US011385516B2

(12) United States Patent
Didomenico

(10) Patent No.: US 11,385,516 B2
(45) Date of Patent: Jul. 12, 2022

(54) AGILE LIGHT CONTROL BY MEANS OF NOISE, IMPULSE, AND HARMONIC SIGNAL INDUCED DIELECTROPHORESIS PLUS OTHER PHORETIC FORCES TO CONTROL OPTICAL SHOCK WAVES, SCATTERING, AND THE REFRACTIVE INDEX OF COLLOIDS

(71) Applicant: Giant Leap Holdings, LLC, Oakland, CA (US)

(72) Inventor: Leo D. Didomenico, Oakland, CA (US)

(73) Assignee: GIANT LEAP HOLDINGS, LLC, Oakland, CA (US)

( * ) Notice: Subject to any disclaimer, the term of this patent is extended or adjusted under 35 U.S.C. 154(b) by 208 days.

(21) Appl. No.: 16/530,889

(22) Filed: Aug. 2, 2019

(65) Prior Publication Data

US 2019/0353975 A1 Nov. 21, 2019

Related U.S. Application Data

(63) Continuation-in-part of application No. PCT/US2018/016930, filed on Feb. 5, 2018.

(60) Provisional application No. 62/460,080, filed on Feb. 16, 2017, provisional application No. 62/456,614, filed on Feb. 8, 2017.

(51) Int. Cl.
 *G02B 26/08* (2006.01)
 *G02F 1/29* (2006.01)
 *G02F 1/167* (2019.01)
 *G02B 1/06* (2006.01)
 *G02B 3/14* (2006.01)

(52) U.S. Cl.
 CPC ............... *G02F 1/167* (2013.01); *G02B 1/06* (2013.01); *G02B 3/14* (2013.01)

(58) Field of Classification Search
 CPC . B01D 61/00; G02B 1/06; G02B 3/14; G02B 3/12; G02F 1/167; G02F 1/166; G02F 1/292
 USPC .................................................. 359/290–320
 See application file for complete search history.

(56) References Cited

U.S. PATENT DOCUMENTS

| | | | |
|---|---|---|---|
| 7,106,297 B2* | 9/2006 | Shannon ............... | G02F 1/1677 345/107 |
| 2006/0050402 A1* | 3/2006 | Ito .......................... | G02F 1/167 359/666 |
| 2007/0115550 A1* | 5/2007 | Nakayama .............. | G02F 1/167 359/487.06 |

(Continued)

Primary Examiner — Mahidere S Sahle
(74) Attorney, Agent, or Firm — Law Office of Christopher Peil; Christopher Peil

(57) ABSTRACT

Methods and devices are provided for the beam steering, focusing, display, and generation of light and images by electronically induced refractive index gradients and scattering fields formed by forces on particles in a colloid due to phoretic processes. The methods and devices provide control over multi-octave bandwidth and polarization diverse light having a large dynamic range in power handling. Embodiments of the technique are provided for large-angle beam steering, beam combining, focusing, and redirecting light electronically. Diverse applications for the technology include, but are not limited to: solar concentrators, LiDAR, robotic vision, smartphone zoom lenses, 3D-manufacturing, high-power laser machining, augmented & virtual reality displays, electronic paper displays, computer and television displays.

33 Claims, 119 Drawing Sheets

FIGURE NOT TO SCALE

(56) References Cited

U.S. PATENT DOCUMENTS

| | | | |
|---|---|---|---|
| 2011/0042215 A1* | 2/2011 | Hou | C30B 29/58 |
| | | | 204/547 |
| 2012/0188295 A1* | 7/2012 | Joo | G09G 3/344 |
| | | | 345/690 |
| 2014/0080040 A1* | 3/2014 | Fontecchio | G03H 1/024 |
| | | | 430/2 |
| 2015/0268529 A1* | 9/2015 | Lin | G02F 1/163 |
| | | | 359/275 |
| 2015/0369220 A1* | 12/2015 | Takatori | B01D 61/00 |
| | | | 60/530 |

* cited by examiner

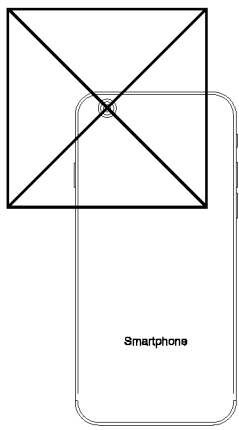
FIG. 1A
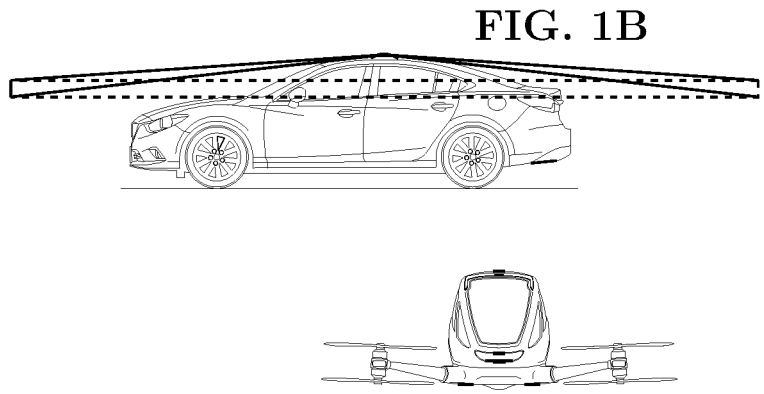
FIG. 1B
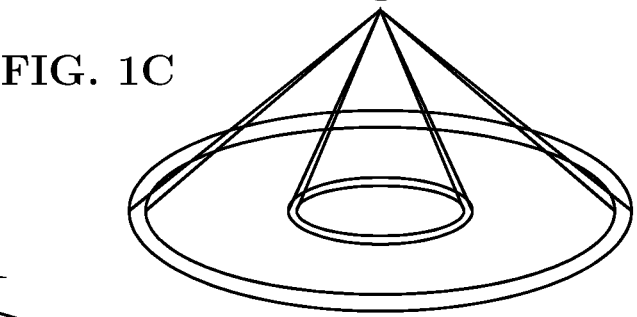
FIG. 1C
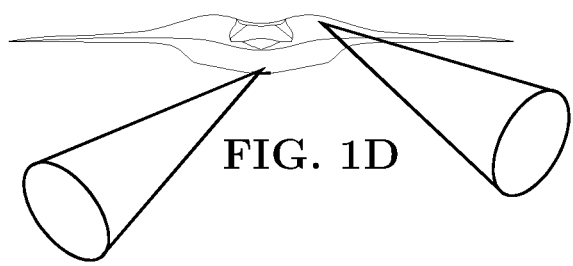
FIG. 1D
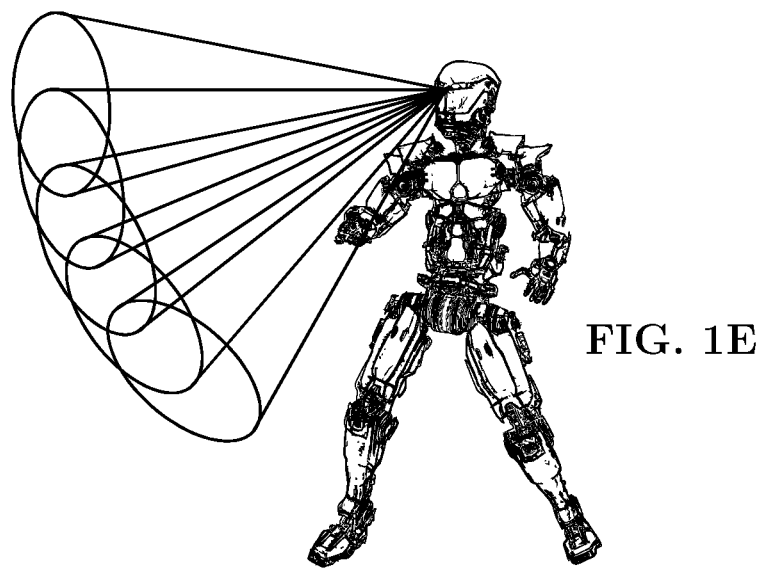
FIG. 1E
FIG. 1

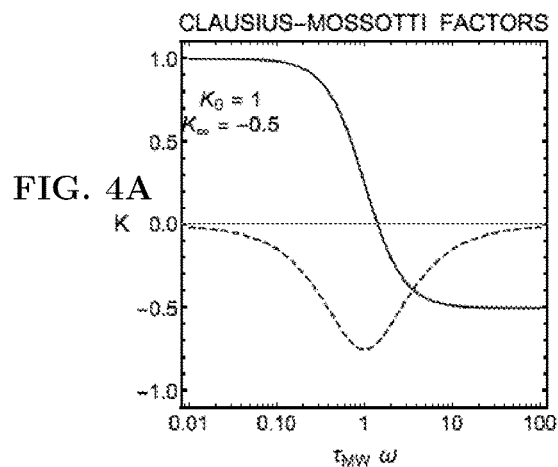
FIG. 4A
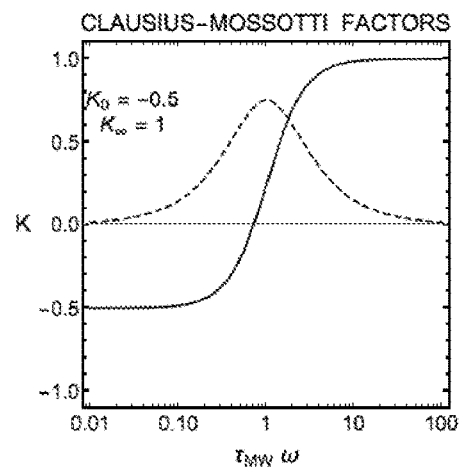
FIG. 4B
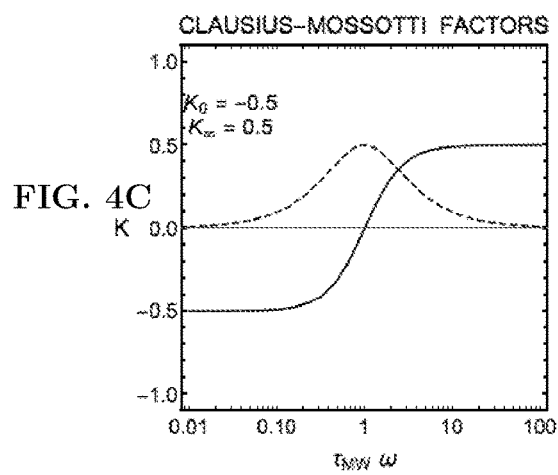
FIG. 4C
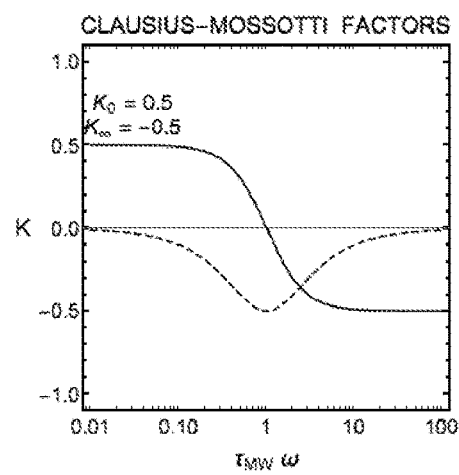
FIG. 4D
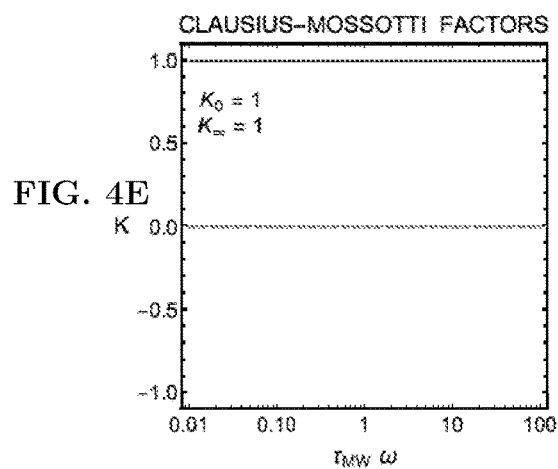
FIG. 4E
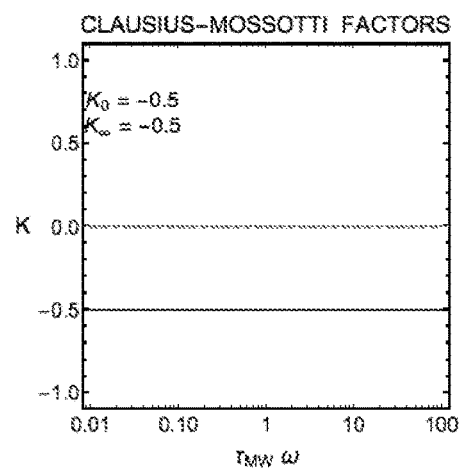
FIG. 4F
FIG. 4

FIGURE NOT TO SCALE

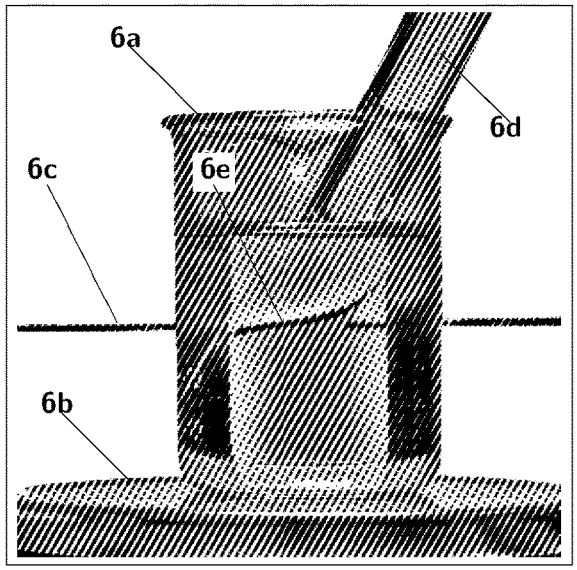
FIG. 6A
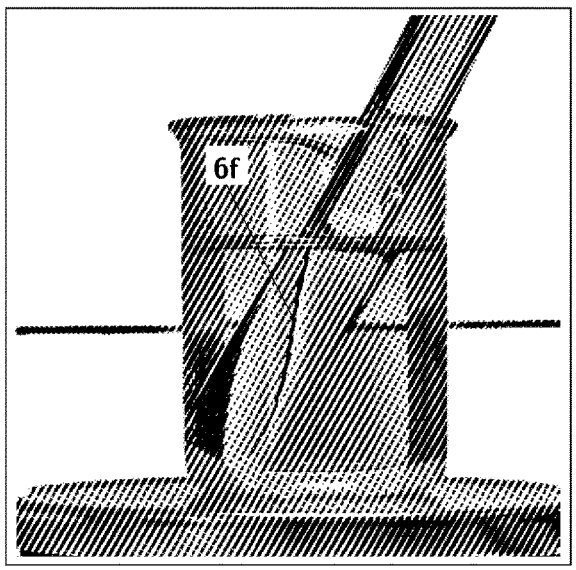
FIG. 6B
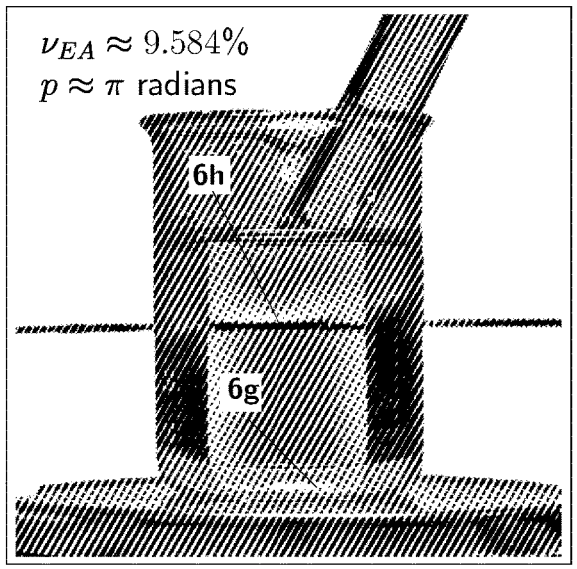
FIG. 6C
FIG. 6

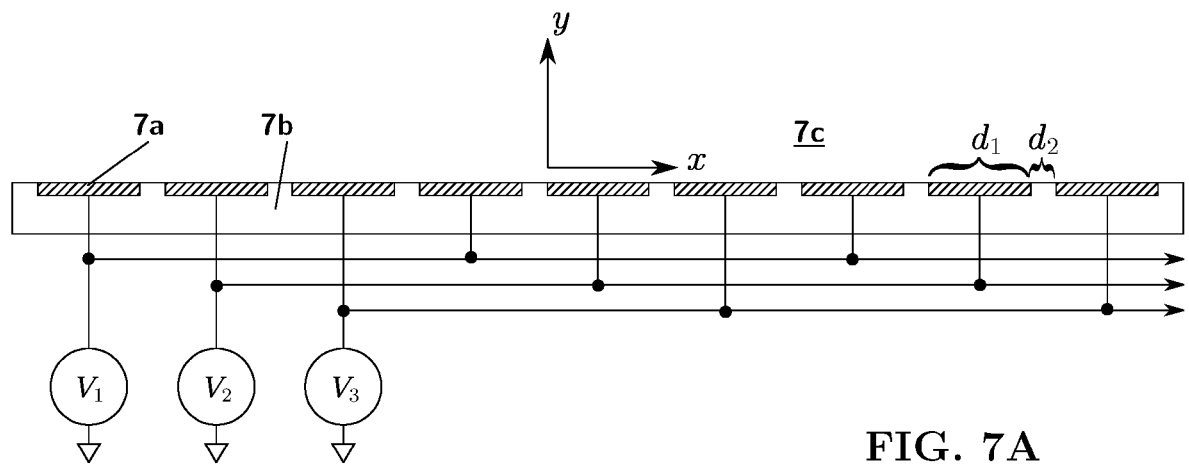
FIG. 7A
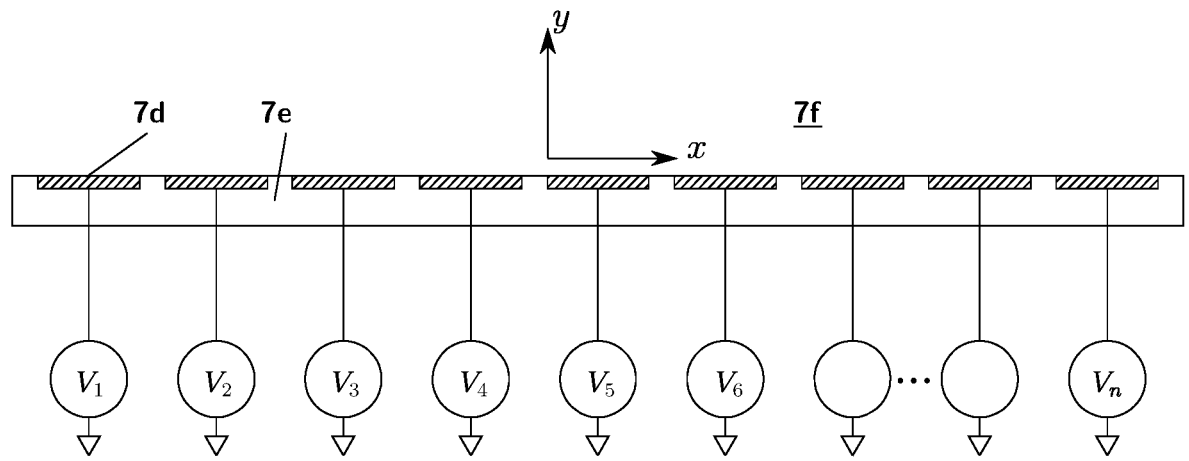
FIG. 7B
FIG. 7

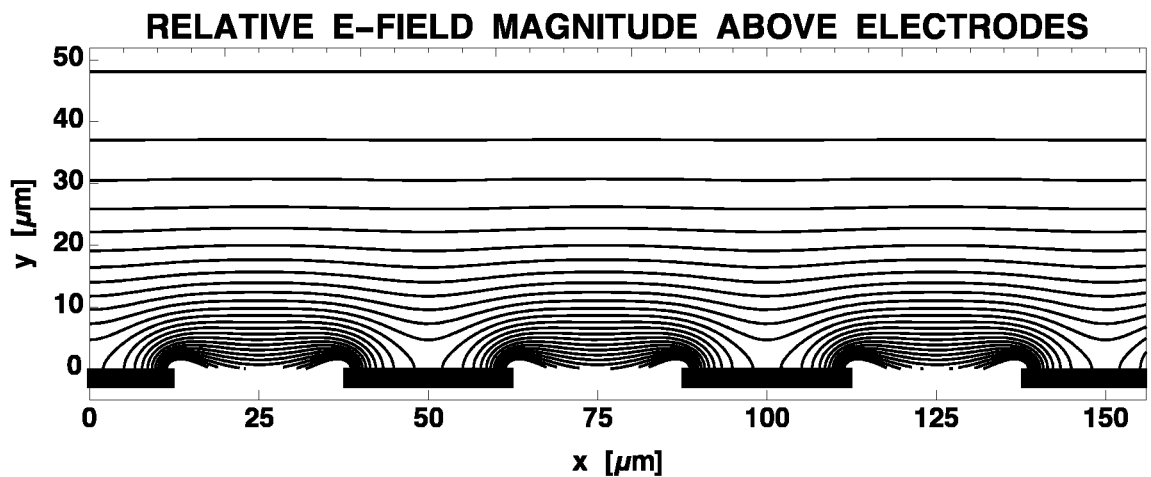
FIG. 8A
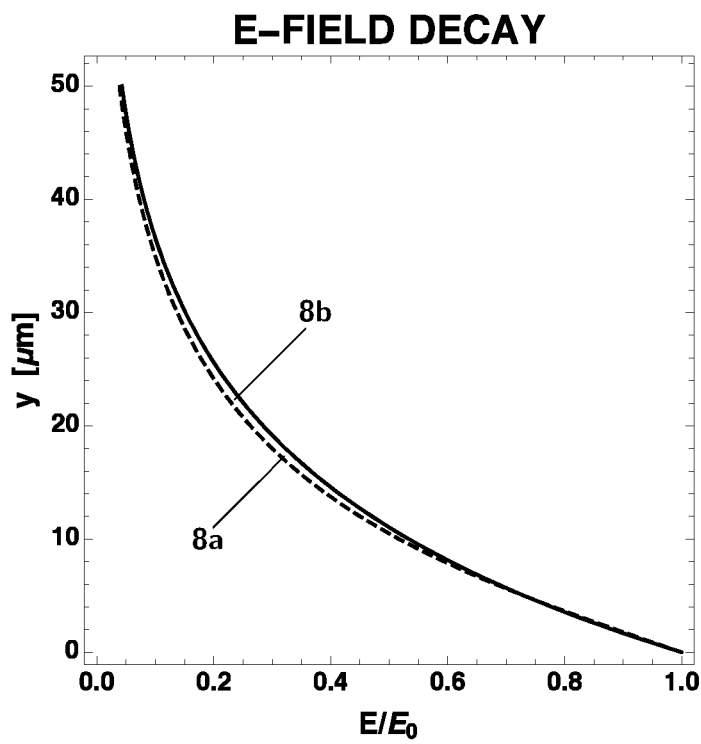
FIG. 8B
FIG. 8

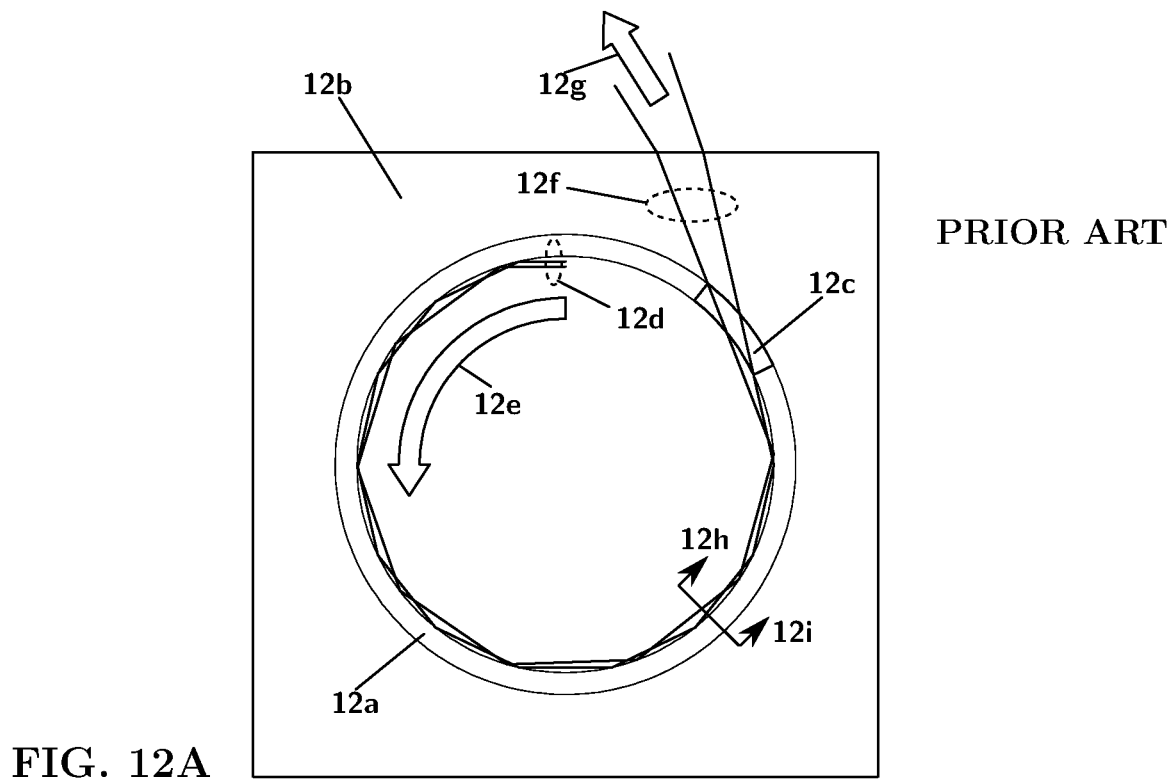
FIG. 12A   PRIOR ART
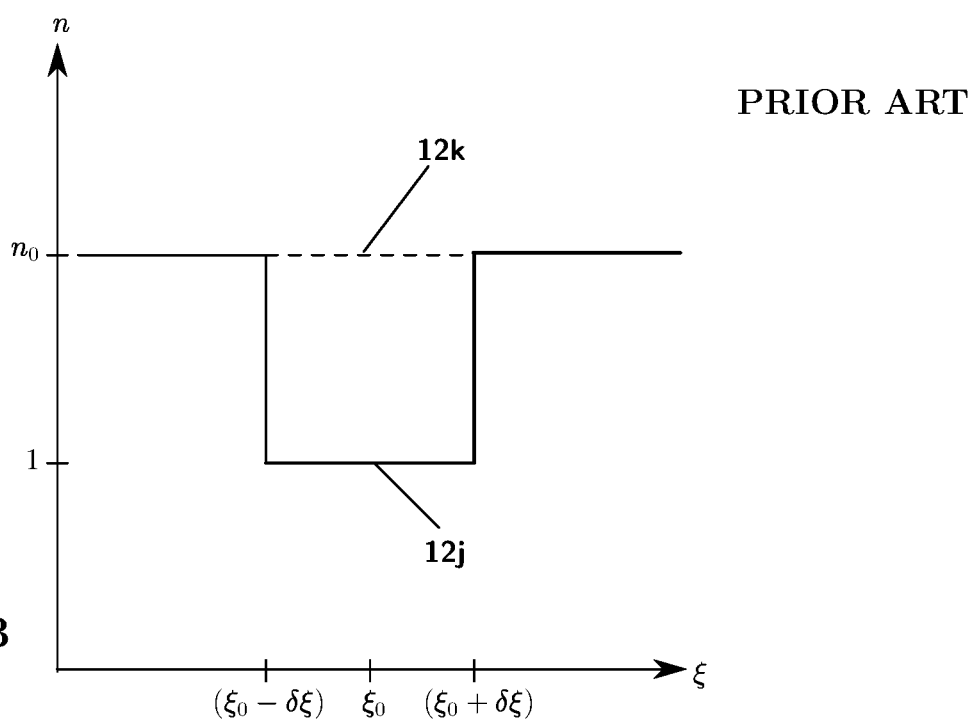
FIG. 12B   PRIOR ART
FIG. 12

FIG. 13

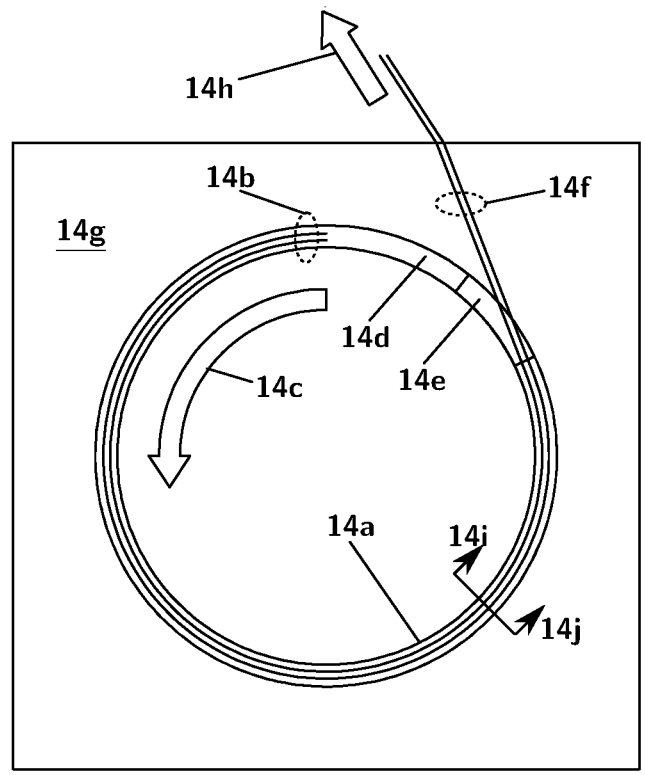
FIG. 14A
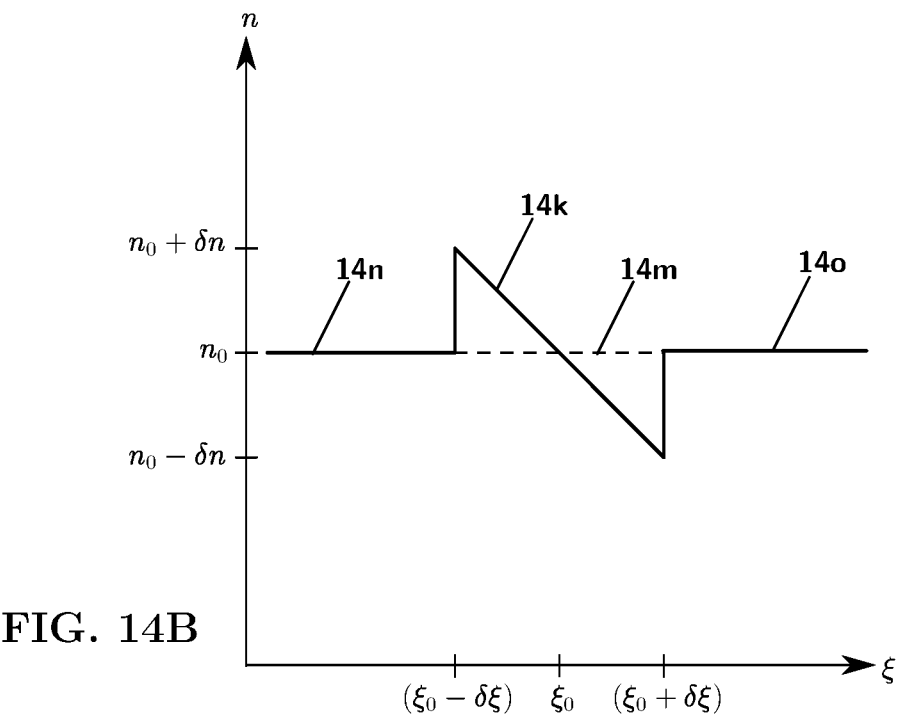
FIG. 14B
FIG. 14

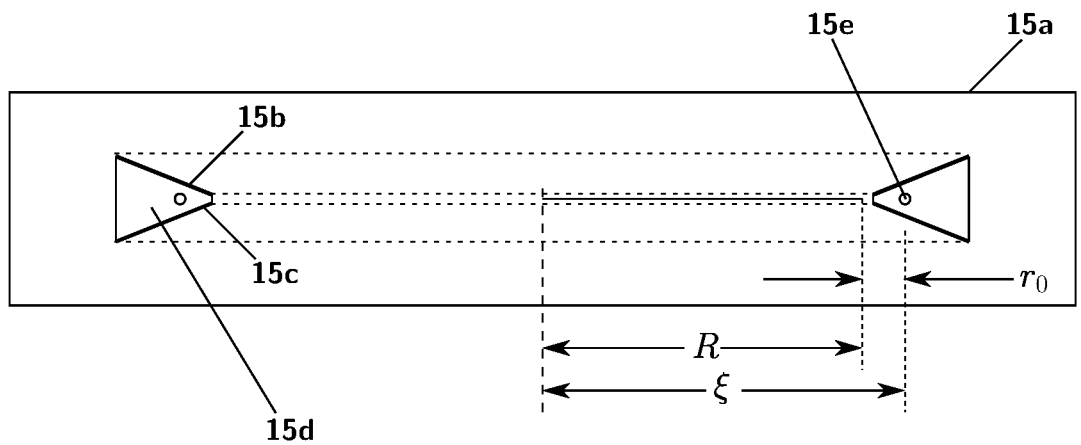
FIG. 15A
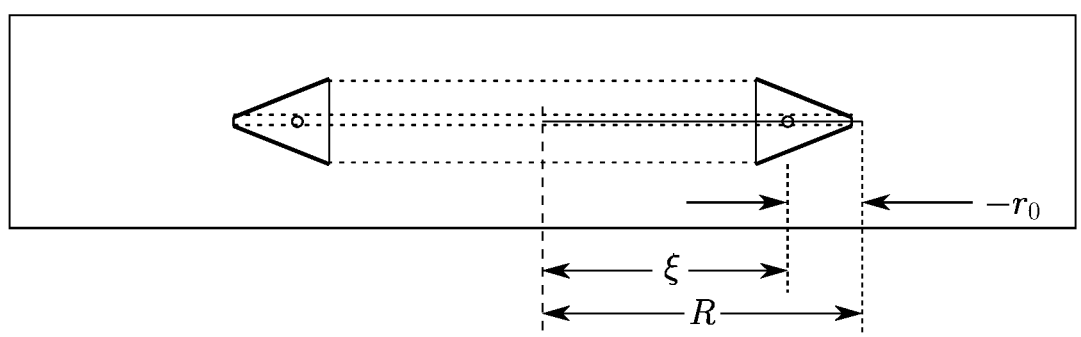
FIG. 15B
FIG. 15

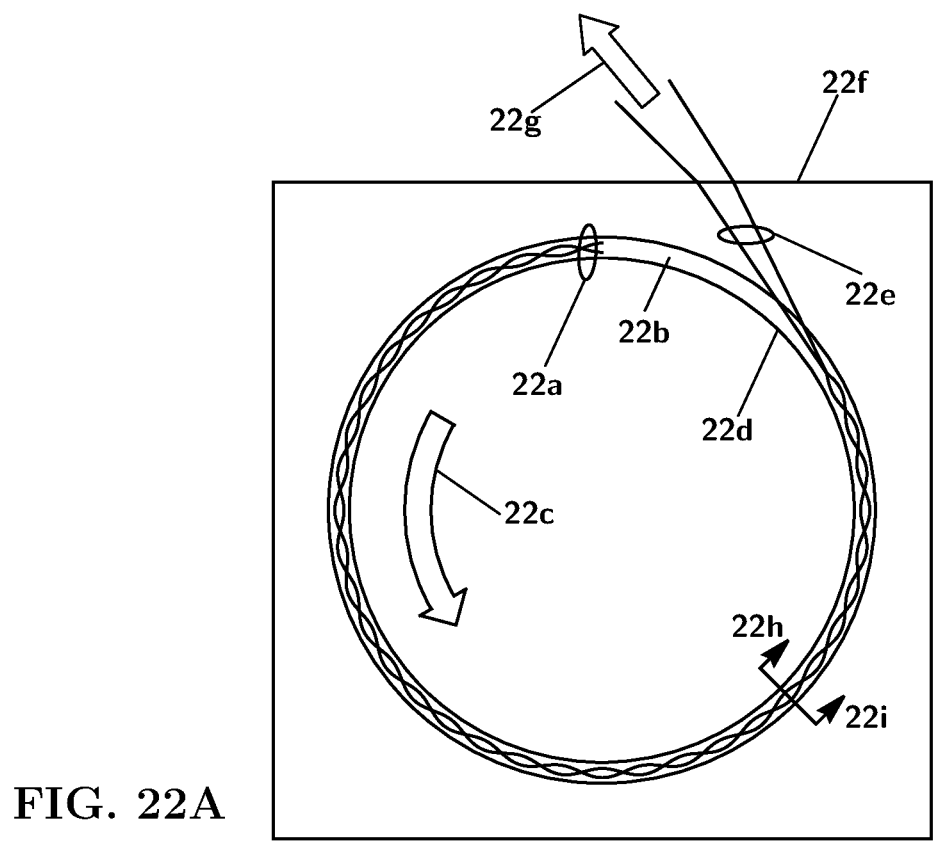
FIG. 22A
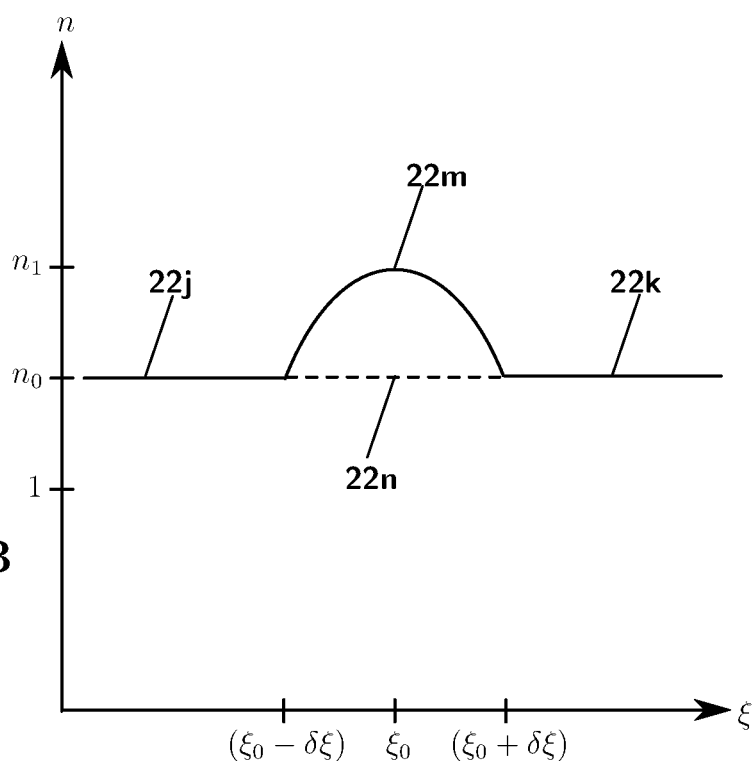
FIG. 22B
FIG. 22

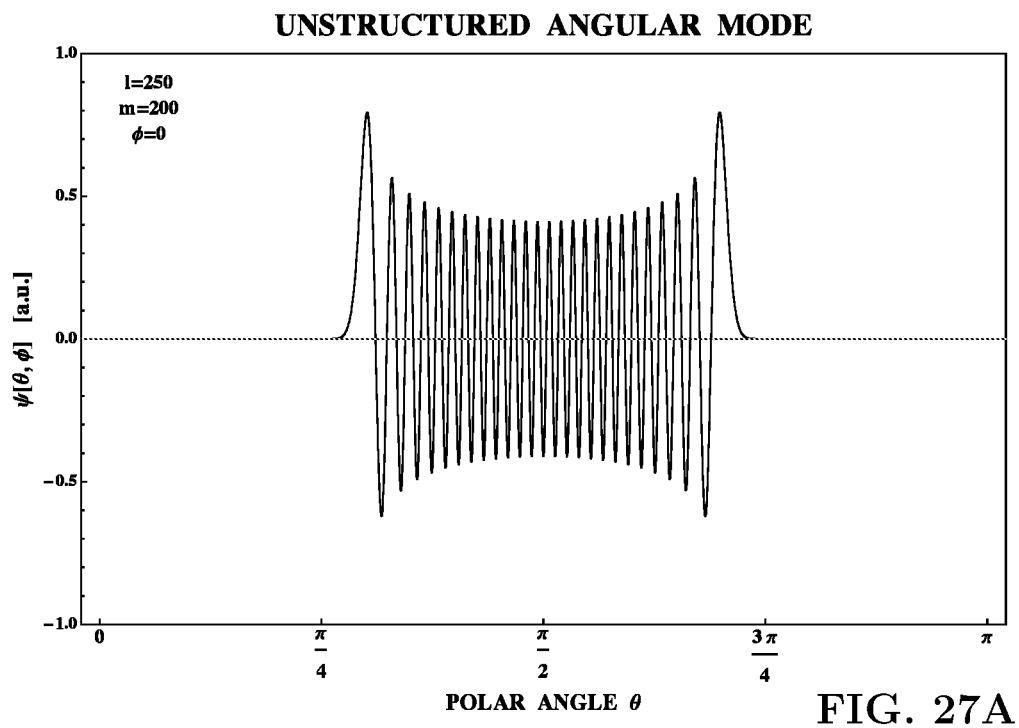
FIG. 27A
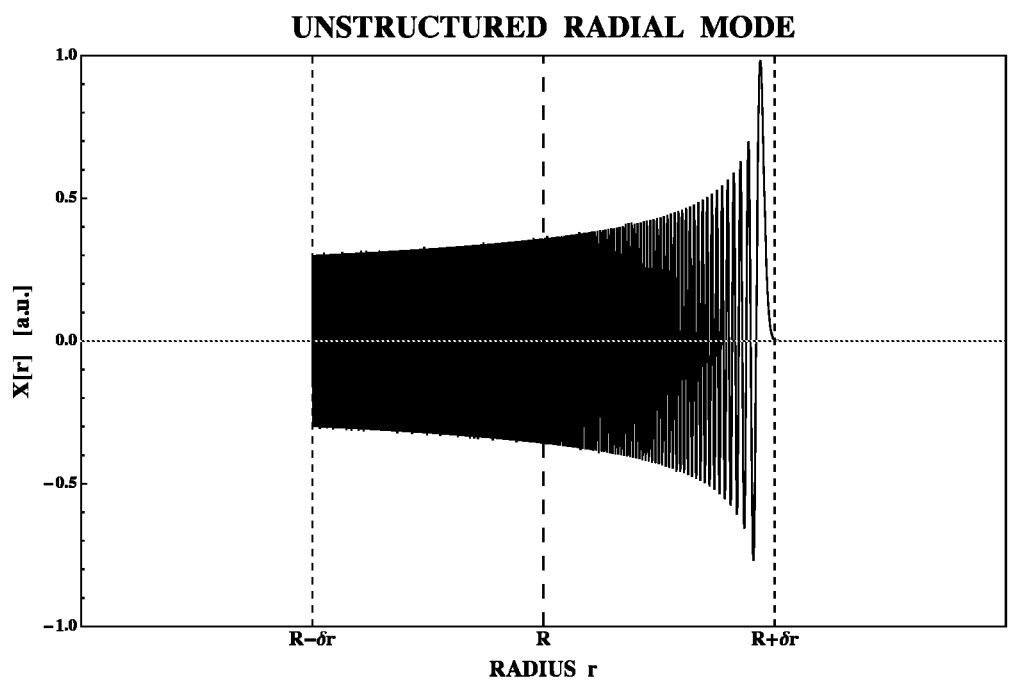
FIG. 27B
FIG. 27

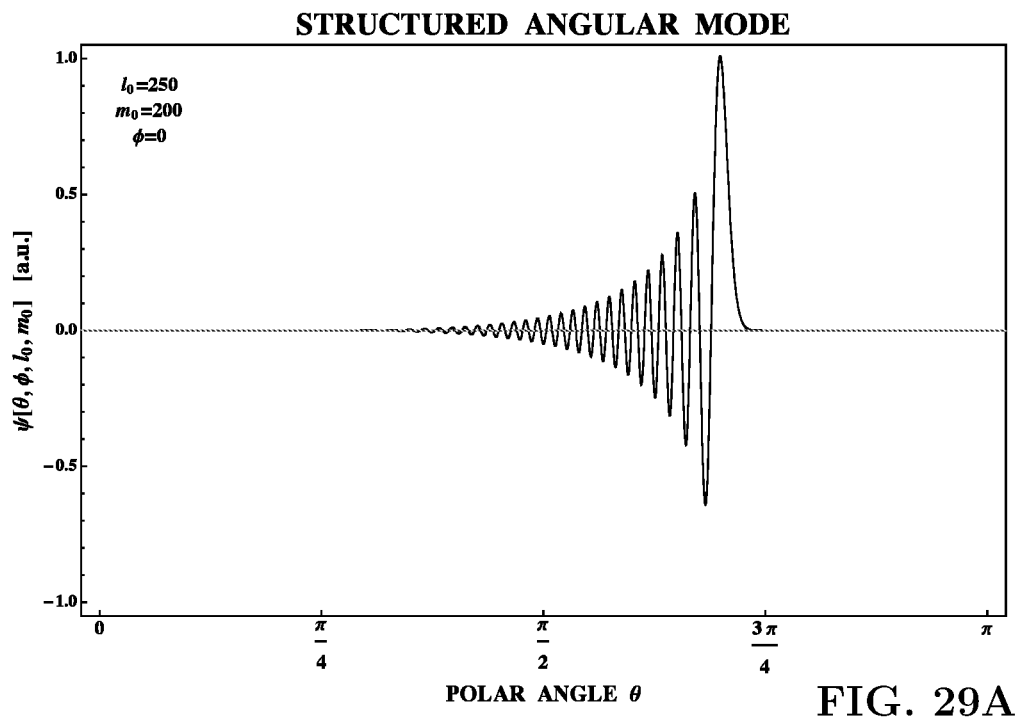
FIG. 29A
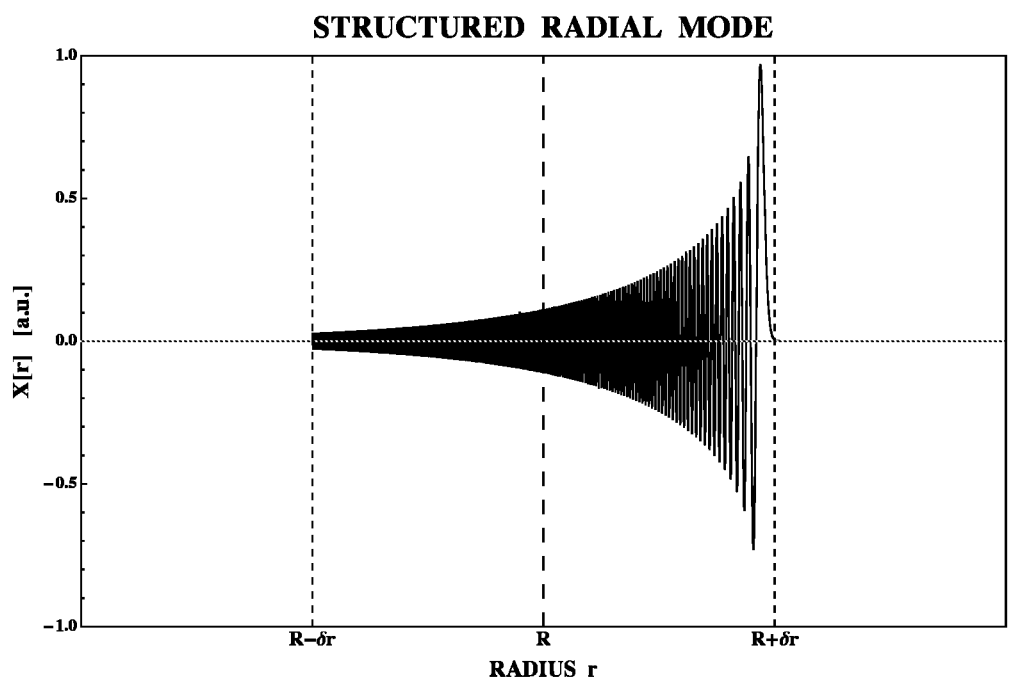
FIG. 29B
FIG. 29

$\omega = \omega_0$
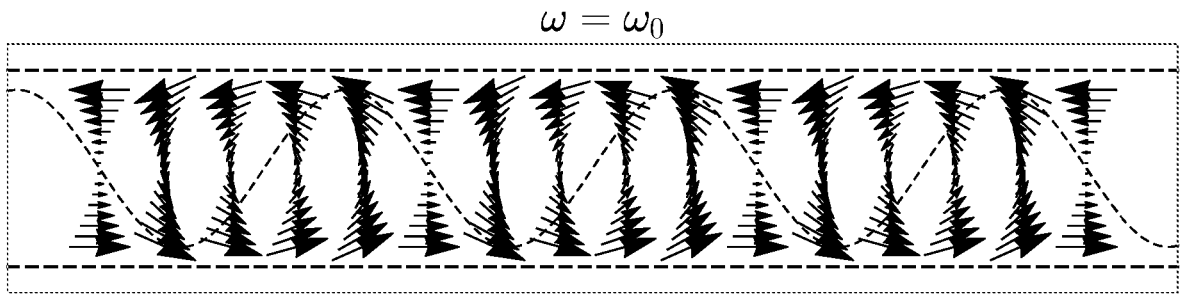
FIG. 48A
$\omega = 3\omega_0$
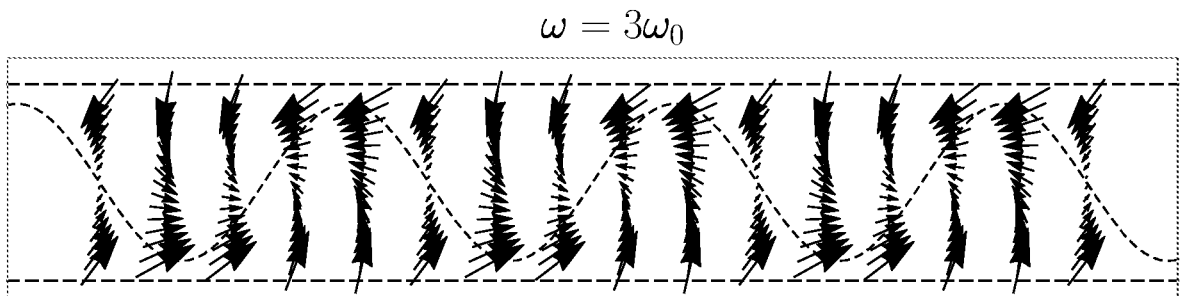
FIG. 48B
$\omega = 10\omega_0$
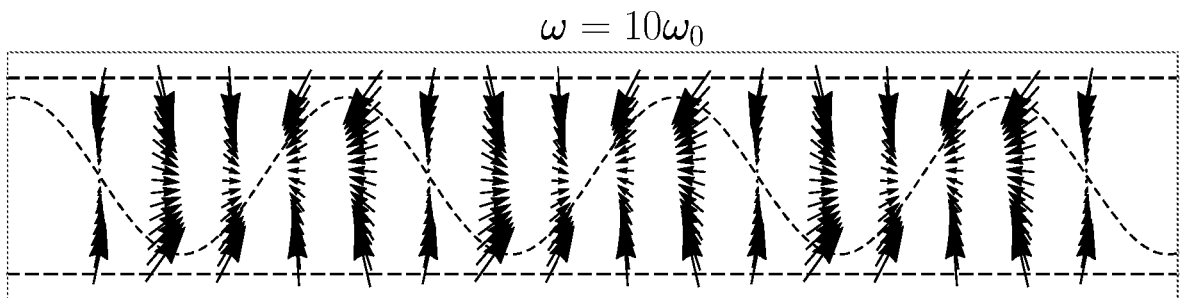
FIG. 48C
FIG. 48

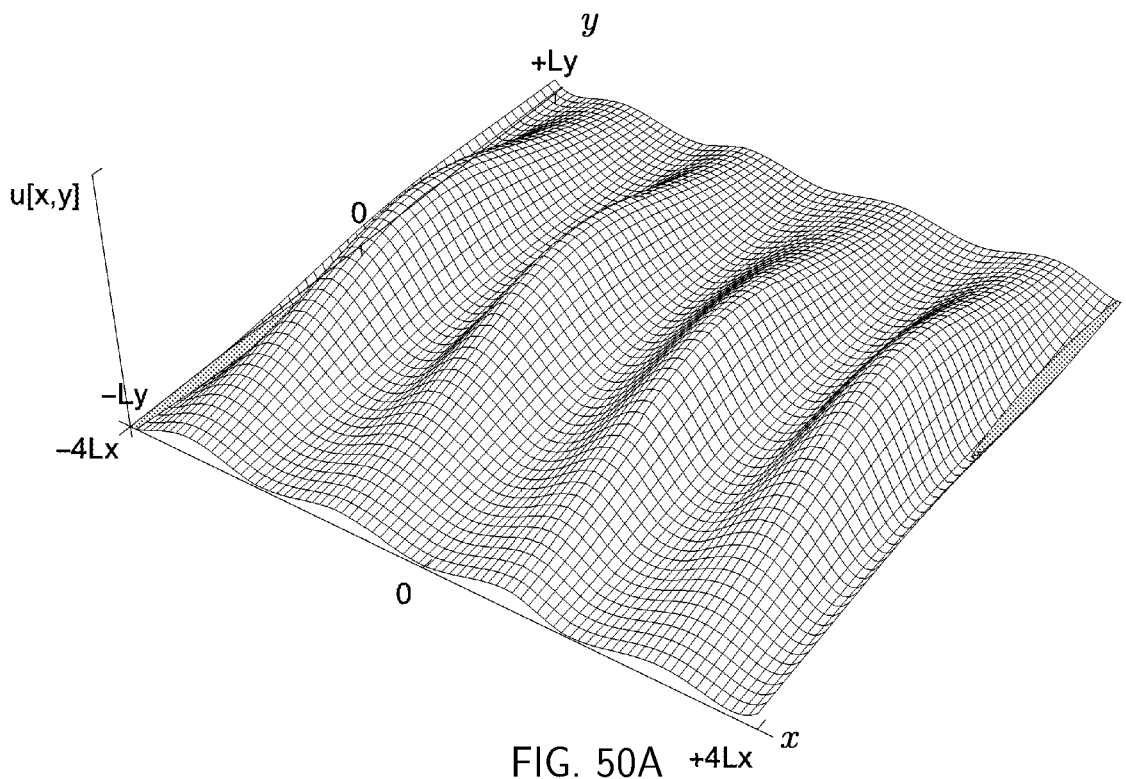
FIG. 50A
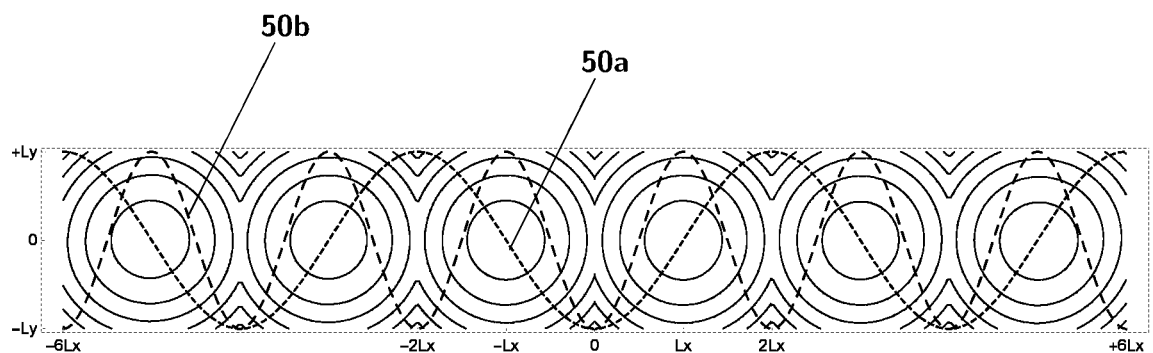
FIG. 50B
FIG. 50

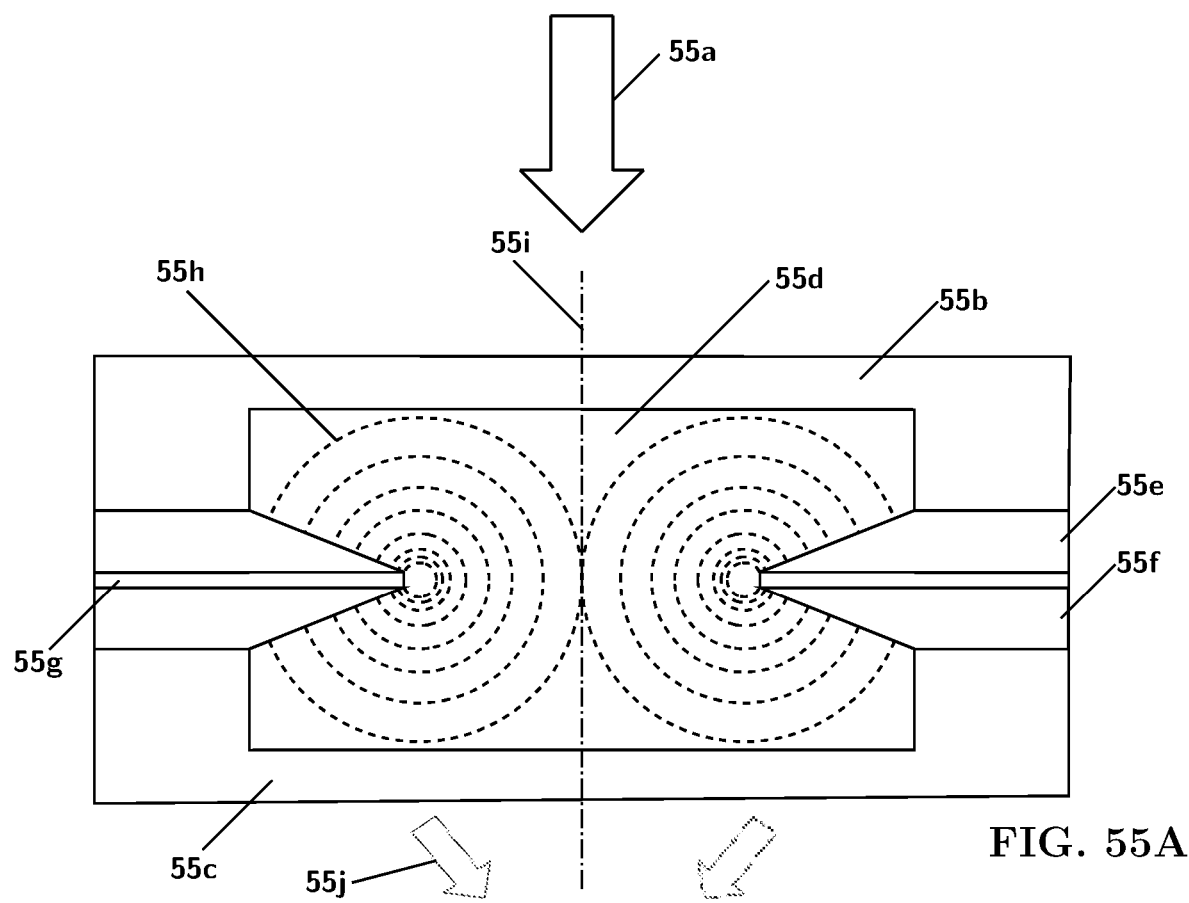
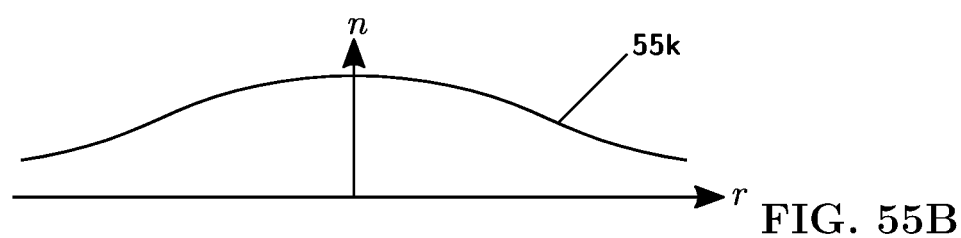
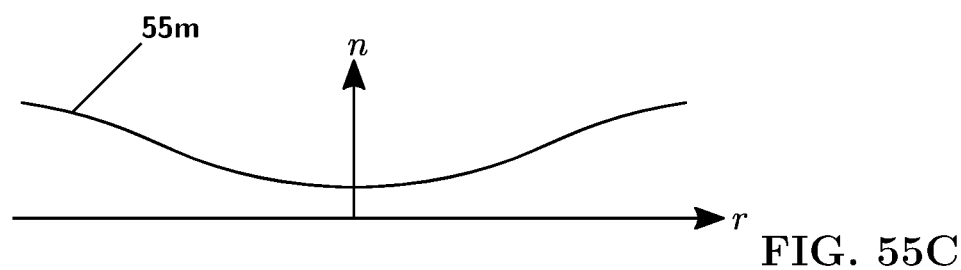
FIG. 55

| REFERENCE SYMBOL | MEDIUM NAME | MEDIUM PHASE | EXAMPLE RI[a] VALUE | NANOPARTICLE VOL. FRAC. ($\nu_S$) |
|---|---|---|---|---|
| 93a | External Environment | Gas/Vacuum/Liquid | 1.00/1.00/1.35 | NA[b] |
| 93b | External Cladding | Solid | 1.49 | NA |
| 93c | Light Guide | Solid | 1.54 | NA |
| 93d | Low RI Colloidal Cladding | Colloidal Liquid | 1.49 | 0% |
| 93e | Low RI Colloidal Cladding | Colloidal Liquid | 1.49 | 0% |
| 93f | Pixel RIM | Colloidal Liquid | 1.54 | 10% |
| 93g | Beam Shaper RIM[c] | Colloidal Liquid | 1.59 | 20% |
| 93h | Beam Shaper RIM | Colloidal Liquid | 1.59 | 20% |
| 93i | Electronics Layer | Solid | 1.59 | NA |
| 93j | Second Lens | Solid | 1.59 | NA |
| 93n | External Eye Environment | Gas | 1.00 | NA |

[a]RI=Refractive Index
[b]NA = Not Applicable
[c]RIM = RI Matching

TABLE 1

FIG. 92

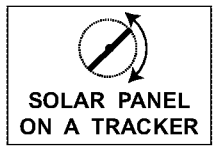
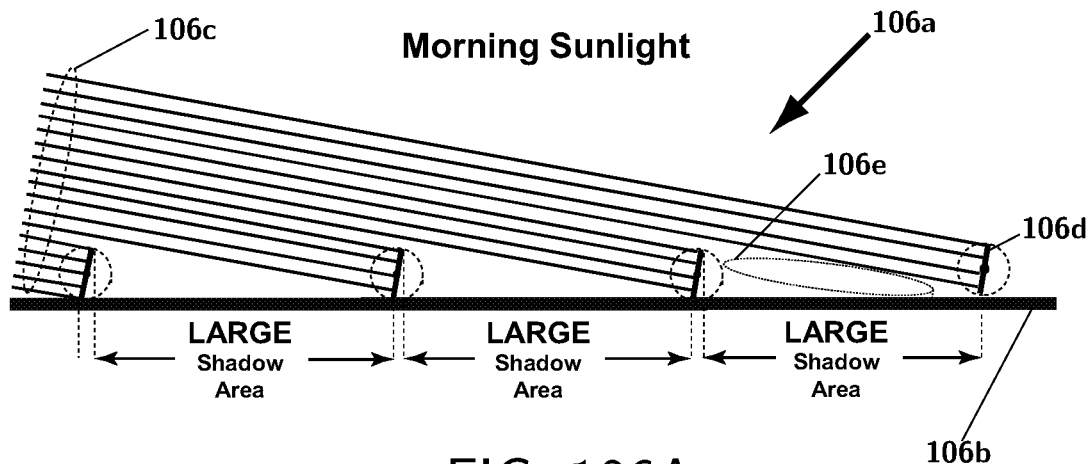
FIG. 106A
PRIOR ART
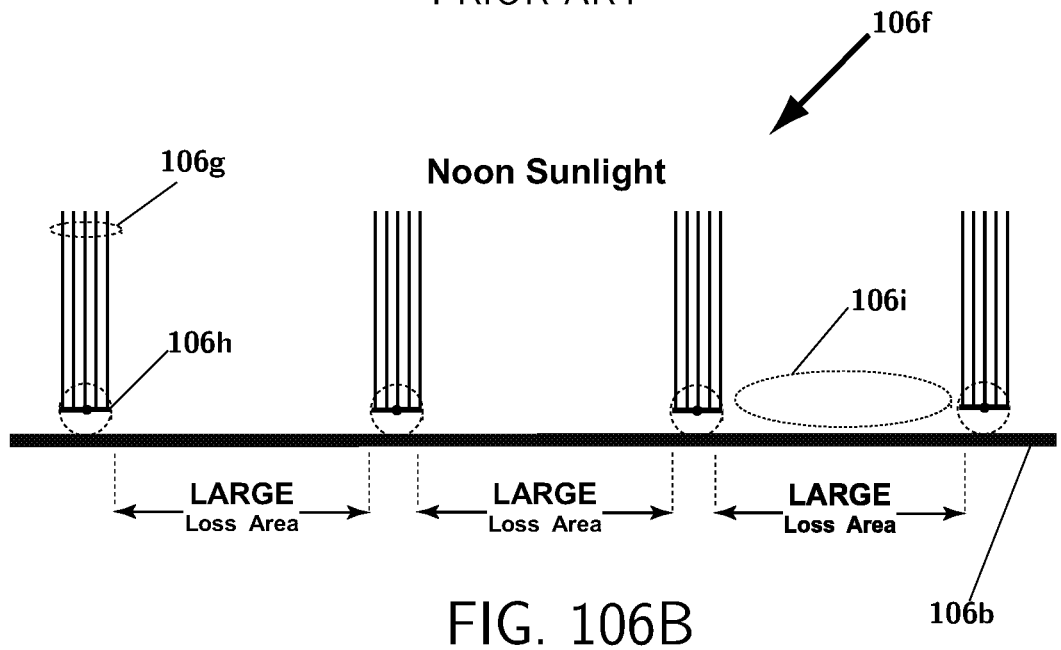
FIG. 106B
PRIOR ART

Figure Not To Scale

Figure Not To Scale

AGILE LIGHT CONTROL BY MEANS OF NOISE, IMPULSE, AND HARMONIC SIGNAL INDUCED DIELECTROPHORESIS PLUS OTHER PHORETIC FORCES TO CONTROL OPTICAL SHOCK WAVES, SCATTERING, AND THE REFRACTIVE INDEX OF COLLOIDS

CROSS REFERENCE TO RELATED APPLICATIONS

This invention claims the benefit of patent applications: [1] PCT application number PCT/US18/016930, entitled "Light Steering and Focusing by Dielectrophoresis," which was filed by patent attorney Christopher Peil for the inventor Leo D. DiDomenico on 2018 Feb. 5, the entirety of which is incorporated herein by this reference; [2] U.S. 62/558,829 filed by patent attorney Christopher Peil for the inventor Leo D. DiDomenico on 2017 Sep. 14 and entitled, "Method and Apparatus for Precision, Non-Mechanical Digital Control of Light," is hereby incorporated in its entirety; [3] U.S. 62/693,894 filed by patent attorney Christopher Peil for the inventor Leo D. DiDomenico on 2018 Jul. 3 and entitled, "Light Steering, Focusing and Fluorescing by Dielectrophoresis," is hereby incorporated in its entirety; [4] U.S. 62/794,505 filed by patent attorney Christopher Peil for the inventor Leo D. DiDomenico on 2019 Jan. 8 and entitled, "Controlling Light by Dielectrophoresis For LiDAR, Beam Steering, Augmented Reality, Electronic Lens Focusing, Sensor Drones, and Other Applications," is hereby incorporated in its entirety.

1 CONTENTS
2 DESCRIPTION
   2.1 Cross Reference to Related Applications
   2.2 Technical Field of Invention
   2.3 Author's Note
3 BACKGROUND ART
   3.1 Fluidic Light Control
4 SUMMARY OF THE INVENTION
   4.1 Problem: How to Control Refractive Index & Light
   4.2 Solution: Use Dielectrophoresis in an Optical Colloid
5 BRIEF DESCRIPTION OF THE DRAWINGS
6 LIGHT CONTROL BY NANOPARTICLE DISTRIBUTIONS
   6.1 Introduction to Physical Principles
   6.2 Dyadic Calculus for Dielectrophoresis
   6.3 Maxwell's Equations and Notation
   6.4 Time-Averaged Maxwell Stress Tensor
   6.5 Time-Averaged Forces By Dielectrophoresis
   6.6 An Alternative Formulation of Dielectrophoresis
   6.7 Noise & Impulse Based Low-Voltage Dielectrophoresis
   6.8 Summary of Nanoparticle Distributions in Colloids
   6.9 Volume-Averaged Refractive Index Distributions
   6.10 Generalized Refractive Index Averaging
   6.11 Fermat's Principle, Atomic Transitions & the Eikonal
   6.12 Redirecting Light Using Colloidal Shock Waves
   6.13 Optical Traps and Dielectrophoresis
   6.14 Generalized Phoresis and Self-Propelled Particles
   6.15 Materials Considerations for Optical Dielectrophoresis
7 LIGHT-BEAM STEERING BY DIELECTROPHORESIS
   7.1 Introduction to Beam Steering
   7.2 Circular Trajectory Beam Steering
   7.3 Helical Trajectory Beam Steering
   7.4 Hybrid LiDAR, RADAR, & Imaging Sensors (Autonomous Vehicles)
   7.5 DEP-Based Generation of Thousands of LiDAR Beams
   7.6 Precision Beam Steering
   7.7 Beam Steering Optics For DEP-Based Gratings
   7.8 Beam Steering Fields For DEP-Based Gratings
   7.9 Beam Steering Sensor Drones
8 LENSES & OPTICS BY DIELECTROPHORESIS
   8.1 Adjustable Focus Lenses for Smart Phones
   8.2 Spectral & Non-Spectral Light Combiners
   8.3 Bistable Optical Switches
   8.4 On GRIN Lens Fabrication Using DEP Electrodes
   8.5 Broadband and Broad-Angle Anti-Reflection Coatings
9 DISPLAYS BY DIELECTROPHORESIS
   9.1 Display Pixels Based On Total Internal Refraction (Not Reflection)
   9.2 Pixel Color By Diffused Quantum & Plasmonic Dots
   9.3 E-Paper By DEP-Diffusion of Large & Small Particles
   9.4 Overview of Augmented & Virtual Reality Displays
   9.5 Augmented Reality Glasses Via Colloidal Shock Waves
10 HIGH-POWER LASERS BY DIELECTROPHORESIS
   10.1 Introduction to Prior-Art High-Power Fiber Lasers
   10.2 DEP-Based High-Power Fiber Lasers
   10.3 Fiber-Bundle Laser With Beam Combiner & Steering
11 SOLAR COLLECTORS BY DIELECTROPHORESIS
   11.1 Introduction to High-Temperature Solar Processing
   11.2 DEP Solar Collectors, Concentrators, and Directors
12 ADDITIONAL APPLICATIONS
   12.1 DEP-based 2D-Reconfigurable Optics
   12.2 Quantum Computing
13 SPECIFICATION END NOTES
   13.1 Scope of Invention
   13.2 Industrial Applicability
   13.3 Acknowledgments
   13.4 Reference Signs List
14 CLAIMS
15 ABSTRACT

TECHNICAL FIELD OF INVENTION

This invention relates to electronically controlling input light using a dielectrophoresis process (and more broadly generally phoretic processes from light, heat, chemical composition, magnetic fields, spin and orbital momentum in light fields, sound, etc.) on colloids or suspensions so that the direction and propagation of light in the colloid or suspension is controlled electronically to provide: fast light-beam steering, light focusing, light generation, and light wavefront control by particle placement within a control volume. These functions are very general and provide a means to address many disparate practical applications.

AUTHOR'S NOTE

The material in this disclosure is a new sub-field of optics: the dynamic control of a refractive index distributions (and scattering in general) by controlling microscopic particle distributions to redirect light often along substantially curved trajectories with accuracy, precision, and speed in ways not possible before in order to replace or enhance traditional optics elements like lenses, mirrors, diffraction gratings, spatial light modulators etc. as well as to create new and hitherto unrealized capabilities.

Therefore, in this document I have taken the effort to develop this topic from first principles and to show many example embodiments for applications in a variety of fields. All the while I have focused on a small number of core principles and hardware elements. These core principles and hardware elements are the focus of what is actually claimed in this disclosure.

BACKGROUND ART

Fluidic Light Control

There are several fluidic methods discussed in the prior art for electronically redirecting light. Broadly speaking micro-optofluidic light guides and lenses are utilized for redirecting light and they are enabled by (1) changing the properties throughout a volume of a liquid (pressure, electric energy, orientation of suspended liquid crystals etc. . . . ) or (2) by changing the shape of a liquid's optical surface by using surface effects. Somewhat more specifically, electrostatic and quasi electrostatic fields in a liquid can provide a means for these changes and can provide: a net force on the bulk volume of a liquid and/or change the contact angle of a liquid's surface with a contacting solid by electronically changing the surface energy of liquids and solids.

In the case of substantially conductive liquids the surface shape is often changed electrically by means of an electrowetting precess, which requires that an insulator covers electrodes so that the electrodes at different potentials are not shorted through the liquid. A voltage across an electrode pair induces polarization charges in the insulators near the electrodes. These polarization charges interact with a polar liquid to change the liquid's surface energy and the wettability of the insulation contacting the liquid. This results in forces on a liquid in contact with the insulator that can move the liquid. It can also change the shape of the surface of a drop of a liquid as a function of applied electrode voltages.

However, in the case of substantially non-conductive liquids the surface shape is often changed electrically by means of dielectrophoresis, wherein the electrodes may now be in direct contact with a liquid that is surrounded by a gas or vacuum. A non-uniform electric field can then induce the liquid to move or to change shape by means of Kelvin forces.

The use of liquid drops in electrowetting and dielectrophoresis based light steering and focusing has disadvantages, including the need for: (1) small optics with limited light gathering ability, (2) multiple lenses to correct aberrations, (3) a limited range of refractive index due to the relatively low refractive index of most liquids so that the refractive power is small and light steering not appreciable.

There are numerous variations in the prior art for using the electrowetting approach including for example U.S. Pat. No. 7,898,740 entitled "Tunable Optical Array Device Comprising Liquid Cells," issued to Jason Heikenfeld et. al. on 2011 Mar. 1. This prior-art patent shows an array of liquid-filled cells comprising at least two transparent and non-miscible fluids, each having a different refractive index. Voltages applied to the cells induce polarization charges that change the wetting angle of the boundary between the two non-miscible fluids, by a process called electrowetting, and this causes the optical boundary to change orientation so that light is refracted into different directions.

There are also numerous variations of the dielectrophoresis based approach of light control, including that discussed in a 2013 review article in the Journal of Physics D: Applied Physics, by Su Xu, et. al, entitled "*Dielectrophoretically tunable optofluidic devices,*" and having digital object identifier doi:10.1088/0022-3727/46/48/483001 J. Phys. D: Appl. Phys. 46 (2013) 483001 (14 pp). The article describes using dielectrophoresis for manipulating a quantity of liquid so that the shape of the liquid changes to provide lensing or guiding of light.

One particularly important point about the prior arts' use of dielectrophoresis for light control is that it is often the case that the focus of attention is a tiny liquid particle (e.g. a liquid drop), which is used in the dielectrophoresis process. The forces of the dielectrophoresis are directed on the liquid drops, which is immersed in a gas, another immiscible liquid or a vacuum medium and moved about by nonuniform electric fields.

In contradistinction, in this disclosure typically solid nanoparticles are immersed in a medium, typically a liquid and to a lesser extent potentially a gas. This may also include semi-solid particles like blood cells and other soft matter particles.

Alternately, in the prior-art the shape of liquid surfaces may be modified indirectly using soft-matter transparent elastomeric membranes, such as polydimethylsiloxane, in combination with actuators like piezoelectrics. Changing the fluid pressure causes liquid that is behind a membrane to push the membrane into a curved surface that mimics a lens shape that can subsequently redirect light.

The use of membrane-based light steering and focusing has disadvantages, including: (1) slow response time, (2) limited controllability of the membrane shape and (3) the need for actuators that may be complex and take up additional volume.

There are also numerous variations of a fluidic and membrane based approach of light control, including those discussed in the book "*Introduction to Adaptive Lenses,*" by Hongwen Ren and Shin-Tson Wu, printed in 2012 by John Wiley & Sons, Inc., ISBN 978-1-118-01899-6, which provides a review of light control techniques and documents optical surfaces formed by elastomeric membranes, piezoelectric actuators, electrowetting, dielectrophoretic optics comprising one or more liquids, liquid crystals, polymer dispersed liquid crystal lenses.

In yet another approach of the prior art two or more flowing liquids are used in guiding and/or focusing light. In particular, different flowing liquids that are moving relative to each other provide a refractive index gradient that is formed and controlled by the local geometry controlling the flow and speed of contacting liquids as a diffusion process works to mix some of one liquid having a low refractive index into another liquid having a higher refractive index. The gradient in the refractive index then provides an optical medium to modify the direction of light propagation.

The use of flowing liquids has disadvantages, including the need for: (1) an expendable feedstock of each liquid, (2) a pump to move each liquid in a flow, (3) the need for significant pump power to overcome friction and momentum and (4) the slow response time of flowing liquid system.

There are also numerous variations for liquid flow and induced refractive index gradient based approach of light control, including that discussed in an article published by the Optical Society of America by authors Richard S. Conroy, et. al., entitled "Optical waveguiding in suspensions of dielectric particles," in Vol. 44, No. 36 of Applied Optics, 2005 Dec. 20. The article focuses on refractive index gradients formed by flowing liquids of differing refractive index.

Another example of controlling light by flowing fluids can be found in the journal review article "*Micro-optofluidic Lenses: A review,*" by Nam-Trung Nguyen and published by the American Institute of Physics in BioMicroFluidics 4, 031501 2010 and having digital object identifier doi: 10.1063/1.3460392. The article notes various techniques of how flowing fluids, including those that have nanoparticle suspensions can redirect light by forming a refractive index gradient.

In yet another approach of conventional liquid crystals, including polymer dispersed liquid crystals, focus and redirect light not necessarily based on the shape of an optical surface, but rather on the orientation of liquid crystals within an optical volume to provide the needed phase shifts to allow the focusing and steering of light.

There are numerous variations on using liquid crystals for beam steering and focusing including: U.S. Pat. No. 6,958,868 entitled "Motion-Free Tracking Solar Concentrator," issued to John George Pender on 2005 Oct. 25, which shows liquid crystal filled prism arrays that can steer light. Another example is U.S. Pat. No. 8,311,372 entitled "Liquid Crystal Waveguide Having Refractive Shapes For Dynamically Controlling Light," issued to Michael H. Anderson et. al. on 2012 Nov. 13. This patent shows how to use evanescent field coupling to liquid crystals to steer light. Yet another example is U.S. patent application 2012/0188467 entitled "Beam steering devices including stacked liquid crystal polarization gratings and related methods of operation," issued to Michael J. Escuti et. al. on 2012 Jul. 26. This patent shows stacks of polarization holograms (instead of the more common phase and amplitude holograms) and is used to steer light. The polarization holograms are formed from electronically controlled liquid crystals with cyclic variations in the liquid crystal orientations.

The use of liquid crystals has disadvantages, including the need for: (1) restrictions in the polarization of the incident and transmitted light and (2) the small difference in refractive index between the extreme values provided by the liquid crystal orientation, which limits the ability to redirect light over large angles.

A different approach to light control is found in U.S. patent application 2006/0050402 A1 entitled "Variable-Focus Lens and Image Taking Apparatus." This patent application shows the use of electrophoresis, which is a strong polarity-dependent phenomenon related to double-layer charge formation at the surface some particles suspended in an aqueous media. The effect provides an effective particle charge and does not require electric non-uniform electric field to induce forces on particles, as is the case for dielectrophoresis.

In Ito's approach to light control electrophoresis is used to move particles in a liquid onto surfaces containing electrodes. The particles are used to build up new curved surfaces with different curvatures so that a variable focus lens is formed. In Ito's approach the rays of light move though the mixture of liquid and particles in piecewise straight line segments and not along curved trajectories. The technique is inherently a DC process and can have parasitic phenomena like electrolysis, it is also slow and very limited in its ability to move beyond light focusing as provided in Ito's disclosure.

Another approach to light control for displays is found in U.S. Pat. No. 7,106,297 B2 entitled "Color Display Device," issued to John M. Shannon et. al. on 2006 Sep. 12. In this patent dielectrophoresis is used to move color absorbing particles into the path of input white light so that the output is given a color via selective absorption. The rays of light in this patent all move in piecewise straight line segments in the mixture of liquid and particles, and not along curved trajectories. Again, the only substantive modification to the input light is its remaining color in a subtractive color scheme. The ability to arbitrarily focus and steer light along curved trajectories is not provided by Shannon, as is required in the present invention.

Therefore, it is clear that there are many known methods for modifying light, however these known methods have an assortment of significant shortcomings that hinder applications. Consequently, there is a clear need for a method of controlling light that can overcome the shortcomings of the prior-art and provide new directions for a plurality of end-use applications.

SUMMARY OF THE INVENTION

Problem: How to Control Refractive Index & Light

The technical question addressed in this disclosure is how to actively take control of at least one of the refractive index and scattering properties of a particle-based colloid in such a way as to directly and electronically control the flow of light or indirectly and electronically control the manufacture of a device that controls the flow of light. The problem of how to provide fast, accurate, and precise light redirection of up to $2\pi$ radians in two dimensions and up to $4\pi$ steradians in three dimensions is addressed as are ray optics and modal optics where control of light fields in space and time are discussed. Particles of the colloid typically, but not necessarily, being nano-scale. The light controlled typically being at least one of narrowband, broadband, coherent, incoherent, low-power, high-power, polarization-specific (e.g. specific spin and orbital angular momentum), polarization-diverse, and "designer light fields" with temporal frequencies connected to spatial frequencies on a dispersion relation manifold.

This disclosure then addresses a plurality of optical problems and demonstrates methods and device embodiments to exploit the properties of particle-based optical colloids that allow electronic control of the colloid and the resulting control of the propagation direction of light for a number of applications, including: beam steering, focusing, concentration, wavefront-control, display of information, high-power laser beam combining, stable high-power fiber lasers, and other optical operations including those for optical device manufacture. Thus, the solution of a small number of engineering problems related to the control of an optical colloid may impact and enable a large number of applications and some of those application embodiments are demonstrated.

The application problems that are described herein typically require: low optical loss, broad spectral range, large angular steering range, high angular steering precision, high angular steering accuracy, polarization independence, voltage controllability, low power consumption, intensity-independent operation, fast responding, thin profile, configurable to steer, focus, concentrate and display information using light. Thus, part of the problem addressed is how to provide these properties, when needed, to the application embodiments through the demonstration of the small number of principles related to controlling a particle-based optical colloid.

The necessary problems of proper selection of materials for making devices functional, relatively safe, non-toxic and capable of working over temperature ranges that exceed the typical US Mil-spec temperature range (−55° C. to +125° C.) over extended periods of time is also addressed for systems comprising mixtures of solids and liquids.

More specific problem and application areas are addressed in FIG. 1. In particular, FIG. 1A shows a smartphone camera lens in the upper left corner that focuses light electronically over a large range of environmental conditions while providing corrections to image aberrations that have historically taken large complex compound lens configurations but are now contained in a single lens element having graded refraction index optics to reduce the size, complexity and cost. The device is ideally conformal to the smartphone, compact and electronically controlled.

In FIG. 1B a LiDAR system that is nearly conformal to a car's roof provides digital and non-mechanical beam steering of laser light over extreme environmental conditions. The beam steering is over an azimuth angle of $2\pi$ radians and has a modest amount of elevation scan angle to allow the car's LiDAR system to paint a full scene of the road and adjacent areas with pulsed laser energy to recreate an accurate representation of the space around the vehicle. Whether the conformal surface is the car's hull or the windshields, there is a way to integrate the beam control systems discussed in this disclosure.

In FIG. 1C a LiDAR system that is nearly conformal to a drone aircraft is shown as different angular regions of a landing area are searched for hazards. As can be seen, instead of the LiDAR beam steering constrained predominantly to a planar circle (as for the car) the beam steering is now over a hemisphere of $2\pi$ steradians beneath the drone. Systems with spherical coverage of $4\pi$ steradians are also possible. Here again the large beam steering angle is shown in the context of conformal or nearly conformal beam directors in the hull of the craft.

In FIG. 1D several light beams are shown for LiDAR and beam steering applications, which are directly integrated into the hull of an aircraft to allow aerodynamic performance to be maintained. The aircraft is shown in a head-on view from which the need to maintain the craft's smooth aerodynamic surfaces are clearly seen. Additionally, note that different portions of the hull of the aircraft are clearly being used to send out (and potentially receive) the beams of energy.

In FIG. 1E a robot vision application that provides a combination of imaging and LiDAR to sense the environment for a robot.

In FIG. 2 an augmented reality (AR) display application combines an external scene with graphics and alpha numerics to provide enhanced situational awareness to a human. The AR glasses 2a are shown being worn as glasses. Each AR pixel element 2b can obtain information from both an image scene 2c (an aircraft is shown as an example image scene) and an independent electronic source (not shown in this figure) that will provide graphics and text to overlay on the scene to be perceived by the user as an overlay of graphical and text information.

To the best of the author's knowledge at the time of the writing of this document, the material in this document appears to describe a new subfield of optics. Additionally, recent review articles on the trajectory of the field of dielectrophoresis appear to neither teach or anticipate the material in this disclosure. An example of such a review article is given by Prof. Ronald Pethig of the School of Engineering, The University of Edinburgh, Edinburgh, Scotland EH9 3JL, United Kingdom, via the article "*Review—Where Is Dielectrophoresis (DEP) Going?*," Journal of The Electrochemical Society, 164 (5) B3049-B3055 (2017).

In summary, this disclosure focuses on a small number of principles related to the electronic control of particle-based colloids that exploit dielectrophoresis (and other phoretic forces) for controlling the refractive index of the colloid and the resulting flow and properties of light. This has broad applicability and the many examples provided demonstrate the flexibility of the method.

Solution: Use Dielectrophoresis in an Optical Colloid

The main focus of a solution to the above-stated problem is found in a process of Dielectrophoresis (DEP) in an optical colloid (or suspension), which modifies the properties of input light using small particles that are moved within a control volume to interact and scatter the input light under the influence of a non-uniform electromagnetic field. A secondary focus of a solution is found in the use of phoresis in general, i.e. where dielectrophoresis only being one form of phoresis and other phoretic forms are given later herein.

In particular, DEP provides ponderomotive forces on particles in a liquid (or gas) using particle interactions with a non-uniform electromagnetic field. Typically, a quasi-electrostatic field is the focus of attention, though this is not always the case in this disclosure. DEP-based ponderomotive forces do not require particles to be charged or to even be dielectric. In fact, all particles exhibit dielectrophoresis in the presence of nonuniform electric fields. However, a special case of particular interest is DEP for transparent dielectric particles driven by a harmonic non-uniform electric field, which can provide a (non-harmonic!) constant average ponderomotive force in one direction locally. This unidirectional ponderomotive force is a result of forces on a particle not being symmetric during each full oscillation of the electric field. The resulting average force can produce a constant drift velocity on solid nanoparticles because the friction of the viscous liquid on the particle resists the unbounded acceleration of the particle and the particle's velocity saturates to a constant. Moreover, the harmonic form of DEP avoids many parasitic phenomena, such as electrophoresis, electro-osmosis and electrolysis, which may make light control more difficult in practice.

Thus, while this disclosure has a strong focuses on harmonic DEP, the principles can also be applied to constant-field DEP processes if one is willing to address or potentially even utilize the parasitic phenomena in specific applications. Thus, this disclosure covers harmonic oscillating-field DEP, constant-field DEP processes, and even phoresis of other quantities (i.e. gradients in light intensity, temperature, magnetic field, etc. . . . ) to cause forces on particles to redirect light.

It should be pointed out that the word "dielectrophoresis" is typically associated with electrodes configured to provide a non-uniform harmonic electric field by means of impressed voltages. This is true in this disclosure too, however the concept of dielectrophoresis is also explicitly extended so that some embodiments may not have any electrodes at all. In this case it is typical that the electric fields are derived from light itself that compels the dielectrophoresis process. An example of this is a focused Gaussian laser beam where the focus region has non-uniform electric (and magnetic) fields. Thus, what is important is that there are non-uniform electromagnetic fields that are typically harmonic and not that there are electrodes. Also, the particles being controlled and coupled to light and optics can be dielectrics, metals, quantum dots, plasmonic dots, photonic bandgap dots, biological cells and many other complex and hybrid structures as will be discussed later for specific applications.

When we apply this ponderomotive force to large numbers of nanoparticles in a colloid we can control the distribution of those nanoparticles and the resulting refractive index as a function of space and time due to impressed non-uniform electric fields. Different size distributions of nanoparticles and different materials will separate differently in space and this allows for an optical element having many degrees of freedom so that various lens or beam steering aberrations are reduced or eliminated in one compact device. Therefore, instead of needing to use multiple lenses a single lens, having different electronically induced optical regions that are configured to eliminate aberrations, may be used. For example, by having some nanoparticles with positive material dispersion and other nanoparticles with negative material dispersion we can better manage chromatic aberrations in a single lens element.

A colloid is a homogeneous, noncrystalline substance comprising nanoparticles of one or more substances mixed and dispersed through a second substance. The nanoparticles do not settle or precipitate from a colloid and cannot be separated out by mechanical means like filtering or centrifuging the mixture. For example, under certain circumstances smoke is a colloid of particles in a gas medium. This is unlike nanoparticles in a suspension where such mechanical actions can separate the nanoparticles from a liquid eventually. Additionally, a colloid in a liquid host is often made stable against precipitation and flocculation by means of adding surfactants and other chemicals into the liquid or onto the nanoparticles. In this document the nanoparticles of interest typically have diameters of 1-100 nm, however this size range is not meant to limit the use of other particle sizes in this disclosure especially in the medical and three dimensional printing applications where larger particles (e.g. blood cells) are typical.

Consequently, as the size of the nanoparticles can be much smaller than the wavelength of light steered, e.g. visible light is from about 380-740 nm, we can approximately average the colloidal refractive index by using the volume fraction of the nanoparticles in the liquid. The direction of light passing through the colloid of nanoparticles is then controlled by using strategically located non-uniform electric fields to change the nanoparticle spatial distribution to redirect light. When used to steer light beams this is called Dielectrophoresis Beam Steering (DBS).

However, nanoparticles that are substantially smaller than the wavelength of light cost more to manufacture than larger nanoparticles and also have less surface area so that larger voltages are required to separate the nanoparticles and form a refractive index gradient. Therefore, the following disclosure also shows how to use larger particles by using a refractive index averaging process that includes diffraction effects of the light around the nanoparticles. This is accomplished by leveraging the theory of anomalous diffraction as applied to a colloid to properly describe the effective refractive index in a DEP driven colloid. It will also be seen that different probability distributions of nanoparticle size and material composition will interact in a complex way to further change the refractive index averaging process and that this can be leveraged to provide many additional degrees of freedom to control the redirection, concentration and focusing of light.

In this disclosure a distribution of dielectric nanoparticles in a liquid forms a colloid that is called an Index Gradient Liquid (IGL). This is different than an Index Matching Liquid (IML), also synonymously called an Index Matching Fluid (IMF), which has been used by this author in other disclosures for soft-matter beam steering. Thus, the refractive index of an IGL is electronically controlled to achieve a refractive index gradient for steering and focusing light, typically within a microfluidic Control Channel (pFCC), or a control volume in a solid and transparent host material. In contradistinction, an IML requires meso-scale advection of the optical liquid to achieve beam steering. IMLs and IGLs provide for different, but complimentary techniques to control light.

BRIEF DESCRIPTION OF THE DRAWINGS

The foregoing discussion is only an introduction and other objects, features, aspects, and advantages will become apparent from the following detailed description and drawings of physical principles given by way of illustration. Note that figures are often drawn for improved clarity of the underlying physical principles and are not necessarily to scale and have certain idealizations introduced to show the essence of the method and embodiments and to make descriptions clear.

FIG. 1A shows a smartphone using dielectrophoresis-based focusing for high performance imaging.

FIG. 1B shows an automotive LiDAR with a dielectrophoresis-based beam steering system for a LiDAR system that is conformally mounted to a car.

FIG. 1C shows a drone LiDAR with a dielectrophoresis-based beam steering system for a collision avoidance system that is conformally mounted to a drone.

FIG. 1D shows LiDAR beam steering on a high-performance drone.

FIG. 1E shows a hybrid imaging LiDAR system conformally integrated into a robot for machine vision systems.

FIG. 4A shows the real and imaginary parts of the Clausius-Mossotti factor for $K_0=1$ and $K_\infty=-0.5$.

FIG. 4B shows the real and imaginary parts of the Clausius-Mossotti factor for $K_0=-0.5$ and $K_\infty=1.0$.

FIG. 4C shows the real and imaginary parts of the Clausius-Mossotti factor for $K_0=-0.5$ and $K_\infty=0.5$. FIG. 4D shows the real and imaginary parts of the Clausius-Mossotti factor for $K_0=0.5$ and $K_\infty=-0.5$.

FIG. 4E shows the real and imaginary parts of the Clausius-Mossotti factor for $K_0=1$ and $K_\infty=1$.

FIG. 4F shows the real and imaginary parts of the Clausius-Mossotti factor for $K_0=-0.5$ and $K_\infty=-0.5$.

FIG. 6A Shows a calibration line optically passing through a beaker with an acrylic rod immersed in methylphenyl siloxane.

FIG. 6B Shows a calibration line optically passing through a beaker with an acrylic rod immersed in ethyl acetate.

FIG. 6C Shows a calibration line optically passing through a beaker with an acrylic rod immersed in a mixture of methylphenyl siloxane and ethyl acetate.

FIG. 7A shows a polyphase voltage excitation that effectively provides an in-phase and quadrature electric field excitation and a traveling voltage wave.

FIG. 7B shows a polyphase and amplitude voltage excitation with arbitrary in-phase and quadrature electric field excitation.

FIG. 8A shows a contour of the magnitude of the electric field for a 2-phase traveling voltage wave over an electrode array.

FIG. 8B shows electric field decay and its approximation as an observer moves away from the electrode array.

FIG. 12A shows a prior art embodiment for redirecting light that is based on advection of a refractive index matching liquid within a microfluidic control channel that forms a control volume.

FIG. 12B shows the on-state and off-state refractive indices as a function of radius for the device in FIG. 12A.

FIG. 14A shows one embodiment of dielectrophoresis based beam steering to form a graded refractive index sufficient to curve the path of the light until it is released for free-space propagation.

FIG. 14B shows the refractive index as a function of radius for the device in FIG. 14A.

FIG. 15A shows in cross section electrodes on the surfaces of a wedge shaped containment vessel forming a control volume, where an Index Gradient Liquid is subject to a nonuniform electric field. The wedge is oriented for a positive radius sign convention as described in the disclosure.

FIG. 15B shows electrodes on the surfaces of a wedge shaped containment vessel, where an Index Gradient Liquid IGL is subject to a nonuniform electric field. The wedge is oriented for a negative radius sign convention as described in the disclosure.

FIG. 22A shows circular beam steering based on dielectrophoresis to form a gradient refractive index medium to confine and redirect light. This beam steering device can release its light beam or hold it internally for applications like a rotation sensing via a light-based gyroscope using the Sagnac effect with counter propagating light beams.

FIG. 22B shows the gradient refractive index distribution for FIG. 22A as well as the uniform refractive index state outside of the control volume.

FIG. 27A shows an example of a basic unstructured angular mode in the form of a spherical harmonic function.

FIG. 27B shows an example of a basic unstructured radial mode in the form of an Airy function, where the mode is only shown in the microfluidic control volume.

FIG. 29A shows an example of a structured angular mode in the form of a superposition of gaussian weighted spherical harmonics at $\phi$=0.

FIG. 29B shows an structured finite power radial mode in the form of an Airy function, where the mode is only contained in the microfluidic control volume.

FIG. 48 A-C shows a time-averaged force field in colloid contained in a control volume between two transparent sheets over several standing wave periods under differing conditions of excitation frequency.

FIG. 50 A Shows a 3D plot of a dielectrophoresis induced grating based on counter propagating potential traveling waves.

FIG. 50 B Shows an iso-contour plot of a dielectrophoresis induced grating based on counter propagating potential traveling waves.

FIG. 55A shows a cross section of a dielectrophoresis-based electronically controllable lens.

FIG. 55B shows the refractive index as a function of lens radius for a converging lens when the real part of the complex valued Clausius-Mossotti factor is less than zero.

FIG. 55C shows the refractive index as a function of lens radius for a diverging lens when the real part of the complex valued Clausius-Mossotti factor is greater than zero.

FIG. 59 B shows the refractive index distribution in a thin dielectrophoresis-based lens.

FIG. 59 C shows the performance of a thin dielectrophoresis-based lens by plotting the lens optical power vs its diameter.

FIG. 66 shows how dielectrophoresis-based optical switch emulates reflection by a process of continuous refraction through a GRIN medium. The conservation of linear photon momentum means that this process will emulate ultimate reflection direction, but not the position of a ray, even though the light's propagation is a curved trajectory through the medium.

FIG. 73 shows a schematic of an electrode array from the applied signals point of view.

FIG. 74A shows a front view of a single color pixel comprising Red, Green, and Blue sub-pixels based on dielectrophoresis and photoluminescence of quantum dots.

FIG. 74B shows a cross sectional view of a single color pixel comprising Red, Green, and Blue sub-pixels based on dielectrophoresis forces on quantum dots.

FIG. 74C shows a cross sectional view of light emitted from a single color sub-pixel.

FIG. 75A shows the separation of different nano and micro particles by positive dielectrophoresis and negative dielectrophoresis so that broadband light scattering large micro particles provides a white paper-like viewing surface on the display.

FIG. 75B shows the separation of different nano and micro particles by negative dielectrophoresis and positive dielectrophoresis so that narrowband scattering small micro particles provide a colored pixel on the viewing surface of the display.

FIG. 76 shows a cross section of geometry and mathematical elements for an augmented reality display as discussed in FIGS. 77-78.

FIG. 77 shows a cross section of an embodiment for an augmented reality display based on the dielectrophoresis of dielectric nanoparticles to produce electronic pixels using total internal reflection at each pixel, as provided by refraction in a graded refractive index medium. The augmented data light is superimposed on an image of an external scene as shown.

Figure 78:
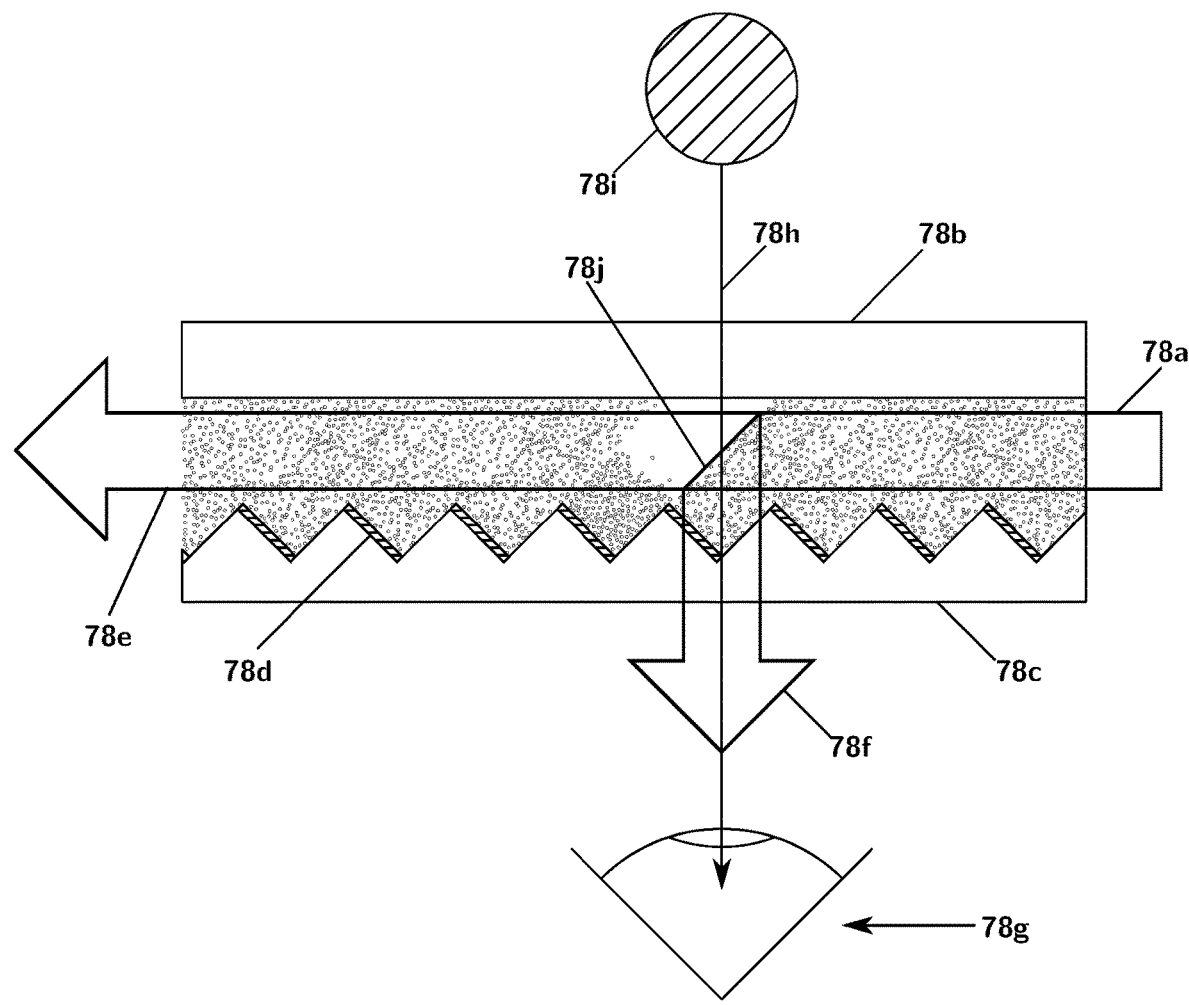

FIG. 78 shows a cross section of an embodiment for an augmented reality display based on the dielectrophoresis of dielectric nanoparticles to produce electronic pixels using total internal reflection at each pixel, as provided by refraction in a graded refractive index medium. This particular embodiment does not use total internal reflection to distribute the data light that is superimposed on the image of a screen.

Figure 79:
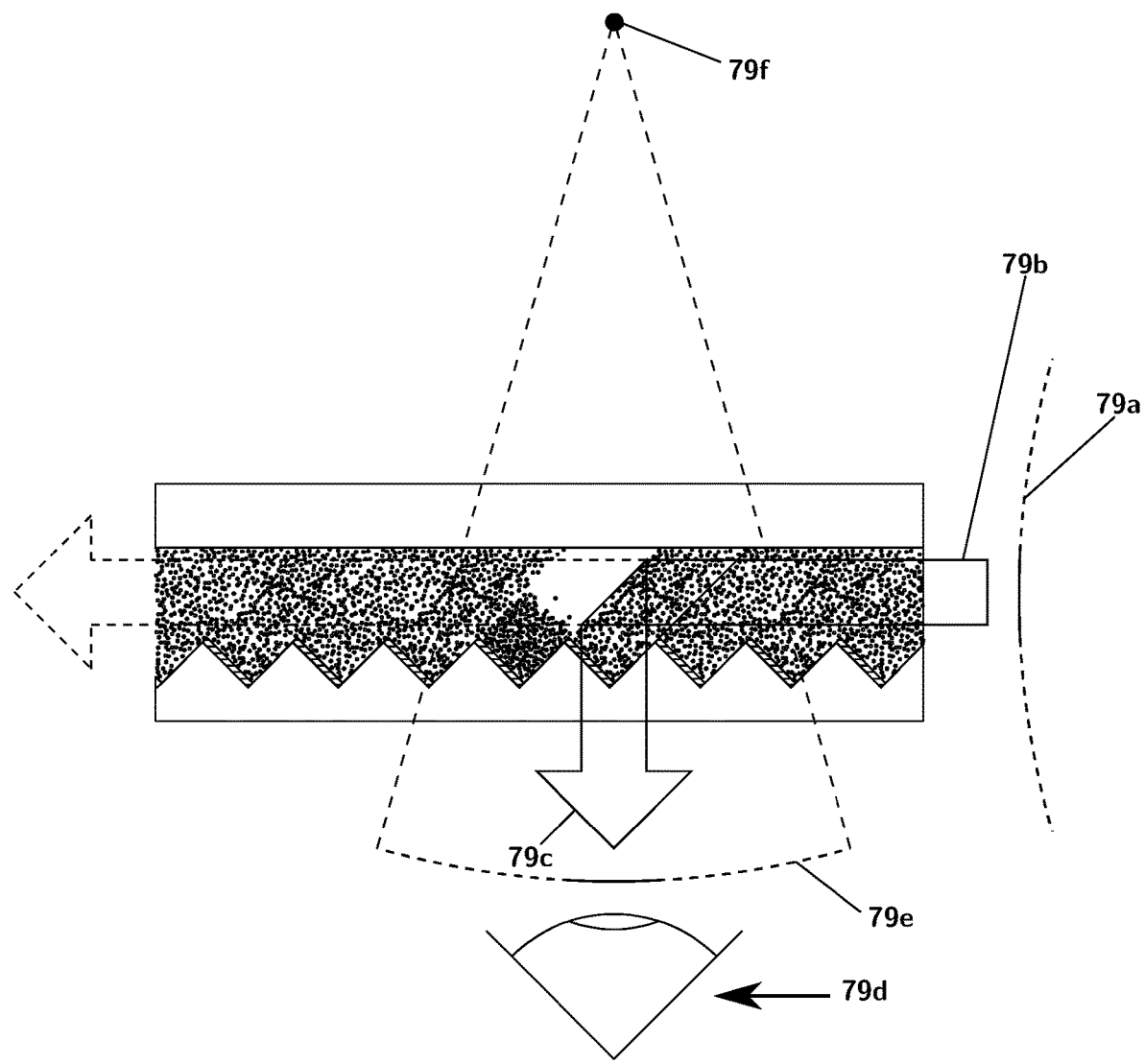

FIG. 79 shows a cross section of an embodiment for an augmented reality display based on the dielectrophoresis of dielectric nanoparticles to produce electronic pixels using total internal reflection (based on refraction in a graded refractive index medium) at each pixel, this particular embodiment shows how the curvature of the wavefronts allows a data pixel to hover in space in front of the observer.

Figure 77:
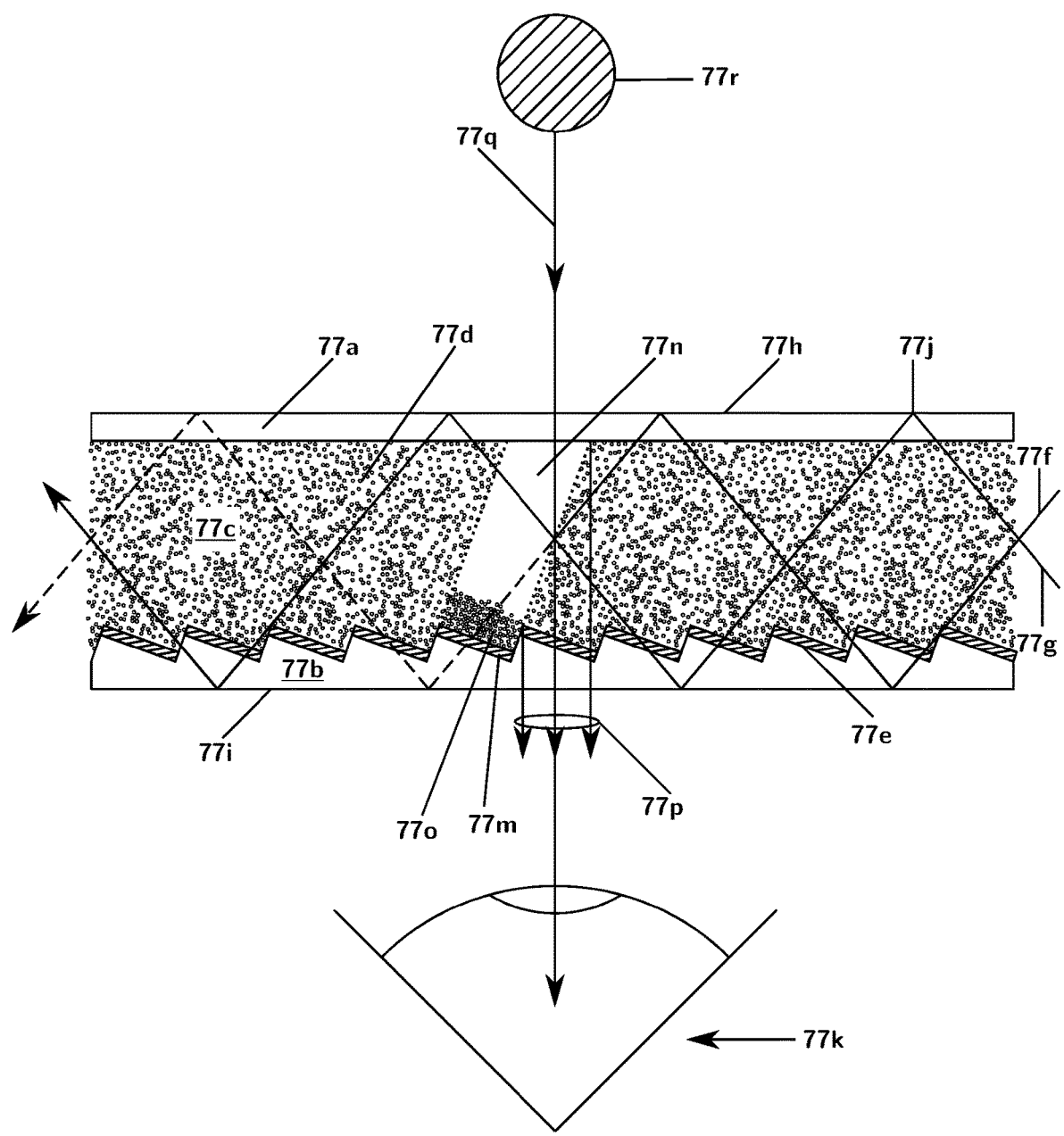
Figure 80:
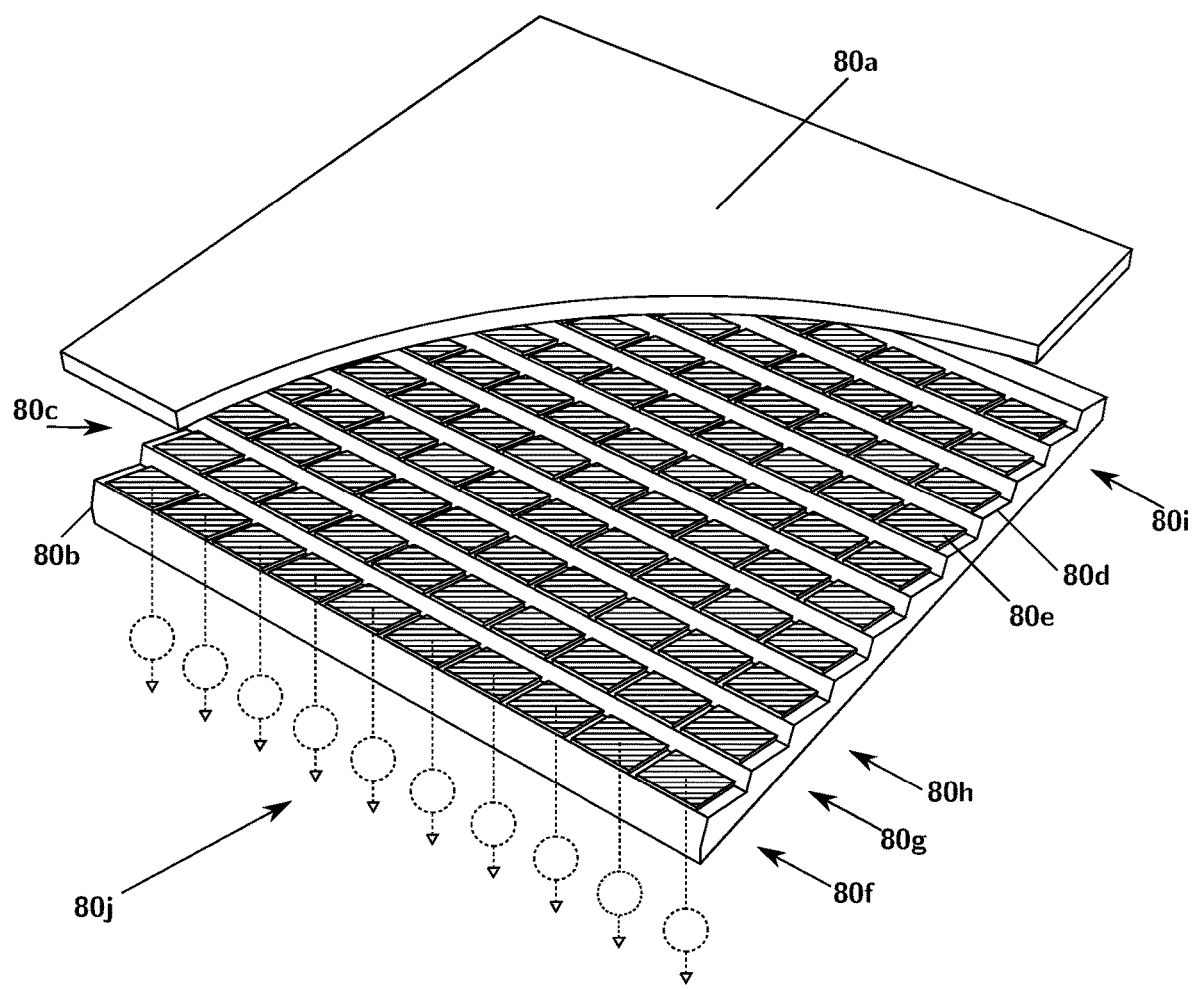

FIG. 80 shows a three dimensional perspective of the display shown in cross-section in FIGS. 77-78.

Figure 81:
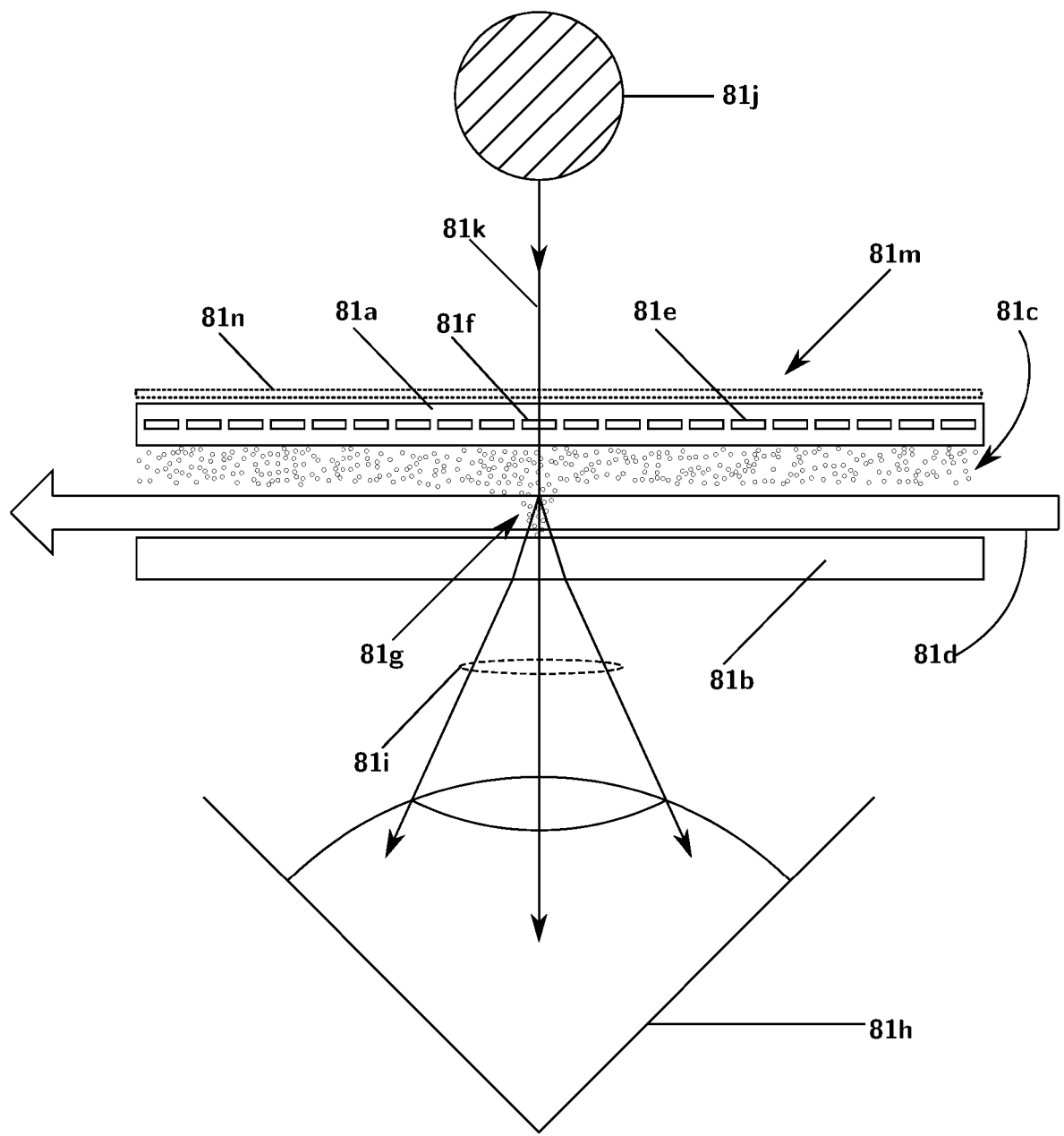

FIG. 81 shows a cross section of an embodiment for an augmented reality (AR) display based on the dielectrophoresis of more complex nanoparticles, such as quantum dots or plasmonic dots, to produce electronic pixels using total internal reflection at each pixel, this particular embodiment does not use total internal reflection to distribute the data light that is superimposed on the image of a screen.

Figure 82A:
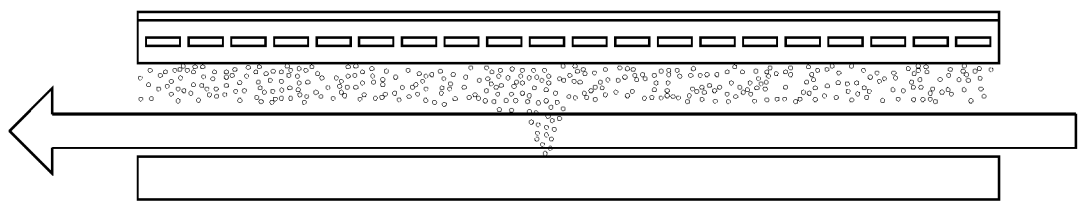

FIG. 82A shows a cross section of an embodiment for an augmented reality display based on the dielectrophoresis of complex nanoparticles, such as quantum dots or plasmonic dots. The choice of drive frequency dictates the specific photoluminescence color for each pixel.

Figure 82B:
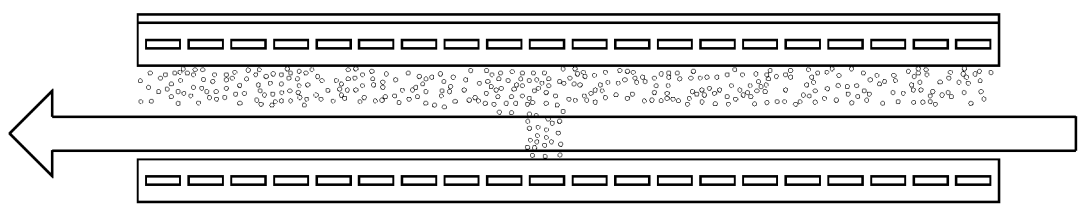

FIG. 82B is the same as in FIG. 82A except for the use of two electrode arrays for more degrees of freedom in color choice.

Figure 82C:
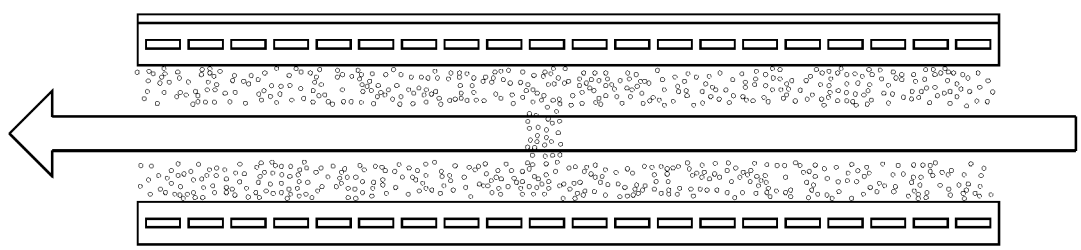

FIG. 82C is the same as in FIG. 82B except for increased numbers of complex nanoparticles and a centered excitation laser beam.

Figure 83:
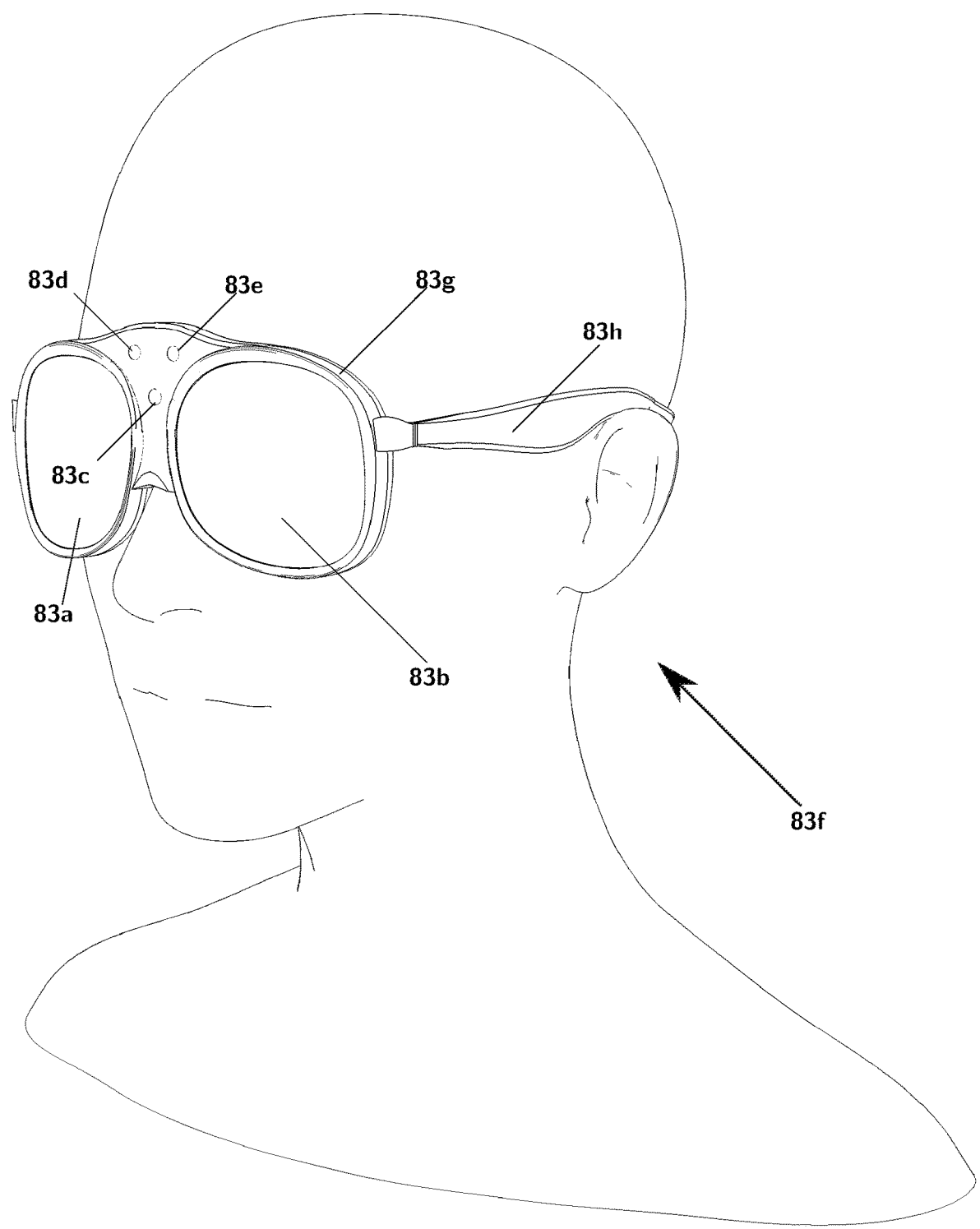

FIG. 83 shows augmented reality glasses with dielectrophoresis-based subsystems comprising lenses, beam-steered LiDAR transmitter, and camera lens. This figure shows the entire front of the glasses.

Figure 84:
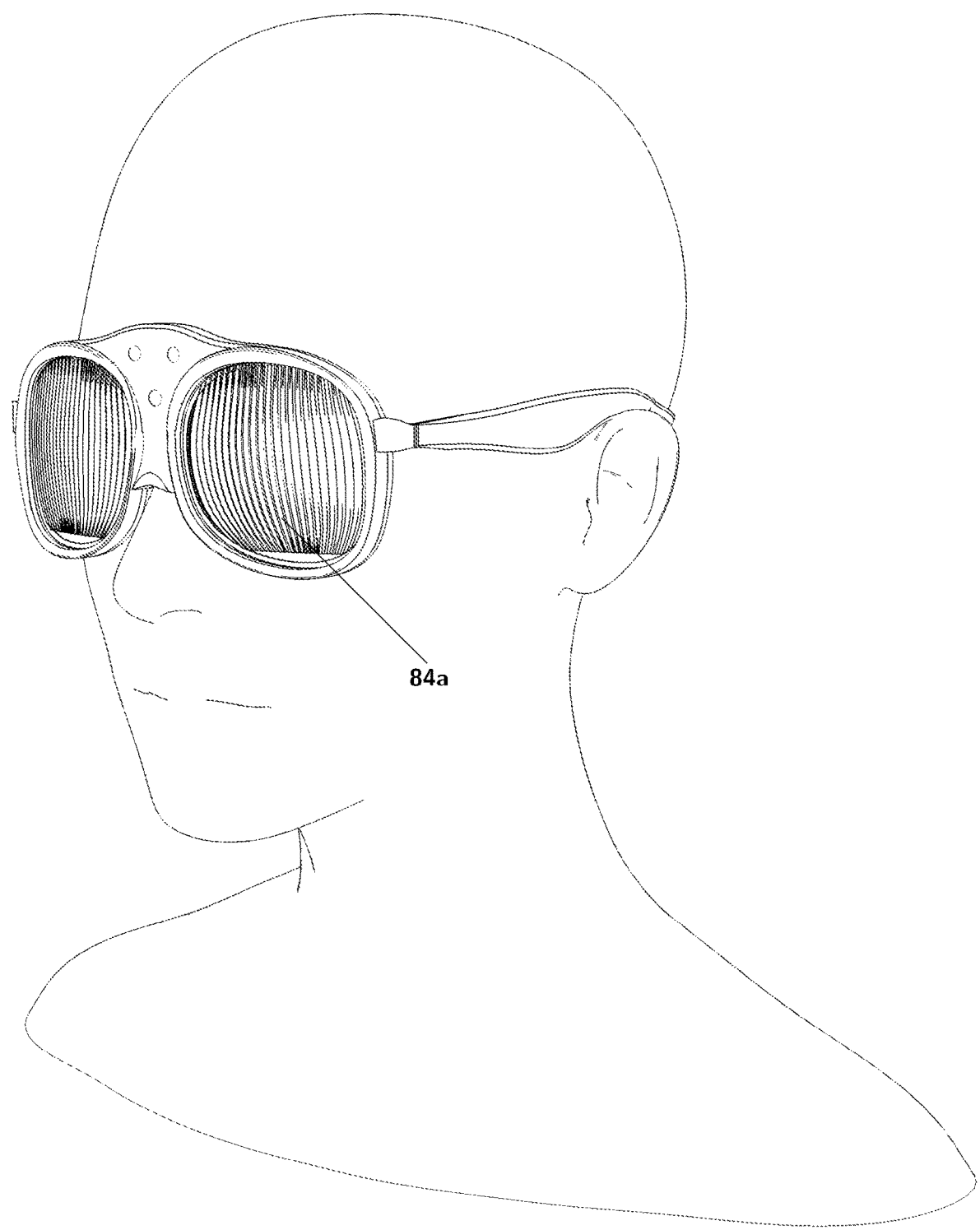

FIG. 84 shows augmented reality glasses with dielectrophoresis-based lenses, LiDAR and camera lens. This figure shows the front of the glasses with the first layer of the lens removed to allow for a discussion of its operation.

Figure 85:
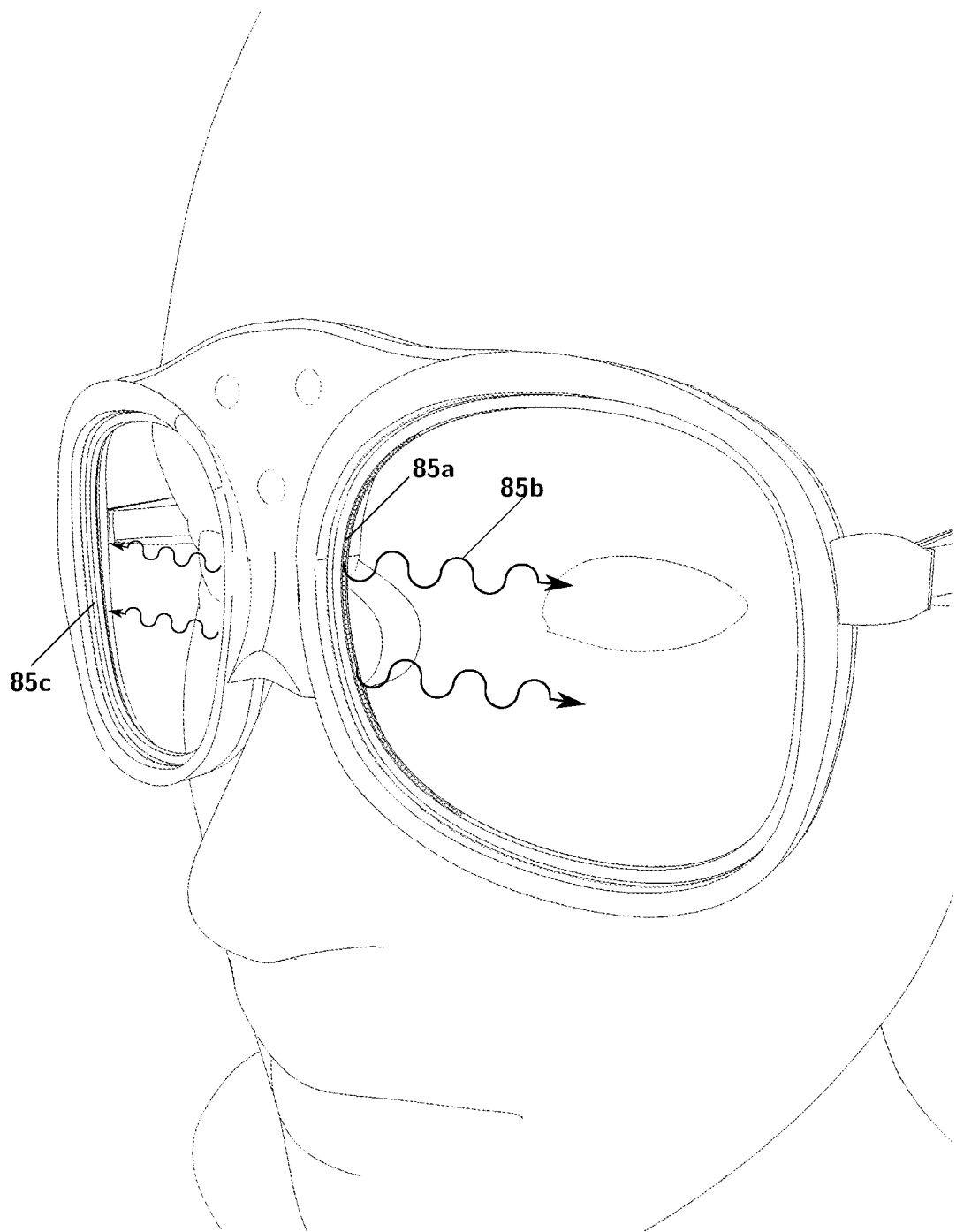

FIG. 85 shows augmented reality glasses with dielectrophoresis-based lenses, LiDAR and camera lens. This figure shows the front of the glasses with the first and second layer of the lens removed to allow for a discussion of the operation of edge-injection of light into the lenses.

Figure 86:
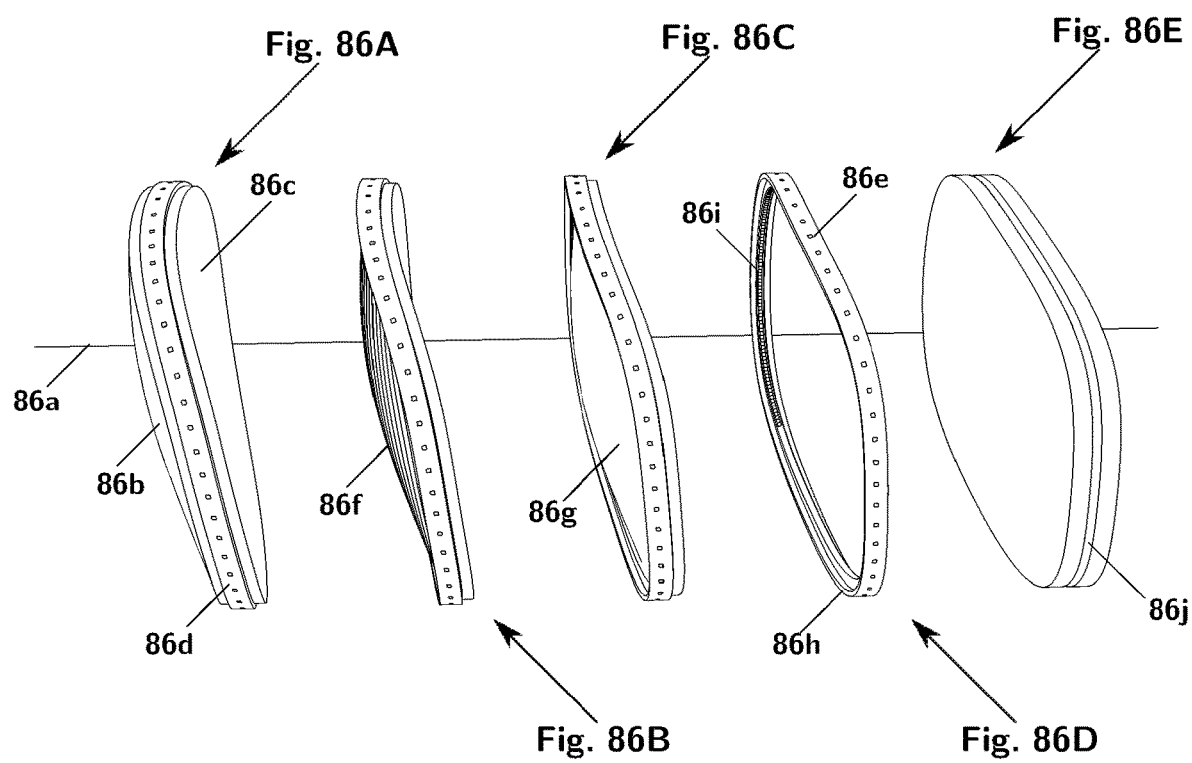

FIG. 86 shows an augmented reality lens in several stages of disassembly to allow an understanding of how the lens is built into an optical system.

Figure 87:
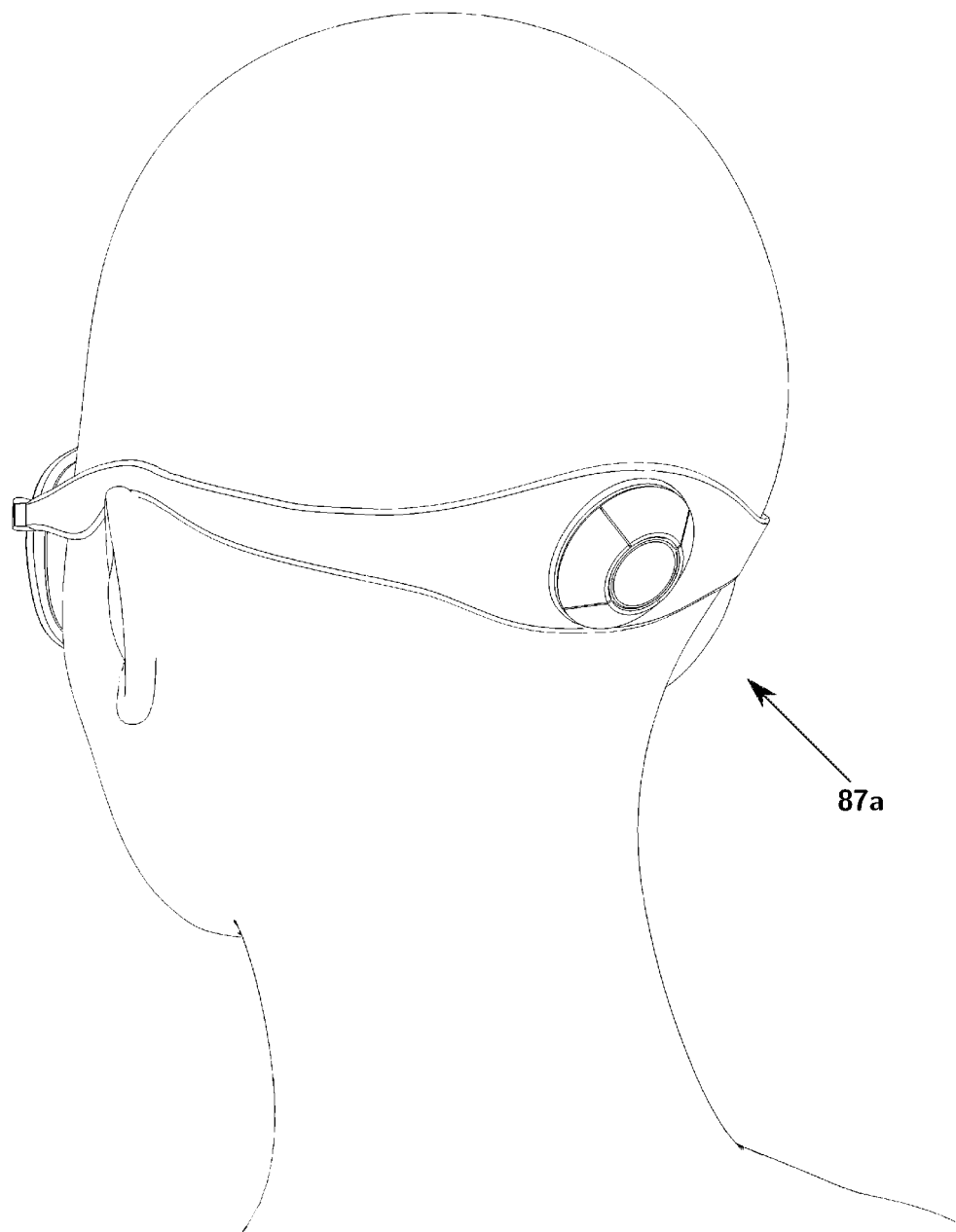

FIG. 87 shows an example of a multi-button controller on the back of the head of an augmented reality user that allows the user to control the operation of the augmented reality glasses. It is to be understood that the essence of dielectrophoresis-based augmented reality displays, virtual reality displays and mixed reality displays are captured in FIGS. 83-87 and that various dielectrophoresis-based pixel types are possible.

Figure 88:
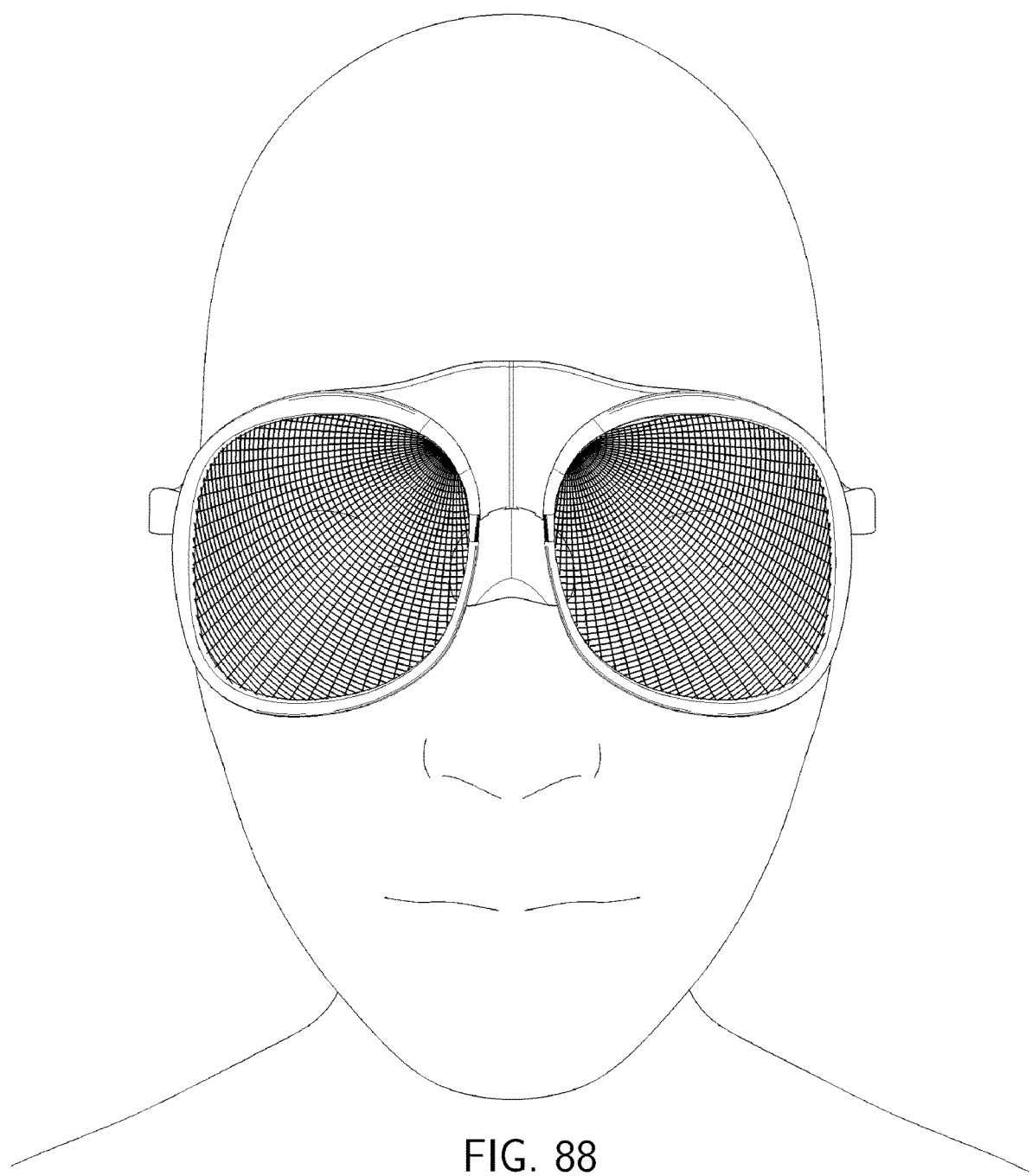

FIG. 88 shows a coordinate system on each lens in a specific embodiment of a virtual reality head set.

Figure 89:
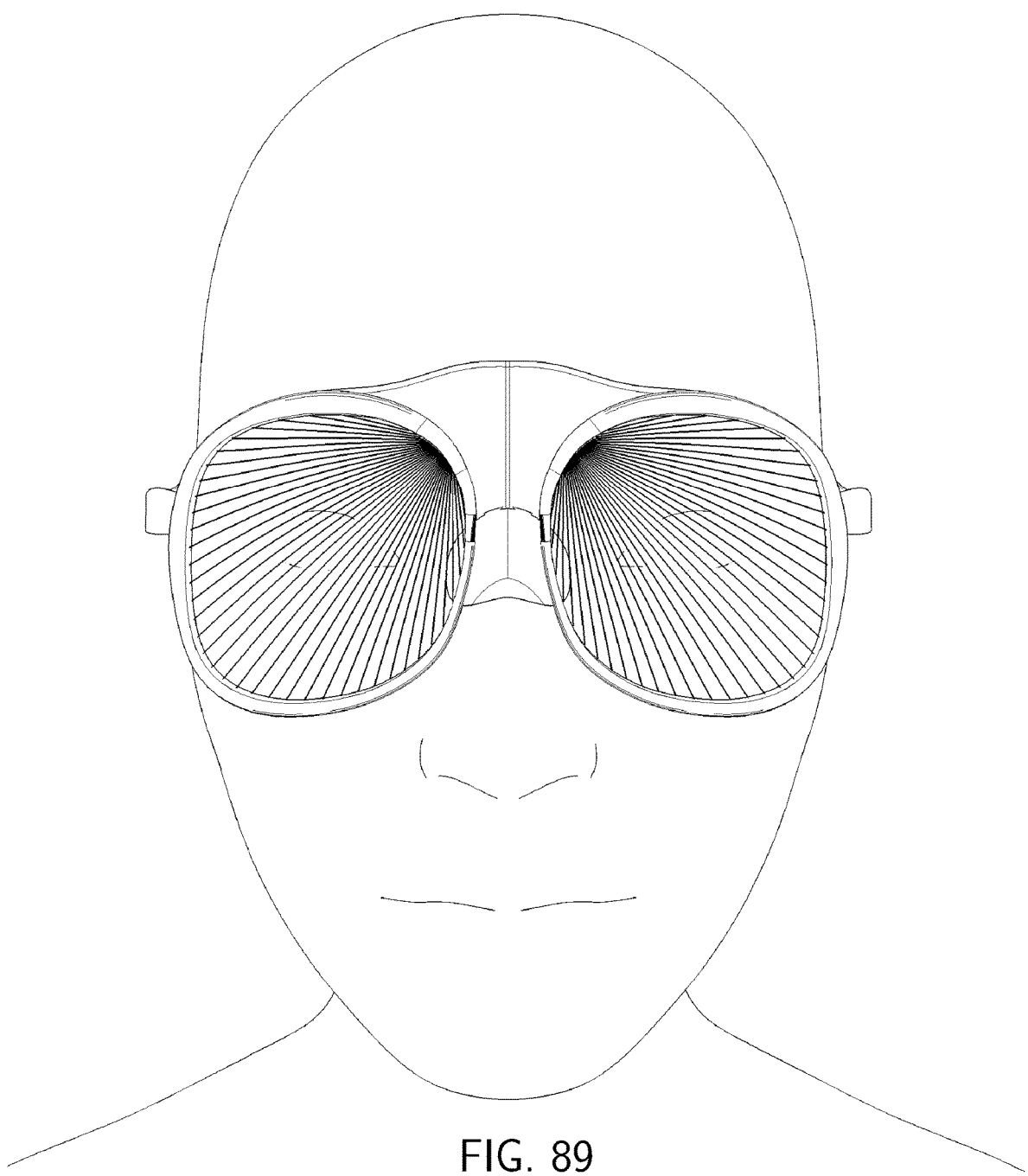

FIG. 89 shows the direction of laser light in each lens of a virtual reality headset.

Figure 90:
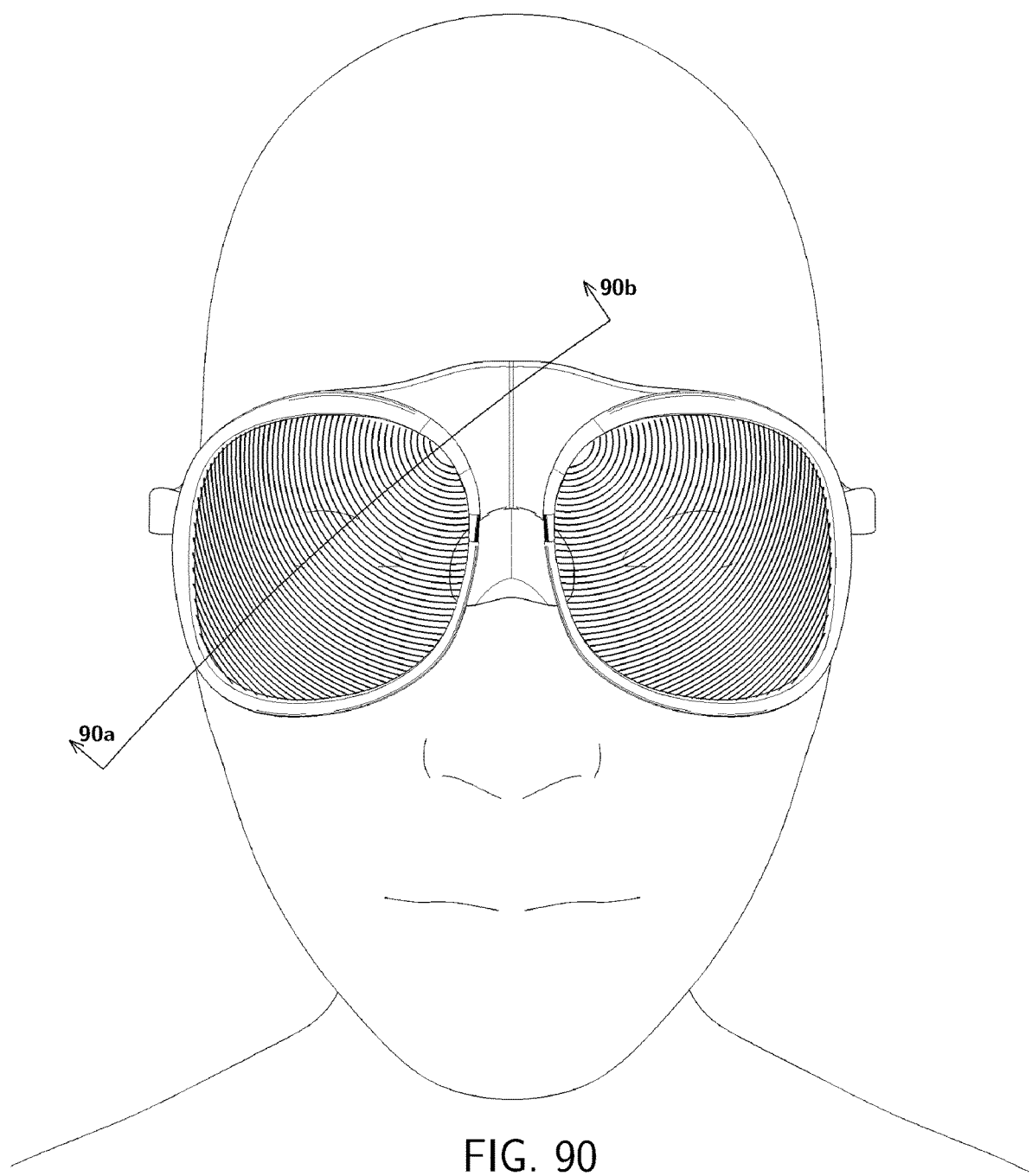

FIG. 90 shows the general layout of electrodes in a virtual reality headset.

Figure 91:
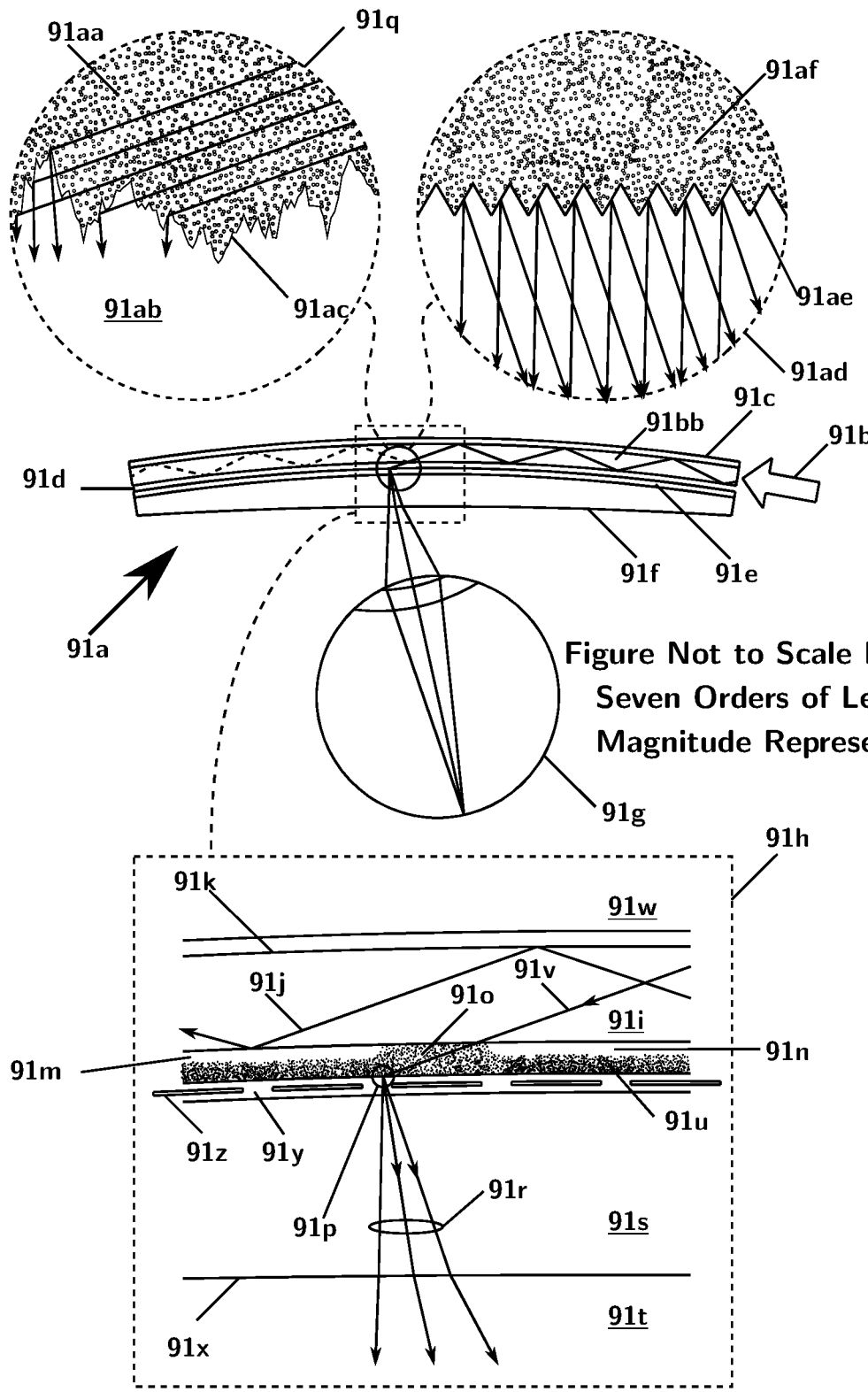

FIG. 91 shows the cross section of the virtual reality headset lens indicated in FIG. 90 with magnified inset images of different scattering methods also provided.

Figure 93:
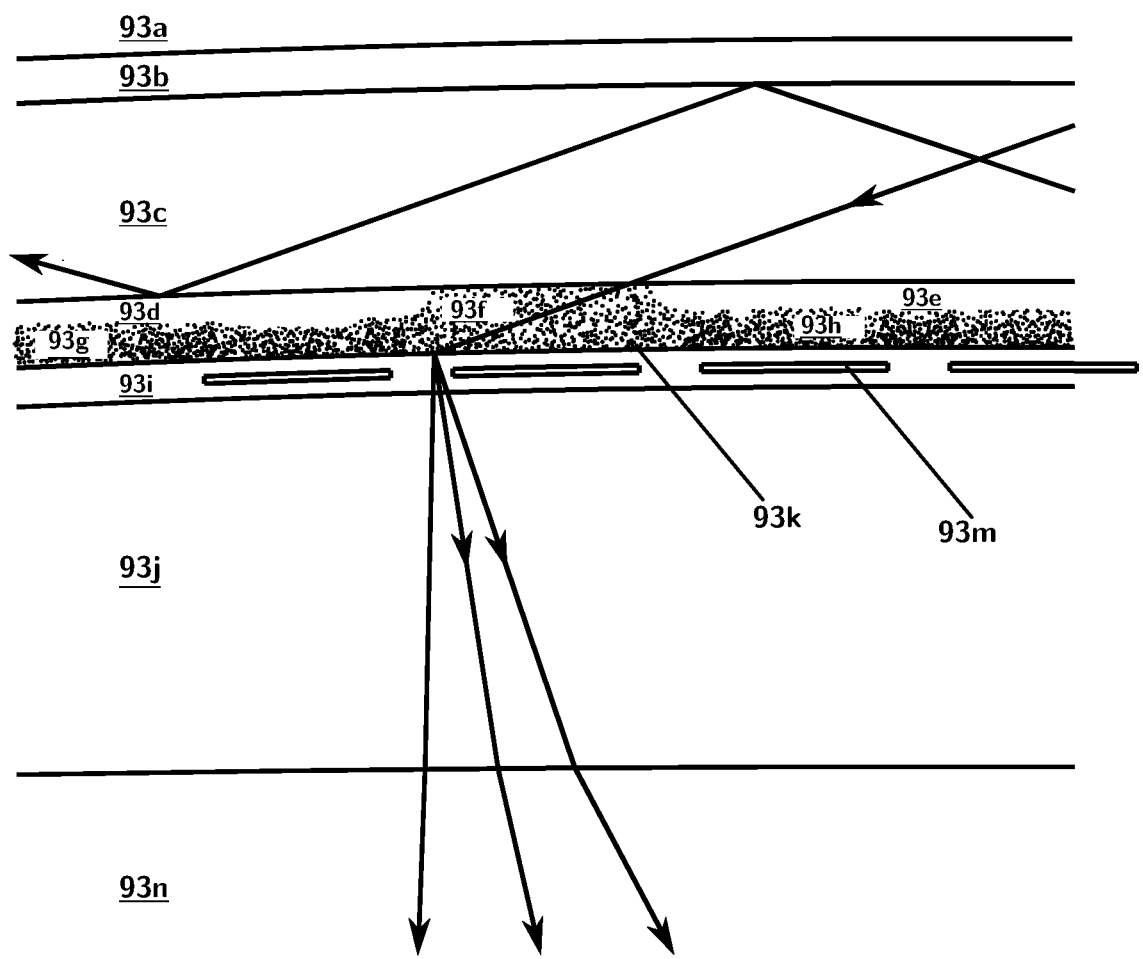

FIG. 92 shows a table of example of refractive indices and nanoparticle volume fractions used for each section of the virtual reality head set based on dielectrophoresis, as shown in FIG. 93. Values provided are only for illustration purposes.

FIG. 93 shows an example of each section of the virtual reality head set based on dielectrophoresis, as shown in FIG. 88-91.

Figure 32:
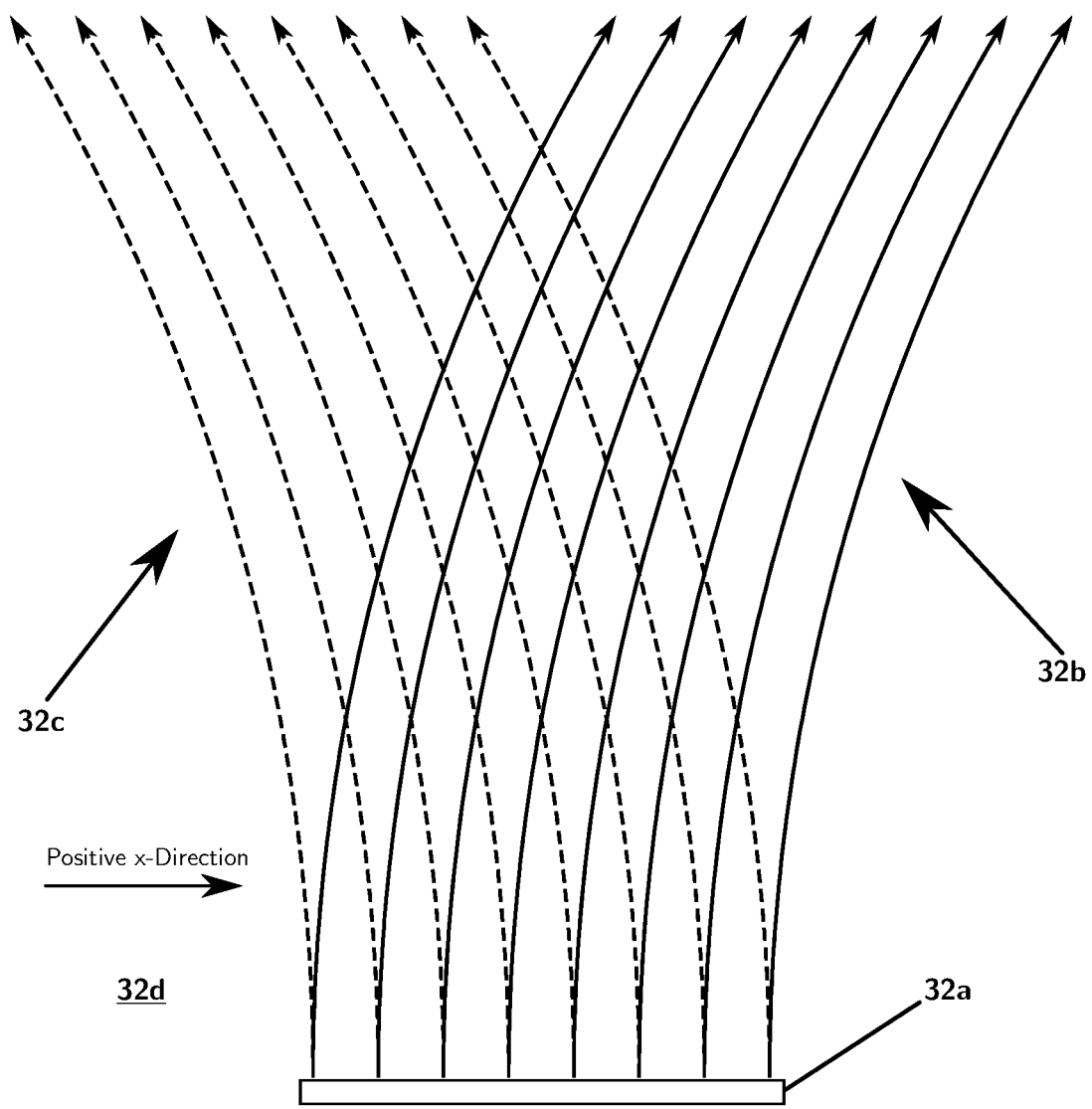
FIG. 32 shows a how a light beam initially having parallel rays in a exponential gradient refractive index medium will retain the rays as parallel as the rays propagate through the medium.
Figure 94A:
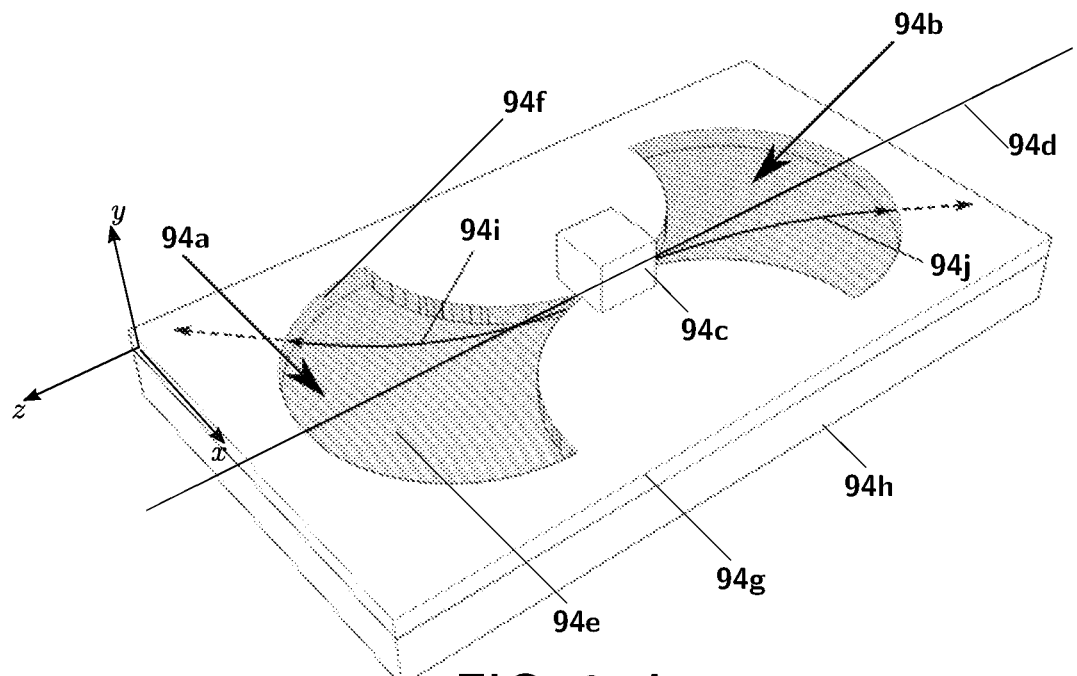

FIG. 94A shows two colloidal cavities and parallel electrode configurations that induce an exponentially-varying graded refractive index for beam scanning as described in FIG. 32 for two beams, i.e. one for each eye of the XR headset.

Figure 94B:
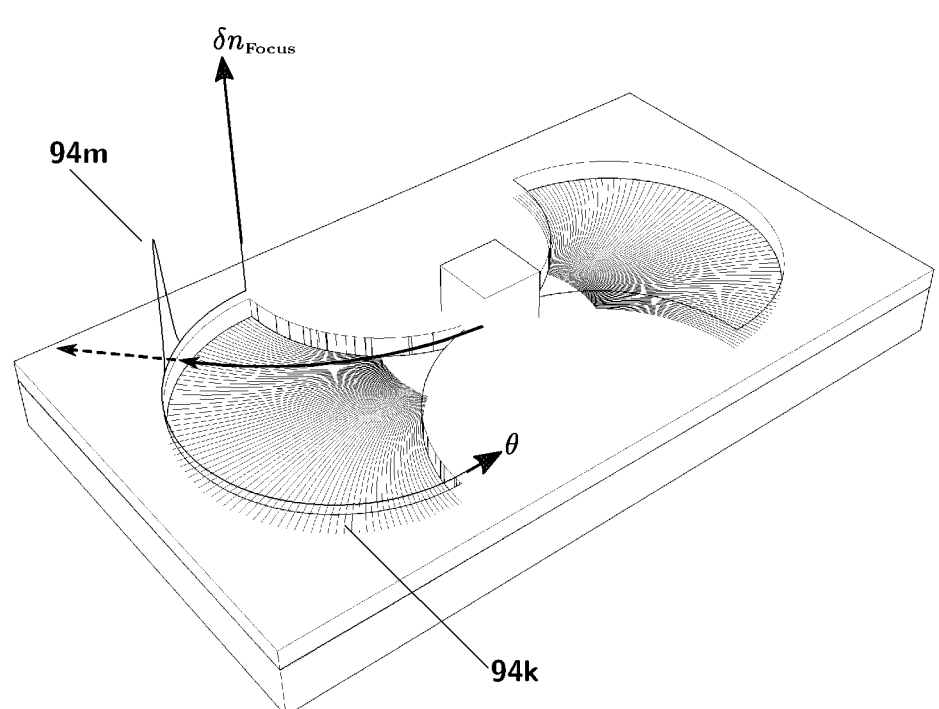

FIG. 94B shows two colloidal cavities and curved electrodes that follow the curved trajectories induced by the electrodes of FIG. 94A of two scanned laser beams to impress curvature on the laser wavefront for each eye of the user.

Figure 95:
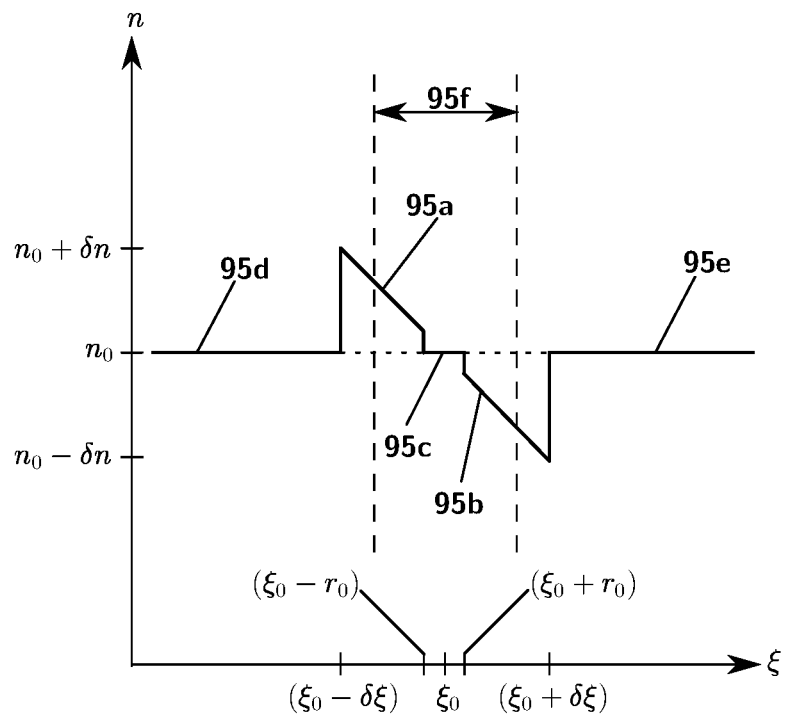

FIG. 95 shows the refractive index as a function of radius for one embodiment of dielectrophoresis based fiber laser embedded in a beam steering colloidal system with guided light and symmetry-breaking of a pump beam.

Figure 96A:
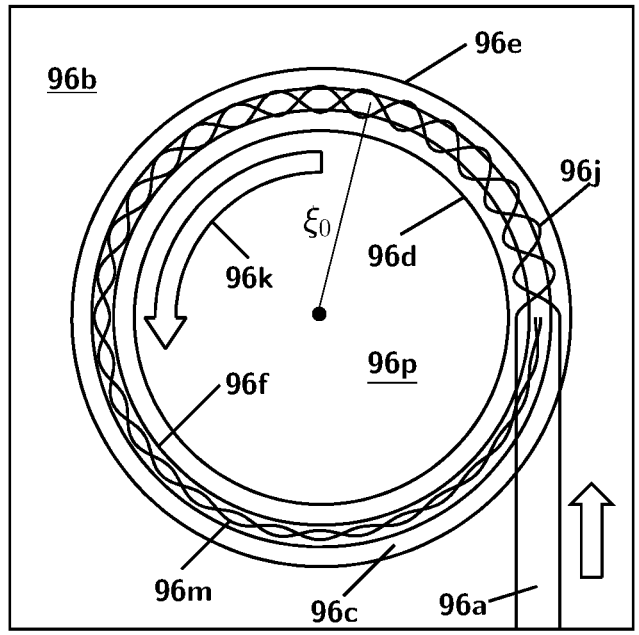

FIG. 96A shows a schematic of a circular laser geometry based on a single solid-core fiber in a colloidal medium with a refractive index distribution that allows large numerical aperture of the pump light and single-mode laser output.

Figure 96B:
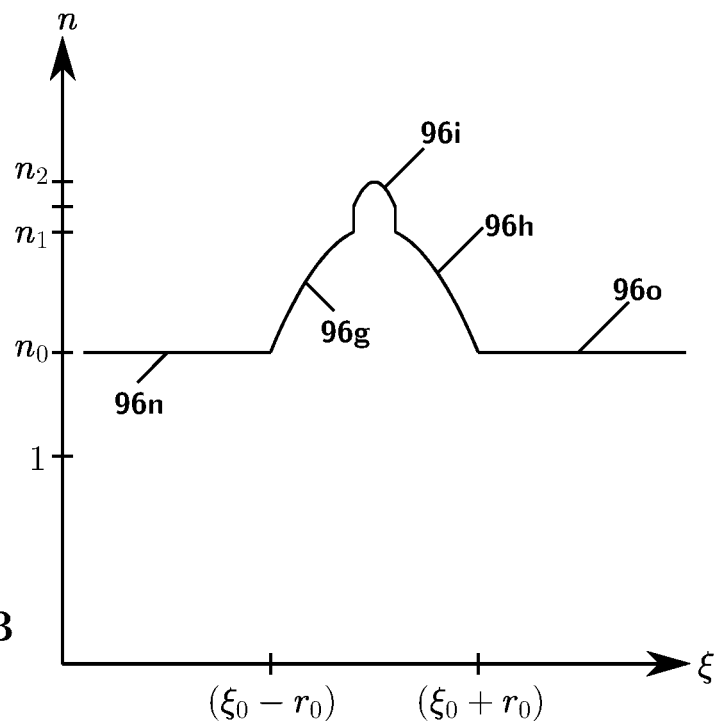

FIG. 96B shows an example of the refractive index distribution in the control volume as a function of radius from the center of an annulus-shaped control volume.

Figure 97:
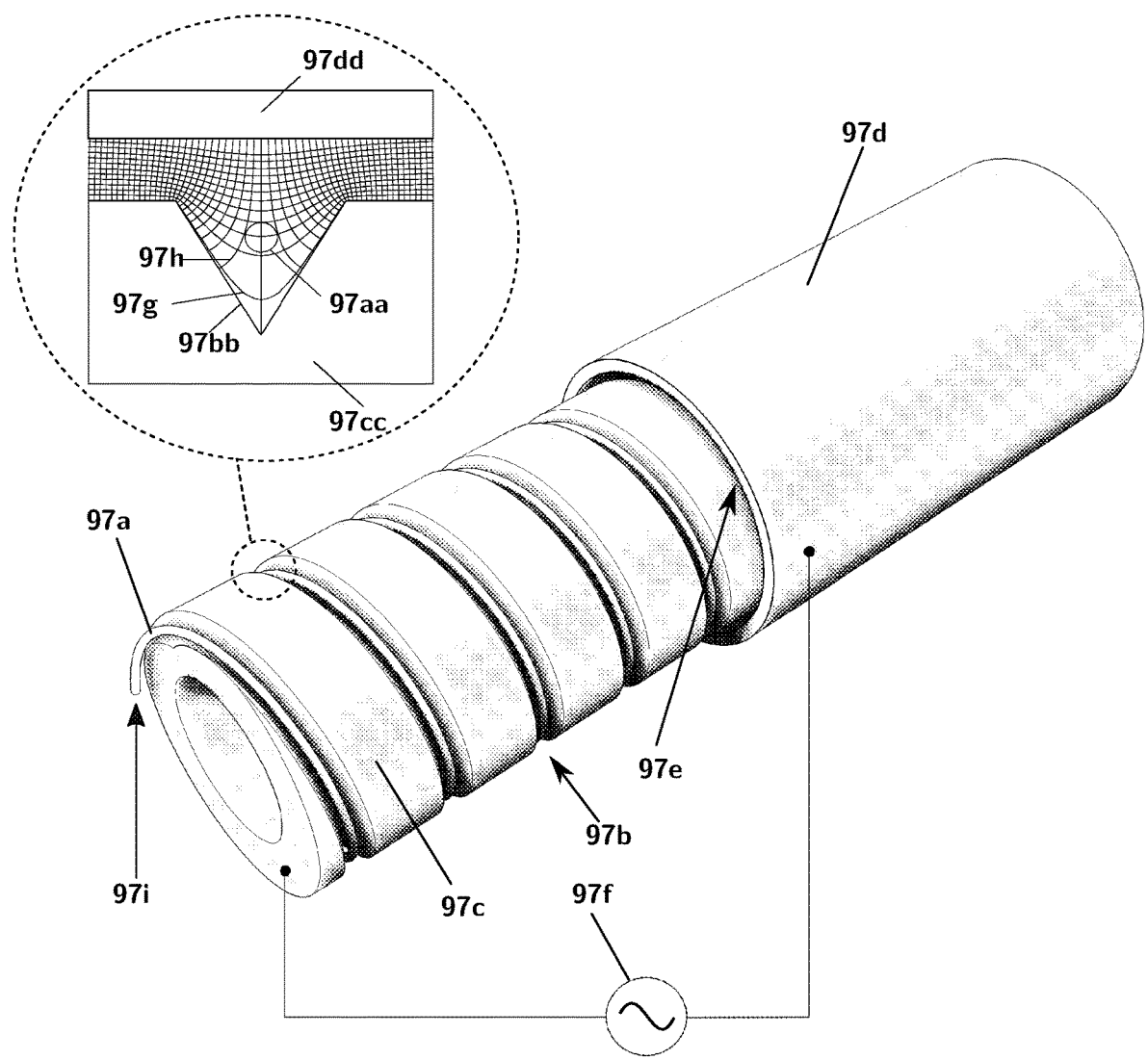

FIG. 97 shows a high-power doped fiber laser core in a grove between two conductive electrodes formed to provide ponderomotive forces on nanoparticles in a colloid in the interstitial spaces between the electrodes, which are shaped to provide a nonuniform electric field for the purpose of creating a refractive index distribution for guiding pump light and breaking propagation symmetries to improve pump conversion efficiency into laser light.

Figure 98A:
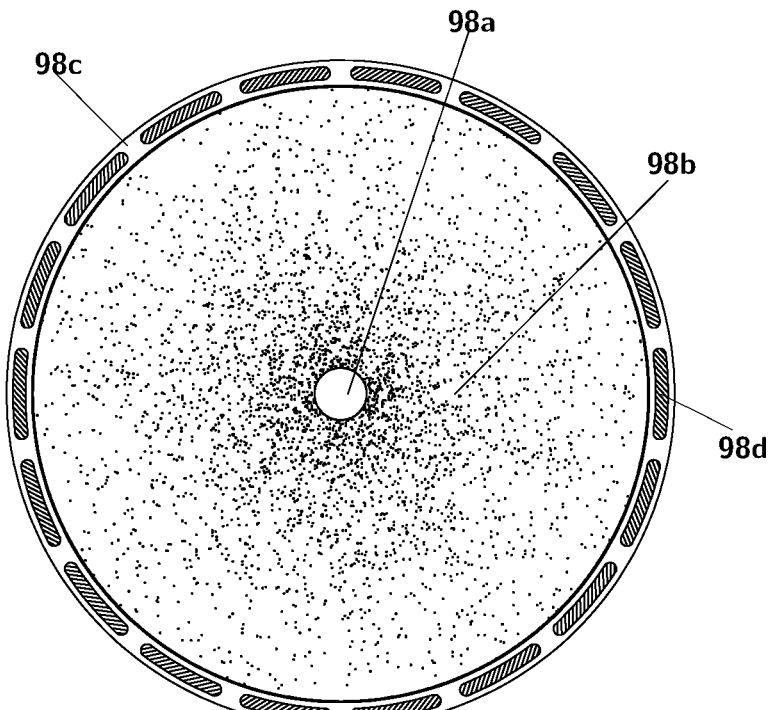

FIG. 98A shows a solid fiber laser in a nano-particle colloidal cladding that has a symmetric refractive index distribution induced dynamically by electrodes.

Figure 98B:
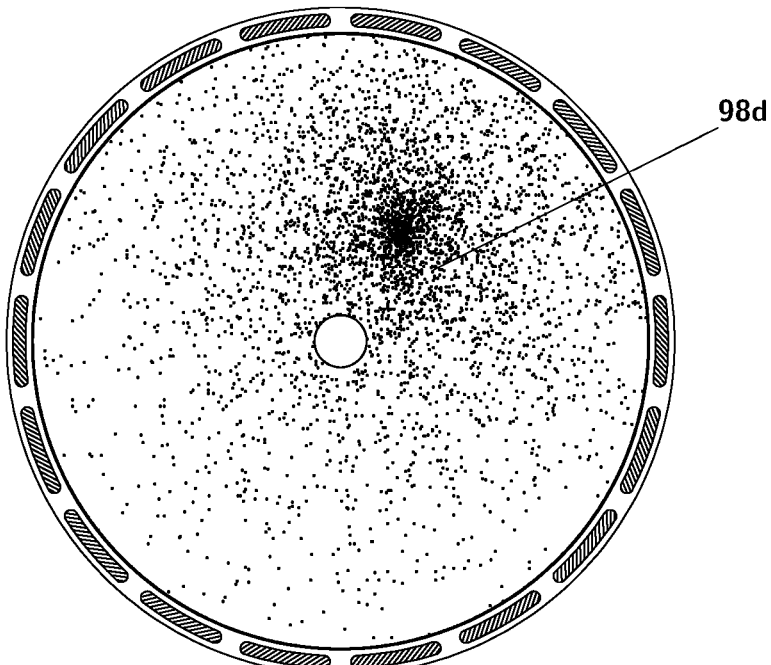

FIG. 98B shows a solid fiber laser in a nano-particle colloidal cladding that has a asymmetric refractive index distribution induced dynamically by electrodes.

Figure 99A:
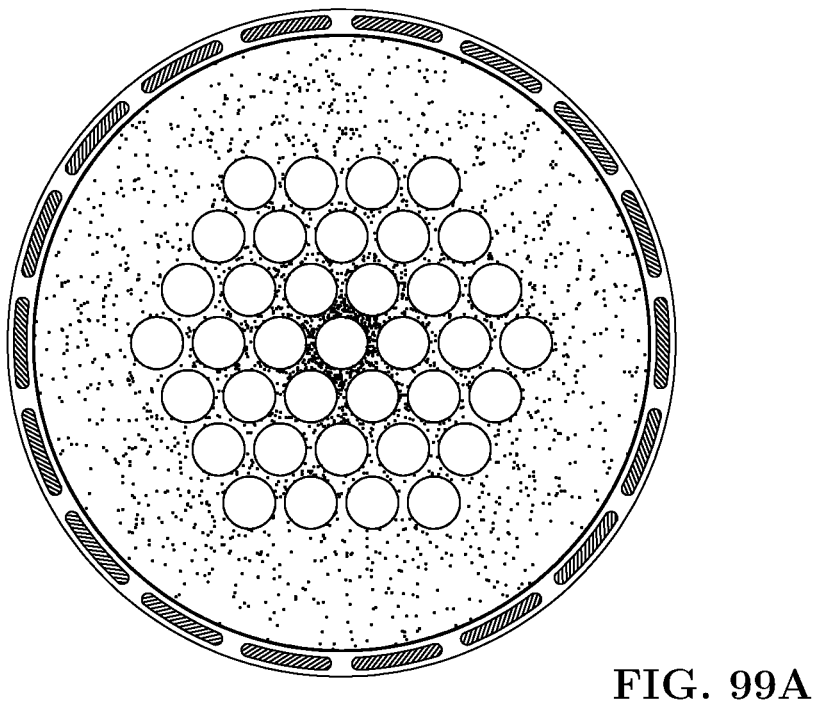

FIG. 99A shows a solid fiber bundle laser in a nano-particle colloidal cladding that has a symmetric refractive index distribution induced dynamically by electrodes.

Figure 99B:
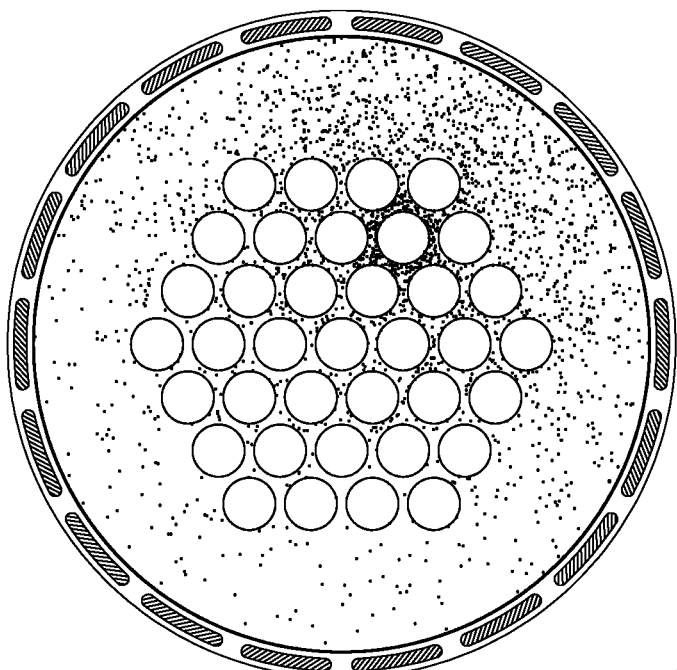

FIG. 99B shows a solid fiber bundle laser in a nano-particle colloidal cladding that has an asymmetric refractive index distribution induced dynamically by electrodes.

Figure 100:
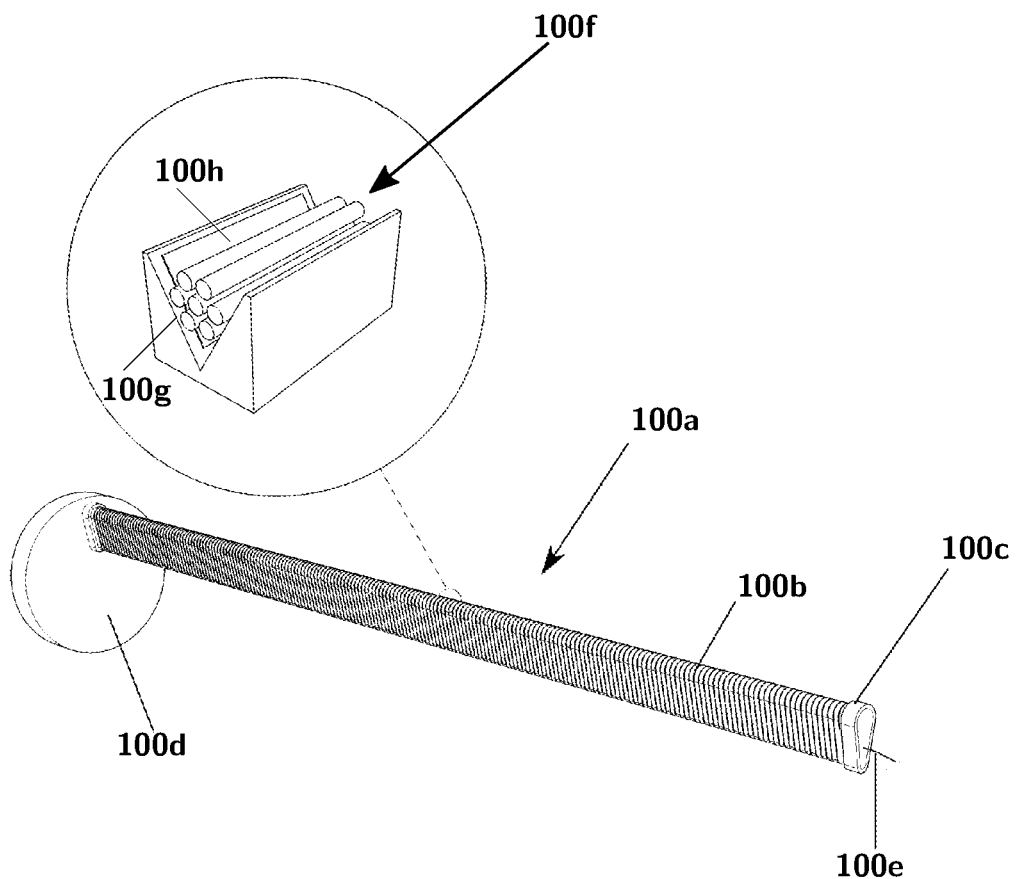
Figure 101:
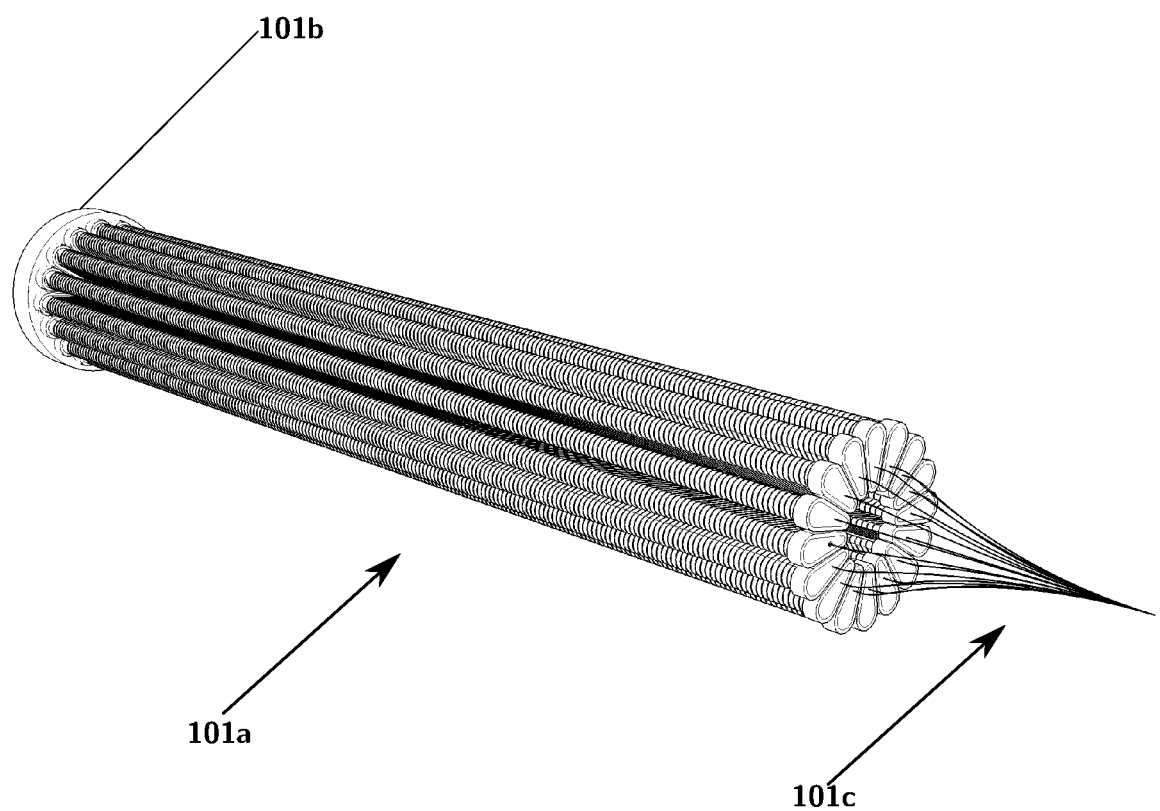
Figure 102:
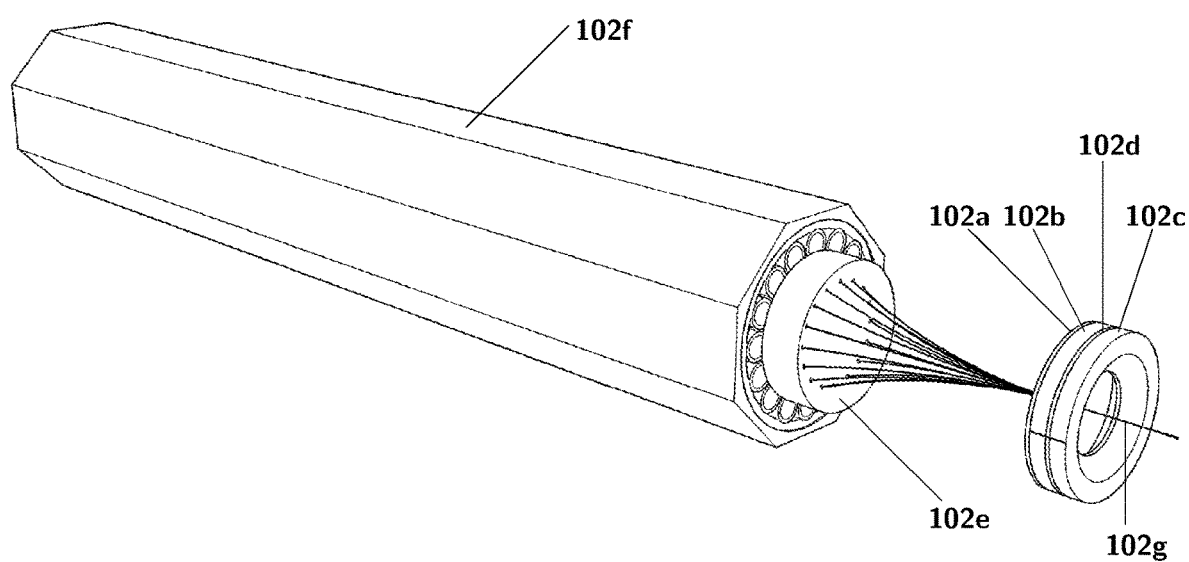
Figure 103:
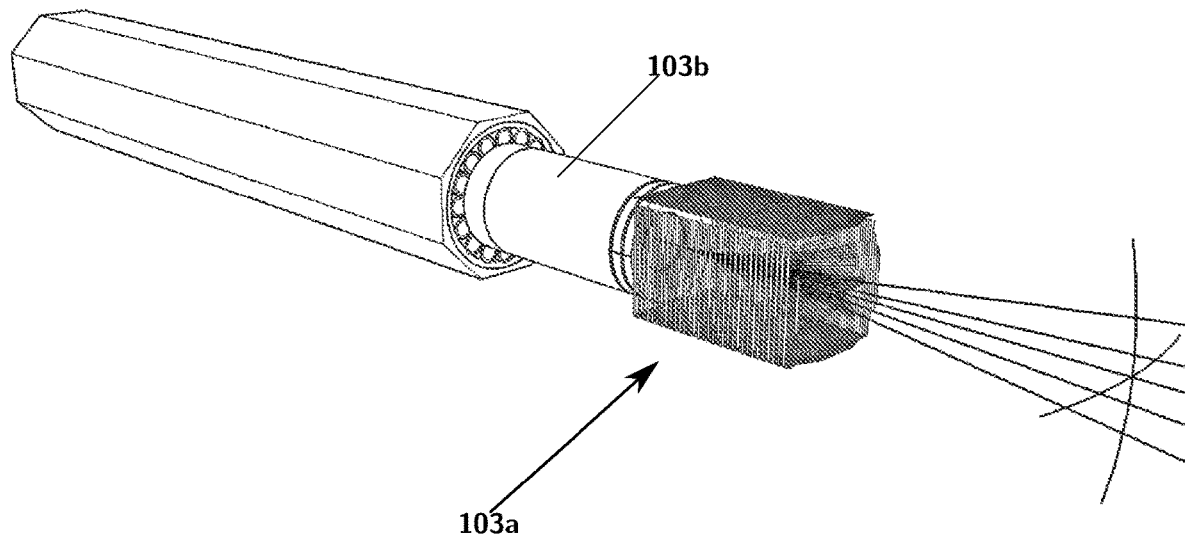
Figure 104:
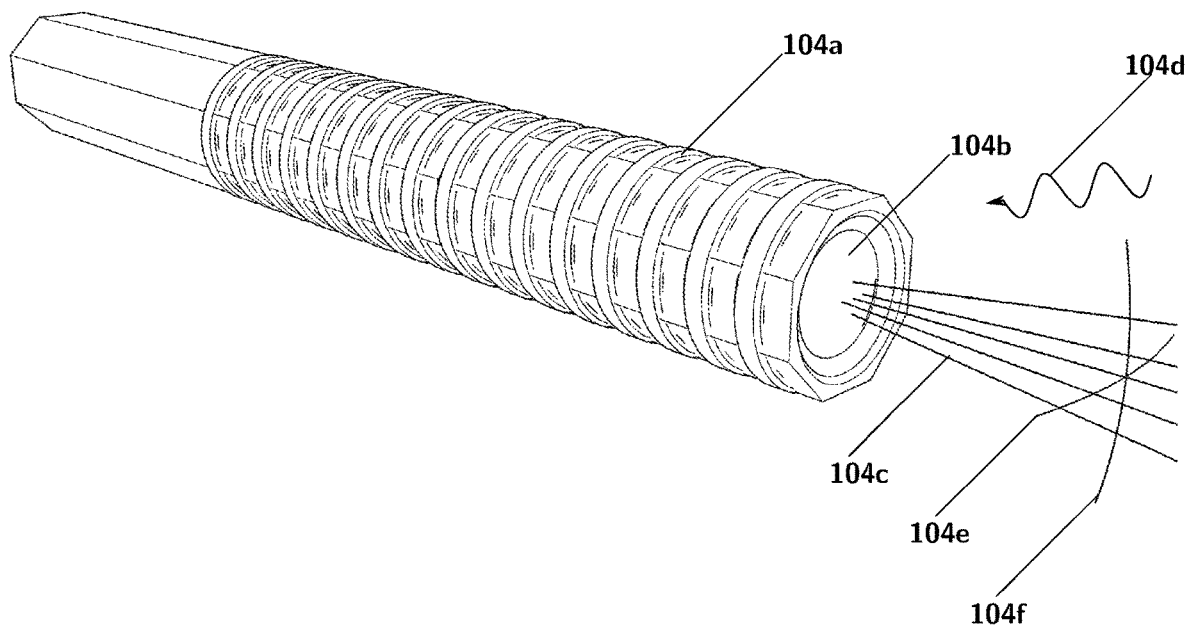
Figure 105:
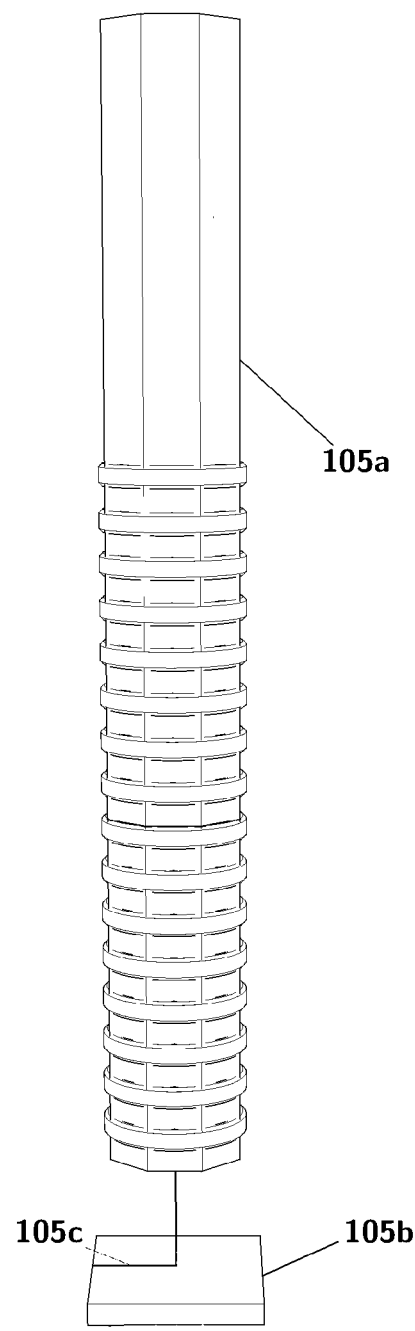

FIG. 100 shows a first portion of a fiber laser system.
FIG. 101 shows a second portion of a fiber laser system.
FIG. 102 shows a third portion of a fiber laser system.
FIG. 103 shows a fourth portion of a fiber laser system.
FIG. 104 shows a fifth portion of a fiber laser system.
FIG. 105 shows an example application of metal cutting and machining using dielectrophoresis to control laser light.

FIG. 106A shows a prior-art solar tracking array in the early morning just after the sun rises.

FIG. 106B shows a prior-art solar tracking array at noon and functioning within air.

Figure 107:
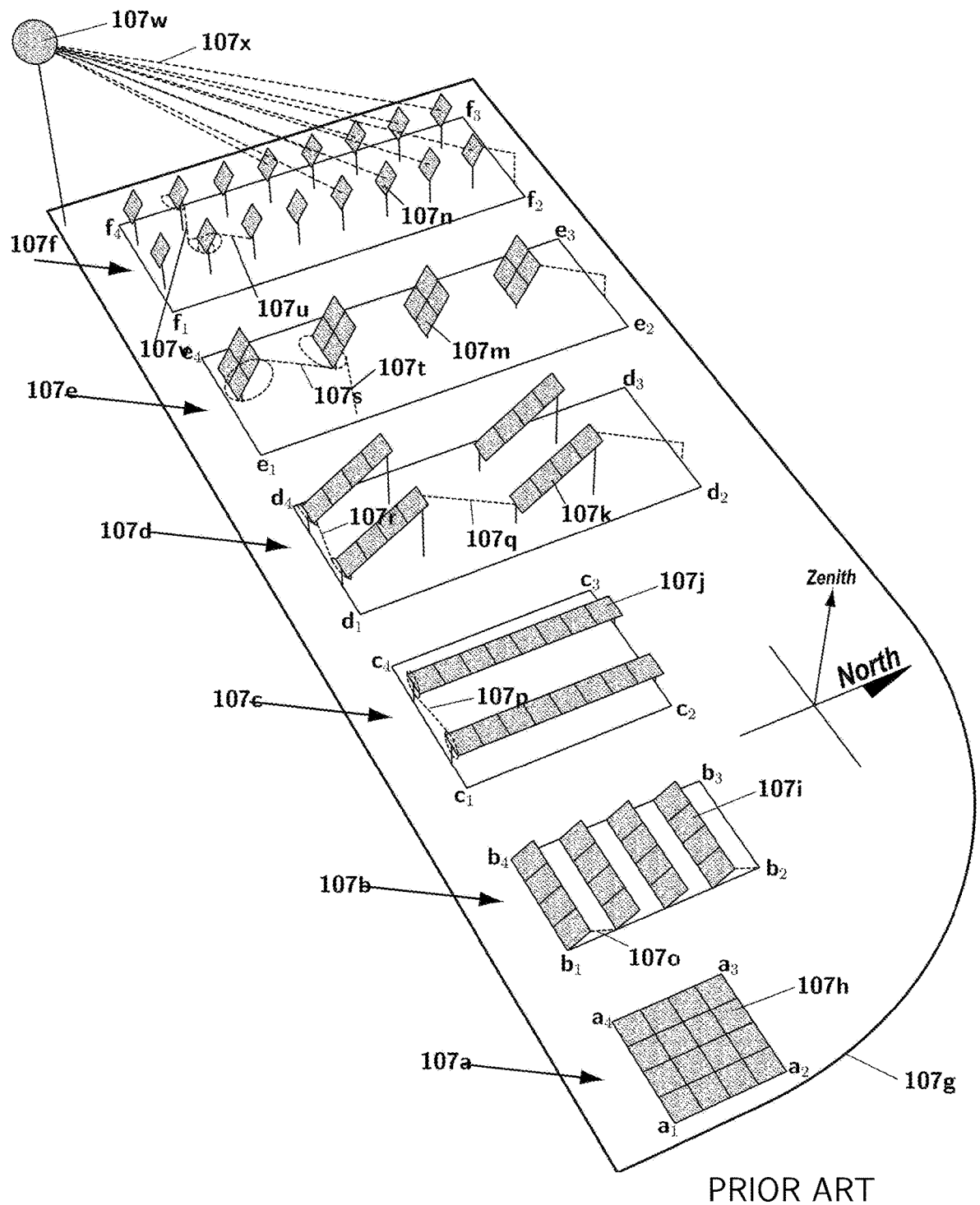

FIG. 107 shows prior-art solar mirror configurations for concentrating solar energy and associated area requirements.

Figure 108:
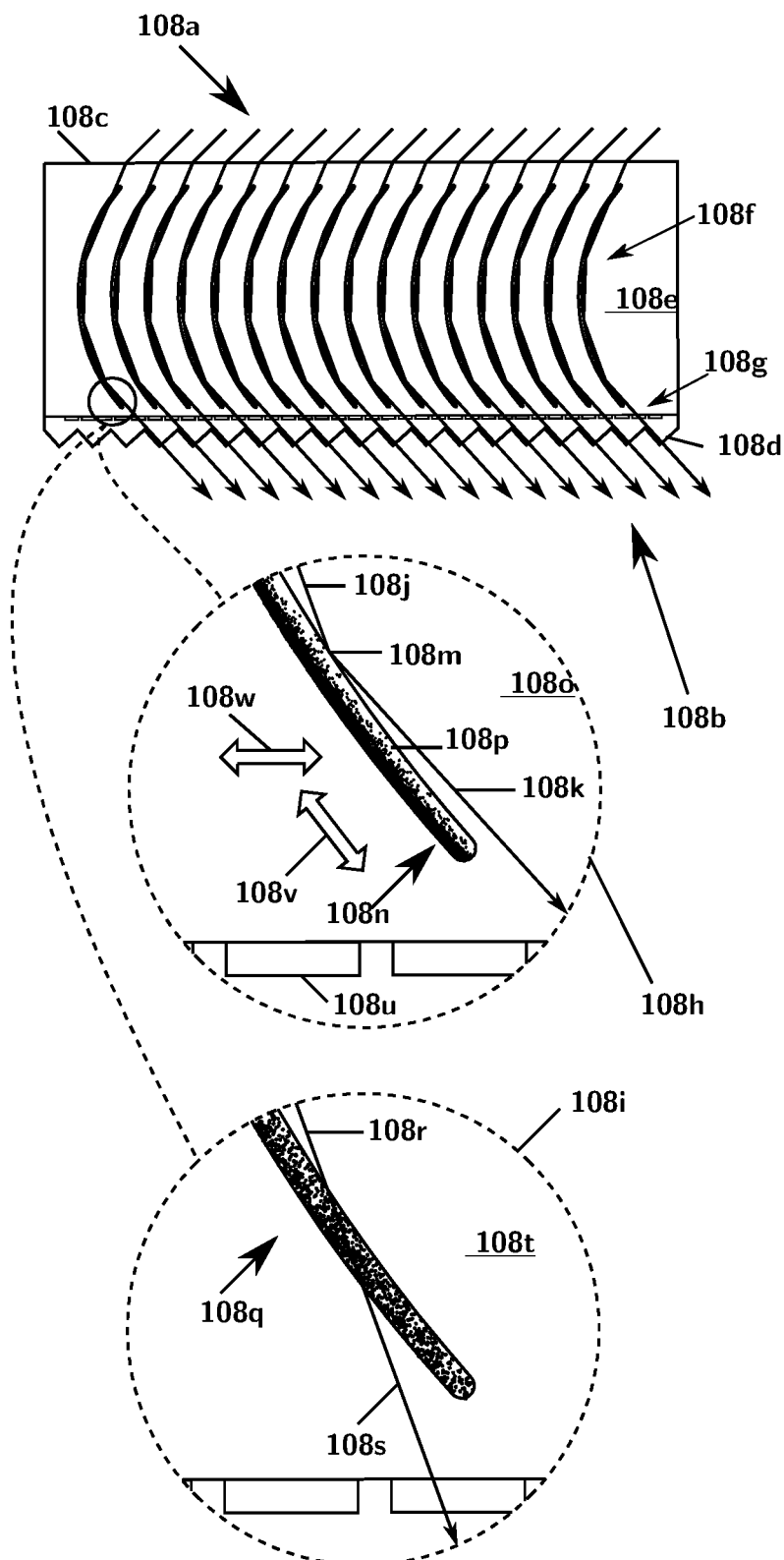

FIG. 108 shows a small cross section of a pane of glass configured with control channels disposed to redirect light and having a colloid of nanoparticles therein, which may change spatial distribution by the application of a traveling wave dielectrophoresis having four phases. This configuration provides large-area light steering and is useful for solar collectors, solar concentrators, solar redirectors, and other applications where light redirection over large areas is needed. This figure is related to and yet different from the prior-art of FIG. 13.

Figure 109:
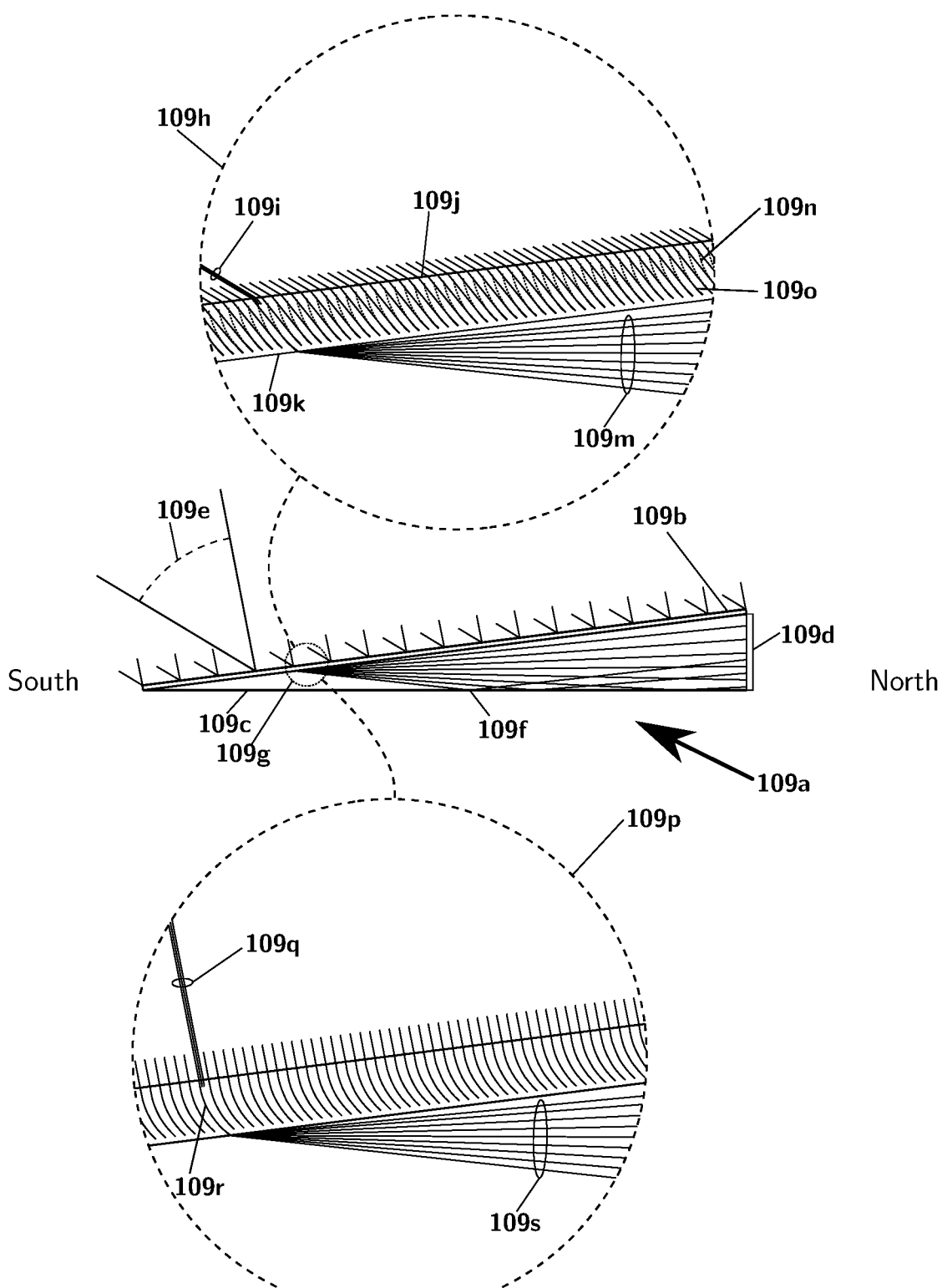

FIG. 109 shows in north-south cross section a hybrid 1-degree of freedom microfluidic solar collector and concentrator.

Figure 110:
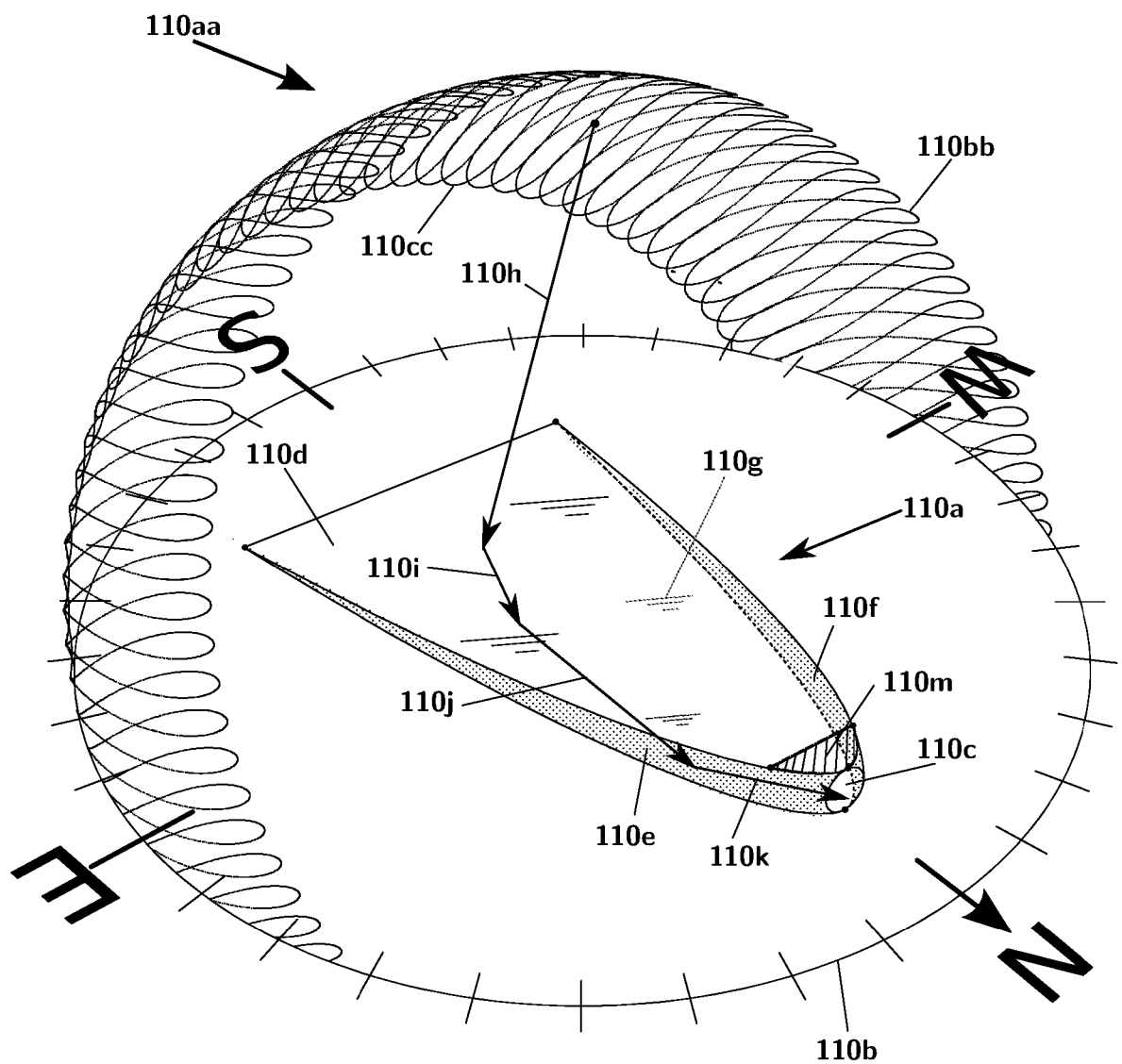

FIG. 110 Shows a concentrating solar plant providing two stages of solar concentration, a compass rose, and the equation of time superimposed on the local sky of the power plant.

Figure 111:
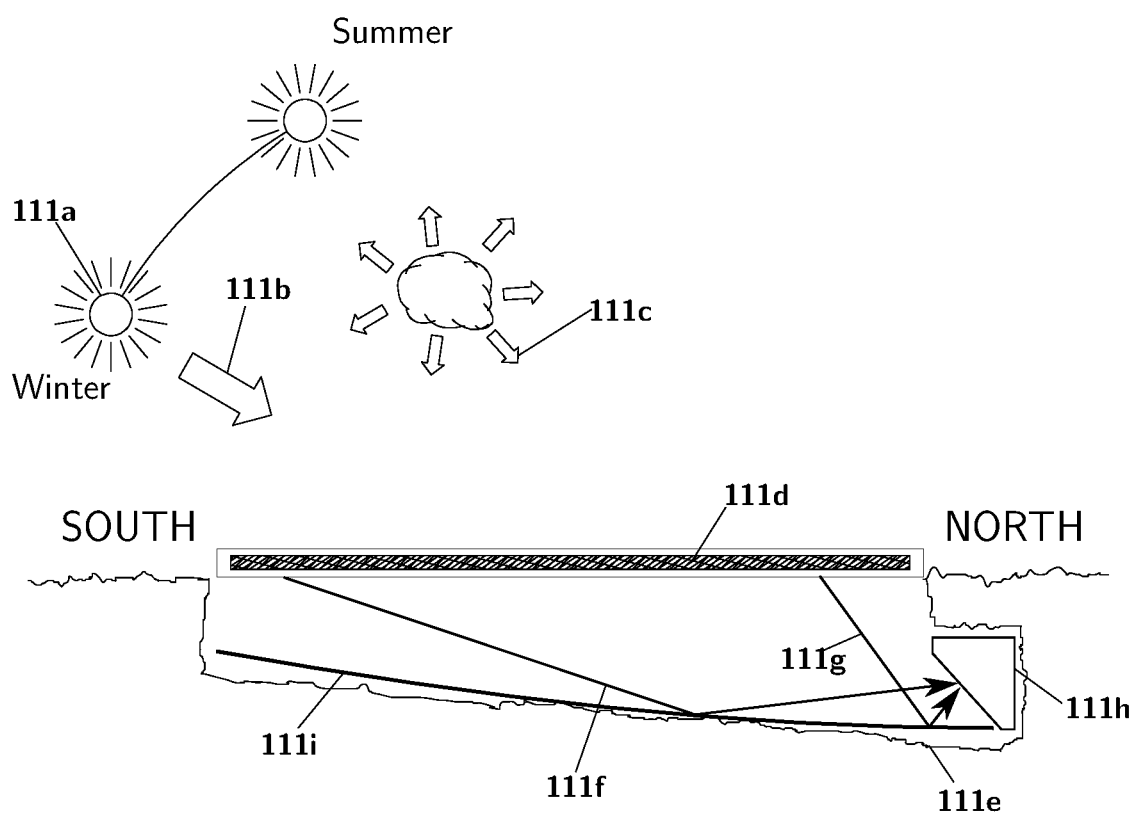

FIG. 111 shows a north-south cross section of a dielectrophoresis-based, and more generally a phoretic-force based, sun tracker used in a below-ground solar application.

Figure 112:
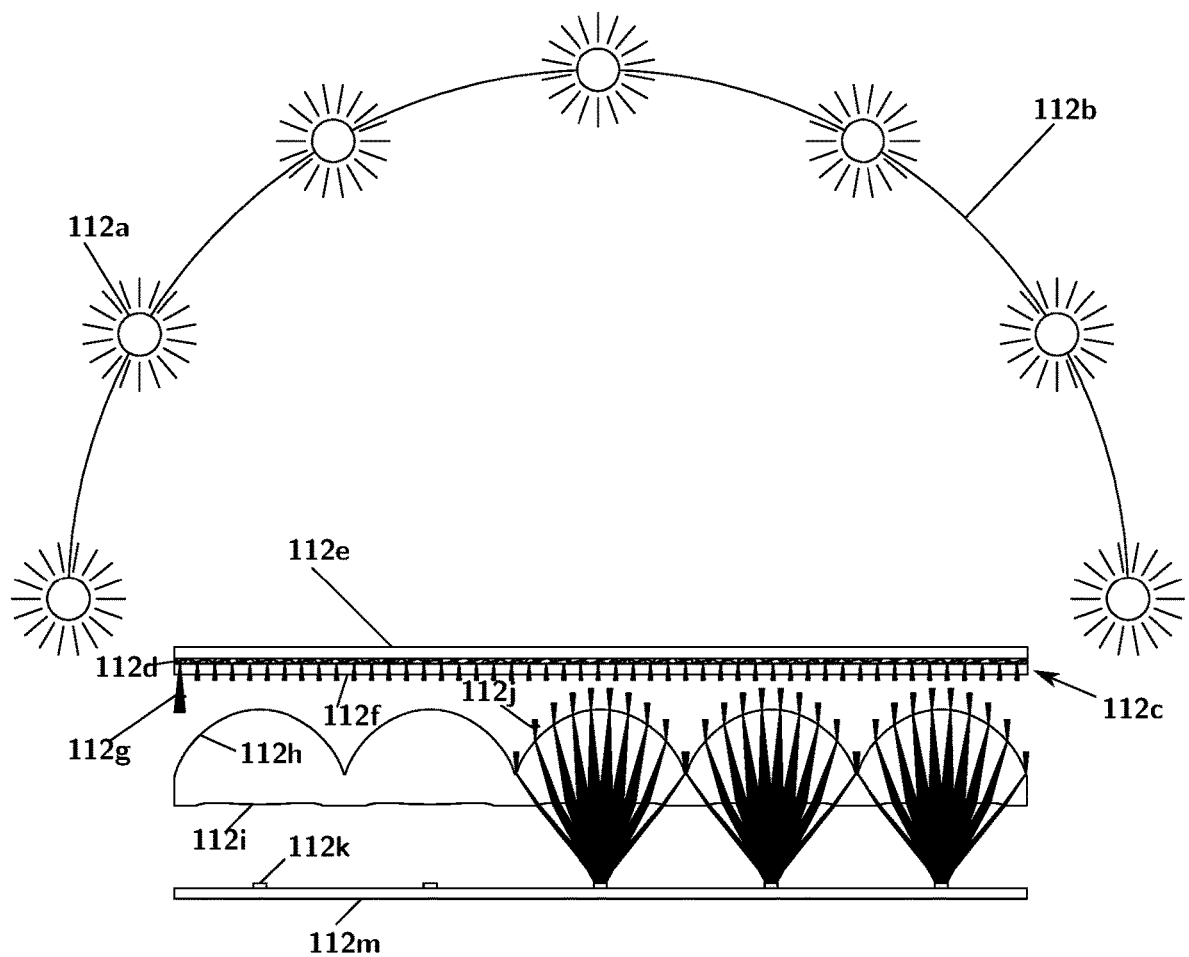

FIG. 112 shows a dielectrophoresis based, and more generally a phoretic force-based, sun tracker optically coupled to a lens array.

Figure 113:
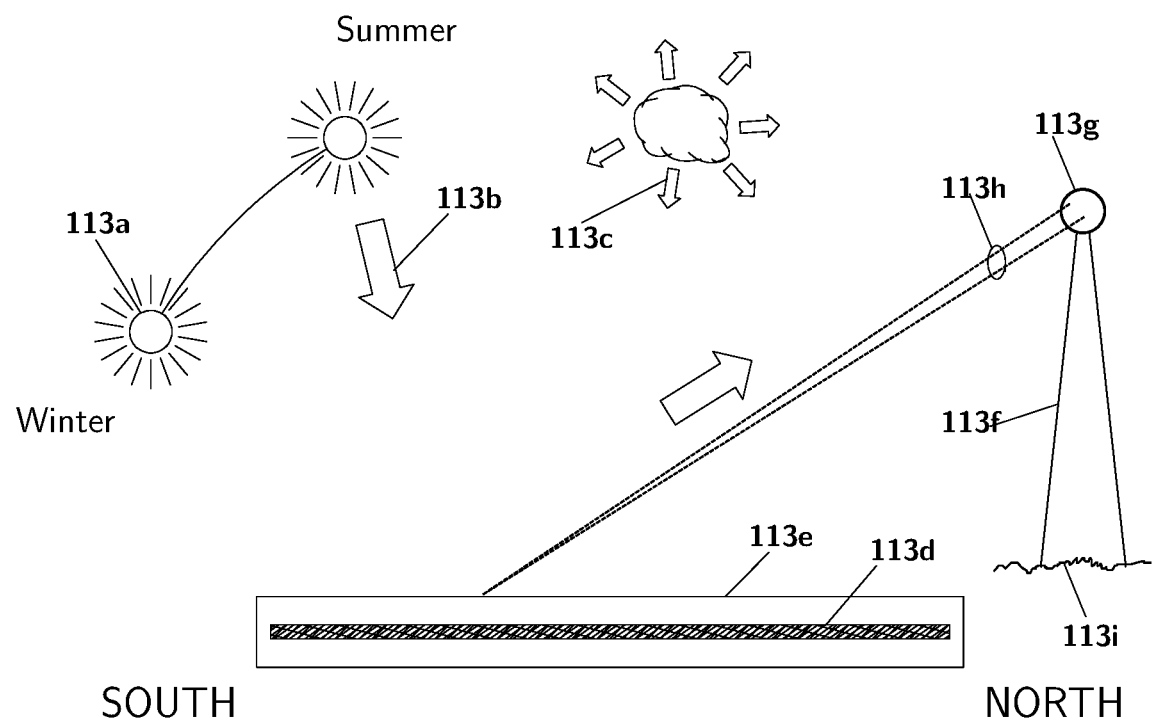

FIG. 113 shows a north-south cross section of a reflective dielectrophoresis based, and more generally a phoretic force based, sun tracker used in an above ground solar application.

Figure 114:
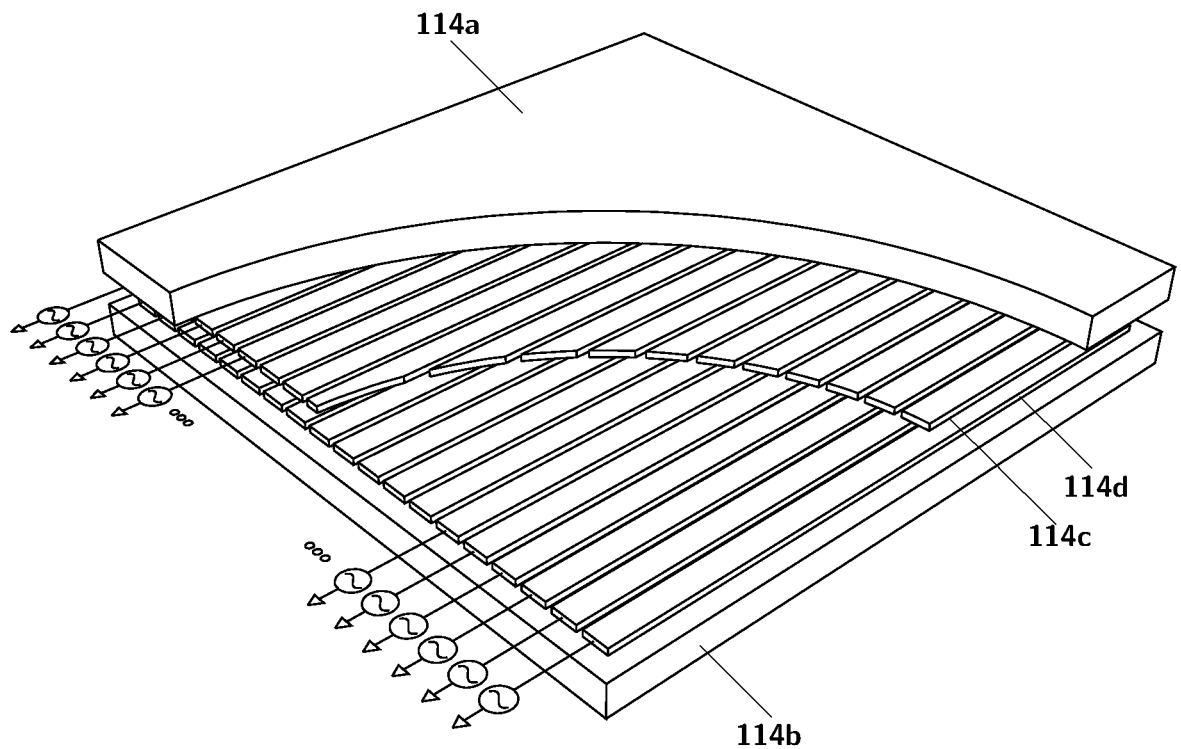

FIG. 114 A shows a cut away perspective view of a small portion of a solar collector panel, which is capable of redirecting light by means of voltages placed on transparent electrodes attached thereto to create variable flat grating elements to pass light through the device.

FIG. 114 B shows a cut away perspective view of a small portion of a solar collector panel, which is capable of redirecting light by means of voltages placed on transparent electrodes attached thereto to create variable flat grating elements to reflect light from the device.

FIG. 114 C shows a cut away perspective view of a small portion of a solar collector panel, which is capable of redirecting light by means of voltages placed on transparent electrodes attached thereto to create variable flat grating elements to redirect light by gallery waves along a curved surface.

FIG. 115 A shows a solar collector with dielectrophoresis-based flat grating elements to refract sunlight into a desired direction.

FIG. 115 B shows a solar collector with dielectrophoresis-based flat grating elements to reflect sunlight into a desired direction.

FIG. 115 C shows a solar collector with dielectrophoresis-based flat grating elements to refract sunlight into a desired direction along curved particle-density manifolds.

Figure 116:
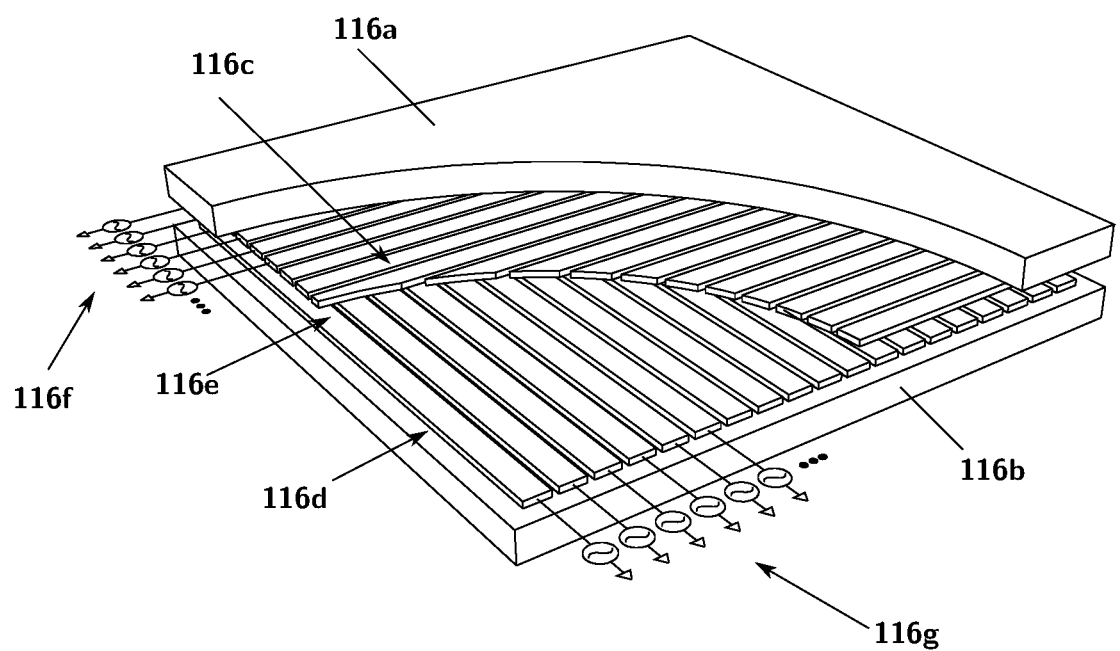

FIG. 116 shows a cut-away perspective view of a software reconfigurable optical device that is capable of making lenses, beam steering devices, optical reflection switches and other functions.

LIGHT CONTROL BY NANOPARTICLE DISTRIBUTIONS

Introduction to Physical Principles

The following pages provide the details of the underlying theory and embodiments of DBS for both opto-electronic light steering and other optical operations from first principles where needed. The objective of providing the theory is so that there is no question as to exactly what it is that is being discussed in a very complex technical area. The detailed technical discussion also allows insights into the limits of the prior-art and ultimately allows those less familiar with the material to have easier access to the present material using one consistent and unified notation. This material is inherently multi-disciplinary in nature and draws from a number of diverse fields including, but not limited to: fluid flows, heat transfer, continuum mechanics, electromagnetics, electronics, chemistry, material science, optics, thermodynamics, computer science and mathematics.

The reader is advised that due to the large number of concepts needed to describe the material in this disclosure, the associated symbolic representations sometimes required symbol reuse or at least similar looking symbols. Such symbols are never mixed in the same discussion unless some form of symbolic distinction is provided. For example the identity matrix is I and the irradiance of light is I. The meaning of symbols is clear from the context of the discussion in the disclosure.

Dyadic Calculus for Dielectrophoresis

Consider 3-dimensional vector functions of space and time A and B, which are arbitrary and not necessarily field quantities from Maxwell's equations. The dyadic product of these three dimensional vectors is represented as AB and has nine components that may be written as a matrix having elements $a_{ij}=A_iB_j$ and is given formally using the Einstein summation convention over two repeated indices as $$AB = A_i \hat{x}_i B_j \hat{x}_j = A_1 B_1 \hat{x}_1 \hat{x}_1 + A_1 B_2 \hat{x}_1 \hat{x}_2 + \ldots + A_3 B_3 \hat{x}_3 \hat{x}_3, \quad (1)$$

where double subscripts indicate summation over the three spatial dimensions and in general $AB \neq BA$. No distinction is made here between covariant and contravariant vectors. In the following analysis all derivations are provided using cartesian dyadics, however the resulting equations are correct across any self-consistent system of coordinates.

We shall use the Levi-Civita tensor $\epsilon_{ijk}$, to make curl and other operations easy to compute. In particular, the Levi-Civita tensor takes the values $$\epsilon_{ijk} = \begin{cases} +1 & \text{if } (i,j,k) \text{ is } (1,2,3), (2,3,1), \text{ or } (3,1,2) \\ -1 & \text{if } (i,j,k) \text{ is } (3,2,1), (1,3,2), \text{ or } (2,1,3) \\ 0 & \text{if } i=j, j=k, \text{ or } k=i \end{cases} \quad (2)$$

and we can show by direct computation that $$\epsilon_{ijk}\epsilon_{klm} = \epsilon_{kij}\epsilon_{klm} = \delta_{il}\delta_{jm} - \delta_{im}\delta_{jl} \quad (3)$$

where $\delta_{ij}$ is a Kronecker Delta function. The Levi-Civita tensor is used to write the cross product of A and B as $$A \times B = \hat{x}_k \epsilon_{kij} A_i B_j \quad (4)$$

and the curl of A as $$\nabla \times A = \hat{x}_k \epsilon_{kij} \partial_i A_j, \quad (5)$$

where as usual we have applied the Einstein summation convention.

The first result of importance is the divergence of a dyadic product.

It may be expanded as follows $$\nabla \cdot (AB) = (\hat{x}_k \partial_k) \cdot (\hat{x}_i A_i \hat{x}_j B_j)$$

$$= \partial_k A_i B_j (\hat{x}_k \cdot \hat{x}_i) \hat{x}_j$$

$$= \partial_k (A_i B_j) \delta_{ik} \hat{x}_j$$

$$= \partial_i (A_i B_j) \hat{x}_j$$

$$= [B_j(\partial_i A_i) + A_i(\partial_i B_j)] \hat{x}_j \quad (6)$$

$$= (\hat{x}_j B_j)(\partial_i \hat{x}_i) \cdot (A_i \hat{x}_i) + (A_i \hat{x}_i) \cdot (\partial_i \hat{x}_i)(\hat{x}_j B_j) \quad (7)$$

$$= B(\nabla \cdot A) + A \cdot (\nabla B) \cdot \quad (8)$$

$$\nabla \cdot (AB) = B(\nabla \cdot A) + A \cdot \nabla B \quad (9)$$

where in the future we may not always write obvious unit factors like $(\hat{x}_i \cdot \hat{x}_i)$ in intermediate results. Also note in the above equation we have used the fact that $$(A \cdot \nabla) B = A \cdot (\nabla B) = A \cdot \nabla B. \quad (10)$$

Next, the cross product of the curl of a vector is expanded as $$A \times (\nabla \times B) = \hat{x}_i \epsilon_{ijk} A_j \partial_l B_m \qquad (11)$$
$$= \hat{x}_i \epsilon_{kij} \epsilon_{klm} A_j \partial_l B_m$$
$$= \hat{x}_i (\delta_{il}\delta_{jm} - \delta_{im}\delta_{jl}) A_j \partial_l B_m$$
$$= \hat{x}_i (A_j \partial_i B_j - B_j \partial_j A_i).$$

Similarly, its compliment is $$B \times (\nabla \times A) = \hat{x}_i (B_j \partial_i A_j - A_j \partial_j B_i) \qquad (12)$$

Moreover, $$(A \cdot \nabla)B = A_j \partial_j B_i \hat{x}_i \qquad (13)$$

$$(14) \qquad (15)$$

so that $$A \times (\nabla \times B) + B \times (\nabla \times A) + (A \cdot \nabla)B + (B \cdot \nabla)A = \qquad (16)$$
$$\hat{x}_i (A_j \partial_i B_j + B_j \partial_i A_j) = \hat{x}_i \partial_i (A_j B_j) = \nabla (A \cdot B)$$

$$A \times (\nabla \times B) + B \times (\nabla \times A) + (A \cdot \nabla)B + (B \cdot \nabla)A = \nabla (A \cdot B) \qquad (17)$$

A special case of the above equation that is useful for analysis of Quasi Electro Static (QES) systems and DEP in particular, which specifies irrotational fields so that $\nabla \times A = \nabla \times B = 0$. Therefore, if we set A=B in Eq. 17 and assume irrotational fields then $$A \cdot \nabla A = \nabla \left( \frac{A^2}{2} \right) = \nabla \cdot \left( \frac{A^2}{2} I \right), \qquad (18)$$

where the last equality in the above equation was obtained by observing that for an arbitrary scalar $U = A^2/2$ we can write the equation using the 3×3 identity matrix I. In particular, $$\nabla \cdot U = \nabla \cdot (UI) \qquad (19)$$
$$= \hat{x}_k \partial_k \cdot (U \hat{x}_i \hat{x}_j \delta_{ij})$$
$$= \partial_k \delta_{ki} U \hat{x}_i$$
$$= \partial_i U \hat{x}_i$$
$$= \nabla U.$$

so that $$\nabla \cdot U = \nabla \cdot (UI) = \nabla U \text{ when } U \text{ is a scalar.} \qquad (20)$$

Next, by using Eq. 9 and its compliment, which is formed by swapping B for A and vice versa, we can solve separately for $(B \cdot \nabla)A$ and $(B \cdot \nabla)A$ $$(A \cdot \nabla)B = \nabla \cdot (AB) - B(\nabla \cdot A) \qquad (21)$$

$$(B \cdot \nabla)A = \nabla \cdot (BA) - A(\nabla \cdot B) \qquad (22)$$

and now substitute these equations back into Eq. 17 so that $$\nabla (A \cdot B) = A \times (\nabla \times B) + B \times (\nabla \times A) + \qquad (23)$$
$$\{\nabla \cdot (AB) - (\nabla \cdot A)B\} + \{\nabla \cdot (BA) - (\nabla \cdot B)A\}.$$

A special case for QES systems is where A and B are irrotational so that $\nabla \times A = \nabla \times B = 0$, then Eq. 23 can be written as $$\nabla \cdot (AB + BA) = \nabla (A \cdot B) + A(\nabla \cdot B) + B(\nabla \cdot A) \qquad (24)$$

By setting A=B in the above equation we obtain $$\nabla \cdot (AA) = A(\nabla \cdot A) + \nabla \left( \frac{A^2}{2} \right) \qquad (25)$$

where $A^2 = A \cdot A$. Now using Eq. 18 in Eq. 25 we obtain $$\nabla \cdot (AA) = \nabla \left( \frac{A^2}{2} \right) + \nabla \left( \frac{A^2}{2} \right) = \nabla (A^2) \qquad (26)$$

so that $$\nabla \cdot (AA) = \nabla (A^2) = \nabla \cdot (A^2 I) \text{ when } A \text{ is only irrotational.} \qquad (27)$$

Additionally, from Eq. 25 and 27 we also have that $$A(\nabla \cdot A) = \nabla \left( \frac{A^2}{2} \right). \qquad (28)$$

We summarize Eqs. 18 and 28 as $$A(\nabla \cdot A) = A \cdot \nabla A = \nabla \left( \frac{A^2}{2} \right) = \nabla \cdot \left( \frac{A^2}{2} I \right) \qquad (29)$$

when A is only irrotational.

Notice that if A is solenoidal in Eq. 25 so that $\nabla \cdot A = 0$ then we have from Eq. 25 that $$\nabla \cdot (AA) = \nabla \left( \frac{A^2}{2} \right) \qquad (30)$$

when A is irrotational and solenoidal. Again, notice how different Eq. 30 is from Eq. 27.

The next relation that is needed is derived by using Eq. 2 and 3 so that the divergence of the ordered difference is $$\nabla \cdot (AB - BA) = \partial_i (A_i B_j - B_i A_j) \hat{x}_j \qquad (31)$$
$$= (\delta_{il}\delta_{jm} - \delta_{im}\delta_{jl}) \partial_i (A_l B_m) \hat{x}_j$$
$$= \epsilon_{kij} \epsilon_{klm} \partial_i (A_l B_m) \hat{x}_j$$
$$= -\hat{x}_j \epsilon_{jik} \partial_i [\epsilon_{klm}(A_l B_m)]$$
$$= -\hat{x}_j \epsilon_{jik} \partial_i [A \times B]_k$$
$$= -\nabla \times (A \times B)$$
$$= \nabla \times (B \times A).$$

$$\nabla \cdot (AB - BA) = \nabla \times (B \times A) \qquad (32)$$

This result can be combined with Eq. 9 so that $$\nabla \times (B \times A) = \nabla \cdot (AB) - \nabla \cdot (BA) \qquad (33)$$
$$= \{(\nabla \cdot A)B + (A \cdot \nabla)B)\} - \{(\nabla \cdot B)A + (B \cdot \nabla)A)\},$$

which in the special case when A and B are solenoidal, i.e. with $\nabla \cdot A = \nabla \cdot B = 0$, then Eq. 33 reduces the above equation to $$\nabla \times (B \times A) = A \cdot \nabla B - B \cdot \nabla A \text{ when } A \text{ \& } B \text{ are solenoidal.} \qquad (34)$$

Maxwell's Equations and Notation

We start with the space-time version of Maxwell's equations for macroscopic systems in SI units and the constitutive relations for a homogeneous, isotropic and linear materials. In particular, Maxwell's equations in SI units are $$\nabla \times \mathcal{E}(r, t) = -\frac{\partial \mathcal{B}(r, t)}{\partial t} \qquad (35)$$

$$\nabla \times \mathcal{H}(r, t) = +\frac{\partial \mathcal{D}(r, t)}{\partial t} + \mathcal{J}_f(r, t) \qquad (36)$$

$$\nabla \cdot \mathcal{D}(r, t) = \rho_f(r, t) \qquad (37)$$

$$\nabla \cdot \mathcal{B}(r, t) = 0 \qquad (38)$$

and the constitutive relations are $$\mathcal{D}_{(r,t)} = \epsilon(r,t)\epsilon(r,t) \qquad (39)$$

$$\mathcal{B}_{(r,t)} = \mu(r,t)\mathcal{H}_{(r,t)} \qquad (40)$$

$$\mathcal{J}_{f(r,t)} = \sigma(r,t)\epsilon(r,t). \qquad (41)$$

The electromagnetic quantities above include the electric field intensity ε [V/m], the electric field density $\mathcal{D}$ [C/m²], the magnetic field intensity $\mathcal{H}$ [A/m], the magnetic field $\mathcal{B}$ [Wb/m²], the free electric current density $\mathcal{J}_f$ [A/m²], the free electric charge density $\rho_f$ [C/m³], the permittivity ε [F/m], the permeability μ [H/m] and the conductivity σ [S/m]. If we assume that quantities are harmonic then we can decompose the space and time functions of fields and charges into functional products in phasor space and material properties into functions of space and frequency, which are to be calculated or assumed as the situation requires, so that in the frequency domain we have $$\mathcal{D}_{(r,t)} \rightarrow D(r)e^{i\omega t} \qquad (42)$$

$$\epsilon(r,t) \rightarrow E(r)e^{i\omega t} \qquad (43)$$

$$\mathcal{B}_{(r,t)} \rightarrow B(r)e^{i\omega t} \qquad (44)$$

$$\mathcal{H}_{(r,t)} \rightarrow H(r)e^{i\omega t} \qquad (45)$$

$$\rho_f(r,t) \rightarrow \rho_f(r)e^{i\omega t} \qquad (46)$$

$$\sigma(r,t) \rightarrow \sigma(r,\omega) \qquad (47)$$

$$\epsilon(r,t) \rightarrow \epsilon(r,\omega) \qquad (48)$$

$$\mu(r,t) \rightarrow \mu(r,\omega), \qquad (49)$$

where quantities like E(r) are in general complex valued quantities unless noted otherwise and $i = \sqrt{-1}$. Alternately, we can write that $\epsilon(r, t) = \text{Re}[E(r)e^{i\omega t}]$. Either way we can rewrite Maxwell's equations as $$\nabla \times E(r) = -i\omega\tilde{\mu}(r,\omega)H(r) \qquad (50)$$

$$\nabla \times H(r) = +i\omega\tilde{\epsilon}(r,\omega)E(r) \qquad (51)$$

$$\nabla \cdot \{\tilde{\epsilon}(r,\omega)E(r)\} = 0 \qquad (52)$$

$$\nabla \cdot \{\tilde{\mu}(r,\omega)H(r)\} = 0 \qquad (53)$$

where the third and fourth equations above follows from taking the divergence of the first and second equations and using the vector identity $\nabla \cdot (\nabla \times A) = 0$, where A is an arbitrary vector over space coordinates. Furthermore, we find that on using the constitutive relation $\mathcal{J}_f = \sigma_f \epsilon$ that Eq. 36 takes the form of Eq. 51 when $$\tilde{\epsilon}(r, \omega) = \epsilon(r, \omega) - i\frac{\sigma_f(r, \omega)}{\omega} \qquad (54)$$

$$= \{\epsilon_R(r, \omega) - i\epsilon_I(r, \omega)\} - i\frac{\sigma_f(r, \omega)}{\omega} \qquad (55)$$

$$= \epsilon_R(r, \omega) - i\left\{\epsilon_I(r, \omega) + i\frac{\sigma_f(r, \omega)}{\omega}\right\} \qquad (56)$$

$$\stackrel{\Delta}{=} \tilde{\epsilon}_R(r, \omega) - i\tilde{\epsilon}_I(r, \omega) \qquad (57)$$

$$\tilde{\mu}(r, w) = \mu(r, \omega) \qquad (58)$$

The above equations are provided to establish notation and sign conventions such as the phasor sign convention given by $e^{i\omega t}$. Also, excitations may involve multiple frequencies so that in general $\epsilon(r, t) = \text{Re}[E_1(r)e^{i\omega_1 t} + E_2(r)e^{i\omega_2 t} + E_3(r)e^{i\omega_3 t} + \ldots]$.

Time-Averaged Maxwell Stress Tensor

In addition to Maxwell's equations Eqs. 35-38 and the constitutive equations Eqs. 39-41 there is the Lorentz force equation, which for a single charge is given by $$\mathcal{F} = q\epsilon + qv \times \mathcal{B} \qquad (59)$$

where q is the charge and v is the velocity vector of the charge in an inertial frame of reference. If we multiply both sides by N, which is the concentration of charged particles in units of number of charges per unit volume. Note that N is different than the concentration of nanoparticles per unit volume u. Therefore, then we can identify $\rho_f = Nq$ as the free charge density, $\mathcal{J}_f = Nqv$ as the free vector current density and the force per unit volume as $\mathcal{F}_V = N\mathcal{F}$. Therefore, the force per unit volume, i.e. the force density, is $$\mathcal{F}_V = \rho_f \epsilon + \mathcal{J} \times \mathcal{B}. \qquad (60)$$

Also, because the speed of light squared is $c^2 = 1/(\epsilon\mu)$ the Poynting vector divided by the speed of light squared in media is $$\frac{S}{c^2} = \frac{\mathcal{E} \times \mathcal{H}}{c^2} = \epsilon\mu\frac{\mathcal{E} \times \mathcal{B}}{\mu} = \mathcal{D} \times \mathcal{B}. \qquad (61)$$

Therefore, $$\frac{\partial}{\partial t}\left(\frac{S}{c^2}\right) = \frac{\partial \mathcal{D}}{\partial t} \times \mathcal{B} + \mathcal{D} \times \frac{\partial \mathcal{B}}{\partial t}. \qquad (62)$$

Combining results by inserting Maxwell's equations Eq. 35-38 into the volume forces Eq. 60 and further exploiting Eq. 62 we obtain $$\mathcal{F}_V = \rho_f \mathcal{E} + \mathcal{J} \times \mathcal{B} \quad (63)$$

$$= (\nabla \cdot \mathcal{D})\mathcal{E} + (\nabla \times \mathcal{H}) \times \mathcal{B} - \frac{\partial \mathcal{D}}{\partial t} \times \mathcal{B}$$

$$= (\nabla \cdot \mathcal{D})\mathcal{E} + (\nabla \times \mathcal{H}) \times \mathcal{B} - \left\{ \frac{\partial}{\partial t}\left(\frac{S}{c^2}\right) - \mathcal{D} \times \frac{\partial \mathcal{B}}{\partial t} \right\}$$

$$= (\nabla \cdot \mathcal{D})\mathcal{E} + (\nabla \times \mathcal{H}) \times \mathcal{B} - \frac{\partial}{\partial t}\left(\frac{S}{c^2}\right) - \mathcal{D} \times (\nabla \times \mathcal{E})$$

and on rearranging terms and strategically adding a zero term using $\nabla \cdot \mathcal{B} = 0$ then $$\mathcal{F}_V = -\frac{\partial}{\partial t}\left(\frac{S}{c^2}\right) + \underbrace{\mathcal{E}(\nabla \cdot \mathcal{D}) - \mathcal{D} \times (\nabla \times \mathcal{E})}_{\text{Term-1 }(T_1)\text{ for Electric Field}} + \underbrace{\mathcal{H}(\nabla \cdot \mathcal{B}) - \mathcal{B} \times (\nabla \times \mathcal{H})}_{\text{Term-2 }(T_2)\text{ for Magnetic Field}}. \quad (64)$$

Therefore, focusing initially on term-1 we find $$T_1 = \mathcal{E}(\nabla \cdot \mathcal{D}) - \mathcal{D} \times (\nabla \times \mathcal{E}) \quad (65)$$

$$\rightarrow \mathcal{E}_j \partial_i \mathcal{D}_i - \epsilon_{ijk} \mathcal{D}_j \epsilon_{klm} \partial_l \mathcal{E}_m$$

$$= \mathcal{E}_j \partial_i \mathcal{D}_i - \epsilon_{ijk} \epsilon_{klm} \mathcal{D}_j \partial_l \mathcal{E}_m$$

$$= \mathcal{E}_j \partial_i \mathcal{D}_i - (\delta_{il}\delta_{jm} - \delta_{im}\delta_{jl})\mathcal{D}_j \partial_l \mathcal{E}_m$$

$$= \mathcal{E}_j \partial_i \mathcal{D}_i - \mathcal{D}_j \partial_i \mathcal{E}_j + \mathcal{D}_j \partial_j \mathcal{E}_i$$

$$= \epsilon(-\mathcal{E}_j \partial_i \mathcal{E}_j + \mathcal{E}_j \partial_i \mathcal{E}_i + \mathcal{E}_j \partial_j \mathcal{E}_i) \text{ Reordered and constant } \epsilon$$

$$= \epsilon(-\mathcal{E}_j \partial_i \mathcal{E}_j + \mathcal{E}_j \partial_i \mathcal{E}_i + \mathcal{E}_i \partial_j \mathcal{E}_j) \text{ With } i \leftrightarrows j \text{ in 3rd term}$$

$$= \epsilon(-\mathcal{E}_j \partial_i \mathcal{E}_j + \partial_i (\mathcal{E}_i \mathcal{E}_j))$$

$$= \epsilon\left(-\frac{1}{2}\partial_i(\mathcal{E}_j \mathcal{E}_j) + \partial_i(\mathcal{E}_i \mathcal{E}_j)\right)$$

$$= \epsilon \partial_i \left(-\frac{1}{2}\mathcal{E}_k \mathcal{E}_k \delta_{ij} + \mathcal{E}_i \mathcal{E}_j\right) \text{ Because } \partial_i(\mathcal{E}_k \mathcal{E}_k) = 2\mathcal{E}_k \partial_i \mathcal{E}_k$$

$$= \epsilon \partial_i \left(-\frac{1}{2}\mathcal{E}^2 \delta_{ij} + \mathcal{E}_i \mathcal{E}_j\right) \text{ By Einstein Summation Convention}$$

$$\rightarrow \nabla \cdot \left(-\frac{\epsilon}{2}|\mathcal{E}|^2 I + \epsilon \mathcal{E}\mathcal{E}\right) \text{ Where } I \text{ is the identity matrix.}$$

$$= -\nabla\left(\frac{\epsilon}{2}|\mathcal{E}|^2\right) + \nabla \cdot (\epsilon \mathcal{E}\mathcal{E}), \quad (66)$$

where the first term in the last line is minus the gradient of the electric field energy density and the second term is the divergence of the dyadic product of field quantities.

Similarly, for $T_2$ we can let $\mathcal{D} \rightarrow \mathcal{B}$, $\epsilon \rightarrow \mathcal{H}$ and $\epsilon \rightarrow 1/\mu$ so that $$T_2 = \mathcal{H}(\nabla \cdot \mathcal{B}) - \mathcal{B} \times (\nabla \times \mathcal{H}) \quad (67)$$

$$\rightarrow \frac{1}{\mu}\partial_i\left(-\frac{1}{2}\mathcal{B}^2 \delta_{ij} + \mathcal{B}_i \mathcal{B}_j\right)$$

$$\rightarrow \nabla \cdot \left(-\frac{1}{2\mu}|\mathcal{B}|^2 I + \frac{1}{\mu}\mathcal{B}\mathcal{B}\right)$$

Therefore, the Maxwell stress tensor, comprising field-induced mechanical stress matrix elements, is $$\mathcal{T} = \left(-\frac{\epsilon}{2}|\mathcal{E}|^2 I + \epsilon \mathcal{E}\mathcal{E}\right) + \left(-\frac{1}{2\mu}|\mathcal{B}|^2 I + \frac{1}{\mu}\mathcal{B}\mathcal{B}\right). \quad (68)$$

The force per unit volume is given as $$\mathcal{F}_V = -\frac{\partial}{\partial t}\left(\frac{S}{c^2}\right) + \nabla \cdot \mathcal{T}, \quad (69)$$

which has a first term due to radiation pressure and a second term due to field induced stresses.

For quasi electrostatic DEP systems the Maxwell stress tensor needs to be evaluated for the time average volume force, accordingly if we assume harmonic electric and magnetic fields with phase shifts then we may separate space and time. For example, for electric fields we can write $$\varepsilon(r,t) = \text{Re}[\tilde{E}(r)e^{i\omega t}] = E(r)\cos(\omega t) \quad (70)$$

$$\mathcal{D}(r,t) = \text{Re}[\tilde{D}(r)e^{i\omega t}] = D(r)\cos(\omega t - \phi_\epsilon) \quad (71)$$

where $\phi_\epsilon = \phi_\epsilon(r)$, $E(r)$ and $D(r)$ are real valued functions of position r. We can then write the time average Maxwell stress tensor as $$\langle \mathcal{F}_V \rangle = -\frac{1}{c^2}\frac{\partial \langle S \rangle}{\partial t} + \nabla \cdot \langle \mathcal{T} \rangle \quad (72)$$

$$= 0 + \nabla \cdot [\langle \mathcal{T}_E \rangle + \langle \mathcal{T}_B \rangle].$$

Let us assume that electrodes, or nota bene a source of non-uniform electromagnetic radiation designed to replace electrodes, are introduced such that the electric field intensity being used to generate a ponderomotive force has an in-phase and a quadrature component so that by design $$\varepsilon = E_R \cos(\omega t) + E_I \sin(\omega t) \quad (73)$$

$$\mathcal{D} = D_R \cos(\omega t - \phi_\epsilon) + D_I \sin(\omega t - \phi_\epsilon) \quad (74)$$

where $E_R$ is not parallel to $E_I$ and the phase shift $\phi_\epsilon$ is due to the material properties. Then we consider the dyadic product $$\mathcal{D}\varepsilon = D_R E_R \cos(\omega t - \phi_\epsilon)\cos(\omega t) + D_R E_I \cos(\omega t - \phi_\epsilon)\sin(\omega t) + D_I E_R \sin(\omega t - \phi_\epsilon)\cos(\omega t) + D_I E_I \sin(\omega t - \phi_\epsilon)\sin(\omega t). \quad (75)$$

The time average can be obtained by first using the trigonometric identities for arbitrary angles a and b $$2 \cos a \cos b = \cos(a+b) + \cos(a-b) \quad (76)$$

$$2 \cos a \sin b = \sin(a+b) - \sin(a-b) \quad (77)$$

$$2 \sin a \cos b = \sin(a+b) + \sin(a-b) \quad (78)$$

$$2 \sin a \sin b = -\cos(a+b) + \cos(a-b) \quad (79)$$

so that the time average of $\mathcal{D}\varepsilon$ over an integer number of cycles is formed. For example, $$\cos(\omega t - \phi_\epsilon)\cos(\omega t) = \frac{1}{2}[\cos(2\omega t - \phi_\epsilon) + \cos\phi_\epsilon] \xrightarrow{\text{AVERAGE}} \frac{\cos\phi_\epsilon}{2} \quad (80)$$

and applying this method to each term in Eq. 75 we obtain the time average dyadic product as $$\langle \mathcal{DE} \rangle = \frac{1}{2}[D_R E_R \cos\phi_\epsilon + D_R E_I \sin\phi_\epsilon - D_I E_R \sin\phi_\epsilon + D_I E_I \cos\phi_\epsilon] \quad (81)$$

$$= \frac{1}{2}\text{Re}[(\cos\phi_\epsilon + i\sin\phi_\epsilon)(D_R + iD_I)(E_R - iE_I)]$$

$$= \frac{1}{2}\text{Re}[|\tilde{\epsilon}|(\cos\phi_\epsilon + i\sin\phi_\epsilon)(E_R + iE_I)(E_R - iE_I)]$$

$$= \frac{1}{2}\text{Re}[(\hat{\epsilon}_R + i\hat{\epsilon}_I)(E_R + iE_I)(E_R - iE_I)]$$

$$= \frac{1}{2}\text{Re}[\tilde{\epsilon} E E^*]$$

$$= \frac{1}{2}\text{Re}[D E^*]$$

where the asterisk indicates the complex conjugate and Re[ ] is the real part operator. Also note that the complex permittivity is $$\tilde{\epsilon} = \hat{\epsilon}_R + i\hat{\epsilon}_I. \quad (82)$$

Additionally, we also find using essentially the same above procedure, that for an inner product the time average is $$\langle \mathcal{D} \cdot \mathcal{E} \rangle = \frac{1}{2}\text{Re}[D \cdot E^*]. \quad (83)$$

Therefore, the time average Maxwell stress tensor is $$\langle \mathcal{T}_E \rangle = \left\langle -\frac{1}{2}(\mathcal{D} \cdot \mathcal{E})I + \mathcal{DE} \right\rangle \quad (84)$$

$$= \frac{1}{2}\text{Re}\left[-\frac{\tilde{\epsilon}}{2}(E \cdot E^*)I + \tilde{\epsilon} E E^*\right]$$

$$= \frac{1}{2}\text{Re}\left[-\frac{(\hat{\epsilon}_R + i\hat{\epsilon}_I)}{2}(E_R + iE_I) \cdot (E_R - iE_I))I + (\hat{\epsilon}_R + i\hat{\epsilon}_I)(E_R + iE_I)(E_R - iE_I)\right]$$

$$= \frac{1}{2}\left\{-\frac{1}{2}\hat{\epsilon}_R E^2 I + \hat{\epsilon}_R(E_R E_R + E_I E_I) + \hat{\epsilon}_I(E_R E_I - E_I E_R)\right\}$$

However, the electric component of the average ponderomotive force is $$\langle \mathcal{F}_E \rangle = \nabla \cdot \mathcal{T}_{\tau_E} \rangle \quad (85)$$

and we immediately see a need to reduce the expressions for $\nabla \cdot (E_R E_I - E_I E_R)$ and $\nabla \cdot (E_R E_R + E_I E_I)$. We shall assume that we are in the quasi electrostatic regime where both the real and imaginary parts of the electric field intensity are irrotational so from Eq. 32 we find that $$\nabla \cdot [E_R E_I - E_I E_R] = \nabla \times (E_I \times E_R) \quad (86)$$

and from Eq. 27 with irrotational fields $\nabla \times E_R = \nabla \times E_I = 0$ for quasi electrostatics we have $$\nabla \cdot [E_R E_R + E_I E_I] = \nabla (E_R^2 + E_I^2) = \nabla \cdot (E^2 I) \quad (87)$$

so, the quasi-electrostatic force, i.e. the Kelvin force density, is obtained from Eq. 84 as $$\langle \mathcal{F}_{dep} \rangle = \frac{1}{2}\left\{\nabla\left[\frac{\hat{\epsilon}_R}{2}(E_R \cdot E_R + E_I \cdot E_I)\right] + \nabla \times (\hat{\epsilon}_I E_I \times E_R)\right\}. \quad (88)$$

This is the Kelvin force density applied to a spherical nanoparticle of radius b and volume $$v = \frac{4}{3}\pi b^3. \quad (89)$$

Figure 2:
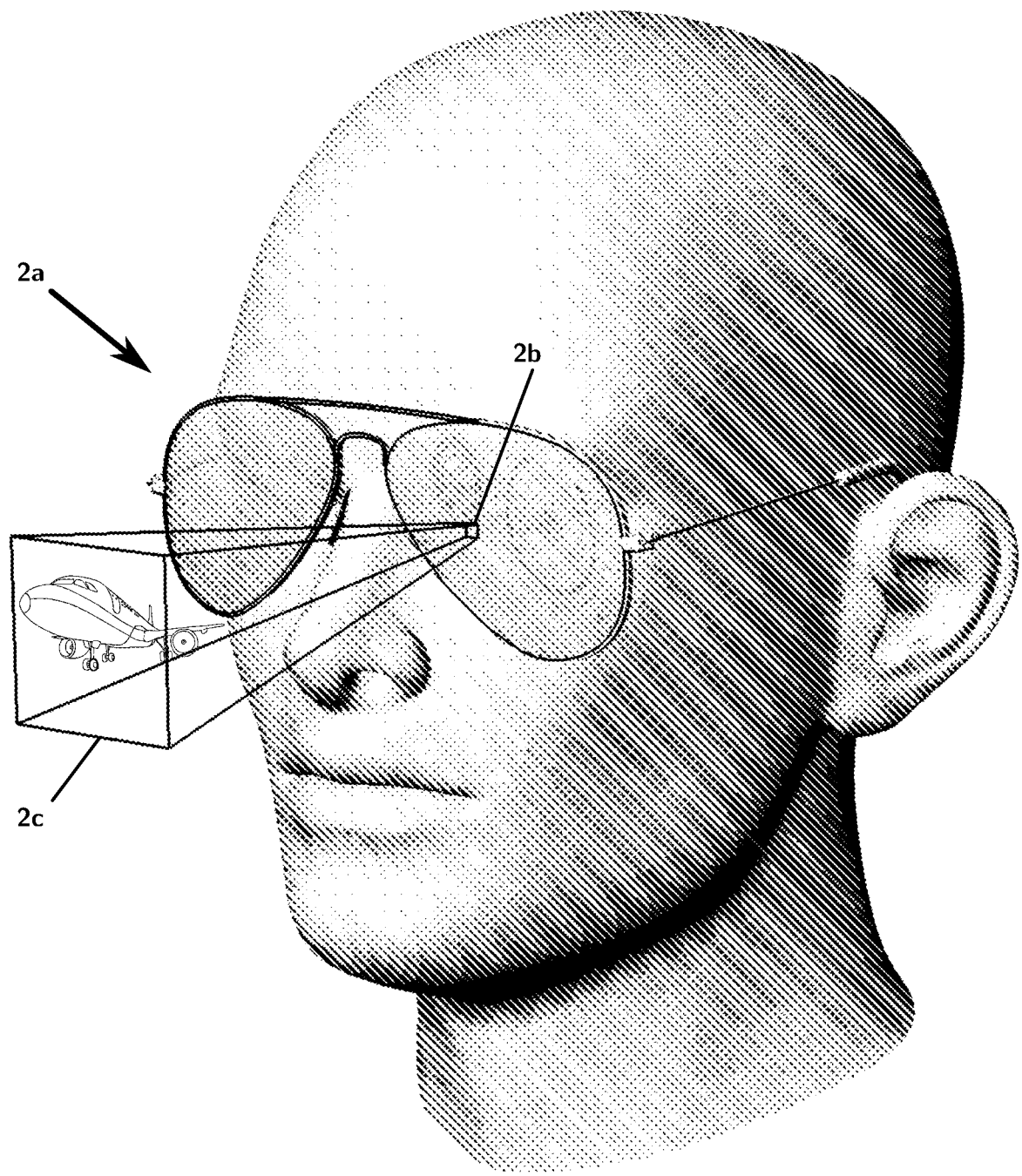
FIG. 2 shows a person using augmented reality glasses that are based on dielectrophoresis of nanoparticles that may include dielectrics, quantum dots and plasmonic nanospheres.
Figure 3:
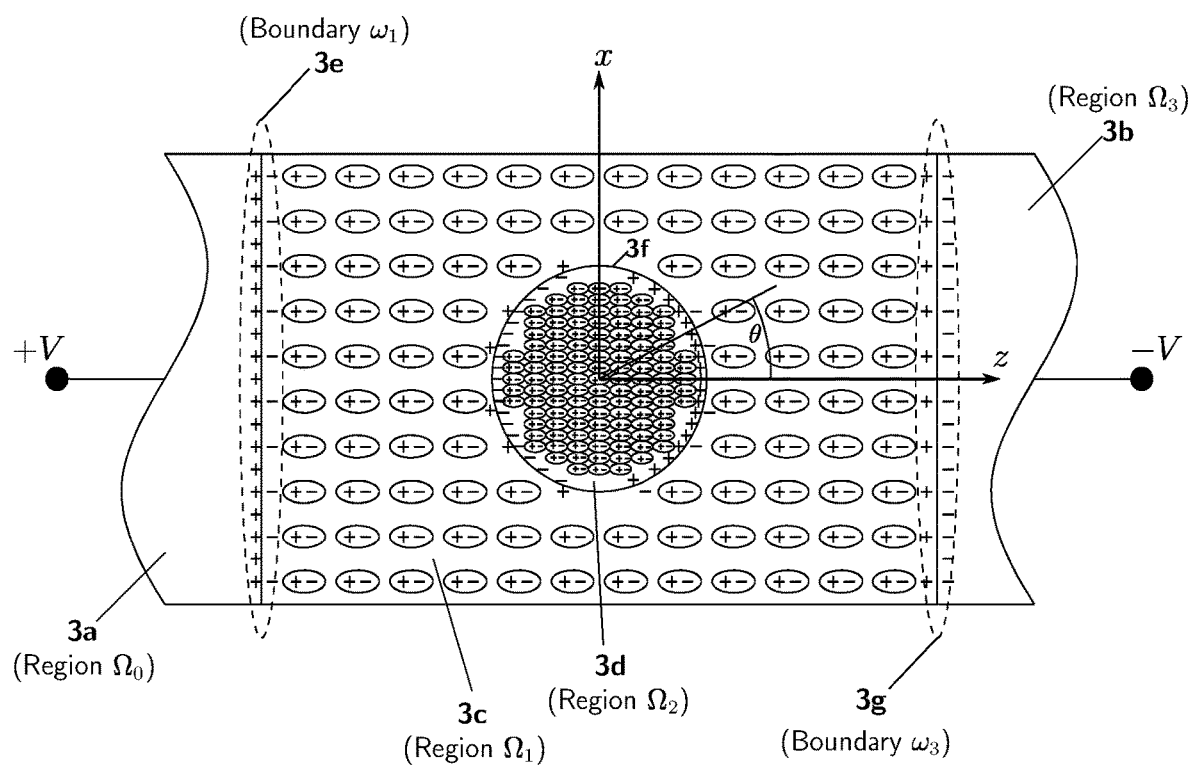
FIG. 3 shows a cross section of a fluid control channel having free and bound charges associated with a nano-scale dielectric sphere embedded in a dielectric liquid and energized by electrodes on the control channel.

The value of $\tilde{\epsilon} = \hat{\epsilon}_R + i\hat{\epsilon}_I$ associated with Eq. 88 is now derived heuristically by considering FIG. 3, where a schematic of a spherical dielectric nanoparticle within a liquid medium is shown between electrodes. In particular, regions $\Omega_0$ and $\Omega_3$ comprise metallic electrodes 3a and 3b respectively. A dielectric liquid 3c fills region $\Omega_1$ and a spherical dielectric nanoparticle 3d is in region $\Omega_2$. The boundary 3e between regions $\Omega_0$ and $\Omega_1$ is $\omega_1$. The spherical boundary 3f between $\Omega_1$ and $\Omega_2$ is $\omega_2$. The boundary 3g between regions $\Omega_1$ and $\Omega_3$ is $\omega_3$. The materials are to be replaced by bound and free charges in the regions and on the boundaries between the regions. The angle θ, which is used to describe the charge distributions, is also shown in FIG. 3. Finally, FIG. 3 also shows the volume polarization of atoms with ovals containing positive and negative charges; the figure also shows the surface charges at each boundary. The surface charges include free charges from conducting electrodes and bound charges on dielectric boundaries.

We seek to find an expression for the local field in region $\Omega_2$ so that we can find an equation for the polarizability $\alpha_S$ that relates the electric field intensity in the liquid $E_L$ to the polarization of the dielectric sphere. We start by considering the total local electric field in region $\Omega_2$ as the sum of the electric field intensity in the liquid plus the field due to the bound volume polarization and the field from the bound surface polarization on surface $\omega_2$. This results in a Lorentz relation between macroscopic effective fields ($E_L$ and $E_{loc}$) and polarization fields ($E_{\Omega_2}$ and $E_{\omega_2}$), so that by inspection of the signs of the charges and the resulting anticipated field directions in FIG. 3 we can write $$E_{loc} = E_L + E_{\Omega_2} - E_{\omega_2}, \quad (90)$$

where $E_L$ depends on the voltages applied to the electrodes, $E_{\Omega_2}$ also depends on the specific spatial configuration (i.e. the lattice structure) of the atoms and molecules making up the spherical nanoparticle and $E_{\omega_2}$ depends on the net charge at the spherical boundary. Once found $E_{loc}$, which is the total field at the sphere's center when accounting for all charges in the system, allows us a way to find the polarizability $\alpha_S$ of the nanoparticle so that we can find the effective (average) polarization of the nanoparticle by the definition $$p = \alpha_S E_{loc}. \quad (91)$$

This can be related to the potential of an average dipole moment. As we shall see this then provides the effective dielectric constant, which is the objective of our calculation.

To find the three field components of the Lorentz relation we need to find the various electric charges in the system first. In general, because the divergence of the macroscopic polarization is the volume charge density $\nabla \cdot P = -\rho_b$ we have from Gauss's law $\nabla \cdot E = (\rho_f + \rho_b)/\epsilon_0$ that $$P = D - \epsilon_0 E, \quad (92)$$

and the bound-surface-charge density per unit area is $$\sigma_b = P \cdot \hat{n} = (D - \epsilon_0 E) \cdot \hat{n}. \quad (93)$$

Also, by integrating $\nabla \cdot D = \rho_f$ over volume and using Gauss's integral theorem we obtain the free-surface-charge boundary condition $$\sigma_f = (D_2 - D_1) \cdot \hat{n} \quad (94)$$

where h is the normal unit vector pointing out of medium-1 into medium-2. At each of the boundaries we can write expressions for the bound and free charge densities.

For boundary $\omega_1$ the free, bound and total charge densities are $$\sigma_{f1}=(D_1-D_0)\cdot\hat{z}=\epsilon_0\tilde{\epsilon}_{rL}E_L \tag{95}$$

$$\sigma_{b1}=P_L\cdot\hat{z}=-\epsilon_0(\tilde{\epsilon}_{rL}-1)E_L \tag{96}$$

$$\sigma_{t1}=\sigma_{f1}+\sigma_{b1}=\epsilon_0 E_L. \tag{97}$$

where the complex relative permittivity $\tilde{\epsilon}_{rL}$ was used to account for losses and phase shifts between the application of a harmonic electric field intensity and an induced polarization. Similarly, for the boundary $\omega_3$ we have $$\sigma_{f3}=(D_3-D_2)\cdot\hat{z}=-\epsilon_0\tilde{\epsilon}_{rL}E_L \tag{98}$$

$$\sigma_{b3}=P_L\cdot\hat{z}=\epsilon_0(\tilde{\epsilon}_{rL}-1)E_L \tag{99}$$

$$\sigma_{t3}=\sigma_{f3}+\sigma_{b3}=-\epsilon_0 E_L, \tag{100}$$

which shows that the total surface charge densities on the electrodes (i.e. $\sigma_{t1}$ and $\sigma_{t3}$) are of equal and opposite sign. It also shows that one component of the total electric field intensity within the dielectric is $E_L$. However, this is not the only component because of the bound charges induced on the sphere. Therefore, the total local field must be $E_L$ plus a electric field component due to the sphere.

In particular, for the spherical boundary $\omega_2$ the charge densities are $$\sigma_{f2}=\epsilon_0\tilde{\epsilon}_{rL}E_L-\epsilon_0\tilde{\epsilon}_{rS}E_S=0 \tag{101}$$

$$\sigma_{b2L}=-\epsilon_0(\tilde{\epsilon}_{rL}-1)E_L\cos\theta \tag{102}$$

$$\sigma_{b2S}=+\epsilon_0(\tilde{\epsilon}_{rS}-1)E_S\cos\theta \tag{103}$$

and therefore the total surface charge density on the sphere is $$\begin{aligned}\sigma_{t2} &= \sigma_{f2}+\sigma_{b2L}+\sigma_{b2S} \\ &= 0-\epsilon_0(\tilde{\epsilon}_{rL}-1)E_L\cos\theta+\epsilon_0(\tilde{\epsilon}_{rS}-1)E_S\cos\theta \\ &= -\epsilon_0(\tilde{\epsilon}_{rL}-1)E_L\cos\theta+\epsilon_0(\tilde{\epsilon}_{rS}-1)\left(\frac{\tilde{\epsilon}_{rL}}{\tilde{\epsilon}_{rS}}E_L\right)\cos\theta \\ &\text{[Using Eq. 101]} \\ &= \frac{(\tilde{\epsilon}_{rS}-\tilde{\epsilon}_{rL})\epsilon_0 E_L\cos\theta}{\tilde{\epsilon}_{rS}}.\end{aligned} \tag{104}$$

We can use the net charge distribution $\sigma_{t2}$ on the surface $\omega_2$ to obtain the total electric field at the origin of the nanosphere by integration from the source on the spherical surface to the observation point at the center of the sphere, i.e. in the $(-\hat{r})$ direction so that $$\begin{aligned}E_{\omega_2} &= \int_{\omega_2}\frac{\sigma_{t2}(-\hat{r})dA}{4\pi\epsilon_0 r^2} \\ &= \int_{\theta=0}^{\pi}\int_{\phi=0}^{2\pi}\frac{-\epsilon_0(\tilde{\epsilon}_{rS}-\tilde{\epsilon}_{rL})E_L\cos\theta}{4\pi\epsilon_0\tilde{\epsilon}_{rS}b^2}(\sin\phi\cos\theta\hat{x}+\cos\phi\cos\theta\hat{y}+\cos\theta\hat{z})b^2\sin\theta d\phi d\theta \\ &= \frac{-(\tilde{\epsilon}_{rS}-\tilde{\epsilon}_{rL})E_L\hat{z}}{2\tilde{\epsilon}_{rS}}\int_{\theta=0}^{\pi}\cos^2\theta\sin\theta d\theta\end{aligned} \tag{105}$$

$$\begin{aligned}&= \frac{-(\tilde{\epsilon}_{rS}-\tilde{\epsilon}_{rL})\hat{z}}{2\tilde{\epsilon}_{rS}}\int_{u=1}^{-1}u^2\frac{du}{(-1)} \\ &= -\frac{(\tilde{\epsilon}_{rS}-\tilde{\epsilon}_{rL})E_L\hat{z}}{3\tilde{\epsilon}_{rS}}.\end{aligned}$$

Because we have taken the sum to ensure that we have the total electric field at the center of the sphere of radius b, we can identify that $$E_{\omega_2}(\text{Sphere}) = \frac{-\frac{(\tilde{\epsilon}_{rS}-\tilde{\epsilon}_{rL})E_L\hat{z}}{3}}{\tilde{\epsilon}_{rS}} = \frac{E_{\omega_2}(\text{Vacuum})}{\tilde{\epsilon}_{rS}} \tag{106}$$

so that we can change perspective from the sphere to the background liquid by using the electric field intensity in the vacuum as follows $$E_{\omega_2}(\text{Liquid}) = \frac{E_{\omega_2}(\text{Vacuum})}{\tilde{\epsilon}_{rL}} = \frac{\tilde{\epsilon}_{rS}}{\tilde{\epsilon}_{rL}}E_{\omega_2}(\text{Sphere}). \tag{107}$$

Therefore, in the liquid we can finally write that relative to the local background medium of a liquid that $$E_{\omega_2}(\text{Liquid}) = -\frac{(\tilde{\epsilon}_{rS}-\tilde{\epsilon}_{rL})E_L\hat{z}}{3\tilde{\epsilon}_{rL}}. \tag{108}$$

Next, we consider the bound polarization charges within the nanoparticle. We will assume that the atoms are on a cubic grid this is only a convenient assumption that can in general be relaxed. That is, the result is approximately correct for other geometries, including amorphous media like glass, but the calculation can become very complex in these other cases. In particular, the total electric field intensity is given by summing over source charges $q_j$ at positions $r_j$ so that $$\begin{aligned}E_{\Omega_2} &= \frac{1}{4\pi\epsilon_0}\sum_{\text{All Charges}}\frac{q_j(r-r_j)}{|r-r_j|^3} \\ &= \frac{q}{4\pi\epsilon_0}\sum_{\text{Dipoles}}\left\{\frac{r_m-\frac{d}{2}}{\left|r_m-\frac{d}{2}\right|^3}-\frac{r_m+\frac{d}{2}}{\left|r_m+\frac{d}{2}\right|^3}\right\} \\ &\approx \sum_{\text{Dipoles}}\frac{3r_m(r_m\cdot p)-r_m^2 p}{4\pi\epsilon_0 r_m^5},\end{aligned} \tag{109}$$

where $p=qd$ and d is the displacement of the charges in the direction of the z-axis. Setting $p=p\hat{z}$ and $r_m=x_m\hat{x}+y_m\hat{y}+z_m\hat{z}$ we obtain $$E_{\Omega_2} = \frac{p}{4\pi\epsilon_0}\sum_{\text{Cubic Grid}}\frac{3x_m z_m\hat{x}+3y_m z_m\hat{y}+(3z_m^2-r_m^2)\hat{z}}{r_m^5} \tag{110}$$

But for a cubic lattice we are summing an antisymmetric function over a symmetric domain for the $\hat{x}$ and $\hat{y}$ components, which sums to zero for these two components. For the z-component we recognize that we can write $r_m^2 = x_m^2 + y_m^2 + z_m^2$ and $$\sum_m \frac{x_m^2}{x_m^2 + y_m^2 + z_m^2} = \sum_m \frac{y_m^2}{x_m^2 + y_m^2 + z_m^2} = \sum_m \frac{z_m^2}{x_m^2 + y_m^2 + z_m^2} \quad (111)$$

therefore for a cubic lattice and as a good approximation for many other practical materials we have that $$E_{\Omega_2} = 0. \quad (112)$$

From the above calculations we find that the Lorentz relation can be evaluated for the local electric field intensity with the spherical nanoparticle removed and the fields referenced to the liquid. The result in general is $$E_{loc} = E_L + E_{\Omega_2} - E_{\omega_2} \quad (113)$$
$$\approx E_L + 0 - E_{\omega_2}$$
$$= E_L \hat{z} + \frac{(\tilde{\epsilon}_{rS} - \tilde{\epsilon}_{rL}) E_L}{3\tilde{\epsilon}_{rL}} \hat{z}$$
$$= \left( \frac{\tilde{\epsilon}_{rS} + 2\tilde{\epsilon}_{rL}}{3\tilde{\epsilon}_{rL}} \right) E_L \hat{z}.$$

Therefore, with a concentration of u particles per unit volume and a polarizability of $\alpha_S$ then using Eqs. 108 and 113

$$p = \epsilon_0 \frac{(\tilde{\epsilon}_{rS} - \tilde{\epsilon}_{rL})}{\tilde{\epsilon}_{rL}} = u\alpha_S \left( \frac{\tilde{\epsilon}_{rS} + 2\tilde{\epsilon}_{rL}}{3\tilde{\epsilon}_{rL}} \right) E_L \quad (114)$$

so that $$\frac{u\alpha_S}{3\epsilon_0} = \frac{\tilde{\epsilon}_{rS} - \tilde{\epsilon}_{rL}}{\tilde{\epsilon}_{rS} + 2\tilde{\epsilon}_{rL}}. \quad (115)$$

If there is only one particle with a volume of $\mathcal{V} = 4/3\pi b^3$, where b is the particle radius, then the sphere's polarizability is $$\alpha_S = 4\pi b^3 \epsilon_0 \left( \frac{\tilde{\epsilon}_{rS} - \tilde{\epsilon}_{rL}}{\tilde{\epsilon}_{rS} + 2\tilde{\epsilon}_{rL}} \right). \quad (116)$$

The effective polarization density of a collection of nanoparticles with concentration per unit volume u is then $$p_S = \quad (117)$$
$$u\alpha_S \text{Re}[\tilde{\epsilon}_{rL}] E_L = 3\epsilon_0 \text{Re}[\tilde{\epsilon}_{rL}] \left( \frac{\tilde{\epsilon}_{rS} - \tilde{\epsilon}_{rL}}{\tilde{\epsilon}_{rS} + 2\tilde{\epsilon}_{rL}} \right) E_L = 3\text{Re}[\tilde{\epsilon}_L] \left( \frac{\tilde{\epsilon}_S - \tilde{\epsilon}_L}{\tilde{\epsilon}_S + 2\tilde{\epsilon}_L} \right) E_L$$

so that $$\tilde{\epsilon} = \tilde{\epsilon}_R + i\tilde{\epsilon}_I = 3\epsilon_L \left( \frac{\tilde{\epsilon}_S - \tilde{\epsilon}_L}{\tilde{\epsilon}_S + 2\tilde{\epsilon}_L} \right). \quad (118)$$

Note the real part of the $\tilde{\epsilon}_{rL}$ is used to ensure consistency with the classical expression for electric dipole potential as a function of radius and angle—e.g. "*Classical Electrodynamics 2nd Ed.*" by J. D. Jackson.

Note that the above derivation is only exemplary and additional layers may be added to the dielectric nanoparticle to provide other functions for the complex dielectric constant that are consistent with multilayer spherical geometry.

For example, to ensure a stable colloid a surfactant may be added as a coating to the nanoparticle's outer layer. This would require that another layer of total bound charges at the boundary between the inner dielectric and the outer coating layer needing to be included into the analysis and a new expression for E.

Additionally, note that from Eq. 56 and assuming for convenience the imaginary part of the dielectric constant equal to zero we have $$\tilde{\epsilon}_S = \epsilon_S - i\frac{\sigma_S}{\omega} \quad (119)$$

$$\tilde{\epsilon}_L = \epsilon_L - i\frac{\sigma_L}{\omega} \quad (120)$$

and we may place this in Debye relaxation form as follows $$K = \frac{\tilde{\epsilon}_S - \tilde{\epsilon}_L}{\tilde{\epsilon}_S + 2\tilde{\epsilon}_L} \quad (121)$$

$$= \frac{\left(\epsilon_S - i\frac{\sigma_S}{\omega}\right) - \left(\epsilon_L - i\frac{\sigma_L}{\omega}\right)}{\left(\epsilon_S - i\frac{\sigma_S}{\omega}\right) + 2\left(\epsilon_L - i\frac{\sigma_L}{\omega}\right)} \quad (122)$$

$$= \frac{\omega(\epsilon_S - \epsilon_L) - i(\sigma_S - \sigma_L)}{\omega(\epsilon_S + 2\epsilon_L) - i(\sigma_S + 2\sigma_L)} \quad (123)$$

$$= \frac{\omega\left(\frac{\epsilon_S - \epsilon_L}{\epsilon_S + 2\epsilon_L}\right)\left(\frac{\epsilon_S + 2\epsilon_L}{\sigma_S + 2\sigma_L}\right) - i\left(\frac{\sigma_S - \sigma_L}{\sigma_S + 2\sigma_L}\right)}{\omega\left(\frac{\epsilon_S + 2\epsilon_L}{\sigma_S + 2\sigma_L}\right) - i} \quad (124)$$

$$= \frac{i\omega K_\infty \tau_{MW} + K_0}{i\omega \tau_{MW} + 1} \quad (125)$$

$$= K_\infty + \frac{K_0 - K_\infty}{\omega \tau_{MW} i + 1} \quad (126)$$

$$= K_R + iK_I \quad (127)$$

where we used the following definitions $$K_0 = \frac{\sigma_S - \sigma_L}{\sigma_S + 2\sigma_L} \quad (128)$$

$$K_\infty = \frac{\epsilon_S - \epsilon_L}{\epsilon_S + 2\epsilon_L} \quad (129)$$

$$\tau_{MW} = \frac{\epsilon_S + 2\epsilon_L}{\sigma_S + 2\sigma_L}, \quad (130)$$

and where $\tau_{MW}$ is the Maxwell-Wigner time constant. Therefore, after a little algebra the real and imaginary parts of K are $$K_R = K_\infty + \left[\frac{K_0 - K_\infty}{1 + (\omega \tau_{MW})^2}\right] \quad (131)$$

$$K_I = (K_\infty - K_0)\left[\frac{\omega \tau_{MW}}{1 + (\omega \tau_{MW})^2}\right] \quad (132)$$

which is the complex Clausius-Mossotti (CM) factor for the solid sphere embedded in a dielectric liquid. The zero crossing frequency occurs when $\omega=\omega_0$ so that $K_R(\omega_0)=0$. Also, the peak frequency occurs when $\omega=\omega_p$ so that $K_I'(\omega_p)=0$. This results in $$\omega_p = \omega_{MW} = \frac{1}{\tau_{MW}} \quad (133)$$

$$\omega_0 = \pm i\omega_{MW}\sqrt{\frac{K_0}{K_\infty}} \quad (134)$$

Therefore, if we carefully select the material properties of the particles and liquid medium so that $K_0+K_\infty=0$ then $\omega_0=\omega_p=\omega_{MW}=1/\tau_{MW}$. This may not be the optimum configuration for controlling a particle distribution for a particular application.

Furthermore, note that $K_R$ and $K_I$ can take on both positive and negative values such that $-\frac{1}{2} \le K_0 \le +1$, $-\frac{1}{2} \le K_\infty \le +1$, $-\frac{1}{2} \le K_R \le +1$ and $0 \le |K_I| \le \frac{3}{4}$. As we shall see this allows forces and drift velocities on nanoparticles to take on both positive or negative values depending on the frequency $\omega$ of the harmonic excitation of the voltages on electrodes. In the case of $\epsilon_S > \epsilon_L$ we have that $K_\infty > 0$. Therefore, to make $K_0 < 0$ we would choose the liquid, which may be a mixture of several chemicals, to have $\sigma_L > \sigma_S$. This will provide a means to focus, defocus and collimate light using DEPS optics as needed for a particular application simply by changing the frequency and voltage amplitude on the electrodes, as is demonstrated later in specific embodiments. FIGS. 4A-F show log-linear plots of the real and imaginary parts of the CM factor over frequency for specific values of $K_0$ and $K_\infty$.

Also, as an aside note that Eq. 121 is a modified bilinear transformation on the complex plane. Taking $$z = \hat{\epsilon}_S/\hat{\epsilon}_L \quad (135)$$

we can then rewrite Eq. 121 as $$z = \frac{1 + 2K}{1 - K}. \quad (136)$$

On setting $z=z_R+iz_I$ and $K=K_R-iK_I$ we can with some algebra obtain equations representing the CM factor on the complex plan parameterized by the real and imaginary parts of z. The curve equations are $$[K_R - 1]^2 + \left[K_I - \frac{3}{2z_I}\right]^2 = \frac{9}{4z_I^2} \quad (137)$$

$$\left[K_R - \frac{1 + 2z_R}{2(2 + z_R)}\right]^2 + K_I^2 = \frac{9}{4(z_R + 2)^2} \quad (138)$$

which are orthonormal circles forming a modified Smith Chart that relates the dielectric constants of the liquid and the nanosphere to the CM factor.

Also, from Eq. 118 and Eq. 127 we can obtain the important results $$\hat{\epsilon}_R = 3\epsilon_L K_R \quad (139)$$

$$\hat{\epsilon}_I = 3\epsilon_L K_I, \quad (140)$$

where $K_R$ and $K_I$ are a function of the constitutive parameters and the excitation frequency.

Finally, it should be noted that the conductivity of the particle $\sigma_S$ is not always that of the bulk material making up the particle. In particular, as the diameter 2b of each particle decreases the impact of the surface electrical properties of the particle become more and more important. It can be shown that the conductivity is then given by $$\sigma_S = \sigma_B + \frac{k_S}{2b}, \quad (141)$$

where $\sigma_B$ is the bulk conductivity and $k_S$ is the surface conductance of the particle and is typically about 1-5 nS and may be dominated by the mobility of counterions in the surrounding electrical double-layer. The impact of counterions, which are associated with electric double layers, in increasing the effective polarizability of nano particles was first observed by Washizu et al., see M. Washizu, S. Suzuki, O. Kurosawa, T. Nishizaka, and T. Shinohara, IEEE Trans. Ind. Appl., 30, 835 (1994). Under certain conditions this can cause the magnitude (and even the sign) of the Clausius-Mossotti factors $K_R$ and $K_I$ to change from that anticipated from the bulk conductivity.

Time-Averaged Forces by Dielectrophoresis

From the force density Eq. 88, volume 89, and Eqs. 139-140 we can obtain the time-average force on a particle as $F_{dep} = \mathcal{V} \langle \mathcal{F}_{dep} \rangle$ whereby $$F_{dep}(r, \omega) = 2\pi b^3 \epsilon_L \left\{\nabla\left[\frac{K_R}{2}(E_R \cdot E_R + E_I \cdot E_I)\right] + \nabla \times (K_I E_I \times E_R)\right\}. \quad (142)$$

In order to save some space it is convenient to write the above equation as $$F_{dep} = \nabla[\gamma_1 E \cdot E] + \nabla \times (\gamma_2 E_I \times E_R) \quad (143)$$

$$\gamma_1 = \pi b^3 K_R \epsilon_R \quad (144)$$

$$\gamma_2 = 2\pi b^3 K_I \epsilon_I. \quad (145)$$

where $K_R$ and $K_I$ are now to be thought of in general as a function of space, time, constitutive parameters, and excitation frequency.

Moreover, a particle that is subject to a DEP-based ponderomotive force will feel the effects of its viscous fluid environment. In particular, Newton's second law at steady-state conditions becomes $$m_s \frac{d^2 r}{dt^2} = F_{dep} - F_{drag} \qquad (146)$$
$$= F_{dep} - 6\pi \eta b \frac{dr}{dt}$$
$$= 0$$

where, the well known Stokes Law for spherical particle drag in a fluid was used to develop the second term and η is the dynamic viscosity of the fluid surrounding the nanoparticle. Therefore, the drift velocity is given by solving for dr/dt so that $$v_{dep}(r) = \gamma F_{dep} \qquad (147)$$

$$\gamma = \frac{1}{6\pi \eta b}, \qquad (148)$$

which represents the forced motion of a particle due to a DEP process.

Next, let's consider the thermal motion of a particle under the influence of a DEP process. In particular, using Eq. 20 the average force can be written in terms of a conservative potential energy tensor $-U$ so that the net flux of particles through the liquid under equilibrium and steady-state conditions is given by the drift current $$j_{drift}(r) = u(r) v_{drift}(r) = -u(r) \gamma \nabla \cdot U(r) \qquad (149)$$

where u(r) is the particle concentration and the diffusion of the particles due to thermal agitation and Brownian motion is given by $$j_{diff}(r) = -D(r) \nabla \cdot u(r), \qquad (150)$$

where $u(r) = I u(r)$, u is the particle concentration, i.e. the number particles per unit volume, and D is the to-be-determined diffusion coefficient of our analysis. Under equilibrium conditions the net vector flux of particles is zero so that $j_{drift} + j_{diff} = 0$. Therefore, $$j_{drift} + j_{diff} = -u(r) \gamma \nabla \cdot U(r) - D(r) \nabla \cdot u(r) = 0. \qquad (151)$$

Observe that by the definition of the gradient if W is the energy then $\nabla W \cdot dl = dW$ and $\nabla u \cdot dl = du$, where dl is the length element in the direction of the shortest distance between iso-value surfaces so that the gradient is a maximum directional derivative. Therefore, $$dl = \frac{dW}{\nabla W \cdot \hat{l}} = \frac{du}{\nabla u \cdot \hat{l}} \qquad (152)$$

and $$\nabla u \cdot \hat{l} = \frac{du}{dW} \nabla W \cdot \hat{l} \qquad (153)$$

so that $$(\nabla \cdot (uI)) \cdot \hat{l} = \frac{du}{dW} (\nabla \cdot (WI)) \cdot \hat{l} \qquad (154)$$

or on introducing additional terms that strategically have an inner product with l that is zero we find that $$(\nabla \cdot u) \cdot \hat{l} = \frac{du}{dW} \left[ \nabla \cdot W + \underbrace{\nabla \cdot (\nabla \times F)}_{=0} + \nabla \cdot \underbrace{(GH - HG)}_{V} \right] \cdot \hat{l} \qquad (155)$$

where the second term on the right sets the energy level to an arbitrary value and the third term has the property that the commutator of the outer products (GH–HG) is always a skew-symmetric matrix whereby Eq. 32 provides that $\nabla \cdot (GH-HG) = \nabla \times (G \times H)$. For this to occur we can imagine that the complex electric field intensity E is broken into an in-phase and a quadrature component that are directed along (for example) the x- and y-axis respectively and have no z-directed variations. In this way $$[\nabla \cdot (GH - HG)] \cdot l = [\nabla \cdot (E_R E_I - E_I E_R)] \cdot l \qquad (156)$$
$$= [\nabla \times (E_R \times E_I)] \cdot l$$
$$= \begin{bmatrix} \hat{x} & \hat{y} & \hat{z} \\ \partial_x & \partial_y & \partial_z \\ \frac{(E_R \times E_I)_x}{Q_x} & \frac{(E_R \times E_I)_y}{Q_y} & \frac{(E_R \times E_I)_z}{Q_z} \end{bmatrix} \cdot l$$
$$= [\hat{x}(\partial_y Q_z - \partial_z Q_y) - \hat{y}(\partial_x Q_z - \partial_z Q_x) + \hat{z}(\partial_x Q_y - \partial_y Q_x)] \cdot l$$
$$= [\hat{x}(\partial_y (0) - (0) Q_y) - \hat{y}(\partial_x (0) - (0) Q_x) +$$
$$\hat{z}(\partial_x Q_y - \partial_y Q_x)] \cdot l$$
$$= [\hat{z}(\partial_x Q_y - \partial_y Q_x)] \cdot l$$
$$\propto \hat{z} \cdot l$$
$$\equiv 0$$

where for example we might take $$E = E_R + i E_I \qquad (157)$$
$$= g(x, y) \hat{x} + i h(x, y) \hat{y},$$

where functions g and h are real valued functions of the coordinates x and y only. Also, note that $E_R$ and $E_I$ are really not restricted to just the xy-plane. For example in cylindrical coordinates we might take a tangent plane to a unit cylinder at each polar azimuth angle as the plane wherein the in-phase and quadrature components of the electric field intensity are defined. This will have important consequences for beam steering from arbitrary formed hulls, e.g. the hull of an aircraft having complex form for proper aerodynamic properties.

Consequently, we can write the equations $$\nabla \cdot u = \frac{du}{dW} \nabla \cdot \underbrace{[W + V]}_{U} \qquad (158)$$

and $$\nabla \cdot u = \frac{du}{dW} \nabla \cdot U. \qquad (159)$$

However, in statistical mechanics the Maxwell Boltzmann statistics are used to describe the average distribution of non-interacting material particles over allowed energy states in thermal equilibrium. This distribution is applicable when the temperature is high enough or the particle density is low enough to render quantum effects negligible. Using this observation we write $$u(r) = A e^{-\frac{W(r)}{k_B T}} \tag{160}$$

where A is a constant related to the total number of particles in a unit volume and $k_B$ is Boltzmann's constant. Consequently, $$\frac{du}{dW} = -\frac{u}{k_B T} \tag{161}$$

Therefore, $$j_{drift} + j_{diff} = 0 \tag{162}$$

$$-u\gamma \nabla \cdot U - D \nabla \cdot u = 0 \tag{163}$$

$$-\left[u\gamma + D\left(\frac{du}{dW}\right)\right] \nabla \cdot U = 0 \tag{164}$$

and $$D = -\gamma \frac{u}{\left(\frac{du}{dW}\right)} = \gamma k_B T \tag{165}$$

hence $$D = \gamma k_B T, \tag{166}$$

which is an extension of the well known Einstein Diffusion Coefficient for the case where the Maxwell stress tensor has non-zero off-diagonal elements. Note that in general the diffusion coefficient can be a function of space, time and concentration.

The quasi-electrostatic approximation for the time averaged force associated with DEP assumes that the amplitude of the electric field intensity E is invariant in space. This can be relaxed if time variations are slow compared to the period of the harmonic excitation $\tau = 2\pi/\omega$. Therefore, if $t \gg \tau$ then approximately $E = E(r, t) = E_R(r, t) + iE_I(r, t)$ so that the DEP particle flux is $$j_{dep}(r, t) = u(r, t) v_{dep}(r, t) \tag{167}$$

$$= u(r, t)\gamma\{\nabla(\gamma_1 E \cdot E) + \nabla \times (\gamma_2 E_I \times E_R)\}.$$

By way of comparison, for the diffusion process the particle flux is $$j_{diff}(r,t) = -D\nabla u(r,t), \tag{168}$$

for advection in general $$j_{adv}(r,t) = u(r) v(r) \tag{169}$$

and for electrophoresis (EP) for positive/negative charged particles $$j_{ep}(r,t) = \pm u(r,t) \mu(r,t) E. \tag{170}$$

The total particle flux is then $$j(r, t) = \sum_{m=1}^{M} j_m(r, t) = j_{dep}(r, t) + j_{dif}(r, t) + \ldots \tag{171}$$

and by continuity we can write $$\frac{\partial u(r, t)}{\partial t} = -\nabla \cdot j(r, t) + Q(r, t) \tag{172}$$

where Q(r, t) is a volume source in units of particle per unit volume.

For the special case where only DEP and diffusion are the dominant phenomena, i.e. gravity is ignored when surfactant coatings are used on nanoparticles to maintain a stable and separated colloid in a gravity field. We then obtain a total particle flux under quasi-electrostatic conditions of $$j(r,t) = -D\nabla u(r,t) + u(r,t)\gamma F_{dep}(r,t) \tag{173}$$

where the space and time dependence of $F_{dep}(r, t)$ is introduced to account for slowly changing electric fields. In a particle-source-free region of space the continuity equation must hold whereby $$\frac{\partial u}{\partial t} + \nabla \cdot j = 0 \tag{174}$$

and we obtain the equation $$\frac{\partial u}{\partial t} - D\nabla^2 u = -\nabla \cdot [u v_{dep}] \tag{175}$$

$$v_{dep} = v_{dep}(r, t) = \gamma F_{dep}(r, t) \tag{176}$$

$$u = u(r, t) \tag{177}$$

which is a Fokker-Planck type forced equation that is subject to initial, Neumann, and possibly periodic boundary conditions.

In particular, note that the solid boundaries of a control volume are subject to zero particle flux, normal to the surfaces, from the combined process of diffusion and electric-field-gradient forced advection. Therefore, the sum of the diffusive and advective particle flux is zero whereby $j_{tot} \cdot \hat{m} = 0$, where $\hat{m}$ is the unit normal vector $$[-D\nabla u(r_S,t) + v_{dep}(r_S,t) u(r_S,t)] \cdot \hat{m} = 0, \tag{178}$$

where $r_S$ represents points along the solid boundary $\partial \Omega_S$ of the control volume $\Omega$.

Moreover, when there are periodic boundary conditions that are enforced on the concentration u(r, t). e.g. because of a periodic potential inducing a periodic time-average electric field, then we must have that flows of particles leaving a periodic boundary surface $\partial \Omega_L$ are matched by flows of particles entering the periodic boundary surface $\partial \Omega_E$. Then using subscripts E for particle "entering" and L for particles "leaving" we have for periodic regions typically that unit normals pointing out of the boundary satisfy $\hat{m}_L = -\hat{m}_E = \hat{m}$ and that $$[-D\nabla u(r_L,t) + v_{dep}(r_L,t) u(r_L,t)] \cdot \hat{m}_L = [-D\nabla u(r_E,t) + v_{dep}(r_E,t) u(r_E,t)] \cdot (-\hat{m}_L). \tag{179}$$

Next, observe that the volume integral of u must be a conserved quantity because the number of particles in the control volume is constant. Therefore, the time derivative of a constant (i.e. the total number of particles in a periodic unit cell) is zero.

As a check to confirm the model is compatible with this insight we can take the volume integral of Eq. 175 over the unit cell and use Gauss's integral theorem to obtain $$\frac{d}{dt}\int_\Omega u(r,t)d^3r = \int_\Omega \frac{\partial u(r,t)}{\partial t}d^3r$$

$$= \int_\Omega [D\nabla^2 u(r,t) - \nabla \cdot [v_{dep}(r,t)u(r,t)]]d^3r$$

$$= \int_{\partial\Omega} [D\nabla u(r,t) - v_{dep}(r,t)u(r,t)] \cdot \hat{m} d^2r$$

$$= \underbrace{\int_{\partial\Omega_S} [D\nabla u(r,t) - v_{dep}(r,t)u(r,t)] \cdot \hat{m} d^2r}_{\text{Solid Boundaries: by Eq. 178 is identically zero.}} + \underbrace{\int_{(\partial\Omega_E + \partial\Omega_L)} [D\nabla u(r,t) - v_{dep}(r,t)u(r,t)] \cdot \hat{m} d^2r}_{\text{Periodic Boundaries: by Eq. 179 is identically zero.}}$$

$$= 0 \qquad (180)$$

This confirms that the boundary conditions and mathematical model are consistent with the intuitive sense of particle conservation and it means that the volume integral of u(r, t) over the control volume (and a unit cell in the case of a periodic system) is a conserved quantity so that $$\int_\Omega u(r;0)d^3r = \int_\Omega u(r,t)d^3r. \qquad (181)$$

This provides a means to check a numerical calculation because over one (or more) complete units cells of the calculation we must find that $$C(t) = \frac{\int_\Omega u(x,y,t)d^3r}{\int_\Omega u(x,y,0)d^3r} \equiv 1 \qquad (182)$$

and any substantial deviations from this are an indication of problems with the numerical calculations. Thus, the above Eq. 182 is a necessary, but not a sufficient condition to show the validity of a calculation and may be used as a check of the fidelity of a numerical calculation.

The above analysis also shows that particle conservation, flow restrictions through the solid walls of the control volume, and periodic conditions insure that the particle concentration u should never be negative, i.e. u≥0 for all time and space.

Finally, the reader should note that strictly speaking $E_R$ and $E_I$ are not functions of time, however, because we are using a quasi electrostatic approximation they may vary slowly relative to the harmonic excitation. Therefore, the reader should be aware that in fact the following is valid:

$$\mathcal{E}(r,t) = \underbrace{E_R(r,t)}_{Slow}\overbrace{\cos(\omega t)}^{Fast} + \underbrace{E_I(r,t)}_{Slow}\overbrace{\sin(\omega t)}^{Fast} \qquad (183)$$

by which $E_R$ and $E_I$ are now slow functions of time as well as functions of space.

An Alternative Formulation of Dielectrophoresis

For the avoidance of legal doubt please note that there is an alternative formulation of DEP-based ponderomotive forces that is formulated directly in terms of the excitation electric field phases so that even in the case of no gradients in the electric field magnitude there may still be a DEP process if there are gradients in the electric field phase. This alternative formulation is also included in this disclosure.

Recall from Eq. 142 that the time averaged DEP-based ponderomotive force on a particle is $$\langle \mathcal{F}_{DEP} \rangle = 2\pi b^3 \epsilon_L \left\{ \frac{K_R}{2} \nabla |E(r)|^2 + K_I \nabla \times (E_I \times E_R) \right\} \qquad (184)$$

where $$|E(r)|^2 = E_R(r) \cdot E_R(r) + E_I(r) \cdot E_I(r) \qquad (185)$$

and when Eq. 73 is the electric field as expressed in phasor form. The electric field was written as $$\varepsilon(r,t) = E_R(r)\cos(\omega t) + E_I(r)\sin(\omega t), \qquad (186)$$

to develop Eq. 184. However, we could have written the electric field equivalently as $$\varepsilon(r,t) = \langle \varepsilon_x(r,t), \varepsilon_y(r,t), \varepsilon_z(r,t) \rangle \qquad (187)$$

where $$\varepsilon_x(r,t) = E_{x,0}(r)\cos[\omega t + \varphi_x(r)] \qquad (188)$$

$$\varepsilon_y(r,t) = E_{y,0}(r)\cos[\omega t + \varphi_y(r)] \qquad (189)$$

$$\varepsilon_z(r,t) = E_{z,0}(r)\cos[\omega t + \varphi_z(r)], \qquad (190)$$

where $\varphi_x(r)$, $\varphi_y(r)$, $\varphi_z(r)$ are the phase variation functions in the coordinate directions.

Next, we make the observation that an electrically neutral particle that is placed in an electric field will experience charge separation, i.e. it becomes polarized. Part of the particle at position r substantially acquires a net charge −q and part of the particle at position (r+d) acquires a net charge +q. Therefore, the total force on the particle is given by a Taylor expansion in three dimension so that $$\mathcal{F}(r,t) = q\mathcal{E}(r+d,t) + (-q)\mathcal{E}(r,t) \qquad (191)$$

$$= q\{\mathcal{E}(r,t) + d \cdot \nabla \mathcal{E}(r,t) + \ldots\} + (-q)\mathcal{E}(r,t)$$

$$\approx q d \cdot \nabla \mathcal{E}(r, t)$$

$$= \mathcal{P} \cdot \nabla \mathcal{E}(r, t),$$

where $\mathcal{P}$ is the polarization of the particle. Clearly, the polarization of the particle cannot happen instantaneously so that there must be a phase lag in the polarization from that of the driving electric field. This phase lag is accounted for by means of a complex-valued function K, which is called the Clausius-Mossotti factor.

The polarization field is $$\mathcal{P}(r,t) = \langle \mathcal{P}_x(r,t), \mathcal{P}_y(r,t), \mathcal{P}_z(r,t) \rangle \quad (192)$$

Therefore, assuming that the particle is spherical and of radius b, then the induced polarization charge is jointly proportional to the volume $4\pi b^3/3$ and the quantity $(3|K|\epsilon_L)$, where $\epsilon_L$ is the dielectric constant of the liquid medium surrounding the particle and the number 3 comes from Eqs. 139-140. Therefore, on including equal phase lags $\varphi_p$ in each coordinate direction we have that $$\mathcal{P}_x(r,t) = \left(\frac{4}{3}\pi b^3\right)(3\epsilon_L|K|)E_{x,0}(r)\cos[\omega t + \varphi_x(r) - \varphi_p] \quad (193)$$

$$\mathcal{P}_y(r,t) = \left(\frac{4}{3}\pi b^3\right)(3\epsilon_L|K|)E_{y,0}(r)\cos[\omega t + \varphi_x(r) - \varphi_p] \quad (194)$$

$$\mathcal{P}_z(r,t) = \left(\frac{4}{3}\pi b^3\right)(3\epsilon_L|K|)E_{z,0}(r)\cos[\omega t + \varphi_x(r) - \varphi_p]. \quad (195)$$

where the polarization phase lag is $\varphi_p$. Whereby, on expanding Eq. 188 and Eq. 193 by trigonometric expansion so that, for example $$\mathcal{P}_x(r,t) = 4\pi b^3 \epsilon_L E_{x,0}(r)\{(|K|\cos \varphi_p)\cos(\omega t + \varphi_x(r)) + (|K|\sin \varphi_p)\sin(\omega t + \varphi_x(r))\} \quad (196)$$

then, $$\mathcal{P}_x(r,t) = 4\pi b^3 \epsilon_L E_{x,0}(r)\{K_R \cos[\omega t + \varphi_x(r)] + K_I \sin[\omega t + \varphi_x(r)]\}. \quad (197)$$

Using this relation, and its equivalent y and z component equivalents, it becomes possible to evaluate Eq. 191. The time average of the first term of this evaluation is $$\left\langle \mathcal{P}_x(r,t) \frac{\partial \mathcal{E}_x(r,t)}{\partial x} \right\rangle = \quad (198)$$

$$4\pi b^3 \epsilon_L \left[ \frac{K_R}{2} E_{x,0}(r) \frac{\partial E_{x,0}(r)}{\partial x} + \frac{K_I}{2} E_{x,0}^2(r) \frac{\partial \varphi_x(r)}{\partial x} \right]$$

whereby on including the y and z components we obtain $$\langle \mathcal{F}_{DEP} \rangle = 2\pi b^3 \epsilon_L \left[ \frac{K_R}{2} \nabla |E|^2 + K_I(E_{x,0}^2 \nabla \varphi_x + E_{y,0}^2 \nabla \varphi_y + E_{z,0}^2 \nabla \varphi_z) \right] \quad (199)$$

where $E_{x,0} = E_{x,0}(r)$, $\varphi_x = \varphi_x(r)$, etc. and $$|E(r)|^2 = E_{x,0}^2(r) + E_{y,0}^2(r) + E_{z,0}^2(r). \quad (200)$$

Comparing Eq. 184 and Eq. 199 we can see the same form except that the second term in this alternative formulation of the DEP process does not necessarily need to have any spatial variations in the magnitude of the electric field. Instead, all that is needed are spatial variations in the electric field phase, which can also cause a DEP process. This demonstration explicitly extends the concept of a DEP process to also include phase gradients as well as magnitude gradients.

Noise & Impulse Based Low-Voltage Dielectrophoresis

This section extends the results of the previous section to show how we can exchange a large voltage amplitude of a small bandwidth signal with a small voltage amplitude of a large bandwidth signal. This allows will allow us to use at least one of a digitally derived voltage noise signal and voltage impulses in time.

To begin let's define the Fourier transform pair relating a time signal x(t) and its frequency representation as $$X(\omega) = \frac{1}{2\pi} \int_{-\infty}^{+\infty} x(t) e^{-i\omega t} dt \quad (201)$$

$$x(t) = \int_{-\infty}^{+\infty} X(\omega) e^{+i\omega t} d\omega, \quad (202)$$

where we have used a slightly unusual convention of placing the factor of $1/(2\pi)$ on the forward transform. This will help to keep formulas consistent with our phasor conventions for electromagnetism.

Generalizing Eqs. 188-190 we obtain $$\varepsilon_{c,m}(r,t) = \int_{-\infty}^{+\infty} E_m(r,\omega) e^{i\varphi_m(r,\omega)} e^{i\omega t} d\omega, \quad (203)$$

where the c in the subscript of $\varepsilon_{c,m}$ reminds us that this is a complex representation in the time domain, which requires taking the real part to obtain the actual function. The subscript $m \in \{1, 2, 3\}$ corresponds to the x, y, and z coordinate axis. Similarly, we can generalize Eqs. 193-195 as $$\mathcal{P}_{c,m}(r,t) = 4\pi b^3 \epsilon_L \int_{-\infty}^{+\infty} K(\omega) E_m(r,\omega) e^{i\varphi_m(r,\omega)} e^{i\omega t} d\omega. \quad (204)$$

Notice that if $E_r(r, \omega) = E_{0,m}(r)\delta(\omega - \omega_0)$ then we recover the original equations Eqs. 188-190 and Eqs. 193-195 evaluated at $\omega = \omega_0$ after taking the real part of the complex form. For example, Eqs. 193-195 are reproduced as follows $$\mathcal{P}_{c,m}(r, t) = 4\pi b^3 \epsilon_L \int_{-\infty}^{+\infty} K(\omega) E_m(r, \omega) e^{i\varphi_m(r,\omega)} e^{i\omega t} d\omega \quad (205)$$

$$= 4\pi b^3 \epsilon_L \int_{-\infty}^{+\infty} K(\omega) E_{0,m}(r) \delta(\omega - \omega_0) e^{i\varphi_m(r,\omega)} e^{i\omega t} d\omega$$

$$= 4\pi b^3 \epsilon_L K(\omega_0) E_{0,m}(r) e^{i[\omega_0 t + \varphi_m(r,\omega_0)]}$$

$$= 4\pi b^3 \epsilon_L |K(\omega_0)| E_{0,m}(r) e^{i[\omega_0 t + \varphi_m(r,\omega_0) - \varphi_p]}$$

$$\xrightarrow{Re} 4\pi b^3 \epsilon_L |K(\omega_0)| E_{0,m}(r) \cos[\omega_0 t + \varphi_m(r, \omega_0) - \varphi_p].$$

Starting with Eq. 191 we now calculate the time average of the complex valued force on a component by component basis. For example, if angle brackets operate on its contents to take the time average then Eq. 191 becomes $$F_c(r) = \left\langle \sum_{m=1}^{3} \sum_{q=1}^{3} \mathcal{P}_{c,m}(r, t) \frac{\partial \mathcal{E}_{c,q}(r, t)}{\partial x_m} \right\rangle \quad (206)$$

For the sake of simplicity let's work on just one general term and sum later. Therefore, $$F_{c,q,m}(r) = \left\langle \mathcal{P}_{c,m}(r,t) \frac{\partial \mathcal{E}_{c,q}(r,t)}{\partial x_m} \right\rangle$$

$$= \left\langle 4\pi b^3 \epsilon_L \int_{-\infty}^{+\infty} K(\alpha) E_m(r,\alpha) e^{i\varphi_m(r,\alpha)} e^{i\alpha t} d\alpha \frac{\partial}{\partial x_q} \int_{infty}^{+\infty} E_m(r,\beta) e^{i\varphi_m(r,\beta)} e^{i\beta t} d\beta \right\rangle$$

$$= 4\pi b^3 \epsilon_L \int_{-\infty}^{+\infty} \int_{-\infty}^{+\infty} \left\{ K(\alpha) E_m(r,\alpha) \left( \frac{\partial E_m(r,\beta)}{\partial x_q} \right) + iK(\alpha) E_m(r,\alpha) E_m(r,\beta) \frac{\partial \varphi_m(r,\beta)}{\partial x_q} \right\} \langle e^{i[(\alpha+\beta)t+\varphi(r,\alpha)+\varphi(r,\beta)]} \rangle d\alpha d\beta$$

(207)

To evaluate the above expression note that time average is $$\langle e^{i[(\alpha+\beta)t+\varphi(r,\alpha)+\varphi(r,\beta)]} \rangle = \frac{\hat{\delta}(\alpha+\beta)}{2} e^{i[\varphi_m(r,\alpha)+\varphi_m(r,\beta)]}$$

(208)

where $\hat{\delta}(\cdot)$ is the Kronecker $\delta$-function—i.e. not the Dirac $\delta$-function. To see that this is true note first that the time average of a sinusoidal signal is always over a single period of the sinusoidal signal, which is of course dependent of its frequency. Thus, for any pure sinusoidal signal the time average is zero.

That said, the special case of interest is when the sinusoidal signal has zero frequency. This occurs in the above average when $\alpha = -\beta$. In this special case we have the time average of a complex constant $\exp i[\varphi_m(r,\alpha) + \varphi_m(r,\beta)]$, which is just the constant itself.

Note that the factor of ½ in Eq. 208 arises due to the time averaging process. The easiest way to see this is to compare the time-averaging process of multiplied trigonometric functions compared to multiplied complex exponential functions. In particular, $$\langle \cos(\alpha t)\cos(\beta t) \rangle =$$

(209)

$$\left\langle \frac{\cos[(\alpha-\beta)t] + \cos[(\alpha+\beta)t]}{2} \right\rangle = \frac{\hat{\delta}(\alpha-\beta) + \hat{\delta}(\alpha+\beta)}{2}$$

therefore, when working with the complex form of the equation the averaging operator $\langle \cdot \rangle$ must include a factor of ½ so that $$\langle e^{i\alpha t} e^{i\beta t} \rangle = \frac{\hat{\delta}(\alpha+\beta)}{2}.$$

(210)

Moreover, Eq. 208 is subject to constraints. In particular, if the phase is due to a time delay then phase is an odd function. To see this note consider $\cos[\omega(t-t_0)]$, where to is a pure time delay. Then it is clear that the phase is $\varphi = -\omega t_0$, which is an odd function of frequency $\omega$. This intuitive sense of how the phase is distributed in frequency can be made more formal and we can also get the behavior of the amplitude as well.

In particular, let's consider a causal real valued signal, by which we will mean that the real signal exists after it is turned on, but never before it is turned on. While the reader may consider this to be the epitome of common sense, it also represents a kind of symmetry that we can exploit. In particular, we can write the causal real valued signal that is turned on at t=0 as $$f_{cas}(t) = f(t) U(t),$$

(211)

where $U(t)$ is the unit step function $$U(t) = \begin{cases} 0 & t < 0 \\ 1 & t \geq 0 \end{cases}.$$

(212)

Then we can decompose the causal function into even and odd functions as follows $$f_{cas}(t) = \underbrace{\frac{f(t)U(t) + f(-t)U(-t)}{2}}_{Even} + \underbrace{\frac{f(t)U(t) - f(-t)U(-t)}{2}}_{Odd}$$

(213)

Let's define $$g(t) = \frac{f(t)U(t) + f(-t)U(-t)}{2}$$

(214)

$$h(t) = \frac{f(t)U(t) - f(-t)U(-t)}{2}$$

(215)

Then the Fourier transform of the casual signal is $$F_{cas}(\omega) = \underbrace{\frac{1}{2\pi} \int_{-\infty}^{+\infty} g(t) e^{-i\omega t} dt}_{G(\omega)} + \underbrace{\frac{1}{2\pi} \int_{-\infty}^{+\infty} h(t) e^{-i\omega t} dt}_{H(\omega)}$$

(216)

from which we see immediately that $G(-\omega) = G(\omega)$ so that $G(\omega)$ is even and that $H(-\omega) = -H(\omega)$ so that $H(\omega)$ is odd. Moreover, $G(\omega)$ is a purely real function and $H(\omega)$ is a purely imaginary number. For example, $$G(\omega) = \frac{1}{2\pi} \int_{-\infty}^{+\infty} g(t) e^{-i\omega t} dt$$

(217)

$$= \frac{1}{2\pi} \int_{-\infty}^{+\infty} \left[ \frac{f(t)U(t) + f(-t)U(-t)}{2} \right] e^{-i\omega t} dt$$

$$= \frac{1}{\pi} \int_0^{+\infty} g(t) \left[ \frac{e^{+i\omega t} + e^{-i\omega t}}{2} \right] dt$$

-continued $$= \frac{1}{\pi} \int_0^{+\infty} g(t)\cos(\omega t)dt \to \text{Pure Real Number}$$

Similarly, we find that $$H(\omega) = \frac{i}{\pi} \int_0^{+\infty} h(t)\sin(\omega t)dt \to \text{Pure Imaginary Number} \quad (218)$$

As we shall see this implies that both $E_m(r, \omega)$ and $\varphi_m(r, \omega)$ are real functions. Also, note that we can instead treat the multiplication in the time-domain of $f(t)U(t)$ as convolution in the frequency domain. This alternate line of reasoning leads to the Kramers-Kronig relations that connects the real and imaginary parts of a complex function that is analytic in the upper half plane.

Now, recall that we had defined the Fourier transform of the causal electric field signal component as $E_m(r, \omega)e^{i\varphi_m(r, \omega)}$ so that by Euler's formula $$E_m(r, \omega)e^{i\varphi_m(r,\omega)} = \underbrace{E_m(r, \omega)\cos\varphi_m(r, \omega)}_{G(\omega)} + \underbrace{iE_m(r, \omega)\sin\varphi_m(r, \omega)}_{H(\omega)}. \quad (219)$$

Now there are four cases to consider corresponding to whether or not $E_m(r, \omega)$ and $\varphi_m(r, \omega)$ are each even or odd real functions. Using the fact that an even times an even function is an even function; an odd function times an odd function is an even function; and an even function times an odd function is an odd function.

The first case occurs if $E_m(r, \omega)$ is even in $\omega$ and $\varphi_m(r, \omega)$ is even in $\omega$. Then we find that $G(\omega)$ is even and $H(\omega)$ is even. Thus, this case is inconsistent with a causal signal.

The second case occurs if $E_m(r, \omega)$ is odd in $\omega$ and $\varphi_m(r, \omega)$ is odd in $\omega$. Then we find that $G(\omega)$ is odd and $H(\omega)$ is even. Thus, this case is inconsistent with a causal signal.

The third case occurs if $E_m(r, \omega)$ is odd in $\omega$ and $\varphi_m(r, \omega)$ is even in $\omega$. Then we find that $G(\omega)$ is odd and $H(\omega)$ is even. Thus, this case is inconsistent with a causal signal.

The fourth case occurs if $E_m(r, \omega)$ is even in $\omega$ and $\varphi_m(r, \omega)$ is odd in $\omega$. Then we find that $G(\omega)$ is even and $H(\omega)$ is odd. Thus, this case is consistent with a causal signal.

Thus, we conclude that for a causal signal we must have that both $E_m(r, \omega)$ and $\varphi_m(r, \omega)$ are real functions and that they are even and odd functions in frequency $\omega$ respectively so that $$E_m(r,-\omega) = E_m(r,\omega) \quad (220)$$

$$\varphi_m(r,-\omega) = -\varphi_m(r,\omega). \quad (221)$$

We can use these results with Eq. 208 to evaluate Eq. 207 as $$F_{c,q,m}(r) = 4\pi b^3 \epsilon_L \int_{-\infty}^{+\infty}\int_{-\infty}^{+\infty} \left[K(\alpha)E_m(r, \alpha)\frac{\partial E_m(r, \beta)}{\partial x_q} + \right. \quad (222)$$

$$\left. iK(\alpha)E_m(r, \alpha)E_m(r, \beta)\frac{\partial \varphi_m(r, \beta)}{\partial x_q}\right]\frac{\delta(\alpha+\beta)}{2}d\alpha d\beta$$

$$= 2\pi b^3 \epsilon_L \left\{\left[\int_{-\infty}^{+\infty} K(\alpha)E_m(r, \alpha)\frac{\partial E_m(r, -\alpha)}{\partial x_q}d\alpha\right] + \right.$$

$$\left. \int_{-\infty}^{+\infty} iK(\alpha)E_m(r, \alpha)E_m(r, -\alpha)\frac{\partial \varphi_m(r, -\alpha)}{\partial x_q}d\alpha\right\}$$

$$= 2\pi b^3 \epsilon_L \left\{\frac{\partial}{\partial x_q}\left[\int_{-\infty}^{+\infty} \frac{K(\alpha)}{2}E_m^2(r, \alpha)d\alpha\right] - \right.$$

$$\left. \int_{-\infty}^{+\infty} iK(\alpha)E_m^2(r, \alpha)\frac{\partial \varphi_m(r, \alpha)}{\partial x_q}d\alpha\right\}.$$

However, using Eq. 127 and taking the real part of the above expression we have that $$F_{q,m}(r) = \text{Re}[F_{c,q,m}(r)] \quad (223)$$

$$= 2\pi b^3 \epsilon_L \left\{\frac{\partial}{\partial x_q}\left[\int_{-\infty}^{+\infty} \frac{K_R(\alpha)}{2}E_m^2(r, \alpha)d\alpha\right] + \right.$$

$$\left. + \int_{-\infty}^{+\infty} K_I(\alpha)E_m^2(r, \alpha)\frac{\partial \varphi_m(r, \alpha)}{\partial x_q}d\alpha\right\}$$

now summing over m and q and changing back to an c dummy variable we get $$F(r) = 2\pi b^3 \epsilon_L \left\{\nabla\left[\int_{-\infty}^{+\infty} \frac{K_R(\omega)}{2}|E(r, \omega)|^2 d\omega\right] + \right. \quad (224)$$

$$\left. + \sum_{m=1}^{3}\int_{-\infty}^{+\infty} K_I(\omega)E_m^2(r, \omega)\nabla\varphi_m(r, \omega)d\omega\right\}$$

which is equivalent to $$F(r) = 2\pi b^3 \epsilon_L \left\{\nabla\left[\int_{-\infty}^{+\infty} \frac{K_R(\omega)}{2}|E(r, \omega)|^2 d\omega\right] + \right. \quad (225)$$

$$\left. \nabla \times \left[\int_{-\infty}^{+\infty} K_I(\omega)E_I(r, \omega) \times E_R(r, \omega)d\alpha\right]\right\},$$

which shows that even though the force is a nonlinear function of the electric field intensity, the principle of superposition of forces over different frequencies still holds. Thus, to overcome any high-voltage using one excitation frequency $\omega$ we instead use several discrete frequencies or even a continuous band of frequencies to drive a DEP process.

Note that from Eqs. 131-132 that $K_R(\omega)$ is an even function and $K_I(\omega)$ is an odd function. Moreover, for causal signals in Eq. 225 we have $\varepsilon(r, \omega) = E_R(r, \omega) + iE_I(r, \omega)$, which must have by Eqs. 216-218 that $E_R(r, \omega)$ is an even function in $\omega$ and that $E_I(r, \omega)$ is an odd function in $\omega$. Thus, the first integral in Eq. 225 has all even functions and the second integral of Eq. 225 includes the product of two odd functions and an even function, which in total is an even function. So we have that both integrals of Eq. 225 have even kernels and integration over both positive and negative frequencies $\omega$ is justified.

Next, by way of example, consider the interesting case where the circulation of the electric fields is zero and only the first term survives in Eq. 225. Moreover, when the frequencies are much less than the zero crossing frequency (i.e. $\omega \ll \omega_0$) of the Clausius Mossotti factor then $K_R(\omega) \approx K_0$ is constant, and the force is $$F(r) = 2\pi b^3 \epsilon_L \frac{K_0}{2} \nabla \int_{-\infty}^{+\infty} |E(r,\omega)|^2 d\omega \qquad (226)$$

where the integral is the Power Spectral Density (PSD) of the signal and denoted by $S_{EE}(\omega)$. This suggests that we may use at least one of a deterministic and a stochastic signal to generate the ponderomotive forces on particles in a colloid as both deterministic and a stochastic signals have a PSD. For the reader that is not familiar with stochastic processes they may imagine that a random signal is first recorded and then played back as a deterministic signal. Therefore, $$F(r) = \pi b^3 \epsilon_L K_0 \nabla S_{EE}(r) \qquad (227)$$

$$\approx \phi b^3 \epsilon_L K_0 \nabla |E(r,\omega)|^2 \Delta\omega \qquad (228)$$

where the last line assumed a constant gradient of the squared magnitude of the electric field. We can see that force is now proportional to the bandwidth $\Delta\omega$.

Equation 228 is an example of an amazing and general result, which is that we can trade signal amplitude for signal bandwidth to achieve the same ponderomotive force on particles in colloid. This can be done impulsively with impulse signals over one or more short periods of time. It can also be done with a noise signal over a sustained period of time. Moreover, these signals may be generated with low power digital electronics. Therefore, by increasing the conductivity of the liquid $\sigma_L$ we can increase the noise bandwidth because the zero-crossing frequency of $K_R(\omega)$ increases and the force on particles are driven by low-pass broadband noise. Alternately, frequencies greater than the zero crossing frequency may be obtained form high-pass filtered noise and the conductivity $\sigma_L$ may be decreased if desired to increase the bandwidth above the zero-crossing frequency. One of the advantages of noise above the zero crossing frequency $\omega_0$ is that slower particle dynamics can evolve in time, which may be desired, and the fast dynamics is now associated with the high-pass noise-driven ponderomotive force process.

Finally, we may generalize the diffusion equation of Eq. 175 to be $$\frac{\partial u}{\partial t} - D\nabla^2 u = -\nabla \cdot \left[ u\gamma \int_0^\infty F_{dep}(r,\omega)d\omega \right], \qquad (229)$$

where the Force Spectral Density (FSP) is $$F(r,\omega) = \qquad (230)$$
$$2\pi b^3 \epsilon_L \left\{ \nabla \left[ \frac{K_R(\omega)}{2} |E(r,\omega)|^2 \right] + \nabla \times [K_I(\omega) E_I(r,\omega) \times E_R(r,\omega)] \right\}.$$

In summary, this section has shown that we can have a profound impact on reducing the needed voltage levels for a DEP process by using noise and other broadband signals. See for example FIG. 10, where a 1 kV level is rescaled to about 10 V. Now the force need not be just a result of one frequency component, but rather an infinite number of frequency components.

Summary of Nanoparticle Distributions in Colloids

The following equation summary assumes that only DEP and diffusion processes are at play and gravity effects are negligible in a stable colloid. Additionally, harmonic voltage excitations are provided to electrodes that are in the vicinity of a colloid of solid nano-particles in a liquid, both of which are typically (but not necessarily) optically transparent. The liquid and solid nanoparticles are typically not of the same bulk refractive index as a function of wavelength. Units are designated in terms of L for length, T for time, M for mass, I for current, θ for absolute temperature, and # for number of nanoparticles. In summary, $$\frac{\partial u}{\partial t} = D\nabla^2 u - \nabla \cdot \left[ u\gamma \int_{-\infty}^{+\infty} F(r,\omega)d\omega \right] \qquad (231)$$

Fokker-Planck Forced Diffusion $$F(r,\omega) = \nabla[\gamma_1 |E(r,\omega)|^2] + \nabla \times (\gamma_2 E_I(r,\omega) \times E_R(r,\omega))$$

Force Spectral Density $$|E(r,\omega)|^2 = E_R(r,\omega) \cdot E_R(r,\omega) + E_I(r,\omega) \cdot E_I(r,\omega)$$

$u(r,t)$ = Nano-particle concentration in liquid colloidal suspension [# $L^{-3}$]

$E(r,\omega)$ = Spectral Amplitude of the complex

Electric Field Intensity [$LMT^{-2}I^{-1}$]

$E_R(r,\omega)$ = Real part of spectral amplitude, may be a function of time [$LMT^{-2}I^{-1}$]

$E_I(r,\omega)$ = Imaginary part of spectral amplitude, may be a function of time [$LMT^{-2}I^{-1}$]

$\delta(\omega)$ = Dirac $\delta$-function in frequency $\omega$ [$T$]

$r$ = Position vector [$L$]

$t$ = Time when $t \gg$ $(2\pi/\omega)$ to allow for quasi-electrostatic approximation [$T$]

$\omega$ = Radian frequency of the harmonic excitation of electrodes [$T^{-1}$]

$\gamma$ = Intrinsic Mobility [$M^{-1}T$]

$= \frac{1}{6\pi\eta b}$ $\eta$ = Dynamic viscosity [$L^{-1}MT^{-1}$]

$b$ = Spherical nanoparticle radius [$L$]

$\mathcal{V}$ = Nanoparticle volume [$L^3$]

$= \frac{4}{3}\pi b^3$ $\gamma_1$ = Relative mobility in non-rotating fields [$M^{-1}T^4I^2$]

$= \pi b^3 K_R \epsilon_L$ $\gamma_2$ = Relative mobility in rotating fields [$M^{-1}T^4I^2$]

$= 2\pi b^3 K_I \epsilon_L$ $K_R$ = Real part of the Clausius-Mossotti equation [Unitless]

$= K_\infty + \left[ \frac{K_0 - K_\infty}{1 + (\omega\tau_{MW})^2} \right]$ $K_I$ = Imaginary part of the Clausius-Mossotti equation [Unitless]

$= (K_\infty - K_0)\left[ \frac{\omega\tau_{MW}}{1 + (\omega\tau_{MW})^2} \right]$ -continued $$K_0 = \frac{\sigma_S - \sigma_L}{\sigma_S + 2\sigma_L}$$

$$K_\infty = \frac{\epsilon_S - \epsilon_L}{\epsilon_S + 2\epsilon_L}$$

$\tau_{MW}$ = Maxwell-Wagner time constant $[T]$ $$= \frac{\epsilon_S + 2\epsilon_L}{\sigma_S + 2\sigma_L}$$

$\epsilon_S$ = Permittivity of solid nanoparticles $[L^{-3}M^{-1}T^4I^2]$ $= \epsilon_o \epsilon_s$ $\epsilon_L$ = Permittivity of liquid medium $[L^{-3}M^{-1}T^4I^2]$ $= \epsilon_o \epsilon_l$ $\epsilon_s$ = Relative Permittivity of solid nanoparticle [Unitless]

$\epsilon_l$ = Relative Permittivity of liquid medium [Unitless]

$\epsilon_o$ = Permittivity of Free Space $[L^{-3}M^{-1}T^4I^2]$ $= 8.85418782 \times 10^{-12}$ m$^{-3}$ kg$^{-1}$s$^4$A$^2$ $\sigma_S$ = Conductivity of solid nanoparticle $[M^{-1}L^{-3}T^3I^2]$ $\sigma_L$ = Conductivity of liquid medium $[M^{-1}L^{-3}T^3I^2]$ $D$ = Stokes-Einstein diffusion coefficient $[L^2T^{-1}]$ $= \gamma k_B T$ $T$ = Absolute temperature $[\theta]$ $k_B$ = Boltzmann constant $[L^2MT^{-2}\theta^{-1}]$ $= 1.38064852 \times 10^{-23}$ m$^2$ kgs$^{-2}K^{-1}$ Volume-Averaged Refractive Index Distributions The objective of this section is to show that DEP can be used to create refractive index gradients that allow a light beam to be directed along curved trajectories. In particular, a colloid comprising transparent sub-wavelength-scale particles in a transparent liquid (or transparent gas) host medium provides a volume averaged refractive index. By changing the local volume fraction of nanoparticles within a colloid the point-to-point effective refractive index may be changed dynamically in time.

If we initially assume that scattering processes have no impact on the average refractive index then the volume fractions for the liquid $v_L$ and solid $v_S$ components of a colloid must sum to unity so that $$v_L + v_S = 1, \quad (232)$$

and we can derive a relation for the average refractive index. This is based on our intuition of how the refractive averaging process works and provides an average real refractive index of $$n_A = n_L v_L + n_S v_S \quad (233)$$

$$= n_L(1 - v_S) + n_S v_S$$

$$= n_L + (n_S - n_L)v_S.$$

The volume fraction of the solid nanoparticles $v_S$ has no units and is a pure real number between zero and one such that $v_S$ is obtained by multiplying the particle concentration by the volume per nanoparticle so that $$v_S = u \mathcal{V} \quad (234)$$

whereby it is possible to provide a direct linear relation between the nanoparticle concentration u and the average refractive index as $$n_A(r,t) = n_L + u(r,t)\mathcal{V}(n_S - n_L). \quad (235)$$

This is a direct linear relation between nanoparticle concentration we found in the previous sections and the average refractive index of the colloidal suspension.

Strictly speaking Eq. 235 is only correct when the radius b of the particle approaches zero, i.e. when b→0 and scattering processes are essentially zero. As the particle size approaches zero the required voltage for changing the spatial distribution of nanoparticles goes to infinity. So we are motivated to obtain a more realistic averaging equation between $n_L$ and $n_S$ so that voltages are in a practical range for engineered devices.

Additionally, note that when the particle size is much smaller than the free-space wavelength of light, typically b≤$\lambda_0$/20, then we have Rayleigh scattering as a light beam passes through the colloid comprising the dispersed nanoparticles. As the particle size increases then typically we would use the full Mie scattering theory for nanoparticles of comparable size to the wavelength of light to describe the scattering process.

For the purposes of this discussion the scattering can be broken down into roughly two components. The first component is scattering into a direction that is far from the direction of wave propagation. For example, perpendicular to the direction of propagation of the incident light. This type of scattering is highly dependent on the size of the particle relative to the wavelength of the light. The second component is light scattering that is roughly in the direction of the incident light, which tends to be approximately independent of particle diameter. See for example "*Light Scattering by Small Particles*," by H. C. Van de Hulst having ISBN 0-486-64228-3 and "*Refraction by spherical particles in the intermediate scattering region*," by G. H. Meeten, 1996, Optics Communications 134 (1997) 233-240.

When the nanoparticle is made of a material that is transparent, but of a refractive index $n_S$ that is different than the surrounding liquid medium $n_L$ then it can be shown that particle size has a very weak dependence on the scattering process and we can simultaneously account for both diffraction and particle induced phase shifts. This means that even for particles that are large compared to the wavelength, an expression for the scattering cross-section close to the direction of propagation is roughly independent of the type of scattering theory that is used to derive it. That said, we are going to use the theory of Anomalous Diffraction (AD) to obtain analytic expressions for the scattering process and then use that information to develop an expression for the average refractive index that is similar to Eq. 233, but modified to account for scattering processes of practical larger nanoparticles. In this way we can avoid the complexities of Mie and other forms of scattering theory.

For DEP-based beam steering the colloid or suspension comprises a liquid and nanoparticle mixture having two operational frequencies. The first frequency is that associated with DEP control of the nanoparticle distribution in the liquid. This frequency is roughly on the order of $10^1$ to $10^8$ Hz for electrode-based DEP and at this frequency there are nonzero loss tangents so that there is a real and imaginary component to the dielectric constants.

In contradistinction, the optical frequency of light is approximately $10^{14}$-$10^{15}$ Hz, where by convention we tend to specify free-space wavelength rather than frequency (i.e. roughly 1000-100 nm respectively). We will assume that the materials are lossless at this higher optical frequency. This is not a requirement, but it makes the calculations simpler and the interpretation clear.

So, for the sake of simplifying the description to its important points, in this document we assume a nonzero loss tangent only for the low frequency effects associated with DEP. In actual devices there will always be some losses at all frequencies.

As we shall come to see, the scattering of light by many lossless colloidal nanoparticles removes light from the direction of propagation. Thus, we will be able to introduce an effective complex refractive index to model the loss process. However, it must be stressed that the loss is a result of scattering by diffraction and not ohmic heating of the liquid or nanoparticles.

Consider an incident light field propagating in the z-direction given by its electric field phasor $$E_1 = E_0 e^{-ikz} \qquad (236)$$

where we have used a scalar to represent the incident electric field strength $E_0$ instead of a vector quantity because spherical nanoparticles do not have a preferred orientation and we can therefore ignore the light's polarization in this special case. In the far field the scattered electric field intensity will take the form $$E_2 = E_0 S(\theta) \frac{e^{-ikr}}{ikr} \qquad (237)$$

where $S(\theta)$ is the normalized amplitude function of the scattering particle, r is the distance from the center of the nanoparticle to the far-field point (x, y, z) and $\theta$ is the angular direction of scattering relative to the direction of incidence, i.e. the z-direction.

The total field E of the incident and scattered field is then the superposition $$E = E_0 e^{-ikz}\left[1 + S(\theta)\frac{e^{-ik(r-z)}}{ikr}\right]. \qquad (238)$$

but, in the far-field where z is large relative to x and y, we can use a Taylor expansion to obtain an approximation so that $$r = (x^2 + y^2 + z^2)^{1/2} \qquad (239)$$
$$\approx z + \frac{1}{2z}(x^2 + y^2).$$

and in the direction of incidence $\theta=0$ therefore $$E = E_1\left[1 + S(0)\frac{e^{-\frac{ik}{2z}(x^2+y^2)}}{ikr}\right] \qquad (240)$$

where $E_1 = E_0 e^{-ikz}$. This process can be extended for many identical spherical nanoparticles having a concentration of u [number of particles per m$^3$] in a thin infinite planar slab of thickness z=l according to $$E = E_1\left[1 + \sum_{\alpha\, Particles} S(0)\frac{e^{-\frac{ik}{2z_\alpha}(x_\alpha^2+y_\alpha^2)}}{ikr_\alpha}\right]. \qquad (241)$$

However, $z \gg \sqrt{x^2+y^2} = \zeta$ and the distance to the observation point is $r_\alpha \approx r$ so that for large numbers of particles observed from the far-field, after the light passes through the layer of nano particles, we have in the limit that $$E = E_1\left[1 + \frac{S(0)}{ikr}\int_{z=0}^{l}\int_{\phi=0}^{2\pi}\int_{\zeta=0}^{\infty} e^{-\frac{ik}{2r}\zeta^2} u\, dz\rho\, d\zeta\, d\phi\right]. \qquad (242)$$

Moreover, the integral in $\zeta$ is easy to evaluate by observing that $$\int_0^\infty e^{-a\zeta^2}\zeta\, d\zeta = \frac{1}{2a} \qquad (243)$$

where $a=ik/(2r)$. So on substituting this result we find the expression reduces to $$E = E_1\left[1 - \frac{2\pi}{k^2}ulS(0)\right] \approx E_1 e^{-\frac{2\pi}{k^2}ulS(0)}, \qquad (244)$$

where in general we have S(0) is a complex quantity.

Let $n=n'-in''$ represent the effective complex refractive index of the colloidal suspension of nanoparticles that includes diffractive scattering losses from a large number of otherwise lossless dielectric nanospheres at the optical free-space wavelength $\lambda_0$. That is, we say that in the direction of $\theta=0$ we have losses and a non-zero imaginary component of the effective refractive index. Then the complex phase shift is $$kl\frac{(n-n_L)}{n_L} = \frac{2\pi l}{\left(\frac{\lambda_0}{n_L}\right)}\frac{(n'-in'')-n_L}{n_L} = \frac{2\pi l}{\lambda_0}(n'-n_L-in''). \qquad (245)$$

The effective complex refractive index of the colloid is then defined by writing $$E = E_1 e^{-\left[\frac{2\pi}{k^3}uS(0)\right]kl} \equiv E_1 e^{-\left[i\left(\frac{n-n_L}{n_L}\right)\right]kl}, \qquad (246)$$

so that $$\frac{2\pi}{k^3}uS(0) = i\left(\frac{n-n_L}{n_L}\right) \qquad (247)$$

$$\frac{2\pi}{k^3}u[S'(0) + iS''(0)] = i\left(\frac{n'-in''-n_L}{n_L}\right) \qquad (248)$$

where $S'(0)=\text{Re}[S(0)]$ and $S''(0)=\text{Im}[S(0)]$ so that on equating real and imaginary components on the left and right hand sides of the above equation we find a relation between the effective refractive index and the scattering amplitude as $$n' = n_L + n_L \frac{2\pi}{k^3} u S''(0) \tag{249}$$

$$n'' = n_L \frac{2\pi}{k^3} u S'(0). \tag{250}$$

Moreover, we can use the fact that the volume fraction of the nanoparticles is $v_S = u\mathcal{V}$ and the individual nanoparticle volume is $\mathcal{V} = 4/3\pi b^3$ so that $$u = \frac{v_S}{\frac{4}{3}\pi b^3} \tag{251}$$

and therefore $$n' = n_L + n_L \frac{3}{2} \frac{v_S}{\chi^3} S''(0) \tag{252}$$

$$n'' = n_L \frac{3}{2} \frac{v_S}{\chi^3} S'(0), \tag{253}$$

where the nanoparticle size parameter $\chi = kb$ was utilized. Then by using Eq. 250 the magnitude of the Poynting vector is $$I = \frac{|E|^2}{2\eta_0} \tag{254}$$
$$= \frac{|E_1|^2}{2\eta_0} e^{-2kl\frac{n''}{n_L}}$$
$$= \frac{|E_1|^2}{2\eta_0} e^{-\left[\frac{4\pi}{k^2}S'(0)\right]ul}$$
$$= \frac{|E_1|^2}{2\eta_0} e^{-C_{ext}ul},$$

where $C_{ext}$ is defined to be the extinction cross-sectional area and $$C_{ext} = \frac{4\pi}{k^2} S'(0) \tag{255}$$
$$= \frac{4\pi b^2}{k^2 b^2} S'(0)$$
$$= \frac{4G}{\chi^2} S'(0),$$

where $G=\pi b^2$ is the geometric cross sectional area of a spherical nanoparticle. We further define the real part of the extinction efficiency in the direction of the incident light as $$Q'_{ext} = \frac{C_{ext}}{G} = \frac{4}{\chi^2} S'(0) \tag{256}$$

and the imaginary part of the extinction efficiency is $$Q''_{ext} = \frac{C_{ext}}{G} = \frac{4}{\chi^2} S''(0). \tag{257}$$

Therefore, using Eqs. 252-253

$$n' = n_L + n_L \frac{3}{2} \frac{v_S}{\chi^3} S''(0) \tag{258}$$
$$= n_L + n_L \frac{3}{8} \frac{v_S}{\chi} \frac{4 S''(0)}{\chi^2}$$
$$= n_L + n_L v_S \frac{3}{8} \frac{Q''_{ext}}{\chi}$$

and similarly $$n'' = n_L v_S \frac{3}{8} \frac{Q'_{ext}}{\chi}. \tag{259}$$

So that we have developed the components of the complex effective refractive index in terms of the extinction scattering efficiency, the liquid's refractive index and the volume fraction of the spherical nanoparticles.

Figure 5:
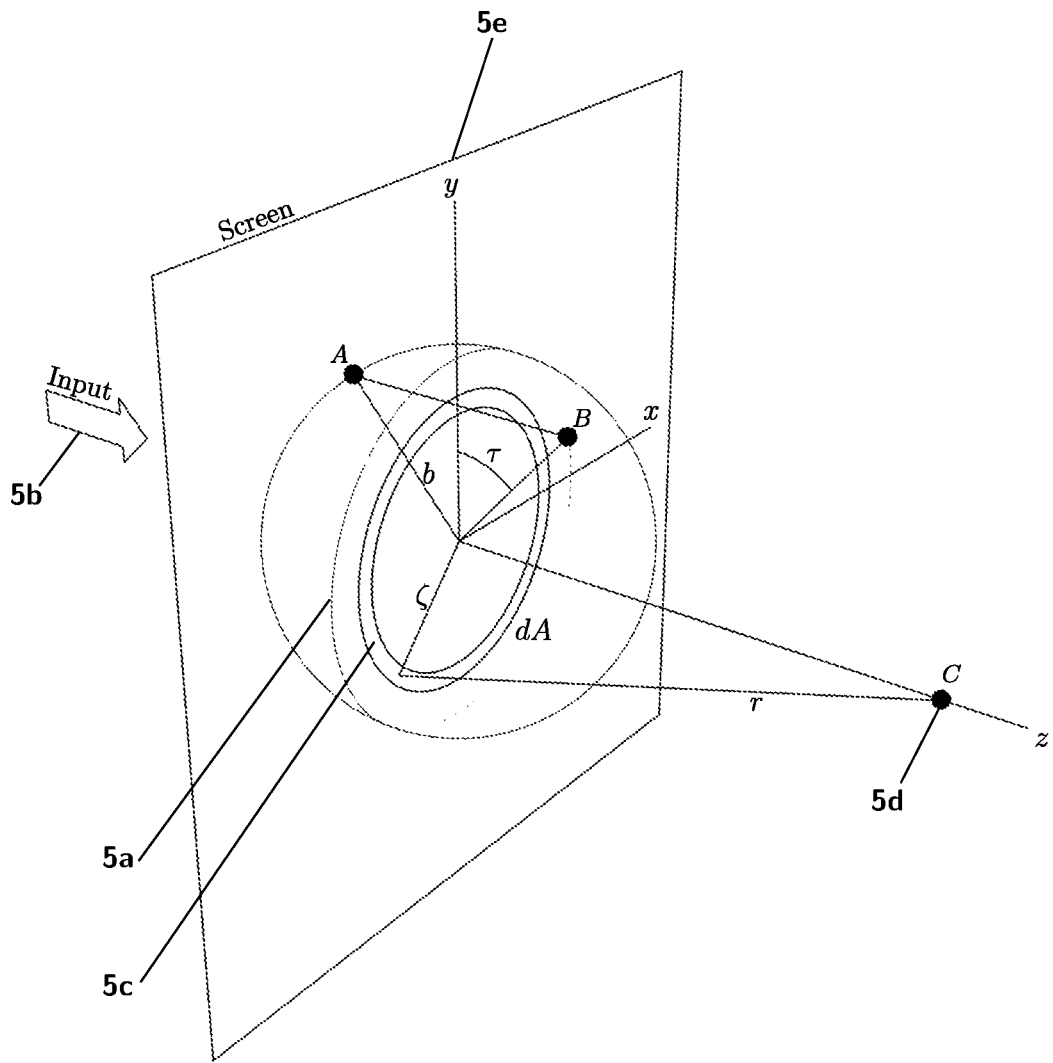
FIG. 5 An input plane wave is shown interacting with a single dielectric nanosphere to produce both a diffracted scattered wave and a diffracted transmission wave, which is phase shifted through the sphere. The annulus of area dA is in the plane of the screen. The line of length r is not to scale in this image and should be thought of as nearly parallel to the z axis so that the far-field point C is far away from the nanosphere's center. Line $\overline{AB}$ has length $2b \sin \tau$, which is associated with the phase lag of the input wave through the sphere at angle $\tau$.

Next, consider a plane wave incident on a spherical particle as shown in FIG. 5, where we see a single dielectric nanosphere 5a having incident light field 5b. The light field is assumed to be a plane wave propagating in the positive z-direction. The input plane wave interacts with a single dielectric nanosphere and produces both a diffractive scattered wave and a transmissive wave with a phase shift through the sphere. The differential annulus 5c of area dA is in the plane of the screen. The distance from the annulus to a far-field point 5d (also identified as point C in this figure) is r, note the image is not to scale so that this line should be nearly parallel to the z axis. Line $\overline{AB}$ has length $2b \sin \tau$, which is associated with the phase lag of the input wave at angle $\tau$.

The diffraction process is accounted for by using Huygen's principle, which states that each point of a wavefront can be considered to be the origin and source of wavelets that radiate spherically. For example a plane wave $$E = E_0 e^{-ikz} \tag{260}$$

can have an array of area elements, each having area dA across its surface, which serve as the sources for Huygen's wavelets. In this case we expect that in the far-field $$dE_1 = qE_0 \frac{e^{-ikr}}{r} dA \tag{261}$$

where the proportionality constant (not to be confused with charge) q is a to-be-determined and $$r \approx z + \frac{1}{2z}(x^2 + y^2) = z + \frac{\zeta^2}{2z} \tag{262}$$

so that $$E_1 = E_0 \int_{\phi=0}^{2\pi} \int_{\zeta=0}^{\infty} q \frac{e^{-ik\left(z+\frac{\zeta^2}{2z}\right)}}{r} \zeta d\zeta d\phi$$

$$= E_0 \frac{2\pi q e^{-ikz}}{r} \int_{\rho=0}^{\infty} e^{-ik\frac{\zeta^2}{2z}} \zeta d\zeta \quad (263)$$

$$= E_0 e^{-ikz}, \quad (264)$$

where the last line is the original plane wave in the far field after free space propagation and where the integral on the second line is evaluated using Eq. 243 and the fact that r≈z in the far-field. On solving the last two lines for the proportionality constant we get that q=i/λ so that $$dE_1 = E_0 \frac{ie^{-ikr}}{r\lambda} dA. \quad (265)$$

This is the disturbance caused by a wavefront having area dA and amplitude $E_0$ at a point having a distance r from the area element, where r is in a direction that is approximately in the direction of propagation of the incident wavefront. It is clear that when dA=rλ that there is no focusing or defocusing of the wave. Therefore, the width of the source must be approximately $\omega=\sqrt{r\lambda}$. The implication is that it is impossible to have rays traced from a particle having a width (diameter) of λ or smaller, and in general provides the Fresnel equation $$\varepsilon(x, y, z, t) = -\frac{ik}{2\pi} \int\int \varepsilon_0(x', y', z=0) \frac{e^{-i(kr-\omega t)}}{r\lambda} dx' dy', \quad (266)$$

which is an exact solution of the full time-domain wave equation under paraxial conditions, i.e. the paraxial wave equation, when the phase term in Eq. 266 uses expanding Huygens wavelets from each source point in a source plane with a Taylor expansion of the distance to second order $$r \approx z + \frac{1}{2z}[(x-x')^2 + (y-y')^2] \quad (267)$$

and the denominator in Eq 266 uses r≈z.

By way of example: the light scattering that gives rise to the apparent white color of a white paint is produced by large (1-10 micron sized) spherical micro-spheres of transparent titanium dioxide that are included in the paint by the manufacturer to scatter the light and provide the appearance of a white paint. However, the white color will typically not be present for small diameter nanospheres (e.g. <50 nm), which are sized significantly less than the wavelength of visible light. This idea may be generalized to any wavelength of interest and it is very important because we do not want the addition of nanoparticles to cloud and substantially scatter light from the IGL beam steering liquid.

With this analysis and example in mind we now return to FIG. 5, wherein a dielectric nanosphere whose bulk material is substantially transparent is scattering a plane wave traveling in the z-direction. We can now apply Babinet's principle, which is a theorem from optics that states that the diffraction pattern from an opaque body is identical to that from a hole, i.e. formed by the spherical nanosphere, in an opaque screen 5e. The hole is of the same size and shape as the particle cross section. Moreover, for complementary screens comprising the hole and the infinite area around the hole, the sum of the wave diffracted around a finite opaque screen plus the wave diffracted through the complementary hole, is the same as if no screen were present. Therefore, Babinet's principle is $$E_{particle} + E_{hole} = E_{incident} \quad (268)$$

This theorem can be modified slightly to account for a transparent dielectric particle that introduces optical phase shifts into the incident field. In particular, if from each area element of the hole we subtract off the complex amplitude of the incident wave and then add back in the complex phase-modified field we will have accounted for the phase shifts of the transparent bulk medium of the nanoparticle. In this way we can approximately account for the phase lag induced by the nanosphere of a refractive index different than its surrounding medium. Therefore, Babinet's principle in the far-field becomes $$E_{particle} + \int_{Hole} E_0 \frac{ie^{-kir}}{r\lambda}(e^{-i\psi} - 1)dA = E_0 e^{-ikz}, \quad (269)$$

where from FIG. 5 the phase lag ψ is $$\psi = \left(\frac{2\pi}{\lambda_0}\right)(2b\sin\tau)(n_S - n_L) \quad (270)$$

$$= \left(\frac{2\pi}{\lambda_0/n_L}\right)(2b)\sin\tau\left(\frac{n_S - n_L}{n_L}\right)$$

$$= k(2b)\left(\frac{n_S}{n_L} - 1\right)\sin\tau$$

$$= p\sin\tau$$

and $$p = k(2b)\left(\frac{n_S}{n_L} - 1\right) = 2\chi\left(\frac{n_S}{n_L} - 1\right) \quad (271)$$

Clearly, p is the phase lag directly through the central diameter of the nanosphere. Moreover, from Eq. 269 we have $$E_{particle} = E_0 e^{-ikz} - \int_{Hole} E_0 \frac{ie^{-kir}}{r\lambda}(e^{-i\psi} - 1)dA \quad (272)$$

$$= \underbrace{E_0 e^{-ikz}}_{E_1}\left[1 + \frac{e^{-ik(r-z)}}{ikr}\left(\frac{k^2}{2\pi}\right)\underbrace{\int_{Hole}(1 - e^{-ip\sin\tau})dA}_{S(0)}\right]$$

where the identification of S(0) was obtained by comparison to Eq. 240. Moreover, from FIG. 5 we can see that the annular area element is a function of τ so that the scattering amplitude in the direction of the incident wave is $$S(0) = \frac{k^2}{2\pi} \int_{Hole}(1 - e^{-ip\sin\tau})dA \quad (273)$$

$$= \frac{k^2}{2\pi} \int_{\tau=0}^{\frac{\pi}{2}}(1 - e^{-ip\sin\tau})(2\pi b\cos\tau)(b\sin\tau d\tau)$$

Let s=sin τ then the complex scattering amplitude is $$S(0) = k^2 b^2 \int_{s=0}^{1} (1 - e^{-ips}) s \, ds \qquad (274)$$

$$= k^2 b^2 \left[ \frac{1}{2} + \frac{1}{i} \frac{d}{dp} \int_0^1 e^{-ips} ds \right]$$

$$= X^2 \left[ \frac{1}{2} + \frac{e^{-ip}}{ip} + \frac{e^{-ip} - 1}{(ip)^2} \right].$$

From Eqs. 256-257 we get the complex extinction efficiency as $$Q_{ext} = \frac{4}{X^2} S(0) \qquad (275)$$

$$= 2 + 4 \frac{e^{-ip}}{ip} + 4 \frac{e^{-ip} - 1}{(ip)^2}$$

$$= \underbrace{\left( 2 - \frac{4}{p} \sin p - \frac{4}{p^2} (\cos p - 1) \right)}_{Q'_{ext}} + i \underbrace{\left( \frac{4}{p^2} \sin p - \frac{4}{p} \cos p \right)}_{Q''_{ext}}.$$

Next, plug in the expression for $Q_{ext}''$ into Eq. 258 and simplifying using Eq. 271 we find $$n' = n_L + n_L v_S \frac{3}{8} \frac{Q''_{ext}}{X} \qquad (276)$$

$$= n_L + n_L v_S \frac{3}{8x} \left[ \frac{2\left(\frac{n_S}{n_L} - 1\right)}{2\left(\frac{n_S}{n_L} - 1\right)} \right] \left( \frac{4}{p^2} \sin p - \frac{4}{p} \cos p \right)$$

$$= n_L + v_S (n_S - n_L) 3 \left( \frac{\sin p}{p^3} - \frac{\cos p}{p^2} \right),$$

Thus, on setting $n_A$=n' for the average real refractive index we get $$n_A = n_L + v_S (n_S - n_L) 3 \left( \frac{\sin p}{p^3} - \frac{\cos p}{p^2} \right). \qquad (277)$$

where the phase lag through the diameter of a nanosphere is $$p = \frac{4\pi b}{\lambda_0} (n_S - n_L), \qquad (278)$$

and where $\lambda_0$ is the free-space wavelength of the light. These equations should be compared with the intuitively derived expression of Eq. 233, where we note that in the limit of small particles that the correction factor $$\lim_{p \to 0} 3 \left( \frac{\sin p}{p^3} - \frac{\cos p}{p^2} \right) = 1 \qquad (279)$$

so that Eq. 233 and Eq. 277 are identical. Notice also that no attempt to further developed the expression for n" has been undertaken because the scattering losses are more strongly regulated by scattering processes roughly perpendicular to the direction of the incident light and are strongly size dependent. This requires the use of an appropriately chosen scattering formalism (e.g. Mie scattering) to properly account for the loss processes. Finally, the equation for the refractive index Eq. 277 can be connected to Eq. 231 by noting that $$v_S(r,t) = u(r,t) \mathcal{V} \qquad (280)$$

where $\mathcal{V} = 4/3\pi b^3$ and we consider the volume fraction a function of space and time under the control of voltages from electrodes. Then $$n_A(r, t) = n_L + v_S(r, t)(n_S - n_L) 3 \left( \frac{\sin p}{p^3} - \frac{\cos p}{p^2} \right). \qquad (281)$$

By way of a numeric example, if b=25 nm, $(n_S - n_L)$=0.5 and $\lambda_0$=500 nm then p=π/10 and the correction factor would be about 0.9902, so Eq. 233 is off by about 1%. However, the needed voltages for a 25 nm radius nanoparticle are high and will require high DEP voltages to control and potentially longer time periods to stabilize at the steady state. Therefore, if b=100 nm we find that the correction factor is 0.8507 and represents nearly a 15% error that does need to be taken into account.

In summary, light passing through a colloid or suspension will encounter liquid and nanospheres that are made of a material that in bulk is transparent. If at the optical frequencies the bulk materials are lossless then there will still be an extinction process that is governed by scattering of light from the nanoparticles. While scattering in directions substantially different than the direction of incidence is a strong function of nanoparticle size, this is not the case for light scattered into a narrow range of angles about the incident direction where the dependence on nanoparticle size is much weaker. In this case we can avoid using the exact Mie scattering theory or specific scattering approximations that are optimized for particle size relative the wavelength, e.g. the Rayleigh scattering approximation for particles small relative to wavelength, and use a scattering approximation called the Anomalous Diffraction approximation, which provides a compact analytic expression for the average refractive index of the mixture of liquid and nanoparticles.

The Anomalous Diffraction approximation, was originally developed by Dutch astronomer van de Hulst describing light scattering for optically soft spheres. It also goes by the name of the van de Hulst approximation, eikonal approximation, high energy approximation or soft particle approximation and it allows us to replace the lossless refractive indices of the liquid and nanoparticles with a complex, and therefore lossy dielectric constant n=n'-in" of a homogenous material. The essence of the approximation was that n could be related to the scattering amplitude in the forward direction S(0) as the loss mechanism instead of a ohmic loss. The value of S(0) being derived from using a modified version of Babinet's principle to account for both diffraction and phase lags introduced in the incident wave from the transparent sphere. The technique can be generalized to account for particles that are not spherical and for intrinsically lossy liquids and nanoparticles, though the mathematics is more involved.

In practice, obtaining spherical nanoparticles of only one size b is often difficult or expensive. Typically there is a distribution of sizes that are available. With that in mind we can generalize Eq. 277 to $$n_A = n_L + (n_S - n_L)3\sum_{m=1}^{M} v_m\left(\frac{\sin p}{p_m^3} - \frac{\cos p}{p_m^2}\right), \quad (282)$$

where the total volume fraction of the solid nanospheres is $v_S$, which is divided into M distinct different sphere radii $b_m$. The different radii then provide different phase diameter phase lags $$p_m = \frac{4\pi b_m}{\lambda_0}(n_S - n_L) = \alpha b_m, \quad (283)$$

where $\alpha$ is a convenient constant to be used shortly. Moreover, the sum over the individual number of nanoparticles in each size is $$N_T = N_1 + N_2 + N_3 + \ldots + N_M \quad (284)$$

where $N_T$ is the total number of nanoparticles. Therefore, $$\frac{N_1}{N_T} + \frac{N_2}{N_T} + \frac{N_3}{N_T} + \cdots + \frac{N_M}{N_T} = 1 \quad (285)$$

which can be rewritten in terms of the probability mass function $f_m$ $$f_1 + f_2 + f_3 + \ldots + f_M = 1. \quad (286)$$

Therefore, the volume fraction of the $m^{th}$ sphere size is the ratio given by the volume of the nanospheres to the total volume as $$v_m = \frac{\left(\frac{4\pi}{3}b_m^3 N_m\right)}{v_0 N_T} = \frac{\left(\frac{4\pi}{3}b_m^3\right)}{v_0} f_m, \quad (287)$$

where $\mathcal{V}_0$ is the maximum unit cell volume that allows one nanoparticle to fit therein and $\mathcal{V}_0 N_T$ is the total volume of a colloid filled with nanoparticles. By using Eq. 287 and taking the limit of many nanoparticles we can move to a continuum of nanoparticle sizes so that $$n_A = n_L + (n_S - n_L)\left(\frac{4\pi}{v_0}\right)\int_0^{\infty} f_b(b) b^3 \left(\frac{\sin p}{p^3} - \frac{\cos p}{p^2}\right) db, \quad (288)$$

where $f_b(b)$ is the probability density function (PDF) of the random variable b. If we take $$p = ab \quad (289)$$

where $$\alpha = \frac{4\pi}{\lambda_0}(n_S - n_L) \quad (290)$$

then $db = dp/\alpha$ and $$n_A = n_L + (n_S - n_L)\left(\frac{4\pi}{v_0 \alpha^4}\right)\int_0^{\infty} f_b\left(\frac{p}{\alpha}\right) p^3 \left(\frac{\sin p}{p^3} - \frac{\cos p}{p^2}\right) dp. \quad (291)$$

Thus with different particle size distributions we will get different correction factors.

For example, if we assume that nanospheres are fabricated with a uniform distribution of sizes, perhaps by using a nano-sieve during fabrication $$f_b(b) = \begin{cases} 1/b_{max} & 0 < b \leq b_{max} \\ 0 & \text{Otherwise} \end{cases} \quad (292)$$

then Eq. 291 can be integrated directly and provides that $$n_A = n_L + (n_S - n_L)\left(\frac{4\pi b_{max}^3}{v_0}\right)\left(\frac{2}{p^4} - \frac{2\cos p}{p^4} - \frac{\sin p}{p^3}\right), \quad (293)$$

where for uniform probability distributions $$p = \frac{4\pi b_{max}}{\lambda_0}(n_S - n_L). \quad (294)$$

This can be written in several ways, however let's observe that the average particle volume is $$v_A = \frac{1}{b_{max}} \int_0^{b_{max}} \frac{4\pi}{3} b^3 db = \frac{\pi}{3} b_{max}^3 \quad (295)$$

then for uniform distributions of nanospheres having radii ranging from 0 to $b_{max}$ we find $$n_A = n_L + (n_S - n_L)\langle v_S \rangle 12\left(\frac{2}{p^4} - \frac{2\cos p}{p^4} - \frac{\sin p}{p^3}\right). \quad (296)$$

where the average volume fraction of nanospheres in the colloid or suspension is $$\langle v_S \rangle = \frac{v_{avg}}{v_0}. \quad (297)$$

Also, note that in the limit of small particles that $$\lim_{p \to 0} 12\left(\frac{2}{p^4} - \frac{2\cos p}{p^4} - \frac{\sin p}{p^3}\right) = 1 \quad (298)$$

so that we can see that very small particles with a range of sizes do not have a great impact on the overall performance if the particles are small. The impact of using such small particles is the need for high DEP voltages and perhaps high nanoparticle cost, which may not be desired.

Conversely, by moving to other probability distribution functions for particle sizes, and potentially a range of refractive indices, we can gain added degrees of freedom for forming optical elements having different layers and mitigating optical aberrations. The resulting average refractive index will take the form $$n_A = n_L + \delta n_1 \langle v_{S1} \rangle F_1(p) + \delta n_2 \langle v_{S2} \rangle F_2(p) + \ldots + \delta n_M \langle v_{SM} \rangle F_M(p) \quad (299)$$

where $\delta n_j = n_{Sj} - n_L$, the refractive index of the $j^{th}$ material, the correction factors are $F_j(p)$ and $\langle v_{Sj} \rangle$ are the average volume fractions for the $j^{th}$ material used such that the total volume fraction is $$v_S = \langle v_{S1} \rangle + \langle v_{S2} \rangle + \ldots + \langle v_{SM} \rangle. \tag{300}$$

These different forms of averaging the refractive index provide the basis for correcting chromatic, spherical and other forms of aberrations in an optical system. It also provides the basis for solving inverse problems where the objective is to find the size and electrical properties of the particles and liquid via optical probing.

Finally, note that large particles in a colloid can have dipole moments interact, which may cause the particles to align and form a "pearl chain." This periodic geometry may lead to diffraction effects. This is avoided by using small nanoparticles particles that are constantly randomized by the Brownian motion.

Generalized Refractive Index Averaging

In this section we discuss an experiment performed by the author. In particular, consider FIG. 6A where a beaker 6a containing methylphenyl siloxane (MPPS) is on a precision lab scale 6b with a calibration line 6c in the background. Also, in the beaker is an acrylic rod, i.e. poly methyl methacrylate (PMMA). The difference in the refractive index of the MPPS and the PMMA is indicated by a first optically mapped curve 6e that is the image of the calibration line 6c after it passed through the beaker with MPPS and the PMMA rod.

In FIG. 6B the setup is reset with ethyl acetate (EA) as the liquid in the beaker. The difference in the refractive index is indicated by a second optically mapped curve 6f.

In FIG. 6C the setup is reset with MPPS and the mass is measured with the precision lab scale 6b and then EA is gradually (drop by drop) added to the beaker as a magnetic stirring rod 6g mixes the two chemicals. The mass of the combined chemicals is measured for each added drop of EA. Drop-by-drop a third optically mapped curve 6h line begins to align with the calibration line 6c until it is nearly impossible to tell the difference between the two. At this point the system has an optically matched liquid mixture with the PMMA rod.

The chemical species do not chemically react and can form a pure mixture. The atoms making up the individual molecules are about 0.1 nm in diameter. However, the MPPS and EA molecules are very roughly 1 nm in diameter with 10 atoms (in order of magnitude). In contradistinction, a 50 nm diameter solid nanoparticle (as considered is some embodiments in this disclosure) has 0.1 nm atoms and roughly 100 million atoms in it volume.

This condition is different than that which was discussed in the previous section because both are liquid and both are very small in diameter. Nonetheless, we find that at 22.5° C. the measured volume fraction of EA is 0.09584±0.00020 and the refractive indices are: $n_{MPPS}=1.498\pm0.0001$, $n_{EA}=1.372\pm0.0001$, and $n_{MPPS+EA}=1.494\pm0.001$ (i.e. a less precise average measurement). This mixed refractive index is that of acrylic, i.e. poly methyl methacrylate (PMMA), which was used as a reference for calibration purposes. We may then assume that there is a volume fraction correction $\Phi$ so that $$n_{MPPS+EA} = n_{MPPS} + (n_{EA} - n_{MPPS})\Phi v_{EA} \tag{301}$$

whereby $$\Phi = \frac{1}{v_{EA}} \left( \frac{v_{MPPS+EA} - n_{MPPS}}{n_{EA} - n_{MPPS}} \right) \approx 0.33 \pm 0.08 \tag{302}$$

This means that if we use Eq. 277 so that $$\Phi = 3\left( \frac{\sin p}{p^3} - \frac{\cos p}{p^2} \right) \tag{303}$$

then we have that p=3.06±0.027 radians of phase shift. This appears to imply that there is $\pi$ radians of phase shift associated with the interaction.

Note, that strictly speaking it is not justified to use Eq. 277 given the size of both molecular species is so small. It is still quite intriguing that we find a $\pi$ radians of phase shift at the edge of the error bars. Clearly, more analysis is needed here to validate the result and extend the correction of Eq. 303 to this case.

Nonetheless, the value of $\Phi$ does provide an experimental volume fraction correction and it may be used in cases where the theoretical analysis is not sufficient to cover the case at hand. Thus, by this example we extend the volume averaging process of Eq. 277 into a general form $$n_A = n_L + v_S(n_S - n_L)\Phi \tag{304}$$

where $\Phi$ is empirically determined and is a function of the important parameters of the averaging process, which covers many other cases not covered so far in a detailed theoretical analysis herein.

Fermat's Principle, Atomic Transitions & the Eikonal

In this section we will develop the rules for light propagation both with and without light-emitting atomic transitions. Atomic transitions in a GRIN medium provide a loophole in the physics of light propagation that allows an optical system to bypass étendue conservation laws of ray optics and this principle is especially useful in some forms of DEP-based displays and elsewhere.

Additionally, in this section an exact solution to the well know Eikonal equation is provided and later applied to DEP-based lens design and other applications. The Eikonal equation is central to light propagation in a GRIN medium and it is well know to be extremely difficult if not impossible to solve exactly. Nonetheless, if the ray trajectories are known a-priori then the needed GRIN distribution can be found analytically. This exact solution to the Eikonal is both possible and very useful for DEP-based optics.

With these objectives in mind consider this: light that passes through a GRIN medium may interact with an active medium where nanoparticles can absorb and reemit light via both elastic and inelastic scattering precesses, therefore we consider the rules of combining probability amplitudes. From Eqs. 35-41 with regions of space with no macroscopic sources and a freely propagating electromagnetic wave we have $$\nabla \times \mathcal{E} = -\mu \frac{\partial \mathcal{H}}{\partial t} \tag{305}$$

$$\nabla \cdot \mathcal{E} = 0 \tag{306}$$

and

-continued $$\nabla \times \mathcal{H} = +\epsilon \frac{\partial \mathcal{E}}{\partial t} \qquad (307)$$

$$\nabla \cdot \mathcal{H} = 0. \qquad (308)$$

Take Eqs. 305-306 and multiply through by $\sqrt{\epsilon}/2$. Also, take Eqs. 307-308 and multiply through by $i\sqrt{\mu}/2$, where $i=\sqrt{-1}$. Then we can add the curl and divergence equations together respectively to obtain $$\nabla \times \left( \frac{\sqrt{\epsilon}\mathcal{E} + i\sqrt{\mu}\mathcal{H}}{\sqrt{2}} \right) = -i\sqrt{\epsilon\mu} \frac{\partial}{\partial t}\left( \frac{\sqrt{\epsilon}\mathcal{E} + i\sqrt{\mu}\mathcal{H}}{\sqrt{2}} \right) \qquad (309)$$

and $$\nabla \cdot \left( \frac{\sqrt{\epsilon}\mathcal{E} + i\sqrt{\mu}\mathcal{H}}{\sqrt{2}} \right) = 0, \qquad (310)$$

where $\epsilon$ and $\mathcal{H}$ are real-valued functions of space and time. Let us also define the complex vector electromagnetic amplitude as $$\psi = \frac{\sqrt{\epsilon}\mathcal{E} + i\sqrt{\mu}\mathcal{H}}{\sqrt{2}}. \qquad (311)$$

and $$\mathcal{E} = \frac{\psi + \psi^*}{\sqrt{2\epsilon}} \qquad (312)$$

$$\mathcal{H} = \frac{\psi - \psi^*}{\sqrt{2\epsilon}}, \qquad (313)$$

where the asterisk indicates the complex conjugate operation. As a consequence $$\nabla \times \psi = i\sqrt{\epsilon\mu} \frac{\partial \psi}{\partial t} \qquad (314)$$

$$\nabla \cdot \psi = 0. \qquad (315)$$

However, because of the vector identity $\nabla \cdot (\nabla \times \psi) = 0$ there is really only one equation as can be seen by taking the divergence of Eq. 314, therefore $$\nabla \times \psi = \frac{i}{c} \frac{\partial \psi}{\partial t}, \qquad (316)$$

where $c = 1/\sqrt{\epsilon\mu}$. On rearranging and multiplying through by $\hbar$ and using the fundamental quantum assumption $\Delta\epsilon \hbar \omega$ (where $\Delta\epsilon$ is the change in energy in this context and is not to be confused with the electric field) and since $k=\omega/c$ we obtain $$\left[ \frac{\Delta\mathcal{E}}{k} \nabla \times \right] \psi = i\hbar \frac{\partial \psi}{\partial t}, \qquad (317)$$

which may be written in terms of an electromagnetic Hamiltonian operator $\hat{\mathcal{H}} = [\Delta E/k\nabla \times]$, which has units of energy, so that we obtain a vector form of Schrödinger's wave equation $$\hat{\mathcal{H}}\psi = i\hbar \frac{\partial \psi}{\partial t}, \qquad (318)$$

and it can be shown that $\hat{\mathcal{H}}$ is Hermitian.

Consequently, Maxwell's equations are equivalent to a vector Schrödinger wave equation for wave propagation within a homogenous, isotropic and linear material and we can heuristically identify $\psi$ as a vector quantum probability amplitude for photons that captures the polarization properties. As such $\psi$ is subject to being constructed by similar rules as were used to construct the original Schrödinger equations. In particular, we can leverage the rules for combining probability amplitudes for photons and electrons, as developed by the physicist Richard P. Feynman (e.g. see "*Quantum Mechanics and Integrals*," by Feynman and Hibbs, ISBN: 64-25171) wherein we distill that:

Non-Interfering Paths: The probability amplitudes multiply. This corresponds to a particle traveling along one available path by means of subpath-1 AND subpath-2 AND subpath-3 AND etc. . . . all stacked serially so that the value of the probability amplitude is Exp[i (phase of prob. wave-1)]×Exp[i (phase of prob. wave-2)]×Exp[i (phase of prob. wave-3)] . . . .

Interfering Paths: The probability amplitudes add. This corresponds to a particle traveling along path-1 OR along path-2 OR along path-3 OR etc. . . . all stacked in parallel. The probability is then given by a sum of waves Exp[i (phase of prob. wave-1)]+Exp[i (phase of prob. wave-2)]+ . . . .

The total probability of a particle moving along a particular path is then the magnitude square of the total probability amplitude.

With this in mind consider light that has transitioned from a first medium into a colloidal medium at an optical boundary and assume that this light has a phase of $$\phi = k \cdot r - \tilde{\omega} t \qquad (319)$$

where k is the vector wavenumber, r is a point in space along the path of the light, $\tilde{\omega}$ is the radian frequency of the light (i.e. not the frequency of the harmonic excitation of electrodes) and t is the time. By Eq. 318 the phase of the electromagnetic wave is also the phase of the corresponding probability amplitude. Therefore, multiply Eq. 319 through by the reduced Planck constant $\hbar$ so that $$\hbar \phi = \hbar k \cdot r - \hbar \tilde{\omega} t \qquad (320)$$

and use the fundamental quantum assumptions whereby the energy transition in an atom (or quantum dot etc. . . . ) is $\Delta\epsilon = \hbar\tilde{\omega}$ and the vector momentum of the light is $p=\hbar k$. On taking the time derivative we then obtain the Legendre transformation $$\hbar \frac{d\phi}{dt} = p \cdot v - \Delta\mathcal{E}. \qquad (321)$$

The propagator of the probability amplitude to go from point-1 in space-time to point-2 in space-time along an $m^{th}$ arbitrary path is then $$\psi_{1,2}(m) = C(m) e^{i \frac{d\phi_{1,2}(m)}{dt} \delta t} \qquad (322)$$

where $i=\sqrt{-1}$ and C(m) is a vector of proportionally to account for polarization effects on the $m^{th}$ path. To go from point-1 to point-2 to point-3 and so on to point-N we have by the rule for non-interfering paths that $$\psi_{1,N}(m) = C(m)\psi_{1,2}(m)\psi_{2,3}(m)\psi_{3,4}(m) \ldots \psi_{N-1,N}(m) \quad (323)$$

$$= C(m)e^{i\sum \frac{d\phi_{n,n+1}(m)}{dt}\delta t}$$

$$\rightarrow C(m)e^{\frac{i}{\hbar}\int_{t_a}^{t_b}(p\cdot v-\Delta\mathcal{E})dt}$$

where C(m) is the vector proportionally constant that is different for each path and polarization. Additionally, we must also consider all possible separate interfering paths along which the photons may also travel, therefore let m take on different values for different spatial paths so that we may write a Feynman path integral for the light path in FIG. 68B as follows $$\psi = \psi(1) + \psi(2) + \psi(3) + \ldots \quad (324)$$

$$= \lim_{m \to \infty} C \int \ldots \int e^{\frac{i}{\hbar}\int_{t_a}^{t_b}(p\cdot v-\Delta\mathcal{E})dt} dx_1 \ldots dx_m dy_1 \ldots dy_m dz_1 \ldots dz_m \quad (325)$$

$$= C \int e^{\frac{i}{\hbar}\int_{t_a}^{t_b}(p\cdot v-\Delta\mathcal{E})dt} \mathcal{D}r. \quad (326)$$

Note that the exponential in the above equation takes on a broad range of complex values as the phasor rotates in response to the evolving wave. It can be shown that on a statistical average the phasor sum of the path integral is therefore zero. To avoid this and obtain a non-trivial solution we must require that the exponent is stationary about a specific path in space-time so that variations δ of the exponential integral must obey $$\delta\int_{t_a}^{t_b}(p\cdot v - \Delta\varepsilon)dt = 0. \quad (327)$$

or on recognizing that $p=p_0 n\tau$ and $vdt=dr=\tau ds$ where $\tau$ is the tangent vector to the path of the ray, n is the spatial distribution of the refractive index, ds is the element of arc length and $p_0=\varepsilon_0/c$ is the quantum of photon momentum with a photon initially having energy $\varepsilon_0$ so that $$\delta\int_{r_a}^{r_b} n(r)ds = c\delta\int_{t_a}^{t_b}\frac{\Delta\mathcal{E}}{\mathcal{E}_0}dt, \quad (328)$$

which we identify as a modified form of Fermat's Principle that can account for the effects of quantum transitions from atoms and colloidal quantum dots.

There is much that can be said about obtaining expressions for energy transitions in atoms, molecules and quantum dots. However, for now we will take $\Delta\varepsilon=0$ and recover the usual Fermat's Principle from Eq. 328 so that $$\delta\int_{r_a}^{r_b} n(r)\sqrt{\dot{r}\cdot\dot{r}}\,ds = 0 \quad (329)$$

where $\dot{r}=dr/ds$ and we can identify the Lagrangian as $\mathcal{L}=n(r)\sqrt{\dot{r}\cdot\dot{r}}$ and the variational problem of Eq. 328 is solved by the Euler-Lagrange equations $$\frac{\partial\mathcal{L}}{\partial r} - \frac{d}{ds}\left(\frac{\partial\mathcal{L}}{\partial\dot{r}}\right) = 0. \quad (330)$$

However, $$\frac{\partial\mathcal{L}}{\partial r} = \sqrt{\dot{r}\cdot\dot{r}}\frac{\partial n(r)}{\partial r} = \frac{\partial n(r)}{\partial r} = \nabla n(r) \quad (331)$$

because $\sqrt{\dot{r}\cdot\dot{r}}=1$. Additionally, $$\frac{\partial\mathcal{L}}{\partial\dot{r}} = n(r)\frac{\partial}{\partial\dot{r}}\sqrt{\dot{r}\cdot\dot{r}} = \frac{n(r)}{\sqrt{\dot{r}\cdot\dot{r}}}\dot{r}\cdot\frac{\partial\dot{r}}{\partial\dot{r}} = n(r)\dot{r}\cdot I = n(r)\dot{r} \quad (332)$$

where I is the identity matrix. We may therefor write Eq. 330 as $$\frac{d}{ds}[n(r)\dot{r}] = \nabla n(r) \quad (333)$$

or $$n(r)\ddot{r} + \dot{n}(r)\dot{r} = \nabla n(r). \quad (334)$$

This equation is extremely useful for deriving the trajectories of rays in a refractive index distribution. For example, this is done in a subsequent sections on LiDAR beam steering.

Also note that the derivative of a position vector r with respect to arc length s has unit magnitude and direction. It is the unit tangent vector to a ray's trajectory and we can write $$\hat{\tau} = \frac{dr}{ds} \quad (335)$$

so that the linear optical momentum of a ray is $$p = \hbar k = \left(\frac{2\pi\hbar}{\lambda_0}\right)n\hat{\tau} = \left(\frac{\hbar\omega}{c}\right)n\hat{\tau} = p_0 n\hat{\tau}, \quad (336)$$

where $p_0$ is the free-space quantum of linear momentum of a photon associated with the free-space wavelength $\lambda_0$. The factor of $p_0$ usually has no impact on ray optics and divides out on both sides of equations where it might be used. In particular, we see immediately that the Optical Path Length (OPL) function S must be given as $$p = p_0 \nabla S(r) \tag{337}$$

so that $$p \cdot p = p_0^2 n^2 = p_0^2 \nabla S(r) \cdot \nabla S(r) \tag{338}$$

or in rectangular coordinates we get the nonlinear partial differential equation $$\left(\frac{\partial S}{\partial x}\right)^2 + \left(\frac{\partial S}{\partial y}\right)^2 + \left(\frac{\partial S}{\partial z}\right)^2 = n^2 \tag{339}$$

where $S=S(x, y, z)$ and $n=n(x, y, z)$. Equation 339 is called the Eikonal equation in terms of the OPL function S. This function is notoriously difficult to solve and it has been studied extensively as it has applications in such diverse fields as oil exploration (i.e. for acoustic waves probing for oil) and optics.

The Eikonal equation of Eq. 339 is equivalent to the vector equation Eq. 334. So a solution of one can be converted into the solution of the other. Therefore, in this sense both are Eikonal equations, but expressed with different dependent variables.

Equation 334 is now rewritten as $$\ddot{r} + \left[\frac{\dot{n}}{n(r)}\right]\dot{r} = \frac{\nabla n(r)}{n(r)}, \tag{340}$$

which can be rewritten again as $$\ddot{r} + \frac{d}{ds}[\ln n(r)]\dot{r} = \nabla[\ln n(r)]. \tag{341}$$

Now let's define $$m(r) = \ln n(r) \tag{342}$$

so if $m(r)$ can be found then $$n(r) = e^{m(r)}. \tag{343}$$

On rewriting Eq. 341 we get $$\ddot{r} + \frac{dm(r)}{ds}\dot{r} = \nabla m(r), \tag{344}$$

which can be expanded by the chain rule to give $$\ddot{r} + [\dot{r} \cdot \nabla m(r)]\dot{r} = \nabla m(r). \tag{345}$$

Let's further take $$q(r) = \nabla m(r) \tag{346}$$

then we have $$\ddot{r} + [\dot{r} \cdot q(r)]\dot{r} = q(r). \tag{347}$$

This equation can be written as three separate equations $$\ddot{x}(s) + [\dot{x}(s)q_x(r) + \dot{y}(s)q_y(r) + \dot{z}(s)q_z(r)]\dot{x}(s) = q_x(r) \tag{348}$$

$$\ddot{y}(s) + [\dot{x}(s)q_x(r) + \dot{y}(s)q_y(r) + \dot{z}(s)q_z(r)]\dot{y}(s) = q_y(r) \tag{349}$$

$$\ddot{z}(s) + [\dot{x}(s)q_x(r) + \dot{y}(s)q_y(r) + \dot{z}(s)q_z(r)]\dot{z}(s) = q_z(r) \tag{350}$$

or by inspection of these three equations we get $$\begin{bmatrix} \ddot{x}(s) \\ \ddot{y}(s) \\ \ddot{z}(s) \end{bmatrix} + \begin{bmatrix} \dot{x}(s)\dot{x}(s) & \dot{x}(s)\dot{y}(s) & \dot{x}(s)\dot{z}(s) \\ \dot{y}(s)\dot{x}(s) & \dot{y}(s)\dot{y}(s) & \dot{y}(s)\dot{z}(s) \\ \dot{z}(s)\dot{x}(s) & \dot{z}(s)\dot{y}(s) & \dot{z}(s)\dot{z}(s) \end{bmatrix} \begin{bmatrix} q_x(r) \\ q_y(r) \\ q_z(r) \end{bmatrix} = \begin{bmatrix} q_x(r) \\ q_y(r) \\ q_z(r) \end{bmatrix}. \tag{351}$$

Therefore, we can write $$\ddot{r} + [\dot{r}(s)\dot{r}^T(s)]q(r) = q(r), \tag{352}$$

where the T superscript indicates a transpose operation and $r(s)$ is now considered to be a column vector.

Next, it is desirable to be able to solve for $q(r)$ by matrix operations, as we shall see shortly it is not possible, nonetheless the algebraic manipulations are performed anyway to emphasize an important point that is described in more detail below. Consequently, we obtain $$q(r) = \nabla(r) = [I - \dot{r}(s)\dot{r}^T(s)]^{-1}\ddot{r}, \tag{353}$$

where I is the identity matrix and the (−1) exponent indicates matrix inverse. Moreover, we then write that $$\frac{dm(s)}{ds} = \dot{r} \cdot \nabla m(r) = \dot{r}^T(s)[I - \dot{r}(s)\dot{r}^T(s)]^{-1}\ddot{r}(s) \tag{354}$$

so we can integrate to get the expression $$m(s) = m(0) + \int_0^s \dot{r}^T(\xi)[I - \dot{r}(\xi)\dot{r}^T(\xi)]^{-1}\ddot{r}(\xi)d\xi \tag{355}$$

and then use Eq. 343 to get the refractive index along the trajectory of a ray by $$n(s) = e^{m(0)} e^{\int_0^s \dot{r}^T(\xi)[I - \dot{r}(\xi)\dot{r}^T(\xi)]^{-1}\ddot{r}(\xi)d\xi} \tag{356}$$

and $$n(s) = n_0 e^{\int_0^s \dot{r}^T(\xi)[I - \dot{r}(\xi)\dot{r}^T(\xi)]^{-1}\ddot{r}(\xi)d\xi} \tag{357}$$

where $n_0 = n(0)$. Thus, it appears that the refractive index along a single ray trajectory depends on the direction of the trajectory $\dot{r}(s)$ and the principle normal to the trajectory $\ddot{r}(s)$, which has a magnitude equal to the curvature. In general, it appears that each refractive index value along a ray trajectory is based on having a unique arc length s, tangent vector, principle normal vector and curvature.

At first look Eq. 357 appears both reasonable and compelling, however it is wrong. The problem is that the matrix $[I - \dot{r}(s)\dot{r}^T(s)]$ always has a determinant of zero and therefore its inverse does not exist. This is a result of the fact that $\dot{r}$ is a unit tangent vector to the ray trajectory and the sum of the squares of its components always equals unity. Consequently, there is no general procedure to just specify the ray trajectories and obtain the needed refractive index distribution—more information is needed or a symmetry needs to be exploited in specific cases.

In summary, by starting with Maxwell's equations this disclosure develops a general theory of ray propagation that includes scattering by atoms, molecules and quantum dots as a means to overcome some of the limitations imposed by étendue conservation. It was then shown that in general it not possible to specify the ray trajectories to determine the refractive index. Instead one must specify the refractive index and then determine the ray trajectories. This approach is taken later in this disclosure to describe a number of detailed embodiments for DEP-based devices including DEP-based mixed reality displays and DEP-based variable focus lenses.

Redirecting Light Using Colloidal Shock Waves

Next, we will consider redirecting light using electric fields from electrodes that are all typically placed on the same surface, even if the surface is curved. It will be shown how this electrode configuration can produce colloidal shockwaves that redistribute nanoparticles into a desired spatial distribution for switching and graded refractive index optics.

Equation 231 shows that ponderomotive forces on nanoparticles can be achieved from the first term on the right hand side. However, for in-phase and quadrature excitation the first two terms of Eq. 231 may be required. This can be seen when equation Eq. 231 is rewritten as $$\frac{\partial u}{\partial t} = -\gamma\gamma_1 \nabla \cdot \underbrace{(u\nabla[|E_R|^2 + |E_I|^2])}_{\text{Non-Uniform Field}} - \gamma\gamma_2 \nabla \cdot \underbrace{[u\nabla \times (E_I \times E_R)]}_{\text{Circulating Field}} + D\nabla^2 u \quad (358)$$

where $E_R$ is the in-phase electric field (i.e. the real component of the field) and $E_I$ is the quadrature electric field (i.e. the imaginary component of the field), which is not in the same direction as $E_R$.

One way to induce the in-phase and quadrature excitations in the above equation is to use a poly-phase harmonic traveling-voltage-wave on the electrode array in FIG. 7A. Under suitable conditions this has the potential to provide forces on nanoparticles in both the x- and y-directions as indicated in the figure. In the example shown in FIG. 7A only three phases are shown $$V_1 = V_0 e^{i0} \quad (359)$$

$$V_2 = V_0 e^{i\frac{2\pi}{3}} \quad (360)$$

$$V_3 = V_0 e^{i\frac{4\pi}{3}}, \quad (361)$$

but more or less phases are also possible typically with equal phase separation between adjacent electrodes. The voltage sources are connected to electrodes, such as electrode 7a. The electrodes may be placed on or imbedded in a solid dielectric material 7b, which is typically transparent at the optical wavelengths of interest. In contact with the solid dielectric material is a colloidal nanoparticle fluid 7c. As discussed before the nanoparticles are dispersed in the liquid and the particular spatial distribution of the nanoparticles provides an optical gradient to control light. Although it is not shown in FIG. 7A the electrode array is formed on at least one surface of a control volume such as a μFCC, which has been discussed throughout this disclosure. The linear electrode array may be extended into two dimensional surface, i.e. a manifold, which is embedded in a three dimensional space—see for example FIG. 24 for a cylindrical manifold. Additionally, the array may have counterpart electrodes that are formed on other surfaces of the μFCC.

Added degrees of freedom to the nanoparticle distribution are applied to the electrodes by energizing them with different voltage amplitudes, timing, phases and frequencies in order to better control the forces on transparent dielectric nanoparticles and the resulting distribution of the refractive index as a function of space and time. This is shown in FIG. 7B, where forces on colloidal nanoparticles are in one or both of the x- and y-directions. As in the previous paragraph FIG. 7B has electrodes such as 7d, which is on or in a solid dielectric material 7e. In contact with the solid dielectric material is a colloidal nanoparticle fluid 7f.

In practice it is usual for a 2-phase electrode array to be configured to provide pure DEP forces normal to the electrode array, i.e in the y-direction. It is also usual for a 4-phase DEP system to create traveling wave forces to allow movement of nanoparticles parallel the plane of the electrode array, i.e. in the x-direction. This second kind of DEP is called traveling wave DEP or twDEP.

The electric field may be represented by a harmonic wave traveling from left-to-right. A convenient model for the phasor form for the electric field to first order is given by $$E = E_0[i\hat{x}f(x) + \hat{y}]e^{-i\kappa x - \beta y} \quad (362)$$

where $f(x)$ is a real valued function that models the driving electronic's ability to change the amplitude of the harmonic voltage excitation as a function of electrode position in the plane of the electrodes, $\kappa$ is the spatial radian frequency of the fields, $\beta$ is the electric field decay rate, and $\hat{x}$ and $\hat{y}$ are unit vectors in the x- and y-directions. Note that when the amplitude has a change from $+V_0$ to $-V_0$ this represents a $\pi$ radian phase shift, which is often used in practice because the electrodes can be interdigitated. Also, there is an exponential-like decay of the electric field strength as the point of observation moves away from the plane of the electrodes in the positive y-direction.

By expanding the last equation using the well-known Euler's formula $e^{i\theta} = \cos\theta + i\sin\theta$ we obtain $E = E_R + iE_I$ such that $$E_R = E_0 e^{-\beta y}[\hat{x}f(x)\sin(\kappa x) + \hat{y}\cos(\kappa x)] \quad (363)$$

$$E_I = E_0 e^{-\beta y}[\hat{x}f(x)\cos(\kappa x) - \hat{y}\sin(\kappa x)]. \quad (364)$$

from which we find $$E_R \cdot E_R = E_0^2 e^{-2\beta y}[f^2(x)\sin^2(\kappa x) + \cos^2(\kappa x)] \quad (365)$$

$$E_I \cdot E_I = E_0^2 e^{-2\beta y}[f^2(x)\cos^2(\kappa x) + \sin^2(\kappa x)] \quad (366)$$

$$E_R \cdot E_I = E_0^2 e^{-2\beta y}[f^2(x) - 1]\sin(\kappa z)\cos(\kappa z) \quad (367)$$

$$E^2 = E_0^2 e^{-2\beta y}[f^2(x) + 1] \quad (368)$$

$$E_I \times E_R = E_0^2 e^{-2\beta y} f(x)\hat{z} \quad (369)$$

where $E^2 = E_R \cdot E_R + E_I \cdot E_I$. Notice that $\kappa$ does not play a role in the last two equations. After some algebra Eq. 231 becomes $$\frac{\partial u}{\partial t} - D\nabla_T^2 u = -\nabla_T \cdot (uV). \quad (370)$$

This is immediately identified as a Fokker-Planck Equation (FPE) in two dimensions. In the context of advection of particles the FPE is sometimes also known as a Smoluchowski equation. The elements of the FPE include a transverse gradient operator given by $$\nabla_T = \left\{\frac{\partial}{\partial x}, \frac{\partial}{\partial y}\right\}. \quad (371)$$

a characteristic nanoparticle advection velocity vector is given by $$V = \frac{e^{-2\beta y}}{2} \begin{bmatrix} f(x) & \frac{-f'(x)f(x)}{\beta} \\ \frac{f'(x)}{2\beta} & 1 + f^2(x) \end{bmatrix} \begin{bmatrix} V_{x0} \\ V_{y0} \end{bmatrix} \quad (372)$$

where the primes indicate derivatives with respect to x and where $$V_{x0} = 4\gamma\gamma_2\beta E_0^2 \quad (373)$$

$$V_{y0} = 4\gamma\gamma_1\beta E_0^2. \quad (374)$$

Both $V_{x0}$ and $V_{y0}$ have units of velocity. The value for the electric field $E_0$ magnitude and the electric field decay rate $\beta$ is given by solving Maxwell's equations for the electric fields for a specific electrode geometry and voltage amplitude. For example see, "*Closed-form solutions in the electrical field analysis for dielectrophoretic and travelling wave inter-digitated electrode arrays*," by Dong Eui Chang et. al., J. Phys. D: Appl. Phys. 36 (2003) 30733078. Where we find (approximately) both a closed form and infinite sum expression for the electric field over the electrodes given by $$E(x, y) = \frac{8V_0}{\pi d_2} \begin{bmatrix} \text{Re} \\ \text{Im} \end{bmatrix} h(\zeta, q) \quad (375)$$

$$= \frac{8V_0}{\pi d_2} \sum_{m=0}^{\infty} \frac{e^{-p_m y}}{2m+1} \cos\left[\frac{p_m d_1}{2}\right] \begin{bmatrix} \sin(p_m x) \\ \cos(p_m x) \end{bmatrix} \quad (376)$$

where $V_0$ = Voltage amplitude (for a 2-phase traveling wave) (377)

$d_1$ = Electrode width in $x$-direction (see FIG. 7A) (378)

$d_2$ = Gap width between electrodes (see FIG. 7A) (379)

$$d = \frac{d_1 + d_2}{2} \quad (380)$$

$$q = \frac{d_1}{4d} \quad (381)$$

$$p_m = \frac{(2m+1)\pi}{2d} \quad (382)$$

$$\zeta = \exp\left[\frac{\pi(xi - y)}{2d}\right] \quad (383)$$

$$h(\zeta, q) = \frac{1}{4}\ln\left[\frac{1 + 2\zeta\cos(\pi q) + \zeta^3}{1 - 2\zeta\cos(\pi q) + \zeta^2}\right]. \quad (384)$$

Therefore, to first order we see that Eqs. 373-374 suggest taking for $E_0$ and $\kappa=\beta$ the expressions $$E_0 \approx \frac{8V_0}{\pi d_2} \quad (385)$$

$$\beta \approx \frac{\pi}{2d}, \quad (386)$$

where $\beta$ was obtained by considering $\zeta$.

Note, the field expression in Eq. 375 is most accurate when there is a 50% duty cycle in the electrode geometry, i.e. so that $d_1=d_2$, and should probably be used only near this condition. More elaborate and accurate expressions are provided for the electric field in terms of elliptic and Legendre polynomial functions in the above mentioned journal paper by Dong Eui Chang et. al., this should be used if a large deviation from a 50% duty cycle is needed or if more phases are used to support the voltage traveling wave so as to make the fields more independent of x-directed variations.

Also, as a reminder to the reader, the voltage across the electrodes is what is being maintained and not the number free-charges in vacuum. Therefore, the electric field provided in Eq. 375 is only a function of the voltage and electrode geometry and not the dielectric constant in the control volume where the electric fields interact with the colloid. If instead there were a constant number of free charges on the electrodes then the introduction of a colloid would reduce the free charge density from $\sigma_f$ to $\sigma_f/\epsilon_r$ as free charges combined with bound charges in the colloid.

FIG. 8A shows a contour plot of the magnitude of the electric field sourced by a 2-phase traveling voltage wave on a linear electrode array. FIG. 8B shows a plot of the electric field decay 8*a* from Eq. 375 and compares it to the exponential approximation 8*b* $e^{-\beta y}$ from the model used in Eq. 362. As the observation point moves away from the center of a gap between electrodes the model and the journal paper strongly agree.

By inspection of FIG. 8 we see that away from the electrodes there is little variation in the electric field magnitude in the x-direction. Therefore, a one dimensional FPE that assumes $f(x)=1$ and $\partial/\partial x \to 0$ can be written as $$\frac{\partial u}{\partial t} - D\frac{\partial^2 u}{\partial y^2} = -\frac{\partial}{\partial y}(uV_{y0}e^{-2\beta y}) \quad (387)$$

where the factor $V_{y0}e^{-2\beta y}$ represents the strength of an advective velocity field, in the y-direction, which is induced by a DEP process over the electrodes where $$V_{y0} = 4\gamma\gamma_1\beta E_0^2, \quad (388)$$

which may take on either positive or negative values depending on the harmonic excitation frequency used to drive the electrodes as has been noted before with respect to the Clausius-Mossotti factor. Equation 387 for $u=u(y, t)$ is now going to be solved for the control volume region $0<y<L$ assuming a constant and uniform concentration $u_0$ as an initial condition. The concentration is therefore subject to the initial condition and boundary conditions given by $$u(y, 0) = u_0 \quad (389)$$

$$-D\frac{\partial u(0, t)}{\partial y} + u(0, t)ve^{-2\beta(0)} = 0 \quad (390)$$

$$-D\frac{\partial u(L, t)}{\partial y} + u(L, t)ve^{-2\beta L} = 0. \quad (391)$$

The last two equations are Neumann boundary conditions and are chosen to ensure that the net nanoparticle flux is zero at the walls of the containment volume holding the nanoparticle colloid. The boundary conditions also ensure that the area under the integral is a constant so that the number of nanoparticles in the containment volume is conserved, therefore $$\int_0^L u(y,t)dy = u_0 L = \text{const.} \quad \forall t \geq 0. \tag{392}$$

See the similar derivation leading to Eq. 181.

As an example and in order to explore the behavior of colloid kinetics we next numerically solve the FPE for the one-dimensional system of equations Eq. 387-391 using the appropriate definitions under Eq. 231 and the electric field amplitude and decay rate from Eqs. 385-386.

In particular, it is assumed that the liquid forming the colloid is a silicone fluid called dimethyl siloxane Trimethylsiloxy (terminated) [CAS No: 63148-62-9], having a specific gravity of 0.913, relative dielectric constant of 2.6, loss tangent of 0.0004 at 100 Hz (to obtain the liquid's conductivity), and kinematic viscosity of 5 cSt (i.e. centiStokes, which needs to be converted into the dynamic viscosity in the calculation). It is also assumed that ionic compounds are dissolved in the dimethyl siloxane to increase the conductivity of the liquid dimethyl siloxane by a factor of $2.0 \times 10^7$, which takes the conductivity of the liquid from that comparable to a piece of highly insulating glass (i.e. a near perfect insulator) to the conductivity of typical drinking water and sets the Maxwell-Wigner frequency $1/\tau_{MW}$ of the Clausius-Mossotti factor to about 500 kHz. The nanoparticles are assumed to be spherical diamond or lanthanum glass beads with a diameter of 50 nm, relative dielectric constant of 5.7, and loss tangent of 0.0006 at 100 Hz.

The electrodes are assumed to be long strips in the z-direction that are parallel to each other to form a periodic sheet in the plane y=0. The electrodes have a 50% duty cycle in the x-direction so that $d=d_1=d_2=50$ μm, like that in FIG. 8A. The length L of the containment volume (i.e. the gap width where the colloid exists) is assumed to be 50 μm and the system is at a room temperature of 297K. These parameters are especially useful for optical switching, where temperature effects are easily circumvented due to using nanoparticle saturation effects and the presence or absence of nanoparticles independent of temperature. Examples of applications are given later in the sections on optical switching, general displays, and a specific augmented reality headset design.

A DEP-induced colloidal shock wave is a sharp change in concentration u, nanoparticle volume fraction $v_S$, and average refractive index $n_A$, in a narrow spatial region that travels as a wave through the colloid. The wave is created by the rapid onset of a strong advective flow field caused by ponderomotive forces from non-uniform harmonic electromagnetic fields.

Figure 9:
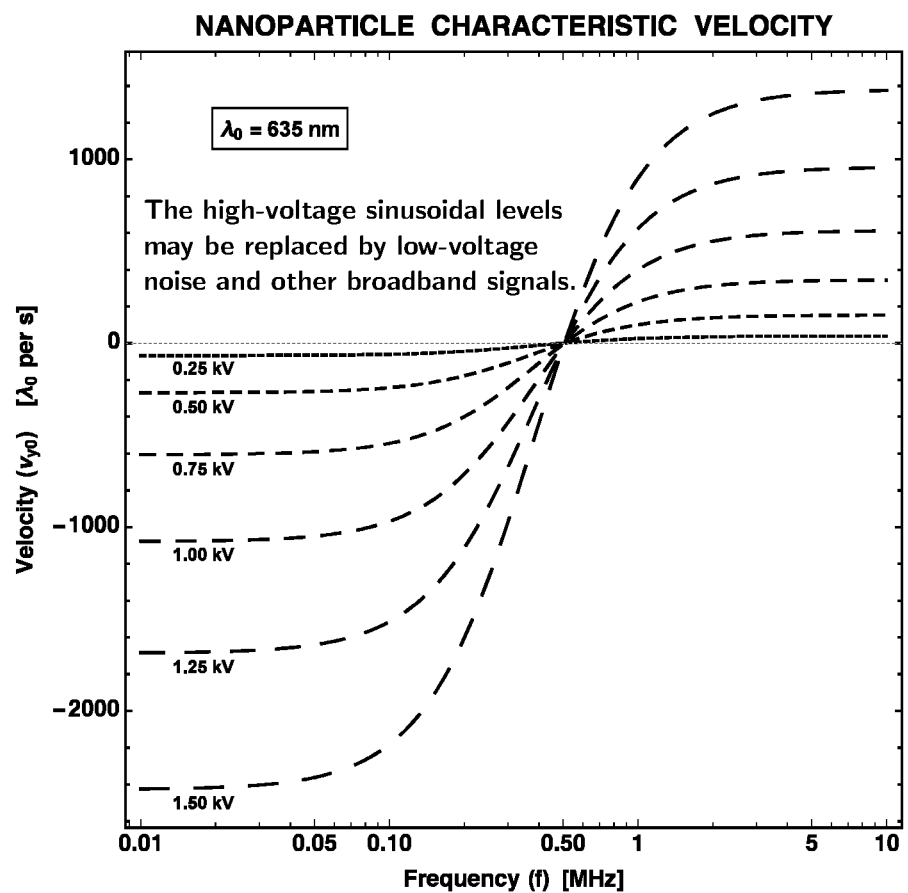
FIG. 9 shows characteristic velocities as a function of electrode drive frequency and voltage amplitude for the Fokker-Planck type shock waves induced by rapid-onset dielectrophoresis.

The parameters listed above are now used as the basis of a simple example for the formation of a colloidal shock wave. Starting in FIG. 9 the characteristic advection velocities as a function of excitation frequency and voltage amplitude are shown. The advection velocities are normalized to the optical wavelength $\lambda_0=635$ nm, which is a typical wavelength of a red solid-state laser. The normalization is done because total internal reflection at an interface has evanescent electric fields that extinguishes by about 99% within 1-2 optical wavelengths. This fact is use used later in switching speed calculations. Thus, in optical switching applications the ability to quickly move the nanoparticles away from the electrodes by 1-2 optical wavelengths is an enabling capability. So, from the figure we see that shock waves can move with speeds of thousands (and actually even millions) of optical wavelengths per second and this allows for fast acting opto-electronics. The voltages shown in the example range from 250 V to 1.5 kV. However, as will be discussed shortly, these voltages levels are only necessary for a short amount of time, which is much smaller than the full switching time of a colloidal switch, and average voltages typically on the order of 10 V are anticipated to hold a particular state. The higher voltages shown are used to initiate a colloidal shockwave and may be derived from a low-current and high-voltage source.

Figure 10A:
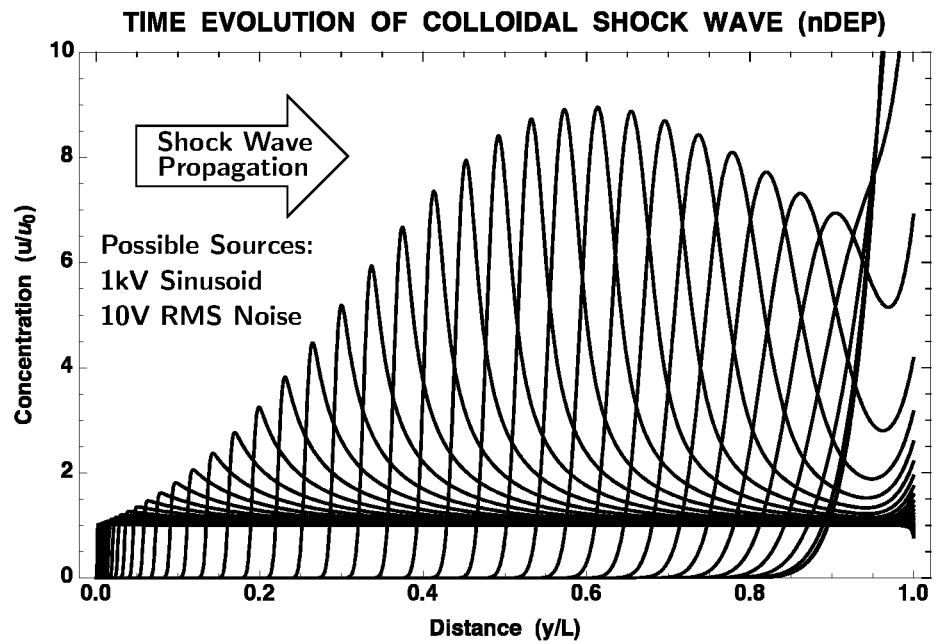
FIG. 10A shows a rapid onset colloidal shock wave for 1000V excitation amplitude.
Figure 10B:
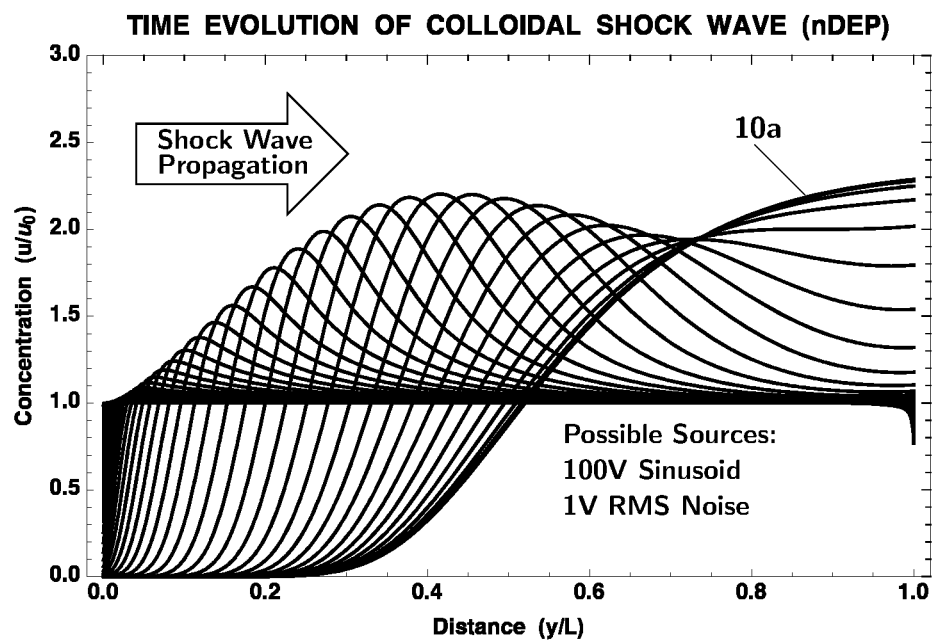
FIG. 10B shows a rapid onset colloidal shock wave for 100V excitation amplitude.

FIG. 10A-B show the time evolution of a DEP induced colloidal shock wave for 1000 V and 100 V respectively. The nDEP reference corresponds to the idea that the Clausius-Mossotti factor is negative due to being driven below the Maxwell-Wigner frequency and ponderomotive forces are opposite to the direction of increasing electric field magnitude. In the current example the electrodes are driven at 100 kHz, see the negative velocities at 100 kHz in FIG. 9. At t<0 the relative concentration is $u/u_0=1$ over the containment region 0<y/L<1. Then at t=0 a 2-phase harmonic excitation is impressed on the electrodes as a step in time and a rapid-onset and exponentially decaying advective flow of nanoparticles begins. The electric field is most intense near the electrodes and decays away from the electrode plane at y=0 so that initial accelerations are high and then quickly decrease.

Figure 11:
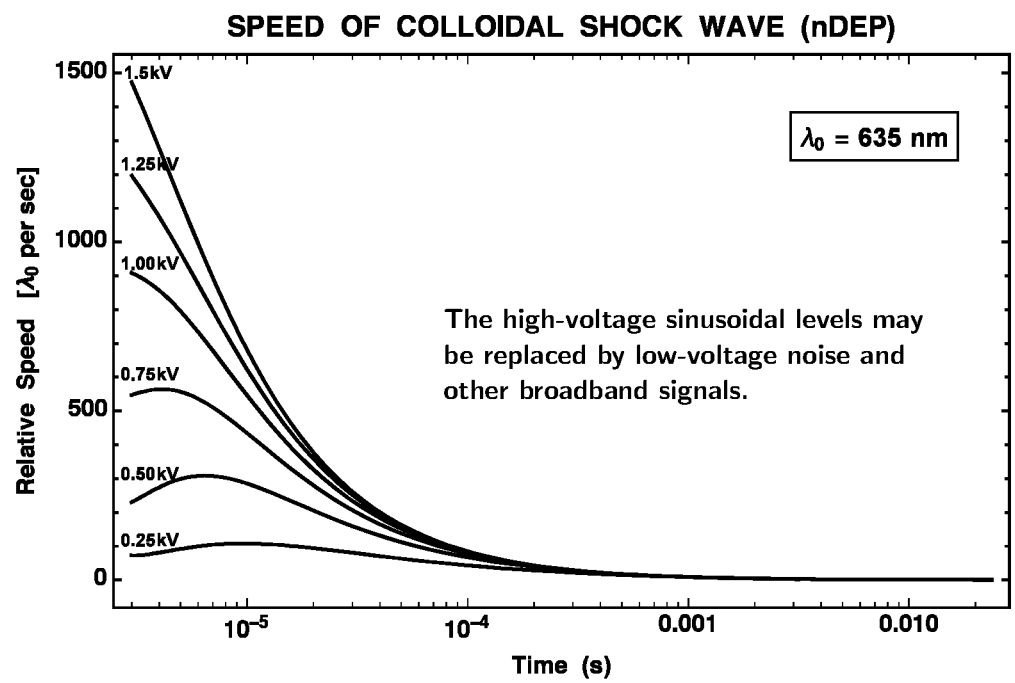
FIG. 11 shows the normalized speed of a nDEP colloidal shock wave as a function of time for different sinusoidal amplitudes. The speed is provided in terms of the wavelength of light.
Figure 13A:
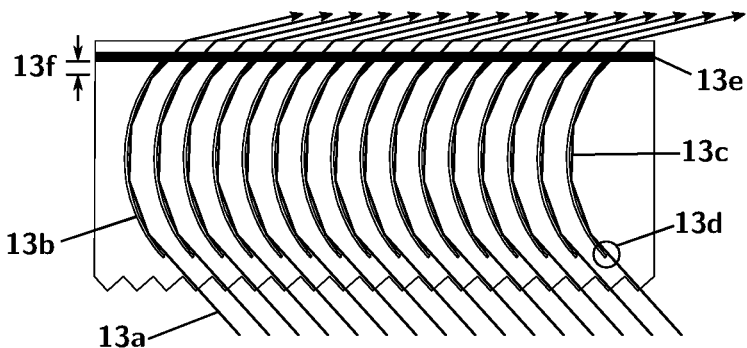
FIGS. 13A-D show a time sequence of a light beam being steered by adjusting the injection depth of index matching fluid into microfluidic control channels as provided in prior art disclosures by the present author.
Figure 13B:
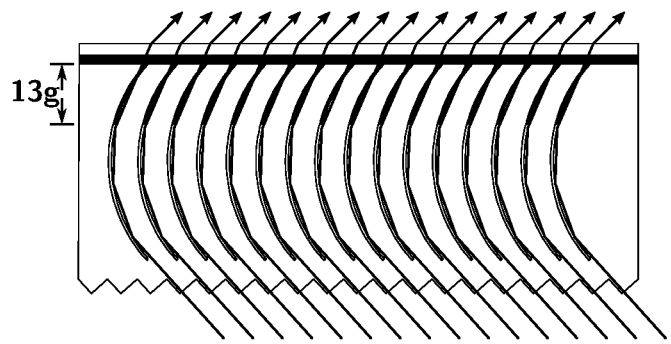
Figure 13C:
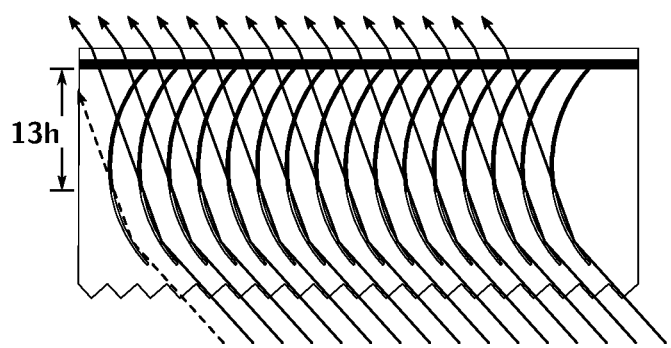
Figure 13D:
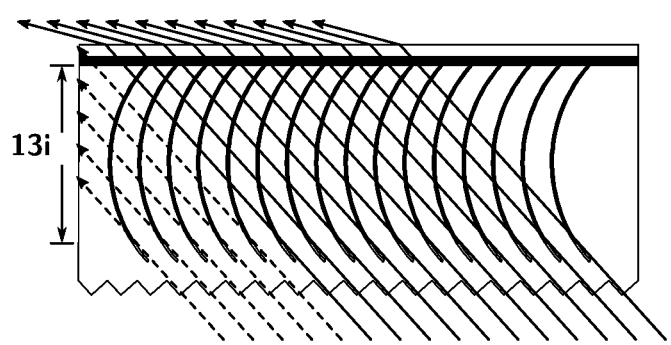

Notice in FIG. 10A how the solid containment wall at y/L=1 causes the wave to "slosh" up the wall all the while keeping the area under the curve constant. FIG. 10B shows the same behavior, but the shock wave does not reach the back wall of the containment volume at y/L=1. Instead, a balance between diffusion forces and advective flow is reached and an "S" shaped steady-state is eventually reached at approximately y/L=0.5. Of course it is not possible for the colloid to support arbitrary concentrations because of the finite diameter of each nanoparticle as described later in more detail in Eqs. 486-487. Additional insights as to the speed and acceleration of the shock wave are provided in FIG. 11, which shows the normalized speed of a nDEP colloidal shock wave as a function of time for different sinusoidal amplitudes. Accelerations of up to 10,000-100,000 optical wavelengths per second per second (in order of magnitude) are also consistent with FIG. 11.

Therefore, it may be advantageous in some applications to have an initial voltage spike to quickly move the nanoparticles away from the wall at y/L=0 and then use very small voltage amplitudes to maintain the nanoparticles away from the wall at y/L=0. This is the basis of an optical switch that can redirect light by total internal reflection. Alternatively, using a noise signal that is high-pass or low-pass filtered with (for example) the zero crossing frequency $\omega_0$ of the Clausius-Mossotti factor $K_R(\omega)$ as one edge of the filter response provides ponderomotive forces using a smaller voltage levels at the expense of using a noise circuit, which is often low cost and even controllable using digital techniques.

It should be noted that light propagation through the optical boundaries formed by the containment walls for the colloid and the colloid itself is not necessary. An amazing alternative is that light can be launched directly into the colloid, parallel or near parallel to the xz-plane and in the region 0<y<L. In this case the light can interact with the colloid over an extended range. For example, by using different voltages on different long-thin electrodes so that $f((x) \neq 1$ then the we can gain control over a two dimensional concentration and refractive index u(x, y, t). If the electrodes are not long thin electrodes, but instead pixelated electrodes, then control over the concentration u(x, y, z, t) for 0<y<L becomes possible by introducing a function g(z) that varies the electrode-to-electrode voltage in the z direction. So for example the electric fields approximately become $$E = E_0[i\hat{x}(x) + \hat{y} + i\hat{z}g(z)]e^{-i\kappa x - i\kappa z}e^{-\beta y} \tag{393}$$

This opens up the possibility of creating an electronically controllable GRIN environment for creating lenses, gratings, holograms, beam steering, switches, shutters, and other optical functions all on demand and under the control of a computer. Thus, the elements of a general purpose broadband, polarization independent opto-electronic computer are provided and in the more narrow case reconfigurable opto-electronic instrumentation and prototype optical breadboards. The use of cartesian coordinates for electrodes is also only an example and electrodes following general curvilinear are possible. This is discussed at length in the section on augmented reality lenses where hyperbolic shaped electrodes and coordinates are introduced to combine the function of a lens and a beam steering device into one device. See for example the discussion associated with FIG. 94A. Thus, combining disparate functions that where hitherto considered to be separate optical functions into one device is a useful, novel and unique capability.

The big picture here is that:
1. A spatial distribution of nanoparticles in a colloid can be controlled by DEP.
2. Rapid onset DEP induces a shock wave if the field-strength is strong enough.
3. At steady state the ponderomotive forces balance diffusive forces.
4. The direction of ponderomotive forces depends on excitation frequency.
5. Voltage changes between electrodes allows arbitrary GRIN in the colloid.
6. A first embodiment has light passing through the control volume.
7. A second embodiment has light remaining within the control volume.
8. Computer controlled and reconfigurable optics becomes possible.
9. Controllable GRIN distributions converts optics design to software design.

It is especially important to note that this technology makes it possible to create an optical "breadboard" where arbitrary optical components are programmed into existence. Such a programmable optical system can be used for making arbitrary optics like lenses, beam steering devices, and may even provide important capabilities for a general purpose classical or quantum optical computer.

Optical Traps and Dielectrophoresis

Dielectrophoresis occurs when a force is exerted on a particle subjected to a non-uniform electric field. This force does not require the particle to be charged, the particle can be metallic, dielectric, anisotropic, etc. All particles exhibit a dielectrophoretic force in the presence of non-uniform electric fields. Also, in this disclosure we are usually interested in harmonic non-uniform fields, though this is not a requirement.

The derivations described in previous sections for ponderomotive forces on particles are by means of harmonic electric fields provided by specific electrode configurations. However, in this section the technique is shown to actually be more general. In particular, the field of trapping atoms, molecules and large-particles (e.g. 100 Trillion atoms are in a blood cell) by intense lasers is described by essentially the same mathematics.

For historical reasons the name "particle trapping" or "optical tweezers" are commonly used. However, laser-based particle trapping is essentially just the application of ponderomotive forces on particles located in a non-uniform electromagnetic field found at the focus of a laser beam. In contradistinction, dielectrophoresis is typically considered to be the use of a dedicated set of conductive electrodes supporting time harmonic voltages from a lumped-parameter voltage source. In the case of dielectrophoresis the harmonic excitation of electrodes is in a frequency ranged very roughly from 1 Hz to 106 Hz, while for optical trapping the excitation frequency is on the order of $10^{15}$ Hz. There is really no restriction on the excitation frequency and other spectral bands are also possible.

The electric fields of a focusing laser approach a maximum magnitude at the location of the focus where the beam is at a minimum cross-sectional area. The symmetry of a focused laser beam can then trap a particle with forces of very roughly 1 pico newton in vacuum at the beam constriction (focus) region. Given the density of elements of the periodic table 1 pico newton corresponds to spheres of very roughly 1-10 microns diameter i.e. about the size a human blood cell. Note that in the case of optical trapping a first order correction to the physics provided by the theory of dielectrophoresis is a scattering force that tends to provide a very slight displacement of the position of the trapped particle equilibrium point, this is not enough of a difference to justify considering optical trapping and dielectrophoresis different phenomena even if the scattering correction is useful to know in some applications. Of course under suitable conditions the light scattering forces can be made very large, i.e. on the order of 100,000 greater than the gravitational force on a nano particle. Therefore, for particle trapping we can choose the parameters of the system so that the trapping forces dominate significantly.

So for this disclosure we shall consider dielectrophoresis, optical particle trapping, and optical tweezers as deriving from the same physical principles. This is made explicit from Eq. 88 and the magnetic analog to Eq. 88. By taking the electric fields from a laser as a Transverse Electromagnetic (TEM) so that both electric and magnetic terms are needed. Taking $E_I = 0$ and $B_I = 0$ then the force density is split between electric and magnetic energy density.

$$\langle \mathcal{F}_{dep} \rangle = \frac{\mathcal{V}}{2} \nabla \left( \frac{\hat{\epsilon}_R}{2} E_R \cdot E_R + \frac{1}{2\hat{\mu}_R} B_R \cdot B_R \right) \tag{394}$$

but in magnitude we can rewrite the second term in terms of electric fields by noting that for TEM waves $E_R = cB_R$, $\hat{\epsilon}\hat{\mu} = 1/c^2$ and from Eqs. 118-129 we see that $$\lim_{\omega \to \infty} \tilde{\epsilon} = \hat{\epsilon}_R = 3\epsilon_L K_\infty. \tag{395}$$

Therefore, on multiplying through by the volume of a spherical particle from Eq. 89 and using equal phases for electric and magnetic fields we obtain the force from the force density on a single particle as $$\langle F_{dep} \rangle = \frac{4}{3} \pi b^3 \left( \frac{3\epsilon_L K_\infty}{2} \right) \nabla (E_R \cdot E_R) \tag{396}$$

or on plugging in the expression for $K_\infty$ we get on further multiplying and dividing by c $$\langle F_{dep} \rangle = \frac{2\pi b^3}{c}\left(\frac{\epsilon_S - \epsilon_L}{\epsilon_S + 2\epsilon_L}\right)\nabla(c\epsilon_o\epsilon_L E_R^2) \quad (397)$$

$$= \frac{3\mathcal{V}}{2}\frac{K_\infty n_L}{c_o}\nabla I \quad (398)$$

where c is the speed of light in the medium $\epsilon_L$. However, $c=c_o/n_L$, where $c_o$ is the free space speed of light, $n_L=\sqrt{\epsilon_L}$, $n_S=\sqrt{\epsilon_S}$, and by Poynting's theorem we find that the irradiance is $I=c\epsilon_o\epsilon_L E_R^2$ [W/m²] so that $$\langle F_{dep} \rangle = \frac{2\pi b^3 n_L}{c_o}\left(\frac{m^2-1}{m^2+2}\right)\nabla I \quad (399)$$

where $m=n_S/n_L$. Equation 399 is the classical equation for the confining force formed by an optical trap and it was derived directly from the equations for dielectrophoresis. The only real difference in the derivation to that of electrode-based DEP is the inclusion of the magnetic energy density term $B_R^2/(2\hat{\mu})$ to account for TEM wave propagation instead of having physical electrodes. The subscript L is now interpreted as liquid or as any other medium within which the particle is being trapped—for example a vacuum or a gas.

To understand the scattering forces we first note that the energy density U [energy per unit volume] has the same base units as a pressure $\mathcal{P}$, i.e. a force per unit area, and it can be shown that $$\mathcal{P} = U = \frac{\hat{\epsilon}_R}{2}E_R \cdot E_R + \frac{1}{2\hat{\mu}_R}B_R \cdot B_R = \hat{\epsilon}_R E_R \cdot E_R \quad (400)$$

The energy flux is then $$S = \frac{U(cA\Delta t)}{A\Delta t} = Uc. \quad (401)$$

Moreover, the scattering force will be related to the time rate of change of the momentum density $p_v$ as light passes through a volume $A \Delta t$ of the medium so that $$U = \frac{S}{c} = \mathcal{P} = \frac{F}{A} \quad (402)$$

and $$F = A\frac{S}{c}, \quad (403)$$

which can be time averaged whereby $\langle S \rangle = I$ is the irradiance and the average scattering force on a particle is then $$\langle F_{scat} \rangle = A_{scat}\frac{I}{c} \quad (404)$$

where $A_{scat}$ is the scattering cross section. If we assume that the refractive indices of the medium is $n_L$ and the solid particle $n_S$ are not complex then the irradiance is $$I_{scat} = If(\mathcal{V}, r, \lambda, n_L, n_S) \quad (405)$$

where I is the incident irradiance, $\mathcal{V}$ is the particle volume, r is the distance between the particle and the observer, $\lambda$ is the wavelength in the medium and $f$ is a function to be determined. Clearly we must have that $f$ is dimensionless because $I_{scat}$ and I have the same units. Therefore, based on unit analysis and our expectation that the intensity falls off as the square of the distance from the particle we expect that $$I_{scat} = Ig(n_L, n_S)\frac{\mathcal{V}^2}{r^2\lambda^4}, \quad (406)$$

where g is a to-be-determined function of the refractive indices. It is interesting to note that this $\lambda^{-4}$ factor causes the blue end of the visible spectrum to scatter more strongly and causes a blue sky on earth.

A more detailed analysis, for example see chapter 3 of "*The Scattering of Light and Other Electromagnetic Radiation,*" by Milton Kerker, published in 1969, which provides $$A_{scat} = \frac{8}{3}\pi(kb)^4 b^2\left(\frac{m^2-1}{m^2+2}\right)^2 \quad (407)$$

where $k=2\pi n_L/\lambda_0$ so on using $c=c_o/n_L$ we get $$\langle F_{scat} \rangle = \frac{128\pi^5 b^6}{3c\lambda_0^4}\left(\frac{m^2-1}{m^2+2}\right)^2 n_L^5 I\hat{\tau}. \quad (408)$$

where $m=n_S/n_L$, $n_S$ is the refractive index of the sphere and $n_L$ is the refractive index of the surrounding medium and $\hat{\tau}$ is a unit vector in the direction of the incident radiation onto the particle. The surrounding medium may be vacuum, gas or liquid in general. To have a stable optical trap, the gradient force must be much lager than the scattering force. Alternately, to have particle acceleration we must have the scattering force is greater than the trap forces.

The main point of this section is that ponderomotive forces from electrodes or from non-uniform light fields are nearly identical in the underlying phenomena and can be considered to be variations on the same idea of position and orientation control of material particles by non-uniform and harmonic electromagnetic fields. In the case of DEP with electrodes the magnetic field is often ignored as part the quasi-electrostatic approximation used to simplify the math, but in reality magnetic fields are still there, but smaller in effect. In the case of DEP with a focused laser (or other spatial variations in the light field) there are both electric and magnetic fields working together to propagate the light in free space and the quasi electrostatic approximation is not used.

Generalized Phoresis and Self-Propelled Particles

Much of this disclosure focuses on the specific example of dielectrophoresis as a means to control the distribution of particles in a colloid or suspension. However, this is only one form of phoresis. In general, phoresis is a process whereby a non-uniform quantity (e.g. an electric field, a magnetic field, a light intensity field, etc.) provides a force on a particle. Other forms of phoresis are possible and these phoretic processes may also control scattering and the propagation of light.

For example, a previous section showed how fast acting electronics can cause a colloidal shock wave for fast optical switching. However, under certain conditions, even faster motion of particles is possible using smaller electric field amplitudes and smaller voltages on electrodes. To achieve even faster refractive index changes that already described carefully designed self-propelled particles are introduced into the colloid that derive their energy from the environment e.g. from light.

The self-propelled particles have a definite orientation that is defined by the direction that the particles move when activated. Moreover, the self-propelled particles may take specific orientations relative to the external environment when they are under the influence of impressed torques from at least one of electric and magnetic fields. Alternately, the particles may have random orientations even in the presence of at least one of electric and magnetic fields if the impressed torques are applied by oscillating fields that act too fast for the mechanical rotation of the self-propelled particles to response.

Thus, a new advective flow exists when all self-propelled particles are in coordinated motion and all particles are oriented in the same direction locally. Alternately, a new effective diffusion constant of the particles exists when the orientation of the particles is random. This new effective diffusion constant is typically much greater than the diffusion constant when the particles are not self-propelled.

Nano and micro-scale particles in a liquid move in a typically low Reynolds number environment where viscous dissipation of the particle motion overcomes the effects of fluid momentum. Therefore, if a micro or nano-scale self-propelled particle design is based on a "swimming machine" that tries to mechanically swim in a colloidal environment (e.g. perhaps using a propeller) then the swimming will not occur and the particle will fail to move. An analogy is that of a human trying to swim in a pool of thick viscous honey so that the mechanical effort of swimming is substantially nullified by viscous dissipation. Therefore, to provide self-propelled particles in colloid requires a different approach than mechanical propulsion.

One such non-mechanical approach to self-propelled particles is based on self-induced phoretic processes. In particular, phoresis (or a phoretic process) is the motion of particles due to a gradient of a specific quantity. There are actually many kinds of phoresis that are based on different gradient quantities and they can provide particle forces and motion. A partial list of phoretic processes includes gradients by:

Acoustophoresis (ACP)—Sound waves
Anaphoresis (AP)—Negatively charged anion particles
Cataphoresis (CP)—Positively charged cation particles
Chemophoresis (CHM)—Chemical reactions giving thermal gradients
Dielectrophroesis (DEP)—Electric fields for any particle type
Diffusiophoresis (DP)—Motion of species A due to a gradient in species B
Diffusioosmosis (DO)—Capillary osmosis due to concentration gradient only
Electrophoresis (EP)—Electric charges in a uniform E-field
Electromagnetophoresis (EMP)—Electromagnetic field (e.g. focused laser)
Thermophoresis (TP)—Temperature
Magnetophoresis (MP)—Magnetic fields for magnetic particles
Optophoresis (EMP)—Same as Electromagnetophoresis Each of these phoretic processes (and others) is usually thought of as being externally induced. However, there is also the ability of having self-induced phoretic processes. This is described in detail in the summary article entitled, "*Microswimmers With No Moving Parts*," by Jeffery Moran and Jonathan Posner in the May 2019, volume 72, number 5 issue of Physics Today on pages 44-50.

Of particular interest to us here is the observation that self-propelled particles may be formed by processes including: self-electrophoresis, self-diffusiophoresis, and self-thermophoresis. These processes are often created by means of particles having bilateral symmetry with opposite-facing sides with different material and chemical properties. These particles are called Janus particles, in reference to the two-faced Roman god of beginnings and endings.

Therefore, externally applied dielectrophoresis, as has been discussed throughout this disclosure, may be augmented by internally impressed forms of phoresis. Alternately, dielectrophoresis may be replaced by any suitable external phoretic process, which may then be augmented by internally impressed forms of phoresis.

An example Janus particle is a dielectric nano-sphere of titanium dioxide with half of the particle's exterior coated in a thin layer of gold. Such a particle, when mixed with pure water (i.e. having low conductivity) and subjected to ultraviolet (UV) light, will self-propel through the liquid with the gold side of the Janus particle in the direction of the velocity of motion. Such a particle is capable of self-propulsion under very low light conditions As the particles are in random orientations so too are the self-propelled directions unless external fields of suitable oscillating frequency are applied. See for example the article entitled "*Highly Efficient Light-Driven TiO$_2$—Au Janus Micromotors*," by Renfeng Dong, et. al. ACS Nano 10, 839 (2016) having DOI:10.1021/acsnano.5b05940.

In this case the gradient that is formed is based on electron-hole pairs. The UV light causes electron-hole separation and an electron current to flow form the TiO$_2$ to the gold, while chemical reactions occur on the gold and TiO$_2$ surfaces so that a self generated electric field is generated about the particle and the field interacts with the charges to produce a self-induced propulsion force based on electrophoresis. This is called self-electrophoresis and it requires that the liquid medium have very low conductivity so that the electric fields are as large as possible and localized. Therefore, if a plurality of half-gold-coated TiO$_2$ microspheres are located in water and exposed to sunlight then the UV portion of the sunlight will cause the particles to self-propel. Alternatively, if the particles are in a stronger UV light field then the self-propulsion will be even more pronounced.

The enhancement in the diffusion coefficient of randomly oriented self-propelled particles compared to a normal unstructured nano-sphere of the same size can be as much as 30,000 or possibly more. The above cited article by Moran and Posner notes that phoretic self-propelled particles can move so fast that they cover a distance of 100 body lengths per second. By way of comparison, a Ferrari-488 sports car moving at its top speed of 205 mph (330 km/hr) only moves about car lengths per second. Moreover, the direction of the self-propulsion can be controlled by the addition of an external directional bias, like that provided by a DEP-process. As has been discussed herein this my be utilized for controlling light scattering and bending light.

In addition to self-propelled particles based on phoretic processes, it also possible to have self-propelled particles based on non-phoretic processes. An example is a chemical reaction on one side of the particle that causes the release of particles that provide asymmetric moment change.

From conservation of mass we have that the net particle flux j=j(r, t) flowing through the surface ∂Ω of a volume Ω must obey the relation $$\int_{\partial\Omega} j \cdot dA = -\frac{d}{dt}\int_{\Omega} u\,dV + \int_{\Omega} R\,dV \qquad (409)$$

so that the particle flow out of the volume is equal to the time rate of decrease in the particle concentration u=u(r, t) in the volume plus the particles generated per unit volume Q=Q(r, t). This gives the well-known continuity equation $$\nabla \cdot j + \frac{\partial u}{\partial t} = Q. \qquad (410)$$

The particle flux is an aggregation of many potential types including: diffusion (diff), external phoretic (xp), self-phoretic (sp), and other non-phoretic (np) fluxes so that $$j = j_{diff} + \underbrace{j_{acp} + j_{ap} + j_{cp} + j_{dep} + j_{dp} + j_{ep} + j_{emp} + j_{tp} + j_{mp} + \ldots}_{External-Phoretic\ (xp)} + \qquad (411)$$

$$\underbrace{j_{ACP} + j_{AP} + j_{CP} + j_{DEP} + j_{EP} + j_{EMP} + j_{TP} + j_{MP} + \ldots}_{Self-Phoretic\ (sp)} + j_{NP}$$

where for example the terms that would survive for phoretic light control by DEP and self-electrophoretic self-propelled particles are $$j_{diff} = -D\nabla u \qquad (412)$$

$$j_{dep} = u\gamma/\{\nabla(\gamma_1 E \cdot E) + V \times (\gamma_2 E_I \times E_R)\} \qquad (413)$$

$$j_{EP} \approx \gamma\gamma_3 u I_{uv} \hat{E} \qquad (414)$$

where $I_{uv}$ is the UV irradiance, E is the unit vector of the electric field that sets the local direction of the coordinated motion of the self-propelled $TiO_2$—Au Janus particles, $\gamma$ is the intrinsic mobility, $\gamma_3$ is the relative mobility.

Therefore, at least one suitable external phoretic process, such as but not limited to dielectrophoresis, may work alone or in combination with at least one internal phoretic process to modify the scattering properties of a colloid or suspension to allow substantial control over light scattering and the direction of propagation of light. Self-propelled particles are one manifestation of this process and can provide additional degrees of freedom for controlling light from all bands of the electromagnetic spectrum.

Materials Considerations for Optical Dielectrophoresis

For an optical colloid containing transparent solid nanoparticles a midrange of refractive indices is obtained by using different kinds of well-known glass, which can provide a refractive index ranging from roughly 1.5 to 1.9.

However, for nanoparticles with extremely high refractive index the range of potential materials is more restrictive. A first example is diamond (dust), which has a refractive index of 2.417 at 589.29 nm wavelength. A second example is gem quality silicon carbide, which has a refractive index of 2.650 at 589.29 nm wavelength. A third example is the common titanium dioxide (rutile), which has an ordinary refractive index of 2.621 and an extraordinary refractive index of 2.919 at about 589.29 nm wavelength, this provides an average refractive index of 2.770 for random oriented nanoparticles at about 589.29 nm wavelength. A fourth example is gem quality strontium titanate, which has a refractive index of 2.410 at 589.29 nm wavelength. A fifth example is lonsdaleite also called hexagonal diamond, which has been made in the lab and is 58 percent harder than natural diamond, with a refractive index of about 2.404. A sixth example is Barium Titanate having a refractive index of 2.426 at 589.29 nm wavelength. A seventh example is Corundum, which is a transparent crystalline form of aluminum oxide ($Al_2O_3$), having a hardness of 9.0 on the Mohs scale, it also has an ordinary and extraordinary refractive index of 1.77 and 1.76 respectively and a melting point of 2044° C. Corundum may also fluoresce or phosphoresce under UV light.

An eighth example are garnets, which come in many colors including colorless. Most garnets are colored, however colorless Leuco Garnets have a refractive index roughly between 1.715 and 1.735, which is a cubic crystal so that it has a single isotropic refractive index. A generic chemical formula of garnet is $A_3B_2(SiO_4)_3$. The A and B sites can be partially filled by calcium, magnesium or aluminum ions, none of which cause colorations. If no chromophores are in the A and B sites, e.g. only calcium and aluminum, then garnets exhibits diamagnetism.

The sites A or B can also be iron (providing purplish red, brown, yellow crystals), manganese (orange, pink), chromium (red, green), and vanadium (green). In principle, the diamagnetism of colorless gannet can be used in the presence of a strong magnetic field to provide additional forces on nanoparticles in a liquid medium. Alternately, colored iron garnets are some of the most magnetic gemstones and are ferrimagnetic, for example Yttrium Iron Garnet (YIG) and is transparent for light that is above 600 nm wavelength. It is anticipated that the force on a YIG nanoparticle from an external magnetic field would be more pronounced than for diamagnetic systems (and oppositely directed) and could be used instead of a DEP related force in certain light control applications.

The low-frequency (i.e. very roughly less than 1 MHz) dielectric properties of solids varies considerably from material to material. Most of the materials listed above have a high dielectric constant. For example, rutile has a dielectric constant in its principle crystallographic directions of 100 and 175, so that on average a nanosphere would have a dielectric constant of about 138. See for example "*Static Dielectric Constant of Rutile,*" by R. A. Parker, Physical Review Vol. 124, Number 6, December 1961. Similarly Barium Titanate has a dielectric constant of about 2000 at room temperature. A high value for the low-frequency dielectric constant tends to restrict the Clausius-Mossotti factor $K_R$ of Eqs. 131-132 to take on only positive (or only negative) values so that besides zDEP only pDEP (or nDEP) are available for controlling light.

In comparison to many other materials, diamond nanoparticles prepared by chemical vapor deposition and other means has a dielectric constant of about 5.7 and is transparent from the Ultraviolet (about 230 nm) to the far infrared. This is especially attractive for automotive LiDAR work where 1550 nm is desired for an eye-safe region and also for defense applications. Moreover, a wide band gap means that there is no thermal generation of charge carriers at elevated temperatures. This eliminates the phenomena of thermal run away under intense laser irradiation as might be found in LiDAR applications.

Additionally, diamond does not become nonlinear at high radiation intensities. The above properties, coupled with high thermal conductivity, chemical stability, mechanical stability, a loss tangent of about 0.00005 and a dielectric strength of $10^6$V/cm give excellent life expectancy properties to the material. Diamond may however require coatings, such as surfactants, added to maintain colloidal stability to avoid precipitation out of the liquid-solid mixture. The low dielectric constant and the low loss tangent at low-frequencies makes a single colloid providing nDEP, pDEP and zDEP through $K_R$ possible at electrode excitations less than about 1 MHz. Diamond nanoparticles are available with sizes less than 10 nm.

Nanoparticles may also be structured. One form of structured nanoparticle is one with a void therein to lower the effective refractive index of the surrounding medium. An example of a particle that can be used for this purpose is a fullerene like C60, C200 and nanotubes, which are all cage molecules. Another example of a cage molecule are borospherenes. Additionally, derivatives of cage molecules formed by chemical structures attached externally to the cage molecule as well as endohedral forms of cage molecules, which enclose other atoms like nitrogen therein may be useful in applications like DEP-enhanced quantum computing.

Nanoparticles may also be structured so that they are of the Janus type, with different material properties on at least two sides. This provides a means for self-phoretic processes that self-propel the particles with energy derived from the environment. This can enhance the diffusion process and lower the required fields for distributing the nanoparticles.

For an optical colloid the liquid is desired to be transparent, colorless, low toxicity and low cost. Such liquids having a low refractive index are more common than the extremely high refractive index solids. For example silicone fluids are extremely stable against thermal oxidation. In particular, the dimethyl silicone fluid remains essentially unchanged when exposed to temperatures up to 150° C. in air. Methylphenyl silicone fluid exhibits even better heat resistance than dimethyl silicone fluid and can be used for long durations in environments reaching 250° C. Silicone fluid also has excellent low-temperature resistance to changes. For example dimethyl silicone fluid remains a liquid even at −50° C. Methylphenyl silicone fluid remains a liquid even in environments of −65° C. Moreover, the ambient temperature has little effect on the fluid's viscosity. The refractive index of the methylphenyl silicone fluid called methylphenylpolysiloxane is about 1.498 at 589.29 nm wavelength. This refractive index can be further decreased in the liquid state with additives like ethyl acetate (refractive index of about 1.370) and ethanol (refractive index of about 1.372) if needed. Ethanol also has a large usable temperature range and may be used by itself. The chemical stability of the liquid is further enhanced by hermetic containment, and the elimination of dissolved oxygen gas by exposure to a vacuum. Isopar, a form of synthetic isoparaffins, is also a transparent liquid that has: a low freeze point, good chemically stability, low electrical conductivity, low surface tension for good wetting and spreading properties. Finally, even water with a dissolved salt like potassium chloride to set the conductivity can be used in some applications.

The external solid materials used to define the μFCC in the devices are glass, transparent plastics (e.g. acrylic) that has a refractive index of 1.4905 at 589.29 nm wavelength. Additionally, materials like semiconductors often can have transparent spectral windows outside of the visible spectrum, where some applications may require transparent materials e.g in the infrared and ultraviolet.

The above mentioned materials are only representative and other materials, particle shapes, particle structures, etc. are possible.

Light-Beam Steering by Dielectrophoresis

Introduction to Beam Steering

There is almost no end to the number of potential applications of broadband, polarization diverse, low-to-high power light beam steering. Some of the applications include: automotive LiDAR, electronic steering of illumination lights, robotic vision, power beaming to keep drones fling over extended periods, dynamic private and/or covert point-to-point communications, bar-code readers, high-power fiber lasers, additive 3D-printing, subtractive laser machining, free-space network links for a local and private covert moving computer network, laser light shows for entertainment, optimized hydroponic lighting, remote chemical & bio-hazard monitoring, bridge inspection, sensor drones, active lightning suppression (by draining clouds of excess charge with UV lasers), wind-sheer monitoring for aircraft, topography mapping, bathymetry mapping, surveying, GIS for natural resource management, augmented reality sensors, drought monitoring, drone collision avoidance, drone based structural inspection, construction site monitoring, security, and many others.

The beam steering described below provides a large field-of-view, including spherical, hemispherical, and circular thereby providing flexibility in LiDAR coverage. This is very useful for LiDAR for autonomous cars and drones.

Circular Trajectory Beam Steering

The current discussion is about the steering of a light beam in a circular trajectory for achieving large angular turning of a light beam. For example, this large field of view is especially useful for automotive and drone LiDAR applications where the surroundings of the vehicle are critically important. Having built up the needed physics in the previous sections we will next consider light beam steering along a planar circle using only a harmonic excitation $\cos(\omega t)$ between two electrodes configures into a V-shape that are not parallel and positioned along flat or curved surfaces.

As an introduction to DEP-based circular beam steering it will prove instructive to first consider the work of the current author as provided in FIG. 12A, wherein a circular μFCC 12a is cut into a transparent dielectric 12b block. The channel is filled with a vacuum except for a small region that contains a small quantity of IML 12c, which is positioned at the location shown by means of advection induced by electronics e.g. electrowetting or dielectrophoresis of fluid drops. The electronics to accomplish advection is not shown to keep the figure uncluttered and general, but in general requires electrodes along the μFCC. Two rays are input 12d (source not shown) and are directed in a counterclockwise propagation direction 12e around the inside boundary of the μFCC guide and the resulting output rays 12f are shown to diverge on as external output rays 12g outside the transparent dielectric.

Two possible states of the refractive index as "seen" by the laser beam are shown in FIG. 12B, which represents the refractive index towards the direction arrows 12h and 12i. The inside radius of the circular μFCC is $(\xi_0-\delta\xi)$, the outside radius is $(\xi_0+\delta\xi)$ and the center is at radius $\xi_0$. As can be seen the refractive index in the μFCC varies between the vacuum refractive index 12j and $n_0$, which is the solid medium refractive index 12k.

The extent of the total angular divergence of the output rays in FIG. 12 may be shown by analytic ray tracing to be $$\theta_T \approx 2\cos^{-1}\left[1 - \left(\frac{d}{\xi_0}\right)\right], \tag{415}$$

when $\xi_0 \gg \delta\xi$ where $\xi_0$ is the radius of curvature and d is the diameter of the collimated input light source. When $\xi_0$ is large or d is small the divergence can be made to approach zero. Another approach is to approximate the circle by straight μFCC segments (that have $\xi_0 = \infty$) so that $\theta_T = 0$.

To better see how the apparatus of FIG. 12A is used in applications, which is instructive when comparing other forms of beam steering to this disclosure, consider the prior-art FIG. 13. FIG. 13 shows a time sequence of light steering from "horizon-to-horizon" for incident light 13a that has a fixed input direction. The light is redirected by the microfluidic control channels, an example of which is 13b, that supports gallery rays such as 13c. The leading edge of the microfluidic control channels is 13d. The output side of the beam steering device in this example has a IML reservoir 13e. FIG. 13A shows the steered rays for the case when the IML injection depth 13f is near zero. FIG. 13B shows the steered rays for the case when the IML injection depth 13g is larger than 13f. FIG. 13C shows the steered rays for the case when the IML injection depth 13h is larger than 13g. FIG. 13D shows the steered rays for the case when the IML injection depth 13i is larger than 13h and almost completely fills the microfluidic control channel. The actuation system is not drawn in FIG. 13 to reduce clutter and focus the reader's attention towards the optical configuration. A more detailed description can be found in U.S. patent application Ser. No. 15/480,053, *"Wide Angle, Broad-Band, Polarization Independent Beam Steering and Concentration of Wave Energy Utilizing Electronically Controlled Soft Matter,"* by Leo DiDomenico (the current author of this disclosure), filed on 2017 Apr. 5.

To overcome the problem of light divergence and the need for liquid advection we consider FIG. 14A, where a continuous (non-segmented) μFCC 14a is located. Input rays 14b are launched within the μFCC in a counterclockwise propagation direction 14c source not shown.

An IGL 14d completely fills the μFCC and it is controlled electronically to form a refractive index gradient on demand. The idea is to form a gradient to steer the light without divergence of the rays until just the correct position is encountered by the rays, at which point we electronically spoil the Graded Refractive INdex (GRIN) in the gradient spoiled region 14e and remove the gradient and launch the beam out of the μFCC into output rays 14f. In this case the channel is filled completely with liquid that typically does not flows, but responds to electric fields passing through it to form a GRIN channel. The electrodes and composition of the liquids used to form the electric fields are not shown in FIG. 14A, but are described in more detail later in this disclosure. Ultimately the output rays leave the solid transparent material 14g as external output rays 14h. The shape of the solid transparent material may be in any convenient shape, but it is shown as a square (a cube in three dimensions) in FIG. 14A.

Next, we develop the required refractive index gradient profile as seen looking towards the direction arrows 14i and 14j so that circular propagation is maintained. The required linearized refractive index 14k gradient is then shown in context in FIG. 14B.

In particular, from FIG. 14 at a circular radius $\xi$ the refractive index is n and at a radius $\xi + \delta\xi$ the refractive index is $n+\delta n$ and at radius $\xi - \delta\xi$ the refractive index is $n-\delta n$. Then the optical path length at the circular radius $\xi$ is $OPL_1 = \theta \xi n$, where $\theta$ is the angular are that one side of the laser beam traverses in FIG. 14A. The larger radius of the laser beam must then accrue an optical path length of $OPL_2 = \theta(\xi + \delta\xi)(n+\delta n)$. For non-diverging trajectories we would need $OPL_1 = OPL_2$ so after rejecting second-order differentials and taking the limit to infinitesimals we find that $$\int \frac{d\xi}{\xi} = -\int \frac{dn}{n} + C \tag{416}$$

$$n_{cir} = n_0\left(\frac{\xi_0}{\xi}\right), \tag{417}$$

where $n_{cir}$ is the refractive index needed for a circular trajectory of the beam and the constant of integration C was determined by assuming that at $\xi = \xi_0$ the refractive index is $n=n_0$. Next we take the Taylor expansion of the refractive index to first order to linearize the equation about $\xi=\xi_0$, the result is $$n_{cir} \approx n_0 - \frac{n_0}{\xi_0}(\xi - \xi_0). \tag{418}$$

A μFCC having a width of $(2\delta\xi)$ symmetrically about $\xi_0$ at the center of the μFCC would then provide a refractive index at the inner and outer channel boundary of $$n_{cir}(\xi_0 \pm \delta\xi) \approx n_0 \mp n_0\frac{\delta\xi}{\xi_0} = n_0 \mp \delta n, \tag{419}$$

where $\delta n = n_0(\delta\xi/\xi_0)$, as shown in FIG. 14B. For example, if we wanted to make the optics "big" then we might choose $\xi_0 = 25$ mm, $\delta\xi = 0.25$ mm (i.e. a channel width of 0.50 mm) and $n_0 = 1.50$. Then we find that $\delta n = 0.0150$ and this is possible for certain liquid mixtures that provide more than $2\delta n = 0.030$ of refractive index change.

One of the key points to be made in the above example is that the ratio of $\delta\xi/\xi_0$ sets the amount of change in the refractive index needed. Moreover, as the μFCC are small in width $2\delta\xi$ the ratio $\delta\xi/\xi_0$ can be made very small, thereby keeping the needed refractive index change small even with circular beam steering of $2\pi$ radians and so practical colloids are available for the IGL.

In FIG. 14B, the required linearized refractive index 14k is spoiled by changing the amplitude or frequency of a DEP based IGL. The gradient spoiled region 14e of the device corresponds to uniform refractive index region 14m region in FIG. 14B. The uniform refractive index region 14m may be set equal to the refractive index of the solid transparent material 14g as shown by the solid refractive index regions 14n and 14o. Refractive index regions 14n and 14o may also be higher or lower than $n_0$ to facilitate containment of the beam in the presence of imperfections in the manufactured DBS device. Note that the gradient spoiled region 14e obtains its uniform refractive index by changing the voltage level or the frequency on electrodes that are energizing the gradient spoiled region 14e. The electrodes for this operation are not shown in FIG. 14 to avoid cluttering the figure.

The IGL comprises a mixture of one or more liquids with one or more nanoparticles types therein (with potentially many millions of individual particles) so that the bulk refractive index is a spatial average over the properties of the liquids and solid particles. In this way controlling the spatial distribution of solid particles in liquids also controls the volume average refractive index. This can be accomplished at fast electronic speeds, without the need for liquid advection.

Next, we will consider FIG. 15 and assume that we have an expression v(r) for the steady state concentration of nanoparticles in a colloidal suspension. Then for the geometry that we have shown in FIG. 14 we have a one dimensional problem and r→r. Additionally, we can write the steady-state nanoparticle concentration as $v(r)=u(r, \infty)$ so that Eq. 235 becomes $$n(r)=n_L+v(r)\mathcal{V}(n_S-n_L). \quad (420)$$

Near the radius of $r=r_0$ we can use a Taylor approximation to rewrite this as $$n(r) \approx n_L + \left\{v(r_0) + \frac{dv(r_0)}{dr}(r-r_0)\right\}v(n_s-n_L). \quad (421)$$

Moreover, we can now equate Eq. 421 to Eq. 418 after we first relate the coordinate system in FIG. 14 to the coordinate system in FIG. 15A.

Note that in FIG. 15A the apex of the DEPS electrodes is pointing towards the symmetry axis of rotation of the electrodes and this forms the circular channel in FIG. 14. Said another way, FIG. 14 provides a top view and FIG. 15 provides a cross sectional view that includes the center of the device and electrode orientation is as shown. The beam steering device 15a has a circular μFCC having electrodes 15b and 15c. Internal to the beam steering device is a wedge shaped μFCC that contains the refractive IGL 15d. A collimated light beam 15e is propagating into the page and out of the page on the other symmetric side. FIG. 15B is identical except that the orientation of the wedge is reversed and this will require $K_R<0$ compared to FIG. 15A, which requires $K_R>0$. Note that $-r_0$ is used as the coordinate convention as shown in FIG. 15B.

From FIG. 15A we can see that $$\xi=R+r \quad (422)$$

$$\xi_0=R+r_0 \quad (423)$$

where R is the distance from the axis of rotation to the point where the electrodes would intersect and $r_0$ is the position of the portion of the μFCC used to control the optical radiation. We can rewrite Eq. 418 as $$n_{cir} \approx n_0 - \frac{n_0}{R+r_0}((R+r)-(R+r_0)) \quad (424)$$

$$= n_0 - \frac{n_0}{R+r_0}(r-r_0).$$

Therefore, on setting the required $n_{circ}$ equal the DEPS based n we obtain $$n_L + v(r_0)(n_s - n_L)v + \frac{dv(r_0)}{dr}(r-r_0)(n_S-n_L)v = \quad (425)$$

$$n_0 - \frac{n_0}{R+r_0}(r-r_0),$$

which we can see by matching coefficients of $(r-r_0)$ that $$n_0 = n_L + v(r_0)(n_s - n_L)v \quad (426)$$

$$-\frac{n_0}{R+r_0} = \frac{dv(r_0)}{dr}(n_S - n_L)v, \quad (427)$$

which can be used to eliminate $n_0$ so that $$\frac{1}{v}\left(\frac{n_L}{n_L - n_S}\right) + v(r_0) + (R+r_0)\frac{dv(r_0)}{dr}. \quad (428)$$

This is the high-level master equation that must be satisfied for a light beam to move in a circular trajectory at DEP steady-state. To go any further we must solve the quasi-electrostatic boundary value problem for the electric fields generated by the electrodes and then solve the DEP master equation Eq. 231 under steady-state conditions. Finally, note that the case of FIG. 15B is obtained by setting $r_0 \to -r_0$ in the above equation.

Figure 16:
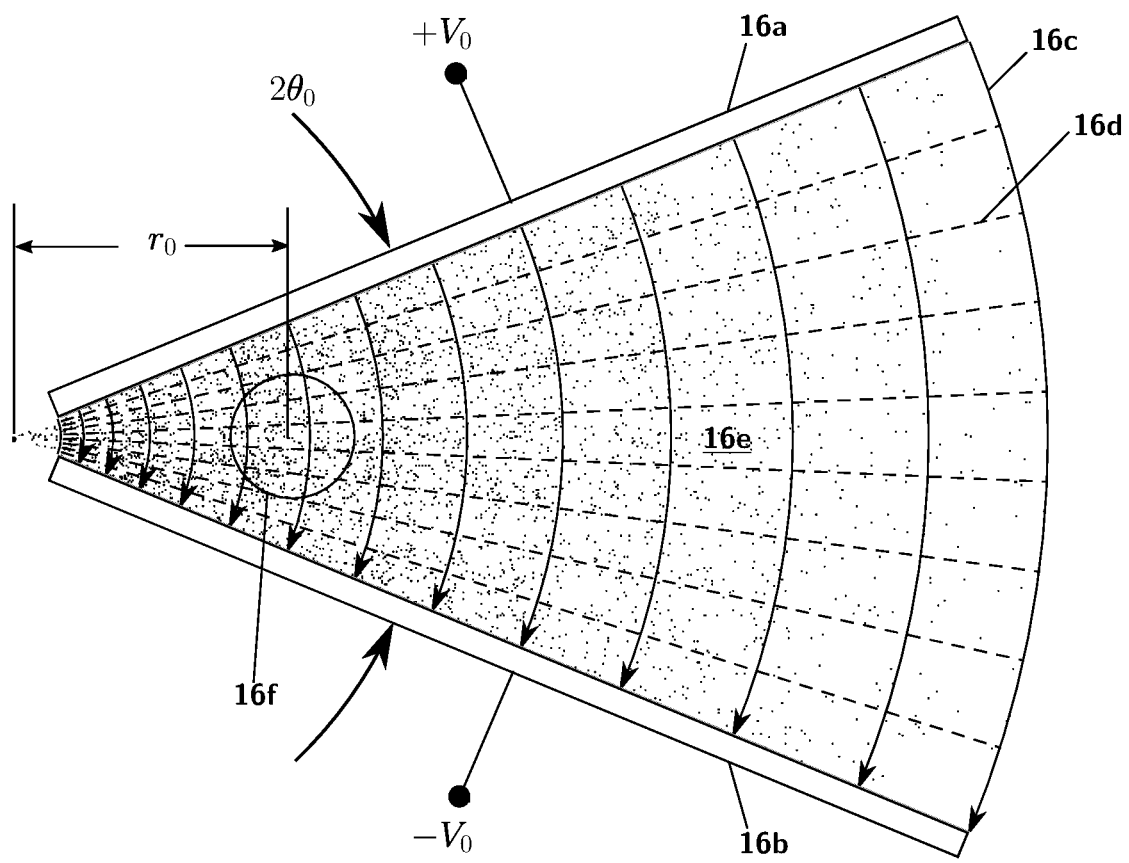
FIG. 16 shows the cross section of electrodes and refractive index gradient liquid at steady-state conditions when the real part of the complex Clausius-Mossotti factor is greater than zero for a light beam propagating into the page of the figure.

With that objective in mind, consider an example arrangement of two electrodes as shown in cross-section in FIG. 16 where an angle of $2\theta_0$ is formed between two flat electrodes 16a and 16b. The electrodes form a v-shape or wedge shape and follow a circular arc that follows the electric field 16c in the plane of the page and can also form a circular μFCC in the direction into the plane of the page. The total voltage amplitude between the electrodes is $2V_0$, i.e. from $+V_0$ to $-V_0$, and there are dashed constant potential lines such as 16d. The volume between the electrodes is filled with a nanoparticle colloid that forms a IGL 16e. The gradient of the IGL is represented in the figure by the density of dots shown and the density of nanoparticles is greatest near the apex of the electrode wedge. In this region is a light beam 16f that propagates into the plane of the page and is redirected into a circular trajectory as the light propagates into the page along the circular μFCC.

Figure 17:
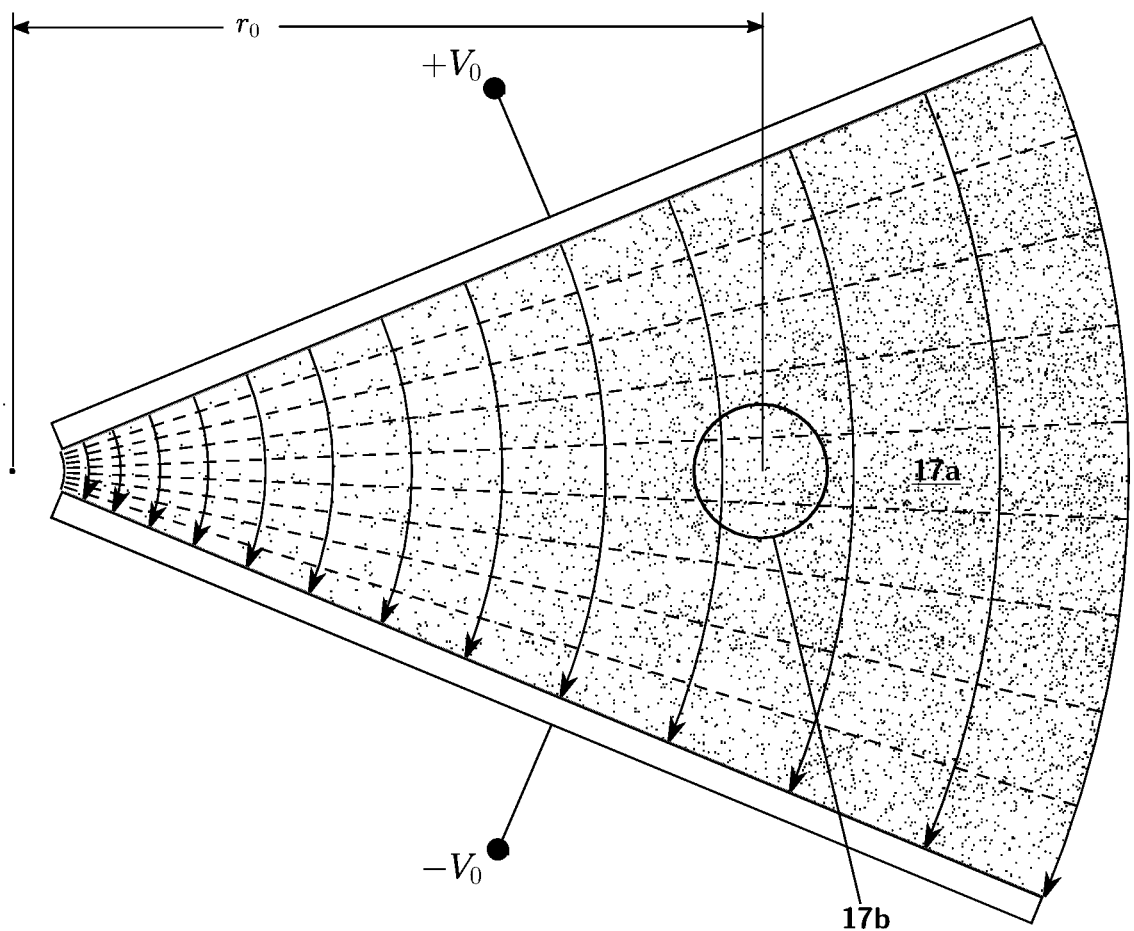
FIG. 17 shows the cross section of electrodes and refractive index gradient liquid at steady-state conditions when the real part of the complex Clausius-Mossotti factor is less than zero for a light beam propagating into the page of the figure.

Note that FIG. 16 is consistent with $K_R>0$ and is the same as FIG. 17 except that FIG. 17 is consistent with $K_R<0$. This can be seen by the IGL 16e gradient, i.e. the density of dots, in the nanoparticle colloid compared to the IGL 17a gradient of nanoparticles. The position of the light beam 17b that is being steered in a circle has shifted relative to the light beam 16f. When $K_R>0$ the process is a positive DEP (pDEP) and when $K_R<0$ the process is a negative DEP (nDEP). If $K_0$ and $K_\infty$ in Eq. 131 are of opposite sign then we can switch between pDEP and nDEP operation by changing the frequency ω. Additionally, the pDEP configuration of FIG. 16 is used in FIG. 15A, while the nDEP configuration is used in FIG. 15B.

Figure 18:
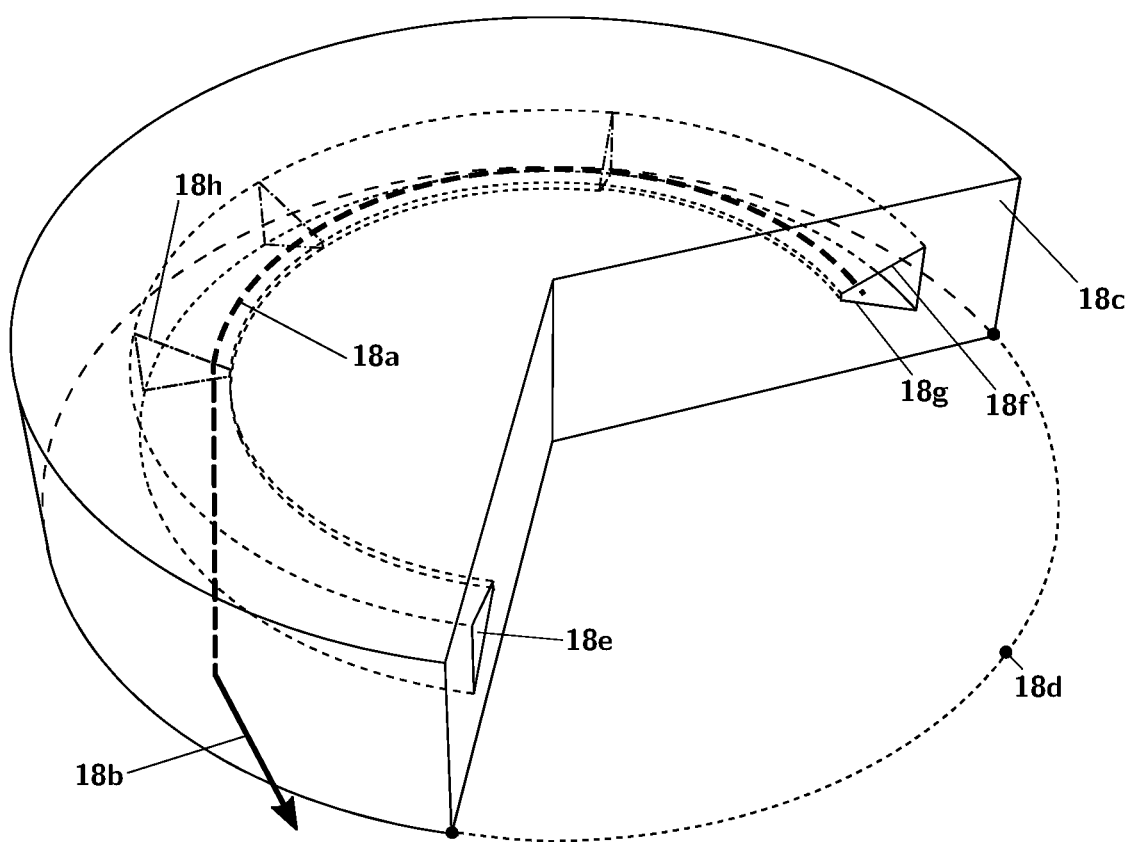
FIG. 18 shows a cut-away perspective of an example dielectrophoresis beam steering device based on a wedge-shaped microfluidics channel (control volume) and electrodes to induce a gradient refractive index over a portion of the circular device. A typical light beam trajectory is shown, including its release into free-space.

FIG. 18 shows a cut-away perspective of an example DBS device based on forming a circular path of the wedge-shaped microfluidics channel and electrodes about a common symmetry axis, as discussed above for FIGS. 15-16. A typical curved light trajectory 18a is shown, including its release into a free-space light beam 18b.

A disk shaped and transparent containment vessel 18c is shown in a cutaway perspective view. The reader is to imagine that the disk also fills the region along the cut-away region 18d. The containment vessel contains a wedge-shaped profile that is revolved around the symmetry axis to form a µFCC 18e that contains within its volume an IGL based on a colloid comprising optically transparent nanoparticles in an optically transparent liquid, where each component of the colloid has a different bulk refractive index. Solid nanoparticles have a refractive index that is typically (but not necessarily) higher than the refractive index of the liquid and transparent containment vessel 18c. This allows the refractive index of the nanoparticles to be averaged with the liquid as a colloid so that the colloid's effective (volume averaged) refractive index is close to that of the solid containment vessel when there are no DEP based forces on nanoparticles, i.e. as shown in FIG. 14 at the uniform refractive index region 14m. This occurs when the voltage difference across the electrodes is zero or when the harmonic electrode excitation radian frequency times the Maxwell-Wagner time constant $\omega\tau_{MW}$ is such that the real part of the Clausius-Mossotti factor is zero, e.g. this is seen in FIG. 4A when the solid curve crosses the K=0 line.

On the top and bottom of the µFCC 18e are electrodes 18f and 18g. The electrodes may each comprise a number of sub-electrodes that are separate and identical in form, but which may be independently energized so that separate angular regions in the µFCC may be energized for light steering, as described below for FIG. 19. A first region is where there is a refractive index gradient is formed in the IGL and a second region is where there is no gradient of the refractive index formed in the IGL. In FIG. 18 the first and second regions have a electrode boundary 18h. The curved light trajectory 18a exists on one side of the boundary and straight propagation in a volume exists on the other side of the boundary.

Figure 19:
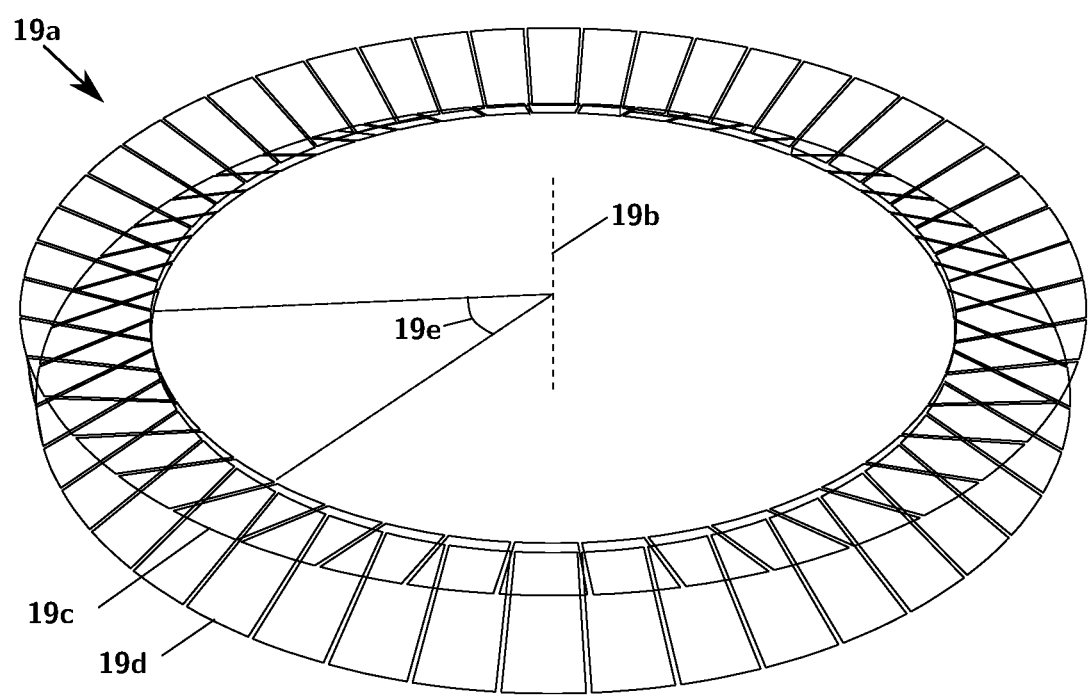
FIG. 19 shows in perspective view a segmented set of electrodes used to control light steering in FIG. 18, where the electrodes are arranged about the refractive index gradient liquid.

In FIG. 19 a set of segmented electrodes 19a that are used in FIG. 18 are shown here in detail to avoid the clutter it would have generated in FIG. 18. In particular, about a symmetry axis 19b are arranged segmented upper electrodes and lower electrodes. An example of an upper electrode 19c and its associated lower electrode 19d are provided. The upper electrodes are typically almost all at the same phasor voltage level $+V_0$. The lower electrodes are typically almost all at the same phasor voltage level $-V_0$. The exception to these voltage levels being where the DBS is to be deactivated to allow the light beam to escape into rectilinear propagation. The deactivated electrodes will have the voltage set to zero or the harmonic excitation frequency set to that value that sets the real part of the complex Clausius-Mossotti factor to zero. Additionally, in actual devices there may be an ability to provide electrode-to-electrode variations in the electrode voltages to compensate for non-ideal effects like temperature effects, beam spread, imperfect input light direction and a distributions of nanoparticle diameters and refractive indices that may not have been well characterized. In fact, it will be later shown that if just the upper (or lower) electrodes are also given a traveling voltage wave that a force normal to the traveling-wave electrodes is generated on nanoparticles and steering light out of the plane of the initial trajectory circle is also possible. Electrodes in the off-state angular range 19e are deactivated to allow the light beam to escape for the example beam depicted in FIG. 18. It is important to note that there may be many electrode segments to allow for high angular resolution. Additionally, they can be set into an off-state over multiple segments so that multiple pulsed beams can be launched almost simultaneously. This is important in applications like LiDAR that have a need for high sample rates using pulsed laser light and pulse-position-encoded laser light. Pulsed light may also be chirped.

Next, the nanoparticle concentration in the µFCC 18e is developed for a the specific example case of the wedge shaped electrodes having harmonic voltage excitation. The voltage phasors across the top and bottom electrodes are $$V(\text{Top},t) = +V_0 e^{i\omega t} \tag{429}$$

$$V(\text{Bottom},t) = -V_0 e^{i\omega t}. \tag{430}$$

In phasor form the voltage in the volume between the electrodes is the solution of $$\nabla^2 V(r,\theta) = 0 \tag{431}$$

subject to the boundary conditions of $$V(r_1 \leq r \leq r_2, +\theta_0/2) = +V_0 \tag{432}$$

$$V(r_1 \leq r \leq r_2, -\theta_0/2) = -V_0. \tag{433}$$

Thus, we can see that we can approximate the voltage between the electrodes at $-\theta_0 \leq \theta \leq \pm \theta_0$ as $$V(r, \theta) \approx \left(\frac{V_0}{\theta_0}\right)\theta. \tag{434}$$

Therefore, the electric field intensity in cylindrical coordinates is $$E(r, \theta) = -\nabla V(r, \theta) \tag{435}$$
$$= -\left\langle \frac{\partial V}{\partial r}, \frac{1}{r}\frac{\partial V}{\partial \theta}, \frac{\partial V}{\partial z} \right\rangle$$
$$= -\left\langle 0, \frac{1}{r}\left(\frac{V_0}{\theta_0}\right), \theta \right\rangle$$

so that $$E^2 = \frac{1}{r^2}\left(\frac{V_0}{\theta_0}\right)^2 \tag{436}$$

and $$\nabla E^2 = \left\langle \frac{\partial E^2}{\partial r}, \frac{1}{r}\frac{\partial E^2}{\partial \theta}, \frac{\partial E^2}{\partial z} \right\rangle \tag{437}$$
$$= \left\langle \frac{-2}{r^3}\left(\frac{V_0}{\theta_0}\right)^2, 0, 0 \right\rangle$$
$$= \frac{-2}{r^3}\left(\frac{V_0}{\theta_0}\right)^2 \hat{r}.$$

Therefore, $$\nabla \cdot (u \nabla E^2) = \nabla \cdot A \tag{438}$$
$$= \frac{1}{r}\frac{\partial}{\partial r}(rA_r) + \frac{1}{r}\frac{\partial A_\theta}{\partial \theta} + \frac{\partial A_z}{\partial z}$$
$$= \frac{1}{r}\frac{\partial}{\partial r}\left(-ru\frac{2}{r^3}\left(\frac{V_0}{\theta_0}\right)^2\right) + 0 + 0$$

-continued
$$= -\frac{2}{r}\left(\frac{V_0}{\theta_0}\right)^2\left[\frac{1}{r^2}\frac{\partial u}{\partial r} - \frac{2}{r^3}u\right]$$
$$= -\frac{2}{r^3}\left(\frac{V_0}{\theta_0}\right)^2\left[\frac{\partial u}{\partial r} - \frac{2}{r^3}u\right]$$

Also, we can identify the real and imaginary parts of the electric field intensity $$E_R = -\left\langle 0, \frac{1}{r}\left(\frac{V_0}{\theta_0}\right), 0 \right\rangle \quad (439)$$
$$E_I = \langle 0, 0, 0 \rangle$$
$$E_I \times E_R = 0.$$

Using the above analysis for $\nabla \cdot (u\nabla E^2)$ and $E_I \times E_R$ the master DEP equation Eq. 231 at a single spectral frequency is written as $$\frac{\partial u}{\partial t} = +\gamma\gamma_1\left(\frac{2}{r^3}\right)\left(\frac{V_0}{\theta_0}\right)^2\left[\frac{\partial u}{\partial r} - \frac{2}{r}u\right] + D\frac{1}{r}\frac{\partial}{\partial r}\left(r\frac{\partial u}{\partial r}\right) \quad (440)$$
$$= \underbrace{2\gamma\gamma_1\left(\frac{V_0}{\theta_0}\right)^2}_{\beta}\left(\frac{1}{r^3}\right)\left[\frac{\partial u}{\partial r} - \frac{2}{r}u\right] + \frac{D}{r}\frac{\partial u}{\partial r} + D\frac{\partial^2 u}{\partial r^2}$$

therefore $$\frac{1}{D}\frac{\partial u}{\partial t} = \frac{\partial^2 u}{\partial r^2} + \frac{1}{r}\left[\frac{\beta/D}{r^2} + 1\right]\frac{\partial u}{\partial r} - \frac{2\beta/D}{r^2}u. \quad (441)$$

Next, we will normalize this equation and make it unitless. This will simplify the equation somewhat and provide some insight into to the final functional form of the solution u. First note that the units of β are obtained by first expanding, whereby $$\beta = 2\gamma\gamma_1\left(\frac{V_0}{\theta_0}\right)^2 \quad (442)$$
$$= 2\left(\frac{1}{6\pi\eta b}\right)(\pi b^3 K_R \epsilon_0 \epsilon_l)\left(\frac{V_0}{\theta_0}\right)^2$$
$$= \frac{b^2 K_R \epsilon_0 \epsilon_l}{3\eta}\left(\frac{V_0}{\theta_0}\right)^2$$

Therefore, the units of β are $$[\beta] = \left[\frac{1}{\eta}\right][b^2][K_R][\epsilon_0 \epsilon_l]\left[\left(\frac{V_0}{\theta_0}\right)^2\right] \quad (443)$$
$$= (L^{-1}MT^{-1})(L^2)(1)(L^{-3}M^{-1}T^4 I^2)(L^2 MT^{-3}I^{-1})^2$$
$$L^4 T^{-1}.$$

Given the differential equation Eq. 441 we seek a product solution of the form $$u \sim r^a t^b D^c \beta^d u_0^e \quad (444)$$

so that so that all of the quantities in Eq. 441 are included as well as the initial spatial condition $u(r, 0) = u_0$ is a constant at concentration at time zero. In terms of the units $$[u] \sim [r]^a [t]^b [D]^c [\beta]^d [u_0]^e$$
$$(\#L^{-3}) = L^a T^b (L^2 T^{-1})^c (L^4 T^{-1})^d (\#L^{-3})^e \quad (445)$$

so that $$a + 2c + 4d - 3e = -3 \quad (446)$$
$$b - c - d = 0 \quad (447)$$
$$e = 1 \quad (448)$$

Therefore, $$d = b - c \quad (449)$$

and $$c = \frac{a}{2} + 2b. \quad (450)$$

Therefore, $$u \sim u_0 \left(r\sqrt{\frac{D}{\beta}}\right)^a \left(t\frac{D^2}{\beta}\right)^b \quad (451)$$

or more generally on summing over different proportionality constants $A_{a,b}$ and exponents we can provide a series solution of the form $$u = u_0 \sum_{a,b} A_{a,b} \left(r\sqrt{\frac{D}{\beta}}\right)^a \left(t\frac{D^2}{\beta}\right)^b \quad (452)$$

or equivalently we can write $$u = u_0 g(\rho, \tau), \quad (453)$$

where g is a function that needs to be determined and where we have introduced the dimensionless similarity variables $$\rho = r\sqrt{\frac{D}{\beta}} \quad (454)$$
$$\tau = t\frac{D^2}{\beta}. \quad (455)$$

Consequently, $$u(r, t) = u_0 g\left(r\sqrt{\frac{D}{\beta}}, t\frac{D^2}{\beta}\right) \quad (456)$$

and at steady-state $$v(r) = u(r, \infty) = u_0 g\left(r\sqrt{\frac{D}{\beta}}, \infty\right) = u_0 G\left(r\sqrt{\frac{D}{\beta}}\right), \quad (457)$$

where the functions g and G are yet to be found by rewriting $$\frac{\partial u}{\partial t} = u_0 \left(\frac{D^2}{\beta}\right) \frac{\partial g}{\partial \tau} \tag{458}$$

$$\frac{\partial u}{\partial r} = u_0 \sqrt{\frac{D}{\beta}} \frac{\partial g}{\partial \tau} \tag{459}$$

$$\frac{\partial^2 u}{\partial r^2} = u_0 \left(\frac{D}{\beta}\right) \frac{\partial^2 g}{\partial \rho^2} \tag{460}$$

resulting in a normalized differential equation $$\rho^2 \frac{\partial g}{\partial \tau} = \rho^2 \frac{\partial^2 g}{\partial \rho^2} + \left[\rho + \frac{1}{\rho}\right] \frac{\partial g}{\partial \rho} - \frac{2}{\rho^2} g. \tag{461}$$

An initial condition and boundary condition are taken respectively as $$g(\rho, 0) = 1 \tag{462}$$

$$g(\infty, \infty) = 0. \tag{463}$$

At steady state when $t \to \infty$ let us define $G(\mu) = g(\rho, \infty)$ where $$0 \le G(\rho_1) < \infty. \tag{464}$$

The infinitely large wedge region is an approximation that allows to avoidance of calculating fringing fields and is reasonable given that most of the DEP forces are near the wedge apex anyway. The first condition above says that the electric field has no impact on the IGL far away from the wedge's apex. The second condition bounds the solution, however for the point particles being used in this model the concentration may go to infinity and we will have to manually restrict the concentration. This will be explained in detail later in the analysis.

Before proceeding note that there are other possible ways to model the situation. For example, by assuming that the number of nanoparticles, in a fixed region between $r_1 \le r \le r_2$, is invariant due to the walls of a finite containment vessel, then $$\int_{-\theta_0}^{+\theta_0} \int_{r_1}^{r_2} u(r,t) r dr d\theta = \zeta = \text{const.}, \tag{465}$$

whereby another similarity analysis yields solutions (when $\beta \ne 0$) of the form $$u(r, t) = \frac{\zeta D}{\beta} g\left(r \sqrt{\frac{D}{\beta}}, t \frac{D^2}{\beta}, r_1 \sqrt{\frac{D}{\beta}}, r_2 \sqrt{\frac{D}{\beta}}\right), \tag{466}$$

and the resulting differential equation Eq. 461 does not change, even though the expression for the solution is different. Thus, Eq. 456 transforms into Eq. 466 so that $u_0 \to \zeta D/\beta$ would be needed in subsequent equations. For the sake of retaining a simple model with features that are useful for this disclosure we now proceed using Eq. 456.

Therefore, at steady-state we expect that $$\rho^2 \frac{d^2 G}{d\rho^2} + \left[\rho + \frac{1}{\rho}\right] \frac{dG}{d\rho} - \frac{2}{\rho^2} G = 0 \tag{467}$$

The general solution to the steady-state equation may be found in several ways, however for the sake of expedience note that the solution is most likely an exponential. So by trial and error we can try trial-solutions of the form $\text{Exp}[a\rho^{-2}]$, $\text{Exp}[a\rho^{-1}]$, $\text{Exp}[a\rho^{1}]$, $\text{Exp}[a\rho^{2}]$, etc. From this we find that the exponential $\text{Exp}[\frac{1}{2}\rho^{-2}]$ solves the equation and that a second independent solution may be found for the second order differential equation by the method of reduction-of-order so that $$G(\rho) = C_1 e^{\frac{1}{2\rho^2}} - C_2 e^{\frac{1}{2\rho^2}} Ei\left[-\frac{1}{2\rho^2}\right] \tag{468}$$

where Ei[z] is the exponential integral function $$Ei[z] = -\int_{-z}^{\infty} \frac{e^{-p}}{p} dp. \tag{469}$$

Figure 20:
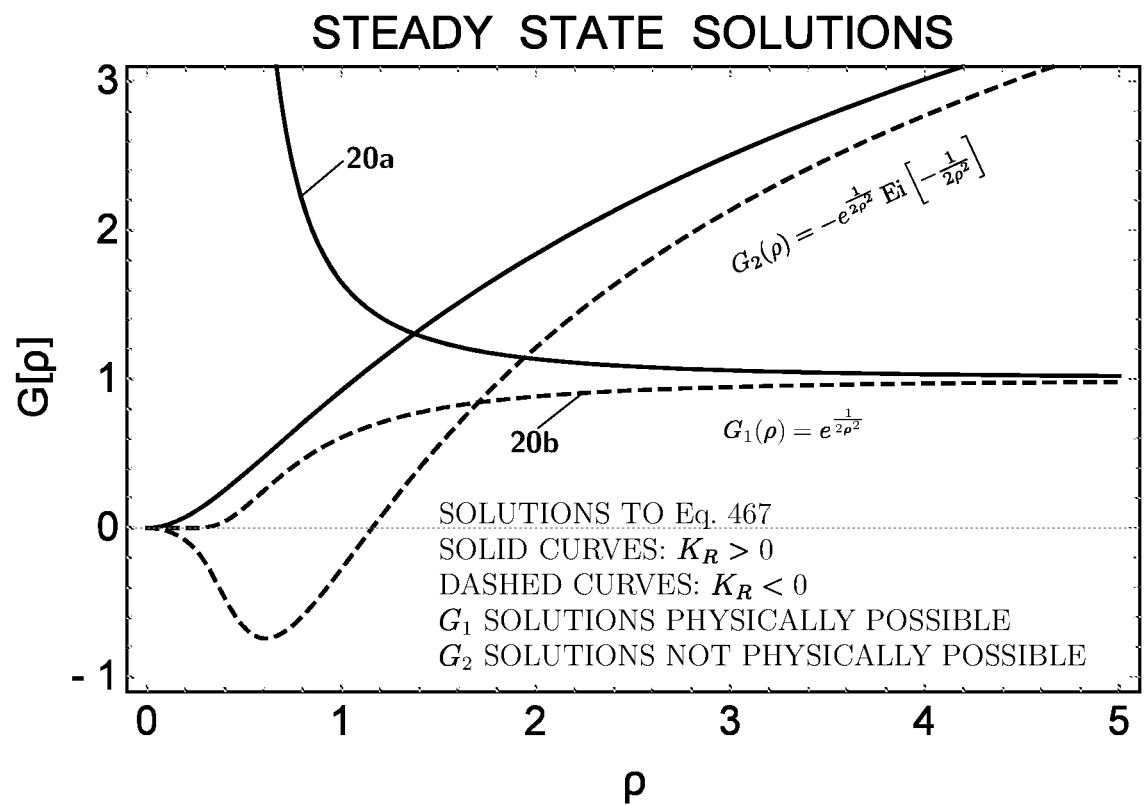
FIG. 20 shows a plot of the solution functions for steady state diffusion of nanoparticles under the influence of a nonuniform electric field from non-parallel flat electrodes forming the boundary of a wedge shaped containment region for an index gradient fluid. The solutions correspond to FIG. 16-19.

The first term $G_1$ to the steady-state solution is a pure exponential and is always greater than zero and decreasing as $\rho$ increases. The second term $G_2$ is not always positive and increasing without bound as $\rho$ increases as shown in FIG. 20. The $G_2$ curve is therefore not a physically realizable solution. Notice that the $G_1$ solutions are also labeled as positive dielectrophoresis pDEP 20a and negative dielectrophoresis nDEP 20b where $K_R > 0$ and $K_R < 0$ respectively.

In general we have the steady-state concentration $v(\rho) = u(\rho, \infty) = u_0 G(\rho)$ where $C_1 = 1$ as required for our normalized differential equation, so that $$v(\rho) = u_0 \exp\left[\frac{1}{2\rho^2}\right]. \tag{470}$$

From Eqs. 89, 131, 148, 166, 442 and 454 we can write Eq. 470 as $$v(r) = u_0 \exp\left[\frac{1}{2k_B T} \left(\frac{(3\epsilon_L K_R)}{2}\right) \left(\frac{V_0}{r\theta_0}\right)^2 V\right], \tag{471}$$

and we can clearly see that $K_R$ can take on both positive and negative values depending on the values of $K_0$, $K_\infty$, $\tau_{MW}$ and the frequency $\omega$. Additionally, we can identify $\text{Re}[\epsilon]$ from Eq. 118, the arc length we identify as $s = r(2\theta_0)$ and the total voltage drop across the electrodes as $2V_0$ so we can further identify the electric field E and electric field energy within a nanoparticle W as $$\text{Re}[\tilde{\epsilon}] = 3\epsilon_L K_R \tag{472}$$

$$E = \frac{V_0}{r\theta_0} \tag{473}$$

$$W = \frac{\text{Re}[\tilde{\epsilon}]}{2} E^2 V. \tag{474}$$

Therefore, the steady-state nanoparticle concentration is a function of the ratio of (1) the energy in the volume of the nanoparticle and (2) the thermal energy. In particular $$v = u_0 \exp\left[\frac{1}{2} \frac{W}{k_B T}\right]. \quad (475)$$

The factor of ½ in Eq. 475 is specific to the form of the impressed electric field used and may change for other electrode geometries. Clearly, the simple form of the above equation shows that an alternate variable to use instead of $\rho$ is the ratio of the energies. Note that we can switch between the two forms of $G_1$ shown in FIG. 20 simply by changing the frequency $\omega$ of the voltage impressed on the drive electrodes to change the sign of $K_R$, i.e. when one of $K_0$ and $K_\infty$ takes on a negative value and the other takes on a positive value, whereby the energy W can be either positive or negative, which creates the physically realizable positive dielectrophoresis pDEP 20a and negative dielectrophoresis nDEP 20b curves that are explicitly shown in FIG. 20 for the wedge electrode example.

From Eqs. 166, 442 and 454 we can write $$\rho = \frac{r}{\tilde{\rho}} \quad (476)$$

$$\rho_0 = \frac{r_0}{\tilde{\rho}} \quad (477)$$

$$\tilde{\rho} = \sqrt{\frac{\beta}{D}} = \frac{V_0}{\theta_0}\sqrt{\frac{2\gamma_1}{k_B T}} \quad (478)$$

where we call $\tilde{\rho}$ the normalizing radius and $r_0$ is the distance from the electrode apex to where the light is confined for steering as shown in FIGS. 15-16. Consequently, we can rewrite Eq. 428 as $$\frac{1}{V}\left(\frac{n_L}{n_L - n_S}\right) = v(\rho_0) + (\mathcal{R} + \rho_0)\frac{dv(\rho_0)}{d\rho} \quad (479)$$

where, similar to the definition of $\rho$ in Eq. 454

$$\mathcal{R} = \frac{R}{\tilde{\rho}}. \quad (480)$$

Therefore, $$\frac{dv(\rho)}{d\rho} = -u_0 \frac{1}{\rho^3}\exp\left[\frac{1}{2\rho^2}\right] \quad (481)$$

and $$\frac{n_L}{n_S - n_L} = v_S \exp\left[\frac{1}{2\rho_0^2}\right]\left(\frac{\mathcal{R} + \rho_0}{\rho_0^3} - 1\right) \quad (482)$$

where the volume fraction of the solid spheres is $v_S = u_0 \mathcal{V}$, occurs on completely mixing the IGL's liquid and nanoparticle components in a beaker outside if an energized circuit. Now solving for the ratio of refractive indices we obtain for the configuration of FIG. 15A the equation $$\frac{n_S}{n_L} = 1 + \frac{\rho_0^3 \exp\left[-\frac{1}{2}\rho_0^{-2}\right]}{v_S(\mathcal{R} + \rho_0 - \rho_0^3)}. \quad (483)$$

Notice, that as the normalized radius of the μFCC increases towards infinity, $\mathcal{R} \to \infty$ that the ratio of refractive indices approaches unity because the trajectory of the light is a straight line and a GRIN profile is not needed. Additionally, for the case shown in FIG. 15B we make the substitution $\rho_0 \to -\rho_0$ so that $$\frac{n_S}{n_L} = 1 - \frac{\rho_0^3 \exp\left[-\frac{1}{2}\rho_0^{-2}\right]}{v_S(\mathcal{R} - \rho_0 + \rho_0^3)}. \quad (484)$$

Figure 21:
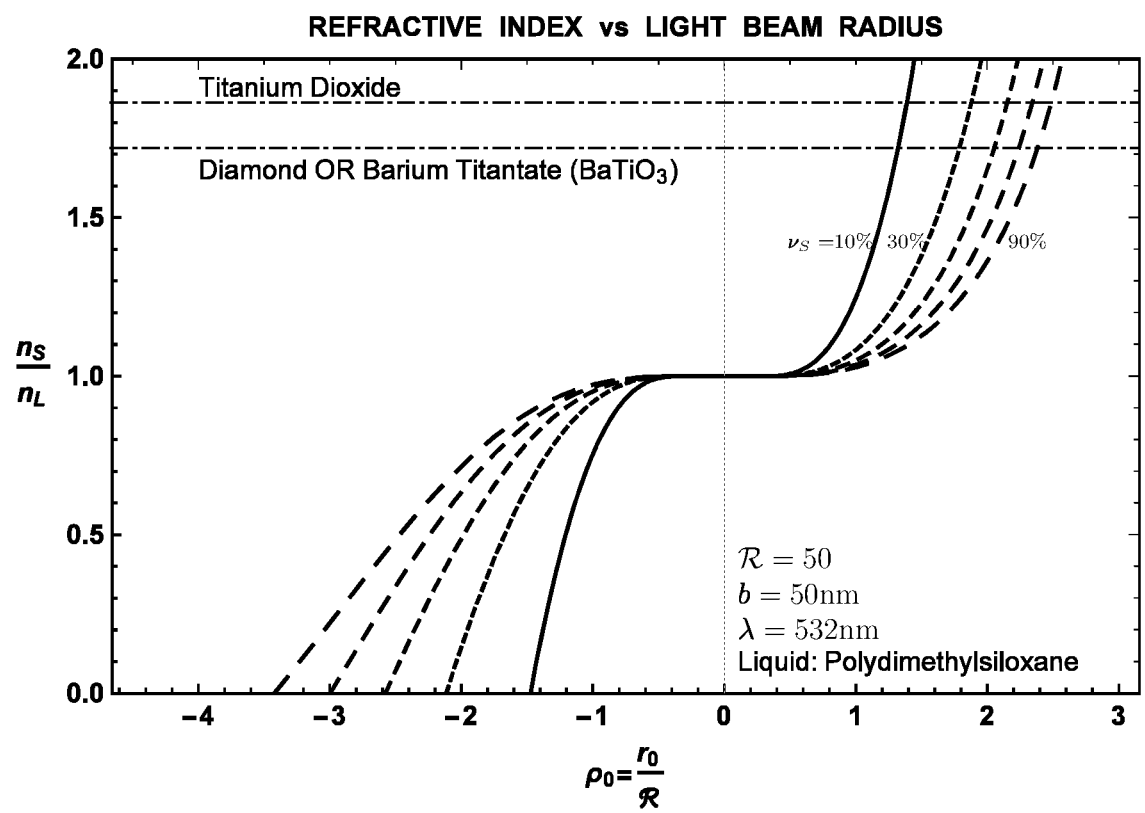
FIG. 21 shows a plot of the normalized nanoparticle refractive index vs the normalized radius for different volume fractions of the solid nanoparticles $v_S$ ranging from 10%-90% by 20% steps assuming that normalized radius of $\mathcal{R}$ =50 and the nanosphere radius is b=100 nm at a wavelength of $\lambda_o$=532 nm.

Finally, for the sake of completeness, when extending Eq. 483 from Rayleigh to Mie scattering with larger nanoparticle sizes, i.e. $b > \lambda_0/20$, we have $$\frac{n_S}{n_L} = 1 + \frac{\rho_0^3 \exp\left[-\frac{1}{2}\rho_0^{-2}\right]}{3\left(\frac{\sin p}{p^3} - \frac{\cos p}{p^2}\right)v_S(\mathcal{R} + \rho_0 - \rho_0^3)}, \quad (485)$$

where p is given by Eq. 278 and $\rho_0$ can take on both positive and negative values to account for the different configurations in FIGS. 15A-B respectively and the refractive indices are a function of free space wavelength $\lambda_0$ and temperature T. Equation 485 is plotted in FIG. 21 for polydimethylsiloxane, which is a low viscosity, chemically stable and large-temperature-range transparent liquid that is representative of dielectric liquids intended for the applications in this disclosure.

Note that some care has to be taken in using the above equations because Eq. 231 essentially assumes that the nanoparticle spheres are points. This means that the points can get arbitrarily close to each other so that the concentration can tend to infinity as $r \to 0$. This cannot happen in practice as the solid spheres would touch each other and stop any further concentration from occurring. In particular, for uniformly sized spheres in three dimensions the densest packing is approximately 74%, i.e. the fraction $\pi/(3\sqrt{2})$ of the volume, for the face centered cubic (FCC) packing and the hexagonal close packing (HCP). In contradistinction, a random packing of equal spheres generally has a density around 64%. Although the analysis in this document has focused on spherical nanoparticles, it is clear that other geometries for the nanoparticles can be utilized.

The maximum uniformly-sized spherical packing density provides a volume fraction of $$v_S(\text{Regular Packing}) = \frac{\pi}{3\sqrt{2}} \quad (486)$$

and the random packing provides $$v_S(\text{Irregular Packing}) \approx \tfrac{2}{3}. \quad (487)$$

As a practical matter for spherical nanoparticles $$0 < v_S << \tfrac{2}{3} \quad (488)$$

and because $v_s = u\mathcal{V}$ $$\rho_{max} = \left[\ln\left(\frac{v_{max}}{v_0}\right)^2\right]^{-1/2}. \tag{489}$$

Thus far in the analysis of beam steering the electrodes 18f and 18g in FIG. 18 have been configured to provide light steering in a plane. However, this is not a requirement and it is possible to add additional steering electrodes so that the light beam can be steered in elevation as well as azimuth. Alternately, the segmented electrodes shown in FIG. 19 can also be energized with traveling wave harmonic signals to allow an additional degree of freedom to gain modest control over the elevation angle. Some applications, like LiDAR for automotive applications, need perhaps just as few as 5-10 degrees of elevation beam control to be able to cover the anticipated field of view.

The DBS device just described is based on a wedge shaped μFCC that has electrodes with opposite polarity placed on the upper and lower surfaces of the μFCC to form a wedge geometry. An alternative method is shown in FIG. 22 where a different electrode symmetry is used and different principles for guiding the light are utilized.

In particular, it is now desired to create a GRIN liquid that confines and guides light much as a fiber optic confines and guides light: by having a core region with higher refractive index than the cladding region. Most fiber optics have a step change in the refractive index between the core and the cladding. Some fiber optics uses a GRIN refractive index profile so that a gradual change occurs between the core and the cladding refractive index. That said, fiber optics have static refractive index profiles while the DBS systems that are described below have dynamic GRIN profiles so that guided light beams are steered to a desired azimuth (or elevation) direction and then released, i.e. by removing the GRIN profile, so that the light is launched into straight-line propagation and out into free-space.

In FIG. 22A input light 22a is injected from a light source (not shown) into a GRIN light guide that is based on the dielectrophoresis of nanoparticles in a colloidal IGL, which is located within an μFCC 22b. The light has a general propagation direction 22c. However, due to the GRIN profile we may consider that rays undulate around the guide as shown in the figure and this can lead to some light divergence at the output. Similar to fiberscope, borescope or endoscope the ray divergence can be controlled by choosing the cladding and core diameters strategically. Along the μFCC there is a plurality of discrete electrodes along the angular direction of propagation (not shown in this figure) that are used to form a GRIN medium to confine the light until a DEP-disrupted region 22d of the μFCC is reached. In the disrupted region the electrodes are intentionally configured so that either the harmonic voltage amplitude is set to zero or the frequency ω of harmonic excitation is set so that the real part of the complex Clausius-Mossotti factor of Eq. 121 is zero to eliminate ponderomotive forces on the nanoparticles and eliminate the GRIN effect. Consequently, after the DEP process is disrupted the light will have rectilinear propagation 22e in the medium of the solid transparent containment vessel 22f and will refract out of the containment vessel into free-space light propagation 22g. The angular divergence of the beam will be determined by the effective numerical aperture of the μFCC based GRIN light guide. The shape of the containment vessel is arbitrary, but has been shown as square in cross section for convenience in FIG. 22A.

In FIG. 22B the refractive index profile as a function of radius ξ is provided looking towards direction arrows 22h and 22i is shown. The containment (vessel) refractive index 22j and 22k is $n_0$ and at the center of the μFCC has a refractive index of $n_1$, which is achieved via a GRIN profile 22m. When the DEP process is disrupted the GRIN reverts to the uniform refractive index 22n.

One of the applications of the embodiment of FIG. 22λ is for beam steering. Another application is for a laser gyroscope using the Sagnac effect. Another application is a laser resonator where the GRIN medium is doped with atoms like ytterbium, which can provide optical gain. Other applications also exist.

Figure 23:
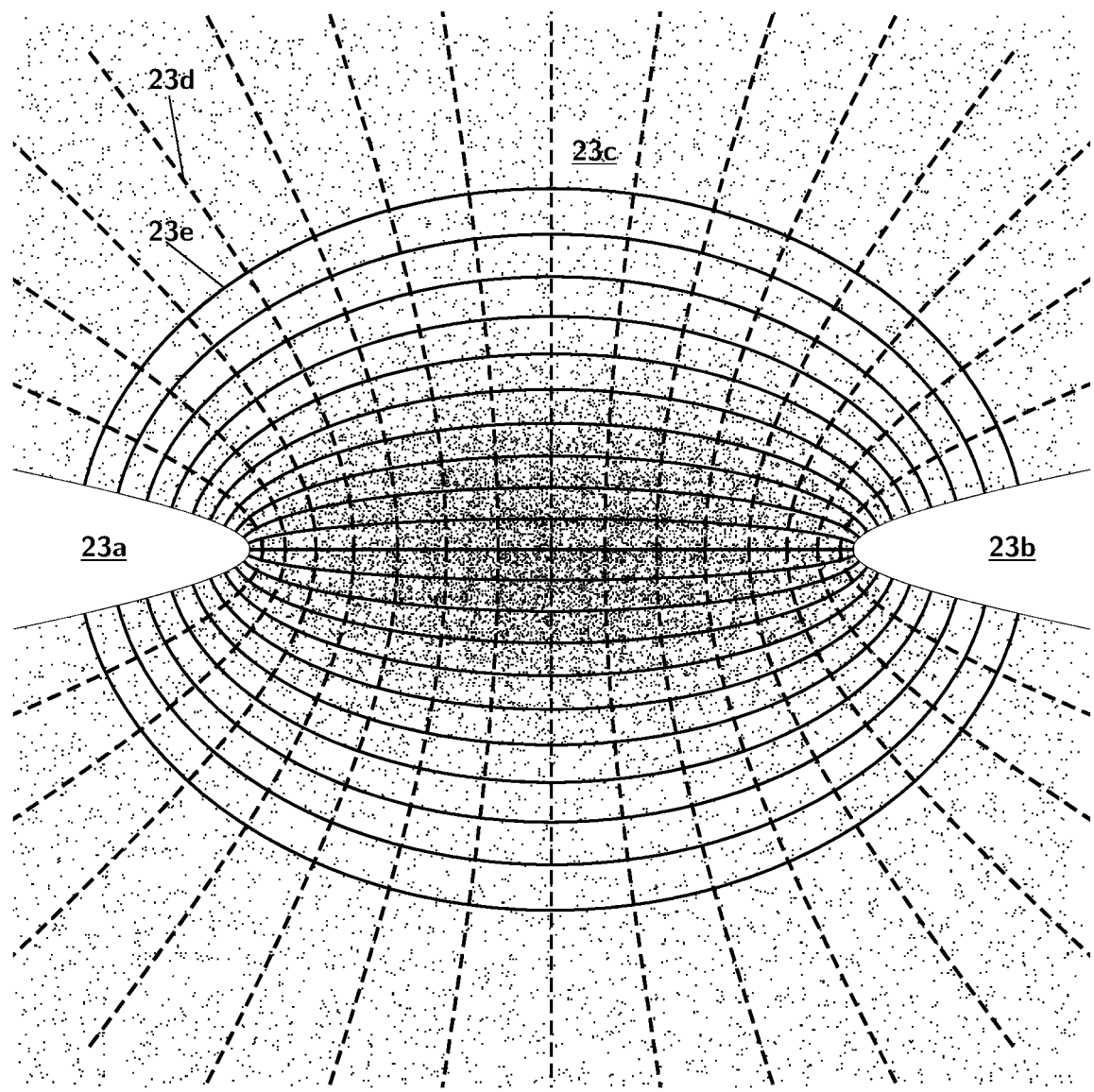
FIG. 23 shows in cross section a distribution of nanoparticles in a microfluidic control channel that can provide graded refractive index confinement of a light beam propagating into the page of the figure. This is similar to that provided by graded refractive index fiber optics, except that the refractive index is electronically controllable by a dielectrophoresis process.

In FIG. 23 the configuration of electrodes that are used to support the GRIN of FIG. 22 is provided. It consists of two separate and substantially separated electrodes 23a and 23b, which support harmonic voltage amplitudes ±$V_0$. Additional electrodes may also be used (but are not shown here), for example the well-known quadruple configuration, so that greater control over the distribution of nanoparticles within the refractive IGL 23c can be obtained. The symmetry of the configuration is provided by the dashed equipotential curves 23d and the electric field curves 23e. Note that the light that is directed around the circular μFCC in FIG. 22A would now be centered between the electrodes and directed into the page of the figure in FIG. 23.

Helical Trajectory Beam Steering

One of the top areas of interest for solid-state beam steering is for LiDAR, which was originally a portmanteau of light and radar, but is now considered an acronym for light detection and ranging. As a first example we will consider a system that can replace spinning mechanical beam steering systems.

Figure 24:
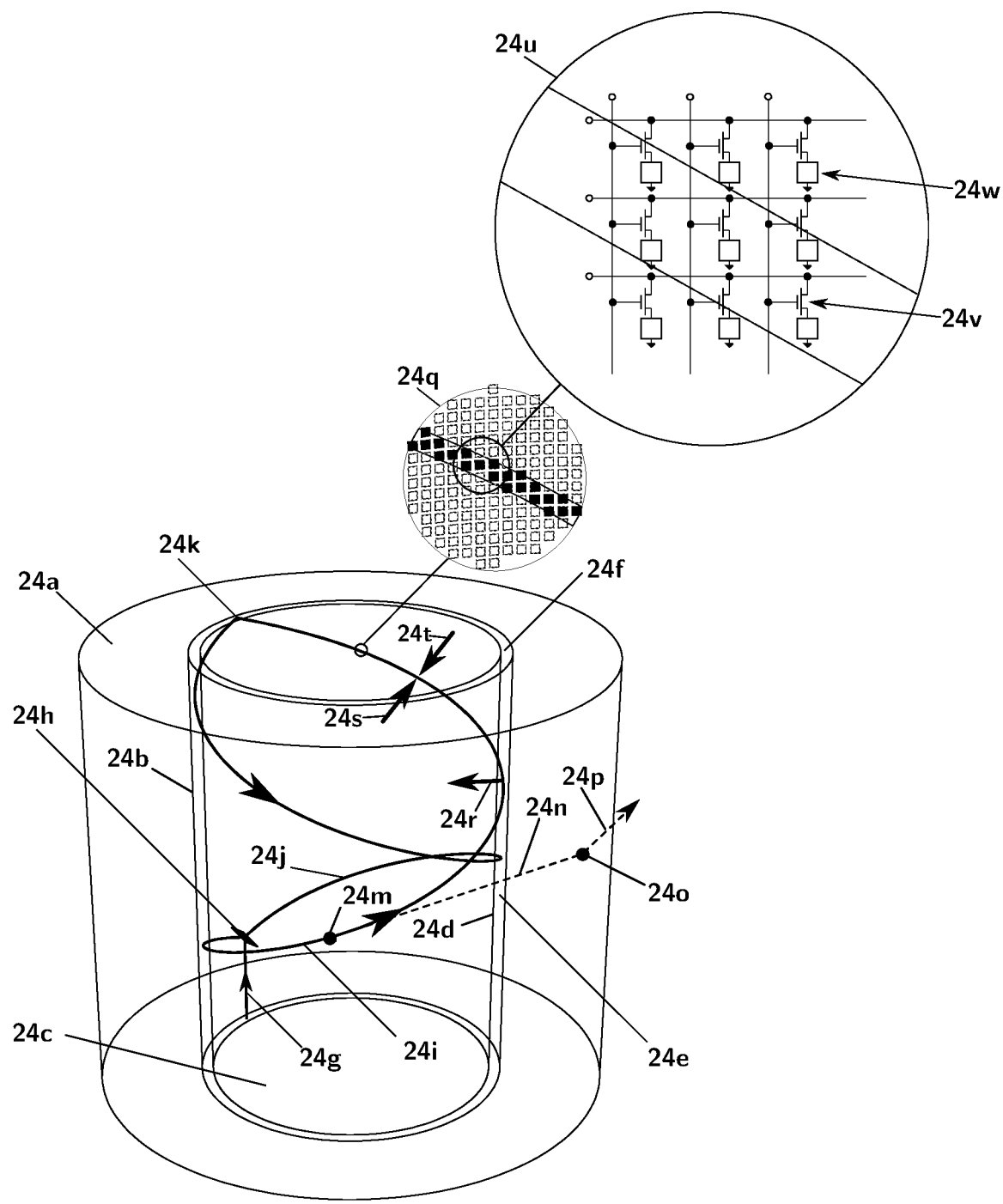
FIG. 24 shows in perspective view a light beam steering system that can redirect light into $2\pi$ radians of azimuth and over $\pm\pi/4$ radian of elevation by the use of a discrete electrode array.

A Dielectrophoresis Beam Steering (DBS) device with 2π radians of azimuth steering and over ±π/4 radians of elevation steering is shown in FIG. 24. The DBS device comprises a solid outer transparent radome 24a, which has a radome inner surface 24b forming one surface of a μFCC. Additionally, an optional inner solid 24c, which may be transparent, provides an outer surface of the inner solid 24d. The gap between the radome inner surface 24b and the outer surface of the inner solid 24d is the μFCC 24e.

Additionally, a nanoparticle colloid 24f located in a μFCC formed either between the outer transparent radome 24a and the optional inner solid 24c; or between the outer transparent radome 24a and the spatial extent of spatially varying electric fields used to contain the light by a GRIN profile.

An input light beam 24g (source not shown) is injected into the μFCC and it is reflected by means of an angle selective electronic mirror 24h into an upward spiraling light trajectory 24i. The upward spiraling light trajectory may optionally be converted into a downward spiraling light trajectory 24j by a reflection device 24k, which is typically just total internal reflection. The injection of the light into the μFCC may be accomplished by any means so that the angle selective electronic mirror 24h is only provided as an example.

A means to control the nanoparticle colloid concentration u(r, t) is also provided and described later. When the means to control the nanoparticle colloid is activated the light trajectory remains spiraling in the upward or downward directions of FIG. 24. When the means to control the nanoparticle colloid is deactivated the light is launched, for example at point 24m, and then has an internal rectilinear trajectory 24*n* and the light beam is refracted into a free-space beam at point 240 on an external rectilinear trajectory 24*p*.

There are three different modes for controlling the trajectory of the light beams. The first mode uses in-phase and quadrature electrode excitation from a traveling voltage wave on electrodes to induce a radial gradient in the refractive index that allows circular light propagation. This first mode (mode-1) has the same requirements as set forth in Eq. 419, sets $f(x)=1$ and has the concentration u exponentially decaying away from the two dimensional electrode array into the IGL in the µFCC. In FIG. 24 we can see the first magnification inset 24*q*, which shows an array of electrodes on the outer surface of the inner solid 24*d* in a small region of the upward spiraling light trajectory 24*i*. The electrode array may also be placed on the radome inner surface 24*b*, but may require setting ω so that the opposite sign of the Clausius-Mossotti factor is used. The radius of curvature of the osculating circle tangent to the spiral trajectory is known so that voltage and harmonic frequency ω can be chosen to ensure that a decaying concentration exists in the radial direction that ensures a spiraling trajectory of the light. The electrodes may be energized as pixels, as shown in FIG. 24, or long strip electrodes (not shown) around the optional inner solid 24*c* cylinder.

The second mode (mode-2) sets $f(x)$ to a non-constant function of x, such that two separate traveling voltage waves are generated: either both propagating away from or towards each side of the upward spiraling light trajectory 24*i*. This allows nanoparticles to accumulate around the light's trajectory to induce a GRIN waveguide similar to a GRIN fiber optic. Therefore, while mode-1 creates a gradient in the radial direction, mode-2 creates a gradient predominately in the angular and axial directions, i.e. in a tangent plane to the outer surface of the inner solid 24*d* such that the gradient vector is always towards or away from the light's spiraling trajectory. This induces a greater refractive index about the desired trajectory and provides a light guide for the light. For the avoidance the doubt FIG. 24 shows an examples: a mode-1 radial nanoparticle gradient vector 24*r* and tangent mode-2 nanoparticle gradient vectors 24*s* and 24*t*. A mode-3 can also be imagined that is combination of mode-1 and mode-2.

A second magnification inset 24*u* shows a detail of transparent transistors 24*v* and transparent electrodes 24*w* that are printed on at least one of the surfaces of the µFCC as an array that can have each of the electrode pixels selected and energized to hold a charge by capacitive action between refresh signals to the transistors shown. A fast microprocessor could exploit a GRIN strategy like mode-1 or mode-2 and energize the electrode array so that a light beam would progress along a spiral until the light is launched out of the µFCC at (for example) point 24*m*.

While the above description was made for a cylindrical DBS device it is equally valid for other structural forms, for example a sphere or hemisphere. In such a case the µFCC would be formed between an outer spherical radome and an inner spherical material. Many variations of electrode geometry are also possible.

In the preceding discussion the electrodes have a geometry that allows their coverage to extend to full or nearly full coverage of the supporting manifold. For example in a flat plane electrodes can extend in one or two dimensions. One possible tessellation is a rectangular grid of square electrodes on a plane, another is a linear grid of electrode strips on a plane and other tessellations are possible. The planar grid many be changed to a cylinder, sphere or other two-dimensional surface.

In an alternative approach, the geometry of the electrodes may be chosen to allow a simple traveling wave to still accumulate nanoparticles in a local region. Consider the one dimensional electrode array in FIG. 7A, which is excited by harmonic polyphase voltages to provide a traveling electromagnetic wave and providing a ponderomotive force on a nanoparticle in the x- and y-directions. At steady-state there will be a non-zero gradient component in the y-direction and (approximately) a zero gradient component in the x-direction. However, if a wall was inserted at an x-location then the boundary would allow an accumulation of nanoparticles and an optical GRIN profile.

Hybrid LiDAR, RADAR, & Imaging Sensors

One of the applications of the V-electrode beam steering device is to provide laser beam radiation into 2π radians of a polar angle with an additional capability to steer the beam roughly ±π/12 in the elevation direction. Additionally, one of the useful aspects of the V-electrode beam steering embodiment is that it easily integrates with a LiDAR receiver colocated with a optical focal plane array for optical image receipt and W-Band automotive frequencies (77-81 GHz) transceivers, typically from a circular array configuration. This represents a multisensor solution for autonomous vehicles and other applications.

Figure 25:
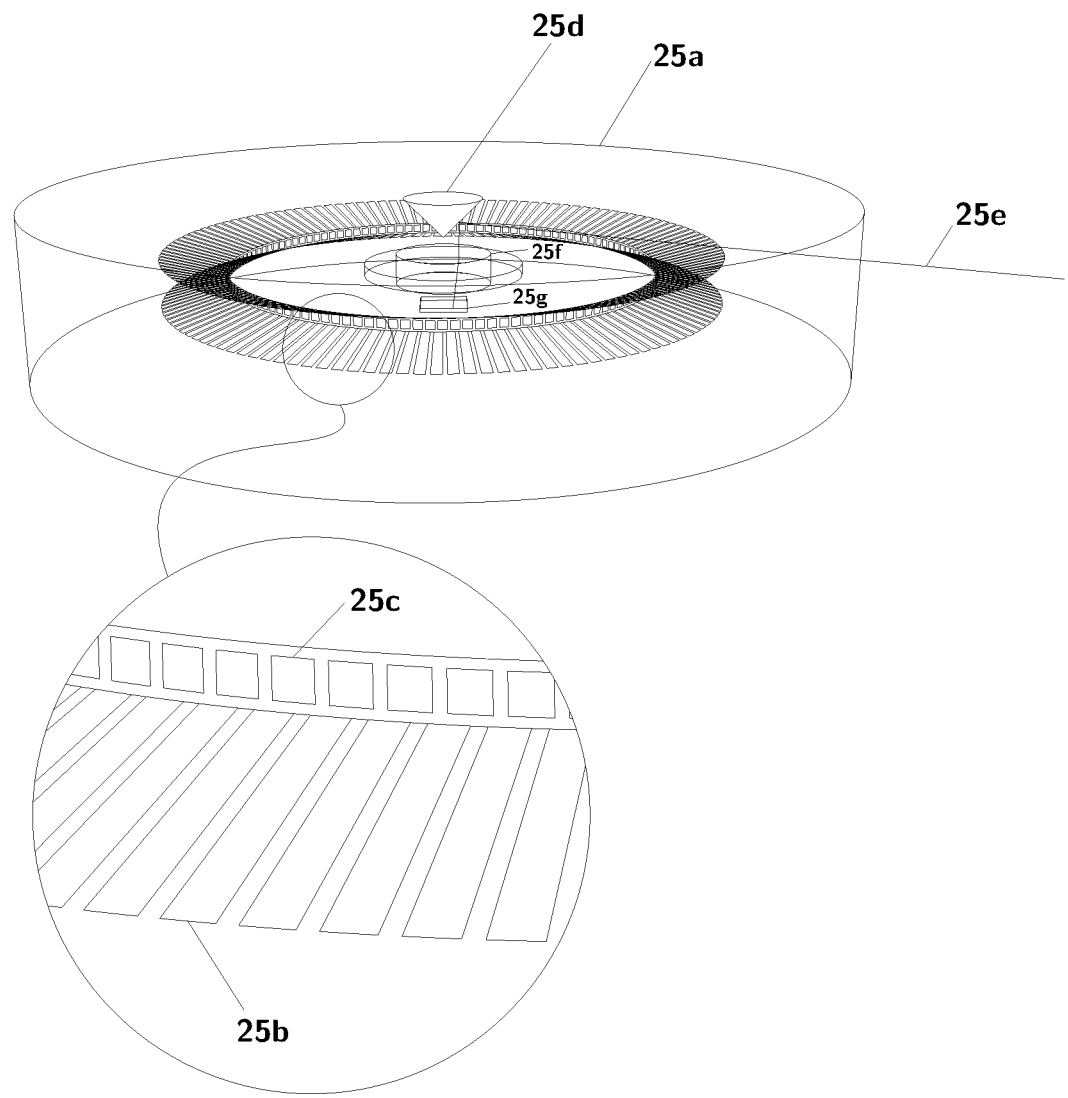
FIG. 25 shows the elements of a combined remote sensing device comprising LiDAR, W-Band radar and optical imaging system for autonomous automotive driving and navigation.

In particular, the elements of a V-electrode hyper-spectral sensor comprising an optical camera, radar and LiDAR are shown in FIG. 25. In particular, a radome 25*a* encloses V-electrodes one of which is 25*b* and W-band antenna apertures such as 25*c*. The W-band antennas are configured into a circular array where some elements of the array are used for transmission, reception, and some elements optionally connected to a matched load to minimize transmit-to-receive cross coupling at the W-band. The W-band array is juxtaposed to the V-electrodes, both in a circular array and having a common circular center when viewed from above the device. The radome 25*a* is transparent at three bands: the visible band from 380-750 nm, the W-band automotive frequencies (77-81 GHz) and the LiDAR band, which is typically 1550 nm but may be centered other wavelengths.

A 2π radian image is obtained via a cone shaped mirror 25*d* embedded in the radome 25*a*. The cone shaped mirror reflects image field light 25*e* (LiDAR light and image light for the camera) and redirects it towards a lens system 25*g* for focusing and a pixelated imaging array, typically a charged couples device (CCD) 25*g* that senses optical radiation. The reflected and focused light is distorted, but this distortion is canceled in post processing of the image.

Figure 26:
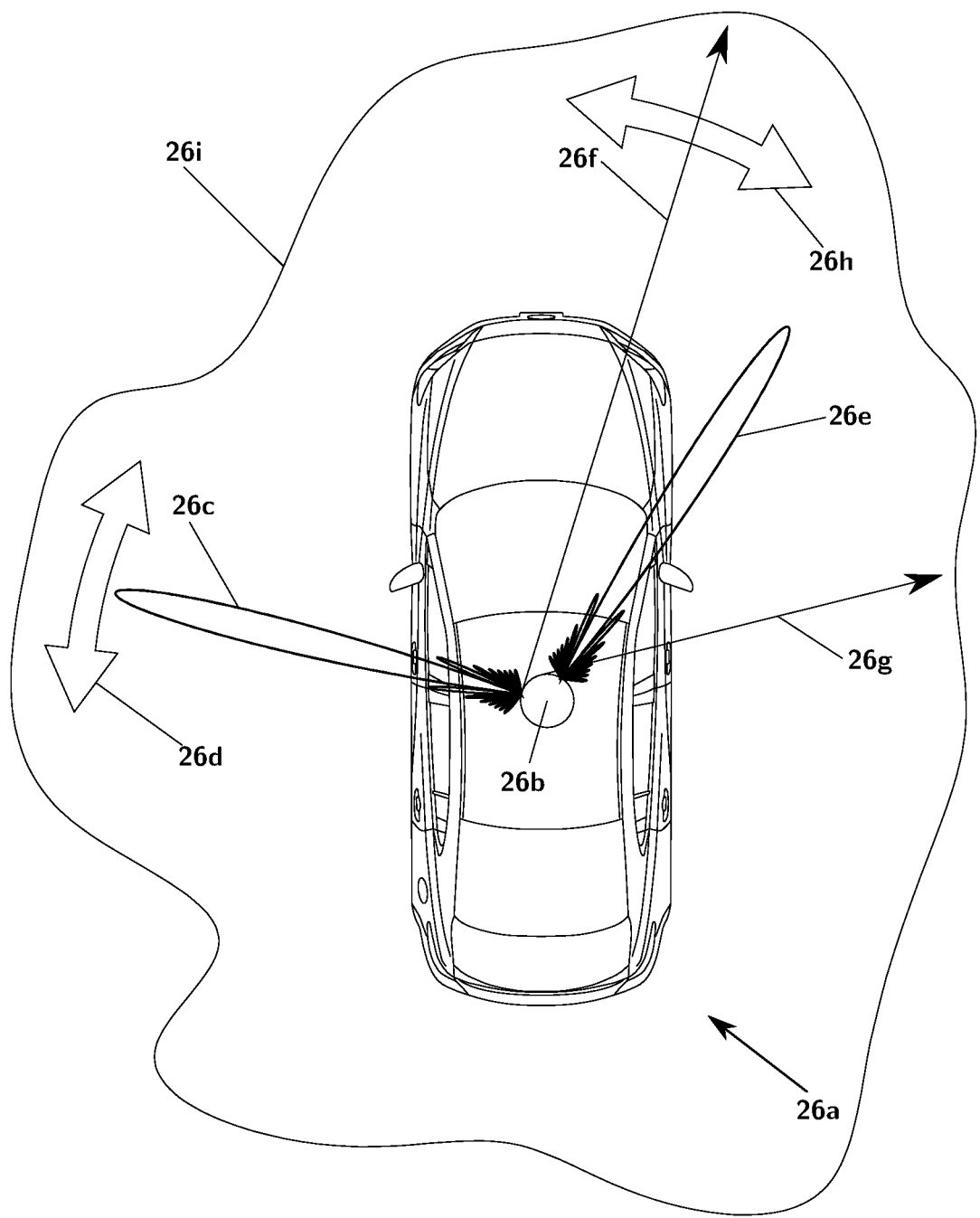
FIG. 26 shows a combined remote sensing device comprising LiDAR, W-Band radar and optical imaging system for autonomous automotive driving and navigation integrated on the top of a car.

In FIG. 26 an autonomous vehicle 26*a* having a V-electrode hyper-spectral sensor 26*b* centrally located on its roof is shown. An example of this sensor is that of FIG. 25. The hyper-spectral sensor provides a W-band RADAR signal that has one more W-band antenna patterns 26*c* that can change angle direction 26*d* to provide a new W-band antenna pattern 26*e* in a new direction. The transmit and receive W-Band antenna patterns typically being close to aligned, but offset in angle slightly to facilitate reduction of cross talk via matched impedance loads in unused W-band antennas. The radar is colocated with the LiDAR sensor that provides LiDAR beams such as 26*f* and 26*g* that have movement in angle 26*h* over time. The RADAR and the LiDAR operate simultaneously with a camera to image the visible world scene 26*i* that surrounds the autonomous vehicle 26*a*.

There are many possible configurations of a remote sensor for applications where LiDAR may be needed. However, for the purpose of this disclosure the main features incorporated in an embodiment are: a light beam, a curved control volume for containing a curved trajectory laser beam. Co-located with the LiDAR's DEP-based transmitter is a LiDAR receiver and may include other sensors like a RADAR, camera and acoustic sensor.

DEP-Based Generation of Thousands of LiDAR Beams

In this section we consider how to take a single input laser beam and spread it in such a way as to create many beams that can be used independently and controlled by a DEP process. By carefully choosing modes to excite in a control volume with a controllable refractive index distribution the light's energy is made to move along a new class of "accelerating" trajectories within a curved control volume forming a μFCC. This has substantial practical applications for building compact beam directors for applications like Light Detection and Ranging (LiDAR) where potentially millions of laser pulses per second need to be steered into many distinct angular directions.

In what follows a quick review of select historical results is followed by an extension of the prior art theory to the new situation of spatially varying refractive index in a colloidal IGL. The resulting modes are used to redirect light into specific angular directions over large solid angles.

Over thirty years ago in the paper "*Nonspreading wave packet*," by M. V. Berry [Am. J. Phys. 47(3), March 1979] it was observed that a probability wave taking the form of an Airy function can propagate in free space without distortion and with constant acceleration without violating the Ehrenfest's theorem on nonaccelerating wave packets. In particular, one possible solution to the Shcrodinger equation in free space $$-\frac{\hbar}{2m}\frac{\partial^2 \psi}{\partial^2 x} = i\hbar\frac{\partial \psi}{\partial t} \tag{490}$$

is an Airy wave given by $$\psi(x,t) = Ai\left[\frac{B}{\hbar^{2/3}}\left(x - \frac{B^3 t^2}{4m^2}\right)\right]\exp\left[\left(\frac{iB^3 t}{2m\hbar}\right)\left(x - \frac{B^3 t^2}{6m^2}\right)\right], \tag{491}$$

which is demonstrated by means of direct substitution of Eq. 491 into the wave equation Eq. 490 and the Airy differential equation $$\frac{d^2 y}{dx^2} - xy = 0. \tag{492}$$

It can be shown that just like plane waves of infinite extent this Airy wave packet can propagate without changing form and remain distortion free. No other functions other than the plane wave and the Airy wave have this property in a linear medium.

Thus, if one could find the electromagnetic counterpart to the above quantum wave functions then the unusual feature of the Airy packets to remain distortion-free over long distances by free acceleration during propagation might be realized. Again, it is worth emphasizing that this distortion-free property is realized without the need for a special non-linear medium and the property may be maintained in free-space or in a beam forming device.

The staring point for bringing this wave property into electromagnetics is the time-domain version of the wave equation, in particular from Maxwell's equations it is easy to show for free propagation that $$\nabla^2 \mathcal{E} = \frac{1}{c^2}\frac{\partial^2 \mathcal{E}}{\partial t^2}. \tag{493}$$

If we substitute the following assumed field configuration (which temporarily breaks with the time sign convention $e^{i\omega t}$ in this disclosure so as to be consistent with the cited literature)

$$\varepsilon(r,t) = E(r)e^{i(kz-\omega t)} \tag{494}$$

into Eq. 493 then we obtain $$\left(\frac{\partial^2}{\partial x^2} + \frac{\partial^2}{\partial y^2} + \frac{\partial^2}{\partial z^2} + 2ik\frac{\partial}{\partial z}\right)E(r) = 0, \tag{495}$$

which has historically been difficult to solve unless a paraxial approximation is made. This requires that the field varies gradually along the z-axis so that $$\left|2k\frac{\partial E(r)}{\partial z}\right| \gg \left|\frac{\partial^2 E(r)}{\partial z^2}\right| \tag{496}$$

whereby Eq. 495 becomes $$\left(\frac{\partial^2}{\partial x^2} + \frac{\partial^2}{\partial y^2} + 2ik\frac{\partial}{\partial z}\right)E(r) = 0. \tag{497}$$

This can be written generically as a kind of Shcrodinger equation similar to that of Eq. 490. In particular, we obtain $$\frac{1}{2}\frac{\partial^2 E(\chi,\zeta)}{\partial \chi^2} = -i\frac{\partial E(\chi,\zeta)}{\partial \zeta}, \tag{498}$$

where $$\zeta = \frac{z}{kx_0^2} \tag{499}$$

$$\chi = \frac{x}{x_0} \tag{500}$$

$$k = \frac{2\pi n}{\lambda_0} \tag{501}$$

and $\chi$ is the normalized transverse direction, $x_0$ is a convenient transverse metric like the beam width, $\zeta$ is the normalized propagation distance and k is the wavenumber in the medium with refractive index n. Equation 498 has a solution $$E(\chi, \zeta) = E_0 Ai\left[\chi - \left(\frac{\zeta}{2}\right)^2\right]\exp\left[i\left(\frac{\chi\zeta}{2} - \frac{\zeta^3}{12}\right)\right], \quad (502)$$

which clearly shows that the intensity profile of the wave is invariant in its propagation. This result does not require a nonlinear medium. Moreover, the excitation of the Airy beam can be accomplished through a truncation via an exponential aperture function at the light beam source so that $$E(\chi, 0) = E_0 Ai[\chi]e^{a\chi} \quad (503)$$

where $0<a<<1$, which ensures that for negative X-coordinate values that the exponential goes to zero and effectively truncates the Airy beam. The resulting extended beam is found by integrating Eq. 498 so that a practical beam takes the form $$E(\chi, \zeta) = \quad (504)$$
$$E_0 Ai\left[\chi - \left(\frac{\zeta}{2}\right)^2 + ia\zeta\right]\exp\left[a\chi - \frac{a\zeta^2}{2} + i\frac{a^2\zeta}{2} + i\left(\frac{\chi\zeta}{2} - \frac{\zeta^3}{12}\right)\right].$$

The Fourier transform of which is proportional to $\exp[ak^2]\exp[ik^3/3]$ so that one way the Airy beam is generated is by means of a Gaussian beam and an optical Fourier transformation after a cubic phase is impressed on the Gaussian beam. The details of this are further discussed by G. A. Siviloglou et. al. in the paper entitled "*Observation of Accelerating Airy Beams*," in Physical Review Letters [PRL 99, 213901 (2001)]. Unfortunately, the Airy beams formed in the paraxial approximation are limited to small angles.

More recent solutions to the full Maxwell's equations have been found that bear a striking resemblance to the paraxial Airy beam solutions and are capable of large angular deviations like those that are found in beam steering. For example, the journal paper entitled "Nondiffracting Accelerating Wave Packets of Maxwell's Equations," by Ido Kaminer et. al. in Physical Review Letters [PRL 108, 163901 (2012)] demonstrates accelerating solutions to Maxwell's equations for circular propagating non-diffracting waves. Also, in the full three dimensions accelerating waves on spherical manifolds were also found and experimentally observed in the journal paper entitled "*Observation of Accelerating Waves Packets in Curved Space*," by Anatoly Patsyk et. al. in [Physical Review X 8, 011001 (2018), DOI: 10.1103/PhysRevX.8.011001]. This last journal paper is of particular interest in this disclosure.

The main feature of accelerating electromagnetic light beams is that their center of momentum (similar to the center of mass) follows a geodesic formed by the μFCC, but the radiation's main lobes follows a curved path that is shape-preserving (non diffracting) over large angular extents while the main radiation lobes do not propagate on a geodesic. In contradistinction to the accelerating beams in flat space, accelerating beams in curved space change their acceleration trajectory due to an interaction that exists between the space curvature and interference effects so that the light's main lobe may follow non-geodesic trajectories while the beam focuses and defocuses periodically due to the spatial curvature of the medium that they traverse.

For the avoidance of doubt, a geodesic is the shortest possible curve between two points on a curved surface or manifold. In the case of a sphere in three spatial dimensions a geodesic is a circle that cuts the sphere such that the center of the cutting circle coincides with the center of the sphere. Examples of a geodesics on a sphere are circles of longitude, while examples of non-geodesics on a sphere are circles of latitude except for the equator circle.

Light that is launched in thin uniform colloidal spherical shell, with thickness much greater than the wavelength light and higher uniform refractive index than a surrounding transparent medium, will propagate along a geodesic trajectory due to total internal reflection in the spherical shell. Similar considerations are possible for other geometric shapes, like cylinders and ellipsoids. The fact that light obeys this principle can be derived in several ways, e.g. for ray optics it is possible to start with Fermat's principle and use the variational calculus. For example, a colloidal cylindrical shell provides a geodesic trajectory called a geodesic helix as is later derived in Eq. 814.

The key to creating thousands or even millions of separate beams for LiDAR is to exploit a "loop hole" of sorts in the physics of light beam propagation that allows a portion of a light field to propagate on non-geodesic and "accelerating" trajectories so long as there are counter balancing "accelerations". More specifically, the loop-hole is that the peak intensity radiation lobe of a modal light field can follow a non-geodesic trajectory if other parts of the light field, e.g. the side-lobes of radiation, compensate so that on average the light's average momentum is on a geodesic. Thus, if one is willing to expend some extra optical energy for the extra modes and a means to generate those modes then it is possible to obtain a new ways to generate beams for LiDAR. In this disclosure the loop-hole in propagation physics is exploited using a DEP process.

The modal solutions that are developed herein allow a control volume comprising a thin spherical shell μFCC, which is simple and cost effective to manufacture, to support many separate laser pulses that are directed along different non-geodesic trajectories, e.g. latitude circles, instead of being restricted to just path-length-minimizing geodesics, where an index gradient is maintained in an optical shell—e.g. the spherical shell. The accelerating laser pulses are steered within the μFCC to the correct angular location and the IGL is relaxed from a gradient state into a uniform refractive index that is matched to the surrounding medium so as to release the light beam into a straight line trajectory that ultimately becomes a plurality of free-space light beams in rectilinear motion. The light may be continuous or pulsed.

Some of the main conceptual points being developed herein include:

1. Thin shells comprising an IGL have a non-uniform refractive index.
2. The curved shell can take any shape, but we will analyze a sphere herein.
3. The curved shell is a transparent colloid with particles therein.
4. A shape-preserving intensity profile develops within the curved shell.
5. Shape preservation ("acceleration") implies diffraction-free propagation.
6. Only a linear medium is required to support accelerating beams.
7. Acceleration of wave allows the main distortion lobe to not follow a geodesic.
8. Controlling the modal structure within the IGL allows control of output beam direction.
9. New accelerating radial modes found include Airy and parabolic-cylindrical-D functions.
10. Radial Airy modes are truncated by light scattering perpendicular to propagation within the IGL.

11. Accelerating light on a curved manifold focuses and defocuses periodically.
12. This focusing and defocusing can occur on trajectories that are complex and not just circles of latitude.

The development herein of the beam steering of a plurality of beams uses a different assumptions from any of the prior art in accelerating beam theory. In particular, it shall be assumed herein that a beam steering and generation device has a liquid and nanoparticle mixture forming a colloidal shell forming a substantially two-dimensional shell in a three dimensional space. Further, that the colloidal shell has a graded refractive index formed therein.

In particular, consider as an example of the principles a thin spherical shell that has a graded refractive index that is only a function of the radius. Moreover, assume that refractive index monotonically decreases as the radius increases, which is a convenient but not a necessary assumption. An example, of this is obtained by generalizing Eq. 418 for the colloid's refractive index as $$n_L(r) = n_0 - \left(\frac{\alpha}{2}\right)\left(\frac{n_0}{R}\right)(r - R), \tag{505}$$

where R is the radius to the center of the thin dielectric shell that forms the µFCC, $n_0$ is the refractive index at the center of the µFCC and α is a real refractive index slope adjustment that is obtained in practice by electronically setting harmonic excitation voltages, electrode-to-electrode phase shift and frequencies that influence the quasi-static ponderomotive forces on the nanoparticles in the IGL. Of course other linearized functions may be used, but Eq. 505 provides a reasonable example for this disclosure.

Therefore, for a spherical dielectric shell the quasi-electrostatic field we need to induce the suggested gradient takes the form $$E = E_0(i\hat{\phi} + \hat{r})f(\phi)e^{-i\kappa\phi - \kappa r}. \tag{506}$$

There is clearly an exponentially decaying field as the point of observation moves from the inner surface at $r_1 = R - \delta r$ towards the outer surface at $r_2 = R + \delta r$, where $0 < \delta r \ll R$. This decaying field provides ponderomotive forces on nanoparticles via a gradient formed by a decaying electric field as r increases. Additionally, and for the sake of clarity, it should be noted that electrodes may be placed on or about the outer surface of the thin spherical surface or on the inside as well, however the sign of the real part of the complex Clausius-Mossotti factor would have to be reversed by choosing that quasi-static excitation frequency appropriately as can be seen in FIG. 4. Thus both nDEP and pDEP processes are possible within the µFCC.

With that in mind we consider an optical transverse magnetic (TM) electric field given by $E = \langle E_r, E_\theta, E_\phi \rangle = \langle 0, E_\theta, 0 \rangle$, where the conventional meaning of the spherical coordinates includes: r is the radius, θ as the polar angle and φ the azimuth angle. The wave equation Eq. 493 is then excited by a field $\varepsilon = \varepsilon(r, \theta, \phi)e^{i\omega t}$ which gives a Helmholtz wave equation $$\nabla^2 E_\theta(r,\theta,\phi) + k^2(r)E_\theta(r,\theta,\phi) = 0. \tag{507}$$

The $\nabla^2 E_\theta$ term has a sub-term with r factors, however we can make the approximation that for factors that do not include derivatives with respect to the radius that $r = R \pm \delta r$ is really just $r \approx R$ so that Eq. 507 becomes $$\frac{\partial^2 E_\theta}{\partial r^2} + \frac{1}{R^2}\left(\frac{\partial^2 E_\theta}{\partial \theta^2} + \frac{1}{\tan\theta}\frac{\partial E_\theta}{\partial \theta} + \frac{1}{\sin^2\theta}\frac{\partial^2 E_\theta}{\partial \phi^2}\right) + k^2(r)E_\theta = 0. \tag{508}$$

This may be solved by the method of separation of variables by letting $E_\theta(r, \theta, \phi) = X(r)\psi(\theta, \phi)$ so that $$\underbrace{\left(\frac{1}{X}\frac{d^2 X}{dr^2} + k^2(r)\right)}_{+\beta} + \underbrace{\frac{1}{R^2\psi}\left(\frac{\partial^2\psi}{\partial\theta^2} + \frac{1}{\tan\theta}\frac{\partial\psi}{\partial\theta} + \frac{1}{\sin^2\theta}\frac{\partial^2\psi}{\partial\phi^2}\right)}_{-\beta} = 0. \tag{509}$$

Where we proceed in the usual way and assign constants $+\beta$ and $-\beta$ to the terms in X and ψ separately. Then the equations for X(r) and ψ(θ, φ) become $$\frac{d^2 X(r)}{dr^2} + (k^2(r) - \beta)X(r) = 0 \tag{510}$$

$$\frac{1}{R^2}\left(\frac{\partial^2\psi(\theta,\phi)}{\partial\theta^2} + \frac{1}{\tan\theta}\frac{\partial\psi(\theta,\phi)}{\partial\theta} + \frac{1}{\sin^2\theta}\frac{\partial^2\psi(\theta,\phi)}{\partial\phi^2}\right) + \beta\psi(\theta, \phi) = 0. \tag{511}$$

The equation in ψ can also be separated by setting $\psi(\theta, \phi) = Y(\theta)Z(\phi)$ so that Eq. 511 becomes $$\underbrace{\left(\frac{1}{Z}\frac{d^2 Z}{d\phi^2}\right)}_{-m^2} + \underbrace{\left(\sin^2\theta\frac{1}{Y}\frac{d^2 Y}{d\theta^2} + \sin\theta\cos\theta\frac{1}{Y}\frac{dY}{d\theta} + \beta R^2\sin^2\theta\right)}_{+m^2} = 0, \tag{512}$$

which has terms in θ and φ only that are set equal to opposite signed constants $\pm m^2$. The resulting set of separated equations becomes $$\frac{d^2 X(r)}{dr^2} + (k^2(r) - \beta)X(r) = 0 \tag{513}$$

$$\sin^2\theta\frac{d^2 Y(\theta)}{d\theta^2} + \sin\theta\cos\theta\frac{dY(\theta)}{d\theta} + (\beta R^2\sin^2\theta - m^2)Y(\theta) = 0 \tag{514}$$

$$\frac{d^2 Z(\phi)}{d\phi^2} + m^2 Z(\phi) = 0. \tag{515}$$

Note that by making the change of variables $x = \cos\theta$ we find that Eq. 514 can be written as $$(1 - x^2)\frac{d^2 Y(x)}{dx^2} - 2x\frac{dY(x)}{dx} + \left(\beta R^2 - \frac{m^2}{1 - x^2}\right)Y(x) = 0, \tag{516}$$

which is the well-known standard form for the associated Legendre equation, which is solved for using a series solution as described by the well-known method of Frobenius—see for example "*Special Functions for Scientists and Engineers*," by W. W. Bell, 1996, ISBN 0-486-43521-0. The resulting recursion relations from the Frobenius method require that the value of $\beta R^2$ and $|m|$ are constrained as $$\beta R^2 = l(l+1) \forall l = 0,1,2,3, \tag{517}$$

$$|m| < l. \tag{518}$$

To solve the system of equations Eqs. 513-515 we need to make the observation that the graded refractive index within the relatively very thin μFCC is nearly linear so we can expand $k^2(r)$ about the center of the thin spherical μFCC region at r=R via a Taylor expansion and then retain the zeroth, first, second, etc. order terms as needed to accurately describe the situation.

The expansion of $k^2(r)$ to first order is $$k^2(r) \approx k^2(R) - 2k(R)|k'(R)|(r-R) \quad (519)$$

where by assumption k'(r)<0 for R−δr<r<R+δR in the μFCC is assumed in the analysis to draw out the negative sign in front of the second term so as to obtain a real valued solution to the radial modes. The k'(r)<0 assumption is not a requirement, but is done for convenience in the example being developed here. For example, in the case of the refractive index of Eq. 505 we find that $k(r)=k_0 n(r)$ so that $$k^2(r) \approx k_0^2 n_0^2 \left[1 - \frac{\alpha}{R}(r-R)\right]. \quad (520)$$

Using Eq. 519 in Eq. 513 provides a general solution in terms of the Airy functions of the first kind (Ai) and the Airy of the second kind (Bi) so that $$X(r) = C_1 Ai\left[\frac{\beta - k^2(R) + 2(r-R)k(R)|k'(R)|}{\{2k(R)|k'(R)|\}^{2/3}}\right] + C_2 Bi\left[\frac{\beta - k^2(R) + 2(r-R)k(R)|k'(R)|}{\{2k(R)|k'(R)|\}^{2/3}}\right]. \quad (521)$$

Alternately, the general expansion of $k^2(r)$ to second order is $$k^2(r) \approx k(R)^2 + 2k(R)k'(R)(r-R) + [k(R)k''(R) + k'(R)^2](r-R)^2 \quad (522)$$

Using Eq. 522 in Eq. 513 provides a general solution in terms of the Parabolic Cylindrical D-function $D_\nu(\xi)$ where $$\frac{d^2 D_\nu(\xi)}{d^2 \xi} + \left[\nu + \frac{1}{2} - \frac{1}{4}\xi^2\right]D_\nu(\xi) = 0, \quad (523)$$

which is further given in terms of the confluent hypergeometric function—see for example Abramowitz and Stegun (1965). In particular, the solution takes the form $$X(r) = \tilde{C}_1 D_{\nu_1}[A_1 r + B_1] + \tilde{C}_2 D_{\nu_2}[A_2 r + B_2] \quad (524)$$

where $\{A_1, A_2, B_1, B_2, \nu_1, \nu_2\}$ are substantially complicated functions of the parameters $\{k(R), k'(R), k''(R), \beta\}$ and are not provided here to save space. A detailed analysis of this radial mode as well as higher order radial modes in $(r-R)^j$ for j≥2 are not provided here.

The solution to Eq. 514 is given in terms of the associated Legendre polynomials of the first kind (P polynomials) and the associated Legendre polynomials of the second kind (Q polynomials) so that $$Y(\theta) = C_3 P_l^m(\cos\theta) + C_4 Q_l^m i(\cos\theta) \quad (525)$$

The solution to Eq. 515 is given in terms of the complex exponential functions $$Z(\phi) = C_5 e^{+im\phi} + C_6 e^{-im\phi}, \quad (526)$$

where the requirement that $Z(\phi)=Z(\phi+2\pi)$ requires that $e^{\pm i 2\pi m}=1$ and that m=0, ±1, ±2, . . . and therefore in general m is an integer. Note that the superposition of Eq. 526 represents propagation into ±φ directions.

It is clear that we can choose to have the electric field propagate in only one direction of φ so we choose a direction and set $C_6$=0. It is also clear that associated Legendre polynomials of the second kind are not bounded and are unphysical for the device configuration being analyzed, therefore $C_4$=0. Finally, the Airy function of the second kind is unbounded and also unphysical for the device configuration being analyzed, therefore $C_2$=0. Additionally, the function $\psi(\theta, \phi) = Y(\theta)Z(\phi)$ is a spherical harmonic and written formally as the normalized eigenmodes $$\psi_{l,m}(\theta, \phi) = N_{l,m} P_l^{|m|}(\cos\theta) e^{im\phi} \quad (527)$$

$$N_{l,m} = \sqrt{\frac{(2l+1)(l-|m|)!}{4\pi(l+|m|)!}} \quad (528)$$

$$l = 0, 1, 2, 3, \ldots \quad (529)$$

$$m = 0, \pm 1, \pm 2, \pm 3, \ldots, \pm l \quad (530)$$

where $N_{l,m}$ is the normalization amplitude of the mode that forms an orthonormal set of spherical harmonics note the slightly different definitions given by "*Physical Chemistry, A Molecular Approach*," by Donald A McQuarrie, ISBN 0-935702-99-7 and "*Mathematical Methods for Physicists, 3rd ed*," by Arfken, ISBN 0-12-059820-5.

However, on using Eq. 517 in Eq. 521 with $C_2$=0 for just a single mode having modal numbers l and m we obtain the simplest allowed modal structures, which in this disclosure are called the unstructured angular modes, which are $$E_\theta(r, \theta, \phi; l, m) = E_0 Ai\left[\frac{\left(\frac{l(l+1)}{R^2}\right) - k^2(R) + 2(r-R)k(R)|k'(R)|}{\{2k(R)|k'(R)|\}^{2/3}}\right] \psi_{l,m}(\theta, \phi) \quad (531)$$

and in the specific case of the graded refractive index via Eq. 520 the electric field becomes $$E_\theta(r, \theta, \phi; l, m) = E_0 Ai\left[\frac{l(l+1) + a\left(\alpha\frac{r}{R} - \alpha - 1\right)}{(\alpha a)^{2/3}}\right] \psi_{l,m}(\theta, \phi) \quad (532)$$

where $a = k_0^2 n_0^2 R^2$. The unstructured angular modes in Eq. 532 are configured with an unstructured radial mode, which in this case is an Airy beam having an electric field amplitude of $E_0$.

Examples of the unstructured modes are plotted in FIG. 27A-27B. Note that in FIG. 27B the radial region between R−δr<r<R+δr is the region of the μFCC where the colloidal IGL is located. A plurality of DEP electrodes operating at harmonic frequency ω are located on or about the radial surfaces $r_1$=R−δr and $r_2$=R+δr. These electrodes are not shown in the figure. Additionally, in FIG. 27B only the Airy modal structure within the μFCC region is shown in preparation for a discussion of the structured radial modes.

Figure 28:
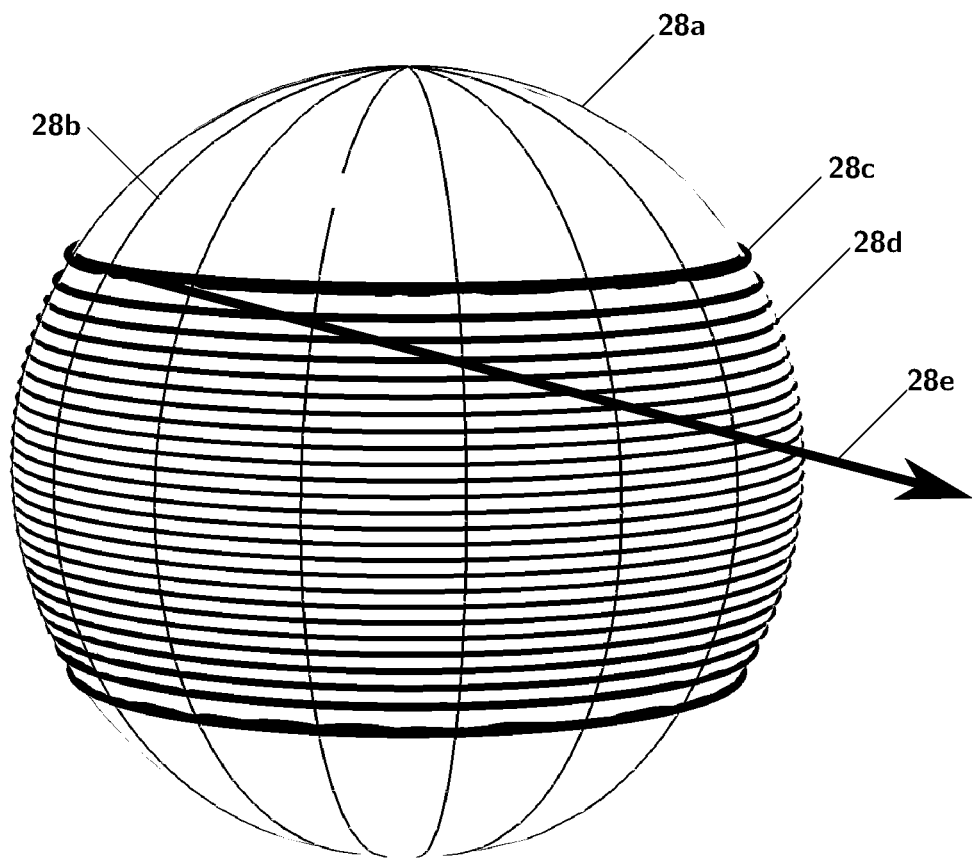
FIG. 28 shows a basic unstructured mode propagating around the symmetry axis on non-geodesic trajectories that are formed just above an inner solid dielectric sphere in the region of a microfluidic control volume.

A different way of showing an example of an unstructured mode is provided in FIG. 28, where the radiation lobes, which are shown as bands, are substantially following non-geodesic trajectories around a spherical dielectric manifold 28*a*. For the sake of clarity, in FIG. 28 geodesics are those circles on a sphere where the center of the sphere is the same as the center of the circle, an example is a meridian geodesic 28*b*. Non-geodesic trajectories include a main lobe 28*c* and a side lobe 28*d*. Note that the thickness of the trajectory curves is representative of the radiation's intensity as plotted in FIG. 29A. When the circulating wave energy is released by changing the refractive index distribution then the main and secondary radiation lobes tangent to the accelerating trajectory becomes linearly propagating light 28*e* in a medium of constant refractive index and the rays follow a straight trajectory through a transparent optical radome (not shown) and at least one of refracts and reflects into the external environment depending on the radome design. The radome may have an outer spherical surface or it may take on other forms.

Note, that typically all the radiation should be released at once. This is done so that the center of the light's momentum remains constant and we have multiple parallel beams leaving the system as LiDAR beams. Only one such linearly propagating light 28*e* beam is shown in FIG. 28 to reduce image clutter.

The reader should appreciate that the colloidal medium may also contain particles that are doped with atoms that can provide gain and lasing action so random light noise becomes an Airy beam in the thin colloidal shell having a GRIN distribution as described. Much more is discussed on the topic of colloids used for lasers in the section of this disclosure on DEP-based lasers.

Having just described the unstructured angular and transverse modal structures, we now look at the structured angular and radial modes, which are formed by the superposition of the basic unstructured modes. The structured modes provide additional useful features, like beam steering in elevation, for end-use applications like LiDAR and are now described.

Structured radiation modes within the beam steering device are formed as a superposition of basic unstructured eigenmodes. For example, we can write in general that a structured angular mode $\psi_l(\theta, \phi, l_0, m_0)$ is given by $$\psi_l(\theta, \phi, l_0, m_0) = \sum_m A_{l,m} \psi_{l,m}(\theta, \phi), \tag{533}$$

which can impact the trajectory of the light in the 2-dimensional ($\theta$, $\phi$) space. Different complex apodization weighting coefficients $A_{l,m}$ will impact the manifold trajectory differently. There are essentially an infinite number of potential candidates for $A_{l,m}$ however, as a specific example we consider the structured angular mode formed from a gaussian weighting, which is chosen only as an example that connects back with discussions of the prior art.

In particular, consider the superposition $$\psi_l(\theta, \phi, l_0, m_0) = \sum_m e^{\left(\frac{m-m_0}{M(l_0, m_0)}\right)^2} \psi_{l,m}(\theta, \phi) \tag{534}$$

where the gaussian weighting parameter is $$M(l,m) = a_{0,0} + a_{0,1}m + a_{1,0}l + a_{1,1}lm + a_{0,2}m^2 + a_{2,0}l^2 + \ldots + a_{N,N}l^N m^N. \tag{535}$$

In general the trajectories of the radiation in the μFCC vary as a function of how the input light is modally structured.

Figure 30:
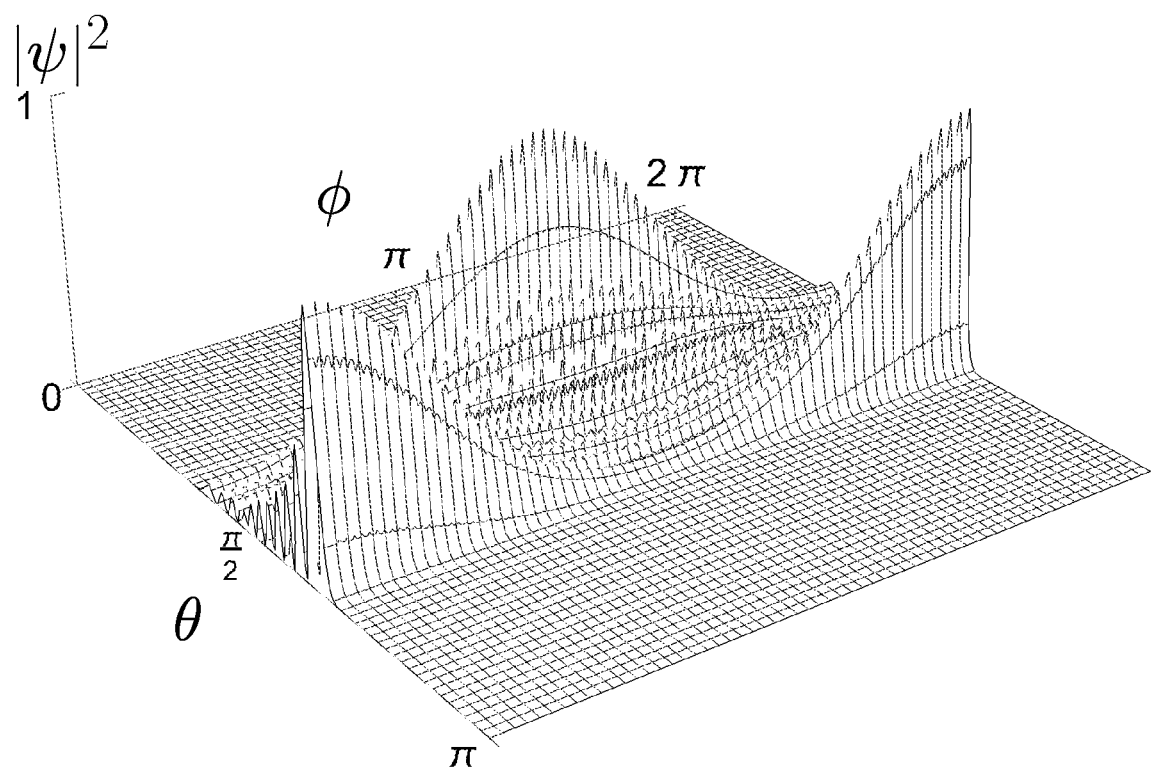
FIG. 30 shows an example structured angular trajectory and intensity of a light beam's main lobe on a non-geodesic trajectory that is confined to constant latitudes.

If $M(100, 90) = a_{0,0} = 1$ then an example of a structured mode is shown in FIG. 30 and there are a series of bands in the $\theta$ direction that represent a main and side lobes. As the wave progresses around the spherical shell of the μFCC in the $\phi$ direction the radiation focuses periodically as shown. The main lobe of the radiation can be launched out of the μFCC at the time the radiation is focused and maximized. In practice the values of $l_0$ and $m_0$ may be quite large as integers with values in the thousands to hundreds of thousands. The values of $l_0 = 100$ and $m_0 = 90$ are only taken to provide a manageable example. Additionally, note that the angular distance of a main lobe from the equator ($\theta = \pi/2$) is proportional to ($l_0 - m_0$) in this example.

Figure 31:
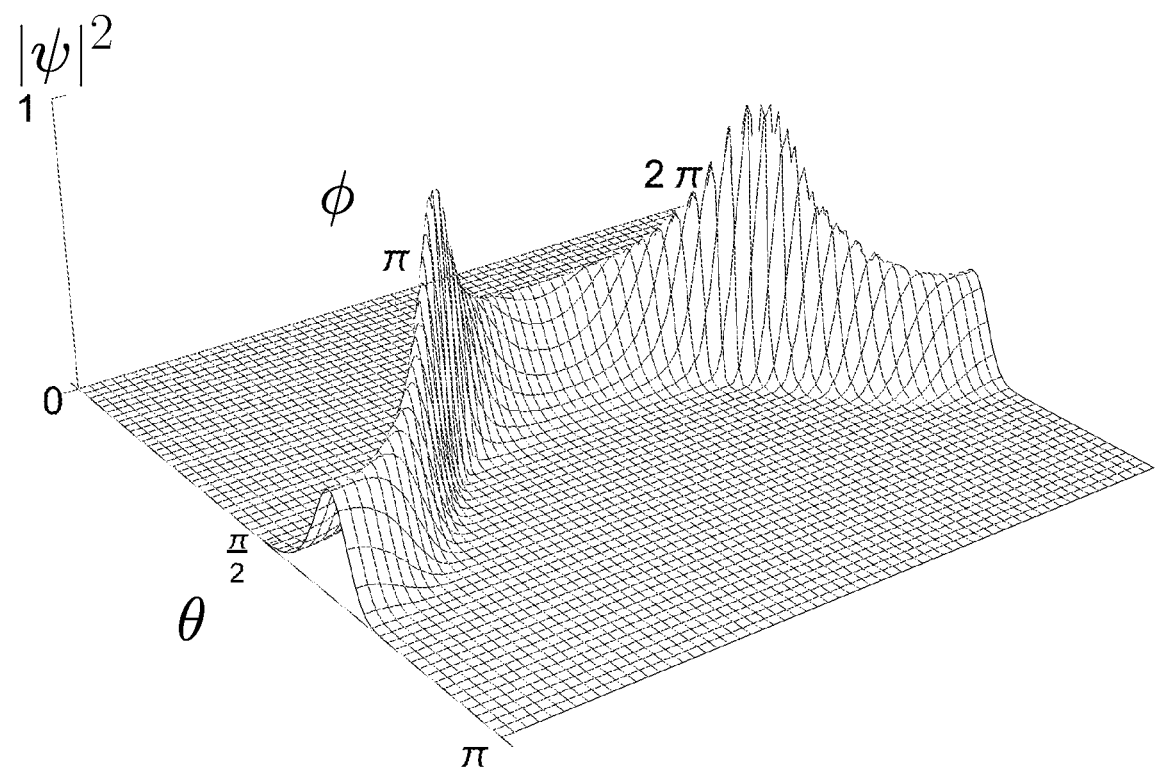
FIG. 31 shows an example structured angular trajectory and intensity of a light beam's main lobe on a non-geodesic trajectory that is not confined to a simple constant latitude.

However, as another example, if $M(l_0, m_0) = l_0 - m_0 + 1$ then we have $M(100, 90) = 11$ and a different type of structured mode is shown in FIG. 31 and there is an oscillating trajectory and an angular locations ($\theta$, $\phi$) for a focus peak. Thus, a means exists for the peak intensity lobe reaching any point ($\theta$, $\phi$) on a trajectory $\theta = \theta(\phi, l_0, m_0)$ and we can also control the slope $\partial_\phi \theta(\phi, l_0, m_0)$ at this focus.

This allows light to be launched into any direction by controlling the modal structure of the radiation in the μFCC through the harmonic excitation voltages, frequency, and phase on the electrodes controlling nanoparticle ponderomotive forces within the control volume μFCC and potentially by adding selective absorbing nanoparticles or selective gain producing nanoparticles.

In summary, it has been demonstrated from first principles that an "accelerating light beam" can maintain its main and side-lobes on non-geodesic trajectory. This flexibility provides significant opportunities for LiDAR laser directors, where there is a need to have large numbers of laser pulses sent into potentially thousands or even millions of per second for mapping the environment.

Supplemental comments: This section has provided some insight into accelerated beams and the quest for diffraction-free beams. In particular, the material herein was focused on the spatial structuring of light. However, recent advances in beam formation technologies has pointed to way towards space-time beam synthesis. An example of this recent literature is the article entitled, "*Weaving the Rainbow,*" by Murat Yessenov, et. al. in Optics and Photonics News May 2019, pages 34-41. DEP-based technologies may also be ideal for the synthesis of diffraction-free space-time beams due to an ability to integrate together diffraction, lenses, and spatial light modulators all of which are needed to produce these new and emerging diffraction-free beam.

Precision Beam Steering

The ability to point a light beam (e.g. a laser beam) over both short and long distances with both accuracy and precision is a fundamental and enabling technology capability for many high-value applications.

End-use applications of accurate and precise beam pointing include, but are not limited to: LiDAR, 3D-Printing, power beaming for drones and aircraft, welding, cutting, drilling, point-to-point laser communications, remote laser spectroscopy for chemical sensing, micro-satellite propulsion, target tracking munitions, laser surgery, and entertainment via light shows. Additionally, a broadband and polarization independent beam steering solution also has the potential for controlling extremely narrow pulses in time as well as light from super continuum laser sources, which are multi-octave bandwidth, for creating atmospheric solitons, electromagnetic bullets and other exotic linear and nonlinear waves in a medium like the atmosphere. This can help to control beam-spread.

For the avoidance of doubt a high-level of laser pointing accuracy is the ability to drive the laser beam to a desired direction with at most small systematic pointing errors so that a Gaussian probability distribution, which describes the beam's output direction statistically, is nearly perfectly centered on the desired output direction.

For the further avoidance of doubt a high-level of laser pointing precision is the ability to drive the laser beam to a desired direction while maintaining at most small random pointing errors so that a Gaussian probability distribution, which describes the beam's output direction, statistically has a small standard deviation centered in the desired direction.

Having both high accuracy and precision means that a laser beam can, in a statistical sense, hit a target at a large distance with high certainty, not withstanding time dependent changes to atmospheric and laser-platform conditions. For example, to have 1 mm of light steering accuracy at 1 km, 10 km, 100 km and 1000 km (under steady and uniform atmospheric conditions) requires 1,000 nrad, 100 nrad, 10 nrad and 1 nrad of light steering accuracy respectively.

The phenomena of Dielectrophoresis (DEP) provides a direct electronic way to achieve both high beam pointing accuracy and precision by utilizing either precision frequency generation, precision voltage levels, or a combination of both. It should be stressed that electronic timing signals, e.g. digital clock pulses, are among the most precise physical quantity that can be generated and measured by humans. Atomic clocks set one end of the time precision spectrum and cheap watch oscillators are at the other end of the spectrum in accuracy and precision. So anytime you can tie performance of a controlled physical process to electronically generated timing signals there is an incredible opportunity to achieve high-quality control. In this case the control is in steering a beam of light e.g. a laser beam.

Thus, by leveraging the digital control of the frequency of a harmonic, i.e. both traveling and non-traveling wave voltage signals, on DEP electrodes both very accurate and precise ponderomotive forces can be generated leading to accurate and precise beam steering. The Clausius-Mossotti factor effectively converts a harmonic clock oscillation at frequency $\omega$ into a non-uniform electric field to impress a force on nanoparticles that respond in aggregate to provide highly controllable spatial distributions of the nanoparticles, and by extension the effective refractive index. This can be seen for example in Eq. 281.

Note that as long as there is no significant variation in the harmonic voltage amplitude along the plane of a planar electrode array (i.e. each electrode has the same electric field amplitude) then we can expect that only the real part of the Clausius-Mossotti factor survives and it is the exponential decay of the electric field intensity away from the electrode array that gives the needed non-uniform electric field intensity for DEP. The real part of the Clausius-Mossotti factor can take on both positive an negative values leading to pDEP and nDEP processes as can be seen in FIG. 4.

To begin an analysis of ray trajectories consider Eq. 334 and divide by n(r) so we can rewrite the equation in terms of the natural logarithm, whereby we obtain $$\ddot{r}+\left[\frac{d}{ds}\ln n(r)\right]\dot{r}=\nabla[\ln n(r)] \tag{536}$$

where s is the arc length of a propagating ray and the dot notation represents derivative with respect to s. Let us also now consider an exponential GRIN medium over a restricted spatial extent where practical values of the refractive index may be generated, then $$n(r)=n_0e^{\alpha\cos\theta_x x+\beta\cos\theta_y y+\gamma\cos\theta_z z}, \tag{537}$$

where α, β and γ are new variables that are all greater than zero and represent the rate of exponential change in the x, y and z directions; and $\cos\theta_x$, $\cos\theta_y$, and $\cos\theta_z$ are the direction cosines of the desired and electronically formed gradient vector. To see this note that $$\nabla n(r)=\langle\alpha\cos\theta_x,\beta\cos\theta_y,\gamma\cos\theta_z\rangle n(r). \tag{538}$$

The increasing exponential distribution of the refractive index in Eq. 537 is used here to model beam steering over a limited spatial extent of the control volume so that the range of the refractive index remains within practical values. The reason for using the exponential refractive index distribution is that nanoparticle distributions in a colloid under DEP processes also follow exponential spatial distributions over at least part of the colloid' control volume. So we anticipate that the refractive index will also follow an exponential distribution. Also, for small values of a the exponential is a good approximation to a linear curve, which is a nice intuitive feature.

As an initial analysis let's consider a 3-dimensional rectangular box forming a microfluidic control volume, which is surrounded by electrodes on each of the walls. The electrodes will impress traveling voltage waves, as has already been describes, to induce ponderomotive forces on nanoparticle contained within the control volume. We assume that for a desired pointing direction of the laser the refractive index is $n_0$ at the boundary x=0 and that only x-directed ponderomotive forces are initially created. The origin of the box forming the control volume is at one corner of the box and the axis are along the edges of the box. An example of the coordinates and control volume are shown in FIG. 37.

Note that $n_0$ is the smallest refractive index in the x-direction and that it is different for different steering directions, as discussed below. If the refractive index gradient points only in the x-direction so that $\theta_x=0$, $\theta_y=\pi/2$ and $\theta_z=\pi/2$ then $$n(r)=n_0e^{\alpha x}. \tag{539}$$

Moreover, as the number of nanoparticles within the rectangular box forming the control volume are a conserved quantity we expect that the average refractive index $n_A$ is also conserved. This implies that for a control volume of length $L_x$ in the x-direction and with only an x-directed gradient that the average refractive index is $$n_A=\frac{1}{L_x}\int_0^{L_x}n_0e^{\alpha x}dx=\frac{n_0}{\alpha L_x}(e^{\alpha x}-1) \tag{540}$$

so that $$n_0=\frac{\alpha L_x n_A}{e^{\alpha L_x}-1} \tag{541}$$

where α=α(V, ω) depends on the voltage and harmonic drive frequency of the electrodes and the average refractive index $n_A$ is given by Eq. 233. Assuming nanoparticles that are much smaller than the wavelength of light we can write an expression for the refractive index over a limited range of x-values where the refractive index is physically realizable so that when the voltages on the electrodes are set to zero and the distribution of the nanoparticles in the colloid within the rectangular box control volume is uniform then $$n_A = n_L + (n_S - n_L)v_S, \tag{542}$$

where $n_L$ is the refractive index of the liquid, $n_S$ is the refractive index of the solid nanoparticles, and $v_S$ is the volume fraction of the solid nanoparticles relative to the total volume of both the liquids and the solids in the colloid—see Eq. 232.

As we shall soon see the value of $n_0$, which changes with harmonic voltage amplitude and frequency, does not enter into the beam steering. Only the spatial rates of change $\alpha$ matters. To see this we use Eq. 539 so that Eq. 536 becomes $$\dot{u} + \alpha u^2 = \alpha \tag{543}$$

$$\dot{v} + \alpha u v = 0 \tag{544}$$

$$\dot{w} + \alpha u w = 0 \tag{545}$$

where $$\dot{x} = u \tag{546}$$

$$\dot{y} = v \tag{547}$$

$$\dot{z} = w. \tag{548}$$

These equations can be integrated directly from which we obtain $$u(s) = \tanh(\alpha s + c_1) \tag{549}$$

$$v(s) = c_2 \operatorname{sech}(\alpha s + c_1) \tag{550}$$

$$w(s) = c_3 \operatorname{sech}(\alpha s + c_1) \tag{551}$$

$$x(s) = c_4 + \left(\frac{1}{\alpha}\right) \ln[\cosh(\alpha s + c_1)] \tag{552}$$

$$y(s) = c_5 + \left(\frac{2c_2}{\alpha}\right) \tan^{-1}\left[\tanh\left(\frac{\alpha s + c_1}{2}\right)\right] \tag{553}$$

$$z(s) = c_6 + \left(\frac{2c_3}{\alpha}\right) \tan^{-1}\left[\tanh\left(\frac{\alpha s + c_1}{2}\right)\right] \tag{554}$$

where $\{c_1, c_2, c_3, c_4, c_5, c_6\}$ are constants of integration to be determined from the initial conditions of ray position and direction. If at $s=0$ the direction cosines of the propagation direction are $u_0 = \cos\theta_u$, $v_0 = \cos\theta_v$, and $w_0 = \cos\theta_w$ then $$c_1 = \tanh^{-1}(u_0) \tag{555}$$

$$c_2 = v_0 \cosh(c_1) \tag{556}$$

$$c_3 = w_0 \cosh(c_1) \tag{557}$$

$$c_4 = x_0 - \left(\frac{1}{\alpha}\right) \ln[\cosh(c_1)] \tag{558}$$

$$c_5 = y_0 - \left(\frac{2c_2}{\alpha}\right) \tan^{-1}\left[\tanh\left(\frac{c_1}{2}\right)\right] \tag{559}$$

$$c_6 = z_0 - \left(\frac{2c_3}{\alpha}\right) \tan^{-1}\left[\tanh\left(\frac{c_1}{2}\right)\right]. \tag{560}$$

Note that nowhere in the above equations Eqs. 549-560 does one find the value for the refractive index at a coordinate point as a parameter. Only the spatial rate of change of the refractive index, i.e. through $\alpha$, is included in the equations. This is an amazing property that allows parallel rays of a laser beam, which have spatial extent via a beam diameter, to continue to track parallel to each other through the GRIN system in the control volume.

This is seen in FIG. 32 where the laser output aperture 32a emits a first laser beam 32b with parallel curved trajectory rays. This is independent of the steering direction as is indicated with a second laser beam 32b. The only thing that is different between these two beams is the direction of the gradient of the refractive index in the colloid 32d. The first laser beam 32b has a refractive index gradient in the positive x-direction and the second laser beam 32b has a refractive index gradient in the negative x-direction.

Additionally, note that the optical path length S is given by combining Eqs. 539, 541, and 549-560 according to the following $$\begin{aligned} S &= \int_0^s n[r(\sigma)] \sqrt{\left(\frac{dx(\sigma)}{d\sigma}\right)^2 + \left(\frac{dy(\sigma)}{d\sigma}\right)^2 + \left(\frac{dz(\sigma)}{d\sigma}\right)^2} \, d\sigma \\ &= \int_0^s n[x(\sigma), y(\sigma), z(\sigma)] \sqrt{u^2(\sigma) + v^2(\sigma) + w^2(\sigma)} \, d\sigma \\ &= \int_0^s \frac{\alpha n_A L_x e^{\alpha x_0} \cosh(\alpha \sigma)}{e^{\alpha L_x} - 1} \, d\sigma \\ &= \frac{n_A L_x e^{\alpha x_0} \sinh(\alpha s)}{e^{\alpha L_x} - 1} \\ &= (n_0 s) \frac{\sinh(\alpha s)}{\alpha s}, \end{aligned} \tag{561}$$

where the limit $$\lim_{\alpha s \to 0} \frac{\sinh(\alpha s)}{\alpha s} = 1 \tag{562}$$

corresponds to the case when there are no ponderomotive forces ($\alpha = 0$) and the laser beam propagates through the uniform colloid a distance s along a straight line.

Let's consider the special case, which may be generalized, where the initial ray is launched from a position $\langle x_0, y_0, z_0 \rangle$ direction into the z-direction so that $\langle u_0, v_0, w_0 \rangle = \langle 0, 0, 1 \rangle$, then we have that $$c_1 = 0 \tag{563}$$

$$c_2 = 0 \tag{564}$$

$$c_3 = 1 \tag{565}$$

$$c_4 = x_0 \tag{566}$$

$$c_5 = y_0 \tag{567}$$

$$c_6 = z_0 \tag{568}$$

and $$u(s) = \tanh(\alpha s) \tag{569}$$

$$v(s) = 0 \tag{570}$$

-continued $$w(s) = \text{sech}(\alpha s) \tag{571}$$

$$x(s) = x_0 + \left(\frac{1}{\alpha}\right) \ln[\cosh(\alpha s)] \tag{572}$$

$$y(s) = y_0 \tag{573}$$

$$z(s) = z_0 + \left(\frac{2}{\alpha}\right) \tan^{-1}\left[\tanh\left(\frac{\alpha s}{2}\right)\right]. \tag{574}$$

In the following analysis we shall obtain a function $z=z(x)$ that describes the ray trajectory. During these algebraic manipulations we will find that the following identities are useful $$\tanh\left(\frac{A}{2}\right) = \frac{\sinh A}{\cosh A + 1} \tag{575}$$

$$\sinh A = \frac{e^A - e^{-A}}{2} \tag{576}$$

$$\cosh A = \frac{e^A + e^{-A}}{2} \tag{577}$$

$$\cosh^2\left(\frac{A}{2}\right) = \frac{\cosh A + 1}{2} \tag{578}$$

$$\tan A = \frac{1}{i}\left(\frac{e^{iA} - e^{-iA}}{e^{iA} + e^{-iA}}\right) \tag{579}$$

$$\tanh A = \frac{e^A - e^{-A}}{e^A + e^{-A}} \tag{580}$$

$$e^{iA} = \cos A + i \sin A \tag{581}$$

$$\cos(2A) = 2\cos^2 A - 1 \tag{582}$$

$$\sin(2A) = 2 \sin A \cos A \tag{583}$$

Therefore, we can write from Eq. 572 that $$\cosh(\alpha s) = e^{\alpha(x-x_0)} \tag{584}$$

$$\sinh(\alpha s) = \sqrt{e^{2\alpha(x-x_0)} - 1} \tag{585}$$

and from Eq. 574 and using Eqs. 575-577 and Eqs. 584-585 we obtain $$\tanh\left[\frac{\alpha s}{2}\right] = \tan\left[\frac{\alpha(z-z_0)}{2}\right] = \frac{\sinh(\alpha s)}{\cosh(\alpha s) + 1} = \frac{\sqrt{e^{2\alpha(x-x_0)} - 1}}{e^{\alpha(x-x_0)} + 1} \tag{586}$$

so that $$e^{2\alpha(x-x_0)} - 1 = (e^{\alpha(x-x_0)} + 1)^2 \tan^2\left[\frac{\alpha(z-z_0)}{2}\right] \tag{587}$$

and from Eqs. 576-577

$$\sinh[\alpha(x-x_0)] = 2\cosh^2\left[\frac{\alpha(x-x_0)}{2}\right] \tan^2\left[\frac{\alpha(z-z_0)}{2}\right]. \tag{588}$$

Now on using Eq. 578 and Eq. 575 a second time we get $$\tanh\left[\frac{\alpha(x-x_0)}{2}\right] = \tan^2\left[\frac{\alpha(z-z_0)}{2}\right]. \tag{589}$$

The next step is to use Eqs. 579-580 to obtain $$1 - 2e^{i\alpha(z-z_0)}e^{-\alpha(x-x_0)} + e^{2i\alpha(z-z_0)} = 0 \tag{590}$$

and now expanding the terms in $(z-z_0)$ by Euler's identity of Eq. 581, independently setting the real and imaginary parts of the resulting equation to zero to enforce the right hand side of Eq. 590 and using the trigonometric identity of Eq. 582 or Eq. 583, depending on if one chooses to work with the real or imaginary part of Eq. 590 respectively, we always obtain in either case a form of the equation describing the ray's path through the GRIN medium as $$\cos[\alpha(z-z_0)] = e^{-\alpha(x-x_0)}, \tag{591}$$

where the electronically controllable DEP parameter a describes the strength of the refractive index gradient for different ray trajectories and is a function of the electrode geometry, the harmonic voltage amplitude and the harmonic drive frequency ω, which excites ponderomotive forces via the Clausius-Mossotti factor.

Now that we have Eq. 591 describing parameterized ray trajectories we can obtain the equation for a lens surface. This is important because we desire to transition rays from a GRIN medium into homogeneous medium like glass or air. If we are not careful a laser beam will diverge at the boundary between the GRIN and homogeneous medium because on the GRIN side of the boundary provides different parts of the laser beam with different refractive indices. So while the beam propagation in the GRIN medium only depends on the gradient parameter a the Snell refraction across an optical boundary does have a refractive index at each point that needs compensation. To overcome this issue we will let the steered laser beam intersect normally at a curved boundary between the GRIN and homogeneous medium. Then at each point on the boundary Snell's law of refraction will always have the input angle set to zero independent of the changing refractive index in the GRIN medium. This is a simple and effective compensation for crossing the boundary without causing beam divergence.

To find the lens shape we first take the derivative of Eq. 591 with respect to x so that $$\frac{d}{dx}\cos[\alpha(z-z_0)] = \frac{d}{dx}e^{-\alpha(x-x_0)} \tag{592}$$

and $$\frac{dz}{dx} = \cot[\alpha(z-z_0)]. \tag{593}$$

A curve that is always perpendicular to the rays will have its slope given by the negative inverse of that in Eq. 593. Let us agree to call the surface of the lens by $z=\tilde{z}(x)$ then $$\frac{d\tilde{z}}{dx} = -\tan[\alpha(\tilde{z}-z_0)]. \tag{594}$$

While Eq. 591, which describes the ray, has a as a parameter, the equation for the lens surface cannot have α as a parameter—it needs its own independent parameter integration constant. So while in principle we could use Eq. 591 in Eq.

594 to eliminate $\alpha$. Unfortunately, Eq. 591 cannot be inverted to find $\alpha=\alpha(z, x)$ and we run the risk of not finding an analytic solution.

Therefore, to make some progress on the shape of the lens to minimize laser beam divergence for long-range accurate and precision beam steering observe that the function $$f(\alpha)=\cos[\alpha(z-z_0)]-e^{-\alpha(x-x_0)}=0 \quad (595)$$

has a Taylor series expansion about $\alpha=0$ so that $$\alpha(x-x_0) - \frac{\alpha^2}{2}[(x-x_0)^2 + (z-z_0)^2] + \frac{\alpha^3}{6}(x-x_0)^3 + \ldots = 0. \quad (596)$$

Now take only the terms though second order in $\alpha$ as an approximation and complete the squares. This results in the equation $$(z-z_0)^2 + \left(x - x_0 - \frac{1}{\alpha}\right)^2 = \frac{1}{\alpha^2} \quad (597)$$

which is an equation of a circle having a center at $(x_0+1/\alpha, z_0)$ in the xz-plane and a radius $1/\alpha$. Thus by inspection we have a circle that is parameterized in a similar way as one might expect from a Möbius projective transformation over the complex plane. We can therefore write a second equation for the projective map that preserves a $\pi/2$ radian angle between the curves of the ray and the possible curves of the lens surface. In particular, the lens equation must be $$(x-x_0)^2 + \left(\tilde{z} - z_0 - \frac{1}{\sigma}\right)^2 = \frac{1}{\sigma^2} \quad (598)$$

where $\tilde{z}$ was used instead of z to distinguish the ray's z-coordinate z from the lens surface z-coordinate $\tilde{z}$ and $(1/\sigma)=(z_m/2)$ is the radius of the circle and $z_m$ is the max distance from the laser to the lens surface—i.e. the circle's diameter. If we set $z(x)=\tilde{z}(x)$ in Eqs. 597-598 then we find that $$x = x_0 + \frac{2\alpha}{\alpha^2 + \sigma^2}. \quad (599)$$

However, what is really amazing is that if we write the condition for the two curves being perpendicular then $$\frac{dz(x)}{dx} = -\frac{1}{\left(\frac{\tilde{z}(x)}{dx}\right)} \quad (600)$$

which, provides on solving for x, that $$x = x_0 + \frac{2\alpha}{\alpha^2 + \sigma^2}. \quad (601)$$

Figure 33:
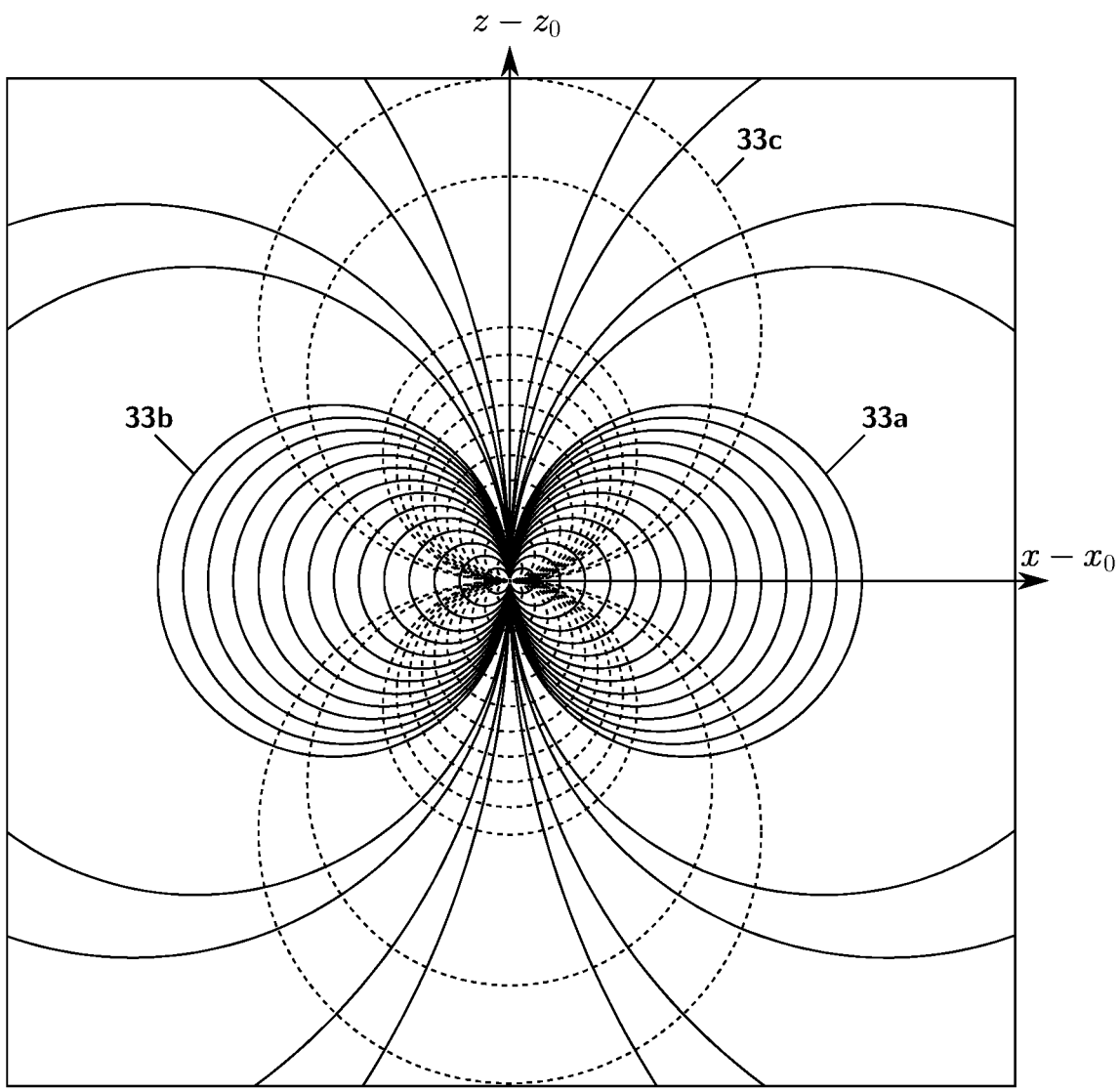
FIG. 33 shows two families of circles that approximate the rays and ray-normal-surfaces to second order that are used to describe a light-beam steering device based on dielectrophoresis.

This is the exact same value for x as in Eq. 601. This proves that the point of intersection is the same as the point of perpendicular crossing, i.e. as might have been expected from knowledge of the Möbius transformation. The second-order approximation to the rays and lens surfaces are provided in FIG. 33. The solid curves, such as ray circles 33a and 33b, are trajectories of a ray launched from point $(x_0, y_0, z_0)$ into the z-direction. The dashed circles, such as lens circle 33c are cuts into lens surfaces that are normal to the ray trajectories. Again, these curves are only approximate over a limited spatial range.

Figure 34:
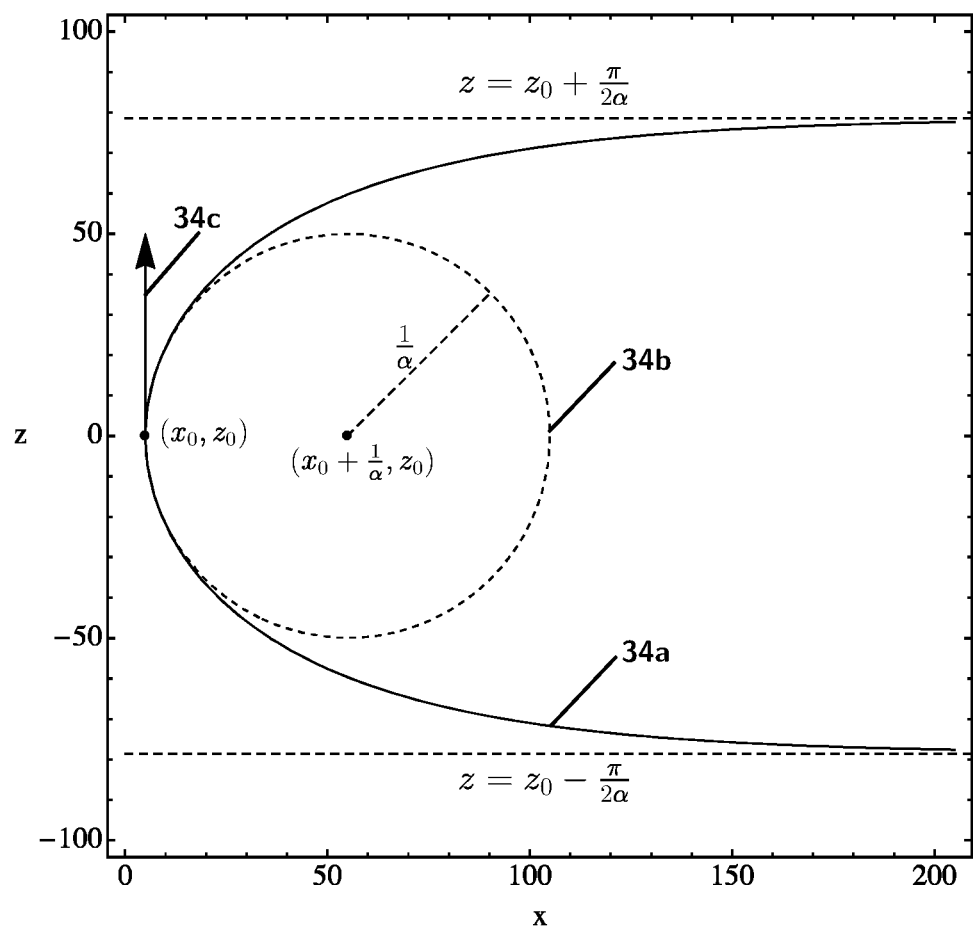
FIG. 34 shows a comparison between the exact and approximate solutions to the ray trajectory in an exponentially graded refractive index medium.

In FIG. 34 a comparison of the exact solution of Eq. 591 as 34a to the approximate solution of Eq. 597 as 34b. The two solutions match very well for z≥0 for an initial ray 34c that is launched in the z-direction. Clearly, the trajectory is of the ray is only valid over a very limited range of coordinate values where practical values of the refractive index can be increased exponentially at the rate a in the x-direction. The two solutions match well over this limited, but very practical spatial range.

Clearly only this limited range of the lens and ray circles are used in an actual design. Additionally, while the circular approximations to the rays and lens boundary are only approximate they give a good second order approximation to the physics and this lends itself to a better understanding. For actual manufacturing additional analysis or numerical optimization may be employed to get an optimized lens shape. Similarly, the above discussion on ray trajectories is only representative and other functional forms of the GRIN medium are possible instead of Eq. 537.

Note that the reason for all this effort in deriving a simple geometric interpretation of the ray trajectories and lens shape for transitioning to the external world is that it allows quick analysis of complex situations. Later in this disclosure more complex situations are introduced, for example in the application of spectral power combining for telecommunications, the geometric interpretation will then prove very useful to simplify the analysis.

Figure 35:
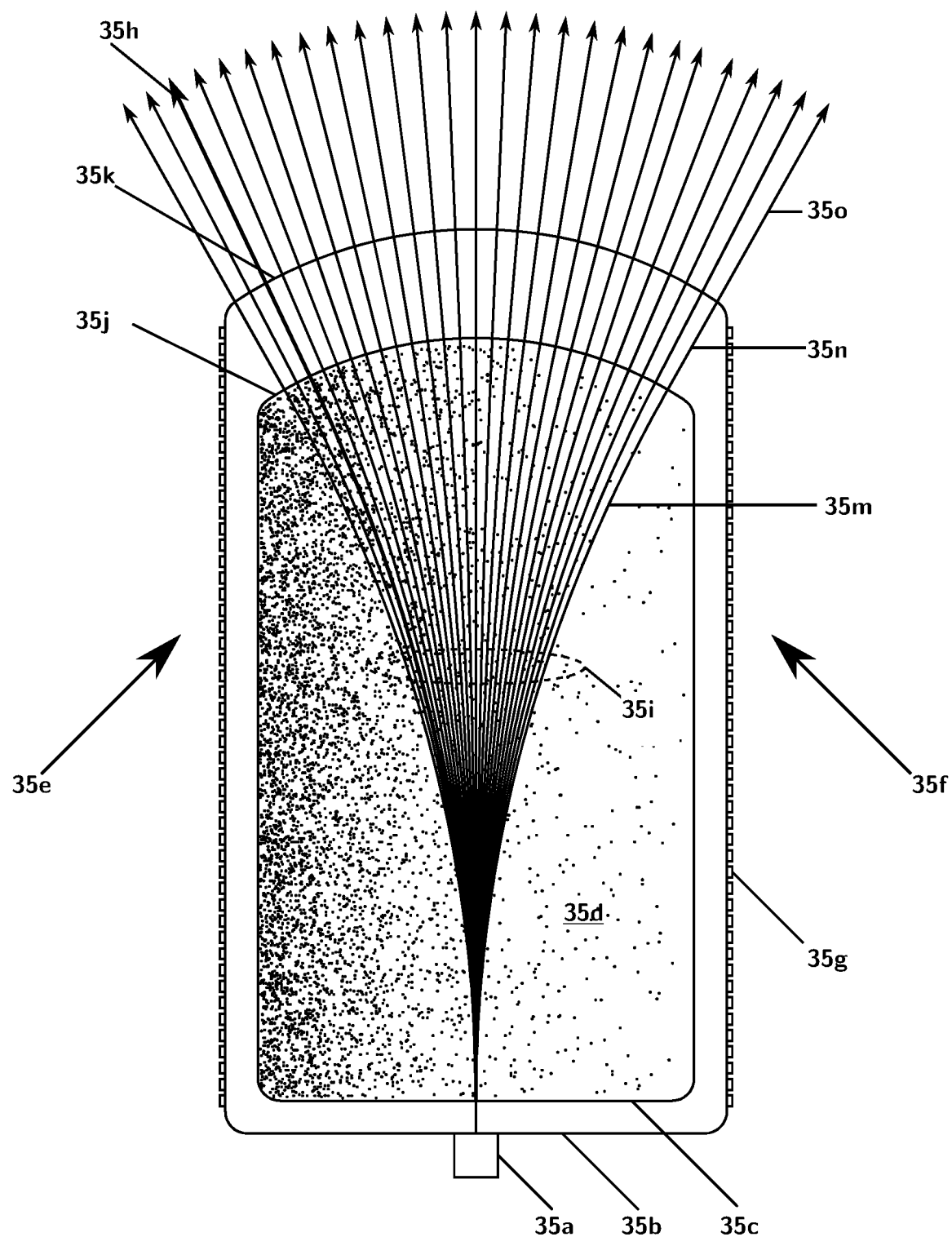
FIG. 35 shows in cross-section an embodiment of a light-beam steering device that is based on frequency and voltage control of the refractive index via a dielectrophoresis process of a colloid containing nano-scale particles.

FIG. 35 shows in cross-section an embodiment of a light-beam steering device that is based on frequency and voltage control of the refractive index via a dielectrophoresis process of a colloid containing nano-scale particles. In particular, a laser source 35a injects a laser beam into a fluidic control volume, said control volume having an external surface 35b and an internal surface 35c. The control volume contains a substantially transparent colloidal medium 35d consisting of a liquid medium and nanoparticles. A first and optional second electrode array 35e and 35f are arranged on either side of the control volume. The location of the electrode arrays may be outside or inside the control volume and only the case for the former is shown. These electrode arrays support traveling-wave voltage signals and can induce a gradient in nanoparticles and refractive index. Thus, individual electrodes, like electrode 35g have a slightly different voltage than its neighbors at any particular instant due to the impressed traveling wave. The frequency of the harmonic traveling wave on the electrode array determines if there is a pDEP, nDEP or zDEP process. Voltage amplitude variations may also be used in the control, but may not be as accurate and precise as frequency-based control.

In FIG. 35 the first electrode array 35e is exciting a nDEP process and second electrode array 35f is exciting a pDEP process. This can be seen by observing the depicted example exponential nanoparticle distribution. The result is a curving ray 35h that curves towards the greater nanoparticle density. As the frequency (and optionally also the voltage amplitude are varied) the light beam swings from one side of the beam steering device to the other side and the nanoparticles pile up on the opposite side of the device compared to that shown in FIG. 35. The range of steering directions is depicted in the figure with separate steered rays 35*i*, for the avoidance of doubt please note that only one of the separate rays shown is propagating at given time and that the beam can move continuously from ray position to ray position via the DEP beam steering process.

Note that in principle only one of the first electrode array 35*e* or the second electrode arrays 35*f* are needed, however if only one array is used then there is need for a much higher voltage on the remaining electrode array to compensate.

The curving ray 35*h* partially follows the trajectory given by Eq. 591, which is approximately a circle as given by Eq. 597. The first lens surface 35*j* approximately follows the curve given by Eq. 598. The second lens surface 35*k* may also be taken from the family of curves given approximately by Eq. 598. In this way a first ray segment 35*m* within the colloid is curved and is described by Eq. 591, a second ray segment 35*n* is a straight trajectory within a solid transparent medium between the first lens surface 35*j* and the second lens surface 35*k*, and a third ray segment 35*o* is a straight trajectory within the air or vacuum of the external environment.

Figure 36:
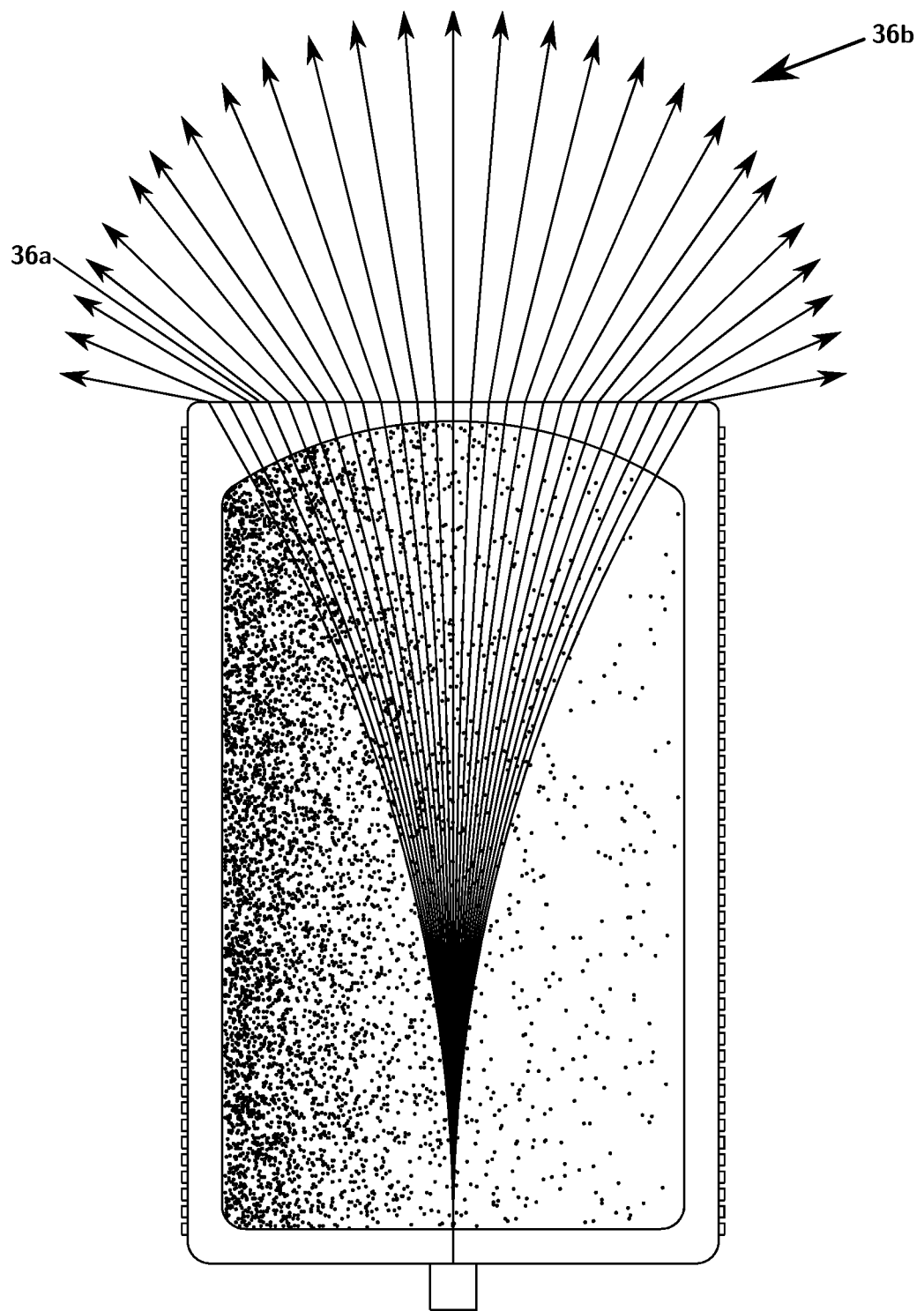
FIG. 36 shows in cross section an embodiment of a light-beam steering device that is based on frequency and voltage control of the refractive index via a dielectrophoresis process of a colloid containing nano-scale particles such that an entire hemisphere of directions can be accessed by a steered light beam.

FIG. 36 is the same as FIG. 35 except that the curved second lens surface 35*k* was replaced by a flat lens surface 36*a*. This results in being able to seer a laser beam over about π radians as shown. Again, for lasers with a non-zero beam width the solution is nearly perfect in that the process of beam steering does not induce any significant angular divergence of a laser beam.

Figure 37:
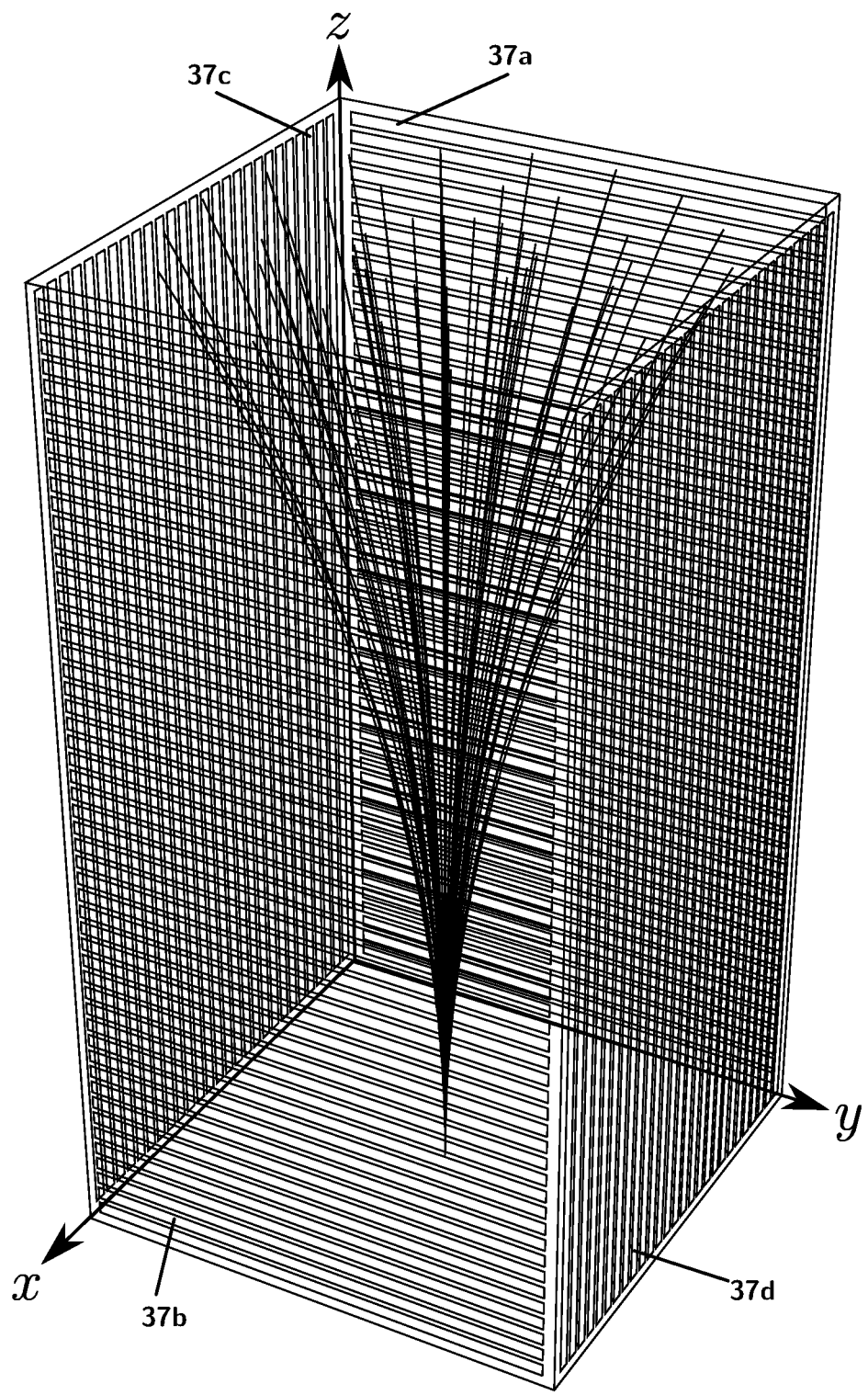
FIG. 37 shows a three dimensional perspective of a light beam steering device where four of the six sides of a rectangular box control volume support electrodes to adjust the refractive index gradient.

The beam steering solutions shown in the zx-plane in FIGS. 35-36 and described in the theory also have symmetry consistent with cylindrical symmetry so long as the gradient vector for the refractive index can be controlled to point along a cylindrical radius line at a specific polar angle. This can be accomplished by using two sets of electrodes. This is shown in FIG. 37 where four of the six sides of the rectangular box that defines the colloid control volume are equipped with an array of electrodes. The connections to the electrodes are not shown to reduce clutter in the figure. The input side (xy-plane at z=0) and the output side of the control volume (xy-plane at $z=z_{max}$) do not have electrodes. In the x-direction there are parallel directed electrodes such as a first parallel electrode 37*a* and a second parallel electrode 37*b*. In the y-direction there are parallel directed electrodes such as a third parallel electrode 37*c* and a fourth parallel electrode 37*b*. The orientation of the electrodes is optional, however whenever possible electrodes along different adjacent walls may be oriented in such a way as to minimize unwanted array-to-array electric field interactions.

The x-direction electrode arrays and the y-direction electrode arrays are energized with harmonic traveling wave voltage signals to induce forces. It is completely reasonable to use different voltage amplitudes at a fixed excitation frequency to adjust the gradient vector of the refractive index in the GRIN colloid. That said, if instead of using voltage amplitudes in quadrature the electrode array frequencies are chosen to achieve a particular ponderomotive force on nanoparticles then we may get the added benefits of (1) pDEP, nDEP and zDEP ponderomotive forces and (2) higher precision and accuracy for the impressed ponderomotive forces on nanoparticles and (3) lower voltage amplitude. Observe that FIG. 37 shows a plurality of potential ray trajectories as a fan of rays propagating from a common source at z=0.

Figure 38A:
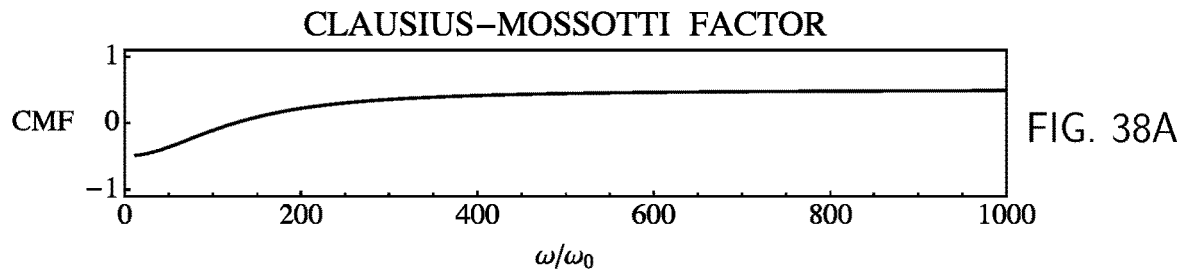
FIG. 38A shows an example of the normalized force on a nano-particle in a colloid via a Clausius-Mossotti factor.
Figure 38B:
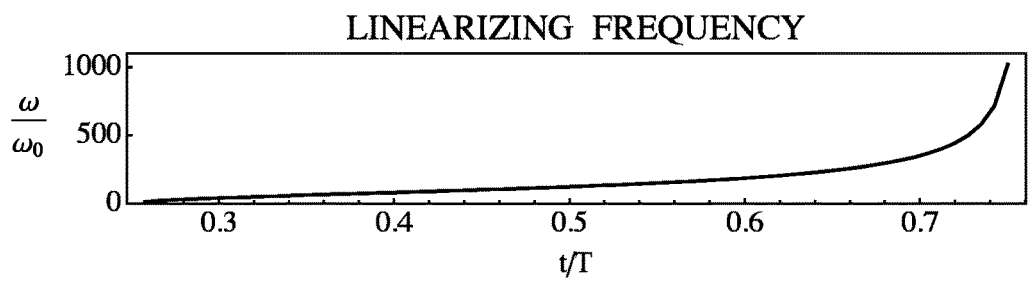
FIG. 38B shows the dielectrophoresis electrode drive frequency needed to linearize the force over time.
Figure 38C:
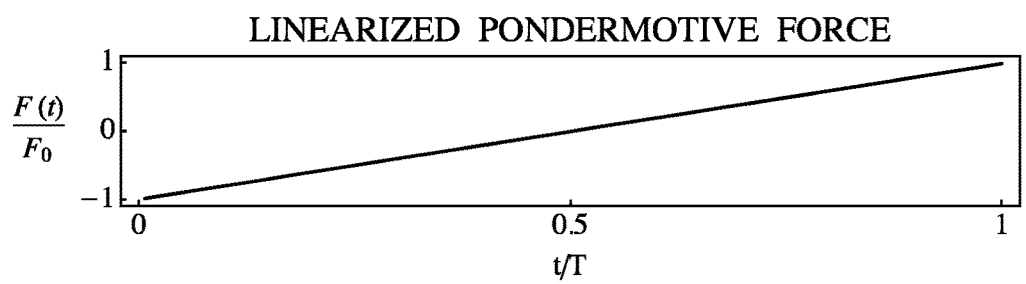
FIG. 38C shows the resulting linearized dielectrophoresis force over time.

In FIG. 38A an example of a Clausisus-Mossotti factor is presented in a linear scale instead of the log-linear scale of FIGS. 4A-F. The force on the nanoparticles is proportional to the Clausisus-Mossotti factor. To have the ability to provide a linear force ramp in time on a nanoparticle within a colloid the harmonic excitation frequency has to change nonlinearly. This is shown in FIG. 38B. This graph is obtained by inverting Eq. 131 so that $$\omega(t) = \omega_0 \sqrt{\frac{K_0 - K_\infty}{f(t) - K_\infty} - 1} \quad (602)$$

where $\omega_0 = 1/\tau_{MW}$, $f(t) = F(t)/F_0$ is the normalized ponderomotive force and $F_0$ is the magnitude of the maximum normalized ponderomotive force $F(t)$ on a nanoparticle in a colloid. The result in a linearized force as shown in FIG. 38C. Furthermore, by use of a digital micro-controller or computer we can use the digital output directly with a level shift, amplification and optionally filtering to obtain the fundamental harmonic instead of an analog circuit to generate waveforms.

Figure 38D:
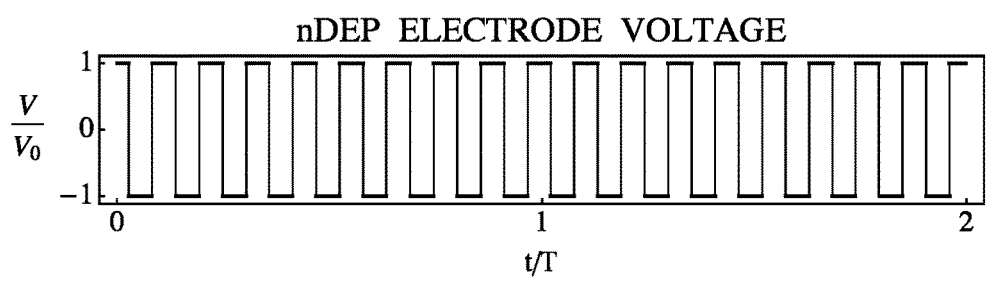
FIG. 38D shows an applied negative-dielectrophoresis (nDEP) electrode voltage for a specific and static light-beam steering direction.
Figure 38E:
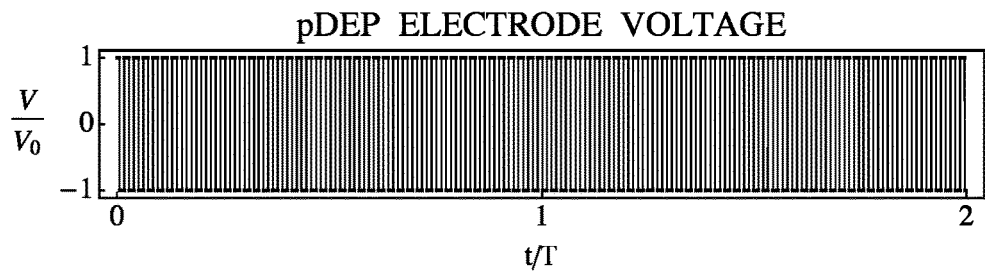
FIG. 38E shows an applied positive-dielectrophoresis (pDEP) electrode voltage for a specific and static light-beam steering direction.
Figure 38F:
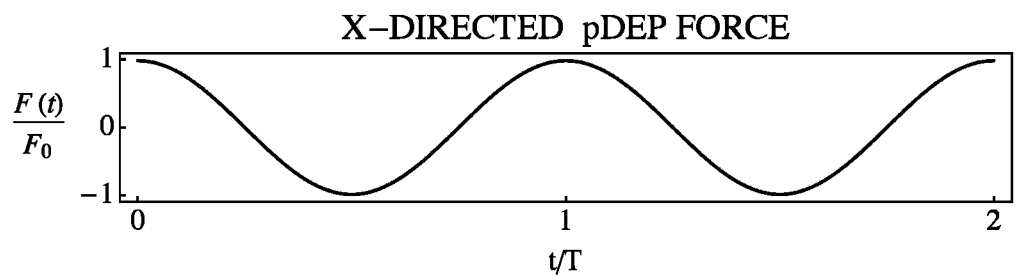
FIG. 38F shows the x-directed positive dielectrophoresis force applied to a colloid by a first electrode array having a normal along the positive x-direction for a rectangular control volume having principle normals along the rectangular coordinate axes.
Figure 38G:
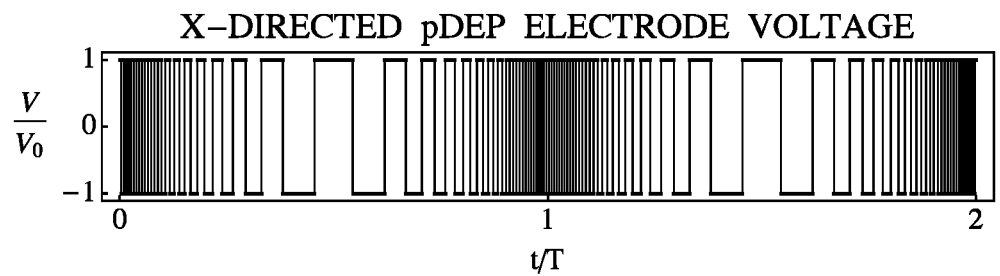
FIG. 38G shows a digital voltage waveform that is applied as a traveling wave to the first electrode array.
Figure 38H:
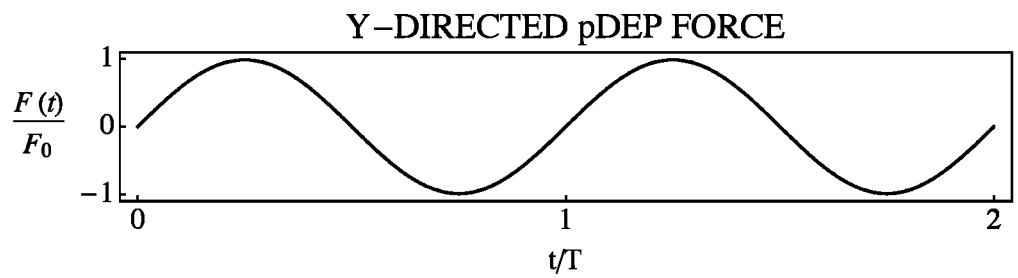
FIG. 38H shows the y-directed positive dielectrophoresis force applied to a colloid by a second electrode array having a normal along the positive y-direction for a rectangular control volume having principle normals along the rectangular coordinate axes.
Figure 38I:
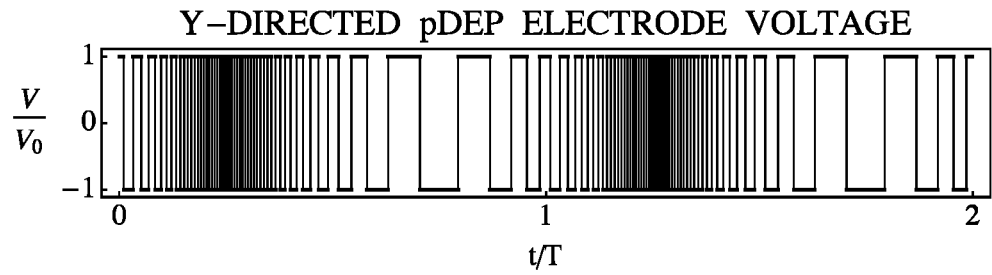
FIG. 38I shows a digital voltage waveform that is applied as a traveling wave to the second electrode array.
Figure 38J:
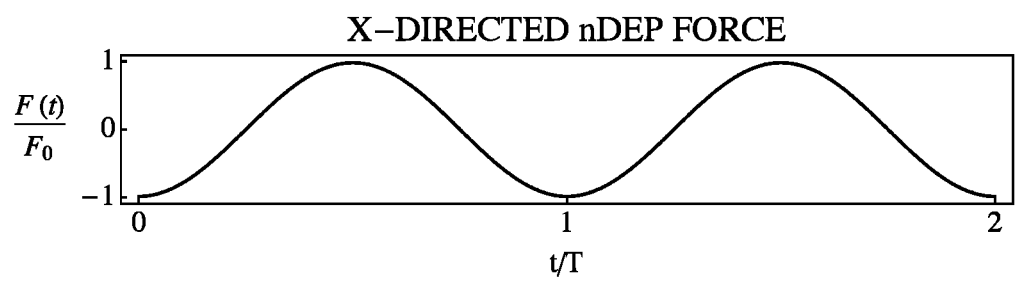
FIG. 38J shows the x-directed negative dielectrophoresis force applied to a colloid by a third electrode array having a normal along the negative x-direction for a rectangular control volume having principle normals along the rectangular coordinate axes.
Figure 38K:
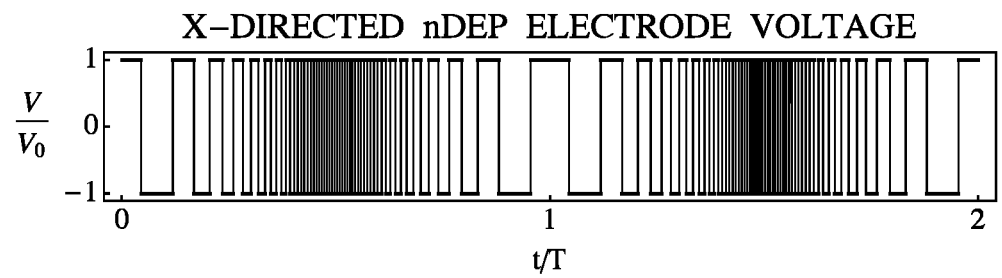
FIG. 38K shows a digital voltage waveform that is applied as a traveling wave to the third electrode array.
Figure 38L:
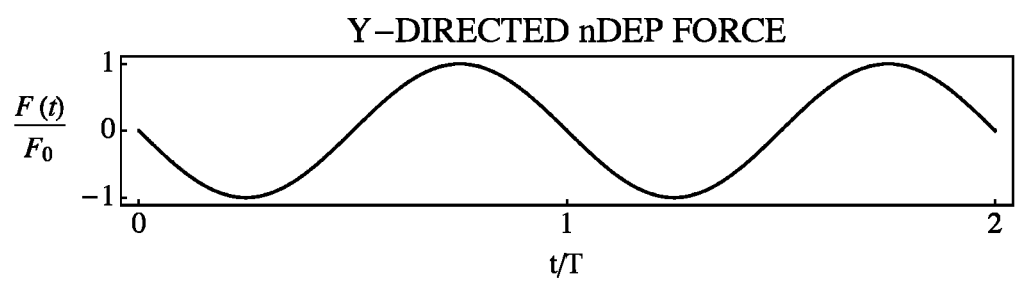
FIG. 38L shows the y-directed negative dielectrophoresis force applied to a colloid by a fourth electrode array having a normal along the negative y-direction for a rectangular control volume having principle normals along the rectangular coordinate axes.
Figure 38M:
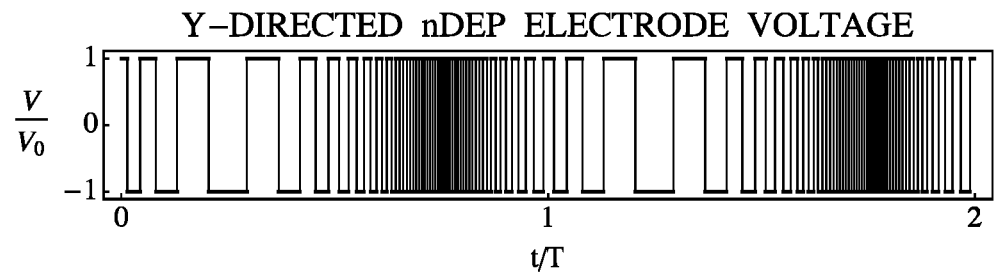
FIG. 38M shows a digital voltage waveform that is applied as a traveling wave to the fourth electrode array.

As an example, consider that a single static refractive index gradient is desired. Then the digital voltage signals u (not to be confused with nanoparticle concentration) for pDEP and nDEP excitation are $$u_\pm = V_0 \text{sgn}\left[\cos\left(\omega_0 t \sqrt{\frac{K_0 - K_\infty}{f_\pm - K_\infty} - 1}\right)\right] \quad (603)$$

where the ±corresponds to pDEP and nDEP; and sgn is the sign function. The above signals will swing the beam to plus or minus a specific beam steering angle ±φ with voltage waveforms as provided by FIGS. 38D-E.

In another example, we might desire to have a light beam moving in time. In this case the harmonic voltage signal to the nanoparticle colloid must also be made to be changing in frequency over time via angle modulation. For this to be properly analyzed we must generalize the electrode drive frequency ω to be the instantaneous frequency so that $$\omega(t) = \frac{d\theta(t)}{dt} \quad (604)$$

where θ is the instantaneous phase angle of the voltage signal applied to the electrodes. As a check on the concept we can see that on taking the derivative of the static-beam phase angle $\theta(t) = \omega_0 t$ we obtain $\omega = \omega_0$, which is a constant frequency as expected.

Also, for the sake of providing an example let's further assume that we choose a symmetric Clausius-Mossotti factor with $K_0 = -1/a$ and $K_\infty = +1/a$, then we can use Eq. 602 with the concept of the instantaneous phase angle so that by integrating Eq. 604 and Taylor expanding about a=0 we find $$\theta(t) = \omega_0 \int \sqrt{\frac{1 + af(t)}{1 - af(t)}}\, dt \quad (605)$$

$$= \omega_0 t + \omega_0 \int \left[af(t) + \frac{1}{2}a^2 f^2(t) + \frac{1}{2}a^3 f^3(t) + \frac{3}{8}a^4 f^4(t) + \ldots\right] dt$$

and we see that if a=0 we recover the static beam pointing case.

For example, an electrode array at x=0 provides a force proportional to cos[θ(t)] and the electrode array at the x=$L_x$ plane provides a force −cos[θ(t)], so that the combined force on a nanoparticle in the control volume is in the same direction via a superposition process. The digital voltages to the electrode arrays would then be $$V_{Xp}(t)=V_0\ \mathrm{sgn}[\cos\theta_{Xp}(t)] \qquad (606)$$

$$V_{Xn}(t)=V_0\ \mathrm{sgn}[\cos\theta_{Xn}(t)] \qquad (607)$$

$$V_{Yp}(t)=V_0\ \mathrm{sgn}[\cos\theta_{Yp}(t)] \qquad (608)$$

$$V_{Yn}(t)=V_0\ \mathrm{sgn}[\cos\theta_{Yn}(t)] \qquad (609)$$

Thus, to steer a light beam around in a circular-cone pattern with the beam steering device at the cone apex a set of digital timing signals are sent to the electrode arrays. Representative forces and digital signals are shown in FIGS. 38F-38M. Finally, note again that each electrode in each electrode array must have a phase shift relative to its neighbor, the smaller the phase shift the closer to ideal the array. This is required for supporting a traveling voltage wave as has been described in detail regarding FIGS. 7A-B.

Clearly, more complex scan patterns may be developed for a computer and applied to a laser scanning program. Also, a series of static forces may be applied in time to simulate a dynamic laser scanning process. Additionally, the particular waveforms used to control light are a function of the Clausius-Mossotti factors, which are further dependent on the low frequency dielectric constants, conductivities shapes and size distributions of the nanoparticles and liquids comprising the colloid. Therefore, the waveforms shown are simply to be taken as examples that need to be changed to accommodate the particular physical parameters of a given embodiment. Further still, not all physical material parameters will support nDEP, pDEP and zDEP simultaneously. As just one example, it is possible for the conductivities of the nanoparticles and liquid to be so small that the zDEP frequency is near zero so that only pDEP and zDEP are possible (i.e. nDEP is excluded from use).

Figure 39A:
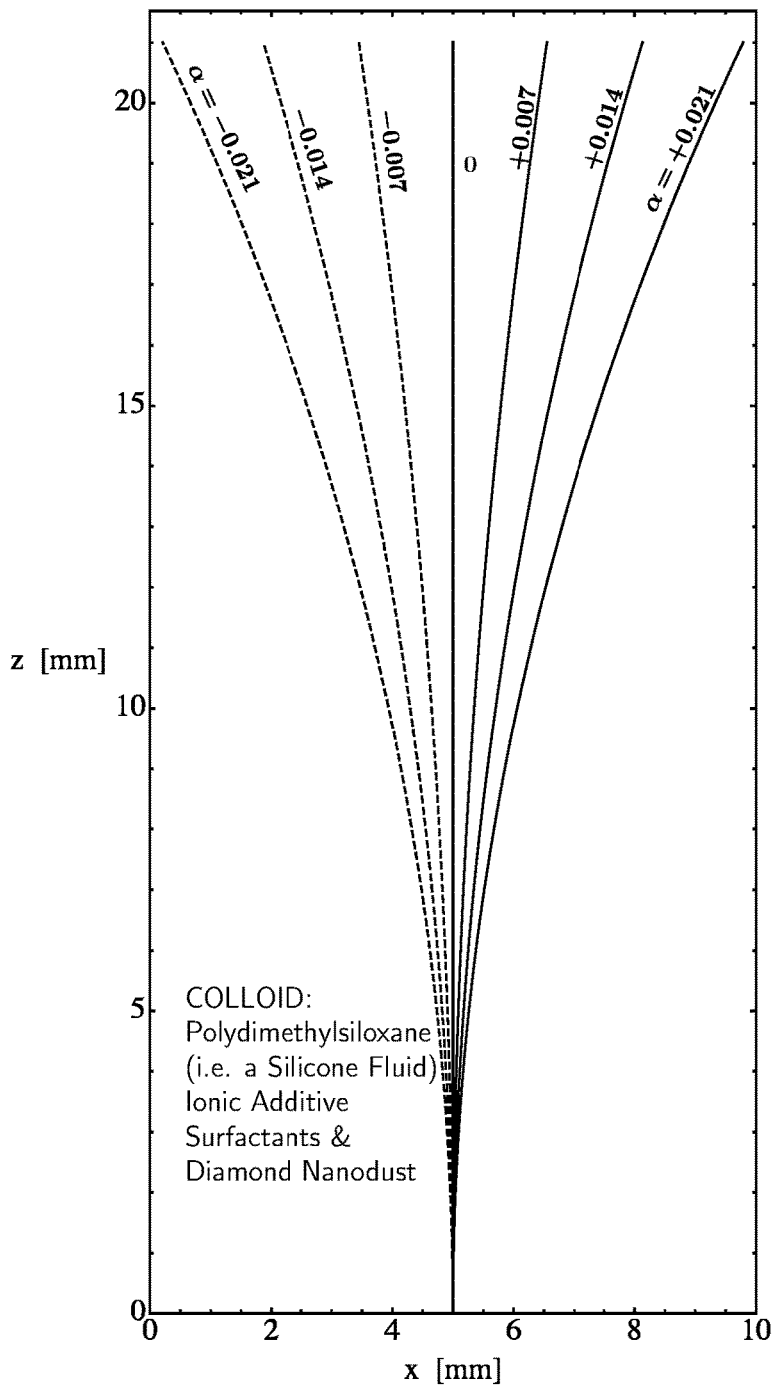
FIG. 39A shows an example family of laser beam trajectories under an exponential refractive index gradient formed in a colloid of diamond nanoparticles, decamethyltetrasiloxane and chemical additives to modify the liquid's conductivity.
Figure 39B:
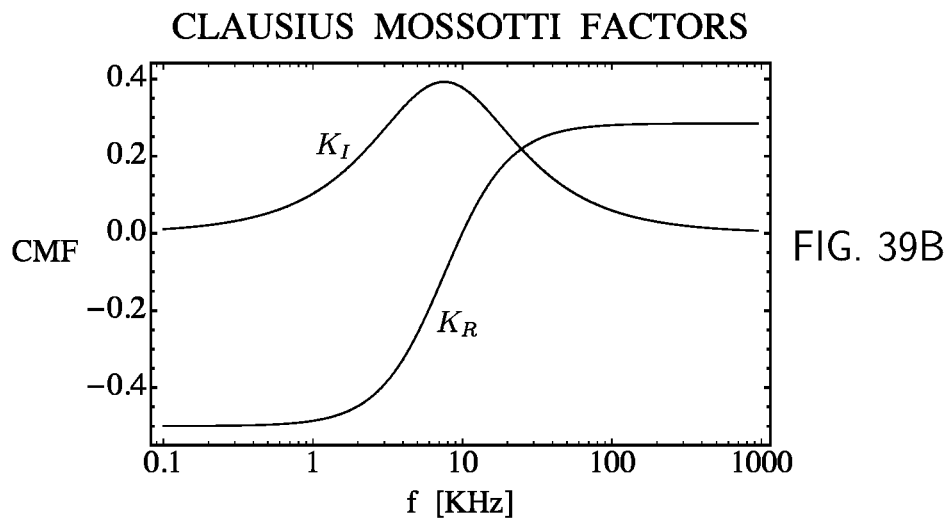
FIG. 39B shows the real and imaginary components of the Clausius-Mossotti factor for a colloid with diamond nanoparticles, decamethyltetrasiloxane and chemical additives to modify the liquid's conductivity.
Figure 39C:
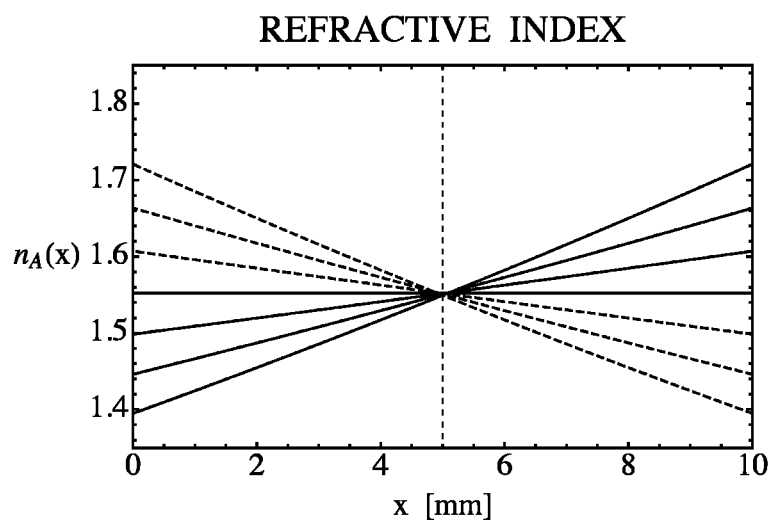
FIG. 39C shows how the refractive index changes along the x-direction of a beam steering device for different values of the gradient.
Figure 39D:
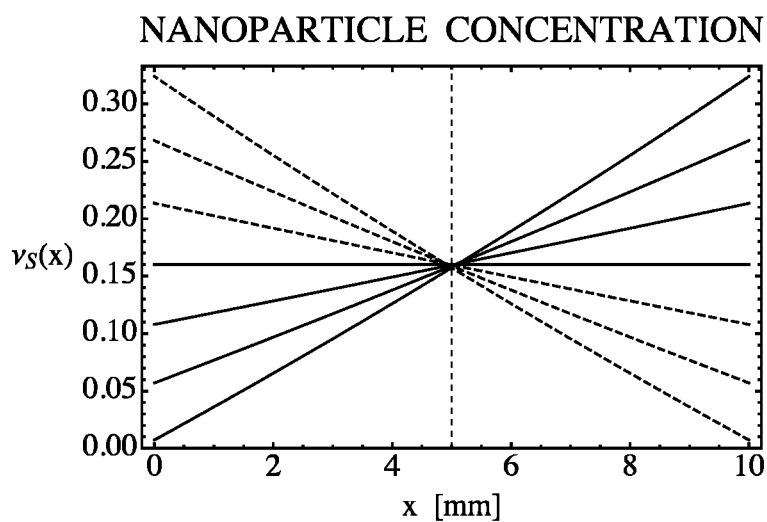
FIG. 39D shows how the nanoparticle concentration by volume changes along the x-direction of a beam steering device for different values of the gradient.

In FIG. 39A we examine another example case of laser beam steering using 10 nm diameter diamond nanoparticles in a liquid of decamethyltetrasiloxane. We can see that for a refractive index gradient directed from left to the trajectories are the solid curves and for a refractive index gradient directed from right to the left trajectories are the dashed curves. FIGS. 39A, 39B and 39C the corresponding Clausius-Mossotti factors, refractive index distribution and nanoparticle distribution respectively.

The various parameters of the example are provided in FIGS. 39A-D. The following important points from the example should be noted. The magnitude of a laser beam's maximum steering angle can be increased by increasing (1) the concentration of the nanoparticles, (2) increasing the bulk refractive index of the nanoparticles, (3) increasing the z-direction length of the device, (4) using a electrode drive frequency having a greater Clausius-Mossotti factor $K_R$ and (5) driving the nanoparticles with a stronger voltage amplitude, which is possible even to the point that the concentration of nanoparticles starts increasing in the vicinity of the optical axis instead of at the control volume boundary.

For example, we can replace diamond nanoparticles with a very low cost and common material like rutile, which is a form of titanium dioxide, and increase the steering angle by roughly the ratio of the refractive indices, i.e. by 2.770/2.410 about 15%. Alternately, increasing the value of the gradient a from 0.210 to 0.271 increases the external steering angle from ±55 degrees to nearly ±90 degrees, i.e. by about 60%, on entering the air environment from the beam steering device. Another important point is that the conductivity of the liquid is easily changed by adjusting the liquid's conductivity so that the zero crossing frequency $\omega_z$ for zDEP is positioned at a desired design frequency. This is shown in FIG. 39A where the original liquid conductivity of $\sigma_{L1}=5.79\times10^{-12}$ S/m is increased to $\sigma_{L2}=2.29\times10^{-6}$ S/m by the inclusion of chemicals that disassociates into ions.

In summary, laser beam steering by electronically impressed ponderomotive forces on nanoparticles in a colloid will induce an exponential GRIN distribution, which is anticipated to provide:

Fast acting beam steering
Compact and low-cost devices
Safe devices via non-toxic colloids
High accuracy laser beam steering
High precision laser beam steering
No mechanical moving parts and associated wear
Multi-octave light steering without phased arrays
Functional temperature at least from −55° C. to 125° C.
Beam steering, focusing and adaptive wavefront control
Steering direction based on precision sine wave frequency
Laser beam's rays remain parallel during steering process
Colloids can be configured over mill-spec temperature range
Exponential GRIN system interface with air via low-cost optics
Beam steering substantially independent of laser's polarization
Steerable colloidal gradients providing arbitrary beam steering direction
A means to consolidate a LiDAR transmitter and receiver into one device
Microprocessor's digital output can beam steer with level-shift/amplification
A beam steering transceiver that captures scenes by LiDAR point-by-point
A beam steering transceiver that captures scenes by LiDAR focal plane arrays
An assortment of end-use applications.

The principles described can be extended in obvious ways by those skilled in the physical, mathematical and engineering arts, however the main point will always remain: A DEP process applied to colloids can be used to steer light by changing the effective refractive index spatially within a control volume containing a colloid (or suspension etc.) and that the steering direction may be tied to one or more accurate and precise electronic frequency standards that are applied as electronic signals to electrodes in addition to the one or more voltage amplitudes. Frequency control of the light direction provides a means for extreme accuracy and precision. Frequency and amplitude beam direction control can be combined. Voltage signals may be substituted with other signal types.

Additionally, while the exponential GRIN model provides the basis of this discussion it is not to be interpreted that this disclosure is restricted to only exponential GRIN distributions. Other refractive index distributions are also covered. For example, superpositions, perturbations and periodic tessellations of the exponential GRIN refractive index distribution are also covered in this disclosure.

Beam Steering Optics for DEP-Based Gratings

Today's holograms, diffraction gratings, and photonics crystals are typically static: once it has been created by incorporating the variations in dielectric constant in the host medium then its optical properties are set. It would therefore be nice to be able to overcome this limitation and create a completely configurable hologram, diffraction grating, and photonic crystal.

As an example of this type of general reconfigurability in this section we look at a specific type of diffraction hologram (essentially an optical grating) that can steer light selectively, i.e. by wavelength and input angle, into a user controllable direction. Extensions are provided that allow for spectrally broadband light, e.g. sunlight, as well. The devices ultimately shown may have as little as a few microns of thickness and are therefore extremely compact.

Ultimately, the objective here is to create very simple hardware comprising a thin colloid layer between two solid transparent sheets, printed transparent electrodes (or alternatively continuous opto- or electro-resistive planes supporting an arbitrary potential boundary function) on the solid sheets, and software in a controller that can reconfigure the colloid to steer light in a desired direction. This may have applications for lenses, augmented reality glasses, LiDAR, and many other areas. As an explicit example, later in this disclosure, a solar collector and concentrator that is based on this technology is explicitly shown.

However, before the details of how to do this using a DEP-based system are provided some background physics is needed first. In particular, we will need to better understand the spatial configuration that is needed for the holographic fringes (grating) elements, and by extension for nanoparticles in a colloid, in order to achieve the desired beam steering result.

Figure 40A:
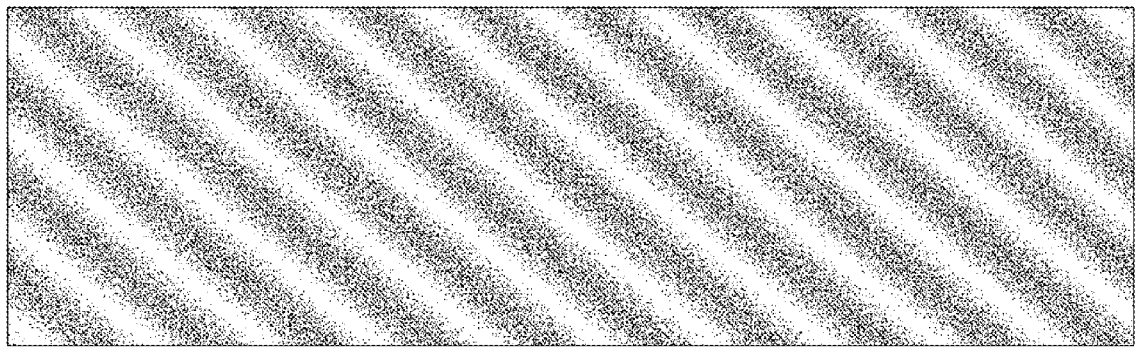
FIG. 40A shows a dot density plot of refractive index in a Volume Phase Hologram.

With this in mind consider FIG. 40A, which shows in cross section a particle density plot of the refractive index distribution within a periodically structured Volume Phase Hologram (VPH), which is a type of grating. Regions of higher refractive index are represented by a higher density of particles in a dynamically controlled colloid.

Figure 40B:
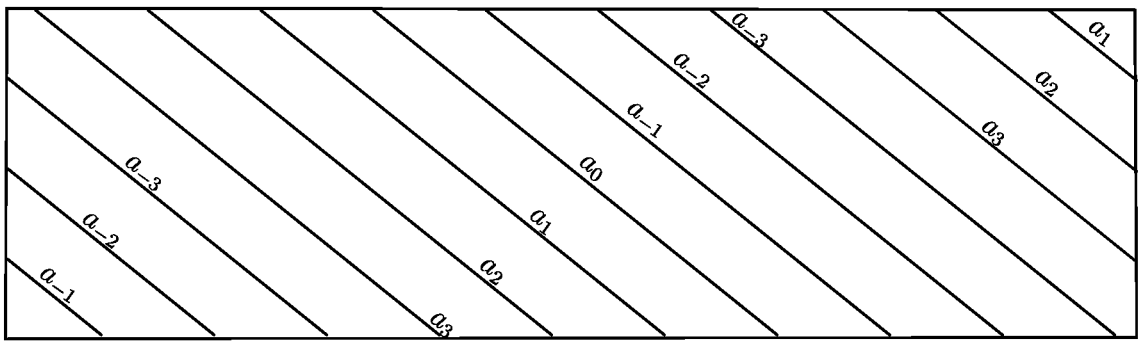
FIG. 40B shows a line schematic of refractive index in a Volume Phase Hologram.

FIG. 40B shows in cross section an equivalent line schematic of the refractive index distribution of a VPH shown in FIG. 40A. It will often be convenient to use the line representation method of FIG. 40B in subsequent figures to simplify the discussion. In this document the regions of higher refractive index are called fringes. In FIGS. 40A and 40B these are straight lines in cross section (in three dimensions they are planes), but in general the fringes can be curved surfaces in three dimensions and curved contours in cross section. Also, the fringes are typically based on a sinusoidal variation of the refractive index about an average value, but other forms are also possible, such as but not limited to, square wave variations of the refractive index about an average refractive index value.

The fringes in FIGS. 40A-B may have non-uniform amplitudes. If different fringes have different amplitudes then we may assign a numerical weighting to each fringe to indicate the relative strength of the refractive index modulation. In this way fringe-to-fringe variations in the refractive index are included. This is seen in FIG. 40B where an example shows a repeating set of weighting coefficients $\{a_{-3}, a_{-2}, a_{-1}, a_0, a_1, a_2, a_3\}$. Additionally, the refractive index of a fringe can also vary along the length of the fringe in which case the coefficients $a_m$ become functions of the distance along the fringe $\sigma$ so that $a_m=a_m(\sigma)$. Both the fringe-to-fringe and along-fringe refractive index variations can be designed to provide apodization by applying forces on the underlying nanoparticles in a colloid. In the current context there are two types of optical artifacts that may need to be removed by apodization. The first are parasitic volume diffraction artifacts. The second are parasitic surface diffraction artifacts.

A rigorous accounting of diffraction requires solving Maxwell's equations, nonetheless great insight can be obtained by first analyzing the conditions for constructive wave propagation in a VPH by accounting for the geometry-based phases. This analysis will ultimately provide design objectives for a distribution of particles to form a periodic GRIN media. The periodic GRIN then needs to be synthesized by generating a suitable field of ponderomotive forces through a DEP-process.

Figure 41:
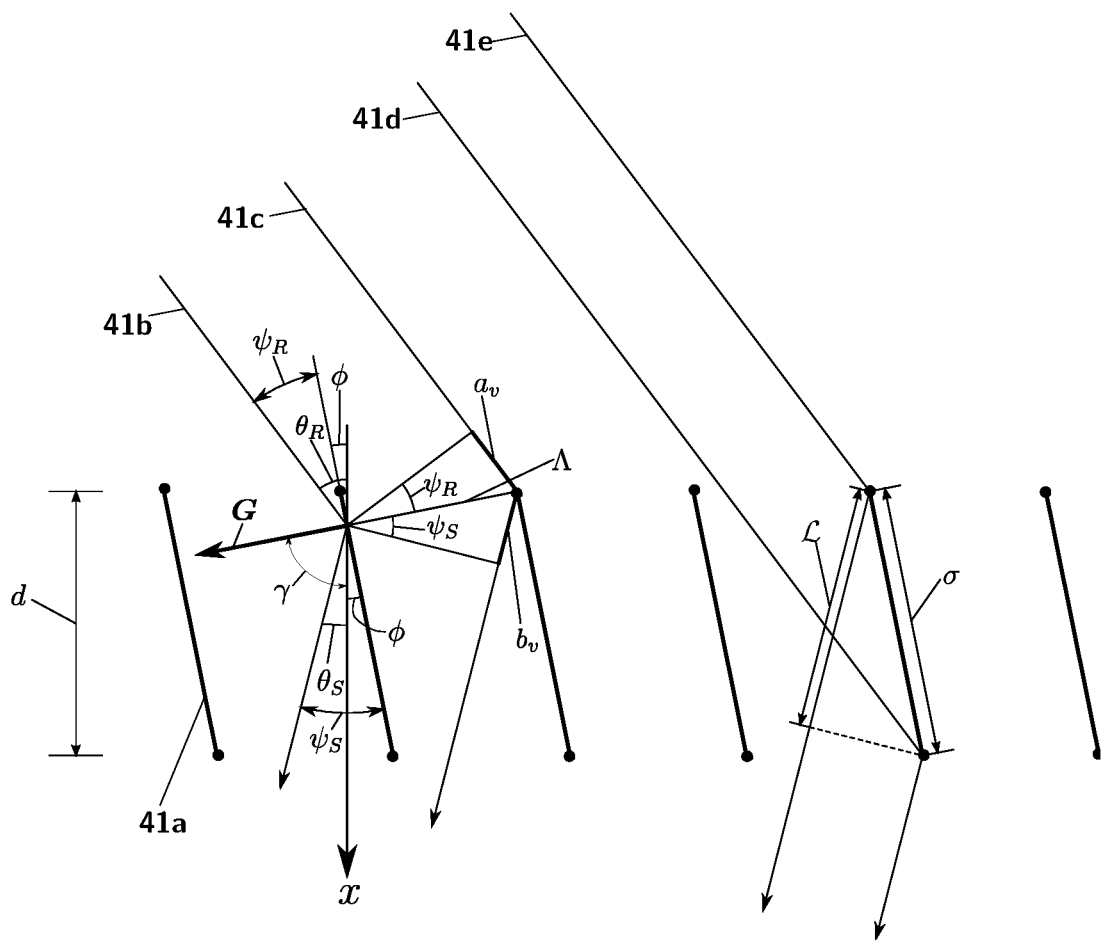
FIG. 41 shows fringes used to derive volume diffraction relations.

With this objective in mind consider FIG. 41, which shows a fringe schematic used in the derivation of the diffraction directions, angular bandwidth and spectral bandwidth of a VPH. In particular, we see six fringes, an example of which is fringe 41a. The thickness of the VPH is d. The fringe slant length is $\sigma$. We will define the grating angle $\gamma$ as the direction normal to the fringes as measured relative to the x-axis as shown. The grating angle is complimentary to the fringe angle $\phi$ so that $\gamma+\phi=\pi/2$. The normal fringe-to-fringe spacing is $\Lambda$. The incident radiation is called the replay signal and has a replay angle $\psi_R$ relative to the fringe. The name "replay signal" is based on the idea that we would like to replay the input light signal, but in a different output direction. The output diffracted radiation is called the scattered signal and has scattered angle $\psi_S$ relative to the fringe. The incident replay signal also has a replay angle $\theta_R=\psi_R+\phi$ relative to the normal of the VPH, i.e. the x-axis in FIG. 41. The output diffracted radiation also has an output scattered angle $\theta_S=\psi_S-\phi$ relative to the x-axis and normal of the VPH.

Interference of a first ray 41b with a second ray 41c from a neighboring fringe will provide constructive interference when the residual path lengths $a_v$ and $b_v$ together are an integer multiple of the wavelength in the medium so that $a_v+b_v=m_v\lambda$, where $m_v\in\{\pm 1, \pm 2, \pm 3, \ldots\}$ and the "v" subscript indicates volume diffraction. Therefore, for the special case when the input homogenous medium is the same as the average refractive index of the VPH, so as to minimize unwanted reflections. Therefore, $$m_v\lambda=\Lambda(\sin\psi_R+\sin\psi_S), \quad (610)$$

and by differentiation we get $$\Delta\lambda = \frac{\Lambda\cos\psi_S\,\Delta\psi_S}{m_v}. \quad (611)$$

Interference of a third ray 41d with a fourth ray 41e, which are on the same fringe, provides destructive interference when the change in the residual path length $\Delta\mathcal{L}\equiv\lambda$ because radiation from the first half of the fringe (from input edge to midpoint) will add destructively with the radiation diffracted from the second half of the fringe (from midpoint to output edge). Note that $\mathcal{L}=\sigma\cos\psi_S$ so that by differentiation $$\Delta\mathcal{L}=\sigma\sin\psi_S\Delta\psi_S=\lambda. \quad (612)$$

Dividing Eq. 611 by Eq. 612 and using the relation $d=\sigma\cos\phi$ we get the relative null-to-null spectral bandwidth $$\frac{\Delta\lambda}{\lambda} = \frac{\Lambda\cot\psi_S\cos\phi}{m_v d}. \quad (613)$$

Also, using Eq. 611 and observing that at Bragg resonance $\psi_R = \psi_S$ so that Eq. 610 provides $$\frac{\Delta \psi_S}{\Delta \lambda} = \frac{1}{\Lambda \cos \psi_S} = \frac{2 \tan \psi_S}{\lambda}, \tag{614}$$

and $$\Delta \psi_S = \frac{\Delta \lambda}{\lambda} 2 \tan \psi_S = \frac{2\Lambda \cos \phi}{m_v d}. \tag{615}$$

Finally, we note that the replay and scatter angles are $\theta_R = \psi_R + \phi$ and $\theta_S = \psi_S - \phi$ that $\Delta \psi_R = \Delta \psi_S = \Delta \theta_R = \Delta \theta_S \equiv \Delta \theta$. Also, for volume diffraction we must have by Snell's law of reflection that $\psi_R = \psi_S \equiv \psi$ so that $$\Delta \theta = \frac{2\Lambda \cos \phi}{m_v d} \tag{616}$$

and $$\frac{\Delta \lambda}{\lambda} = \frac{\Lambda \cot \psi \cos \phi}{m_v d}, \tag{617}$$

where $$\psi = \frac{\theta_R - \theta_S}{2} \tag{618}$$

$$\phi = \frac{\theta_R + \theta_S}{2}. \tag{619}$$

Together Eqs. 616 and 617 show that the spectral and angular bandwidths vary inversely with the VPH thickness d. Moreover, as we shall see later in this document in detail, the VPH thickness d may be chosen according to Eq. 676, so that the bandwidths depend inversely on another integer $m_d$ and directly proportional to a coupling constant $\kappa$, which is further proportional to a modulation amplitude of the refractive index M.

Thus, the greater the thickness of the VPH the narrower the spectral and angular bandwidths and the greater the refractive index variation, through the modulation depth M, the wider the spectral and angular bandwidths.

For volume diffraction at Bragg resonance we must require $\psi_R = \psi_S \equiv \psi$ so that the linear momentum of the photons is conserved along the fringe length and Eq. 610 may be written as $$m_v \lambda = 2\Lambda \sin \psi. \tag{620}$$

In simple words, Eqs. 616-620 basically say that the fringes within the volume of the VPH act as a kind of distributed mirror that is only active when Bragg resonance occurs, i.e. at a specific set of angles and wavelengths where constructive interference occurs.

The reason it is a "mirror" is because the angle of incidence and the angle of refection are identical and equal to $\psi$ relative to the along-fringe direction. When the radiation is far from the Bragg condition the light simply passes through the VPH with essentially no deviation or losses.

As an aside, the reader should also note that the analysis for the bandwidths made in the above paragraphs does not take into account the polarization of the electric field. We will find that the polarization can also impact the extent of the angular and special bandwidths, but the details of this dependence will have to wait for the solution of Maxwell's equations later in this document.

Next, let's rewrite Eq. 620 so that $$m_v \left( \frac{2\pi}{\Lambda} \right) = 2 \left( \frac{2\pi}{\lambda} \right) \sin \psi, \tag{621}$$

and defining the grating vector (also called the reciprocal lattice vector) as $$G = \frac{2\pi}{\Lambda} \langle \cos \gamma, \sin \gamma \rangle \tag{622}$$

and the replay wavevector as $$k_R = \frac{2\pi}{\lambda} \langle \cos \theta_R, \sin \theta_R \rangle \tag{623}$$

then $$\sin \psi = \frac{-k_R \cdot G}{|k_R| |G|} \tag{624}$$

and Eq. 621 reduces to $$m_v \left( \frac{G}{2} \right) = -k_R \cdot \hat{G} \tag{625}$$

where $\hat{G}$ is the unit vector in the direction of G. Also, similarly we can write $$m_v \left( \frac{G}{2} \right) = +k_S \cdot \hat{G}. \tag{626}$$

Adding Eqs. 625 and 626 gives $$(k_S - k_R) \cdot \hat{G} = m_v G. \tag{627}$$

When $m_v = 0$ this is Snell's law of reflection along a fringe and more generally we have $$k_R + m_v G = k_S, \tag{628}$$

which is a fundamental result governing volume diffraction in reciprocal space.

Figure 42:
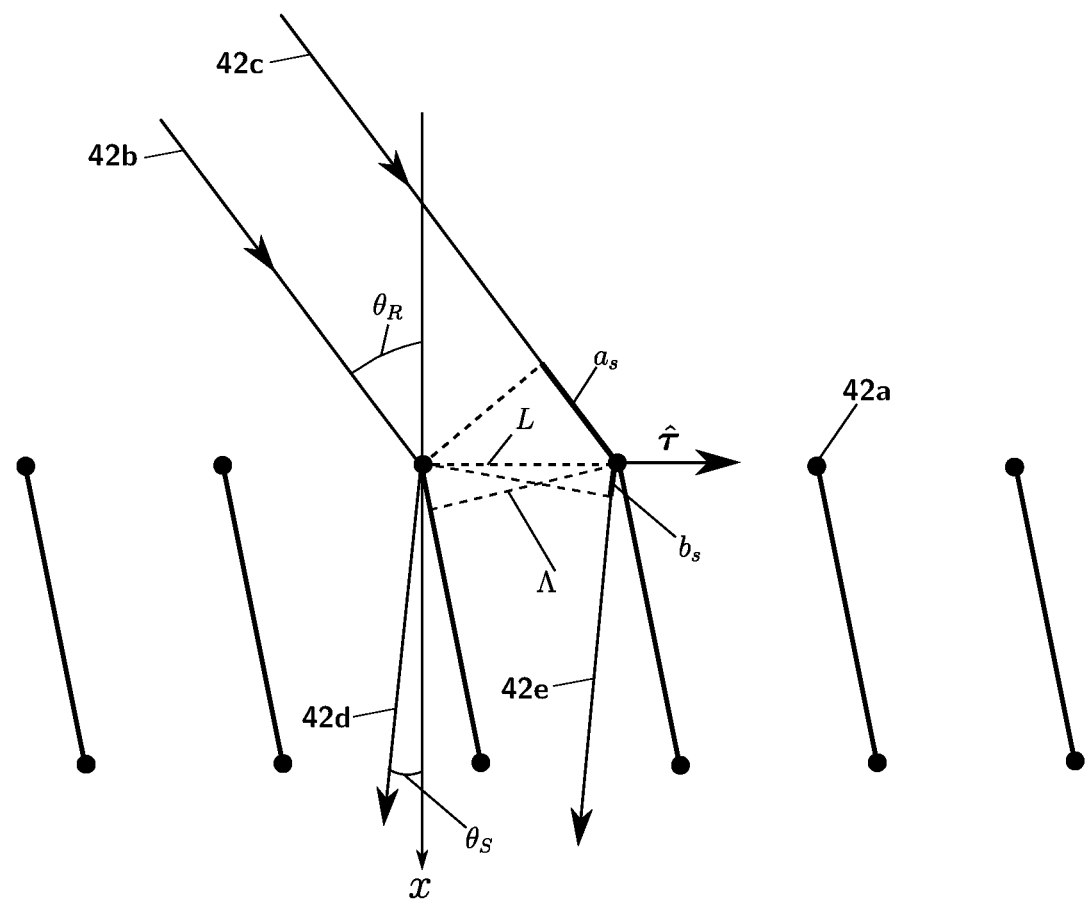
FIG. 42 shows fringes used to derive surface diffraction relations.

Next, we consider surface diffraction at "sharp" high-contrast discontinuous edges that form the boundary between the volume fringe region and an external isotropic region of a VPH. In FIG. 42 these sharp edges are represented by dots at the edges of the fringes, an example of a sharp diffraction edge is 42a. Interference of a first ray 42b and a second ray 42c, from neighboring sharp fringe edges, is constructive into a third ray 42d and a fourth ray 42e, when the residual path lengths $a_s$ and $b_s$ together are an integer multiple of the wavelength in the medium so that $a_s + b_s = m_s \lambda$, where $m_s \in \{0, \pm 1, \pm 2, \pm 3 \ldots \}$ and the s-subscript indicates surface diffraction. However, for surface diffraction the space between scatterers is $L = \Lambda \sec \phi$ so that $a_s = \Lambda \sec \phi \sin \theta_R$ and $b_s = \Lambda \sec \phi \sin \theta_S$. Therefore $$m_s \lambda = \Lambda \sec \phi (\sin \theta_R + \sin \theta_S), \tag{629}$$

which may be written as $$m_s\left(\frac{2\pi}{\Lambda}\right)\cos\phi = \left(\frac{2\pi}{\lambda}\right)(\sin\theta_R + \sin\theta_S). \quad (630)$$

In terms of the reciprocal lattice vector this becomes $$-m_s G\cdot\hat{\tau}=(k_R-k_S)\cdot\hat{\tau}, \quad (631)$$

where $\hat{\tau}$ is a unit vector tangent to a VPH surface in the y-direction as shown in FIG. 42. Therefore, $$(k_S-k_R)\cdot\hat{\tau}=m_s G\cdot\hat{\tau}, \quad (632)$$

and a second fundamental equation is therefore $$k_R+m_s G=k_S. \quad (633)$$

So we see that if we take the inner product of G with $k_R+m_c G=k_S$ we get a description of volume diffraction and if we take the inner product of the unit surface tangent $\hat{\tau}$ into $k_R+m_s G=k_S$ we get a description of surface diffraction from sharp VPH edges. Moreover, as these are completely separate and distinct physical processes that are modified and controlled independently by controlling the extent of the sharp high-contrast refractive index edges at the surface of the VPH.

Figure 43A:
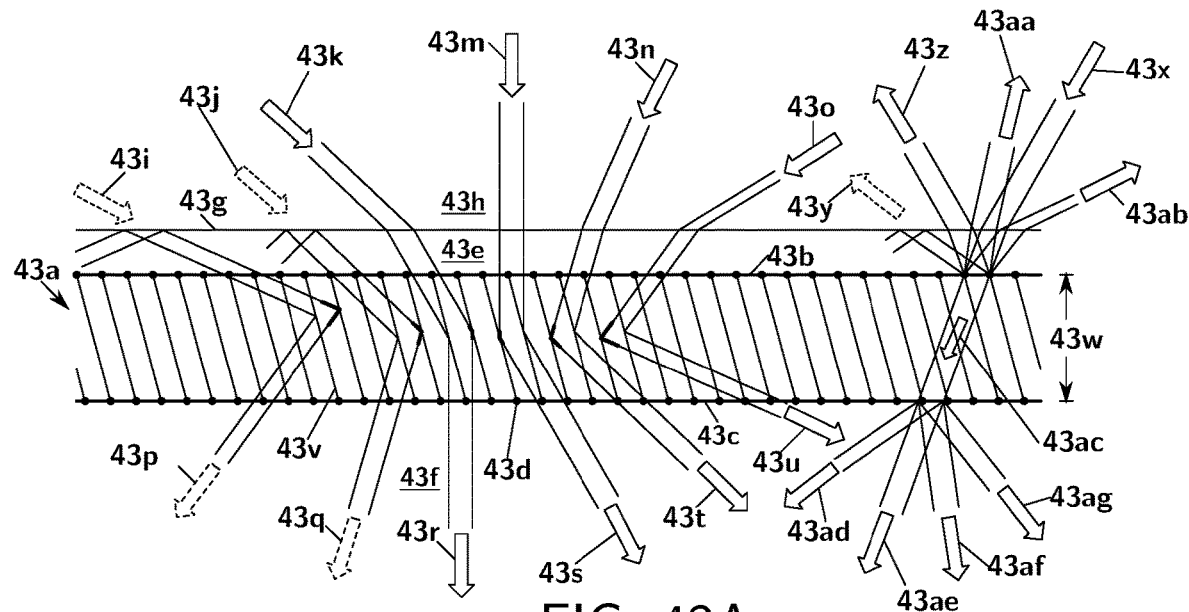
FIG. 43A shows volume and surface diffraction in real space.
Figure 43B:
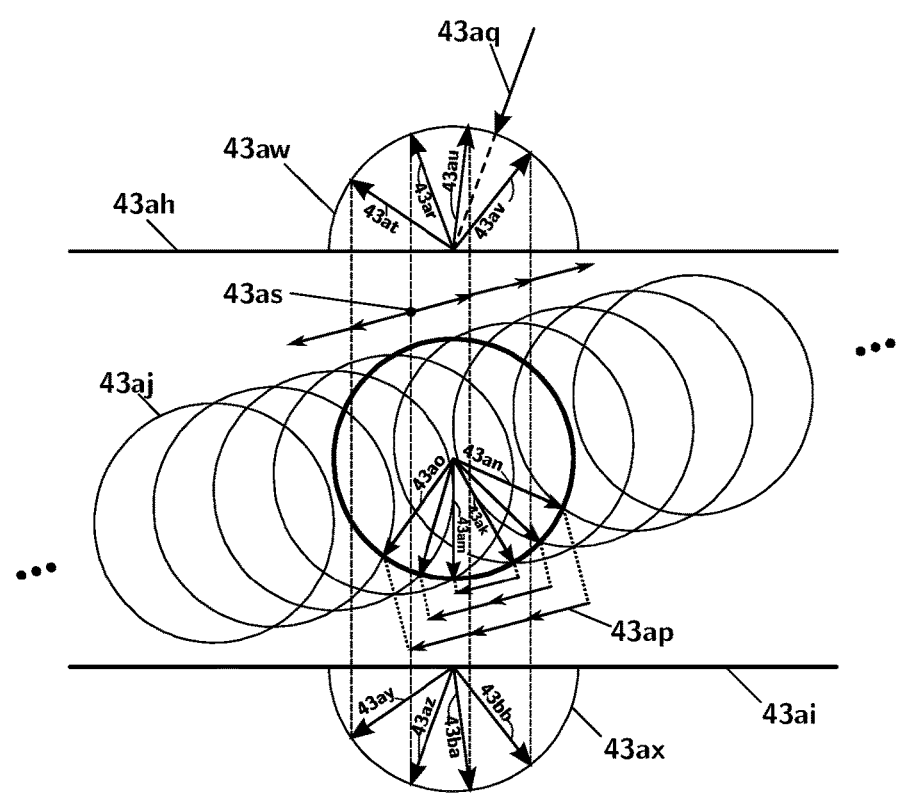
FIG. 43B shows volume and surface diffraction in reciprocal space.

FIGS. 43A-B show volume and surface diffraction from a VPH in real space and reciprocal space respectively. The real space representation is based on counting the number of integer wavelengths added or subtracted from a particular path relative to neighboring paths to find the angular location of constructive interference. The reciprocal space uses a graphical representation called a wavevector diagram for counting the integer number of reciprocal lattice vectors needed to redirect radiation from one direction into another direction at Bragg resonance. These are equivalent methods but the later is easier and provides a lot more insight into the physics because it is closely related to solving Maxwell's equations wherein it is also possible to see each individual Photonic Band Gap (PBG) solution.

In the real space of FIG. 43A a VPH 43a having a VPH first surface 43b and a VPH second surface 43c. Both the VPH first and second surfaces have abrupt discontinuities at the edges leading to point-like scattering in cross section. These scatterers are shown schematically as dots, an example of an edge scattering site on the VPH second surface is 43d. The VPH is embedded between a transparent first medium 43e and a second medium 43f. In one embodiment the refractive index of the material surrounding the VPH is matched to the average refractive index of the VPH. The first medium 43e has a input surface 43g forming an optical boundary between an input medium 43h and the first medium 43e.

FIG. 43A shows examples of volume and surface diffraction separately. In particular, for volume diffraction FIG. 43A shows incident radiation at a single wavelength propagating towards the input surface 43g from a finite number of Bragg resonant propagation directions. The resonant input volume modes are 43i, 43j, 43k, 43m, 43n and 43o. Note that input resonant modes 43i and 43j have virtual sources because they are derived form a process of total internal reflection (TIR) from within the first medium 43e. Bragg resonant input volume modes 43k, 43m, 43n and 43o are from real sources of radiation external to the first medium 43e as this light is first refracted at input surface 43g before being diffracted by the VPH 43a. Thus, in this particular example, there are only six propagating volume diffraction modes that are possible and of these six only four are possible from the external environment. The modes that are possible from the external environment are said to exist in the visible angular region. The modes that are not from the external environment are said to exist in the invisible angular region. The corresponding resonant output volume modes are 43p, 43q, 43r, 43s, 43t and 43u. These are diffracted from the fringes within the volume of the VPH, an example fringe is 43v. Note that the diffraction efficiency of the VPH is not the same for each of the input resonant light modes because efficiency depends on the VPH thickness 43w, electric field polarization of the light and incident direction. Moreover, the diffraction efficiency cannot be easily determined without solving Maxwell's equations. Solutions of Maxwell's equations for the VPH are outlined in more detail later in this document.

For surface diffraction FIG. 43A shows resonant input surface mode 43x propagating towards the input surface 43g and diffracting off of edge scattering sites such as 43d. Unlike the case for volume diffraction, which simply lets the non-resonant energy pass through without redirection, the surface resonant input surface mode 43x may come from any direction and may be any wavelength i.e. there is always a resonance. The resulting diffracted light goes into different directions, which depend on the particular incident direction of the radiation and wavelengths involved. For example, from the first VPH first surface 43b single wavelength modes diffract into output modes 43y, 43z, 43aa and 43ab. The output mode 43y is virtual due to the light trapping effect of TIR at the input surface 43g. Additionally, there are modes that are transmitted through the volume of the VPH and diffracted by edge scattering sites on the VPH second surface 43c. An example of a transmission mode is 43ac. This mode is then diffracted again into output modes 43ad, 43ae, 43f and 43ag. Other transmission modes from the VPH first surface 43b to the VPH second surface 43c also exist, but are not shown to reduce the clutter in the figure.

It is often the case for surface diffraction that efficiently diffracted output modes are at a greater output angle than the input angle—both being measured relative to a surface normal. For example output surface mode 43ad is at a greater angle than the resonant input surface mode 43x. Also, there is little selectivity as surface modes are always resonate at some set of output angles for some set of input angles and wavelengths.

In contradistinction, volume diffraction is very selective and only redirects light that is substantially at certain incident angles and at certain wavelengths. This is a very selective process that is governed by the VPH thickness 43w such that all volume modes have nearly zero diffraction efficiency except for the first order modes, which have almost 100% efficiency.

Therefore, surface diffraction efficiently spreads light out over a large range of angles centered on the light's input direction, while volume diffraction is an extension of the concept of mirror refection from fringes where the "reflection" of light only occurs over specific discrete angles instead of a continuum of angles. Surface diffraction exists for all input angles and wavelengths. Volume diffraction only occurs at specific angles and wavelengths and otherwise light passes unimpeded. Volume diffraction is near 100% only for the first diffraction mode and all other modes have an efficiency near 0%. Surface and volume diffraction are separate phenomena and can be separated by appropriate apodization.

Thus, it is possible to choose the VPH thickness 43w, which is represented by d, as well as lattice constant $\Lambda$, fringe angle $\phi$ and modulation depth M of the relative permittivity (M is to be discussed in more detail later) to diffract a specific wavelength of light λ nearly perfectly into the normal output direction of the VPH. This is shown explicitly in the example of FIG. 43A as input volume mode 43k and output volume mode 43r, which is diffracted with almost 100% efficiency. All other output volume modes are poorly diffracted, with diffraction efficiency<<1%, with the one notable exception comprising input volume mode 43m and output volume mode 43s, which have the same diffraction efficiency, i.e. near 100%, as input volume mode 43k and output volume mode 43r n due to symmetry.

FIG. 43B shows the same example as in FIG. 43A, but in the reciprocal space. The VPH first surface 43b and the VPH second surface 43c are now represented by the similarly named boundaries 43ah and 43ai respectively. A series of circles is show within the VPH region. Each circle represents a shifted version of the average-refractive-index dispersion curve in an isotropic medium. An example of such an isotropic dispersion curve is 43aj. Each dispersion circle is displaced from its nearest neighbors by ±G.

Wavevector 43ak in FIG. 43B corresponds to both input volume mode 43k and output volume mode 43s in FIG. 43A. Wavevector 43am corresponds to both input volume mode 43m and output volume mode 43r. Thus wavevector 43ak plus one reciprocal lattice vector G yields wavevector 43am.

Wavevector 43an in FIG. 43B corresponds to both input volume mode 43i and output volume mode 43t in FIG. 43A. Wavevector 43ao corresponds to both input volume mode 43o and output volume mode 43p. Thus, wavevector 43an plus three reciprocal lattice vectors 3G yields wavevector 43ao. The three reciprocal lattice vectors 3G are shown as 43ap.

Additionally, the example of FIG. 43B also shows surface diffraction by means of projecting the tangential components of the reciprocal lattice vector onto the isotropic dispersion curves 43aw and 43ax in the input and output media respectively. In particular, input surface mode 43x is shown as input surface mode 43aq. The zeroth order diffraction, corresponding to reflection, is shown as output surface mode 43ar and this corresponds to 43z. Therefore, by moving along the VPH surface by integer multiples of ±(G·τ̂)τ, where G is now measured from reference point 43as, we can generate all the diffraction modes, which include output surface modes 43ar, 43at, 43au and 43av. These wavevectors, in FIG. 43B, correspond to output surface modes 43z, 43y, 43aa and 43ab in FIG. 43A.

Similarly, from the VPH second surface 43ai there is also diffraction, which includes output surface modes 43ay, 43az, 43ba and 43bb. These correspond to output surface modes 43ad, 43ae, 43f and 43ag respectively.

Figure 44A:
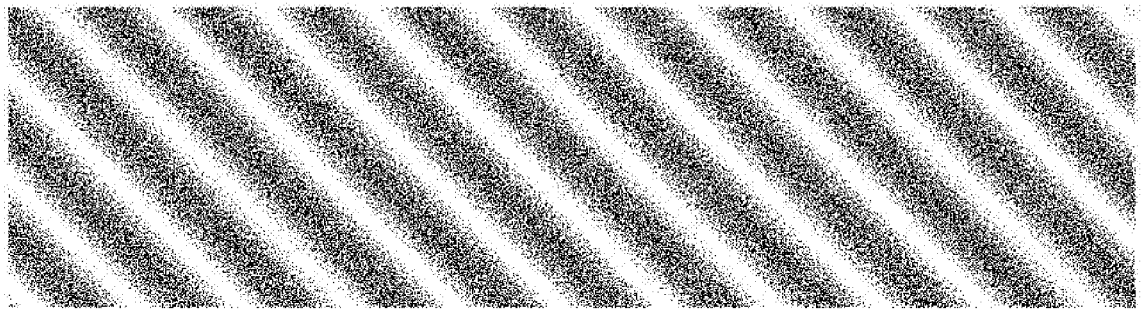
FIG. 44A shows a VPH formed with uniform holographic medium sensitivity.

FIG. 44A shows a particle density plot of a VPH having three built-in gratings: a volume hologram and two surface gratings. The thick volume hologram having extreme directional sensitivity wherein light is not redirected by diffraction unless it is within a narrow angular and spectral band hologram at and about Bragg resonance—see Eq. 620.

Figure 44B:
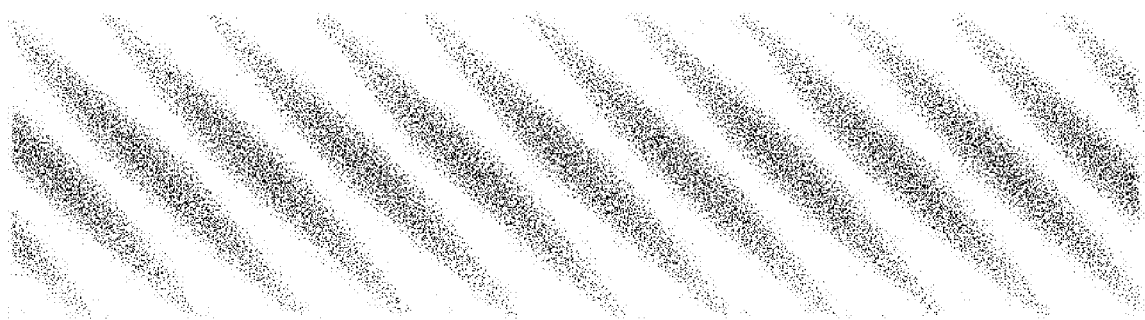
FIG. 44B shows a VPH with uniformly lower refractive index at the surfaces.
Figure 44C:
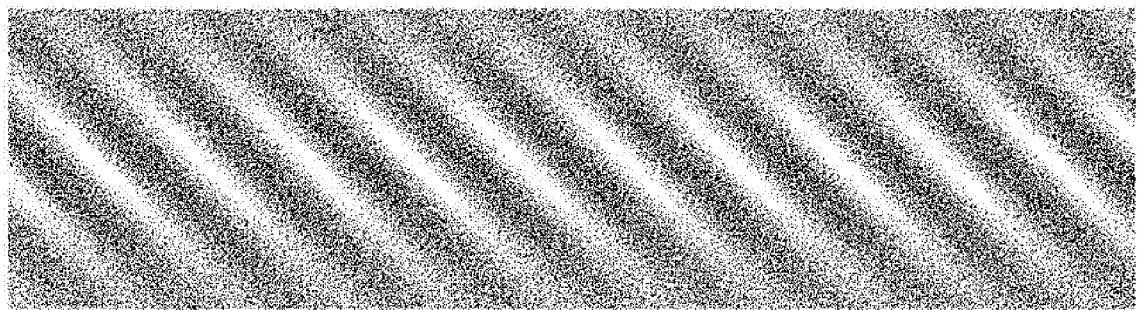
FIG. 44C shows a VPH with uniformly higher refractive index at the surfaces.

To overcome the parasitic diffraction of the surface features of a VPH while retaining the directional sensitivity of the volume of the VPH the surface features of the VPH need to be removed by gradually tapering the fringe contrast so that there are no sharp and periodic refractive index edges to the VPH fringe pattern. The result is a hologram that is suitable for use in intense broadband applications (e.g. for sunlight steering) and which can select both a narrow range of angles and a narrow range of wavelengths around a specific Bragg resonant angle and wavelength. FIG. 44B shows a VPH with uniformly lower refractive index at the surfaces and FIG. 44C shows a VPH with uniformly higher refractive index at the surfaces. Both embodiments are possible depending on the configuration of ponderomotive forces.

In the following disclosure on diffractive beam steering it is to be understood that unless otherwise stated that each VPH is formed with a holographic medium having varying sensitivity as a function of depth to eliminate all abrupt VPH edges. This substantially eliminates all parasitic surface diffraction so that only volume diffraction is present. Furthermore, in general we shall say that a VPH has surface passivation when its refractive index variations gradually taper to zero at the surface of the VPH so as to reduce or eliminate parasitic surface diffraction.

Next, we consider a more formal analysis of electromagnetic waves within a periodically varying medium in order to actually ascertain the efficiency of the redirection of light, which impacts what applications are possible. This may be approached in several general ways, including but not limited to, modal theory, coupled wave theory, translation matrix theory, the method of parallel stacked mirrors and purely numerical methods like the method of moments and the finite elements method. Each technique is helpful in gaining a slightly different insight into the underlying physics of periodically varying media.

For example, our already developing graphical representation of the physical properties is easily refined by the modal theory, which provides a detailed representation of photonics band gaps within a reciprocal space wavevector diagram. Simple expressions for the diffraction efficiency around Bragg resonance are easily derived by the approximate coupled wave theory. Properties of a periodic media away from Bragg resonance and with non-sinusoidal refractive index profiles are often more easily handled by means of a rigorous coupled wave analysis. Aperiodic fringes that are a result of fabrication errors and apodization are analyzed by the more general numerical translation matrix theory and method of parallel stacked mirrors as well as the method of moments. Many of these techniques can also be extended to non-isotropic host media. For a DEP-based system analysis can be complex comprising a hybrid analysis of diffraction and particle distribution.

Figure 45:
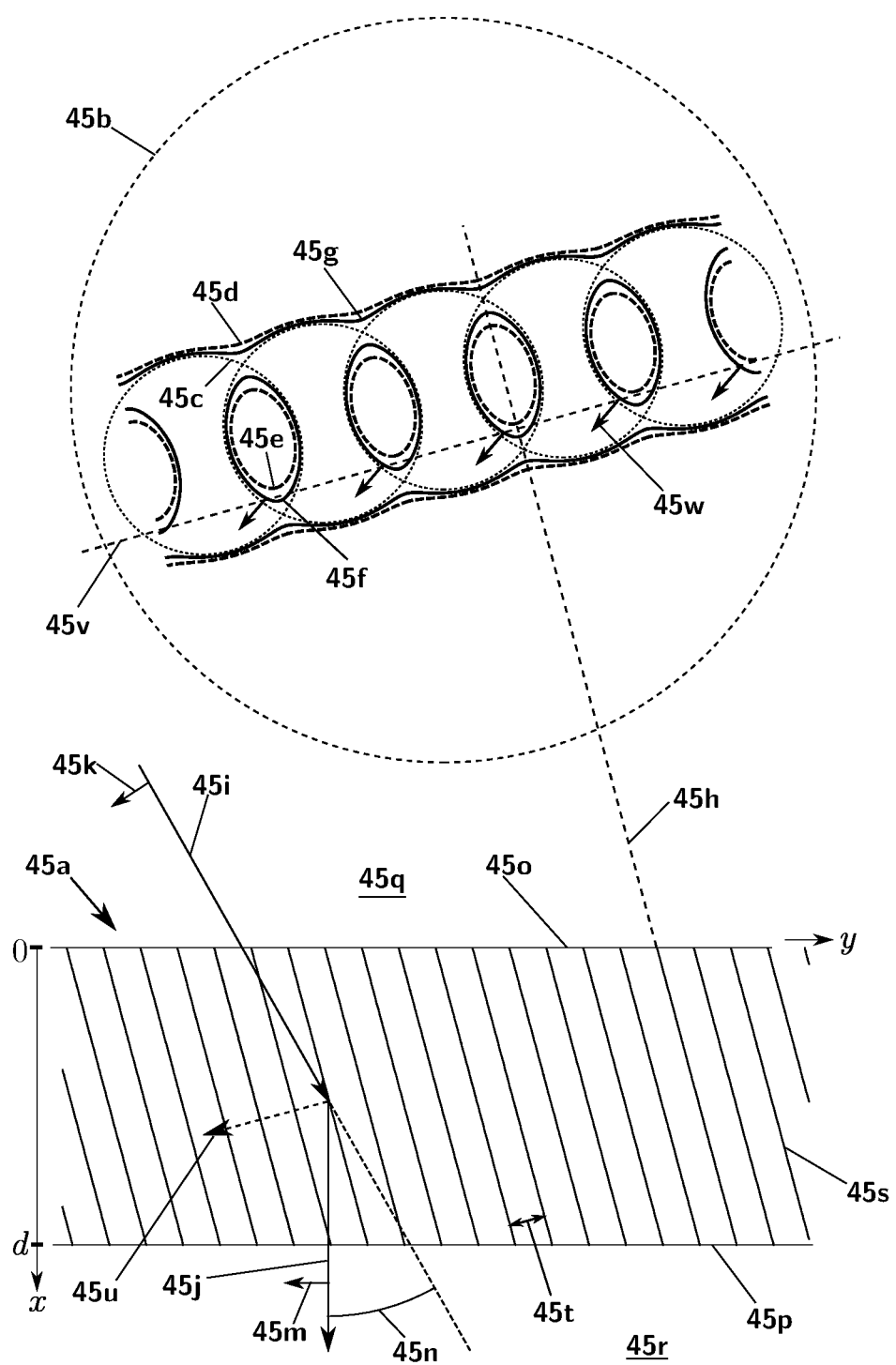
FIG. 45 shows a comparison of s-polarized (TE) and p-polarized (TM) light in a VPH.

Consider FIG. 45, which shows a VPH 45a in the form of a thin layer having an average refractive index $n_0$. The VPH has a first surface 45o, which is its input surface. The VPH has a second surface 45p, which is its output surface. The input medium 45q and the output medium 45r are assumed to have the same refractive index $n_0$ as the average refractive index of the VPH 45a, in this way unwanted refractions and reflections at that first and second surfaces are suppressed. This simplifies analysis but is not a requirement. A typical refractive index fringe 45s is also shown. The normal lattice spacing 45t between the fringes is Λ and has direction given by the reciprocal lattice vector 45u (also called the grating vector. The reciprocal lattice vector makes an angle called the reciprocal lattice angle γ, which is measured relative to the x-axis.

To analyze this structure at optical wavelengths the starting point is Maxwell's curl equations in harmonic form $$\nabla \times E = -\mu i \omega H$$

$$\nabla \times H = +\epsilon i \omega E. \quad (634)$$

Taking the curl of the first relation and using the vector identity $\nabla \times (\nabla \times E) = \nabla(\nabla \cdot E) - \nabla^2 E$ we find that $$\nabla^2 E - \nabla(\nabla \cdot E) + \omega^2 \mu \epsilon E = 0. \quad (635)$$

However, Maxwell's equations provide that $\nabla\cdot(\epsilon E)=\rho_f$, where $\rho_f$ are the free volume charges. Let us assume that $\rho_f=0$, which is typical for non-metallic systems, then after expanding $\nabla\cdot(\epsilon E)$ we obtain $$\nabla\cdot E = -E\cdot\nabla \log \epsilon, \quad (636)$$

where log is the natural logarithm function. There are two interesting cases:
- CASE 1: Transverse Electric (TE), also called s-polarized waves. In this case the electric field is perpendicular to the plane of incidence and the plane of incidence is perpendicular to the contours (which are often planes) forming the fringes of the VPH. Therefore, E is perpendicular to $\nabla \log \epsilon$ so that $\nabla\cdot E=0$.
- CASE 2: Transverse Magnetic (TM), also called p-polarized waves. In this case the electric field is parallel to the plane of incidence and the plane of incidence is perpendicular to the contours (which are often planes) forming the fringes of the VPH. Therefore, E is not perpendicular to $\nabla \log \epsilon$ so that $\nabla\cdot E\cdot 0$.

We start by analyzing the first case, so that the wave equation becomes $$\nabla^2 E + \omega^2 \mu\epsilon E = 0. \quad (637)$$

Next, for the sake of simplicity let us assume that the relative permeability is unity so that $\mu=\mu_0\mu_r=\mu_0$, where $\mu_0$ is the free space permeability. Additionally, let the permittivity take a periodic form so that $$\epsilon = \epsilon_0 \epsilon_{avg}(1+M \cos[G\cdot r]), \quad (638)$$

where M<<1 is the modulation amplitude of the average relative permittivity $\epsilon_{avg}$, $\epsilon_0$ is the free space permittivity, $G=(2\pi/\Lambda)\langle \cos \gamma, \sin \gamma\rangle$ is the reciprocal lattice vector 45u (also called the grating vector, which is in the xy-plane with associated spatial period $\Lambda$) and r is the radius vector from the origin to a point in space within the VPH. The reciprocal lattice vector is always perpendicular to the fringes. Therefore, $$\nabla^2 E + k^2(1+M \cos[G\cdot r])E = 0, \quad (639)$$

where $k^2=\omega^2\epsilon_0\mu_0\epsilon_{avg}=(\omega/c)^2\epsilon_{avg}$ and c is the speed of light in vacuum. Now let the electric field be polarized in the unit z-direction $\hat{z}$ so that Floquet-Bloch (FB) waves propagate in the x-y plane and $E=E\hat{z}$. Then from the well known FB theorem we can expand the solution for the electric field intensity in terms of periodic repetitions of the grating vector, which forms FB waves, so that $$E = \hat{z} \sum_{m=-\infty}^{+\infty} v_m e^{-i(k_0+mG)\cdot r}, \quad (640)$$

where $v_m$ is the amplitude of the $m^{th}$ mode in the expansion. Taking $k_m=k_0+mG$, where $m\in\{0, \pm1, \pm2, \ldots\}$ then $$\nabla^2 E = \left(\frac{\partial^2}{\partial x^2}+\frac{\partial^2}{\partial y^2}\right)E = -\hat{z}\sum_{m=-\infty}^{+\infty} k_m^2 v_m e^{-ik_m\cdot r}, \quad (641)$$

and $$\sum_{m=-\infty}^{+\infty}(k^2-k_m^2)v_m e^{-ik_m\cdot r} + \sum_{m=-\infty}^{+\infty}\frac{k^2 M v_m}{2}[e^{-i(k_m-G)\cdot r}+e^{-i(k_m-G)\cdot r}] = 0. \quad (642)$$

Also, observe that $$k_m - G = k_0 + mG - G = k_0 + (m-1)G = k_{m-1}, \quad (643)$$

and similarly $k_m+G=k_{m+1}$, so that after reorganizing dummy summation variables $$\sum_{m=-\infty}^{+\infty}\left[(k^2-k_m^2)v_m + \frac{k^2 M}{2}(v_{m-1}+v_{m+1})\right]e^{-ik_m\cdot r} = 0. \quad (644)$$

Clearly, the terms in square brackets must be zero for this to be true. As $m\in\{0, \pm1, \pm2, \ldots\}$ then we have an infinite number of equations $$(k^2-k_m^2)v_m + \frac{k^2 M}{2}(v_{m-1}+v_{m+1}) = 0, \quad (645)$$

which may be put into a diagonally banded matrix format such that $$\begin{bmatrix} \ddots & & & \vdots & & & \iddots \\ (k^2-k_2^2) & \frac{k^2 M}{2} & 0 & 0 & 0 \\ \frac{k^2 M}{2} & (k^2-k_1^2) & \frac{k^2 M}{2} & 0 & 0 \\ \ldots & 0 & \frac{k^2 M}{2} & (k^2-k_0^2) & \frac{k^2 M}{2} & 0 & \ldots \\ & 0 & 0 & \frac{k^2 M}{2} & (k^2-k_{-1}^2) & \frac{k^2 M}{2} \\ & 0 & 0 & 0 & \frac{k^2 M}{2} & (k^2-k_{-2}^2) \\ \iddots & & & \vdots & & & \ddots \end{bmatrix} \begin{bmatrix} \vdots \\ v_2 \\ v_1 \\ v_0 \\ v_{-1} \\ v_{-2} \\ \vdots \end{bmatrix} = \begin{bmatrix} \vdots \\ 0 \\ 0 \\ 0 \\ 0 \\ 0 \\ \vdots \end{bmatrix} \quad (646)$$

where $k_m^2=k_m\cdot k_m$. Furthermore, the vector dispersion relation, which is the desired output of our efforts, is then given by $$k_m = k_0 + mG. \quad (647)$$

If we define the infinite square matrix above as A and the infinite element vector as v then Av=0 then we must require that unknown values of $k_0$ satisfy det[A]=0, where det[•] is the determinant operator, so that in general $v_m\neq 0$.

Let $\lambda$ be the wavelength in a medium having average refractive index $n_0$ so that $\lambda=\lambda_0/n_0$ with $\lambda_0$ as the free space wavelength. Then, to compute the vector dispersion relation $k_m$ for all $m\in\{0, \pm1, \pm2, \ldots\}$ it is of considerable importance to note that: [1] the value of k must be equal to $2\pi/\lambda$ to conserve energy and [2] $k_0$ has the same y-component as the incident electromagnetic field to conserve photon linear momentum tangent to the VPH first surface 450.

Let the wavevector associated with m=0, i.e. the wavevector associated with the first Brillouin zone be given in component form by $$k_0 = \langle k_{x0}, k_{y0} \rangle, \tag{648}$$

where $k_{y0}$ taken from the range $-\infty < k_{y0} < +\infty$ and is considered known, i.e. the independent variable. The vector $k_0$, and by extension $k_m$, are therefore considered computed when the dependent variable $k_{x0}$ is calculated from the independent variable $k_{y0}$, which is the component of the wavevector tangent to the VPH boundary with the isotropic medium.

Note that when the computed value of $k_0$ is a real-valued vector then it represents a traveling wave. When the computed value of $k_0$ is complex-valued it represents an evanescent wave. There are two cases for which we expect evanescent waves. The first case is when $|k_{y0}| > 2\pi/\lambda$. This occurs to allow phase matching of waves in the input medium 45q to FB waves in the VPH at the VPH first surface 45o. Similar evanescent surface waves can occur at the VPH second surface 45p. The second case is when $|k_{y0}| \le 2\pi/\lambda$ and there are Bragg resonances leading to at least one PBG. The PBG rejects the propagation of the incident wave through the VPH so that the wave is reflected from the fringes forming the VPH.

In the reciprocal space 45b a solution of Eq. 645 is calculated and graphically represented by a wavevector diagram for particular values of the modulation amplitude M, the wavelength $\lambda$ and the reciprocal lattice vector G. In this particular case there are two PBGs that are shown. Shown are the wavevector diagrams for s-polarized (solid line) and p-polarized (thick dashed curves). The circles (thin dashed curves) are the shifted isotropic medium dispersion curves.

In the particular case shown we see that a construction line 45v cuts the wavevector diagram at periodic positions. Shown at these positions are the group velocity vectors given by the k-space gradient of the dispersion relation $v_g = \nabla_k \omega(k_m)$, where $\omega = ck_m$, where c is the vacuum speed of light. An example of a group velocity vector for the s-polarized waves is 45w. The combination of an infinite number of waves, having the same group velocity vector, forms the FB excitation, which is the fundamental electromagnetic excitation within the VPH. The FB waves are analogous to plane waves in a non-periodic medium. The FB waves are the simplest waves that can exist in the periodic medium of the VPH. Simple isolated plane waves can not exist within the periodic media. The FB waves are formed by an infinite number of different $k_m$ vectors having the same group velocity vector $v_g$.

To obtain analytic expressions for the diffraction efficiencies near Bragg resonance, which will assist the reader in understanding the dependencies of for specifying the optimum VPH thickness and angular bandwidths associated with each VPH layer of the structure, it will prove instructive to look at an Approximate Coupled Wave Analysis (ACWA) of a VPH.

For the purpose of simplifying the analysis we will take the average refractive index of the VPH equal to the refractive index of the input medium, which is also equal to the refractive index of the output medium and is represented by $n_0$. In general this is not a required restriction. Note that the maximum deviation of the refractive index from its average value may be given in terms of the modulation amplitude of the relative permittivity by the relation $$\delta n \approx M \frac{n_0}{2}. \tag{649}$$

Additionally, the VPH thickness is represented by d. The replay wave 45i is represented by $R(x)$ and is at a replay angle $\theta_R$ measured relative to the x-axis. A resulting scattered wave is diffracted according to the contents of a memory cell, i.e. the structure of a VPH. Therefore we say that a scattered wave 45j results from a replay wave. The scattered wave is represented by $S(x)$ and is at a scatter angle $\theta_S$ measured relative to the x-axis. The fringes of the VPH are separated by a normal lattice spacing 45t and form the reciprocal lattice vector 45u, which is represented by G. The reciprocal lattice vector is perpendicular to the fringes and at the reciprocal lattice angle $\gamma$ as measured relative to the a-axis.

The electric field of an s-polarized replay wave in the input medium 45q points in the $\hat{z}$ direction and is given by $$E_R = \hat{z} e^{-ik_R \cdot r}, \tag{650}$$

where $k_R = (2\pi/\lambda)\langle \cos \theta_R, \sin \theta_R \rangle$. The electric field of an s-polarized scattered wave in the output medium 45r is $$E_S = \hat{z} S(d) e^{-ik_S \cdot r}, \tag{651}$$

where $k_S = (2\pi/\lambda)\langle \cos \theta_S, \sin \theta_S \rangle$. Within the structure of the periodic structure there are VPH layers, which to first order are assumed to not interact with each other so that we can focus on the essential underlying physics. Within a VPH layer the s-polarized (TE) electric field is given by $$E_{TE} = \hat{z} \{R(x) e^{-ik_R \cdot r} + S(x) e^{-ik_S \cdot r}\}, \tag{652}$$

where the form of Eq. 652 is consistent with radiation that is at or near Bragg resonance because it assumed that $k_S = k_R + G$ and the magnitudes $k_R \approx k_S$, which can only occur at certain specific intersection points of the shifted isotropic dispersion diagrams forming the VPH wavevector diagram i.e. at or near Bragg resonance.

Next, by plugging in the above assumed form of the electric field into Eq. 639, writing $\cos[G \cdot r]$ in terms of exponential functions and using a slow wave approximation wherein $R''(x) = S''(x) \approx 0$ (where each prime is a derivative with respect to x) we find that $$e^{-ik_R \cdot r}\left[-2ik_R \cos \theta_R R'(x) + (k^2 - k_R^2)R(x) + \frac{Mk^2}{2}S(x)\right] + \tag{653}$$

$$e^{-ik_S \cdot r}\left[-2ik_S \cos \theta_S S'(x) + (k^2 - k_S^2)S(x) + \frac{Mk^2}{2}R(x)\right] = 0.$$

The above equation can only be true when each term in large brackets is zero and when $k = k_R$ (i.e. by energy conservation), so that $$-iR'(x) + \frac{\kappa}{C_R}S(x) = 0 \tag{654}$$

$$S'(x) + \frac{i\Gamma}{C_S}S(x) + \frac{i\kappa}{C_S}R(x) = 0,$$

where the coupling coefficient is $$\kappa = \frac{Mk_R}{4}, \quad (655)$$

the detuning coefficient is $$\Gamma = \frac{k_R^2 - k_S^2}{2k_R}, \quad (656)$$

the replay obliquity coefficient is $$C_R = \cos\theta_R, \quad (657)$$

and the scatter obliquity coefficient is $$C_S = \frac{k_S}{k_R}\cos\theta_S. \quad (658)$$

Additionally, the squared magnitude of the scatter wavevector is given by the dot product $$k_S^2 = (k_R + G)\cdot(k_R + G) \quad (659)$$

where the reciprocal lattice vector is $$G = \frac{2\pi}{\Lambda}\langle\cos\gamma, \sin\gamma\rangle. \quad (660)$$

Furthermore, note that the reciprocal lattice angle $\gamma$, which is actually ambiguous by $\pi$ radians in direction, is chosen by convention so that $k_S = k_R + G$ (and not $k_S = k_R - G$). This is effectively setting all the km components of the prior modal analysis to zero except for one mode. Taking the derivative of Eqs. 654 and rearranging terms we find that $$S''(x) + \frac{i\Gamma}{C_S}S'(x) + \frac{\kappa^2}{C_S C_R}S(x) = 0 \quad (661)$$

$$R''(x) + \frac{i\kappa\Gamma}{C_S}R'(x) + \frac{\kappa^2}{C_S C_R}R(x) = 0.$$

Where the Dirichlet boundary conditions for a transmission VPH are $$S(0) = 0$$

$$R(0) = 1, \quad (662)$$

and the corresponding Neumann boundary conditions are obtained from Eqs. 654 and the Dirichlet boundary conditions, whereby $$S'(0) = \frac{-i\kappa}{C_S} \quad (663)$$

$$R'(0) = 0.$$

On providing trial solutions $R(x) \sim e^{i\alpha_R x}$ and $S(x) \sim e^{i\alpha_S x}$ in Eqs. 661 we find that $$\alpha_S = \frac{-\Gamma}{2C_S} \pm \sqrt{\left(\frac{\Gamma}{2C_S}\right)^2 + \frac{\kappa^2}{C_S C_R}} = a_S \pm b_S \quad (664)$$

$$\alpha_R = \frac{-\kappa\Gamma}{2C_S} \pm \kappa\sqrt{\left(\frac{\Gamma}{2C_S}\right)^2 + \frac{\kappa^2}{C_S C_R}} = a_R \pm b_R, \quad (665)$$

where the $b_S$ and $b_R$ terms are associated with the corresponding terms with square roots. Therefore, after applying the Dirichlet and Neumann boundary conditions we find $$S(x) = \frac{-i\kappa}{b_S C_S}e^{i a_S x}\sin(b_S x) \quad (666)$$

$$R(x) = e^{i a_S x}\left\{\cos(b_R x) - \frac{i a_R}{b_R}\sin(b_R x)\right\}. \quad (667)$$

The diffraction efficiency is calculated by first evaluating Faraday's equation $H = \nabla \times E/(-i\omega\mu_0)$ and then finding the time averaged Poynting vector $\mathcal{P} = \frac{1}{2}\text{Re}[E \times H^*]$ in the input and output media. The input media has an incident wave and the output media has its corresponding replay and scattered waves. The results are $$\mathcal{P}_0 = \frac{k_R}{2\omega\mu_0}\langle\cos\theta_R, \sin\theta_R, 0\rangle \quad (668)$$

$$\mathcal{P}_S = \frac{k_S}{2\omega\mu_0}\langle\cos\theta_S, \sin\theta_S, 0\rangle S(d)S^*(d) \quad (669)$$

$$\mathcal{P}_R = \frac{k_R}{2\omega\mu_0}\langle\cos\theta_R, \sin\theta_R, 0\rangle R(d)R^*(d), \quad (670)$$

from which we can take the ratio of the x-components to obtain the diffraction efficiencies. The s-polarized scattered diffraction efficiency is given as $$\eta_S = \frac{\mathcal{P}_{S,x}}{\mathcal{P}_{0,x}} = \frac{\sin^2\left[\kappa d\sqrt{\left(\frac{\Gamma}{2\kappa C_S}\right)^2 + \frac{1}{C_S C_R}}\right]}{1 + \frac{\Gamma^2 C_R}{4\kappa^2 C_S}}. \quad (671)$$

Similarly, the s-polarized replay throughput efficiency is given by $\eta_R = \mathcal{P}_{R,x}/\mathcal{P}_{0,x}$ so that $$\eta_R = \cos^2\left[\kappa d\sqrt{\left(\frac{\Gamma}{2C_S}\right)^2 + \frac{1}{C_S C_R}}\right] + \quad (672)$$

$$\left(\frac{\Gamma^2 C_R}{4C_S}\right)\frac{\sin^2\left[\kappa d\sqrt{\left(\frac{\Gamma}{2C_S}\right)^2 + \frac{1}{C_S C_R}}\right]}{1 + \frac{\Gamma^2 C_R}{4C_S}}.$$

Finally, it is possible to show that all of the results of the ACWA for s-polarization carry forward for the p-polarization with the understanding that κ is modified. The general expression for κ being $$\kappa = \frac{Mk_R}{4}(\hat{R} \cdot \hat{S}), \qquad (673)$$

where $\hat{R}$ and $\hat{S}$ are unit vectors pointing in the direction of the polarization for the replay and scattered waves. For s-polarized waves $\hat{R}$ and $\hat{S}$ point in the same z-direction and $\hat{R} \cdot \hat{S} = 1$. For p-polarized waves the replay unit polarization vector $\hat{R}$ is shown as 45k and the scatter unit polarization vector $\hat{S}$ is shown as 45m.

At Bragg resonance we have the special cases $$\eta_S = \sin^2[\kappa d\sqrt{\sec\theta_R \sec\theta_S}] \qquad (674)$$

and $$\eta_R = \cos^2[\kappa d\sqrt{\sec\theta_R \sec\theta_S}] \qquad (675)$$

and energy is conserved because $\eta_S + \eta_R = 1$, which is unlike the more general off Bragg resonance case described above. Moreover, an optimum VPH thickness d that will transmit all the replay wave into the scattered wave at 100% efficiency at Bragg resonance occurs when $\eta_S = 1$ (and $\eta_R = 0$), therefore $$d = \frac{\pi}{2} \frac{2m_d + 1}{\kappa\sqrt{\sec\theta_R \sec\theta_S}}. \qquad (676)$$

where $m_d \in \{0, 1, 2, \ldots\}$, which controls both the special and angular bandwidths. Also observe that due to the transition symmetry associated with the reciprocal lattice vector G in Eq. 640 we can formally exchange the angles of $\theta_R$ and $\theta_S$, i.e. $\theta S \leftrightarrow \theta_R$, and still have perfect Bragg resonance. This is the underlying reason for a DAR.

In equation Eq. 676 the quantity $2m_d + 1$ is an odd number for any integer $m_d$. Let us define $m_{TE} = 2m_d + 1$ for TE modes (s-polarized) waves and $m_{TE} = 2m_d + 1$ for TM modes (p-polarized) waves. By combining Eqs. 676 and 673 for TE and TM polarized waves we find that to have 100% diffraction efficiency for both TE and TM polarizations requires that $$\frac{Md}{\lambda\sqrt{\cos\theta_R \cos\theta_S}} = \frac{m_{TE}}{\hat{R}_{TE} \cdot \hat{S}_{TE}} = \frac{m_{TM}}{\hat{R}_{TM} \cdot \hat{S}_{TM}} \qquad (677)$$

and $$\hat{R}_{TE} \cdot \hat{S}_{TE} = 1 \qquad (678)$$

$$\hat{R}_{TM} \cdot \hat{S}_{TM} = \cos(\theta_R - \theta_S). \qquad (679)$$

As a consequence the ideal condition for no polarization dependent losses is that $$\cos(\theta_R - \theta_S) = \frac{m_{TM}}{m_{TE}}, \qquad (680)$$

where $m_{TM}$ and $m_{TM}$ are odd integers for transmission mode holograms and the steering angle 45n is give by $(\theta_R - \theta_S)$. Note that the steering angle is generally not in the plane of FIG. 45.

From a modal analysis perspective we can find the response of a VPH for p-polarized (TM) waves by generalizing Eq. 640 for the FB waves by writing $$E = \sum_{m=-\infty}^{+\infty} v_m e^{-i(k_0 + mG) \cdot r}, \qquad (681)$$

where $v_m$ are now in the x-y plane for p-polarization, instead of in the z-direction for s-polarization—i.e. see coordinates in FIG. 45. Plug the FB expansion into Eq. 635, relabeling dummy variables and collecting related exponential terms we obtain $$(k^2 - k_m^2)v_m + (v_m \cdot k_m)k_m + \frac{Mk^2}{2}(v_{m-1} + v_{m+1}) = 0. \qquad (682)$$

Also, after substituting Eqs. 681 and 638 into Eq. 636, forming the approximation $$\nabla \log \epsilon = \frac{-MG\sin[G \cdot r]}{1 + M\cos[G \cdot r]} \approx -MG\sin[G \cdot r], \qquad (683)$$

which is valid for M<<1, substituting this approximation into Eq. 636 and equating like exponentials in the resulting expression for Eq. 636 we obtain $$v_m \cdot k_m = \frac{M}{2}(v_{m+1} - v_{m-1}) \cdot G, \qquad (684)$$

which is substituted into Eq. 682. Next, take the inner product of the resulting equation with G and define $u_m = v_m \cdot G$ so that $$(k^2 - k_m^2)u_m + \frac{M}{2}\{u_{m+1}(k^2 + k_m \cdot G) + u_{m-1}(k^2 - k_m \cdot G)\} = 0, \qquad (685)$$

which may be put into a diagonally banded matrix format such that $$\begin{bmatrix} \ddots & \vdots & & & & & \cdots \\ (k^2-k_2^2) & \frac{M(k^2-k_2 \cdot G)}{2} & 0 & 0 & 0 & & \\ \frac{M(k^2+k_1 \cdot G)}{2} & (k^2-k_1^2) & \frac{M(k^2-k_1 \cdot G)}{2} & 0 & 0 & & \\ \cdots & 0 & \frac{M(k^2+k_0 \cdot G)}{2} & (k^2-k_0^2) & \frac{M(k^2-k_0 \cdot G)}{2} & 0 & \cdots \\ & 0 & 0 & \frac{M(k^2+k_{-1} \cdot G)}{2} & (k^2-k_{-1}^2) & \frac{M(k^2-k_{-1} \cdot G)}{2} & \\ & 0 & 0 & 0 & \frac{M(k^2+k_{-2} \cdot G)}{2} & (k^2-k_{-2}^2) & \\ \cdots & & & & \vdots & & \ddots \end{bmatrix} \begin{bmatrix} \vdots \\ u_2 \\ u_1 \\ u_0 \\ u_{-1} \\ u_{-2} \\ \vdots \end{bmatrix} = \begin{bmatrix} \vdots \\ 0 \\ 0 \\ 0 \\ 0 \\ 0 \\ \vdots \end{bmatrix} \quad (686)$$

where $k_m^2 = k_m \cdot k_m$. If we identify the infinite square matrix above as A and the infinite element vector as u then Au=0 then we must require that unknown values of $k_0$ satisfy det[A]=0, where det[•] is the determinant operator, so that in general $u_m \neq 0$. This again provides a wavevector diagram having a set of band gaps formed at the intersection of shifted circular dispersion curves. These p-polarized band gaps are different than in the case of the s-polarized waves analyzed before. This is shown in more detail in FIG. 45 where real space VPH 45a and the corresponding reciprocal space 45b are shown for both the s- and p-polarizations.

In particular, within the reciprocal space we see the shifted circular dispersion curves, an example of which is 45c, the s-polarized dispersion curves (thick solid curves) and p-polarized dispersion curves (thick dashed curves) are shown. Examples of the p-polarized dispersion curves are 45d and 45e. Examples of the s-polarized dispersion curves are 45f and 45g. The orientation of the dispersion curves is made clear by the corresponding orientation of the fringes and the construction line 45h. The implication is that the geometry in reciprocal space is much the same as for p-polarization as it is for s-polarization, but there are nonetheless different optimal VPH thicknesses, angular bandwidths, spectral bandwidths, and diffraction efficiencies for the p-polarization.

Figure 46:
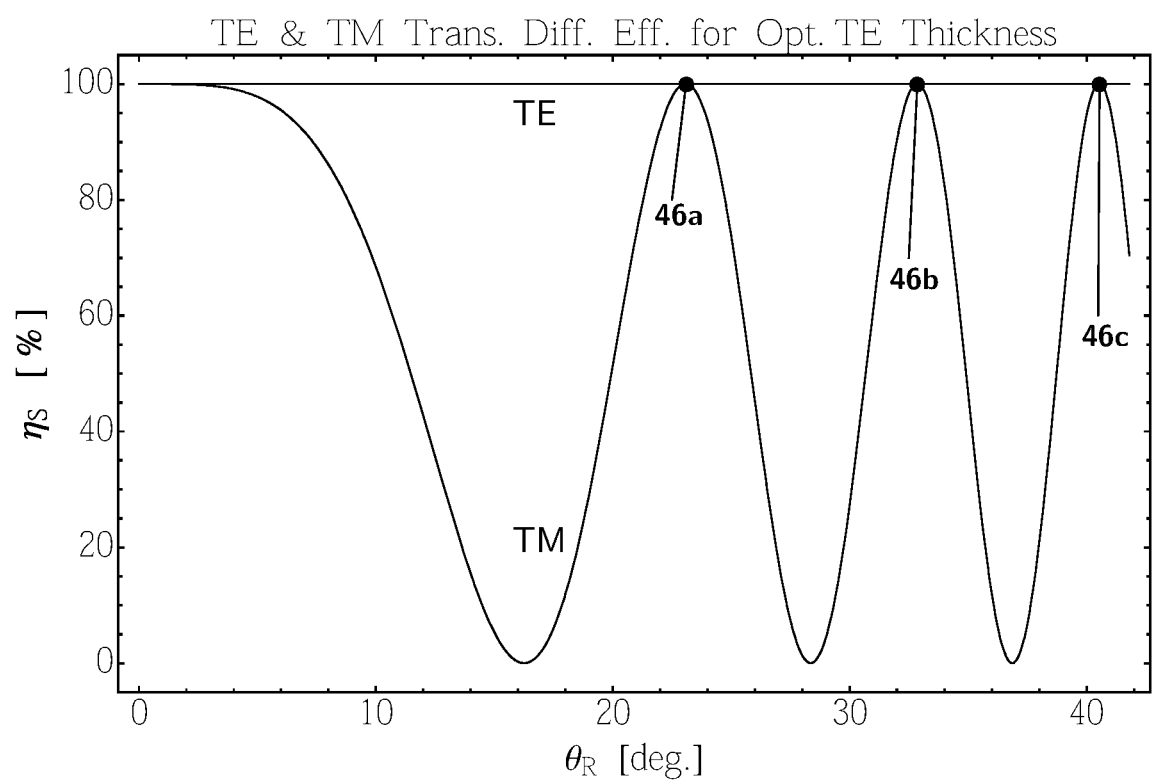
FIG. 46 shows TE and TM transmission diffraction at optimum TE and sub-optimum TM VPH thicknesses.

FIG. 46 shows a comparison of TE and TM diffraction efficiency at suboptimal VPH thicknesses for TM and at optimal thickness for TE when $\theta_S=0$. Now we can see that TE is always at 100% efficiency at all angles while TM is optimal at only discrete optimal performance points. Examples of these points, which are away from the trivial case at the $\theta_R=0$, include optimal performance points 46a, 46b and 46c. So that in combination there are only discrete points at which both the s-polarized and p-polarized waves are at 100% efficiency. In this particular example $m_d=25$. Also, the optimization could have been reversed wherein TM is optimized and TE is not optimized.

Figure 47:
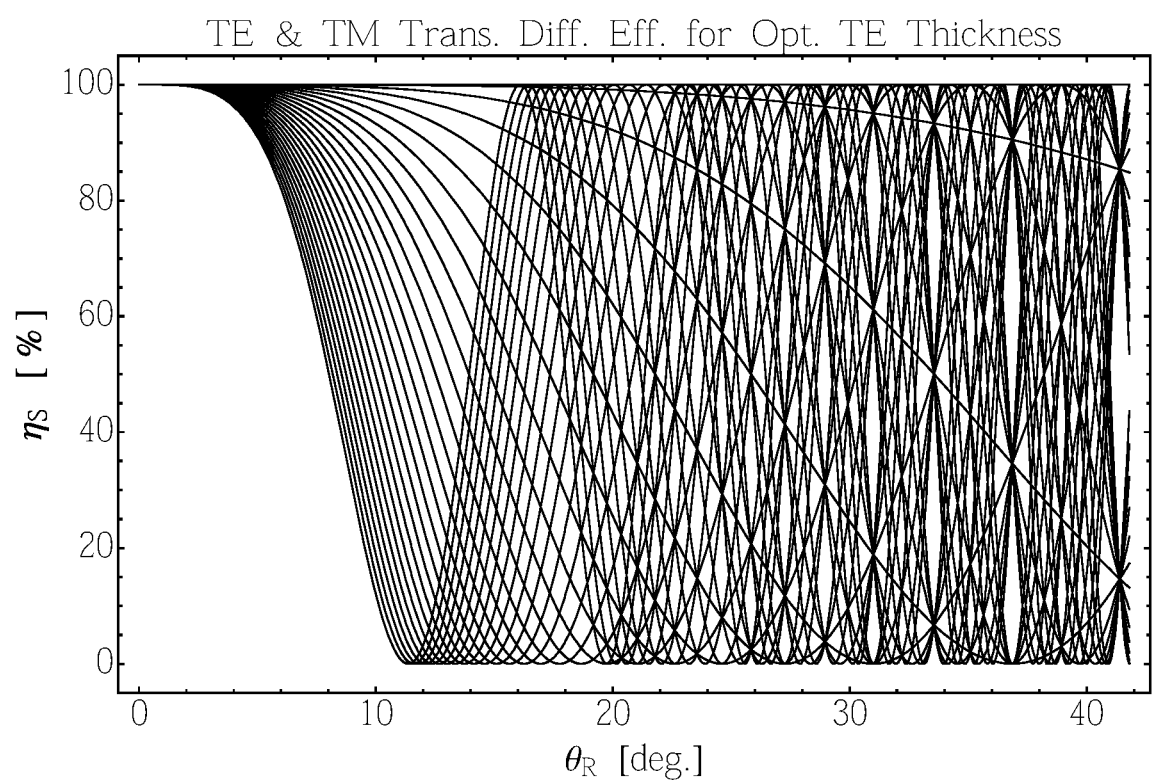
FIG. 47 shows a plurality of optimum input angles, filling the entire range of input angles, where the TM diffraction is 100% efficient even with a sub-optimally thick VPH for TM polarizations.
Figure 49A:
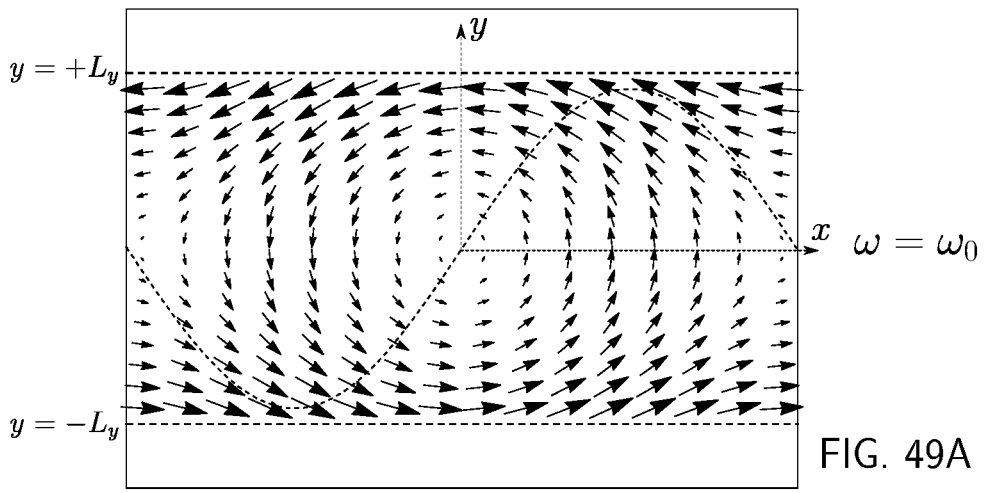
FIG. 49 A-C shows a magnified view of time-averaged force field in colloid contained in a control volume between two transparent sheets over several standing wave periods under differing conditions of excitation frequency.
Figure 49B:
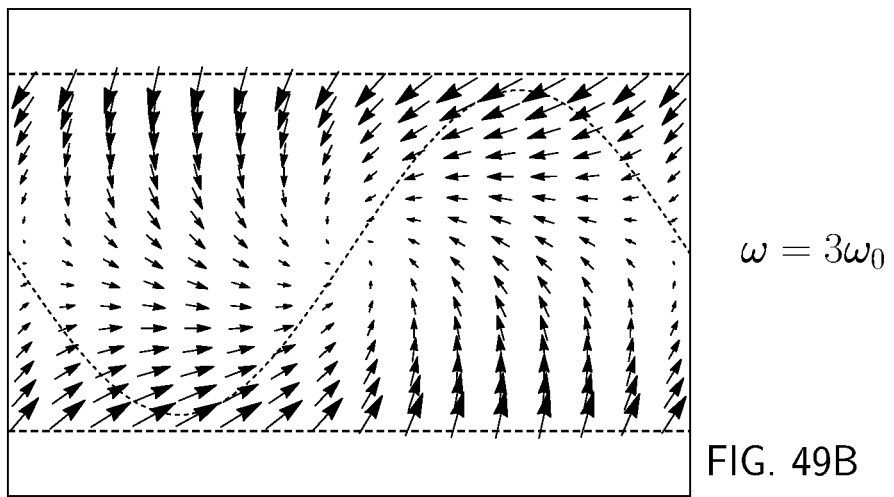
Figure 49C:
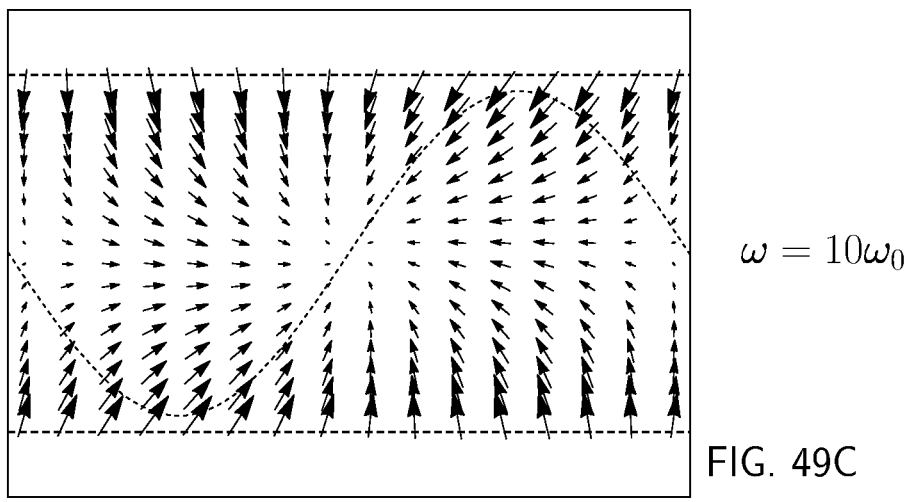

FIG. 47 goes one step further and shows an example of wherein all the possible TE and TM polarization curves for a specific wavelength λ and scatter angle $\theta_S=0$ are provided for $m_d \in \{1, 2, 3, \ldots, 25\}$ when d is optimized for TE operation. Just as in FIG. 46 the TE polarization is a straight line at 100% efficiency in FIG. 47. It is clear that there are many discrete angles at which both TE and TM are at or near 100% efficiency. Moreover, when the angular bandwidth are taken into account then the entire range of angles from $0 \leq |\theta_R| \leq \theta_c$, where $\theta_c = \arcsin[1/n_0]$ is the TIR based critical angle and where $n_0$ is the average refractive index in the VPH, are covered at high efficiency transmission diffraction.

For the avoidance of doubt, what is being shown in FIGS. 46-47 is that even though the VPH thickness and modulation index are at fixed values there are "sweet spots", for a given replay angle $\theta_R$, scatter angle $\theta_S$ and wavelength λ in the average medium, wherein the transmission diffraction efficiency is at or near 100% efficiency for both s- and p-polarizations.

In summary, a basic building block of a light steering system is a Surface Passivated Volume Phase Hologram (SP-VPH). The SP-VPH provides mirror-like diffraction wherein the diffracted light is predominately in the direction that a conventional mirror would provide reflection had it the same orientation as the SP-VPH fringes. The SP-VPH only provides this mirror-like response over a jointly narrow angular and spectral band about the Bragg resonance of the SP-VPH. Light that is not within the narrow angular and spectral bandwidths ideally is not diffracted and passes through the SP-VPH without redirection. The SP-VPH can be made more ideal in its diffractive response by fringe-to-fringe and along-fringe apodization techniques and by carefully choosing the thickness d, depth of modulation M, the steering angle $(\theta_R - \theta_S)$ so as to minimize or eliminate polarization dependent losses.

Next, we consider the generation of the electric fields that can create the needed DEP-based ponderomotive forces on nanoparticles in a colloid to form a proper apodization on a VPH having an electronically controllable reciprocal lattice vector G. This will allow for a thin colloidal control volume to steer light having a specific wavelength λ, bandwidth Δλ, polarization, coherence length, and angular spread Δθ. Ideally, the steering direction would be variable and based on a potentially complex set of waveforms impressed on simple electrodes.

Beam Steering Fields for DEP-Based Gratings

In this section the electric potentials, electric fields, ponderomotive forces, and particle concentrations for simple gratings and VPH having an apodization are derived and demonstrated. Some methods for developing more elaborate gratings are then discussed. These derivations are useful for electrically small and large gratings. The electrically small gratings are typically used with dielectric particles and are dynamic VPHs. The electrically large gratings may be used with dielectric particles or metallic particles. This allows for extremely broadband reflective gratings are useful for applications like solar energy. Thus, the following discussion applies to both electrically small and large structures. The electrically small structures have a scale similar to the wavelength of light. The electrically large structures are much larger than the wavelength of light.

In particular, let us consider a sheet of a colloidal mixture that is located between two solid transparent sheets, such as glass or plastic. This forms a thin control volume that may be very large, even many square meters in area. It is to be assumed that if electrodes are used then the electrodes are directly printed on the two inner surfaces of the control volume.

For electrically large gratings, i.e. where the grating period is much larger than the wavelength of light, electrodes on each surface may be energized by hybrid analog-digital voltage source that provides an arbitrary voltage in space and time on the electrodes. The electrodes may be thought of as a means for spatial sampling of the desired potential waveform and must obey the Nyquest sampling theorem.

For electrically small gratings other means than electrodes are typically required to impress a desired electrical potential because it is difficult to fabricate such small electrodes. For example, light induced surface plasmon polaritons may be used to induce a potential on a thin continuous sheet of metal placed on a glass or plastic surface instead of patterned electrodes. So the objective of the analysis here is to see how harmonic potential fields may be used to reach inside the control volume and create a grating structure dynamically. Similar considerations are useful for photonics crystals.

Note that while the principle of superposition may be used to add together potentials in the control volume it may not be used to obtain the forces because a DEP process is nonlinear—e.g. requires calculating factors like $|E|^2$. Therefore, the entire potential in the control volume needs to be specified at the beginning of the solution of the problem.

For an assumed potential function to be consistent with the allowed field configurations in the control volume it must be constrained by Maxwell's equations, therefore consider Ampere's law $$\nabla \times \mathcal{H} = \mathcal{J}_f + \frac{\partial \mathcal{D}}{\partial t} \tag{687}$$

where $\mathcal{D}=\epsilon\varepsilon$, $\mathcal{J}_f=\sigma\varepsilon$ so that on taking the divergence of the above equation, using the identity $\nabla \cdot (\nabla \times \mathcal{H})=0$, and using the quasi-electrostatic approximation $\varepsilon=-\nabla\phi$ we get $$\sigma\nabla^2 \phi(r,t) + \epsilon\frac{\partial}{\partial t}\nabla^2 \phi(r,t) = 0 \tag{688}$$

which is a differential equation for $\nabla^2\phi(r, t)$ whose solution is $$\nabla^2\phi(r,t) = \nabla^2\phi(r,0)e^{-t/t_0}, \tag{689}$$

where $t_0=\epsilon/\sigma$ the characteristic time of the system. Therefore, for $t \gg t_0$ we have to a good approximation that $$\nabla^2\phi(r,t)=0 \tag{690}$$

which is true for all quasi electrostatic processes. Then potential functions on the plane $y=\pm L_y$ are assumed to have the form of a traveling wave potential $$\phi(x,y,t)=V\cos(\omega t \pm k_x x)e^{-k_y(L_y \pm y)}, \tag{691}$$

where V is the harmonic voltage amplitude, and $k_x$, $k_y$ are wave numbers. This equation is self-consistent with Maxwell's equations, and will only satisfy Laplace's equation for the potential when we restrict $k_x=k_y$ in the control region $-L_y<y<+L_y$, which may be demonstrated by direct substitution into Eq. 690. Note that two oppositely traveling waves potentials will form a standing wave potential which is also allowed by Maxwell's equations. Thus, the simple forms allowed are $$\phi_1(r,t)=V\cos(\omega t \pm \beta x)e^{-\beta(L_y \pm y)} \tag{692}$$

$$\phi_2(r,t)=V\cos(\omega t)\cos(\beta x)e^{-(L_y \pm y)}. \tag{693}$$

where we have let $\beta$ now represent the wavenumber.

The objective is to provide potentials on the electrode planes that are configured to provide podermotive forces normal to the electrode arrays in the y-direction and tangent to the electrode array in the x-direction in such a way as to construct a grating with a desired grating vector and apodization within the control volume. Based on Eq. 231 at a single spectral component we assume the functional forms $$\phi=\phi(r,t) \quad u=u(r,t) \quad \varepsilon=\varepsilon(r,t) \quad F=F(r,\omega) \tag{694}$$

$$E_R=E_R(r) \quad E_I=E_I(r) \tag{695}$$

$$K_R=K_R(\omega) \quad K_I=K_I(\omega) \tag{696}$$

where it is understood that $K_R$ and $K_I$ are also functions of the constitutive parameters. Then the governing equations, in the order of the calculation flow, are as follows $$\varepsilon \approx -\nabla\phi \tag{697}$$

$$\varepsilon = E_R(r)\cos(\omega t) + E_I(r)\sin(\omega t) \tag{698}$$

$$|E|^2 = E_R \cdot E_R + E_I \cdot E_I \tag{699}$$

$$F_{dep} = 2\pi b^3 \epsilon_L \left\{ \frac{K_R}{2}\nabla|E|^2 + K_I \nabla \times (E_I \times E_R) \right\} \tag{700}$$

$$\frac{\partial u}{\partial t} - D\nabla^2 u = -\nabla \cdot [\gamma u F_{dep}] \tag{701}$$

the last equation is a Fokker-Planck type of equation that is expressing DEP-based particle advection and it must be coupled with boundary conditions and an initial condition.

Note that the solid boundaries of the control volume at $y=\pm L_y$ are subject to zero particle flux normal to the surfaces from the combined process of diffusion and electric-field-gradient forced advection, so that the sum of the diffusive and advective particle flux is zero whereby $$[-D\nabla u(x,\pm L_y,t)+\gamma u(x,\pm L_y,t)F_{dep}(x,\pm L_y)]\cdot\hat{y}=0 \tag{702}$$

Moreover, there is also a periodic boundary condition on the concentration u(z, y, t) because there is a periodic force on the particles in the liquid. We shall assume that the potential h is given a periodicity of length $4L_x$. Therefore, the electric field will have periodicity of $4L_x$ because the quasi-electrostatic calculation uses $\varepsilon=-\nabla\phi$. This then implies that the force and concentration have a spatial periodicity of $2L_x$ because the force is proportional to terms like $\nabla|E|^2$ which doubles the spatial frequency and therefore halves the spatial period.

Therefore, when considering the potential periodicity we require that $\sin(\beta x)=\sin(\beta(x+4L_x))$, however, when we consider force periodicity we require that $\sin(2\beta x)=\sin(2\beta(x+2L_x))$. In both cases we have that $$4\beta L_x = 2\pi m \rightarrow \beta_m = \frac{\pi}{2L_x}m \quad \forall \, m \in 0, \pm 1, \pm 2, \pm 3, \ldots \tag{703}$$

This means that the particle flux at $x=-L_x$ must be the negative of the particle flux at $x=+L_x$, which is due to the periodicity of system. Therefore, $$[-D\nabla u(-L_x,y,t)+\gamma u(-L_x,y,t)F_{dep}(-L_x,y)]\cdot \hat{x}+[-D\nabla u(L_x,y,t)+\gamma u(L_x,y,t)F_{dep}(L_x,y)]\cdot \hat{x}=0. \quad (704)$$

The result of Eqs. 702 and 704 is that the volume integral of u over a periodic unit cell is conserved, as was shown in Eq. 180. Note, for this example the unit cell is defined to be $$-L_x<y<+L_x, -L_y<x<+L_y, -L_z<z<+L_z. \quad (705)$$

Next, consider a first approach to making the forces on particles periodic in the x-direction is to exploit the fact that balanced traveling waves in opposite directions will form a periodic standing wave. There are two obvious cases. In the first case oppositely traveling waves are separated by the control volume thickness of $2L_y$. In the second case oppositely traveling wave are induced separately on $y=-L_y$ and $y=+L_y$. This gives rise to two general forms for the potential in the control volume that are consistent with Maxwell's equations under quasi-electrostatic conditions.

The first general form is given by $$\phi_1(x,y,t) = \sum_{m=-\infty}^{+\infty} \{V_{T,m}\cos(\omega t - \beta_{T,m}x)e^{-\beta_{T,m}(L_y-y)} + V_{B,m}\cos(\omega t + \beta_{B,m}x)e^{-\beta_{B,m}(L_y+y)}\} \quad (706)$$

where $y=L_y$ is the location of the top potential plane, $V_{T,m}$ is $m^{th}$ voltage amplitude on the top potential plane, and $\beta_{T,m}$ is the $m^{th}$ wavenumber on the top potential plane. Similarly, $y=-L_y$ is the location of the bottom potential plane, $V_{B,m}$ is $m^{th}$ voltage amplitude on the bottom potential plane, and $\beta_{B,m}$ is the $m^{th}$ wavenumber on the bottom potential plane. Notice that the top and bottom are configured to have oppositely traveling potential waves.

The second general form is given by $$\phi_2(x,y,t) = \sum_{m=-\infty}^{+\infty} \{V_{T,m}\cos(\omega t)\cos(\beta_{T,m}x - \psi)e^{-\beta_{T,m}(L_y-y)} + V_{B,m}\cos(\omega t)\cos(\beta_{B,m}x)e^{-\beta_{B,m}(L_y+y)}\} \quad (707)$$

where $y=L_y$ is the location of the top potential plane, $V_{T,m}$ is $m^{th}$ voltage amplitude on the top potential plane, and $\beta_{T,m}$ is the $m^{th}$ wavenumber on the top potential plane. Similarly, $y=-L_y$ is the location of the bottom potential plane, $V_{B,m}$ is $m^{th}$ voltage amplitude on the bottom potential plane, and $\beta_{B,m}$ is the $m^{th}$ wavenumber on the bottom potential plane. The phase $\psi$ is introduced as a means to vary the relative standing wave positions. Notice that the top and bottom are configured to have oppositely traveling potential waves. Also notice that the $\psi$ term is not included in the first general form because we can always find a new start time when the traveling potential waves are aligned.

The first and second general forms will create a ponderomotive force field in the control volume. This force can quickly become algebraically complex due to the many cross terms that result from forming terms like $|E|^2$. Therefore, initially we will look at only a single term in each of Eqs. 706-707.

Assuming that Eq. 706 only has one term with m=1, we use Eqs. 697-698 to obtain the quasi-electrostatic fields and then use Eqs. 699-700 to find the force field on a particle of radius b. Then we can use Eq. 701 plus initial and boundary conditions to generate the particle concentration u(z, y, t).

Therefore, using one term of Eq. 706 we get in the control volume gap $-L<y<+L$ counter propagating potential waves $$\phi(x,y,t) = \underbrace{V_T\cos(\omega t - \beta_T x)e^{-\beta_T(L_y-y)}}_{\text{Top traveling wave to right}} + \underbrace{V_B\cos(\omega t - \beta_B x)e^{-\beta_B(L_y-y)}}_{\text{Bottom traveling wave to left}}, \quad (708)$$

and using Eq. 698 we get an expression for $\varepsilon(r,t)$, which can be written using trigonometric identities in the form of Eq. 698 whereby the x and y components of $E_R$ are give by $$E_{R,x}=V_T\beta_T e^{-T(L_y-y)}\sin(\beta_T x)+V_B\beta_B e^{-\beta_B(L_y+y)}\sin(\beta_B x) \quad (709)$$

$$E_{R,y}=-V_T\beta_T e^{-\beta_T(L_y-y)}\cos(\beta_T x)+V_B\beta_B e^{-\beta_B(L_y+y)}\cos(\beta_B x) \quad (710)$$

and the x and y components of $E_I$ are give by $$E_{I,x}=-V_T\beta_T e^{-\beta_T(L_y-y)}\cos(\beta_T x)+V_B\beta_B e^{-\beta_B(L_y+y)}\cos(\beta_B x) \quad (711)$$

$$E_{I,y}=-V_T\beta_T e^{-\beta_T(L_y-y)}\sin(\beta_T x)+V_B\beta_B e^{-\beta_B(L_y+y)}\sin(\beta_B x) \quad (712)$$

Then from Eq. 700 we get the time average force on a particle as $$F_3=2\pi b^3\epsilon_L\langle GK_I(\omega)+HK_R(\omega), GK_R(\omega)-HK_I(\omega)0\rangle \quad (713)$$

$$G=2(-V_B^2\beta_B^3 e^{-2\beta_B(L_y+y)}+V_T^2\beta_T^3 e^{-2\beta_T(L_y+y)}++V_TV_B\beta_T\beta_B(\beta_B-\beta_T)e^{(\beta_T-\beta_B)y}e^{-(\beta_T+\beta_B)L_y}\cos[(\beta_T+\beta_B)x]) \quad (714)$$

$$H=2V_TV_B\beta_T\beta_B(\beta_T+\beta_B)e^{(\beta_T-\beta_B)y}e^{-(\beta_T+\beta_B)y}\sin[(\beta_T+\beta_B)x]. \quad (715)$$

In the special case of $\beta=\beta_T=\beta_B$ this reduces to $$F_2=4\pi b^3\epsilon_L\beta^3 e^{-2\beta L_y}\langle K_I(\omega)(V_T^2 e^{2\beta y}-V_B^2 e^{-2\beta y})+2V_TV_B K_R(\omega)\sin(2\beta x), K_R(\omega)(V_T^2 e^{2\beta y}-V_B^2 e^{-2\beta y})-2V_TV_B K_I(\omega)\sin(2\beta x),0\rangle \quad (716)$$

If we also take $V=V_T=V_B$ then the force on a particle in the colloid is $$F_1=8\pi b^3\epsilon_L V^2\beta^3 e^{-2\beta L_y}\langle K_I(\omega)\sinh(2\beta y)+K_R(\omega)\sin(2\beta x), K_R(\omega)\sinh(2\beta y)-K_I(\omega)\sin(2\beta x),0\rangle \quad (717)$$

In FIG. 50A we see the results of a numerical simulation showing periodic variations in the concentration u(z, y, t) when a colloid is subject to the highly symmetric ponderomotive forces of $F_1$ for large values of t. In FIG. 50B we see the iso-contours (solid curves) of the same concentration superimposed on a periodic potential 50a and a periodic ponderomotive force 50b.

Beam Steering Sensor Drones

In this section some applications of accurate and precise GRIN light control are described. In particular, we will look at some representative LiDAR and 3D-printing systems that utilize devices previously described by the exponential GRIN model.

Figure 51:
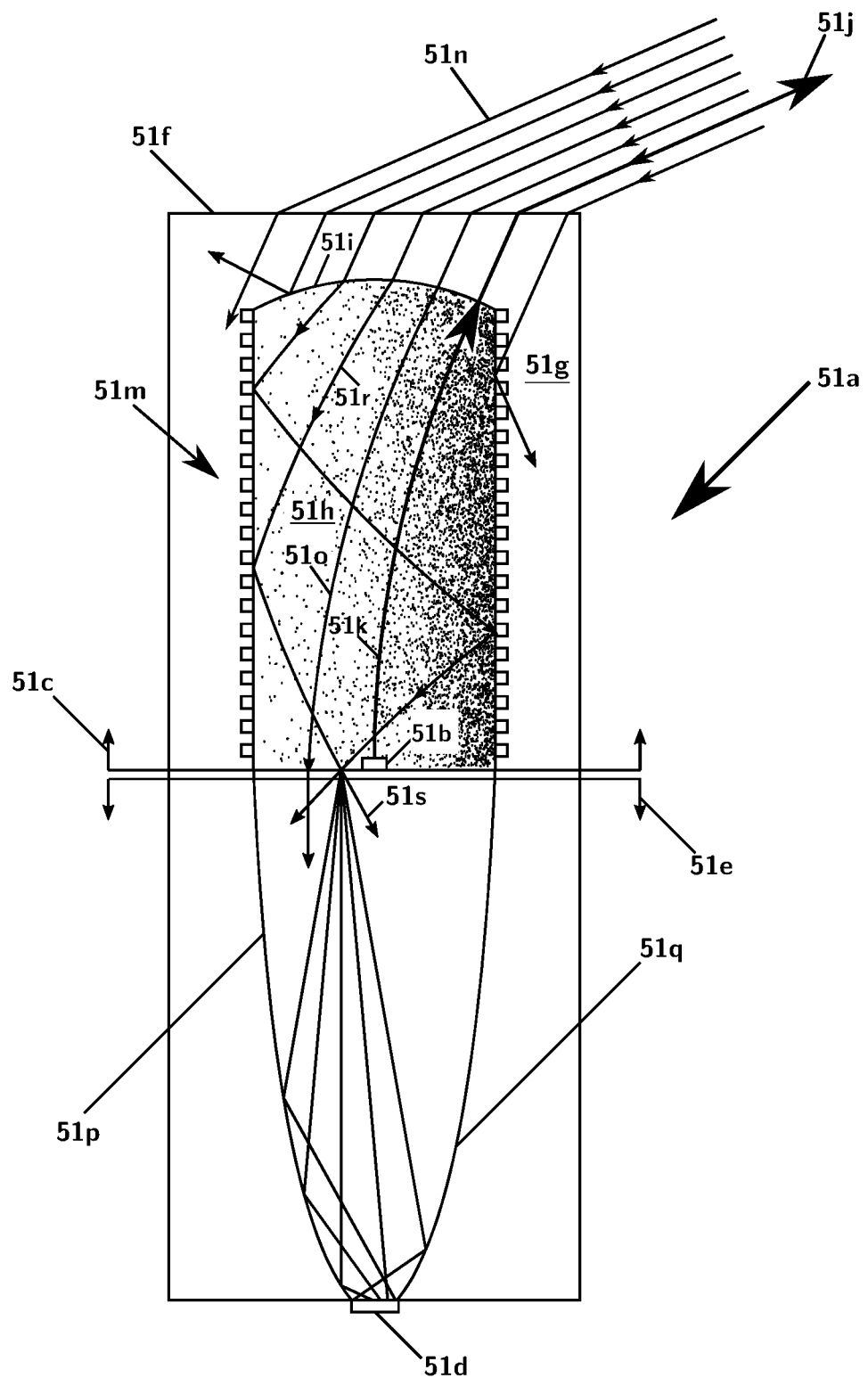
FIG. 51 shows in cross-section a beam-steering LiDAR transceiver comprising both a laser transmitter, a photodiode receiver and a non-imaging compound parabolic concentrator.

In particular, in FIG. 51 shows in cross-section a beam-steering LiDAR transceiver 51a comprising both a laser source 51b in the upper section 51c and a photodiode receiver 51d in the lower section 51e. The laser source may be a local laser diode or it may be a remote laser source and provided by a fiber optic or other form of waveguide. Therefore, the laser source 51b may be thought of as a laser's output aperture.

The upper section 51c further comprises a transparent first surface 51f, a solid and transparent optical radome 51g. The transparent first surface 51f may be flat or curved as has already been described in this disclosure. Internal to the transmitter is a nanoparticle colloid 51h that fills a control volume having a second surface 51i approximately in the shape of a segment of a circle as has also already been described in detail.

The LiDAR transceiver has an outbound laser beam 51j sourced from the transmitter beam 51k. The transmitter beam is curved along an approximately circular trajectory by the application of a harmonic traveling wave voltage to one or more electrode arrays 51m.

An outbound laser pulse strikes a target (not shown), which becomes the source of backscattered light 51n. Some of the back-scatted light refracts through the transparent first surface 51f and then refracts through the second surface 51i to traverse an uninterrupted circular light trajectory 51o back to the plane of the laser source 51b at the beginning of the upper section 51c. This light then enterers a radiation collector comprising a non-imaging optical concentrator formed by optical reflectors 51p and 51q. In this embodiment the optical collector is in the form of a well-known compound parabolic concentrator, which may be formed by a mirrored surface or by TIR. The optical collector provides gain that can improve the signal-to-noise ratio of the receiver. As can be seen from FIG. 51 some of the radiation never makes it to the photodiode receiver 51d due to losses from missing the input aperture, undesired TIR, and also from light that is at too great an angle to be received at the photodiode receiver 51d due to mismatches in optical étendue. An example of etendue mismatched ray segments are 51r and 51s. Note that the efficiency of radiation collection is nearly 100% for targets that do not require beam steering and the efficiency gradually reduces for progressively larger beam steering angles. The cross section of the LiDAR transceiver is valid for both cylindrical and rectangular parallelepipeds.

Note, while FIG. 51 shows separate transmitter and receiver sections it is possible to combine the two sections into one to make the device smaller.

Figure 52:
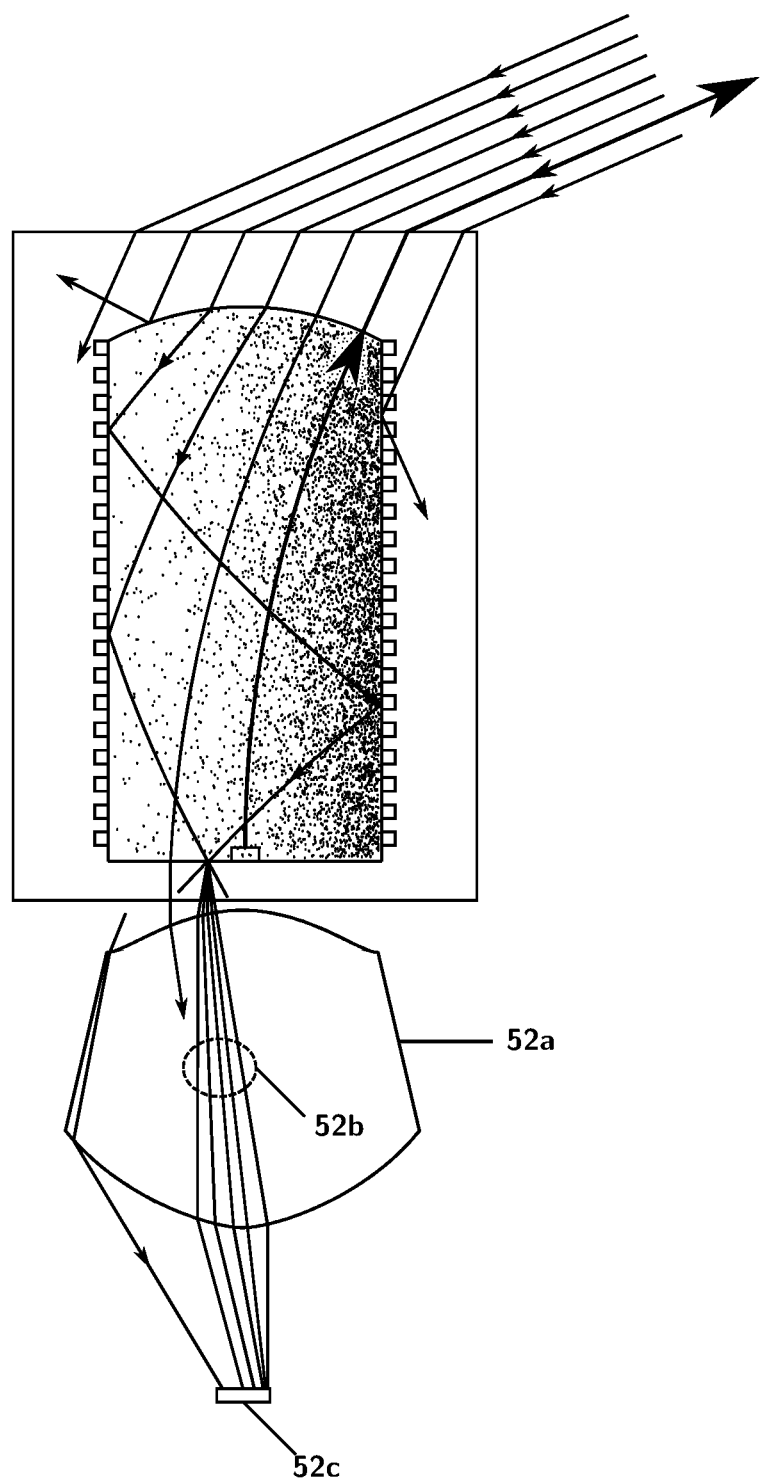
FIG. 52 shows in cross-section a LiDAR transceiver comprising both a laser transmitter, a photodiode receiver and a non-imaging lens.

FIG. 52 shows the same transmitter as in FIG. 51, however now the radiation collector is in the form of a non-imaging lens 52a, which transforms matched rays 52b within a certain angular range to the photodiode 52c for detection. With FIGS. 51-52 we see that different types of non-imaging concentrators are possible in the receiver section of the LiDAR transceiver. Those skilled in the engineering arts of non-imaging optics will realize that there are many other types of non-imaging concentrators that could be substituted for those shown herein to optimize on size, cost or other parameters. Thus, the primary idea is that the DEP-based beam steering is coupled to the non-imaging optical element.

Figure 53:
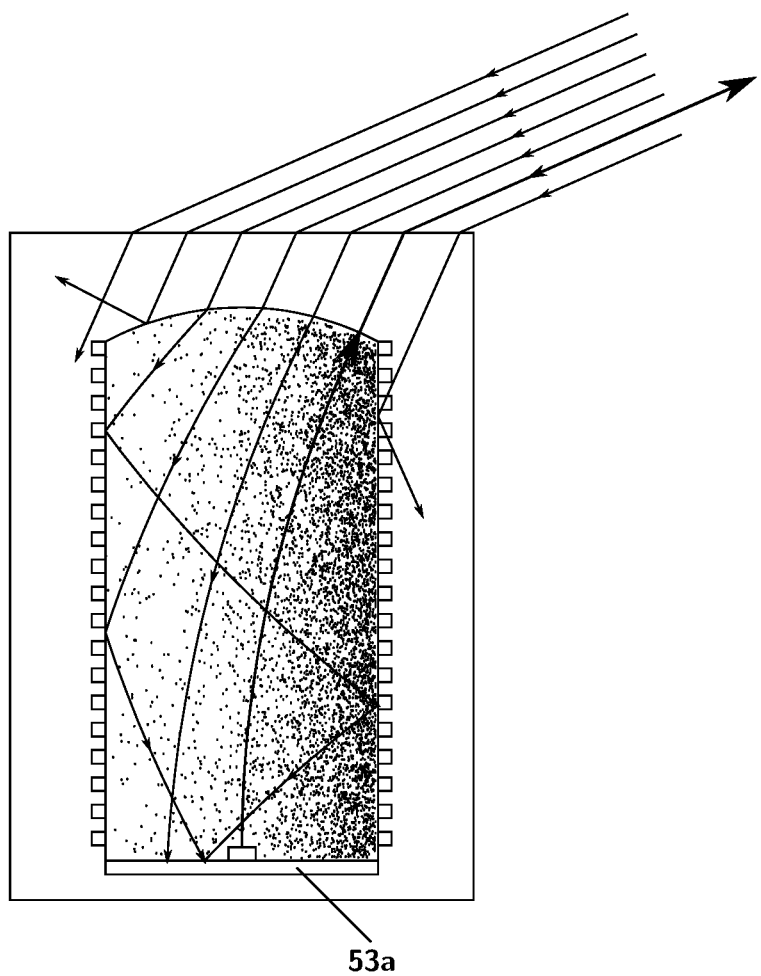
FIG. 53 shows in cross-section a beam-steering LiDAR transceiver comprising both a laser transmitter with a photosensitive array for LiDAR imaging.

FIG. 53 shows the same transmitter as in FIG. 51, however now the radiation collector is in the form of a photosensitive time-domain array 53a for direct LiDAR imaging with time-of-flight for each pulse being directly developed. One of the advantages for this type of sensor is that a narrow pulse can be resolved in time so that rays that take extra time to bounce around in the optical system, i.e. instead of being directly measured, can be resolved in time so that all of the energy being sent into the receiver can be used and étendue ray mismatch conditions are no longer an issue and all the energy can be captured and used.

In the 2012 science fiction movie "Prometheus," which was directed by Ridley Scott, the human crew of a spacecraft used several small spherically shaped drones to explore a subterranean-like network of tunnels on the planet LV-223. The creators of the movie called the automated drones "Spectagraphs," and they were used to provide near real-time maps of potentially dangerous and remote caves and spacecraft corridors. This type of laser scanning sensor drone can be deployed today using a solid-state (or "wet-state" if you prefer due to the nanoparticle colloid) beam steering LiDAR as discussed herein.

Figure 54A:
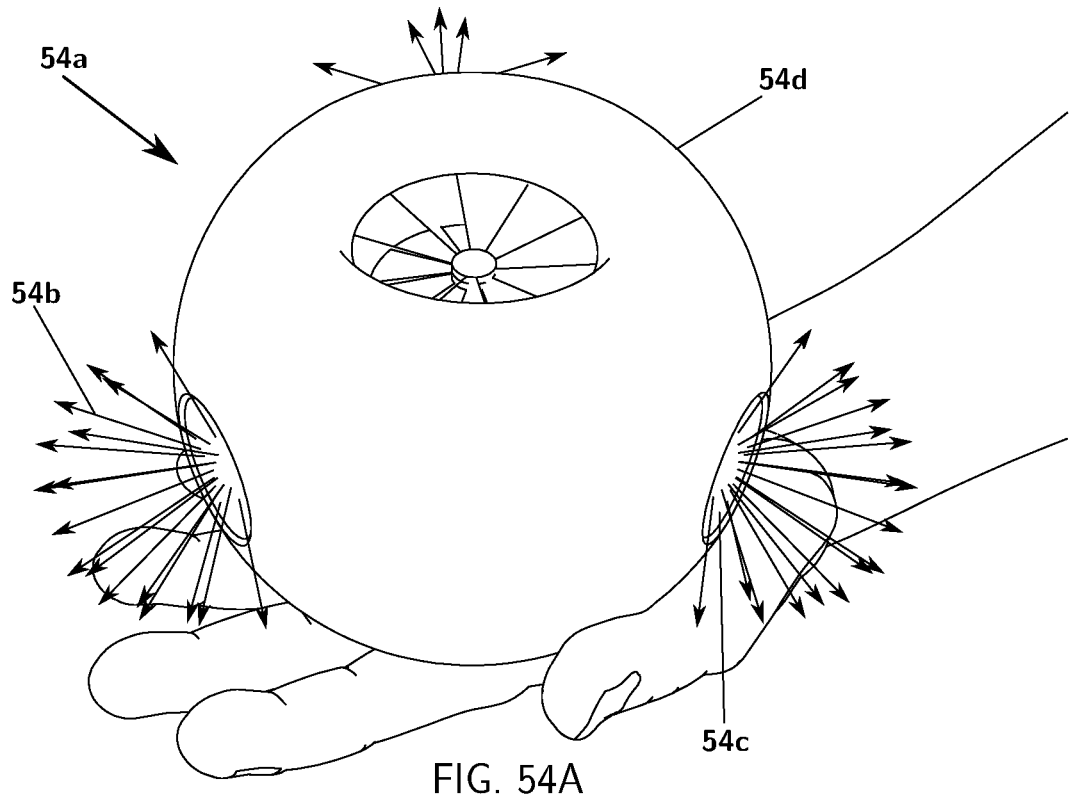
FIG. 54 shows a ducted sensor drone that utilizes a plurality of hybrid LiDAR transceivers as provided in FIG. 53 to gather three dimensional data of the environment that it flies through. The range of potential output LiDAR beams is shown for each sensor port.

In particular, in FIG. 54A we see an example of a beam-steering LiDAR sensor drone 54a that is small enough to be held in a person's hand. The sensor drone provides beam-steered rays 54b from each optical sensor port 54c, which are located around the drone's hull 54d.

Figure 54B:
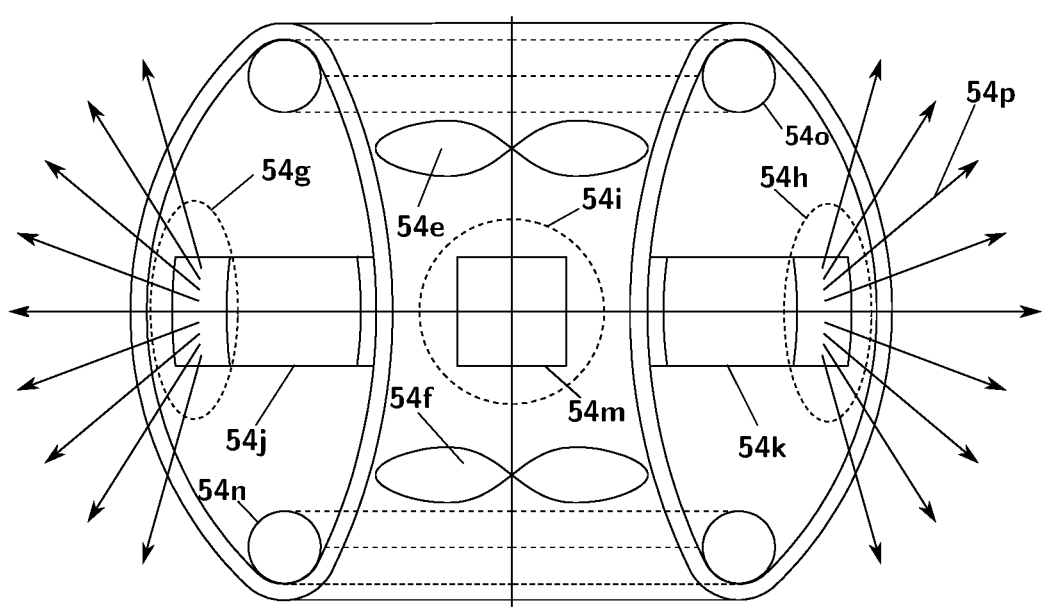

The sensor drone has ducted fans 54e and 54f for propulsion. The fans are located along a centerline of the drone and typically operate in opposite directions to cancel out fan induced torques. The ducted fans can operate at adjusted differential angular velocities speeds to allow a net torque to exist so that the drone can rotate around the rotational axis of the ducted fans. The drone may have may well-known methods for thrust vectoring. In FIG. 54 there are two annulus shaped mass distribution tubes 54n and 54o that distribute mass to induce torques via a gravitational field perpendicular to the ducted fan center axis.

Around the sensor are a plurality of sensor ports 54g, 54h and 54i. Inside of each sensor port is a beam-steering LiDAR transceiver such as 54j, 54k, and 54m. Each steered laser beam 54p may be based on a different wavelength or time-domain pulse position code so that the onboard electronics can discern between backscatter from different LiDAR transceivers. Optionally some of the sensor ports may contain other types of sensors, such as but not limited to imaging sensors.

Lenses & Optics by Dielectrophoresis

Adjustable Focus Lenses for Smart Phones

In this section embodiments light control devices are provided that use DEP processes on nanoparticles in colloids to make variable focus lenses for diverse applications like smart-phone cameras, and robotic vision. The lenses are generally provided in a flat configuration, which is unlike that of a conventional lens that has a one or more curved surfaces. Furthermore, unlike a conventional lens the DEP-based lenses have variable focus based on electrode drive frequency, voltage amplitude, phase between voltages on adjacent electrodes, the (electrical, mechanical, and thermal) properties of the colloid liquid and nanoparticles as well as the distribution of nanoparticle sizes and composition. In the case of nanoparticle composition it is possible to design the distribution of nanoparticles so that the optical dispersion properties of the nanoparticles and liquid cancel to make the lens achromatic.

A first lens example is shown in FIG. 55A where a cross sectional image of a lens is provided. Input light 55a enters the lens and is focused (or defocused if desired) on passing through the lens.

The lens has a transparent containment vessel to hold an IGL, which comprises a first containment structure 55b and a second containment structure 55c. These containment structures provide a volume within which both the refractive IGL 55d and the electric fields used in DEP are located.

Circular annular electrodes comprising a first annular electrode 55e and a second annular electrode 55f are separated by an electrical insulator 55g. The first and second annular electrodes support phasor voltages $+V_0$ and $-V_0$ and produce electric fields 55h, which are indicated in FIG. 55A by dashed lines. Note that the equations already developed for nanoparticle concentration u for wedge-shaped µFCC beam steering still apply here, but now the usable portion of the electric fields fill the outside of the wedge.

Input light 55a that enters the DEP optoelectronic lens along the symmetry axis 55i is focused as output light 55j.

The solutions shown in FIG. 20 still apply approximately for nDEP and pDEP and are plotted in the context of the lens in FIG. 55 in FIGS. 55B-C. If an nDEP process is utilized then a converging lens is formed as shown in FIG. 55B by the converging lens refractive index 55k, which corresponds to a conventional convex lens. If an pDEP process is utilized then a diverging lens is formed as shown in FIG. 55C by the diverging lens refractive index 55m, which corresponds to a conventional concave lens.

Note that a conventional lens uses a constant refractive index and a variable thickness as a function of lens radius to form the lens. In contradistinction the lens in FIG. 55A has a variable refractive index as a function of lens radius and a constant thickness. Additionally, it is also possible for the lens in FIG. 55A to also include a variable thickness. This might be done to eliminate lens aberrations. Alternately, additional electrodes (not shown) placed on the containment vessel surfaces can provide additional degrees of freedom to shape the distribution of nanoparticles and better control focusing and aberrations.

Figure 56:
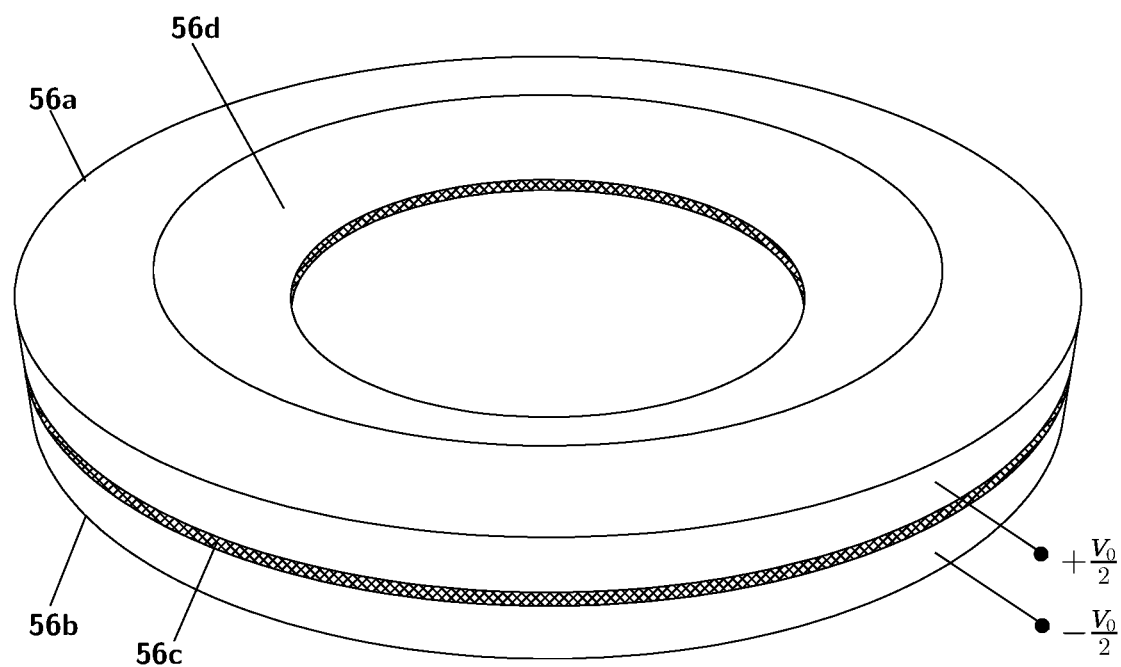
FIG. 56 shows a perspective view of annular electrodes that are used to provide nonuniform electric fields for a dielectrophoresis process to variably focus light in an electronic lens.

A perspective view of the annular electrodes is shown in FIG. 56 and comprises a first annular electrode 56a and a second annular electrode 56b. The electrodes are separated by an electrical insulator 56c. The first and second annular electrodes support phasor voltages +$V_0$ and –$V_0$ and produce nonuniform electric fields by means of the tapered electrode 56d section of the electrodes that has variable thickness as a function of radius.

Figure 57:
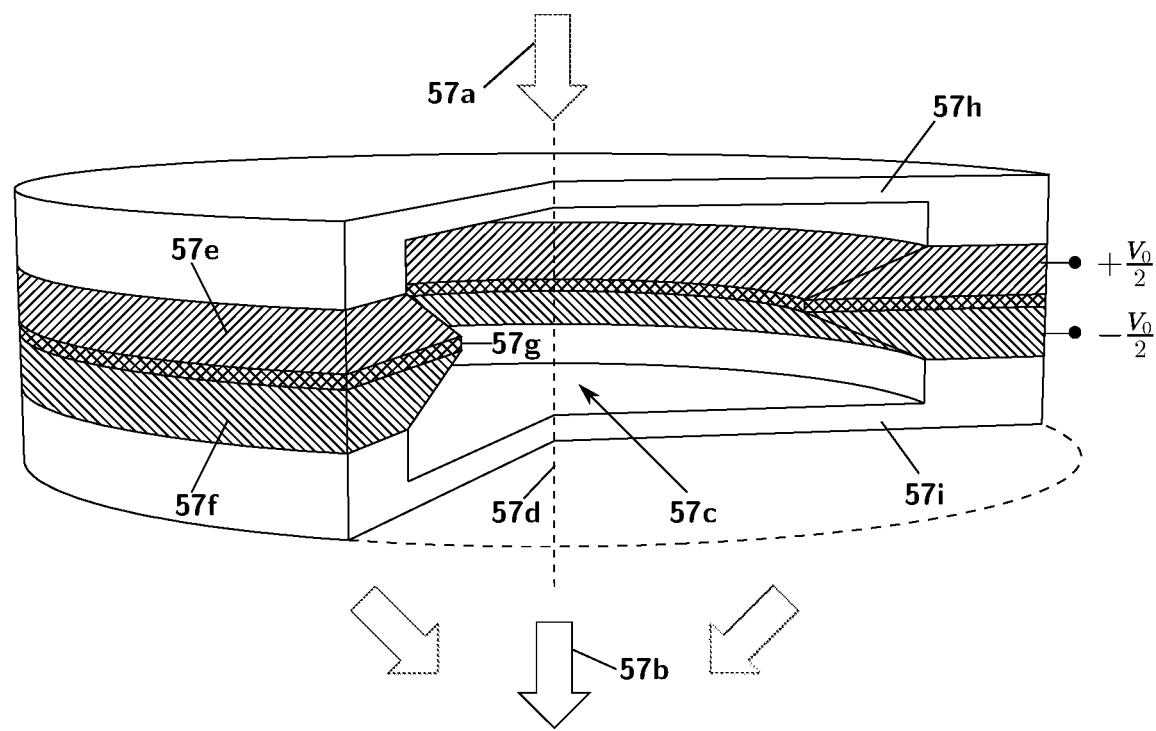
FIG. 57 shows a perspective cut-away view of the integrated annular electrodes and containment vessel (control volume) used in the formation of a dielectrophoresis based lens utilizing concentrations of nanoparticles.

A perspective and cut-away view of the annular electrodes and containment vessel of a electrophoresis-based lens are shown in FIG. 57. This figure is consistent with FIGS. 55-56. Input light 57a is focused to output light 57b via an optoelectronic dielectrophoresis lens 57c that is typically (but necessarily) symmetric about the optical axis 57d. A first annular electrode 57e and a second annular electrode 57f are separated by an electrical insulator 57g. The electrodes provide the nonuniform electric field needed for changing the distribution of nanoparticles and the optical refractive index to electronically focus light passing through the lens. The light is focused by a colloid based GRIN profile formed in the containment vessel, which is formed by the electrodes, insulator, first containment structure 57h and second containment structure 57i.

By using a cylindrical geometry the same thing can be accomplished to form a lens. Therefore, consider the perspective and cutaway view of an electronically controllable lens in FIG. 58, where a set of concentric electrodes 58a is positioned inside a colloid containment volume 58b, which holds the IGL. The electrodes are formed from a transparent conductor, such as but not limited to: indium tin oxide, conductive polymers, silver nanoparticle ink and graphene. The electrode array shown may be the only one used or another electrode array may be formed on the upper surface of the containment volume 58b.

Figure 58:
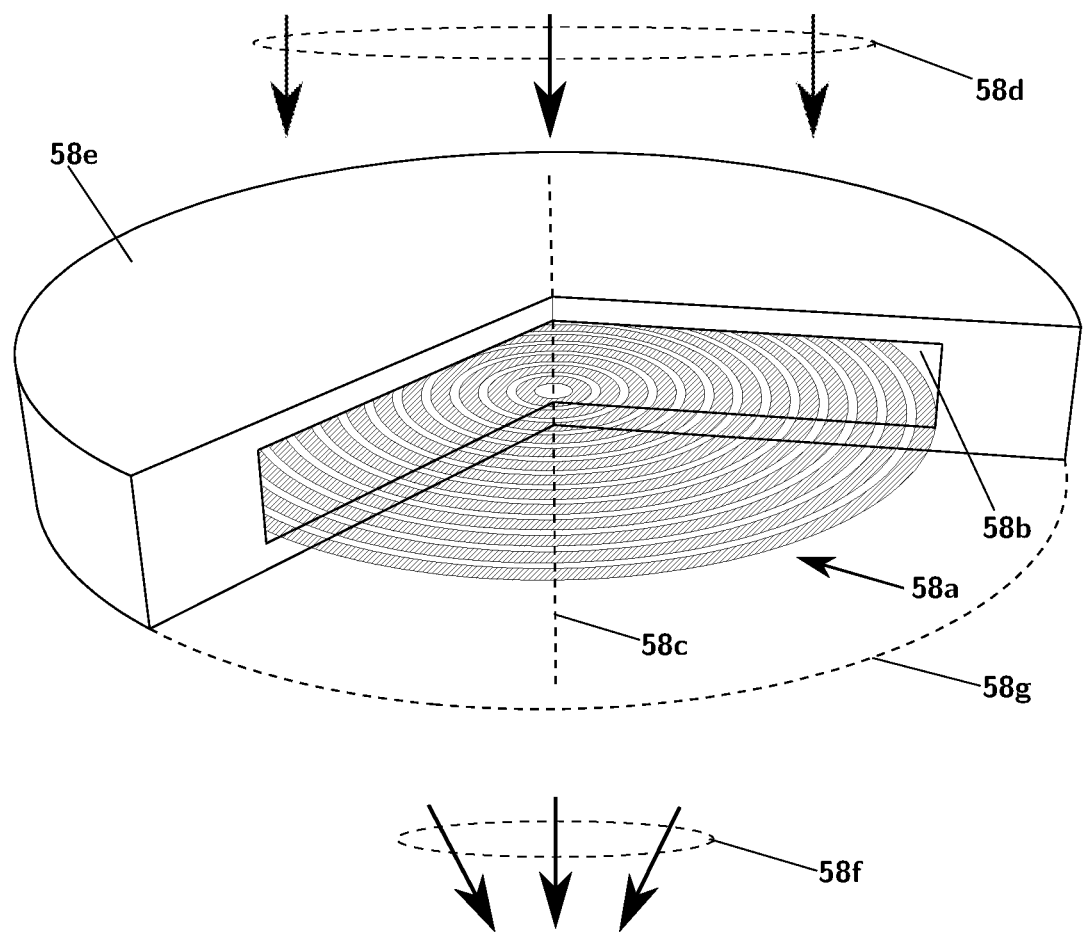
FIG. 58 shows a perspective and cut-away view of a dielectrophoresis-based lens that utilizes traveling voltage waves on a circular and concentric array of electrodes.

The colloid containment volume is a µFCC that contains the IGL and electrodes used to control GRIN profile in the liquid. A traveling wave on the concentric electrodes forces nanoparticles towards or away from the optical axis 58c so that at steady-state the constant thickness containment volume has a GRIN profile in the radial direction. A conventional circular lens, i.e. either convex and converging or concave and diverging, has an optical path length that varies radially from the input surface to the output surface of the lens. This same radial function is made using this DBS device, but now the shaped input and output lenses surfaces are replaced with a GRIN volume. The function of a converging or diverging lens is now obtained by the sign of the real part of the complex Clausius-Mossotti factor, which is controlled by the harmonic frequency of excitation of the electrodes. In this way input light 58d becomes focused output light 58f after it passes through the colloid containment volume 58b and its corresponding IGL containment structure 58e. It also allows for a dynamic zoom-in and zoom-out function as the magnification is changed by changing the harmonic electrode excitation frequency ω, the voltage amplitude or both. In practice the perspective cutaway view in FIG. 58 is made whole by symmetrically completing the structure along cutaway arc 58g.

It should also be noted that if the transparent nanoparticles are replaced by opaque nanoparticles it is possible to have an electronic shutter function or neutral density filter implemented. By this example we can also see that while the main focus of this disclosure has been for transparent nanoparticle there are also obvious extensions to nanoparticles that are opaque or even absorbing in certain optical bands to make a spectral lens filter.

Figure 59A:
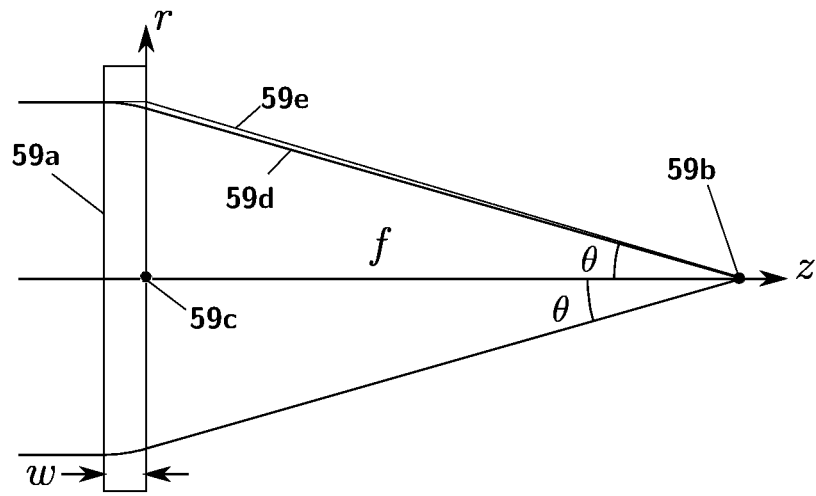
FIG. 59 A shows the geometry of a thin lens approximation used, which is to get an initial estimate of the performance of a dielectrophoresis-based lens.

The lens embodiments of FIGS. 55-58 typically have three dimensional refractive index distributions for the general case of relatively thick lenses. However, for the sake of providing some lens performance metrics and better understanding the basic operations of DEP-based lens, let's consider a thin circular lens 59a of thickness w with flat input and output surfaces. This is shown in FIG. 59A in cross section and is unlike conventional lenses, which have curved input and output surfaces.

The lens used in a DEP-process typically control the refractive index n instead of the surface shape. In the present example it is assumed that n only varies with the radius r of the thin lens. This lens has the z-axis as the optical axis of symmetry and the location of a focus 59b. Let us take the origin of the coordinate system 59c as the center of the lens circle on the output side of the lens. Therefore, the distance from the origin of coordinate system 59c to the focus 59b is the distance $f$.

Furthermore, it is assumed that light rays are incident on the input side of the lens from infinity, so that all the input rays to the lens are parallel. Next, take n=n(r) and $n_0$=n(0), then the Optical Path Length (OPL) of the rays from the source at infinity are all the same and we shall call it $L_\infty$, which is assumed to be in vacuum having a refractive index of unity. Then we can consider the ray path at a radial distance r and another ray at r=0. As the actual output ray 59d is very close to the thin lens approximating ray 59e, we shall take the angle θ to be the same in both cases below.

The OPL must be the same for all ray trajectories at the focus by Fermat's principle, therefore $$OPL = L_\infty + wn + \frac{f}{\cos\theta} \equiv L_\infty + wn_0 + f \quad (718)$$

where the angle θ is formed between the output ray that is focusing to a focus point at a distance $f$ from the output surface of the lens. This can be rewritten as $$n = n_0 - \left(\frac{f}{w}\right)(\sec\theta - 1). \quad (719)$$

Moreover, by trigonometry we find that $$\sec\theta = \sqrt{1+\left(\frac{r}{f}\right)^2}. \quad (720)$$

Additionally, let us assume initially that the solid transparent nanoparticles in the colloid are smaller than approximately $\lambda/10$, this constraint can easily be relaxed later. Then Eq. 233 is valid and we have $$n = n_L + (n_S - n_L)\nu \quad (721)$$

with $\nu$ as the volume fraction of the solid nanoparticles (the subscript of S was dropped for notational convenience) so that Eq. 719 becomes $$n_L + (n_S - n_L)\nu = n_L + (n_S - n_L)\nu_0 - \left(\frac{f}{w}\right)\left[\sqrt{1+\left(\frac{r}{f}\right)^2} - 1\right], \quad (722)$$

Where $\nu_0$ is the volume fraction at $r=0$. Then $$\nu = \nu_0 - \left[\frac{f}{w(n_S - n_L)}\right]\left[\sqrt{1+\left(\frac{r}{f}\right)^2} - 1\right]. \quad (723)$$

For a thin lens with a focal length that is much longer than the radius of the lens we have $$\frac{r}{f} \ll \frac{1}{2}, \quad (724)$$

where the factor of 2 is to account for a diameter. By applying the Taylor expansion for an exponential twice we get $$\sqrt{1+\left(\frac{r}{f}\right)^2} \approx \sqrt{e^{\left(\frac{r}{f}\right)^2}} = e^{\frac{r^2}{2f^2}} \approx 1 + \frac{r^2}{2f^2}. \quad (725)$$

Therefore, on plugging this approximation back into Eq. 723 we get $$\nu = \nu_0\left[1 - \left(\frac{r}{r_m}\right)^2\right] \quad (726)$$

where $$r_m^2 = 2\nu_0 f w (n_S - n_L) \quad (727)$$

and $r_m$ is the maximum radius of the volume fraction distribution so that at $r=r_m$ the volume fraction of nanoparticles is zero. As the diameter $d_m$ is twice the radius $r_m$ we can write $$d_m^2 = 8\nu_0 f w (n_S - n_L). \quad (728)$$

The volume fraction at $r=0$ is $\nu_0$ and it is anticipated to be a maximum of the volume fraction distribution. Also, it would be more convenient to use the average volume fraction $\nu_A$ over the lens control volume instead of the maximum volume fraction of nanoparticles. Therefore, the average over the lens, which has a radius R is $$\nu_A = \frac{1}{R}\int_0^R \nu_0\left[1 - \left(\frac{r}{r_m}\right)^2\right]dr = \nu_0\left[1 - \frac{R^2}{3r_m^2}\right]. \quad (729)$$

Again, because a diameter is twice a radius we can write $$\nu_A = \nu_0\left[1 - \frac{D^2}{3d_m^2}\right]. \quad (730)$$

It is also interesting to note that when $d_m = D$ then from Eq. 730 we find $$\nu_0 = 3/2\nu_A \quad (731)$$

Plugging Eq. 730 back into Eq. 728 we obtain the optical power of the lens in diopters (when $f$ is in meters) as $$\mathcal{D} = \frac{1}{f} = \frac{24\nu_A D(n_S - n_L)}{\xi(3d_m^2 - D^2)} \quad (732)$$

which is valid when $d_m \geq D$ and where it has been taken that the ratio of the lens diameter to the lens thickness is $$\xi = \frac{D}{w}. \quad (733)$$

This ratio is typically ten or greater. Note that if $d_m < D$ then an annular region is formed around the lens that is devoid of nanoparticles. This means that the lens produces images with distortions. Therefore, this case has been eliminated from analysis here even though voltages can still be increased to further concentrate the nanoparticles and increase the lens magnification.

When the diameter of the nanoparticle distribution approaches infinity, ie. $d_m \to \infty$, then there is a uniform distribution of nanoparticles within the lens diameter D, $\nu_A = \nu_0$ and the lens has zero diopters of optical power. When $d_m = D$, then there are zero nanoparticles at the edge of the lens and there is maximum optical power. Thus, $$\mathcal{D}_{max} = \frac{1}{f_{min}} = \frac{12\nu_A(n_S - n_L)}{\xi D}. \quad (734)$$

Figure 59B:
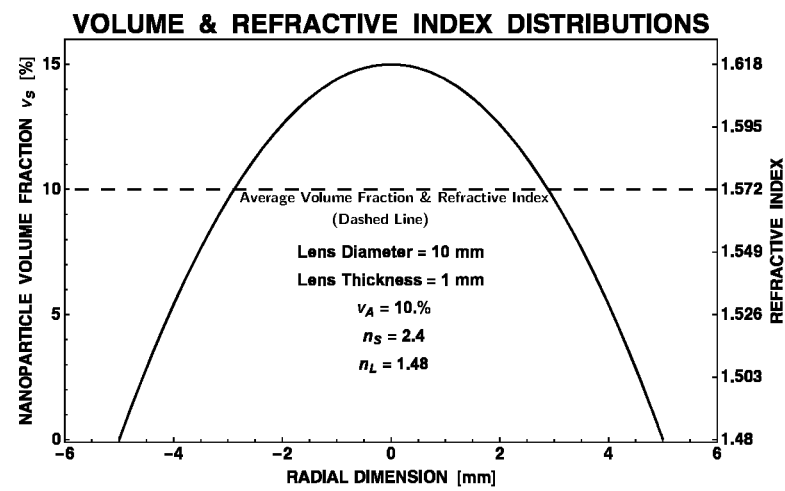

FIG. 59B shows an example of a thin lens having parabolic nanoparticle volume fraction distribution and refractive index distribution. The lens was taken to have a thickness of $w=1$ mm, a diameter of 10 mm, and an average nanoparticle distribution of $\nu_A=10\%$. The liquid was taken to be a dimethyl silicone type fluid and the nanoparticles were diamond nano-scale dust, though titanium dioxide would have an even larger bulk refractive index.

Figure 59C:
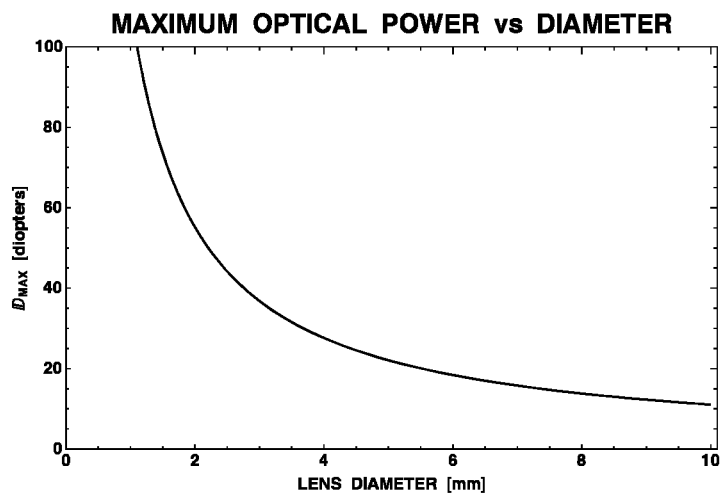

One of the amazing things about this type of lens is that it provides a fluid lens with the optical power of a solid lens. This is seen in FIG. 59C, where we can see that a full order of magnitude more optical power is provided than prior fluidic lenses. Also, there is flexibility in designs because refractive index can be traded off for volume fraction.

Please note that especially for the smaller diameter performance projections in FIG. 59C that the thin lens approximation and the requirement of Eq. 724 become progressively more difficult to justify and there is a need for a more robust model. Nonetheless, qualitatively the result is correct: more optical power is provided in a fluid lens than is typical of other fluid lenses because the high refractive index of the nanoparticles is more effective at light focusing than a single optical surface formed by a fluid as has been the case in many prior art fluid lenses.

Spectral & Non-Spectral Light Combiners

The ability to combine laser beams is an enabling technology for telecommunications and high power laser applications. Power combiners come in two general varieties: (1) single wavelength signal and power combiners and (2) multi-wavelength signal and power combiners (also called spectral signal and power combiners).

The advantage of a single wavelength combiner for M-beams is that the electric fields add and the power is proportional $M^2$. The disadvantage of a such a configuration is that the frequency of each beam must be exactly the same and phase-locked. Failure to achieve this will cause destructive cancellation of the laser beam. The cost and complexity of this configuration is therefore often not compatible with cost constraints and physical scaling to ever larger systems.

In contradistinction, a M-beam spectral power combiner has total combined power proportional to M. However, there is no need to keep the beams at the same frequency or phase locked. The only real requirement is that the frequencies are sufficiently far apart and that no beam frequency is a linear combination of other beam frequencies via a diophantine equation $f_i = m_j f_j + m_k f_k$ for integers $\{m_j, m_k\}$ and frequencies $\{f_i, f_j, f_k\}$ where i, j, k∈1, 2, 3, 4, . . . , M to avoid potential nonlinearities from generating overlapping harmonics.

Power and signal combiners can also be used as part of a telecommunications system. The combiner takes all the beam and combines them to a common output that is useful for wavelength division multiplexing of a communications signal.

Figure 60:
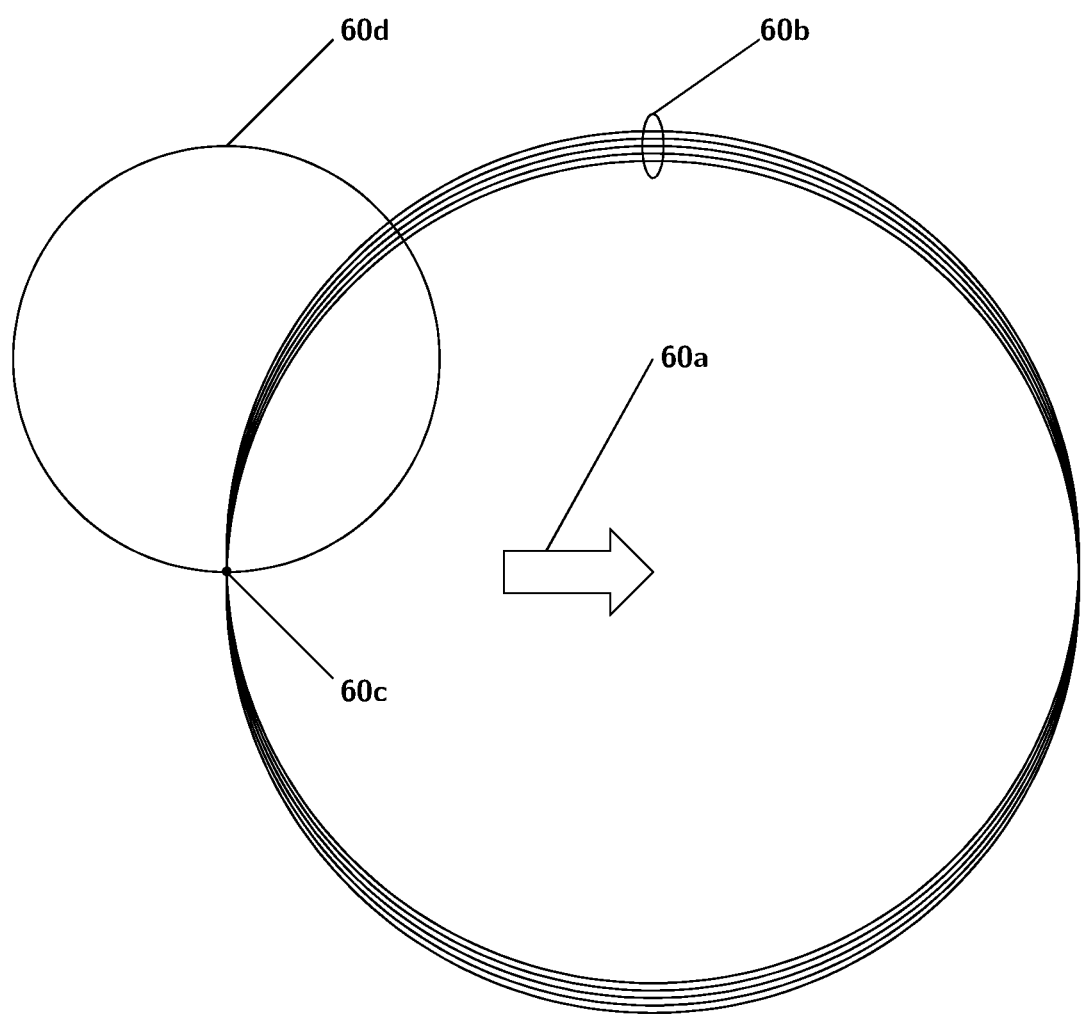
FIG. 60 shows a figure that demonstrates the required refractive index gradient needed to focus light to a single focus point.

Therefore, consider FIG. 60, which geometrically demonstrates that the required refractive index gradient needed to focus light to a single-focus point may be based on an exponential refractive index distribution. In particular, given an exponential refractive index gradient 60a it has already been shown in this disclosure that we can provide a circle that represents an approximation to the ray trajectory through the GRIN medium. In FIG. 60 there is a family of equal radii circles 60b that pass through a focus point 60c. The radii are equal to $1/\alpha$, where $n(x, y, z) = n_0 e^{\alpha x}$ (over a limited range of x), so that we immediately see that the circles are approximate solutions representing Eq. 591. The radome circle 60d represents a lens cover over the containment volume and shows the extent within the circle where the approximation to the actual ray trajectory is extremely good.

Figure 61:
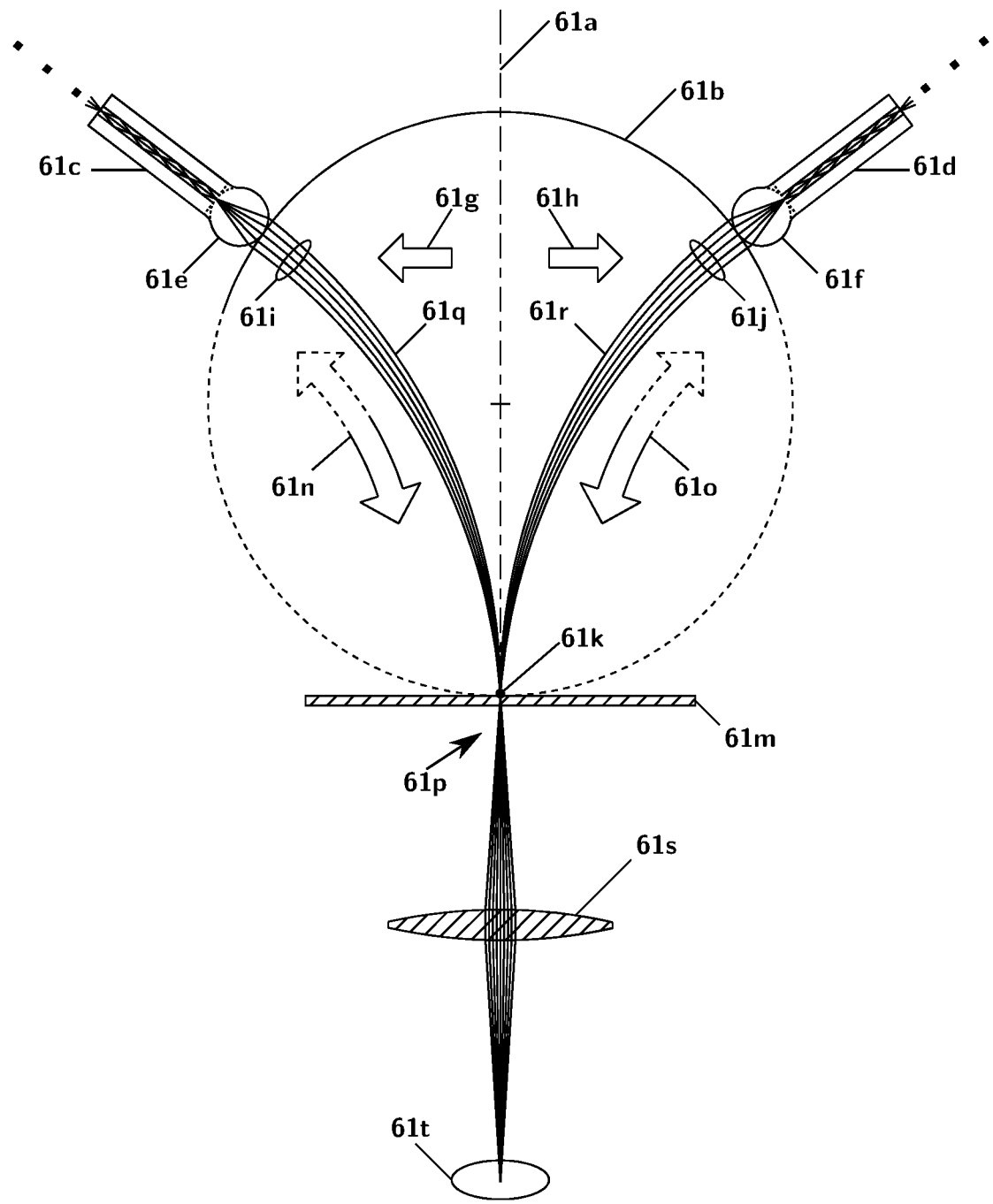
FIG. 61 shows in cross-section a schematic of a beam combiner and focusing system based on graded refractive index distributions.

Based on this insight into focusing light in an exponential GRIN medium we consider FIG. 61, which shows in cross-section a schematic of a beam combiner and focusing system based on graded refractive index distributions. In particular, we consider a cylindrically symmetric system with optical axis 61a. A control volume is schematically shown by control volume circle 61b, which is shown as a solid and dished curve. The solid curve represents an optical surface and the dashed portion represents an arbitrary shaped containment vessel.

Light carrying fiber optic 61c and 61d have output ends symmetrically provided with ball lenses 61e and 61f that provide rays that are on trajectory solution circles, as discussed for FIG. 60, for a GRIN medium. The GRIN medium here is represented schematically by gradient arrows 61g and 61h, which are symmetrically disposed about the optical axis 61a. In three dimensions the gradient arrow is collinear with a cylindrical radius line.

The output of the ball lenses are the ray bundles 61i and 61j, which pass through the GRIN medium to a focal point 61k on the optical axis 61a. An optional mirror 61m is provided having partial reflectivity. When the mirror is present it forms the basis for lasing feedback as light energy is reflected back into the optical fibers along ray bundles 61i and 61j. The direction of propagation is shown by propagation direction arrows 61n and 61o. Note that when the optional mirror 61m is present energy propagates in two directions and this is helpful in applications such as but not limited to interferometry.

Also, it is critical to appreciate that some energy from Light carrying fiber optic 61c is received by Light carrying fiber optic 61d and vice-versa. For example, in a three dimensional geometry with multiple fibers, see for example FIG. 62, every fiber laser receives some of the energy from the other lasers. In this way a single wavelength signal is phase locked between different fiber optics for higher signal output at the beam combiner output 61p. The normal rays 61q and 61r are on the outside of ray bundles 61i and 61j and these normal rays reflect back into the originating fiber lasers and other fibers as well because the system is electromagnetically reciprocal without a preferred laser. Other rays of ray bundles are reflected due to Snell's law of reflection into non-originating fiber lasers.

Thus, with the optional mirror 61m included a single wavelength power combiner is possible. If the optional mirror 61m is not included then each fiber laser may be of a different wavelength and the fiber lasers need not be phased locked. This is called spectral power combining as the different wavelengths of light do not interfere destructively. The beam combiner output 61p is diverging due to the geometry of the trajectories through the GRIN medium so a lens 61s is used to refocus the combined laser beam onto a target 61t. The lens 61s is a DEP-based lens, like that shown in FIG. 56, to provide a variable focus distance.

Figure 62:
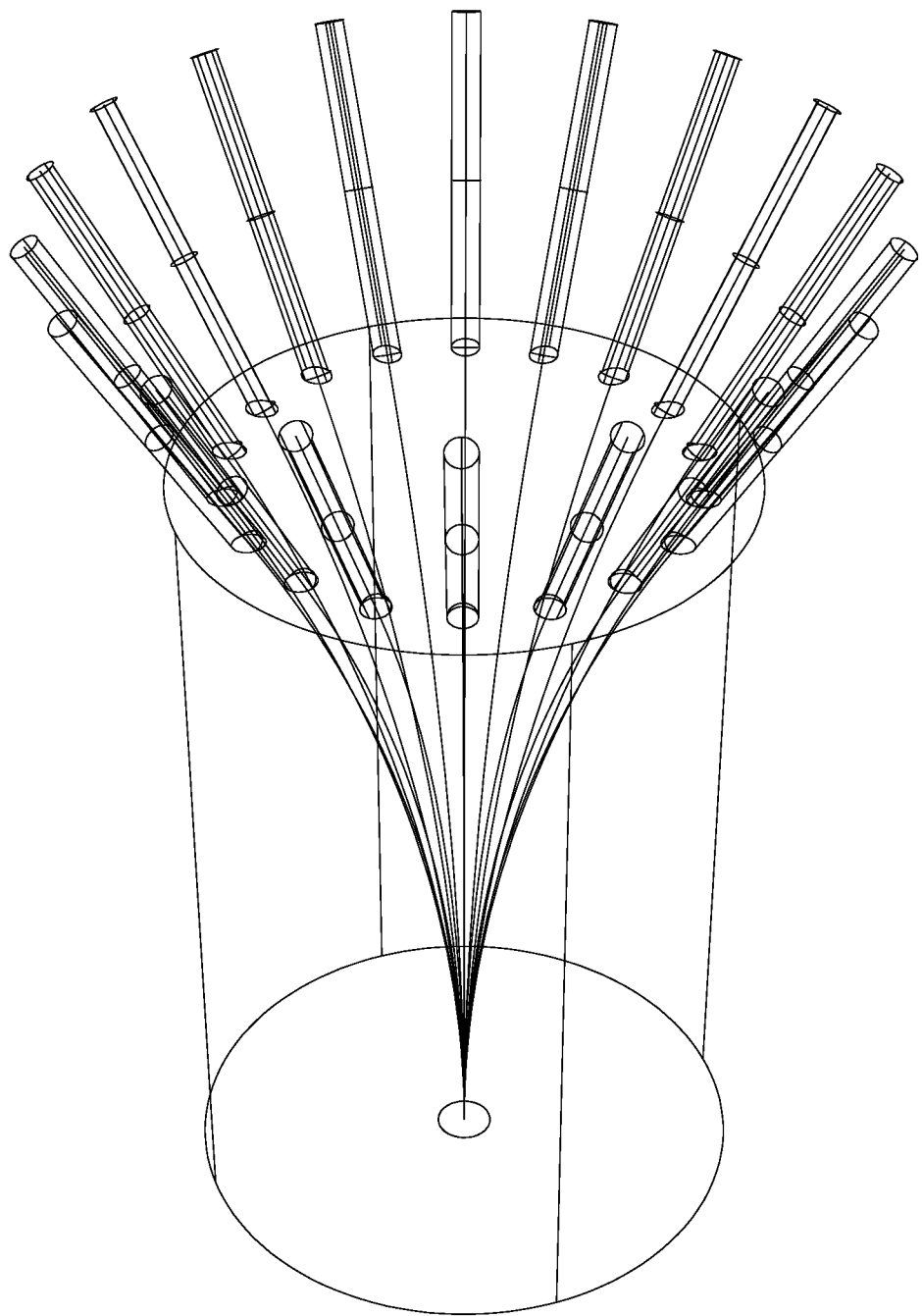
FIG. 62 shows a perspective view of a cylindrically-symmetric dielectrophoresis-based beam-combiner with fiber optic waveguides entering at an angle to the optical axis.

FIG. 62 shows the system of FIG. 61 in three dimensional perspective. Notice that the control volume may be cylindrical even though the control volume in FIG. 61 is circular spherical in three dimensions. Note that it is not necessary that the electrodes surrounding a colloidal medium be present in a final product. In fact, a DEP-based manufacturing process exists to make precision GRIN medium that are solid and do not require the electrodes after a colloidal GRIN medium is hardened during manufacturing. In this way the electrodes are used temporarily.

It is for this reason that FIGS. 61-62 do not show electrodes. A liquid colloid with nanoparticles therein is configured to have the desired refractive index distribution and then the colloid is hardened by chemical curing, heating, and/or photoactive curing. The electrodes used during the manufacturing process for a fixed GRIN device like the beam combiner of FIG. 61 are provided in FIGS. 63 and 64. These electrode configurations may also be used for beam steering instead of the electrode configuration in FIG. 37.

Figure 63:
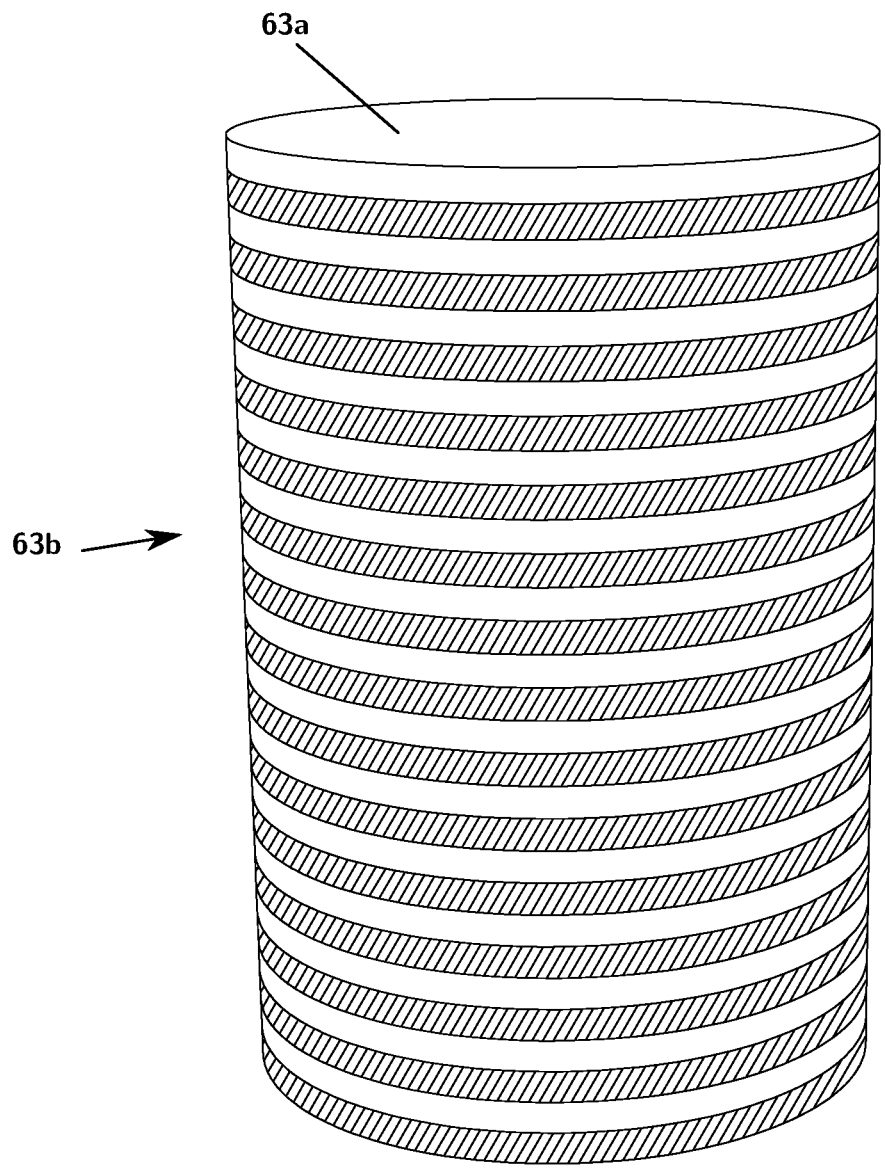
FIG. 63 shows a cylindrically-symmetric dielectrophoresis-based beam-combiner that has an array of circular electrodes surrounding the colloid control volume.

In particular, FIG. 63 shows a cylindrically-symmetric dielectrophoresis-based beam-combiner control volume 63a surrounded by an array of circular electrodes 63b. The electrodes would be energized to form a traveling voltage wave along the length of the control volume. This configuration may have amplitude variations from electrode-to-electrode to allow axial variations in the distribution of the nanoparticles and the resulting refractive index.

Figure 64:
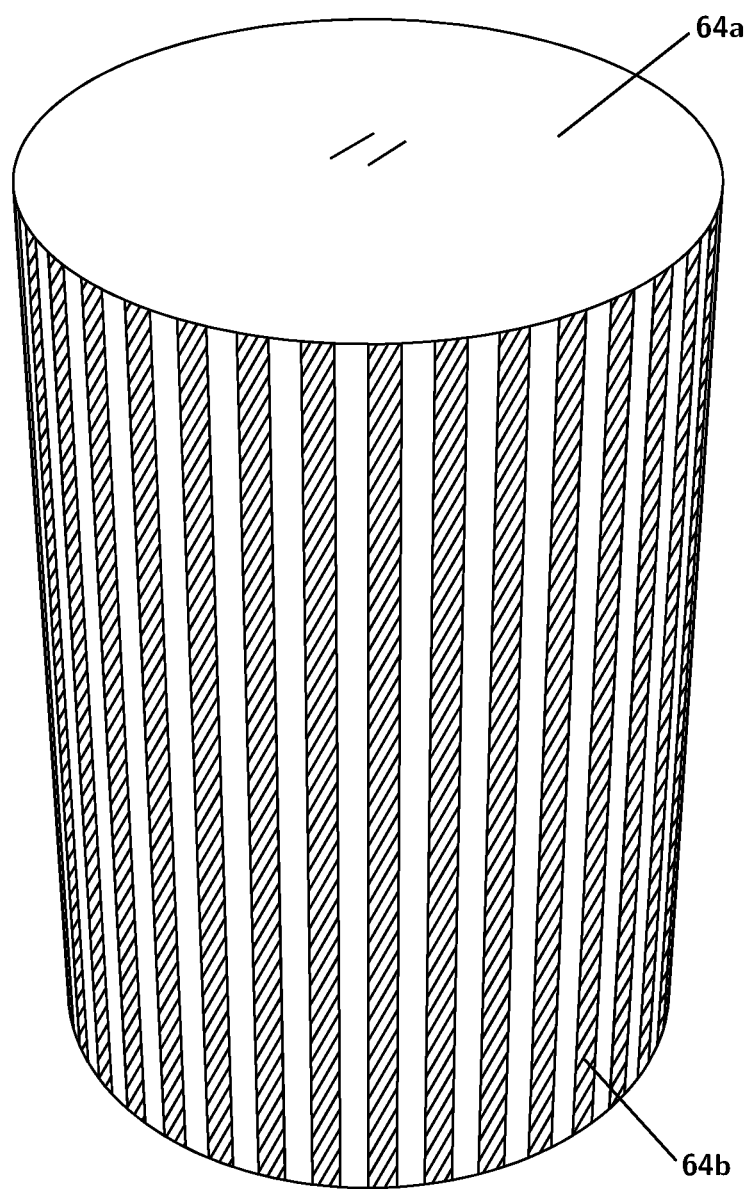
FIG. 64 shows a cylindrically-symmetric dielectrophoresis-based beam-combiner and beam steering device that has an array of axially directed electrodes surrounding the colloid control volume.

Additionally, FIG. 64 shows a cylindrically-symmetric DEP-based beam-combiner control volume 64a surrounded by straight electrodes in a circular array, an example of a linear electrode is 64b. The electrodes are energized to form a traveling voltage wave around the control volume. This configuration may have amplitude variations from electrode-to-electrode to allow polar angle variations in the distribution of the nanoparticles and the resulting refractive index.

Bistable Optical Switches

In what follows we shall examine the properties of a reflectance switch and then show how an optical switch based on DEP is both similar to a reflectance switch and different from a reflectance switch. In particular, we shall see that a DEP-based optical switch can redirect light by a process of refraction through the volume of a GRIN medium that effectively replaces reflection from a surface. Nonetheless, it is quite helpful to first look at the properties of an optical switch that is based on reflection because many of the properties are effectively the same, they just occur over different spatial extents.

Figure 65:
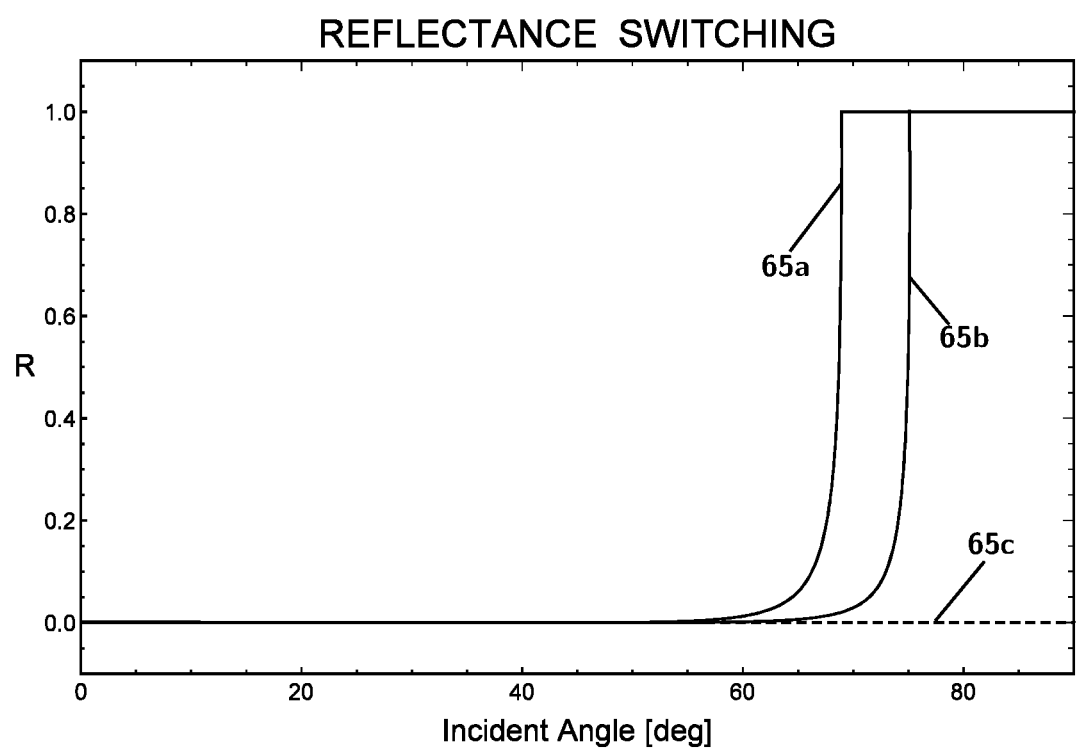
FIG. 65 shows two reflectance states at a transparent solid-colloidal boundary that are accessed by using Dielectrophoresis as a means to effectively switch the reflectance state.

Consider FIG. 65 which shows three example reflectivity plots between two reflectivity states of an assumed optical boundary: transmissive and reflective. These states form the physical basis for an electronic light switch that modulates the depth of penetration of incident light in a first medium into a second medium. The three example plots in FIG. 65 provide a first incident medium comprising a solid transparent material, such as glass or clear acrylic plastic, having a refractive index of $n_1=1.5$. Additionally a second transmission medium, which is in contact with the first medium at a flat boundary, is comprised of a nanoparticle colloidal having solid suspended nanoparticles therein. The distribution of these nanoparticles within the colloid is assumed to be electronically controllable by a DEP processes. As an example we can take the pure liquid to have $n_L=1.40$ and the pure solid nanoparticles to have a refractive index of $n_S=1.55$. Therefore, following Eq. 233, and ignoring secondary phase effects due to nanoparticle size, we can write the refractive index of the second medium as $$n_2(y,t)=n_L+(n_S-n_L)v_S(y,t) \tag{735}$$

where v(y, t) is the electronically modulated volume fraction of the solid nanoparticles as a function of time t and the distance y away from the optical boundary at y=0, where increasing y moves deeper into the colloidal medium away from the solid-colloid boundary. By appropriate choice of electrodes, material conductivities, material dielectric constants of the liquids/solids forming the colloid and a DEP drive frequency ω the ponderomotive forces on the nanoparticles in the vicinity of the boundary between the first and second medium can be made to be: (1) towards the boundary, (2) away from the boundary or (3) a zero force that is neither towards or away form the boundary.

These ponderomotive forces have a magnitude and direction that are due to the magnitude and sign of the real and/or imaginary parts of the Clausius-Mossotti factor—i.e. $K_R$ and $K_I$ respectively. The specific electrode configuration used and the phasing of harmonic voltage signals between the electrodes dictates if the ponderomotive forces on nanoparticles is related to $K_R$, $K_I$ or both $K_R$ and $K_I$. See for example, Eqs. 131-129, Eq. 231, the listed expressions for the relative mobilities $\{\gamma_1, \gamma_2\}$ and FIG. 4.

Continuing the example associated with FIG. 65, we will find that the average refractive index of the colloidal second medium can be electronically switched between the extreme values of $n_2=1.4$ and $n_2=1.5$ based on the volume fraction of the nanoparticles at the boundary. Note that the colloidal second medium cannot typically reach $n_2=1.55$ because there is a maximum volume fraction of about $v_S=\frac{2}{3}$ as provided in Eq. 488. That is at the solid-colloid boundary we can provide a range of refractive indices such as $$n_2(\text{max})=1.40+(1.55-1.40)(\tfrac{2}{3})=1.50 \tag{736}$$

$$n_2(\text{avg})=1.40+(1.55-1.40)(\tfrac{1}{3})=1.45 \tag{737}$$

$$n_2(\text{min})=1.40+(1.55-1.40)(0)=1.40. \tag{738}$$

These three example refractive index values correspond to: (1) a DEP process piling up nanoparticles at the boundary so that a maximum volume fraction of about $v_S=\frac{2}{3}$ is achieved, (2) a relaxed state where the Clausius-Mossotti factor is zero and particles diffuse into an unforced homogeneous distribution in the colloid where the volume fraction of nanoparticles is about $v_S=\frac{1}{3}$ and (3) a DEP process pushing nanoparticles away from the boundary so that approximately $v_S=0$.

These three refractive index cases are shown in FIG. 65 as the Fresnel reflectance at the boundary between a solid having a first medium refractive index of $n_1=1.50$ and a colloidal medium that switches between the three refractive indices of 1.50, 1.45 and 1.40. The high refractive index (1.5) reflectance 65a is contrasted to the medium refractive index (1.45) reflectance 65b and the low refractive index (1.40) reflectance 65c. It is clear that for large incident angles, i.e. relative to the local normal at the optical boundary, that there is a sharp transition and two distinct states corresponding to: (1) TIR and reflected light and (2) passage of light through the boundary. The transition to these states occurs over a range of angles that depends on the value of $n_2$. Also note that for all practical purposes both s-polarization and p-polarization of the incident light have approximately the same graph as shown in FIG. 65 because $n_1$ and $n_2$ are close in numeric value.

Next, we relax the initial assumption of a flat optical boundary surface between the solid first medium and a colloidal second medium and consider in detail how the DEP-based optical switch is actually based on refraction and not reflection. This assumption is even less appropriate in a situation where there are two regions of a colloid having nanoparticles. At issue is the diffusive process that occurs on the nanoparticles in the liquid that creates a GRIN volume medium instead of a well defined optical boundary.

Figure 66:
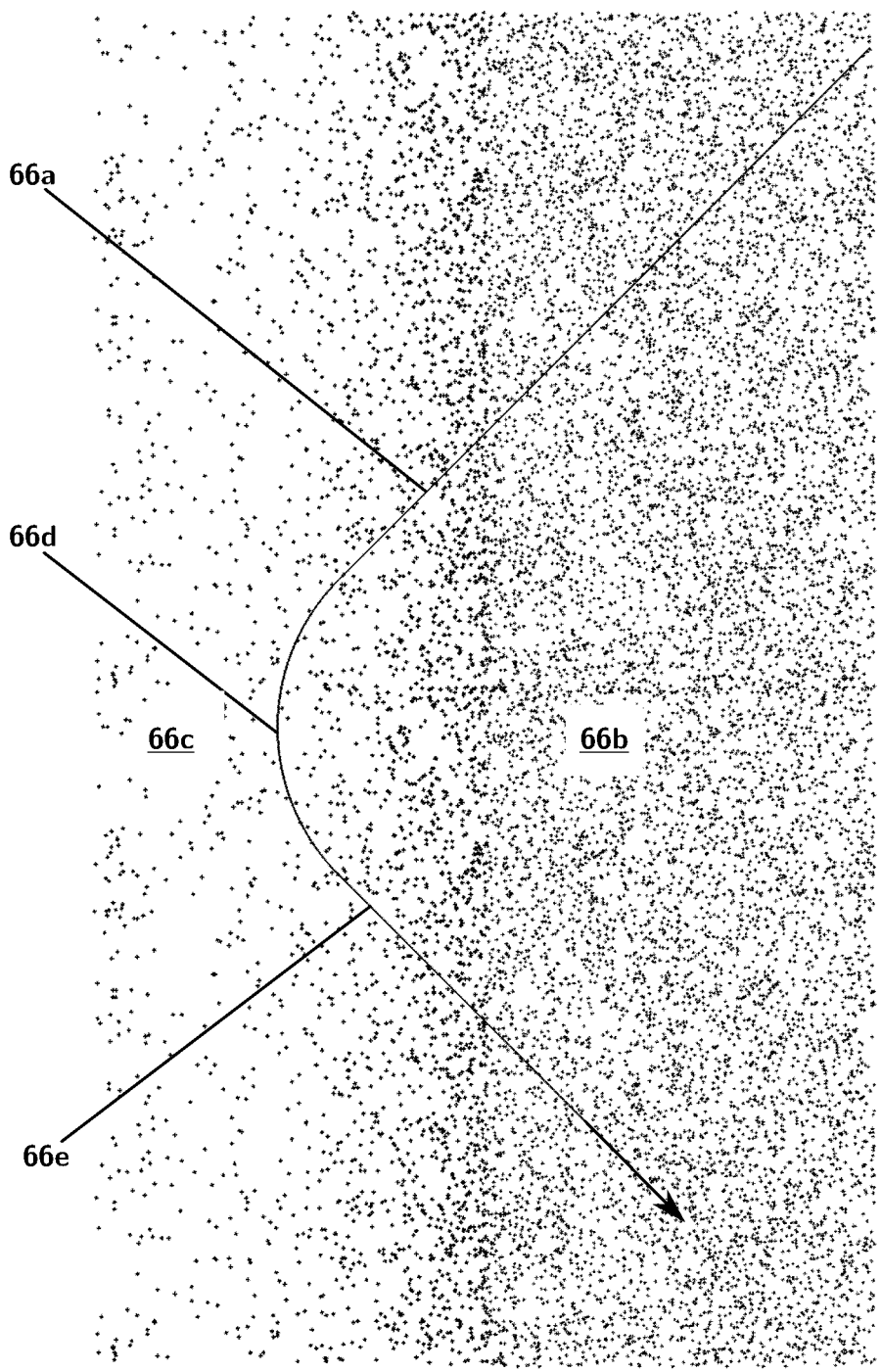
In FIG. 66 shown how this is actually based on refraction instead of reflection as the underlying physical phenomena.

To see how this works out consider FIG. 66 where an input ray 66a is propagating in a uniform high concentration region 66b for nanoparticles that decreases in concentration spatially in the general direction of propagation toward a low concentration region 66c. The input ray then begins to curve towards the direction of the refractive index gradient to satisfy Eq. 66 and we see a curved trajectory ray segment 66d. Ultimately, the ray is again propagating in the uniform high concentration region 66b for nanoparticles and we see the straight trajectory of the output ray 66e. This may be thought of as conservation of linear optical momentum across an infinite number of mathematical surface as the refractive index slowly changes from a high refractive index to a low refractive index.

While we will often continue to talk about this effectively as a "TIR" reflection as a short-hand way to describe this volume refraction process the reader is to appreciate that the process is as has just been described. For the avoidance of doubt, the distinction here is between conventional-TIR from an optical surface compared to a refraction from a GRIN volume region is important because many prior-art display patents, including those for VR, AR, and MR systems have explicitly focused on systems that reflect and/or defract either actively via opto-electronics or passively. Consequently, companies like MagicLeap, Microsoft, Oculus, and Google, which are developing virtual and/or augmented reality glasses generally neither teach or anticipate the possibility of optical elements that are based on a different set of physical principles as have been described herein.

To help the reader a new abbreviation for total internal reflection is adopted herein to help the reader make a distinction: In particular let's adopt the acronyms Total Internal Reflection (TIR) and Total Internal Refraction (TIR2).

As just one specific example, the U.S. Pat. No. 9,804,379 from Magic Leap Inc. and inventors Brian T. Schowengerdt and Mathew D. Watson issued 2017 Oct. 31 shows dozens of disparate alternate embodiments for virtual reality glasses to apparently protect the augmented reality U.S. Pat. No. 9,753,286 and its derivatives. However, the embodiments in U.S. Pat. No. 9,804,379 neither teach or anticipate: (1) volume refraction in a GRIN medium to replace reflecting surfaces by volume refractions, (2) electro-active materials being a mixture of separate materials of different phases like a solid and liquid forming a colloid, (3) that a reflector (or its equivalent) does not have to be a discrete unit, but instead may be self-assembled on demand by an electric signal and (4) how to achieve about 120 degrees field of view for a human observer.

On GRIN Lens Fabrication Using DEP Electrodes

It is often desired to have a Graded Refractive Index (GRIN) lens that is permanent and solid instead of dynamic and a colloid. However, up to this point in this disclosure the material has been focused on dynamic systems. Therefore, in this section we focus on the manufacturing of passive structures, including precision GRIN lenses using electrodes that provide the GRIN in a colloid, which is then cured by at least one of passive drying, heat, photochemical curing.

One method to achieve this is by using a mixture that comprises a colloid or suspension that has liquid phase chemical components that are at least one of thermally cured, chemically cured and photochemically cured. This means that an initially liquid medium, having solid particles therein, is made solid by the application of a drying heat, light that induces a chemical hardening, or by the inclusion of a chemical hardening agent. Any particles in the initial suspension or colloid would be trapped in the resulting hardened material. So that in the case of a transparent colloid or suspension the resulting hardened structure is also transparent and has a GRIN distribution.

However, before the colloid or suspension is hardened by curing it can be manipulated by non-uniform and osculating electromagnetic fields. The electromagnetic field is sourced by electrodes.

This opens up many unique and advantageous possibilities for manufacturing. Because DEP can work on any type of particle it is quite possible to use manufactured three dimensional (3D) structures that have may different types of materials therein.

Broadband and Broad-Angle Anti-Reflection Coatings

Ultra broadband and broad angle Anti-Reflection Coatings are of critical importance in many applications. For example, in solar energy applications, where the solar energy has a wavelength from about 390 nm to 1,800 nm and may be incident from a wide range of directions.

To accommodate such broadband multi-directional light we can turn to nature. In particular, investigations on insect eye efficiency in the 1967 proved interesting because electron microscope images showed that nano-scale bumps and inclusions on the eyes of butterflies and moths increased the efficiency of light transmission into the eyes of these insects substantially near perfect 0% reflectance. The physics that nature exploited was to provide a very gradual change in the refractive index between two optical media. The more gradual the change the better the broadband control of reflected light. See for example the article "*Light Conversions*," by American Scientist, Vol. 107, p-140, May-June 2019.

By using a DEP process it is possible to create a GRIN region between two homogenous media that is very gradual in changing its effective refractive index value so that reflection is minimized. For example, when using a liquid of refractive index 1.48 and glass nanoparticles of say 1.95 then it is possible to slowly transition between intermediate values of refractive index. For example, from a refractive index of 1.60 to 1.75, by varying the solid nanoparticle volume fraction from about 15% to 36%. This transition can be made permanent by using a curable colloid. This can provide a means for extremely broadband antireflection coatings that are between optical elements. However, to extend broadband anti-reflection coatings to an interface between air and an optical medium, e.g. glass or acrylic, something more needs to be done.

In particular, if we consider the solid nanoparticles to now be structured solid nanoparticles having a void therein then the average refractive index of the structured nanoparticle is substantially lower than if it were solid. The void being contained by a thin shell of solid material that makes up a solid structured particle. If the shell has substantially the same refractive index as the liquid (which is not a requirement) then it is as if there is a controllable void that can be positioned in space by the ponderomotive forces of a DEP process. A plurality of such voids may be given a spatial distribution by suitable electric fields. The volume fraction of the voids can then range from nearly 0% to 100% when a plurality of void diameters are deployed—see FIG. 67. In this way the average refractive index will range between near 1 and an intermediate value between $n_L$.

However, for the case of an antireflection region the basic strategy is to use structured particles (micro and nano particles) with voids therein to create a gradual change in the refractive index over a large optical distance, typically from hundreds of nanometers to tens of microns, by DEP forces. This is many wavelengths of the usable radiation, but still small by human scale. Then, if desired, the voids having a specific spatial distribution are locked into place via a curing process of the liquid host medium and afterward the electromagnetic fields are permanently removed to complete the manufacturing. With a refractive index of near 1 close to the surface and a refractive index matched to the inner optical medium away form the surface the light will have a minimum of reflectance over a broad range of wavelengths and angles.

Figure 67:
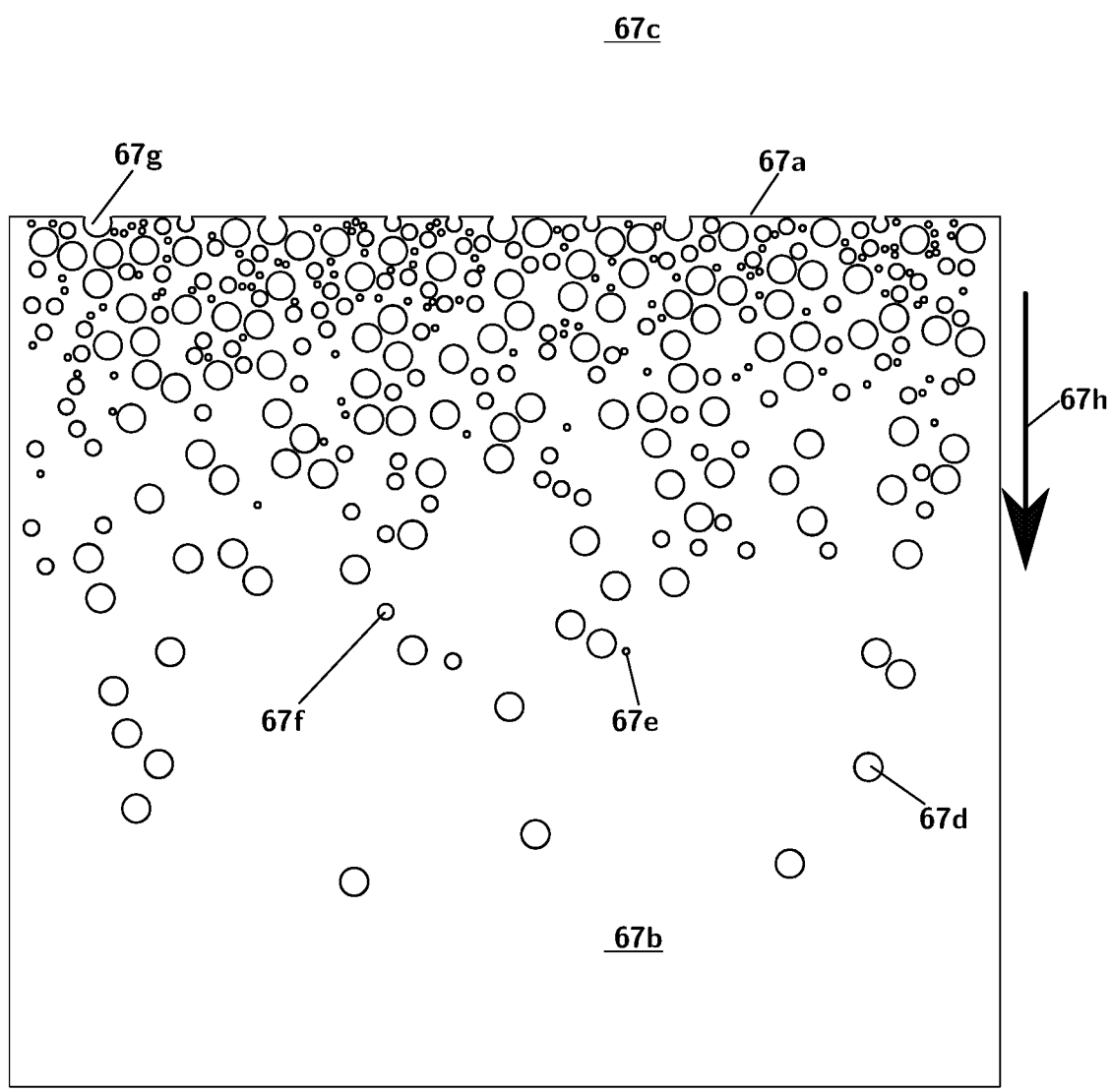
FIG. 67 shows in cross section a broadband wide-angle anti-reflection coating that was manufactured using a dielectrophoresis based approach to distributing structured particles to provide a graded refractive index from near 1 to the refractive index of the homogeneous interior.

FIG. 67 shows in cross section a broadband wide-angle anti-reflection coating that was manufactured using a dielectrophoresis based approach to distributing structured particles with voids to provide a graded refractive index from near 1 at an input surface 67*a* to the homogeneous interior refractive index 67*b*. This matches the refractive index of the air 67*c* to the interior of the transparent medium. In particular, an anti-reflection coating or region is provided that consists of structured nanoparticles having a thin solid shell and an interior void. Examples of such structured nanoparticles include 67d, 67e, and 67f. The input surface 67a may have bumps and inclusions such as inclusion 67g. Thus, as the light is input onto the input surface 67a from the air 67c the refractive index gradient 67h moves from a region of low to high refractive index to minimize energy lost by reflection.

Thus, by using both solid particles and particles with voids a very great range of refractive indices may be obtained. On interesting example of natural thin shelled structured nanoparticles are fullerenes, such as C60 and C200, which can be transparent.

Finally, other approaches may also be deployed. For example, the solid nanoparticles can be made of a material that may be selectively etched away by chemical, photochemical, or other means to create a sponge-like material with varying degrees of porosity. So, in this second approach a plurality of solid particles, of potentially different diameters, are selectively distributed throughout a curable liquid to optimize the pore locations after an etch.

Displays by Dielectrophoresis

Display Pixels Based on Total Internal Refraction

Total Internal Reflection and Total Internal Refraction are different phenomena. Before describing the DEP-based display technology we first consider the difference.

Total Internal Reflection (TIR) is the well-known process that occurs when light traveling in a medium of high refractive index is reflected completely from a surface at the boundary to a lower refractive index back into the region of higher refractive index. The redirection of light obey's Snell's law of reflection and the critical angle from the normal to the surface is $\theta_H = \sin^{-1}[(n_L/n_H)]$, where $n_L$ is the lower refractive index, $n_H$ is the higher refractive index, $O_H$ is the reflection angle in the medium of higher refractive index as measured from the surface normal direction.

In contradistinction, Total Internal Refraction (TIR2) occurs when light traveling in a medium of high refractive index is refracted along a continuous trajectory from the region of higher refractive index back into the region of lower refractive index. The redirection of light obey's Snell's law of refraction as applied along infinitesimally small portions of the trajectory.

Generally, if the same input ray was a used starting from a medium of homogeneous refractive index and the outputs compared between Total Internal Reflection and Total Internal Refraction we would note different internal processes and outcomes. The reflected ray trajectory for Total Internal Reflection is: (1) piecewise continuous, (2) not smooth and differentiable. The refracted ray trajectory for Total Internal Refraction is: (1) continuous, (2) smooth and differentiable through a volume of space. Moreover, the output rays for both process would be spatially displaced, however the directions of the rays would eventually be the same direction and parallel because of the principle of conservation of linear photon momentum.

So for the purpose of this disclosure we often talk about Total Internal Reflection with the common acronym of (TIR). However, based on the context of the discussion the phenomenon of Total Internal Refraction (TIR2) may be more appropriate to use and it will be clear from the context of the discussion what applies. That is to say the directions of the output rays from Total Internal Reflection and Total Internal Refraction are the same even though the rays may be displaced relative to each other. In many applications the displacement is not critical from a physical point-of-view and we can think of the refractive process as a distributed form of a reflected process. However, within the present context Total Internal Reflection and Total Internal Refraction are different physical processes.

In this section the one notable advantage of Total Internal Refraction compared to Total Internal Reflection is that the ray trajectory can pass through a medium optimized for a scattering process that can redirect light out of a pixel region towards a human's eye. The use of Total Internal Refraction appears to be new and not taught or anticipated by the prior art in the context of display technology.

Therefore, we now consider electrode configurations optimized for total internal refraction and for asserting ponderomotive forces on nanoparticles so that a dynamic pixel can be formed. In particular, given a traveling wave on an electrode array that is on one side of an µFCC such that the electric field intensity is $$E = E_0(i\hat{x}+\hat{y})f(t)e^{-\kappa_x - \kappa_y y'} \tag{739}$$

where $f(t)$ is a switching pulse in time then we can show that Eq. 231 at a single spectral line reduces to $$\frac{\partial u(y,t)}{\partial t} = D \frac{\partial^2 u(y,t)}{\partial y^2} + 4\gamma \gamma_1 E_0^2 k_y \frac{\partial}{\partial y}[u(y,t)e^{-2k_y y}] f(t) \tag{740}$$

which is subject to an initial condition $$u(y,0) = u_0, \tag{741}$$

where $u_0$ is a constant homogenous nanoparticle concentration. Also, boundary conditions that stop nanoparticle diffusion flow at the boundaries of a µFCC at y=0 and y=$L_y$ are $$\frac{\partial u(0,t)}{\partial y} = 0 \tag{742}$$

$$\frac{\partial u(L_y,t)}{\partial y} = 0, \tag{743}$$

and a conserved number of nanoparticles in a hermetically sealed environment require that $$\int_0^{L_y} u(y,t) dy = \text{Constant}. \tag{744}$$

Eqs. 739-744 are difficult to solve analytically, however it is easy to see that we can turn the second term on the right in Eq. 740 OFF or ON on demand, which is to be done electronically. When $f(t)=0$ we are left with an unforced diffusion equation. When $f(t)=1$ we have a forced diffusion equation and the forcing function is proportional to $\gamma_1$, which is in turn proportional to the real part of the Clausius-Mossotti factor $K_R$. Recall that $K_R$ can take on both positive and negative values depending on the dielectric constants, conductivities and the electrode excitation frequency $\omega$.

This further leads to three types of electrode configurations: pDEP only, nDEP only and hybrid nDEP-pDEP. Thus, depending on the specific graph of the Clausius-Mossotti factor over frequency we can choose to use one or two arrays of electrodes. One array on one side of the two primary sides of a µFCC and the other array on the other side of the µFCC. The two configurations may differ in cost or switching speed performance and any design may give preference to one or the other configuration for a specific application.

Therefore, in the discussion that follows it is often the case that one of the electrode arrays shown in the specification is "optional," or that if only one electrode array is shown that it is to be understood that two electrode arrays may be substituted. For example, when there are two adjacent arrays then changing the direction of the diffusion of nanoparticles in the μFCC may be based on turning on one array and turning off the other array or alternately using complimentary pDEP and nDEP process on opposite arrays. However, when there is only one array then changing the direction of the diffusion of nanoparticles in the μFCC must be based on switching between different values of ω, which are called $\omega_p$ and $\omega_n$ for pDEP and nDEP processes respectively. Additionally, zero forces on the nanoparticles at certain frequencies $\omega_z$ is possible in zDEP processes.

Figure 68A:
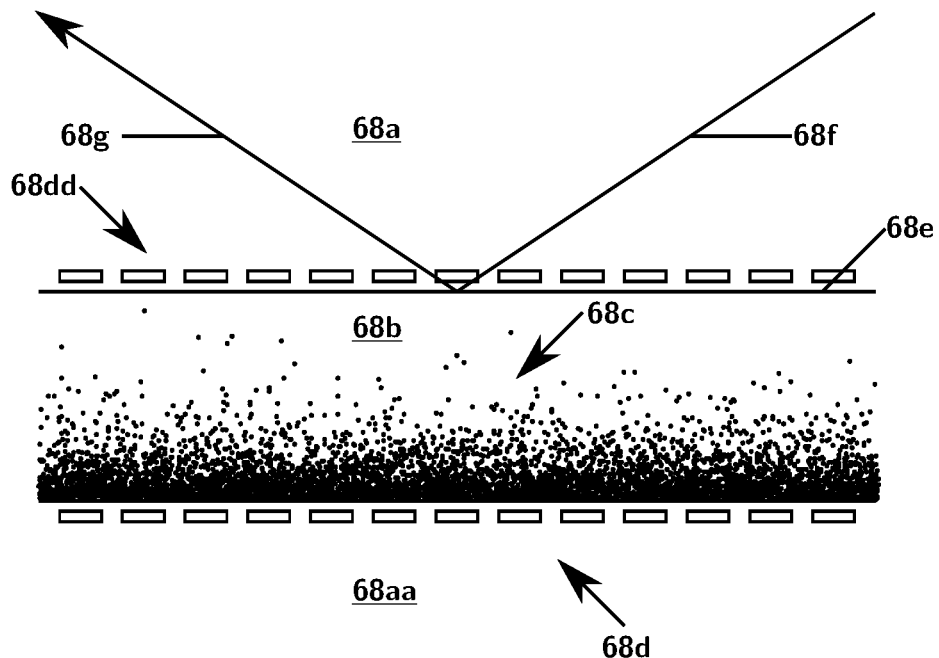
FIG. 68A shows a reflectance switch in the OFF state wherein light in a first medium is not allowed to penetrate into a second medium and is totally internally reflected.

Consider FIG. 68A where we see a first medium 68a and last medium 68aa both having a refractive index $n_1$ and a colloidal medium 68b comprising a colloid with a liquid having refractive index $n_L$ and solid nanoparticles 68c having refractive index $n_S$ at volume fraction $v_S$. The colloidal liquid is trapped in a region that is between solid transparent materials to form a microFluidic Control Channel (μFCC). The colloidal medium has its spatial distribution of nanoparticles controlled by a first array of electrodes 68d and a second array of electrodes 68dd.

These electrode arrays are similar to that shown in FIG. 7A and the driving transparent electronics are therefore suppressed in FIG. 68A to reduce clutter in the figure. If suitable voltages are applied to the electrodes then the nanoparticles are forced towards the first array of electrodes 68d and the nanoparticle density exponentially decays as one moves away from the first array of electrodes 68d towards the optical boundary 68e. This is a DEP process at a specific electrode drive frequency ω. The incident ray 68f passes through transparent electronics and reflects off of the optical boundary 68e by TIR to form output ray 68g. An example graph of the corresponding Clausius-Mossotti factor $K_R$ is shown as the dashed curve in FIG. 4C for a pDEP process. Also note that during this process of compelling nanoparticles towards the first array of electrodes 68d the second array of electrodes 68dd is in an off state that is achieved by setting the voltage amplitude to zero on the second electrode array or by switching to an electrode excitation frequency where the ponderomotive forces are near zero. Alternatively, we can switch one of the electrode arrays to pDEP and the other to nDEP so that an nanoparticle is pushed and pulled simultaneously into the same direction simply by judicious choice of electrode drive frequencies.

Figure 68B:
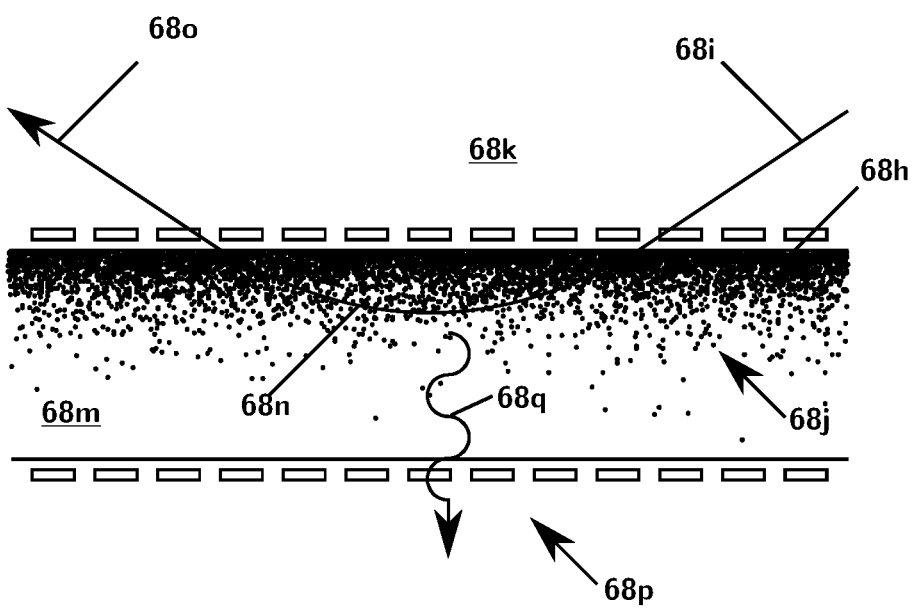
FIG. 68B shows a reflectance switch in the ON state wherein light in a first medium is allowed to penetrate into a second medium partially.

By changing the active electrodes to the second array of electrodes 68dd and deactivating the first array of electrodes 68d the nanoparticles are swept to the opposite side of the μFCC, as show in FIG. 68B, to form an exponentially decaying distribution of nanoparticles that decreases as one moves away from the optical boundary 68h. Consequently as an incident ray 68i strikes the optical boundary 68h there is no longer a TIR process and the light penetrates into the colloidal medium. The exponentially decaying nanoparticle distribution 68j now forms a GRIN medium. Note that by the principle of conservation of linear photon momentum in the vicinity of the optical boundary 68h we would expect that a TIR process occurs, but only after the light penetrates into the colloidal medium 68m via a TIR2 process.

With this in mind consider light that has transitioned from a first medium 68k into a colloidal medium 68m at the optical boundary 68h so that Eq. 328 applies. More specifically, if the nanoparticles are lossless dielectrics then Δε=0. The result is shown as curved scattering ray 68n. Ultimately the scattering ray emerges as a linearly propagating output ray 68o. The radius of curvature of the ray is controlled by the voltage amplitude on the electrode array 68p.

The light in the curved scattering ray 68n can be scattered by dielectric nanoparticles, semiconductor nanoparticles, metallic nanoparticles and hybrid nanoparticle structures that may include spherical dielectrics covered with metal shells, e.g. gold or silver, as well as structured nanoparticles that have various kinds of periodicity introduced, an example of which are photonic crystals. It is even possible to have micro- and nano-particles that are biological in origin such as blood cells and viruses. Each class of particles can interact with light differently to produce a desired color and spectral response and avoid the restrictions of etendue conservation (resulting in TIR) by means of light interacting with atomic processes. An example of the scattered light is shown as scattered light 68q, which may include fluorescing processes.

As another example consider a solid having a first medium of $n_1$=1.50 and a colloidal medium $n_2$ that can take on a range of refractive index values, such as 1.55, 1.50 and 1.45. This can be accomplished with a colloidal liquid having $n_L$=1.45 and solid nanoparticles with $n_S$=1.60. If the volume fraction $v_S$ of the solid nanoparticles in the colloid can take on values {⅔, ⅓, 0} then we find that $$n_2(\max)=1.45+(1.60-1.45)(\tfrac{2}{3})=1.55 \tag{745}$$

and $$n_2(\text{avg})=1.45+(1.60-1.45)(\tfrac{1}{3})=1.50 \tag{746}$$

and $$n_2(\min)=1.45+(1.60-1.45)(0)=1.45 \tag{747}$$

and the average homogenized refractive index is 1.50 as shown.

Figure 69A:
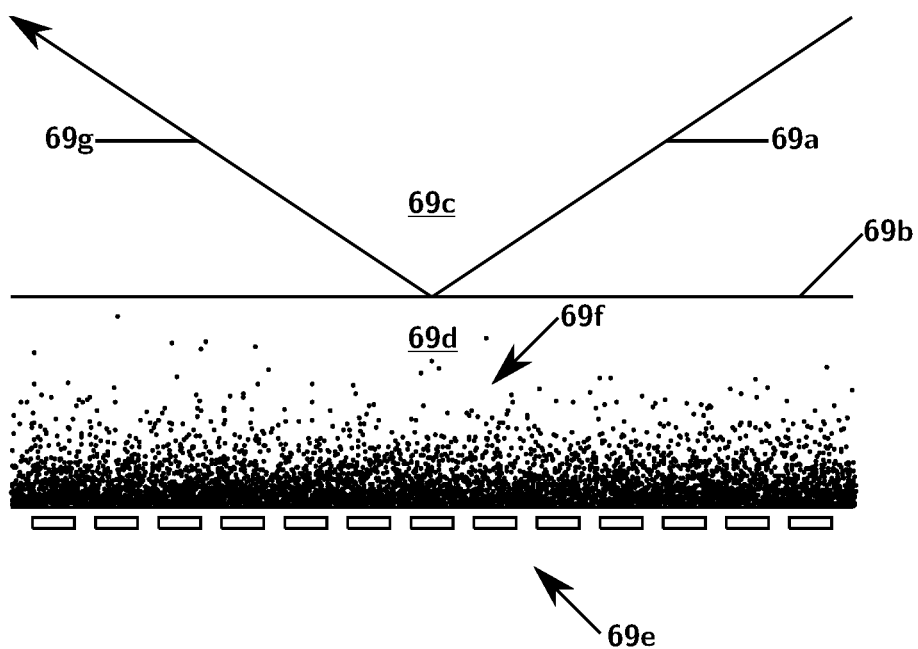
FIG. 69A shows a cross section of a dielectrophoresis-based light switch in its reflection state.

With this in mind consider FIG. 69A where an incident light ray 69a strikes a first optical boundary 69b, this boundary is formed between a first medium 69c having a refractive index of $n_1$=1.50 and a colloidal medium 69d comprising a colloidal liquid having $n_L$=1.45 and solid nanoparticles having $n_S$=1.60. Then in FIG. 69A the electrode array 69e is electrically configured by applying a traveling harmonic voltage wave as has been discussed in regards to FIG. 7A. An active electrode array then forces the colloidal nanoparticles 69f away from the first optical boundary 69b leaving a region near the optical boundary where $v_S$=0 so that immediately beneath the boundary the refractive index is $n_2(\min)$=1.45. This allows the incident light ray 69a to be totally internally reflected in a lossless TIR process. This results in the reflected light ray 69g.

Figure 69B:
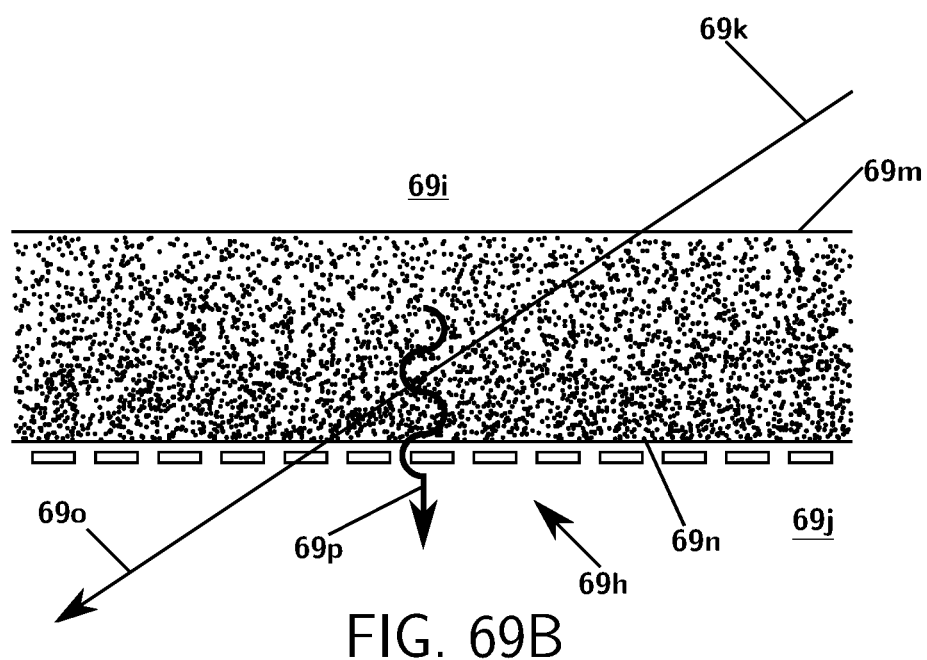
FIG. 69B shows a cross section of a dielectrophoresis-based light switch in its transmission state, which optionally may include photoluminescence and other forms of scattering depending on the types of nanoparticles included in the device's colloid.

Next, in FIG. 69B we consider what happens when the same system has its electrode array 69h deactivated by changing the voltage amplitude to zero or by moving the harmonic electrode drive frequency to a value where the Clausius-Mossotti factor is about zero. Now the first medium 69i has $n_1$=1.50, the (now homogeneous) colloidal medium has $n_2(\text{avg})$=1.50 and the third medium 69j has a refractive index of $n_3$=1.50 by design. Therefore, the incident ray 69k passes through a first optical boundary 69m, the μFCC volume and finally a second optical boundary 69n, which defines the μFCC, and becomes the output ray 69o. As the ray passes through the μFCC it can interact with the nanoparticles therein, which may include quantum dots, plasmonic dots and other scattering types as is discussed below. This will decrease the intensity of the incident ray as the optional scattered light 69p is redirected into other directions. This scattering of light out of the ray will not happen in any appreciable way if the nanoparticles are significantly smaller than the wavelength of light (roughly λ/20) and are composed of lossless dielectrics at the optical frequencies of the light ray. Note that unlike the device in FIG. 68, which needs two electrode arrays, the device in FIG. 69 only needs one electrode array.

Pixel Color By Diffused Quantum & Plasmonic Dots

Next, we consider nanoscale particles that can energy-shift and/or scatter light. Quantum dots (QDs) are semiconductor nano-particles that have a size-dependent emission wavelength, narrow emission peaks and a broad excitation range. The QDs are semiconductor nano-crystals in which excitons are confined in three spatial dimensions to effectively make an artificial atom. The confinement of electrons is obtained by forming a tiny semiconductor in very small size, e.g. several hundred to thousands of atoms per particle. Due to quantum confinement effects these QD artificial atoms show controllable and discrete energy levels. The QDs provide a process of optical excitation, relaxation of an excited state to a lower energy level, recombination of electrons and holes and fluorescent emission at a wavelength that is typically different than the wavelength of the optical excitation. These set of processes taken together are called photoluminescence (PL).

Figure 70A:
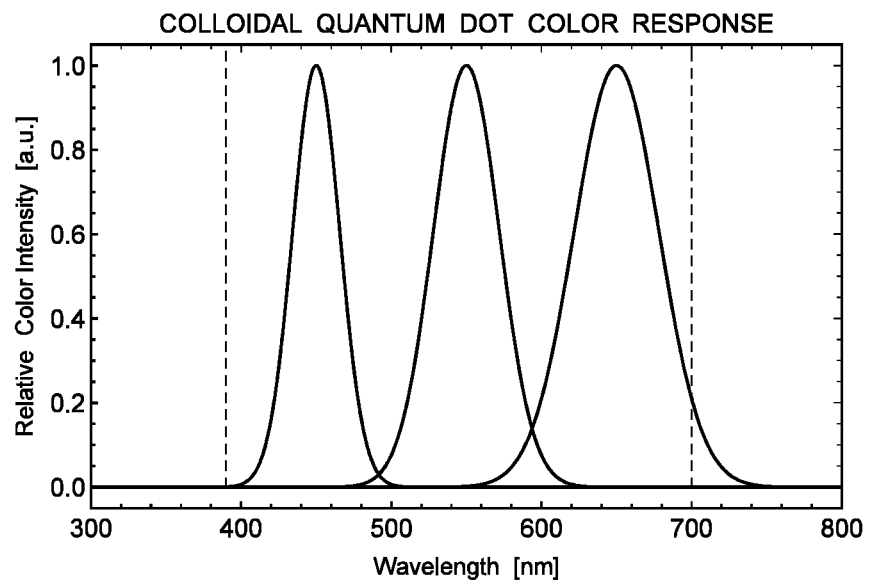
FIG. 70A shows the spectral florescence response from quantum dots having different diameters so that red, green and blue light is emitted.

For example, in FIG. 70A the PL spectrum of three different diameter QDs is shown. The nanospheres formed into quantum dots range in diameter from about 6 nm-2 nm and produce a Red, Green, and Blue (RGB) PL responses when energized by a common pump light source, e.g. a narrow-band ultraviolet backlight in a display. The RGB florescence can be combined in an additive color mode with adjacent RGB pixels to produce a range of different color hues that the human eye can perceive.

Figure 70B:
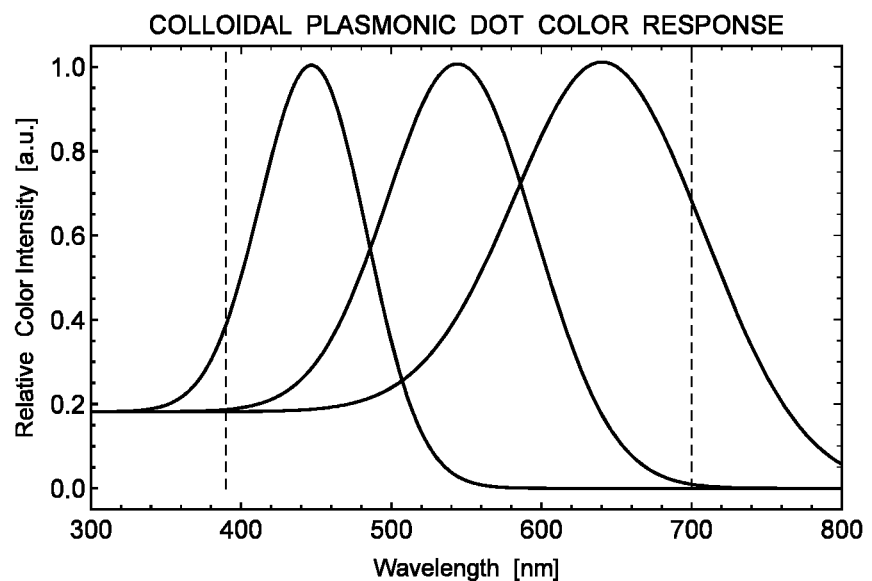
FIG. 70B shows the surface plasmon spectral response from nanoparticles having different metallic shell thicknesses so that red, green and blue light is emitted. In this disclosure these nanoparticles are called plasmonic dots.

Similarly, in FIG. 70B the absorption spectrum of three different Plasmonic Dots (PDs) are provided. The PDs are dielectric, semiconductor or hybrid dielectric-semiconductor nano-crystals that are coated in a metal, e.g. copper, gold or silver, so that an optical wave can excite electrons in the matter as well as having an evanescent wave existence outside of the PD metal coating. Different layer geometries are possible. For example see the article, "*Scalable Electrochromic Nanopixels Using Plasmonics,*" by Peng et al., Science Advances 2019; 5:eaaw2205, 2019 May 10, where both the properties and precision manufacture of multi-layer nano particles is discussed and referenced.

The PDs are based on a surface plasmon spectral response from metal coated nanoparticles. Different metallic shell thicknesses set the resonance color, which can be set to the Cyan, Magenta, and Yellow (CMY) CMY subtractive color model or to the RGB additive color model. When the PDs are illuminated by a broad-band white light source, such as that often found as a backlight in a display system or from the sun, the resonance color will appear. In this way a backlight may be best coupled with an RGB color model and a front light may be best coupled with a CMY color model. Therefore, CMY can be produced for displays that use ambient white light to create a display image based on a subtractive color model and this provides a means for electronic paper.

Additive color systems that start with darkness (i.e. an absorbing black background plane) and that provide a PL response at different wavelengths (e.g. RGB) can combine RGB light in specific proportions to produce a range of colors. In contradistinction, subtractive color systems start with white light (i.e. light that is ambient or from a display's back plane) and has nanoparticles that subtract wavelengths from the incident light in specific proportions can also produce a range of colors. Both additive and subtractive color models are possible in using DEP based displays.

Figure 71:
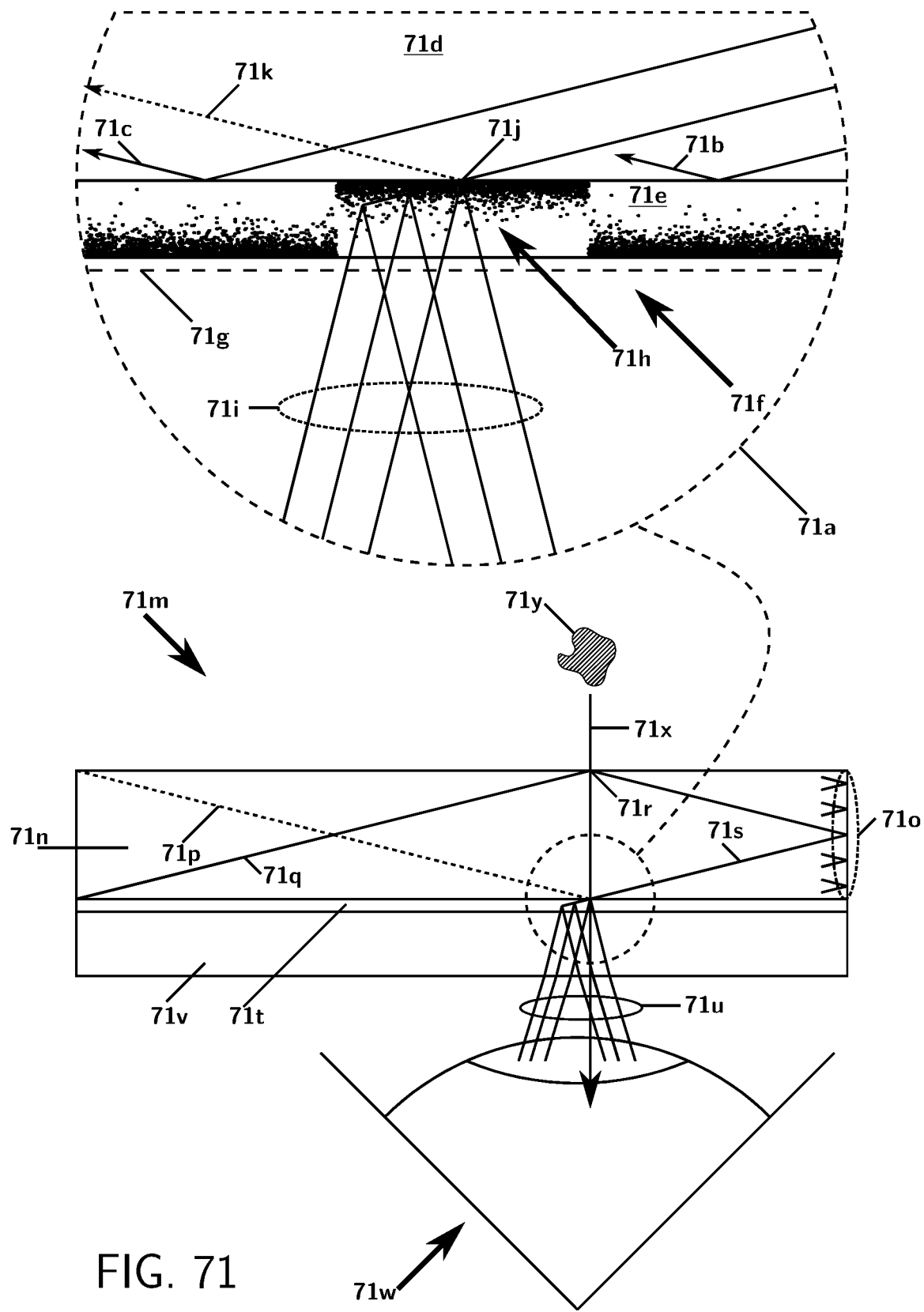
FIG. 71 shows a cross sectional detail of an augmented reality display that is based on reflectance switching via the dielectrophoresis of quantum dots, plasmonic dots and other types of particles.

In particular, in FIG. 71 one embodiment of a digitally controlled display is provided for applications of AR and VR. The same principles can be used for conventional displays as well, which is discussed later in this disclosure. In particular, FIG. 71 shows a magnified cross-section 71*a* of a DEP based display that we will call a QD DEP Display (QDD). An exciting light source, e.g. UV light, is narrow-band guided light, such as 71*b* and 71*c*. These light rays are trapped within a solid waveguide 71*d* (only a portion of which is shown here) by a TIR process. Additionally, within a MicroFluidic Control Channel (μFCC) 71*e* that is in contact with the UV supporting solid waveguide 71*d*. The μFCC contains a colloidal liquid that contains at least one liquid chemical, at least one type of QD, and potentially other types of nanoparticles to assist in optimizing the colloid's properties, e.g. the refractive index distribution and switching speed.

Separate and apart from the μFCC 71*e* there is an array of transparent DEP electrodes 71*f* (shown as the dashed line below the μFCC to represent being in the vicinity of the boundary), comprising individual electrodes such as electrode 71*g*. The transparent electrodes are made from indium tin oxide, carbon nanotubes or other forms of transparent conductors. Note, the electrode drive circuits are not shown here to reduce clutter in the figure, however the array of electrodes is similar in construction and operation to that shown in FIG. 7B. The electrodes may be energized at DEP drive frequency $\omega_p$ to induce pDEP ponderomotive forces on the nanoparticles and move QDs away from the electrodes to ensure that QDs in pixel regions are not fluorescing. However, if it is desired to excite QDs within a Fluorescing Pixel Region 71*h* then the ponderomotive drive frequency can be changed in the vicinity of the pixel. For example, if the DEP drive frequency changes to $\omega_n$ then we have a nDEP process and the QDs in the μFCC that are within the pixel region get moved into contact with the waveguide and are excited into PL—i.e. we toggle the reflectance switch. This is shown as pixel output light 71*i*, which is caused by scattering of waveguide light beginning at point 71*j* instead of TIR into light ray 71*k*.

The external context of the magnified cross-section 71*a* is shown in the zoomed out view 71*m*, where a sheet of transparent material, e.g. clear glass or acrylic plastic, forms the waveguide 71*n* for the (typically but not necessarily) narrow-band guided light. This radiation is edge-launched light 71*o*. Specifically, the TIR confined light is shown as guided rays 71*p* and 71*q*. An example of TIR is provided at TIR point 71*r*.

The waveguide 71*n* is effectively a controllable leaky waveguide. For example edge-launched ray 71*s* can leak into the μFCC 71*t* where it interacts with QDs that PL into output display light 71*u* propagating through a transparent solid 71*v* to a human eye 71*w*. The display light is added to scene light 71*x*, which has as its source a scene object 71*y*. In this way an AR image and display is formed.

Figure 72:
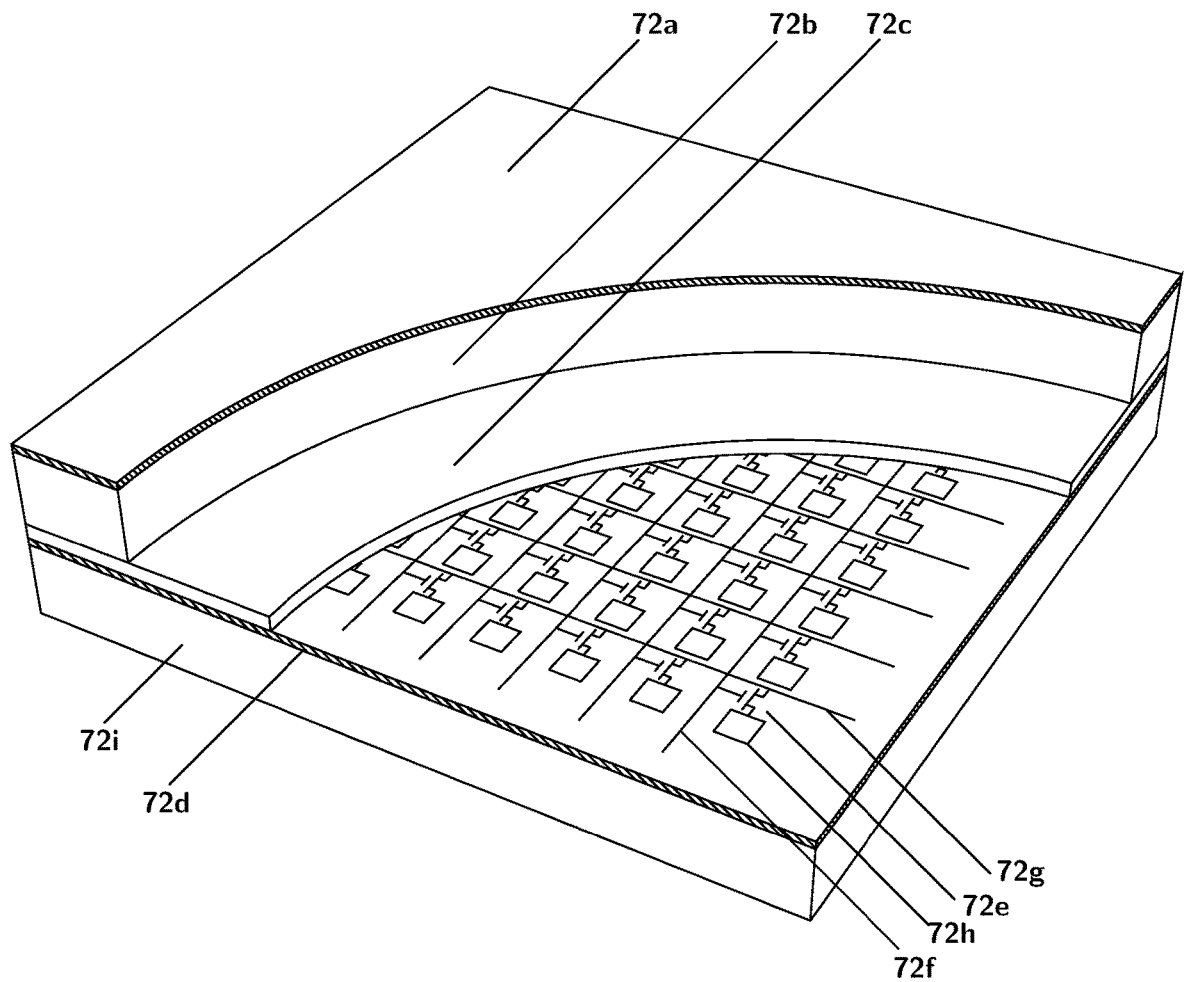
FIG. 72 shows a perspective view and schematic of the optical layers and transparent drive transistors for the display in FIG. 71.

FIG. 72 shows a hybrid perspective view and schematic of the drive electronics for a the display in FIG. 71. An optional light control layer 72*a* comprising an antireflection coating and a strong rejection of UV light (or any wavelength band used for exciting the QDs) that is in the external environmental. This suppression of external UV is provided so that sunlight cannot easily excite the QDs within the system. Its also possible to use QDs that are only excited by wavelengths that are smaller than about 390 nm, which is the lower limit of solar UV light, to avoid unintended QD excitation. This optional light control layer 72a typically has a lower refractive index then the second layer to allow TIR in the second layer.

In particular, the second layer is the transparent waveguide layer 72b, which traps edge-launched light within a high refractive index medium. This waveguide is a controllable leaky waveguide. The control is obtained by a DEP process layer 72c forming a µFCC. This DEP layer comprises a colloid that has a transparent liquid and solid nanoparticles. The nanoparticles may be simple dielectrics, layered dielectrics, quantum dots (for PL response), metal-coated dielectrics (for plasmon resonances), photonic crystals and combinations of these structures. The nanoparticles are often chemically treated to ensure that the colloid is stable and the nanoparticles do not precipitate under gravity or accelerations.

The next layer comprises as many sublayers (not shown) as needed to integrate electrodes and Transparent Thin Film Transistors (TTFTs). The TTFT layer 72d has TTFTs like 72e in the form of an array. On this layer there are transparent electrode-select wires such as 72f. There are also transparent signal wires such as 72g. The signal wires provide the harmonic drive signal at frequency $\omega_p$ or $\omega_n$ for pDEP and nDEP processes respectively. This provides the needed ponderomotive forces on nanoparticles in the DEP process layer 72c. The harmonic signal may be a sine wave or a digitally derived squarewave or other signal with a strong sinusoidal harmonic. Additionally, there are electrodes, such as 72h, that are energized only when their corresponding select wire is energized. The electrodes provide the electric fields that provide the DEP-based ponderomotive forces on nanoparticles.

The transparent waveguide layer 72b in combination with a fluidic containment layer 72i provides the surfaces between which is formed the DEP process layer and µFCC, which is used to contain the colloidal fluid. Note that FIG. 71 is in general not to scale; its subcomponents have been individually and separately scaled to best describe the functionality of the device at a schematic level.

The TTFT layer 72d functions as follows. There are at least three potential harmonic signals types that can be applied to electrodes. These include a pDEP harmonic signal having frequency cc, a nDEP harmonic signal having frequency $\omega_n$, and a zero amplitude signal, which we will call zDEP. These types of DEP are derived from the Clausius-Mossotti Factors, examples of which are provided in FIG. 4. Other types and structures of nanoparticles will have different Clausius-Mossotti factors. Typically, we can just use pDEP and nDEP frequencies as that will allow pushing and pulling of nanoparticles from the electrode plane. The signals that are applied to adjacent electrodes are also phase shifted as has already been described in the disclosure related to FIG. 7. The simplest phase shift being π radians, though other phase shifts are possible. The phase shift allows the electric fields to rotate between electrodes systematically as the field strength decays from the electrode plane. See for example Eq. 362.

For the purpose of this description it is assumed that the relaxation time of nanoparticles from a steady-state spatial distribution to a homogeneous unforced distribution is long compared to the time it takes for nanoparticles to proceed from a homogeneous unforced distribution to a steady state spatial distribution when harmonic signals are present. Said another way, the forced response time is shorter than the unforced response time. The unforced response time may be due to a voltage amplitude of zero during zDEP or it may be due to Clausius-Mossotti factor that is zero at specific electrode drive frequency. We will call this the time division multiplexing assumption (TDMA). It is not a requirement for operation, but it simplifies the problem somewhat and allows a straight forward description of signals used to form an impressed graphic.

The TDMA allows electrodes to be temporarily energized to distribute nanoparticles within the colloid and then shutdown as other parts of the display are updated with new display information. Once an electrode is shut down, e.g. by setting c to the appropriate value to avoid QD interactions, the nanoparticles within its pixel domain will start to relax back to a homogeneous distribution, but long before the steady-state homogeneous distribution is reached all the other sections of the display are also provided an information update signal. In due course an updating signal is reapplied to each electrode again. The process continues over and over as the display images evolves in time.

Figure 73:
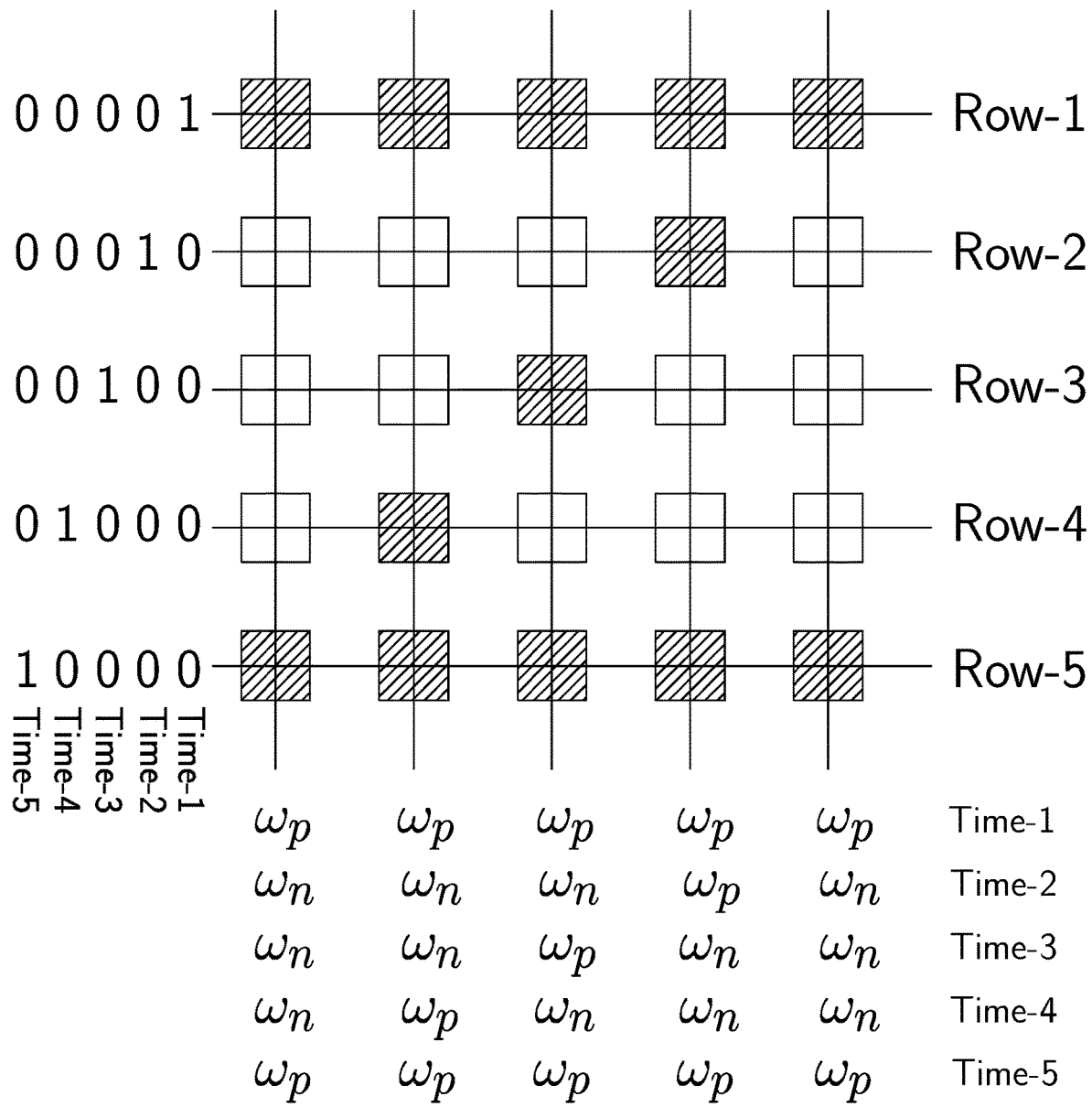

An example of this is shown in FIG. 73 where a 5×5 grid of electrodes is energized in such a way as to form a letter Z. Note that in FIG. 73 the array of TTFTs is not shown but assumed to be present to allow the switching operation to occur.

At Time-1 a signal 10000 is sent to row-select bus lines. This is read vertically from the top of the page to the bottom of the page of FIG. 73 in the time-1 column. Then Row-1 electrodes can be reached by the signal as the pass transistors will pass the data signals. The electrodes are energized by the harmonic signals with frequencies $\{\omega_p, \omega_p, \omega_p, \omega_p, \omega_p\}$, while Row-2, Row-3, Row-4 and Row-5 are not receiving any harmonic signals and their associated nanoparticles are slowly relaxing back to a homogeneous distribution state.

At Time-2 a signal 01000 is sent to row-select bus lines and Row-2 electrodes are energized by the harmonic signals with frequencies $\{\omega_n, \omega_n, \omega_n, \omega_p, \omega_n\}$, while Row-1, Row-3, Row-4 and Row-5 are not receiving any harmonic signals and their associated nanoparticles are slowly relaxing back to a homogeneous distribution state.

At Time-3 a signal 00100 is sent to row-select bus lines and Row-3 electrodes are energized by the harmonic signals with frequencies $\{\omega_n, \omega_n, \omega_p, \omega_n, \omega_n\}$, while Row-1, Row-2, Row-4 and Row-5 are not receiving any harmonic signals and their associated nanoparticles are slowly relaxing back to a homogeneous distribution state.

At Time-4 a signal 00010 is sent to row-select bus lines and Row-4 electrodes are energized by the harmonic signals with frequencies $\{\omega_n, \omega_p, \omega_n, \omega_n, \omega_n\}$, while Row-1, Row-2, Row-3 and Row-5 are not receiving any harmonic signals and their associated nanoparticles are slowly relaxing back to a homogeneous distribution state.

At Time-5 a signal 00001 is sent to row-select bus lines and Row-5 electrodes are energized by the harmonic signals with frequencies $\{\omega_p, \omega_p, \omega_p, \omega_p, \omega_p\}$, while Row-1, Row-2, Row-3 and Row-4 are not receiving any harmonic signals and their associated nanoparticles are slowly relaxing back to a homogeneous distribution state.

The cycle then restarts at Time-1 and new data is provided to change the character from Z to a different character or graphic as needed. So as can be seen, the information is encoded in the frequency of a harmonic signal sent to the electrodes. Examples of harmonic signals that can may be used include sine waves or digital square wave signals with a zero constant voltage offset.

It is interesting to compare the data holding operation in a pixel that occurs between screen data refresh updates for a LCD and a QDD. In particular, the state of a LCD pixel is held by a voltage on a capacitor. However, in the case of a QDD the state of the pixel is held by the viscosity of the liquid used in the DEP process. It takes time for the nanoparticles to relax back to a homogenous state. Some colloids using silicon fluids have relatively stable viscosities over a large temperature range, thereby allowing stable relaxation times over temperature.

If the QDs in a colloid only have one diameter size then the display will be monochrome. For example a green letter Z in FIG. 73. However, it is also possible to have different diameter QDs that respond differently to different harmonic frequencies applied to the electrodes. These different diameter QDs could all be mixed together in the same liquid. This can allow differing amounts of red, green and blue light from PL processes to be emitted from a spatial distribution of QDs with different diameters. In this case both the PL response of the QD and its specific Clausius-Mossotti factor need to be designed, specifically by the use of semiconductors and dielectric layers. Additionally, instead of using only one pair of pDEP and nDEP frequencies $\{\omega_p, \omega_n\}$ there may be many different pairs as well as the use of the voltage amplitude as a another control parameter to improve the fidelity of RGB color mixture.

Thus, designed Clausius-Mossotti characteristics over frequency $\omega$ are possible. For example, the general Clausius-Mossotti factor for a spherical nanoparticle with N layers can be built up from first principles and it will not in general be the expression Eq. 121.

Figure 74A:
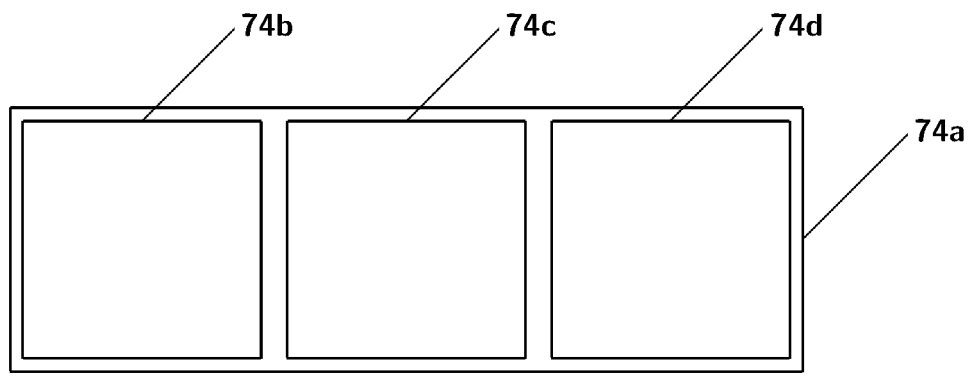

FIG. 74A shows a front view of a single color-pixel 74a comprising a Red sub-pixel 74b, a Green sub-pixel 74c, and a Blue sub-pixel 74d, which are based on dielectrophoresis and photoluminescence of quantum dots. The sub-pixels are arranged in a line, however any convenient sub-pixel geometry is acceptable. For example, the sub-pixels can be arranged in a triangular arrangement.

Figure 74B:
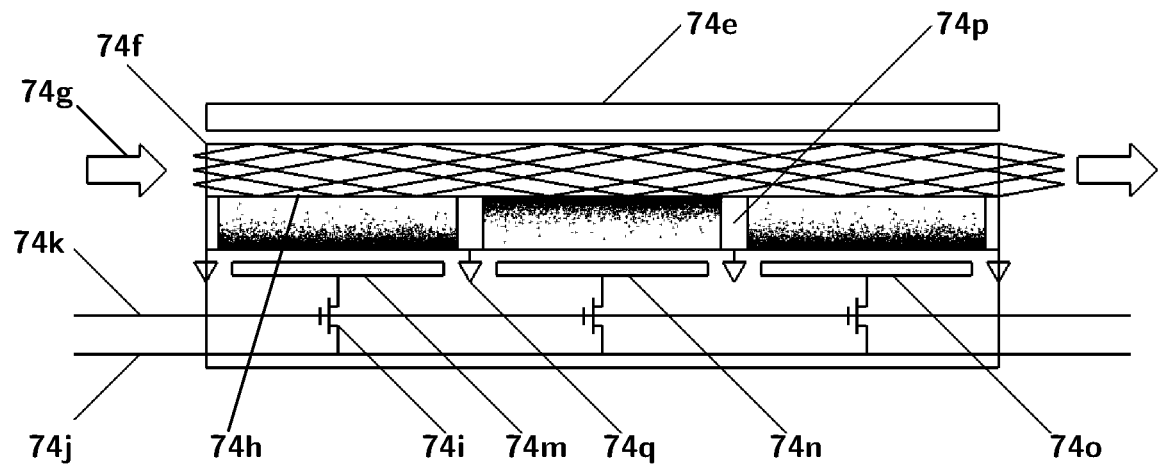

FIG. 74B shows a cross sectional view of the color pixel as in FIG. 74A from the top. In the cross sectional view we see a dark black background 74e that is in close proximity to a waveguide 74f. A primary light source 74g, producing UV light, which propagates within the waveguide 74f and is maintained within the waveguide by TIR. The primary light is retained completely in the waveguide until a specific region of the waveguide is reached. Then ponderomotive forces on nearby QDs, and potentially other nanoparticles such as simple dielectric spheres, moves the nanoparticles to the vicinity of the pixel-waveguide boundary 74h, where TIR2 of waveguide light occurs. Subsequently the light within the waveguide is coupled out of the waveguide in a GRIN trajectory, i.e. due to a gradient in the effective refractive index, to then PL by interacting with the QDs. The PL process is a result of an energy change $\Delta\varepsilon$ so that the modified form of Fermat's principle in Eq. 328 is in effect and rays are not subject to the usual optical étendue restrictions.

The close proximity of the red, green and blue sub-pixels allows colors to be added together to produce a range of colors to the viewer under additive color mixing rules. As a general rule, higher voltages and electric fields are needed for smaller particles and larger gradients in the refractive index. The magnitude of each color is controlled by the number of QDs that are interacting with the evanescent field of the waveguide. This is accomplished by a combination of judicious choice of the harmonic excitation (for pDEP, nDEP and zDEP type responses) and voltage amplitude. In FIG. 74B TTFTs such as 74i passes a harmonic data signal 74j by means of digital select signals 74k. The pixel electrode array, which comprises RGB electrodes 74m, 74n and 74o may have an optional conductive screen 74p that is used to contain the field of the electrodes. If an optional conductive screen is not used then its space may be filled with a transparent medium like (but not limited to) glass or acrylic. The conductive electrodes may also be patterned to allow charges to accumulate no only along the edges, but also along the patterning. Examples of such patterning are approximations to the well know fractal Sierpinski triangle and carpet gaskets, which may be patterned lithographically. The optional conductive screen surrounding the electrodes is connected to a system voltage level, which is typically taken to be electrical ground 74q.

Figure 74C:
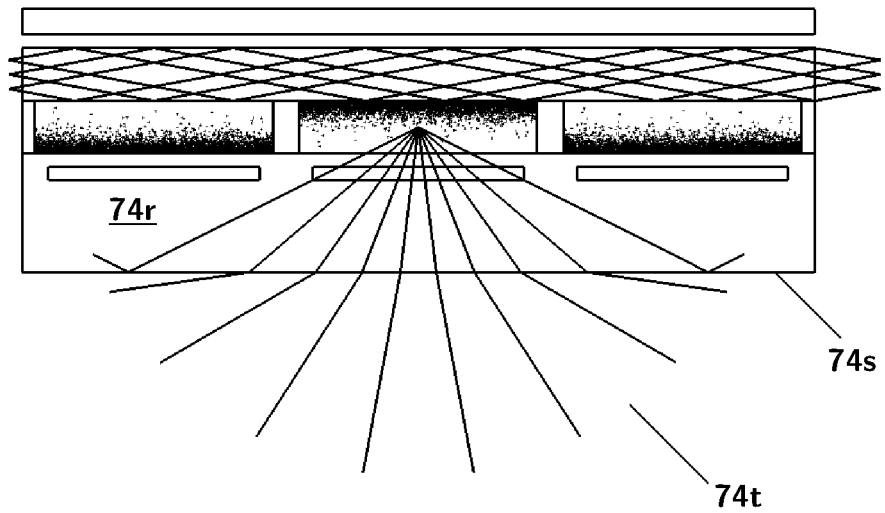

FIG. 74C shows a cross sectional view of light emitted from a single color sub-pixel in this case the green sub-pixel. The light passes through the transparent electronics (electrodes, TTFTs, etc. . . . ) and a transparent containment medium 74r to exit out of the optical output surface 74s. The output light 74t may have up to $2\pi$ steradians field of view.

It should be clear there are many different geometries and signaling schemes that may be used with the electrodes, some of which exploit in-phase ponderomotive forces, some of which exploit quadrature ponderomotive forces and some of which may be hybrid in-phase and quadrature ponderomotive forces. It should also be clear that specific optical bands such as the ultraviolet (UV) light considered in this disclosure for exciting QDs and the broad visible light used in PDs, may be considered only as examples and other optical bands may be used. It should also be clear that specific optical surfaces like the dark black background 74e may be replaced with mirror or other surfaces for some special applications. Additionally, while not shown here it should be obvious that touch displays may be included into the display design.

E-Paper by DEP-Diffusion of Large & Small Particles

Next, we discuss a way to use the basic designs and configurations disclosed as DEP-based displays as a form of electronic paper that only needs ambient light. First, note that while small dielectric nanoparticles in a liquid can interact with light as a modifier to the average refractive index, as provided for in Eqs. 235 and 277, larger particles tend to scatter light to make an effective white surface. If PDs (or other forms of color forming scatters colored particles) are mixed with larger dielectric spheres (white forming scatters) in a colloid then under a DEP process we can separate, by pDEP and nDEP, the white-background-forming dielectric spheres from the color-forming PDs. The user can see in each pixel either the white light scatters or the color scatters. This may be done with separate Cyan, Magenta, Yellow PDs in a subtractive color scheme to allow full color displays that are perfectly readable in bright sunlight and are more akin to paper than light emitting displays. This can be especially effective if the pDEP and nDEP occur at the same electrode drive frequency $\omega$. If this is the case then at harmonic electrode drive frequency $\omega_1$ large dielectric spheres have a pDEP response while small PDs have a nDEP response so that that the same electromagnetic fields cause the dielectric spheres to move away from the electrodes and the PDs to move towards the electrodes. Conversely, at $\omega_2$ the large dielectric spheres have a nDEP response while small PDs have a pDEP response so that that the same electromagnetic fields cause the dielectric spheres to move towards the electrodes and the PDs to move away from the electrodes.

For the avoidance of doubt regarding scattering consider an analogy: white paint is often made by forming a colloid of microspheres of titanium dioxide, which scatters ambient light in such a way as to make it appear that the paint is white, even though the bulk titanium dioxide is essentially transparent. The same phenomena is also at work for table salt, which appears white in a pile of salt even though the individual grains of salt are substantially transparent when viewed under a microscope. Thus, numerous objects with transparent bulk properties can scatter ambient white light to produce a white scattering field, i.e. the white color needed to electronically form an electronic paper substitute.

Figure 75A:
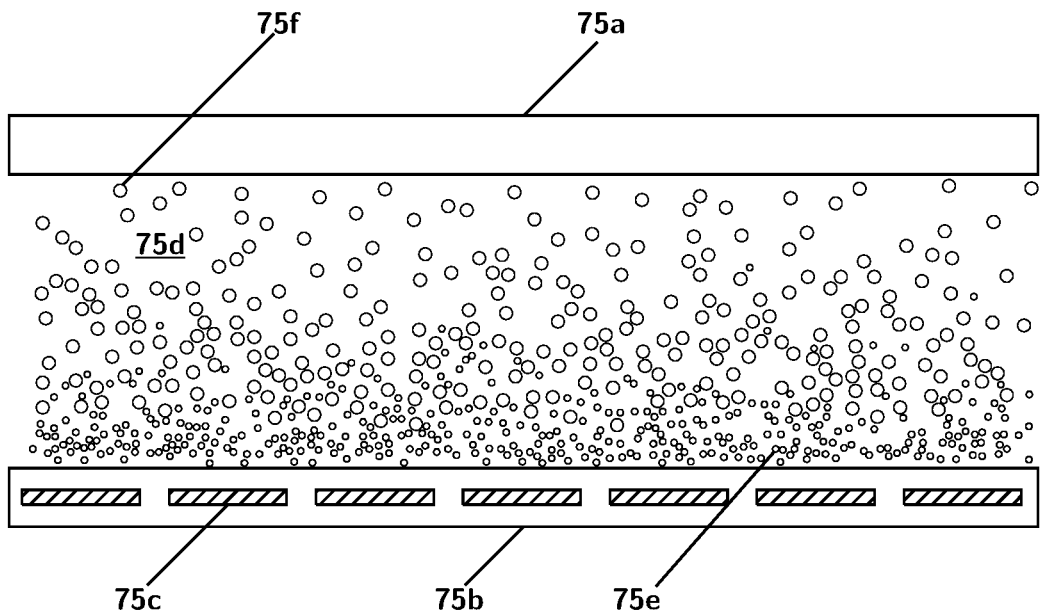

These ideas are captured in FIG. 75A where a display system is shown in cross section. The figure depicts a first transparent slab 75a and a second transparent slab 75b supporting transparent electrodes and electronics. These transparent slabs taken together form a μFCC. Electric fields from electrodes like 75c easily penetrate into the colloidal medium 75d. The colloidal medium has color producing particles 75e such as PDs (small particles). The electrodes are operating at a frequency $\omega_1$ where the Clausius-Mossotti factor is numerically positive for the large light scattering particles, such as white light 75f (large particles) and numerically negative for the color producing particles 75e. Thus, larger white producing particles are at the top and small color producing particles are "hidden" beneath.

Figure 75B:
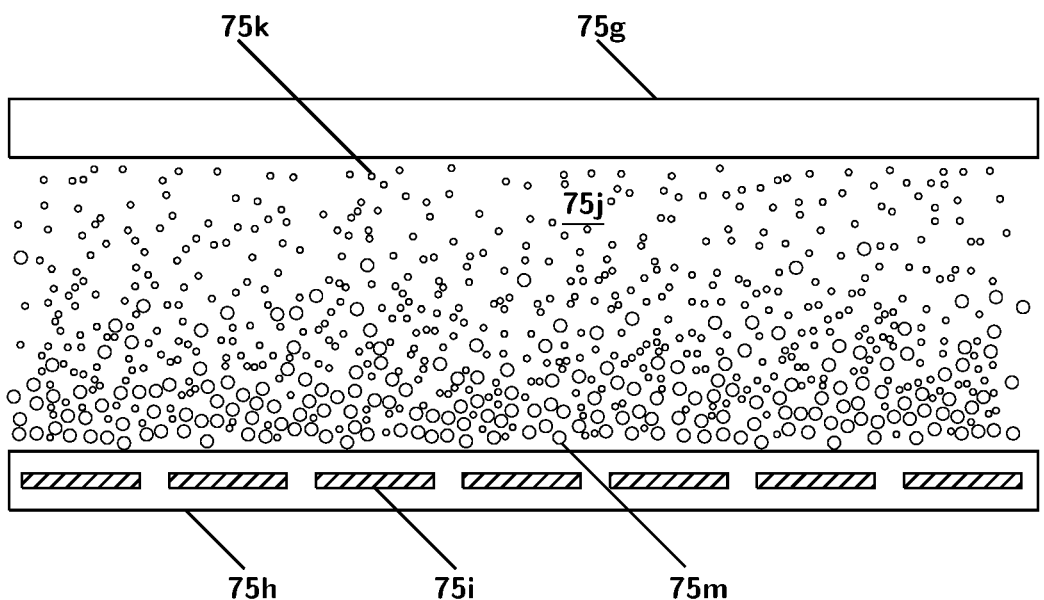

Similarly, in FIG. 75B a first transparent slab 75g and a second transparent slab 75h form a μFCC. Thus, electric fields from electrodes like 75i easily penetrate into the colloidal medium 75j. The colloidal medium has color producing particles 75k such as PDs. The electrodes are operating a frequency $\omega_2$ where the Clausius-Mossotti factor is numerically negative for the large light scattering particles, such as 75m and numerically positive for the small color producing particles 75k. Thus, smaller color producing particles are at the top and larger white producing particles are hidden beneath. Thus, by changing the frequency of one or more sub-pixels we can control the state and color of the electronic display. Note the size of the particles and electrodes in this and other display figures are not to scale.

Overview of Augmented & Virtual Reality Displays

In FIGS. 76-80 a second approach to DEP-based displays is shown that is based on creating regions of nanoparticles that collapse and expand spatially to effectively allow TIR2 based redirection of light. Unlike conventional TIR mirrors there is no well defined surface to reflect from. Instead, an infinite number of separate refractions effectively provides the ray redirection to emulate a TIR-reflection over a volume of space instead of a surface. This has been discussed in detail in the prior sections on Bistable Optical Switches and Display Pixels Based On Total Internal Refraction.

Figure 76:
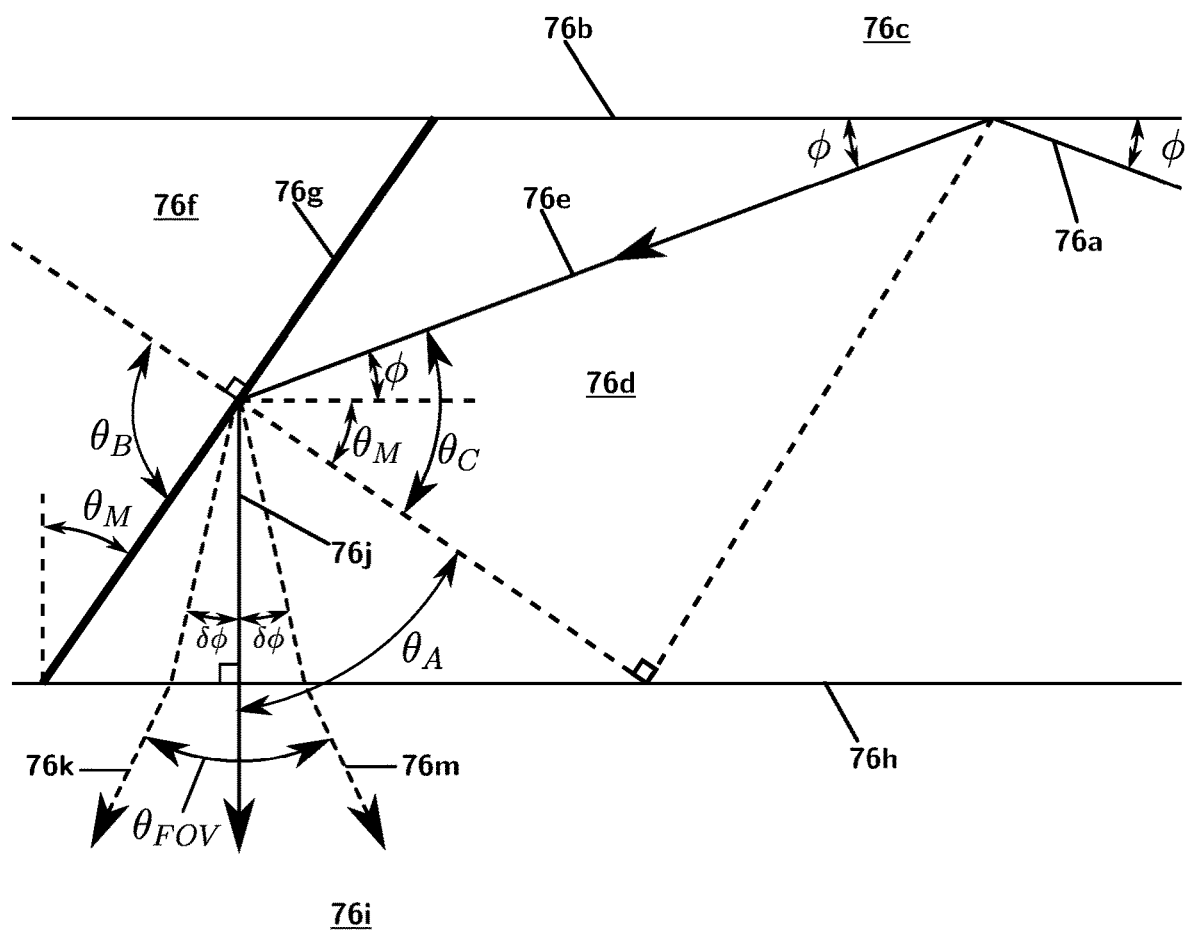

A distillation and idealization of the geometry is shown in FIG. 76. In particular, an input first ray segment 76a is reflected off of a first optical surface 76b by TIR formed between an external environment 76c and a first internal environment 76d. The first ray segment is reflected by TIR at an angle from the surface of ϕ as shown in the figure. The resulting second ray segment 76e passes through the first internal environment 76d and is redirected by TIR2 through the boundary region between the first internal environment 76d, which contains solid nanoparticles in a colloid and a second internal environment 76f, which is devoid of nanoparticles due to the action of ponderomotive forces thereon. The boundary region between the first internal environment 76d and the second internal environment 76f forms a means to refract light and this means can be made to appear to disappear electronically. The effective mirror 76g is at an angle $\theta_M$ relative to a normal from a second optical surface 76h formed between an external environment 76i and a first internal environment 76d. The second ray segment 76e reflects by TIR2 at the effective mirror 76g into a third ray segment 76j. The third ray segment 76j is assumed by design to be normal the second optical surface 76h and exits into the external environment 76i. By extending the refractive index beyond that which is needed to just allow TIR there is a spare capacity to allow small angular deviations to the input ray so that it can exit in the perturbation rays 76k and 76m to form a field of view $\theta_{FOV}$. These rays contain the augmented reality information that is overlaid onto an external scene.

The reader should note that the curvature of the wavefronts of the output rays controls the perception of the location of the data that is provided to the observer, i.e. it controls the distance from the observer where the data "hangs" or "hovers" in space in front of the observer. For example, the third ray segment 76j and the perturbation rays 76k and 76m are associated with flat or curved wavefronts to control depth precetion. If the wavefronts are flat then the data appears to be located between the first optical surface 76b and the second optical surface 76h. The two wavefront curvature control methods may also be combined to extend the range of curvature or to allow greater flexibility in how the control signals are provided to the display.

There are two options to achieve control over the curvature of the wavefronts. In the first method the data light source, which provides the first ray segment 76a is configured to provide the desired curvature of the wavefronts. In the second method, the effective mirror 76g is curved by DEP-based ponderomotive forces. One way to implement this second method is with wavefront curvature control DEP-electrodes on the first optical surface 76b and/or the second optical surface 76h.

Let the refractive index in the first internal environment 76d be called $n_A$ and the refractive index in the second internal environment 76f be called $n_B$ then if we ignore optical phase effects through each nanoparticle we can write $$n_A = n_L + (n_S - n_L)v_A \qquad (748)$$

$$n_B = n_L + (n_S - n_L)v_B \qquad (749)$$

where $n_L$ is the refractive index of the liquid forming the colloid and $n_S$ is the refractive index of the solid nanoparticles forming the colloid; also, $v_A$ and $v_B$ are the volume fractions of the nanoparticles in the first and second internal environments respectively. In general, at the effective mirror 76g $$n_A \sin\theta_A = n_B \sin\theta_B \qquad (750)$$

and at the critical angle $\theta_B = \pi/2$ with $v_B = 0$. Moreover, $\theta_A = \theta_C$ when $v_A = v_C$ (i.e. subscripts of C indicate critical angle) so that $$\sin\theta_C = \frac{n_L}{n_L + (n_S - n_L)v_C} \qquad (751)$$

and $$v_C = \frac{\csc\theta_C - 1}{f}, \qquad (752)$$

where $$f = \frac{n_S - n_L}{n_L}. \qquad (753)$$

Equation 752 can be modified for $v_A$ in general, by including all concentrations that are greater than $v_C$, as TIR is still maintained, consequently $$v_A \geq \frac{\csc\theta_C - 1}{f}. \qquad (754)$$

Therefore, in general we can have different critical angles $\theta_C$ such that $$\sin\theta_C = \frac{n_L}{n_L + (n_S - n_L)v_A} \qquad (755)$$

and we observe from FIG. 76 for a boundary region angle $\theta_M$ that $$\frac{d\theta_C}{dv_A} = \frac{d(\theta_M + \phi)}{dv_A} = \frac{d\phi}{dv_A}. \qquad (756)$$

Therefore, on calculating the derivative we obtain $$\frac{d\phi}{dv_A} = -\frac{f/(1 + fv_A)}{\sqrt{(1 + fv_A)^2 - 1}} \qquad (757)$$

and the field-of-view angle $\theta_{FOV}$ can be calculated from Snell's law $n_A \sin\delta\phi = (1)\sin\theta_o$, where $\theta_0$ is the output angle after the ray leaves the second optical surface 76h. Therefore, approximately $\theta_o = n_A \delta\phi$ and $\theta_{FOV} = 2\theta_0$ and after some algebra we arrive at $$\theta_{FOV} \approx \frac{2(n_S - n_L)\delta v_A}{\sqrt{(1 + fv_A)^2 - 1}}. \qquad (758)$$

Clearly, a greater difference in the liquid and solid refractive index constituents of the colloid will yield a greater field-of-view as will a greater increase in the concentration $\delta v_A$ beyond that which is needed for TIR of the third ray segment 76j, which by assumption exits the device normal to the second optical surface 76h.

For example, if ethanol is used as the liquid with $n_L = 1.37$ and if titanium dioxide with $n_S \approx 2.6$ are used then from Eq. 754 we find that $v_A \geq 0.12$ when $\phi = 35°$ and $\theta_M = 45°$, $\theta_{FOV} \approx 26°$ and $\delta v = 0.08$. This requires a total volume fraction of the nanoparticles in the first internal environment of $v_C + \delta v = 0.20$.

It is also important to note that TIR is not a requirement at the effective mirror 76g boundary. Some light can leak through the effective mirror 76g boundary as it is substantially contained in the internal to the display. This allows for further increases in the FOV and relaxes some of the constraints on the refractive index values and volume fractions needed in colloid.

In FIG. 77 we see an embodiment having a transparent slab 77a and a transparent corrugation slab 77b that form a µFCC 77c, which is a form of a control volume, containing a colloid 77d of solid nanoparticles. The transparent corrugation slab 77b has transparent electrodes, such as the cross-hatched 77e, on its corrugations. If the average refractive index of the uniformly distributed nanoparticle colloid is chosen to be the same as the refractive index of the transparent slab 77a and transparent corrugation slab 77b, then under steady-state conditions light-guide rays 77f and 77g remain trapped by TIR within the light guide formed by the waveguide surfaces 77h and 77i. Note that all the internal corrugations and electrodes do not interact with the light rays because each component and region has its refractive index matched to the adjacent component and region. However, at the surfaces of the device reflection can occur. An example of TIR based confinement is at TIR bounce point 77j.

To form a pixel of light at the observer's eye 77k the drive frequency of the electrodes is changed to $\omega_p$ on a line of electrodes, such as 77m, which are arrayed into the page of the image of FIG. 77. This array is easily seen by looking at the perspective view in FIG. 80. As a consequence of changing the harmonic signal on electrodes from an amplitude of $v=0$ to $v=V$ at frequency $\omega=\omega_p$ the nanoparticles are forced to redistribute leaving a non-particle-region 77n and a high concentration region 77o. The boundary between the non-particle-region 77n and the high concentration region 77o is not well defined as it is a GRIN region where TIR2 can take place.

In this way a pulse of light in the waveguide, depicted here as light-guide rays 77f and 77g are redirected into pixel light 77p, which may be added to the light from the image source 77q, which is produced from a viewed physical object 77r in the field of view of the observer. The pulses of light in the light guide may come from any one of a number of sources, such as but not limited to: lasers or Light Emitting Diodes (LED).

In FIG. 78 a slight modification to the embodiment of FIG. 77 is provided. In particular, the physical parameters that make up the colloid are chosen such that TIR2 of the dynamically formed mirrors can occur at π/4 radians. Therefore, the edge-launched light 78a is collimated and need not be confined by a transparent slab 78b and a transparent corrugation slab 78c. This requires having nanoparticles with a relatively high bulk refractive index, but it allows the edge-launched light 78a to not: (1) pass through transparent electrodes like 78d during distribution to the pixel and (2) not interact with the outer surfaces of the transparent slab 78b and the transparent corrugation slab 78c.

The reduction of light passing through the transparent electrodes is helpful in some applications because the transparent electrodes are not perfectly transparent and reducing the interaction with the electrodes avoids optical losses. The avoidance the outer (environment facing) surfaces of the transparent slab 78b and a transparent corrugation slab 78c is helpful in some applications because dirt, water and other surface contaminants are avoided and the corresponding optical losses and distortions are avoided.

Therefore, edge-launched light 78a is directed into a pass through beam 78e or a pixel beam 78f. The pixel beam can then enter an observer's eye 78g along with external light 78h from a scene object 78i to form an augmented reality display.

FIG. 79 shows the same setup as in FIG. 78 except that now a curved wavefront 79a of the edge-launched light 79b of the data light source is shown. As in FIG. 78 a pixel beam 79c goes to the observer 79d. The pixel beam also has a curved wavefront 79e, which provides the illusion that the pixel is hovering at the hover pixel position 79f.

The embodiments of FIGS. 77-79 show the observer's eye on the side of the device with the transparent corrugation slab, however this is not a requirement and the observer's eye may be located on the side of the device having the transparent slab so long as the edge-launched light is in the opposite direction, i.e. launching from the left edge.

The embodiments of FIGS. 77-79 show devices for augment reality displays, however this is not a requirement and the devices can be tasked with providing a conventional display by allowing the transparent slab opposite the observer to become opaque and to incorporate an appropriate background color for the application. Thus the device is capable of being used for displays, virtual reality and augmented reality applications.

The embodiments of FIGS. 77-79 show devices where the dynamically formed TIR2 light redirection is from relatively flat slab-like regions of a GRIN. An example of a dynamically formed TIR2 mirror is 78*j*. In reality there is a diffusion process from the adjacent regions so that nanoparticles begin to diffuse into the region cleared of nanoparticles. This diffusion process can be made to be slow relative to the digital refresh period of the display by a suitable choice of fluid viscosity.

The embodiments of FIGS. 77-79 show devices where only one side of the device has a transparent corrugation slab. An alternative embodiment would provide that both sides have a transparent corrugation slab. For the avoidance of doubt the transparent slab may be replaced with a transparent corrugation slab. This may done to improve the time response and TIR mirror shape. Also, it allows more than one type of nanoparticle to be used in the µFCC.

The embodiments of FIGS. 77-79 show devices different from prior art, such as but not limited to U.S. Pat. No. 7,457,040 B2, entitled "*Light Guide Optical Device*," by Yaakov Amitai, and granted 2008 Nov. 25. According to the claims of this prior-art the optical device comprised: " . . . at least one partially reflecting surface located in said substrate which is non-parallel to said major surfaces of the substrate [and is] characterized by at least two display sources . . . ." It is clear form the prior-art specification that the reflecting surfaces where anticipated to be fixed (static) physical surfaces. Whereas the current invention has no fixed mirror surfaces within the device, which allows large displays to be formed.

The embodiments of FIGS. 77-79 are generically shown in cross-section while a cut-away perspective is shown in FIG. 80. In particular, in FIG. 80 a transparent slab 80*a* and a transparent corrugation slab 80*b* form a µFCC 80*c* control volume containing a colloid of solid nanoparticles. Each corrugation step 80*d* of the transparent corrugation slab 80*b* contains a linear array of electrodes, where each linear array contains individual transparent electrodes, such as 80*e*. A 1$^{st}$ linear array of electrodes 80*f*, a 2$^{nd}$ linear array of electrodes 80*g*, a 3$^{rd}$ linear array of electrodes 80*h* through to an an N$^{th}$ linear array of electrodes 80*i* is shown. Each electrode array has its electrodes electrically connected to a harmonic voltage source that provides the necessary voltage amplitude, phase and drive frequency c so that ponderomotive forces on nanoparticles are normal to the corrugation surface along the entire corrugation step. The harmonic voltage source array is schematically shown as 80*j* for the 1$^{st}$ linear array of electrodes 80*f*. This voltage source array is similar to that described in FIGS. 7A-B.

Thus, the device of FIG. 80 provides a linear array of dynamically formed TIR2 mirrors. Each TIR2 mirror being formed spontaneously as needed along the length of a corrugation. When the N$^{th}$ TIR2-mirror is activated an array of edge-launched light sources (not shown) would provide the light to form a line-image of the desired two dimensional image. The device of FIG. 80 splits the image formation process between a line of light source pixels (not shown in FIG. 80) and an array of DEP formed dynamic TIR2 mirrors.

In FIGS. 81-82 an alternative method for providing a display is provided that is based on elastic scattering and/or PL. It too may be configured for a standard display or for either augmented reality or virtual reality viewing. In particular, in FIG. 81 shows a cross section of a display having a first optical slab 81*a* and a second optical slab 81*b*, which taken together form a µFCC 81*c* between their closest parallel surfaces. Within the µFCC is a colloid that is electronically configured to normally occupy one side of the µFCC, as is shown in FIG. 81. On the other side of the µFCC is a collimated light beam such that the input light beam is 81*d*, which may be laser light. This light propagates through the liquid part of the colloid without typically interacting with any nearby nanoparticles, because the nanoparticles are configured to one side of the µFCC using a DEP process. A line of electrodes is provided into the page at discrete positions along the device. Therefore, the electrode 81*e* is one electrode of a line of electrodes that extends into-the-page of the image. This line of electrodes into-the-page is similar to that of FIGS. 7A-B. In a perspective view it is similar to that shown in FIG. 80 except that there are no corrugation steps, i.e. just a flat surface. Initially, this into-the-page array of electrodes is operated at a harmonic drive frequency of $\omega_p$ and properly phased to draw the nanoparticles in the colloid towards the electrodes. This is repeated for each line of electrodes into-the-page of FIG. 81. In this way an entire sheet of nanoparticles is pulled to one side of the µFCC. Note, this can also be done with nDEP instead if desired.

The collimated light beam can now be selectively and electronically scattered as a function of position in the array by changing the harmonic drive frequency of one of the into-the-page arrays from $\omega_p$ for pDEP to $\omega_n$ for nDEP. For example, the into-the-page array associated with electrode 81*f* is shown operating at $\omega_n$ so that the nanoparticles that are in the immediate vicinity experience a ponderomotive force that forces the particles away from the electrodes. This results in light scattering nanoparticles 81*g* that enter into the input light beam 81*d* to induce scattering and PL that can be seen by an observer's eye 81*h*. For example if QDs are used for the nanoparticles then a PL effect will be induced and a portion of the resulting light will be scattered out of the device. Because a symmetric QD is radiating into 47*r* steradians from a higher refractive index to a lower refractive index (air) it is possible to have a field of view of $2\pi$ radians in the plane of the page on one side of the display and $2\pi$ steradians of solid angle. The eye's entrance pupil further reduces the output solid angle 81*i* as shown.

In the case when the device is used as an AR display an external environment object 81*j* provides scene light 81*k* that is added to the internally generated light that provides the data overlay on the AR display 81*m*. Note that the linear array into-the-page is typically designed to be set to pDEP or nDEP operation along the entire linear array. This means that for the display to draw a line of image pixels along the into-the-page array there must be a source of pixilated light along the direction of the into-the-page array. This can be a linear array of lasers or other light sources that edge feed the AR device. In this way one or more pixilated light sources is energized to interact with the nanoparticles that are pushed into the light flux in the µFCC.

The AR display just described is monochrome if there is only one diameter of QDs used for the nanoparticles in the colloid. If non-spherical nanoparticles are used, e.g. with a jagged morphology, then it is possible to use passive particles, i.e. not QDs, and have the light scatter into the observer's eye. Thus the color range is then limited by the light sources and a full color display is possible. For the avoidance of doubt, note that spherical nanoparticles will only scatter light very weakly at about $\pi/2$ radians from the propagation direction of incident light. Therefore, a rough or even jagged nanoparticle morphology is better for light scattering, but typically needs to have its effective Clausius-Mossotti factor empirically determined due to the stochastic nature of the particle morphology.

The AR display just described can be converted to a regular display for computers or virtual reality applications with some minor modifications. In particular, an optional light absorbing backplane 81n may be used. Additionally the nanoparticles may be metallic to effect even better scattering properties.

The basic idea behind FIG. 81 can be extended to include two parallel electrode arrays. A comparison is provided in FIG. 82. In particular, FIG. 82λ is the same as FIG. 81 and provides a baseline. FIG. 82B is the same as FIG. 82A except that it uses two electrode arrays to push and pull the nanoparticles into the light beam. FIG. 82C is the same as FIG. 82A except that it uses two electrode arrays to push and pull the nanoparticles into the light beam and it has nanoparticles on each side of the light beam. The nanoparticles may be the same or they my be different so that, for example different diameter QDs can be used for color generation.

FIG. 83 shows an example embodiment for Augmented Reality (AR) glasses based on a DEP optoelectronic device technology. This includes an AR right lens 83a and an AR left lens 83b. There is also an optional sensor suite in the bridge of the AR glasses that provides data to the allow the position of the glasses and objects in the environment to be known by software controlling the AR glasses. Three are many sensors that are possible, depending on the intended use of the AR glasses, however a common set may include a day/night camera with a variable focus DEP zoom lens 83c (like that shown in FIGS. 55-58) a LiDAR beam steering director 83d (like that of FIG. 53) and a LiDAR receiver 83e. The day/night camera, in combination with the zoom lens and an inertial sensor, e.g. a Bosch Sensortec BMA-421, InvenSense ICM-20948 or similar devices are located in the bridge of the glasses. This provides three dimensional data of the screen in front of the augmented reality observer 83f from an image via the technique of Visual Inertial Odometry. This imaging system in combination with a LiDAR system can provide continuous precision data on the position of objects in the environment as well as the user in a global or world coordinate system. The AR glasses have an AR frame 83g and an ear rest 83h that contain a battery and connections to the AR right lens 83a and an AR left lens 83b.

FIG. 84 shows the outer layer of the glasses removed so that corrugations, similar to that shown in FIGS. 79-80, are exposed. However, unlike the corrugations in FIGS. 79-80 the lens corrugation steps 84a are now curved to always focus the light into the eyes of the observer and the corrugations are on a lens that has space curvature. It should be noted that other AR lens designs based on DEp are possible, such as but note limited to AR lenses based on FIG. 81.

FIG. 85 shows a close up of the AR glasses with the lenses removed so that some of the detail of the frames becomes visible, especially where the lenses would normally be located. On one side of the lens, in this case near the bridge of the glasses there are located a source of light in the form of edge injectors 85a, which provide light into the control volume where the colloidal mixture of liquid and solid nanoparticles are located. The light injectors may take several forms. The simplest is that of a linear array of LEDs, lasers or LCD-based pixels. The light from the light injectors is shown schematically as the injected light 85b being emitted by edge injectors 85a. The opposite side from the light edge injectors is a light absorber 85c that suppresses spurious reflections.

FIG. 86 shows an augmented reality lens in several stages of disassembly to allow an understanding of how the lens it built up into an opto-electronic system. In FIG. 86A is a complete lens assembly, FIG. 86B shows a lens with its front optics removed to show the internal optical corrugations, FIG. 86C further removes the corrugations to expose the back optical element, FIG. 86D has all optics removed so that only the lens-holder is remains, and finally FIG. 86E shows all optical elements, but with the lens-holder removed to expose the gap of the control volume, which is where an optical colloid is located.

Note that the lenses are near a table edge 86a, which helps to breakup the image and show when the optical elements are removed. The front lens element is 86b. The back lens element is 86c. The lens holder is 86d. The lens holder attaches to the front lens and the back lens and provides a plurality of electrical and potentially optical connections, which we call signal connections in general. An example of a signal connection is 86e.

Between the front lens element and the back lens element are the lens corrugations 86f. The lens corrugations may be affixed to the front lens element or the back lens element 86g. In the present example the lens corrugations are attached to the front lens element and may be integrated into the lens elements. Electrodes are located on the lens corrugations as are shown in FIG. 80.

The lens-holder 86h has signal connections like 86e that connect to the electrodes on the lens corrugations 86f and controls the light source edge injectors 86i. The light source edge injectors may be lasers, LEDs, or it may be a light pipe with a means to distribute light from a common light source. In this last case the means to distribute light from a common light source may be a DEP-based light switch to redirect light. The light from the light source edge injectors is directed into the control volume gap 86j formed between the front and back lens elements, which is where the colloidal mixture of an optical liquid and nanoparticles are located.

Note that an augmented reality lens that is curved, as is the case of some single piece sunglasses, can provide upwards of 120 degrees field of view with data superimposed on the external scene.

Finally, FIG. 87 shows an example of a multi-button controller 87a on the back of the head of an augmented reality user and is used to control the optical components of the AR glasses. In this particular case the controller has five buttons that include left-right, top-bottom and a central button for entering and selecting data or options on the display glasses.

Augmented Reality Glasses Via Colloidal Shock Waves

In recent years a number of well funded and highly motivated companies have been developing augmented reality (AR), virtual reality (VR), and mixed reality (MR) headsets, which are here collectively called XR headsets. Billions of US dollars have been invested to create high-quality headsets as competing efforts push each other forward. Nonetheless, at the time of the writing of this document it is generally accepted that all of the efforts have fallen short in one or more ways, such as but limited to: cost, size, mass, optical performance, and curved stylish looks. The ultimate objective being a head set that looks exactly like a sunglasses, prescription glasses, or a stylish headset for a specific application like gaming or aerospace applications. This shortfall in performance has caused a search for ever more clever ways to make the AR and VR headsets cheap and high-performance to allow people to have general access to the new and emerging AR and VR markets for both enterprise and commercial applications.

However, one result of this prior and extensive effort is that the typical set of techniques that optical engineers use in optical design has now been tried in multiple ways and the desired outcome has not yet been achieved. Thus, new optical physics and techniques may be needed to overcome current limits and development a low-cost, high-performance, and attractive headset. One such new direction is provided in this disclosure using, in part, DEP-based colloidal shock wave optics.

One aspect of the low-cost nature of the XR headset discussed herein is based on the ability to use Commercial Off The Shelf (COTS) components for the lens, or at least a lens that is close to a COTS type lens. The COTS lenses may be, if desired, obtained from established sunglasses or from prescription lens providers or manufactured directly by established low-cost means in order to include minor modifications to optimize the design for XR applications.

A second aspect of the low-cost nature of the XR headset discussed herein is that, in principle, all the optical functions for data overlay on an external scene occur in or around a thin control volume, which is as small as about 10 μm over the entire lens area. Hence, a nanoparticle colloid is located between two stylishly curved lenses. The optical functions include: a laser source, laser beam scanning, focusing for wavefront curvature control, optical switching, and scattering into a large field-of-view for the user. This means that the optics of XR glasses are really just about the lenses instead of the entire headset. This is an improvement over today's designs where it is often the case that the designers hang various beam steering and light sources external to the lens. For example, DEP-based XR lenses would overcome the need to place fragile micro-electro-mechanical mirrors in or around the ear-piece of the XR glasses, which is found in some current designs.

To create an XR head set functionality several sequential steps are used to process light to provide graphical information to the user as an overlay on the external scene for AR. This same technique can be used in VR applications too, by simply blocking all or selective parts an external scene. In particular, the sequential light processing steps include:

1. Inject colored RGB light into a thin and stylishly-curved lens light-guide
2. DEP beam steering of injected light towards desired pixel location
3. DEP focusing of light for depth perception (may be simultaneous to steering)
4. DEP enabled beam propagation by TIR in solid light-guide lens
5. DEP optical-switch redirects light out of light-guide at the pixel location
6. DEP optical-switch enables light scattering at the pixel location
7. A meso-scale stochastic surface scatters broadband light into human eye
8. External scene-light may simultaneously pass through lens into an eye
9. An optional liquid crystal VR layer switches an external scene on and off As can be see there are at least five DEP-based processing steps that may be used for injecting XR information into a users eye: beam steering, focusing, TIR light guiding, and two optical switching operations. These functions are all implemented in or around a thin layer of a nanoparticle colloid that is located between a first lens and a second lens. Each of these functions is based on manipulating the local refractive index of the colloid by electronic means. Therefore, what is about to be described in the disclosure herein below is a system of dynamic GRIN control for creating various optical devices in an optical system.

The DEP-based optical system is a radical departure from the current XR designs and comprises almost an entire self-contained system for doing optics. Moreover, the optics can even be implemented as dedicated hardware or in terms of a reconfigurable system that is capable of being modified by software updates. Such functionality may be useful in prototyping or in upgradeable hardware.

There are two areas where multiple processes are implemented into one device. The first hybrid device is the combined DEP-based beam steering and focusing device. The second hybrid device is the combined DEP-based optical switch, which is actually two switches comprising a switch that turns ON or OFF TIR-based light guiding on one surface of the optical light guide, while simultaneously turning OFF or ON the broadband stochastic scattering at another surface. Notice that as one side of the switch turns off the other side turns on and vice versa.

Some of the anticipated competitive advantages of a DEP-based XR lens design include:

1. Uses new physics to overcome current XR headset limitations
2. Combines multiple optical operations into one device to reduce size
3. Stylish looking curved lenses are now easy to implement
4. Compatible with low-cost commercial off-the-shelf (COTS) lenses
5. Replaces sunglass, prescription, and face-covering helmet lenses
6. Provides vivid RGB colors for XR headset displays
7. Provides wavefront curvature control for floating objects in front of user
8. Can simultaneously provide MR over different parts of a lens (peek mode)
9. Very large field of view (120 degree anticipated) and large eye-box
10. No ghost images and image shadows
11. Extremely low-cost easy to manufacture design
12. Can include an integrated eye-sensor to determine eye orientation
13. The entire optical package is in the lens, i.e. no external optics to lenses
14. Either dedicated optics or software updatable optics are possible
15. External observers cannot see graphics being displayed on the lenses The reader is encouraged to review the underlying physics presented in the following sections: "Redirecting Light Using Colloidal Shock Waves" and "Hyper Accurate & Precise Beam Steering."

The description of an AR reality headset is now provided. In particular, FIG. 88 shows a front view of an AR headset. Each lens has superimposed over it a family of concentric circles and radial curves that form a coordinate system. The radial curves are associated with the trajectory of a RGB laser source that is steered into different directions through the curved lens, as shown in FIG. 89. The concentric circles are associated with an electrode array, located near the outer or inner lens surfaces. The electrode array carries a traveling wave voltage signal with two or more phases. The simplest being interdigitated electrodes with π radians of phase shift between adjacent electrodes. The electrodes are isolated in FIG. 90. Thus, the concentric circles are based on electrically conducting and transparent surfaces in the lens, while the radial curves are based on scanning a laser. This means that in the radial dimension there is a resolution that is fixed by the electrode spacing and in the angular dimension there is a resolution that is fixed by the beam width, accuracy, and precision of the laser steering process.

Note that the cross-sectional image referenced by the direction arrows 90a and 90b is similar to that provided in FIG. 8A during the discussion of colloidal shock waves. This cross section is further detailed in FIG. 91.

FIG. 91 shows the lens cross section 91a of the virtual reality headset lens indicated in FIG. 90. There are two stacked lenses, and a colloidal region between. The combined lens is curved to functionally conform to the user and for aesthetic purposes. Input light 91b from a red, green, blue (RGB) light source, e.g. a RGB laser, is injected into a light guide core 91bb of a first lens. The light guide core has a lower refractive index solid cladding layer 91c and a electronically controllable colloidal liquid cladding 91d. Both cladding layers have a refractive index lower than the core so that light can be guided by TIR within the core. Just past the colloidal cladding layer is a scattering surface and electrode array collectively known as scattering electrode layer 91e and a second lens 91f. The colloidal cladding layer is actually a two-sided DEP-based optical shock wave switch that scatters light from the intended pixel area into an eye 91g. The scattered light is designed by stochastic means, but provides a deterministic angular scattering distribution so that a large light-box exists for the comfort of the user.

A slightly more in-depth view of what is happening is provided by three magnified inset details. The first magnified detail 91h focuses on the roll that the colloidal layer provides. The nanoparticles in the colloid are moved into different regions by a fast acting shockwave, as has been described in the section "Redirecting Light Using Colloidal Shock Waves."

The light guide core 91i allows light to propagate by TIR. An example guided ray 91j is shown reflecting by TIR off of the interface with the solid cladding layer 91k and the interface with low refractive (RI) cladding regions 91m and 91n of a colloidal cladding layer.

The colloidal cladding layer also comprises a medium refractive index region such as 91o that has its refractive index designed for a specific amount of light leakage from the refractive index of the light guide core 91i. The refractive index of the light guide core 91i can, if desired, be matched to the refractive index of the medium refractive index region such as 91o so that 100% of the intercepted light passes onto a subsequent scattering surface to form a pixel. A magnification of stochastic pixel region 91p is shown in the second magnified detail 91q and its geometry is discussed in a subsequent paragraph.

The pixel region formed by the medium (i.e. intermediate) refractive index region 91o allows light rays like 91v to leak out of the light guide and scatter off of a stochastic pixel region 91p into ray bundle 91r that is directed to the eye of an observer by propagating through the second lens 91s and air 91t. The high RI colloidal region 91u matches the refractive index of the solid medium used to form the stochastic scattering surface so that no light is scattered outside of an active pixel. Additionally, scene light from a scene region 91w also can propagate through the lens stack into the air 91t. Prescription lenses may be implemented by the specific shape of the lens back surface 91x.

A thin transparent electrode layer 91y comprises an array of electrodes, such as transparent electrode 91z. The transparent electrode layer 91y also has one surface with a patterned scattering surface. The thin transparent electrode layer 91y can be manufactured on a roll of thin plastic that has a nano-imprint pattern for the scattering surface.

The second magnified detail 91q shows the boundary between the colloid 91aa and a portion of the thin transparent electrode layer 91ab. A designer surface providing a light transformation with a specific angular dependence based on a randomly rough surface 91ac having slopes that accrue to provide a specific probability distribution function and angular extent of the scattered light. An example of a detailed analysis of such structures is provided in the text book "Designer Surfaces," by Alexei A. Maradudin, et. al., Elsevier Publishers, 2008, ISBN 978-0-444-53048-6, which by reference is included in its entirety herein. One of the important features of a designer surface is that the feature sizes are meso-scale, which means the features are much bigger than the largest wavelength of light to be processed by the XR system, but small compared to physical structures. Therefore, many nanoparticles can easily fit between the peaks in the rough surface so that it becomes possible to have a colloidal refractive index that is matched to the refractive index of the material used to form the randomly rough surface. In this way the randomly rough surface can be turned on or off by changing the concentration u(x, y, z, t) of nanoparticles in the vicinity of the randomly rough surface by means of a DEP process.

The third magnified detail 91ad shows an alternative to the randomly rough surface of the second magnified detail 91q. In particular, a periodic surface 91ae provides a means for the diffraction of light in the light guide. As was the case for the randomly rough surface the nanoparticle concentration u(z, y, z, t) in the colloid 91f provides a means to turn the diffractive scattering on or off. However, the scale of the periodic structures in 91ad is much smaller than the stochastic structures in 91q and thus the ability to turn the surface ON or OFF may be less robust as there is less volume for the light to interact with a large number of nanoparticles.

FIGS. 92-93 show an idealized example of refractive indices and nanoparticle volume fractions used for each layer of a XR head set lens based on dielectrophoresis. This is done to further illustrate the basic principles of operation using concrete numerical values. That said, it is to be understood that the refractive index (RI) values listed are spatial averages and that in fact there are spatial distributions of particles providing a spatial distribution of the RI. See for example the steady state concentration 10a curve, which shows essentially three RI regions. The first region is where $u \approx 0$. The second region is a transition region where $0 < u < 2u_0$ and finally the region where $u \approx 2u_0$. For the purpose of FIG. 93 there are flat portions of a steady state curve, similar to the approximately flat portions of the curve that is shown in the steady state concentration 10a curve.

In particular, FIG. 92 shows a table of the layered region properties of the corresponding figure of the layered structure in FIG. 93. The external environment 93a is typically air, vacuum or water. For example, if the external environment is sea water then the RI is going to be about 1.35 as is indicated. This might arise if the XR headset is being used for an underwater diver's goggles.

The next layer is the solid-phase external cladding layer 93b. This material has a refractive index of about 1.49. This is typical of polymethyl methacrylate (PMMA), i.e. acrylic. This layer provides a separation from the external environment and allows TIR to occur at its interface with the subsequent light guide layer 93c irrespective of the external environment, including dirt on the external surface of the external cladding layer 93b of the first lens.

The next layer is the solid-phase core light guide layer 93c having a RI of about 1.54, as is typical of cyclic olefin copolymer (COC). The light guide layer may be gently curved as is typical of stylish glasses and highly functional face masks. The light guide layer guides the light from the RGB laser to the general vicinity of a pixel.

The light guiding process is substantially in a non-colloidal medium. The only place that the guided light has any opportunity to interact with the colloid is at the boundary of the light guide layer with the colloidal cladding layer. However, the colloidal cladding layer is a liquid with a spatial distribution of high RI nanoparticles. Under ideal conditions for the light guiding process the colloidal cladding layer is configured so that there are no nanoparticles, i.e. just the colloidal liquid, at the boundary between the solid core and liquid cladding so that there is no opportunity for undesired low-level light scattering form light that is inside the light guide. This is shown as the segmented low RI cladding regions 93d and 93e, which occur on either side of a pixel region.

To get light to the eye of the user it is necessary to spoil the light guiding properties of the light guide over the desired pixel region by changing an electrical parameter such as one or more of the electrode-to-electrode voltage amplitude, phase, and excitation frequency so that the distribution of nanoparticles changes quickly and causes the average refractive index to ideally become the same as the light guide layer 93c. This is a process of RI matching so that there is no refraction or reflection at the solid-to-colloid interface. This is shown as the pixel RI matching (RIM) layer 93f, where the nanoparticle concentration $v_S=10\%$ is a constant through the entire thickness of the layer.

Notice that a constant of $v_S=10\%$ throughout the pixel RIM layer 93f implies that there must be a volume fraction $v_S=20\%$ on adjacent sides, where the idealized distribution jumps from $v_S=0\%$ to $v_S=20\%$ at the halfway point across the control volume's gap width so that the average across the entire gap is $v_S=10\%$ as expected by conservation of nanoparticles. The gap width is on the order of 10 μm.

The average RI of the colloid in a region Q, assuming that nanoparticle diameters are small enough to ignore, is given by $$n(\Omega)=n_L+(n_S-n_L)v_S. \quad (759)$$

Thus, assuming a liquid phase polydimethyl siloxane having additives to increase conductivity and the Maxwell-Wigner frequency to about 1 MHz so that its RI is $n_L=1.49$ and lanthanum high RI glass spheres of 50 nm diameter and with $n_S \approx 2.0$. For this example the need for special coatings on the nanospheres to ensure colloidal properties will be ignored. Therefore, the RI in the layered regions are $$n(93d)=n(93e)=1.49+(2.0-1.49)(0.0)=1.49 \quad (760)$$

$$n(93c)=n(93f)=1.49+(2.0-1.49)(0.1)=1.54 \quad (761)$$

$$n(93g)=n(93h)=n(93i)=n(93j)=1.49+(2.0-1.49)(0.2)=1.59 \quad (762)$$

where the light guide layer 93c is index matched to the pixel RIM layer 93f; and the beam shaper RIM layers 93g and 93h are RI matched to the transparent electronics layer 93i, and the second lens 93j. The transparent electronics layer 93i has transparent electrodes, such as transparent electrode 93m, which may be fabricated by a thin layer of transparent indium tin oxide, conductive carbon nanotubes, graphene, borophene, and other transparent and conductive materials.

Notice that the pixel RIM layer 93f is RI matched to the light guide layer 93c, but is not RI matched to the transparent electronics layer 93i. This means that the stochastically designed random surface 93k in the pixel region is actively scattering light that is distributed from the light guide layer 93c. However, the stochastically designed random surface 93k is not scattering light outside of the pixel region because in these regions the RI of the colloid and the electronics layer, which includes the random surface, has a matched RI.

Ultimately, the light that is scattered off of the random stochastic surface passes through the second lens 93j and into the air region of the external eye environment 93n. The directional scattering properties of the random stochastic surface are chosen to deterministically send light into the user's eyes independent of the user's look direction.

The XR glasses of FIG. 89 clearly shows the radial lines indicative of an RGB laser scanning back and forth in the curved lens. This scanning occurs independently in both lenses. Moreover, there is a need to curve the wavefronts of the RGB source laser so that there is a way to give the perception that the data is hanging at a certain distance from the user. An example of this might be a virtual keyboard that hangs in space at arms length so that data entry is possible or perhaps labels that are assigned to various parts of an object in front of the user.

The next objective of this section is to show how to implement a combined fast laser scanning and focusing device within the colloidal region between the external and internal lenses. FIG. 94A shows two colloidal cavities and parallel electrode configurations to induce an exponentially varying graded refractive index for beam scanning. This was described in FIG. 32 and its associated description. Note that in FIG. 94A there are two scanned beams, i.e. one for each eye of the XR headset. Additionally, FIG. 94B shows two colloidal cavities and curved electrodes that follow the curved ray trajectories provided by the parallel electrodes of FIG. 94A of two scanned laser beams to impress curvature on the laser wavefront for each eye of the user. The electrodes in FIGS. 94A-B are not shown with connections to voltage sources in order to reduce the clutter in the figures.

More specifically, FIG. 94A shows a first colloidal control volume 94a and a second colloidal control volume 94b on either side of two RGB lasers contained in RGB laser sources 94c. The independent laser sources send radiation in opposite directions along the optical axis 94d into the two colloidal control volumes 94a and 94b.

Each of the colloidal control volumes has a set of straight parallel electrodes parallel to the z-direction, such as electrode 94e. This electrode array has a spatially varying voltage from electrode-to-electrode to induce an exponential variation in the volume fraction of nanoparticles $v_S$ in the x-direction. Moreover, the variation in this volume fraction is fast because we have set up a nanoparticle shockwave in the y-direction where the colloid only needs to have DEP-based advection over a limited spatial range in the y-direction. Said another way, the speed of change of the refractive index gradient in the x-direction is fast because nanoparticles are being forced into or out of the path of the laser light in the y-direction. The y-direction is the thin gap holding the nanoparticle colloid.

The variation in the volume fraction is chosen so that the refractive index varies exponentially over a limited range of x-values. To see how this can be achieved we imagine that a DEP-based shock wave has pulled all of the nanoparticles towards one wall of the control volume in the y-direction e.g. see the steady state concentration 10*a* curve. Then as we move towards increasing values of x the electrode voltages are adjusted to allow the refractive index to vary as provided by Eq. 539 over a limited range of x. Said another way, the steady state concentration 10*a* curve is slightly adjusted from x to x+dx by variations in the electrode voltage so that each ray sees a corresponding exponentially varying refractive index. Then the solution to Eq. 536 are given by Eqs. 549-560 and the ray trajectory is approximately circular as provided in Eq. 597. Thus the curved laser radome, an example of which is 94*f*, takes the form of a section of an approximate circle as provided by Eq. 598. The curved laser radome is formed by one of the walls of the colloidal control volume, which is located in the transparent electrode layer 94*g*, which is further located on a portion of a lens section 94*h* forming the XR head set.

Thus, curved ray trajectories form a first and second scanned laser 94*i* and 94*j*, which independently redirect RGB laser light with different wavelength combinations into the large lenses in front of the eyes of the user. The two devices of FIG. 94A can also be separated and included separately into the individual XR lenses of the XR glasses.

On the opposite side of the transparent electrode layer 94*g* layer is a second set of electrodes. This second set of electrodes is shown in FIG. 94B and are used to focus the laser radiation in one dimension. An example of a curved focusing electrode 94*k* has a curve shape that approximates the light trajectory, which is a portion of a circle. By way of review the reader should review FIG. 33 and its description. These focusing electrodes may operate at a frequency that is different than that of the scanning electrodes so that ponderomotive forces on nanoparticles are separate and distinct from the frequency of operation of the scanning electrodes. It is possible, for example, to have nDEP scanning electrodes and pDEP focusing electrodes, especially because the electrodes are on opposite sides of the transparent electrode layer 94*g*.

The focusing electrodes follow the light trajectory, therefore by varying the voltage from electrode-to-electrode to induce an additional $\delta n_{Focus}$, as shown by the refractive index variation 94*m* about the trajectory, angularly over 0. It should be clear that in FIG. 94B nanoparticle concentration is increased along the ray's curved trajectory so that a parabolic phase is induced across the laser's cross section. In this way the wavefront has curvature and the rays focus at a distance to induce the visual illusion of a point of light located at a distance. The wavefront in one-dimension is thus curved. To obtain curvature in another dimension additional electrodes and poderomotive forces can be installed.

In summary, an XR headset can be constructed by controlling a nanoparticle colloid between two solid lenses. In one portion of the XR lens the colloid provides a controllable cladding in a light guide. In another portion of the XR lens the colloid is used to create an exponential GRIN medium to both steer light towards the desired pixel and change the curvature of the wavefront to provide the illusion of depth to the user. The colloid response is a fast acting shock wave in the direction of the gap width between the lenses and this is adjusted to accommodate fast frame rates for RGB data overlays on the field of view of the user.

High-Power Lasers by Dielectrophoresis
Introduction to Prior-Art High-Power Fiber Lasers In this section a new class of high-power fiber laser is provides enhanced capabilities based on dynamic control of its internal optical structure. However, before providing these methods let's review how a typical prior-art fiber laser works in this subsection. The interested reader may also get more details by seeing "*High Power Fiber Lasers: A Review*," by Michalis N. Zervas and Christophe A. Codemard in IEEE Journal of Selected Topics in Quantum Electronics, Vol. 20, No. 5, September/October 2014.

One of the main problems with using a fiber optic to generate high-power laser light is in getting the optical pump power into the fiber's gain medium. A single-mode optical laser is very thin and also has a small numerical aperture. In contradistinction, a thick fiber optic is multi-modal and has large numerical aperture, but poor modal structure for the electromagnetic fields. To overcome this problem E. Snitzer proposed a hybrid solution in 1988 that uses a large numerical aperture for capturing pump light and a small numerical aperture for light amplification with a well defined modal structure.

In particular, while conventional low-power fiber optics have just a single core and a single cladding, a high-power fiber laser using Snitzer's approach typically has a core, an inner cladding and an outer cladding. Initially the core plus the inner cladding acts as the effective core and the outer cladding acts as the effective cladding, the pump energy is injected into one end of the fiber laser and the larger numerical aperture allows a large range of angular light directions to be injected into the fiber via solid-state lasers. The injected light then reflects by TIR within the effective core (core plus inner cladding). Thus, most of the light that is not TIR within the core is captured by TIR between the inner cladding and the outer cladding where there is no gain medium, moreover the overall modal structure of the electromagnetic fields is poor i.e. not a single well defined mode.

Nonetheless, by using Snitzer's approach light that is injected into one end of a high-power fiber laser can propagate to the other end, but with the energy in distinct regions. Clearly this is a good start as the light is in the fiber system, but not a sufficient condition for providing a high-power laser. In particular, the light energy that is propagating outside the core, i.e. in the inner cladding, now moves into the core. Thus, a means should exist for pump light to be removed from the inner cladding to the core with little ohmic loss. Moreover, the light that is trapped in the inner cladding has a well defined étendue which is a conserved physical quantity in an optical system. This etendue must be overcome if the light is to have enough room to "fit" into the fiber core. With this in mind we can turn to atomic processes for light absorption and radiation.

A first process, spontaneous emission typically occurs when an atom or molecule transitions from an excited energy state to an unexcited and lower energy state. If the excitation is due to absorption of a photon the spontaneous emission is called fluorescence when the time constant of the process is small and phosphorescence when the time constant is long.

A second process is stimulated emission, which occurs when an incoming photon of a specific energy interacts with an excited atom or molecule so that it emits light as it transitions to a lower energy state. Some atoms and molecules are better at this interaction than others. The input photon transfers it energy to the output photon(s) and can maintain phase, frequency, polarization, and direction of propagation that are identical to the input photon.

A third set of miscellaneous processes are also possible, for example a stimulating photon can in certain systems liberate two more equal but lower-energy photons into the same direction as the input photon. Also, two or more photons can combine within certain atoms and molecules and liberate a higher energy photon. Thus, both up conversion and down conversion (in photon energy) are possible. This means that the wavelength of the pump laser may be different than the wavelength of the laser's output. This allows the pump light to pass unhindered through a Bragg grating that is etched or doped in the ends of the fibers, after which atomic and molecular up or down conversion of pump light changes the wavelength of the pump light so that it is reflected back and forth in the fiber due to Bragg gratings on each end. One of the Bragg gratings is typically configured to transmit a small amount of the energy trapped in the fiber core to allow for a continuous beam output.

A lasing process is started by light interacting with an atom or molecule to produce a random spontaneous emission and potentially up or down conversion; and then stimulated emission becomes dominant in the steady-state. So the fiber's core can be doped with gain producing atoms and molecules that are predisposed to provide both spontaneous and stimulated emission. The gain producing atoms come from rare-earth elements such as dysprosium, erbium, holmium, neodymium, praseodymium, thulium and ytterbium. Currently, ytterbium (Yb) is the most common dopant for high-power fiber laser applications.

To transfer photons from the inner and outer cladding to the core where it can be amplified requires that we overcome two restrictions to light entering and staying in the core: (1) etendue conservation, which forces some of the light to move through both the core an inner cladding instead of just staying inside the core and (2) the circular symmetry of a fiber's cross-section, which allows some input rays to spiral along a three dimensional helix that never intersects with the core. These helix rays may be piecewise continuous or smooth curves depending on the refractive index spatial distribution.

The inclusion of a gain medium like ytterbium into the core breaks the etendue conservation as the ytterbium absorbs and reradiates some light that passes into the core into random directions by spontaneous emission—i.e. by fluorescence and phosphorescence. Some of the spontaneous emission goes into the needed direction along the fibers length and is captured by a TIR process and the amplitude of the light wave is then amplified by stimulated emission as an excited population inversion becomes pronounced. The light is then trapped in the single-mode core and is increasing in strength as it travels along the fiber. This light can also bounce back and forth along the fiber laser by including mirrors or Bragg gratings at the fiber ends.

So as light passing through both the core and inner cladding interacts with dopants like ytterbium in the core the some atoms get excited by fluorescence and phosphorescence from rays that are not properly aligned with the fiber core and radiate in random directions. Then, some of the fluorescence and phosphorescence light propagates into the desired direction along the core's optical axis and this provides a means to take pump light out of the inner core, where there is no gain medium, and transfer it to the inner core where there is a gain medium and population inversion.

To further increase the laser's efficiency we must take into account that there are still the previously mentioned helical rays, which never get a chance to pass into the gain producing core. To combat this situation various geometries are possible that can break the circular symmetry of the fiber optics. For example, offsetting the core from the center of the fiber or flattening one of the sides of the inner cladding. Many geometries have been proposed and implemented for symmetry breaking.

Additionally, many single fiber lasers can be combined into fiber bundles. If the fiber bundles are brought close enough together then evanescent light-field coupling allows the phases of the individual fiber lasers to synchronize. However, slight temperature variations between the fibers can cause tiny changes to the local refractive index of a single fiber. This leads to the loss of symmetry in the fiber bundle and increasing difficulty in keeping phase lock among the fiber lasers. Additionally, at the higher power levels a thermal run away effect is possible where local ohmic losses increase with increasing temperature, which further changes the refractive index and further increases the ohmic losses. Eventually the fiber can fail catastrophically. This process is even more problematic in fiber bundles where a balanced and symmetric system is needed for bundles of fiber lasers to phase lock and amplify successfully.

DEP-Based High-Power Fiber Lasers

Next, we consider how to use the optical properties of colloidal nanoparticles and the control of nanoparticle spatial distributions, via DEP-based ponderomotive forces, can be used to input, guide, amplify, and launch laser light, especially high-power laser light, without the use of the classical fiber optic structure previously discussed in the prior section and prior-art. Instead, only a single solid gain-medium doped fiber core (i.e. typically but not necessarily a single-mode fiber) is needed and that the solid inner cladding and outer cladding of the prior-art fiber lasers are not needed in certain embodiments. Furthermore, under certain special conditions even the need for a solid doped fiber core may not be needed. Instead a dynamic medium is introduced that can effectively act as the cladding or core and change its characteristics over time to improve power levels and efficiency.

Consider FIG. 95, which shows the refractive index as a function of radius $\xi$ in an annular system and is similar to FIG. 14 except that a fiber core of radius $r_0$ has been centered at $\xi=\xi_0$. The refractive index profile is shown as piecewise linear function for convenience. A first RI segment 95$a$ and a second RI segment 95$b$ show decreasing RI as the radius $\xi$ increases. This decrease is in accordance with Eq. 417, which is linearized in Eq. 418. The linearized change in refractive index n is associated with the linearized change in the radius $\xi$ by $$\delta n = n_0 \left( \frac{\delta \xi}{\xi_0} \right). \tag{763}$$

This equation is the averaged RI of a colloid and its slope is adjusted electronically. Inside the linearized refractive index region a third RI segment 95$c$ is shown. This third segment represents a solid fiber core. This fiber core may be doped with a gain medium like ytterbium to provide amplification of light and laser action. It is often the case that the RI of the core may have a RI distribution different from a constant to better control the modal structure of the electromagnetic fields within the core region, this non-constant case is also included by reference.

A fourth and fifth RI segment 95$d$-95$e$ may take on any reasonable value or distribution of refractive index and has been shown as taking on the value of $n_0$ for convenience, but may actually be a strong function of radius and voltages used in the DEP process. The critical issue in FIG. 95 is that the DEP-based refractive index and the refractive index requirements for confinement of light in a circular trajectory match in the vicinity of $\xi=\xi_0$. This is established by correctly setting DEP electrode voltages and the initial nanoparticle volume fraction.

The laser beam extent 95f is represented by dashed lines in FIG. 95. Input laser light in the laser beam extent 95f region is intercepted by the solid third RI segment 95c and it is amplified by the solid fiber optic therein. Light outside the fiber is guided in an approximately circular trajectory to first order. However, to second order there are slight variations in the trajectory and the pump beam will gradually intercept the core where spontaneous emissions will eventually send the light down the solid fiber core where it will be amplified.

Therefore, the function of the solid prior-art fiber optic cladding to contain the pump beam is replaced by the refractive index distribution of the colloid in the circular control volume. The function of the prior-art fiber optics having non-circular cladding shapes, offset asymmetric cores and other asymmetries is replaced by the perturbation of the second order effects in the refractive index distribution in the colloid that disturbs the circular trajectory of the rays to non-circular so that all rays intersect the core.

Some prior figures can now be reused. In particular, FIGS. 15A, 16 and 18 show a light beam 15e and 16f that propagate along a curved (circular) trajectory 18a respectively. These regions are herein updated for this discussion so that instead of a light beam being in a colloid the light beam is in a fiber core. For example, light beam 16f is now to be interpreted as a fiber core and the reader may ignore the nano-particles shown inside the circular region 16f, which is now to be interpreted as a solid fiber core doped with a gain medium— e.g. ytterbium.

In summary, pump light is confined by the GRIN refractive index distribution 95a and 95a which are designed to provide a circular light trajectory and laser light is contained by the fiber core 95c. Advantages of this configuration include:

Direct control of the refractive index distribution surrounding the fiber laser in space and time as the laser operates. This provides a means to compensate for heating effects to control thermal runaway and also provides a Q-switching capability.
  The solid fiber optic is very much simplified, with the inner and outer cores removes, thereby lowering the manufacturing complexity and cost.
  A single fiber core may be replaced with a fiber bundle where the cores are very close to each other, even touching, so that there is strong tendency for coupling and phase-lock across the fibers in a fiber bundle.

In another embodiment FIG. 96A shows a schematic of a circular laser geometry based on a single solid core doped fiber in a colloidal medium with a refractive index distribution that allows large numerical aperture of the pump light and single mode laser output. In particular, a pump beam 96a passes through a solid transparent medium 96b and enters a colloidal medium 96c in a control volume formed between an inner containment wall 96d and an outer containment wall 96e.

In addition to the colloidal medium in the control volume there is also a solid doped fiber core 96f. This core is typically made of a highly transparent glass. As the pump beam 96a enters the control volume it comes under the influence of the non-uniform refractive index distribution detailed in FIG. 96B. The colloid has a non-uniform colloidal refractive index 96g and 96h. The glass fiber core refractive index 96i and is centered at $\xi=\xi_0$. The solid transparent medium 96b has a refractive index of $n_0$ as indicated by containment refractive index 96n and 96o, which smaller than the refractive index of the colloid and fiber core in the control volume. Therefore, TIR effects are eliminated for the pump beam on entering the control volume. The pump beam 96a refracts at the outer containment wall 96e, but this is not shown explicitly in the schematic of FIG. 96A.

After the pump beam enters the control volume several process are at play. First, the wide pump beam, with initially parallel rays, begins to bend towards the region of higher refractive index so that an oscillation of the rays about $\xi=\xi_0$ occurs. Second, these rays pass through the fiber core part of the time and are converted out of the pump beam into an amplified laser beam by spontaneous emission and stimulated emission respectively. Thus, we can see the schematic shows the oscillating rays of decreasing magnitude in a average circular trajectory as shown by the modified pump beam 96j. By properly setting the electrode voltages the pump beam can be made to bend in a circle electrodes are not shown in this figure to reduce image clutter, but examples are shown in other figures. Moreover, by setting different voltages at different positions along the control volume the confinement of the rays can be modified as needed, including release of the rays out of the control volume. As configured the pump beam decreases in oscillation magnitude as it moves in the propagation direction 96k. Thus, schematically the pump beam turns into the laser beam 96m, which is better described as modal energy in a single mode fiber, instead of ray energy.

There are a number of significant variations to the configuration of FIG. 96. In particular, the fiber core may be removed and the colloid configured to comprise nanoparticles that are doped with a gain medium like ytterbium atoms. The colloid may thus have two species of nanoparticles, those particles that have a gain medium and those nanoparticles that do not. This allows for nDEP and pDEP process to configure the colloid to replace the core and cladding functions of current fibers lasers with different species of nanoparticles. In another embodiment the single fiber laser is replaced by a fiber bundle. In another embodiment the solid transparent medium 96b becomes an electrode and is paired with an internal electrode as the inner solid medium 96p and the fiber spirals around the inner solid medium 96p. This last embodiment is now discussed in more detail in a slightly different embodiment because it is uniquely suited to a practical enclosure for a high-power laser.

In particular, FIG. 97 shows a high-power fiber laser core 97a (and 97aa) in a shaped channel 97b (and 97bb) where details are shown in the inset image. The doped fiber laser core is located between a first electrode 97c (and 97cc) and a second electrode 97d (and 97dd), which are formed to provide ponderomotive forces on nanoparticles in a colloid that is located in the interstitial space 97e between the electrodes. The second electrode 97d is shown as a cut away view so the internal structure of the first electrode 97c and high-power fiber laser core 97a are visible.

A harmonic voltage source 97f between the first and second electrodes provides the nonuniform electric field needed for controlling a helical light trajectory outside the fiber laser core 97a, which is where the majority of the light from a light laser pump beam is located before being converted into the desired output laser light by spontaneous and stimulated emission. This provides a non-uniform electric field for the needed ponderomotive forces of a DEP-process to create the refractive index distribution for guiding pump light and breaking propagation symmetries to improve pump conversion efficiency into laser light.

The shaped channel 97b can be any suitable shape for the purpose of providing the desired electric fields. The shaped channel may be part of at least one of the first electrode 97c and the second electrode 97d, however in this example only the first electrode 97c is shown with a V-shaped groove.

The shaping of the V-groove can easily be shown to provide a highly non-uniform field in the vicinity of the gain-medium-doped fiber core by means of the Schwartz-Christoffel transformation. In particular, for the electroquasistatic excitation of the electrodes we anticipate that the voltage potential V=V(x, y) will obey Laplace's equation $$\nabla^2 V(x,y)=0. \tag{764}$$

Let us strategically investigate two-dimensional electric fields and potentials as cross sectional cuts at potentially different orientations into our high-power DEP-based laser system. Let the complex number z=x+iy (note that z is not a coordinate direction here) and let us map this to a complex number w=U+iV by $$w=f(z) \tag{765}$$

which is analytic on the complex w-plane if it admits derivatives that are independent of direction then $$\frac{\partial U}{\partial x} = \frac{\partial V}{\partial y} \tag{766}$$

$$\frac{\partial U}{\partial y} = -\frac{\partial V}{\partial x}, \tag{767}$$

which are the Cauchy-Riemann equations. On eliminating U we obtain $$\nabla^2 V = \frac{\partial^2 V}{\partial x^2} + \frac{\partial^2 V}{\partial y^2} = 0 \tag{768}$$

and a similar equation exists for U. Additionally, if we assume that z=z(t) and w=w(t), where t is an arbitrary parameter (note t is not the time here) then the derivative of w=f(z) becomes $$\frac{dw}{dt} = \frac{df}{dz}\frac{dz}{dt} \tag{769}$$

and this has a complex argument angle given by $$\text{Arg}\left[\frac{dw}{dt}\right] = \text{Arg}\left[\frac{df}{dz}\right] + \text{Arg}\left[\frac{dz}{dt}\right], \tag{770}$$

where $$\theta_z = \text{Arg}\left[\frac{dz}{dt}\right] \tag{771}$$

$$\theta_w = \text{Arg}\left[\frac{dw}{dt}\right] \tag{772}$$

are the angles of the tangent vectors to the parametric curves z(t) and w(t) to their corresponding real axes. Therefore, $$\theta_w(t) = \text{Arg}\left[\frac{df}{dz}\right]\bigg|_{z=z(t)} + \theta_z(t). \tag{773}$$

Then at two separate values of t we have that $$\Delta\text{Arg}\left[\frac{df}{dz}\right] = [\theta_w(t_2) - \theta_w(t_1)] - [\theta_z(t_2) - \theta_z(t_1)]. \tag{774}$$

Moreover, if the parametric trajectories z(t) and w(t) are simple straight lines then the values of $\theta_z(t)$ and $\theta_w(t)$ are easy to determine. If in the z-plane the parametric curve z(t) is initially taken as the real axis so that $$z(t) = \begin{cases} |x|e^{i\pi} & t < 0 \\ |x|e^{i0} & t > 0 \end{cases} \tag{775}$$

and in the w-plane the parametric curve is taken as the negative real axis and a line at an angle of α with the real axis of the w-plane then $$w(t) = \begin{cases} \rho e^{i\pi} & t < 0 \\ \rho e^{i\alpha} & t > 0 \end{cases}, \tag{776}$$

where ρ>0 is the radius. Then if $t_1 \le 0 \le t_2$ we have that $$\theta_z(t_1)=\pi \tag{777}$$

$$\theta_z(t_2)=0 \tag{778}$$

and $$\theta_w(t_1)=\pi \tag{779}$$

$$\theta_w(t_2)=\alpha \tag{780}$$

so that the change in the argument of the derivative of the mapping function is the steering angle through which the parametric curve in the w-plane changes as it passes through the w-plane origin, therefore $$\Delta\text{Arg}\left[\frac{df}{dz}\right] = (\alpha - \pi) - (0 - \pi) = \alpha. \tag{781}$$

This is exactly the case for the function $$\frac{df}{dz} = Az^{-\frac{\alpha}{\pi}}, \tag{782}$$

where A is a complex number, which is chosen for scale and rotation. The argument of Eq. 782 is easy to determine if we use the phasor form of the complex number $z=\rho e^{i\phi}$ so that $$\operatorname{Arg}\left[\frac{df}{dz}\right] = \operatorname{Arg}[A] + \operatorname{Arg}\left[(\rho e^{i\phi})^{-\frac{\alpha}{\pi}}\right] = \operatorname{Arg}[A] - \frac{\phi\alpha}{\pi} \quad (783)$$

Therefore, the change in the argument of Eq. 782 is $$\Delta\operatorname{Arg}\left[\frac{df}{dz}\right] = \left[\operatorname{Arg}(A) - \frac{(0)\alpha}{\pi}\right] - \left[\operatorname{Arg}(A) - \frac{(\pi)\alpha}{\pi}\right] = \alpha. \quad (784)$$

This is the same as required by Eq. 781. Therefore, we may generalize Eq. 782 for the derivative of the mapping function to allow for a piecewise parametric curve in the w-plane, then in terms of a product expansion $$\frac{df}{dz} = A \prod_{m=1}^{M} (z - z_m)^{-\frac{\alpha_m}{\pi}} \quad (785)$$

and $$\omega = f(z) = B + A \int \prod_{m=1}^{M} (z - z_m)^{-\frac{\alpha_m}{\pi}} dz, \quad (786)$$

where B is a complex integration constant.

For the case considered in the simple example of FIG. 97 we take the fiber laser V-groove to be an equilateral triangle in a flat plane and a cover plane overhead. Then we can take the critical points in the z-plane as $$z = -1, z_2 = 0, z_3 = 1, z_4 = 2 \quad (787)$$

where in the w-plane the corresponding points are $$w_1 = -1, w_2 = -i\sqrt{3}, w_3 = 1, z_4 \infty \quad (788)$$

and the corresponding steering angles are $$\alpha_1 = -\frac{\pi}{3}, \alpha_2 = +\frac{2\pi}{3}, \alpha_3 = -\frac{\pi}{3}, \alpha_4 = +\pi \quad (789)$$

so the mapping function is $$f(z) = B + A \int (z+1)^{1/3} z^{-2/3} (z-1)^{1/3} (z-2)^{-1} dz \quad (790)$$

$$\approx B + A \int (z+1)^{1/3} z^{-2/3} (z-1)^{1/3} dz \quad (791)$$

$$= B - 3A(z-1)^{1/3} z^{1/3} (z+1)^{1/3} (z^2-1)\,_2F_1\left[1, \frac{3}{2}, \frac{7}{6}, z^2\right] \quad (792)$$

where $_2F_1$ is the hypergeometric function $$_2F_1[a, b, c, z] = \sum_{n=0}^{N} \frac{(a)_n (b)_n}{(c)_n} \frac{z^n}{n!} \quad (793)$$

and $(a)_n$ is the rising Pochhammer symbol defined by $$(a)_n = \begin{cases} 1 & n=0 \\ a(a+1)(a+2)\cdots(a+n-1) & n>0 \end{cases} \quad (794)$$

The approximation in the second line for $f(z)$ is in anticipation of obtaining a closed form analytic solution corresponding to having the gap between the first electrode 97c and the second electrode 97d large enough that potential isovcurves are nearly parallel to the inner surface of the second electrode 97d when measured near the second electrode. The constants A and B are then found from solving the following two equations simultaneously to ensure the correspondence of z and w points. Accordingly, $$\lim_{z \to -1} f(z) = -1 \quad (795)$$

$$\lim_{z \to 0} f(z) = i\sqrt{3} \quad (796)$$

so we then obtain $$A = -\frac{\Gamma\left(-\frac{1}{3}\right)}{2\sqrt{3\pi}\,\Gamma\left(\frac{7}{6}\right)} \quad (797)$$

$$B = -i\sqrt{3} \quad (798)$$

where $\Gamma(\cdot)$ is the Gamma function. The solution is plotted in FIG. 97 as isopotential curves like 97g and electric fields like 97h. It is clear that there are significant non-uniform electric fields as is required for DEP processes. More careful field distributions are possible by changing the shape and extent of the electrodes.

Thus, input pump light 97i is contained in the close vicinity of the coiled fiber core, which is doped with a gain medium like ytterbium, as the fiber coils around the first electrode 97c the pump light is both guided to travel in a circle with minimal interactions with the metallic electrodes and maximally interact with the fiber laser so as to convert pump light into laser light. The geometry of the electrodes, and the resulting refractive index distribution, are chosen to break symmetries like cylindrical symmetries to maximize pump and fiber interaction. The geometry of the electrodes can also provide control of the polarization (spin angular momentum) and orbital angular momentum of the light passing through the fiber core.

There are a number of different embodiments that are possible including: using fiber bundles, having more electrodes so that there is more control over symmetry breaking, using periodic standoffs to hold up the fibers in the V-groves, different shape grooves, and having multiple layers of wound fiber. These are included herein by reference.

A completely different embodiment is shown in cross section for a colloidal fiber laser in FIG. 98A where in a solid, transparent, gain-medium-doped fiber laser core 98a is surrounded by a nanoparticle colloid 98b in a cylindrical containment vessel 98c. An electrode array embedded in the containment vessel wall, comprising electrodes such as electrode 98d, provides radial and angular control over the refractive index distribution. In FIG. 98A the nanoparticle distribution is purely radial and the process is nDEP. The voltage traveling wave has at least two separate phases for adjacent electrodes and the voltage amplitude is the same for each electrode. This produces a cylindrically symmetric refractive index distribution.

There are a couple of ways to break the cylindrical symmetry to avoid helical rays propagating into the page of the image. One way is to move the fiber core to a nonsymmetrical position and out of the center of the cylindrical symmetry. An alternative is to change the voltage amplitude or excitation frequency as a function of the electrode angle. This can pull the nanoparticles into asymmetric nanoparticle distribution 98e inside the control volume in the containment vessel.

Moreover, if the nanoparticle distribution and refractive index distribution are changed in time this helps to avoid local heating, thermal runaway and to allows better conversion of pump light into the desired laser light output. The colloidal nanoparticles are less prone to laser radiation damage and the colloid can be made into a medium that flows to carry away unwanted heat.

FIGS. 99A-99B show essentially the same thing as FIGS. 98A-98B, but explicitly show an example fiber laser bundle. The cores may touch or be held apart by fiber holders (not shown) so that there is a will defined space between each fiber laser where the nanoparticle colloid may be configured to a specific distribution.

It is worth noting that the nanoparticle colloid may also by photo reactive so that is cures on being illuminated with (typically) UV light. This would allow for a cladding to be manufactured comprising a complex refractive index distribution as a solid cladding. The DEP process only used during manufacturing to set up the desired GRIN distribution. Also, the same idea allows for regions of complex shaped gain medium where the colloid used in manufacturing contains nanoparticles doped with a gain medium like ytterbium atoms.

In summary, a DEP process in a nanoparticle colloid allows the optical properties of a fiber laser to use either dynamic or static GRIN environments for the cladding and core. Core made from conventional gain-medium doped glass may be augmented by colloidal claddings. Cores made from gain-medium doped nanoparticles are also possible. A fiber laser can now have cores that are very close together so that strong coupling allows phase lock across a fiber bundle. This stronger synchronizing signal among the fiber cores can allow a larger array of fiber lasers to be bundled and greater power to be delivered than current fiber lasers. Localized heating can be managed by dynamic reconfiguration of the refractive index along the fiber laser to mix the pump rays and ensure that symmetries are broken and that the pump rays pass through the gain medium in the core to allow stimulated emission to convert poorly directed pump rays into rays that are consistent with the modal structure of the core.

Fiber-Bundle Laser with Beam Combiner & Steering

In this section several components derived in the disclosure are combined to provide a high-power laser. This section therefore discusses a system of DEP-based components that come together for laser applications like high-power metal cutting, welding, sintering for 3D-printers, and additive manufacturing in general.

In particular, FIG. 100 shows a first portion of a fiber laser system with an integrated beam combiner and laser steering system. It comprises a first fiber laser subassembly 100a further comprising a coiled fiber laser bundle 100b that is coiled on an a first fiber laser holder 100c to allow a long fiber-bundle laser with large optical gain. The first fiber laser holder 100c is attached to a diode laser source module 100d, which provides the pump light to the fiber laser bundle via a first laser diode (not shown). For the sake of being specific we will consider the fiber laser bundle to have built-in fiber Bragg grating mirrors on the source end of the fiber laser and that the source laser diodes are at a wavelength that is different than the fiber laser's output. The first portion of a fiber laser system has an output fiber bundle 100e.

The fiber-bundle may comprise one or more bundled fiber cores that are doped with a gain medium like ytterbium atoms. The fiber cores are close packed and surrounded by a colloid that will provide beam confinement, symmetry breaking containment of pump energy and cooling. The colloid refractive index distribution may be dynamically changed to extend power levels and reduce localized heating and thermal runaway effects.

There are many ways that the fiber bundles can be incorporated into the system. In the embodiment shown in the inset image of FIG. 100 the fiber bundle 100f is packed into a hexagonal geometry and packed into a V-groove 100g that incorporates electrodes, such as electrode 100h, to control the refractive index distribution of the colloid surrounding the fiber bundle and allow pump beam confinement and symmetry-breaking to force pump light into the fiber cores and spontaneous emission in the fiber cores to redirect light into the typically single-mode fibers. The fiber bundle has fibers that are close or even touching so that evanescent light-fields can couple from fiber-to-fiber to induce phase-lock. For the avoidance of doubt, the V-groove is only one possible way to incorporate a fiber-bundle. Another way is to use fiber bundles like that shown in FIG. 99B. Other embodiments also exist.

FIG. 101 shows a second portion of a fiber laser system comprising said first portion and a plurality of additional fiber laser bundle subassemblies integrated to form an array of fiber lasers 101a attached to a diode laser source module 101b. The individual fiber laser bundles of the array may be of the same output wavelength or different output wavelengths, because a DEP-based beam combining is able to accommodate either configuration. The coiled fiber optics of the fiber laser bundle array are combined via a DEP-based power combiner, as has been described in FIGS. 60-64. An array of curved laser beam trajectories 101c is shown without its surrounding GRIN medium for clarity. For the avoidance of doubt note that curved laser beam trajectories 101c are not in a fiber optic or a fiber bundle, rather the trajectories are unbounded but controlled by a GRIN distribution.

FIG. 102 shows a third portion of a fiber laser system comprising said second portion and an optional mirror 102a that is utilized for a single wavelength power combiner and is not used for a multi-wavelength spectral power combiner. The third portion of a fiber laser system further combining a DEP-based variable focus lens having a first lens electrode 102b, a second lens electrode 102c and an insulator 102d. The variable focus lens being substantially discussed in regards to FIG. 56. The optical fibers, from a plurality of fiber laser subassemblies, are held in position with ball lenses using the fiber optic retaining structure 102e. A first external case 102f protects the laser from the external environment and it contains a reservoir of colloidal nanoparticles inside of the laser system that surround the fiber cores in the fiber bundles. A first external case 102f also provides shaped electrodes that fit around the array of fiber lasers 101a in FIG. 101, this is not shown in FIG. 102 explicitly, but is included by reference. The collimated laser beam 102g is shown as the last portion of the image.

FIG. 103 shows a fourth portion of a fiber laser system comprising said third portion and a broadband DEP-based beam steering assembly 103a based on the embodiments described in FIGS. 32-53. The body of the GRIN beam combiner 103b is shown before the beam steering assembly 103a.

FIG. 104 shows a fifth portion of a fiber laser system comprising said fourth portion and a fully enclosed and hardened protective shell 104a with integrated heat sink. The end of the laser system has a lens 104b that allows both an outbound laser beam 104c and an inbound laser signal 104d such as backscatter for sensing and imaging of the environment as is often needed in some applications—e.g. monitoring a laser cutting process. The laser has an azimuth field of view 104e and an elevation field of view 104f so that fully electronic scanning of the laser is possible as may be desirable in 3D-printing applications.

Thus, dielectrophoresis-based light-control is used in high-power laser applications like metal welding, cutting, and hole drilling. Variations of the same technology used in these industrial process may also be used for power beaming to drones to keep them aloft for extended periods (e.g. for communications, or package delivery), provide the energy for unconventional forms of aerospace propulsion and many other applications.

Underlying these applications are physical process that are controlled by DEP-based optics, including: beam steering, beam combining, wavefront control for conventional focusing, wavefront control as part of an adaptive-optics system to overcome atmospheric thermal and non-linear effects, laser gain-medium control, bundled fiber laser arrays, and overall thermal control of the high-power laser.

For example, in FIG. 105 we see an example of a commercial laser machining system that is based on the laser system just described. A fiber laser system 105a is shown cutting a laser machined part 105b. A cut line 105c is shown amid sparks being emitted form the cutting process. Note that the ability to have multiple laser wavelengths is useful for cutting different materials having different absorption properties. Also the ability to steer the beam can give additional degrees of freedom in machining a part.

Solar Collectors by Dielectrophoresis

Introduction to High-Temperature Solar Processing

The direct use of the sun's energy has many advantages for certain high-temperature applications. Moreover, photovoltaics has significant disadvantages for energy intensive applications that require very high temperature heating. This is because even at the theoretical limits of solar cell performance, i.e. the 33.7% at 1.34 eV band gap Shockley-Queisser limit, roughly 67% of the solar energy is lost in its conversion to electricity and therefore it really makes no sense to subsequently convert the remaining 33% of sunlight's energy back into heat from electricity—all the while throwing away 67% of the sunlight as heat anyway. A better use of sunlight for heat intensive applications is to use 100% of the sunlight radiant heat directly.

This has strong implications for lowering costs on industrial processes like smelting of steel, water purification by desalination, and utility-scale high temperature materials processing. This is especially true of applications that can also benefit from electricity generation, e.g. for sale to the public, by solar thermal processes when the materials processing is not active. Thus, allowing the down time between materials processing runs to also generate revenues by electricity sale to help offset operational costs.

However, high-temperature materials processing (and electricity generation) by the direct use of the sun's radiant energy requires sun trackers. However, today's prior-art sun tracking technology wastes as much as 90% of the solar energy collection area, is open to the environment, and is based on high-cost low reliability mechanical parts. This is not economical and it is not environmentally friendly.

The underlying problem is more easily seen with the aid of FIG. 106. Consider the performance of today's sun trackers, similar to that shown in FIG. 106A, wherein we see an east-west cross section of a tracking array 106a in its morning configuration. The array can be either one Degree-Of-Freedom (1-DOF) or 2-DOF and is set on the ground 106b. Observe that the early morning sunlight 106c is 100% intercepted by the tracking solar mirrors, which are used to direct light to a common focus to generate high temperatures. An example of a mirror on a tracker that is 106d, which is configured for the morning reception. Clearly in the morning, when the sun is close to the horizon plane, there is a very efficient utilization of the available sunlight—100%. Morning shadows, such as 106e, clearly do not interfere with the operation of collecting sunlight. The same principles also hold during the evening when the sunlight is coming from the opposite direction (not shown). In contradistinction, FIG. 106B shows the same east-west cross section in the noon configuration 106f. Clearly only a small fraction of the sunlight intercepted 106g by mirror 106h, is usable by the array of tracking receivers during the mid afternoon—i.e. when the sun is strongest and highest in the sky. At noon the interstitial region 106i is clearly where there are significant losses of sunlight and energy. The underlying problem of light loss between mechanical sun trackers manifests itself in all current sun tracker configurations.

Current solar tracking systems have the greatest efficiency at harvesting the available solar energy falling on a fixed area of land when the sun is least intense, in the early morning and late in the evenings. This is completely contrary and incompatible to what is needed to maximize performance and allow the solar concentration process to be contained in a compact building to protect the environment instead of spread out over huge fields. Ideally, the efficiency in capturing solar energy across a fixed area should be 100% independent of the time of day and the dangerous temperatures and light flux of concentrated solar energy should be contained and separate and from the external environment (e.g. birds, etc.).

How the sun interacts with current solar array geometries is more easily seen with the aid of FIG. 107, which shows a number of representative geometries of prior art of solar tracking arrays. Each configuration shown in FIG. 107 is demonstrated by the use of 16 solar receivers of equal area.

A first array 107a shows sixteen solar receivers that have 0-DOF, are zenith facing and have a footprint bounded by square $a_1 a_2 a_3 a_4$. Note that there is no panel-to-panel shadowing in this particular configuration, but the sun does not usually point directly at the collectors either.

A second array 107b shows sixteen solar receivers that have 0-DOF, are statically tilted up at an angle equal to the latitude angle of the installation and have a footprint bounded by the rectangle $b_1 b_2 b_3 b_4$. Additionally, the spacing and tilting of each solar panel is chosen so that there is no panel-to-panel shadowing at any time of the year. Thus, the sun is more closely directed to the normal of each collector panel, but the interstitial area between panels is increasing compared to the first array 107a.

A third array 107c shows sixteen solar receivers that have 1-DOF that are capable of dynamically tracking the sun east to west, have a rotational axis that is parallel the ground 107g and have a footprint bounded by rectangle $c_1 c_2 c_3 c_4$. The receivers in this configuration are typically solar thermal parabolic troughs—the receivers shown only represent the input area of the parabolic troughs. Again, the spacing and tilting of the solar receiver is usually chosen so that there is no receiver-to-receiver shadowing during the majority of the day. Thus, the interstitial area between panels is increasing compared to the second array 107b.

A fourth array 107d shows sixteen solar receivers that have 1-DOF with a rotational axis that is tilted up at an angle equal to the latitude angle of the installation and have a footprint bounded by rectangle $d_1d_2d_3d_4$. Additionally, the receivers dynamically track the sun from east to west and also have a more direct average insolation in the north-south direction than array 107c. Again, the spacing and tilting of the solar collector is usually chosen so that there is no panel-to-panel shadowing during the majority of the day. Thus, the interstitial area between panels is increasing compared to the third array 107c.

A fifth array 107e shows sixteen solar receivers that have 2-DOF, are capable of dynamically tracking the sun daily from east to west as well as seasonally from north to south and have a footprint bounded by rectangle $e_1e_2e_3e_4$. Again, the spacing and tilting of the solar mirrors is usually chosen so that there is no panel-to-panel shadowing during the majority of the day. Thus, the interstitial area between panels is increasing compared to the fourth array 107d.

A sixth array 107f shows sixteen solar receivers that have 2-DOF, are capable of dynamically tracking the sun daily from east to west as well as seasonally from north to south and have a footprint bounded by rectangle $f_1f_2f_3f_4$. As in the previous cases the receivers in this configuration are typically mirrors (heliostats) that reflect the sunlight 107x into a solar tower 107w for processing. Again, the spacing and tilting of the solar panel is usually chosen so that there is no panel-to-panel shadowing during the majority of the day. Thus, the interstitial area between panels is increasing compared to the fifth array 107e.

A linearized mathematical model for the energy captured by a collector configuration is provided by the present author (Leo D. DiDomenico) in the article "*Towards doubling solar harvests using wide-angle, broad-band microfluidic beam steering arrays*," Opt. Express 23, A1398-A1417 (2015).

In summary, the model states that the time averaged total cumulative energy E [kwh] received by a solar power system, such as those in FIG. 107, over the course of a year with T [365 days] of operation is proportional to the local average annual solar insolation P [kwh/m²/day] including the effect of the day-night cycle and atmospheric conditions, the total land area A [m²] of the power system, the intrinsic area efficiency $\eta_a$ of the solar receivers (i.e. the ratio of active solar receiver area to the array's land area), the solar receiver's conversion efficiency $\eta_r$, the optical efficiency of the collector $\eta_o$, and the annual average cosine factor $\eta_c$ between the geometric normal to the solar receiver's input and the Sun while the Sun is above the horizon, such that $$E = PAT\eta_a\eta_r\eta_o\eta_c \quad (799)$$

$$\eta_c = \langle \cos\psi \rangle, \quad (800)$$

where $\langle \cos\psi \rangle$ is the average cosine of the angle $\psi$ between the collector panel normal and the direction of the sun when the sun is above the local horizon for the solar array configurations of FIG. 107. The important point that the reader should take away from the above equation is that if the area and location of a solar power system is fixed at a restricted parcel of land then Eq. 799 has the parameters P, A and T fixed and all that is left to determine the annual energy collected E is the receiver efficiency, area efficiency, optical efficiency, and average cosine angle between receiver normal and the sun.

Moreover, from orbital mechanics it can be shown that the annual average above-horizon cosine of the angle between the collector normal and the sun is the product of the average East-To-West (ETW) & North-To-South (NTS) area projections whereby $$\eta_c = \eta_{ETW}\eta_{NTS}. \quad (801)$$

and $$\eta_{ETW} = \frac{1}{\pi}\int_{-\pi/2}^{+\pi/2}\cos x\, dx = \frac{2}{\pi}. \quad (802)$$

Additionally, $$\eta_{NTS} = \frac{1}{2\epsilon}\int_{\theta_{LAT}-\epsilon-\alpha}^{\theta_{LAT}+\epsilon-\alpha}\cos y\, dy \quad (803)$$

$$= \frac{\sin\epsilon}{\epsilon}\cos(\theta_{LAT} - \alpha)$$

$$\rightarrow J_0(\epsilon)J_0(\epsilon^2/4)J_0^2(\tilde{e})\cos(\theta_{LAT} - \alpha)[\text{More Rigorous Result}]$$

where Jo is the Bessel function of the first kind of order zero, $\epsilon \approx 0.409$ radians is the Earth's tilt angel (obliquity angle) to the ecliptic in radians, $\tilde{e} \approx 0.0167$ is the orbital eccentricity of Earth, $\theta_{LAT}$ is the latitude angle of the solar receiver, and a is the tilt angle of the solar collector towards due south. Therefore, $$\eta_c = \begin{cases} \frac{2}{\pi}J_0(\epsilon)J_0(\epsilon^2/4)J_0^2(\tilde{e})\cos\theta_{LAT} & \text{For 107a} \\ \frac{2}{\pi}J_0(\epsilon)J_0(\epsilon^2/4)J_0^2(\tilde{e}) & \text{For 107b} \\ J_0(\epsilon)\cos\theta_{LAT} & \text{For 107c} \\ J_0(\epsilon) & \text{For 107d} \\ 1 & \text{For 107e} \\ \text{Numerical result typically} < J_0(\epsilon) & \text{For 107f} \end{cases} \quad (804)$$

where the case for 107f is typically determined numerically due to the non-uniform placement of heliostats.

From the above results we can determine that the energy collected for a fixed number of solar collectors is greatest for the fifth array 107e. However, if the we instead require that an industrial high-temperature solar plant operates in a containment building then the constrained parameter is not the number of solar collector heliostats, but rather the area of the collector, which is related to the building size and large capital expenditures. Said in another way, for a fixed containment building area some solar collector array configurations will be able to have more collector panels than for other solar array configurations. Therefore, some configurations will collect more energy than others.

With that insight let's compare the fifth array 107e with the first array 107e. In particular, from Eqs. 799 and 804 and assuming that insolation P, time T, plant area A, receiver efficiency $\eta_r$ and optical efficiency $\eta_o$ are the same and $\theta_{LAT}=35°$ we obtain the amazing result $$\frac{E_1}{E_5} = \frac{PA_1 T \eta_{a1} \eta_{r1} \eta_{o1} \eta_{c1}}{PA_5 T \eta_{a5} \eta_{r5} \eta_{o5} \eta_{c5}} = \frac{\eta_{a1}}{\eta_{a5}} \frac{\eta_{c1}}{\eta_{c5}} \quad (805)$$

$$\approx \frac{10}{\frac{2}{\pi} J_0(\epsilon) J_0(\epsilon^2/4) J_0^2(\tilde{e}) \cos\theta_{LAT}}$$

$$\approx 20$$

where the fact that in practice as little as 10% of sun-tracker area is used for 2-DOF sun trackers so that $$\frac{\eta_{a1}}{\eta_{a5}} \approx 10. \quad (806)$$

Therefore, when there is a compelling reason to have a small fixed area, such as the need for a safety containment building, then there is roughly 20× energy advantage to using a area filling solar collector. This is exactly the type of solar collector that can be provided by a DEP process.

Additionally, a microfluidic solar concentrator array has the potential to provide between 10,000-45,000 suns of concentration with temperatures in excess of 3,500° C.—there are few materials that can withstand such a heat flux. Most materials, e.g. steel, will melt or vaporize almost immediately. Such an intense energy flux is useful for smelting steel, copper, glass, and other materials. The heat produced is essentially instant, free, and non-polluting.

There is no need for coal or natural gas to operate a high-temperature solar heat plant. All that is needed is a good insulator to ensure that heat is not lost form its containment vessel. From making better silicon ingots for electronics, to steel, copper, gold, glass, and even chemical reactors there is a real opportunity to directly use focused sunlight for large-scale industrial processes. Even the area of solar desalination has new opportunities with a DEP light steering technology.

Thus, the ability to steer light passing through large physical areas by fluidic techniques is an enabling technology for heat intensive industrial processes that occur in containment buildings. This in combination with recent advances in solar desalination and smelting offer real hope for water resources and clean industrial steel manufacturing.

For example, recent advances in smelting technology allow for carbon-free smelting as noted in "*STEP—A Solar Chemical Process to End Anthropogenic Global Warming. II: Experimental Results*," by Stuart Licht et. al., The Journal of Physical Chem. C 2011 115 (23), 11803-11821 DOI: 10.1021/jp111781a.

As another example, recent advances in the desalination of water as noted in "*Highly efficient solar vapour generation via hierarchically nanostructured gels*," by Fei Zhao, et. al. in Nature Nanotechnology 13, 489-495 (2018) having DOI: 10.1038/s41565-018-0097-z; and "*Architecting highly hydratable polymer networks to tune the water state for solar water purification*," by Xingyi Zhou, et. al. in Science Advances 2019 Jun. 28, Vol. 5 no. 6, eaaw5484, and having DOI: 10.1126/sciadv.aaw5484. In these articles we see that material scientists have found a way to use hydrogels comprising water binding and light absorbing materials to increase the rate of evaporation from the previous theoretical limit of about 1.6 L/h/m² to a now measured 3.2 L/h/m². This is the highest solar evaporation rate ever reported and it is about 12 times the amount produced by todays commercially available solar stills. This technology can in principle be combined with the intense light and heat produced by the solar concentrators of this disclosure for commercial scale water desalination.

Thus, there is a significant motivation to provide large area (i.e. at least 1 m²) digitally controlled pieces of glass that can be used in collector arrays to steer and concentrate sunlight over large areas in a cost effective way. Such a glass panel could be arrayed into large solar power and material processing plants. The principles of operation of such a transparent collector and concentrating panel is the subject of the next subsection.

DEP Solar Collectors, Concentrators, and Directors

Consider the prior-art of FIG. 13 solar collector in cross section, which when run in the reverse direction for light propagation shows a general configuration for redirecting solar energy by using index matching liquids. This techniques was developed by the current author (Leo D. DiDomenico) in the allowed patent application entitled, "*Wide Angle, Broad-Band, Polarization Independent Beam Steering and Concentration of Wave Energy Utilizing Electronically Controlled Soft Matter*," having U.S. patent application Ser. No. 15/480,053 and filed on 2017 Apr. 5, which is included here in its entirety by reference.

This solar collector can be reconfigured to eliminate the need for advective flows along the long length of the microfluidic control channels (μFCCs), the need for vacuum regions in the μFCCs, and the need for an index matching liquid (IML) reservoir. Instead it is possible to use a colloidal system of nanoparticles under the influence of DEP-based ponderomotive forces to control the direction of sunlight for large area solar collectors, concentrators, and redirectors of sunlight. Applications include: concentrating solar power, concentrating solar desalination, concentrating solar smelting of steel, and others.

More specifically, it is possible to provide a DEP-based solar collector having curved (or piecewise flat) μFCCs that act as controllable mirrors and that is based on the GRIN optical switch principles. This has the distinct advantage of allowing electrodes to be easily manufactured on or in proximity to the surface of the transparent window-like sheet instead of in the proximity of the μFCC inside the solar collector panel.

In FIG. 108 a new version of the prior-art of FIG. 13 is provided. This new version eliminates the need for a reservoir for an index matching liquid (IML) and may be easier to manufacture due to the location of the electrodes. Input sunlight 108a is converted into output sunlight 108b having a different propagation direction than the input sunlight.

The sunlight enters the input surface 108c and exits an output surface 108d. As the output direction is typically taken to have a fixed direction the output surface is optionally provided with a corrugated surface that allows sunlight to exit normal the solid transparent medium 108e to assist in reducing reflection losses.

There are a plurality of μFCC that form an array of control volumes 108f. These control volumes are thin and extend into the direction into the page of FIG. 108. There is also an electrode array 108g. The thickness of a control volume is on the order of 5 μm-10 μm. The spacing between curved μFCC is on the order of 100 μm. The thickness of the collector pane is on the order of 5 mm-10 mm.

A first inset drawing 108h and a second inset drawing 108i provide descriptions of the functionality of the device when sunlight is redirected or allowed to pass respectively.

In the first inset drawing 108h intermediate light ray 108j is directed to output light ray 108k by a process of TIR at TIR point 108m. This process occurs between the solid transparent medium 108e and a substantially liquid side and low refractive index side 108p of μFCC 108n. The opposite side of the μFCC has a high density of nanoparticles. In the first inset drawing 108h the right hand side of the μFCC has a low density of nanoparticles (and a low refractive index) and the left hand side of the μFCC has a high nanoparticle density (and high refractive index). Thus, if the solid transparent medium 108o has a high refractive index relative to the low refractive index side 108p of the colloid in the μFCC then losses TIR can occur.

Alternatively, if the nanoparticle concentration is uniform throughout the μFCC 108q, as is the case in the second inset drawing 108i, then the intermediate light ray 108r passes directly through the μFCC 108q into output light ray 108s. This occurs because the refractive index of the colloid in the μFCC is uniform and substantially equal to the refractive index of the solid transparent medium 108t. Thus the μFCC becomes invisible instead of effectively mirrored by TIR.

The change in the refractive index inside each μFCC is controlled by the voltage excitation on the electrode array 108g. Also, the extent of the refractive index separation along the μFCC is also controlled by the excitation on electrode arrays. The electrode array comprises long thin electrodes that are long in length into the page of FIG. 108. Said another way, FIG. 108 shows a cross section of the electrodes along the thin dimension. For example, electrode 108u is has an extended length into the page of FIG. 108. This extended length can be on the order of a meter even if the electrode cross section only is on the order of 100 microns.

In the solar collector of FIG. 13, which is from above mentioned US patent application "Wide Angle, Broad-Band, Polarization Independent Beam Steering and Concentration of Wave Energy Utilizing Electronically Controlled Soft Matter," having U.S. patent application Ser. No. 15/480,053, the refractive index matching liquid advects in the parallel direction 108v to the μFCC. However, in this disclosure the nanoparticles within the colloid advects predominantly in the tangent direction 108w to the electrode array 108g.

To control the direction of the ponderomotive forces relative to the electrode array requires that different types of phase excitation are used. Consider FIG. 7B, and recall that orthogonal ponderomotive forces are substantially directed in orthogonal directions according to $$F = \begin{cases} \langle F_x, 0 \rangle & \text{Using 2-Phases: } \{V_0 e^{i(0)}, V_0 e^{i\pi}\} \\ \langle 0, F_y \rangle & \text{Using 4-Phases: } \{V_0 e^{i(0)}, V_0 e^{i\pi/2}, V_0 e^{i\pi}, V_0 e^{i3\pi/2}\} \end{cases} \quad (807)$$

Other types of excitation, i.e. different amplitudes, phase and number of phases used may produce different mixtures of x-directed and y-directed podermotive forces on the nanoparticles. Therefore, we can use a 4-phase excitation in FIG. 108 to produce ponderomotive forces in the tangent direction 108w to the electrode array.

There are many variations on this approach to light control, for example, making a stack of similar cross sections, but of thinner composition and with only smaller portions of the curved μFCC for segmented light control allows smaller voltage amplitudes to be used in the system.

From a system's perspective a strategy may be employed that is based on tracking the sun from north-to-south (NTS), which requires essentially half the angular tracking capability compared to tracking the sun east-to-west (ETW). For a 1-axis (1-degree-of-freedom) tracker NTS tracking histori- cally has not made any sense for prior-art-systems because the sun moves predominantly in the ETW direction. However, when the curvature of the fluidic channels is directed NTS then by Fermat's principle and the variational calculus it can be shown that light propagating along curved microfluidic mirrors traverse a geodesic helix.

In particular, by Fermat's principle we know that a light ray in going from point A to point B must traverse an optical path length that is stationary with respect to variations of that path. Consequently, the variation 6 of the action integral must be zero $$\delta \int_A^B ds = 0, \quad (808)$$

where ds is a differential element of optical path length. The trajectory is a path in three dimensional space that is restricted to the manifold provided by a control channel. In cylindrical coordinates the line element ds is $$ds = n \sqrt{\left(\frac{dr}{d\sigma}\right)^2 + r^2 \left(\frac{d\phi}{d\sigma}\right)^2 + \left(\frac{dz}{d\sigma}\right)^2} \, d\sigma \quad (809)$$

$$= n \sqrt{\dot{r}^2 + r^2 \dot{\phi}^2 + \dot{z}^2} \, d\sigma \quad (810)$$

$$= L d\sigma \quad (811)$$

where n is the constant refractive index of the rigid transparent solid forming the control channels, r is the radius of the cylinder, $\phi$ is the cylinder's polar angle, z is the cylinders z-coordinate which is directed from ETW, $\sigma$ is the parameterization of the trajectory and L is the Lagrangian. Moreover, as the Lagrangian L is not an explicit function of the parameterization $\sigma$ we may consider the more convenient $L' = L^2$ as the effective Lagrangian with a constant r (i.e. for the spacial case of cylindrical control channels $\dot{r}$=0) so that the trajectory of the light rays must in general satisfy the two Euler-Lagrange equations $$\frac{d}{d\sigma}\left(\frac{\partial L'}{\partial \dot{z}}\right) - \frac{\partial L'}{\partial z} = 0 \quad (812)$$

$$\frac{d}{d\sigma}\left(\frac{\partial L'}{\partial \dot{\phi}}\right) - \frac{\partial L'}{\partial \phi} = 0 \quad (813)$$

the solution of which is easily shown to be a geodesic helix $$\phi = c_1 z + c_2, \quad (814)$$

where $c_1$ and $c_2$ are constants determined from the incident conditions of the ray onto the control channel manifold. Thus light corkscrews on the μFCC for a small distance as it changes some of its photon momentum from the ETW direction to the NTS direction.

The effects of the helical trajectory are especially pronounced in the early morning or late afternoon, however the direction of rotation in the early morning is opposite to that of late afternoon. This rotation or "twisting of light's trajectory" has the wonderful property of twisting predominantly ETW propagating sunlight into the NTS direction, thereby allowing a measure of control in the collection of sunlight that moves ETW.

In particular, FIG. 109 shows in cross section a hybrid solar collector and concentrator that has 1-degree-of-freedom in steering sunlight in the north-south direction. This is done to compensate for the daily and seasonal variation in the sun's trajectory across the sky due to the earth's tilt angle, additionally it redirects sunlight onto a solar receiver at a concentration greater than unity. This reduces the number of conventional solar receivers needed for a fixed area.

In particular, a hybrid solar collector-concentrator 109a comprises a beam steering system 109b, an optional reflector 109c and a solar receiver 109d. The solar receiver may, for example, be a photovoltaic receiver, a solar thermal receiver or a combination of electricity generation and water heating so as to provide a means to both cool photovoltaic cells and use any remaining waste heat for practical purposes. In the north-south cross sectional view shown (assuming the system location is in the northern latitudes of earth) the beam steering system 109b intercepts light over an annual angular range 109e, which is about 48° and is due to the earth's tilt angle and fixed rotation direction with respect to the plane of the ecliptic. The sunlight that enters into the beam steering system 109b comprises rays that are substantially parallel, having about 0.275° angular radius (to form a light cone) about the mean direction of energy propagation. The hybrid solar collector-concentrator 109a is configured electronically to accept this light independent of the time of day and redirect it substantially towards the solar receiver 109d.

The purpose of the optional mirror reflector 109c is to allow either a horizontal bottom surface, as might be required on a flat roof, or a larger output angular extent of light from the beam steering system so as to reduce complexity and cost. Consequently the optional reflector 109c, when utilized, may or may not be configured to be horizontal as is shown in the figure. An example of a mirror reflection 109f is shown for a horizontal mirror surface and a large beam steering angular output.

The magnified region 109g is shown for two example cases: the summer solstice and the winter solstice. The winter solstice magnification 109h shows an input light bundle 109i refracting into a transparent medium at a first surface 109j and light refracting out of the transparent medium at a second surface 109k. The output light bundle 109m typically has a wider angular extent than the input light bundle 109i due to the processing of the light by the beam steering system. Additionally, the input and output surfaces typically are provided with anti-reflection coatings, such as multi-layer dielectrics or a graded refractive index surface, which allow refraction without appreciable reflection losses.

In between the first surface 109j and the second surface 109k fluidic control channels have IMF injected or extracted so that a curved TIR based mirror is dynamically reconfigured. The winter solstice magnification 109h shows schematically that the upper portions of a fluidic control channel array are index matched by a uniform nanoparticle distribution. This is depicted, for example by the example deactivated mirror 109n, which has dashed curved contours. The lower portions of the control channels are not index matched so that activated mirrors, such as 109o, are available to redirect the sunlight.

The summer solstice magnification 109p shows an input light bundle 109q from a different input angle, however, now each fluidic control channel is reconfigured by changing the distribution of nanoparticles so that the curved mirrors of the mirror array allow a greater steering angle. An example of a fully activated mirror is shown as activated mirror 109r. Subsequently, sunlight that is refracted from the second surface forms an output light bundle 109s that is substantially the same as output light bundle 109m as projected onto the plane of the page independent of the time of day and the position of the sun.

Next, FIG. 110 shows in perspective a large concentrating solar plant. It may be many hundreds of meters in width and length. Details like wall thickness have been suppressed in the image to avoid unnecessary clutter. The concentrating solar power plant may use a high-temperature materials processing region to contain the extreme heat. Additionally, it is also possible to use a photovoltaic receiver, a thermal receiver (such as a molten salt energy storage device coupled to an electricity generating turbine) or a hybrid thermo-photovoltaic receiver that combines a molten salt energy storage system with a photovoltaic energy conversion to electricity. Note, because of the many possible choices of a receiver, the details of the receiver are not shown in FIG. 110.

Specifically, a concentrating solar collector 110a, comprising a wedge shaped section of a compound parabolic concentrator is typically situated on the ground 110b and positioned with the output aperture 110c pointing substantially due north when the solar power plant is on the northern hemisphere of earth. The concentrating solar collector 110a comprises an active input slab 110d that redirects sunlight, while allowing the light to pass through the device. As already mentioned this is similar to a beam steering system 109b described in FIG. 109, wherein a slab containing active mirrors is provided by DEP-based distribution of particles in a colloid. Additionally, the concentrating solar collector 110a is in this embodiment is substantially wedge shaped and has reflective sides 110e and 110f, which are reflective on the inside of the structure and follow a compound parabolic concentrator profile. Additionally, a reflective bottom 110g is opposite and below the active input slab 110d. Said another way: all surfaces are substantially reflective inside the structure except for structures associated with the input and output apertures, which are typically transmissive and absorptive respectively.

The concentrating solar collector 110a is shown inside a compass rose that is situated on the ground 110b. North (N), South (S), East (E), and West (W) are shown. Additionally, the in the sky above the concentrating solar collector 110a is shown a band of "figure eights," which are plots of equations of time 110aa separated by fifteen minute intervals. This band shows graphically in some detail the various positions of the sun over the course of a year and over each day of the year. The summer solstice side 110bb and the winter solstice side 110cc depict the angular extent of the sun in the sky, which is about $\pi/4$ radians. In contradistinction the horizon-to-horizon angular extent is about $\pi$ radians. The particular, design shown in FIG. 110 only needs to track the sun over about $\pi/4$ radians in the north-to-south direction to minimize the angular extent of the sun tracking.

A typical input ray 110h, which is incident from the sun, is shown intercepting the active input slab 110d and being redirected thereby into an internal ray 110i, which may (as shown) reflect off of the reflective bottom 110g into internal ray 110j. This ray is further redirected by the reflective side 110e into an internal ray 110k that intercepts the output aperture 110c. Different rays passing through the system may not need to utilize all three redirections shown here. The only required redirection is that provided by the active input slab 110d which provides a first stage of concentration. This concentration is caused simply by redirecting the input light towards the output at an angle close to the planar surface of the active input slab—see FIG. 109 and associated discussion. Most, but not all other input rays, also are redirected by one of the reflective sides 110e and 110f, which provide a second stage of concentration and are utilized at different times of the day. The reflective surfaces may be constructed of simple aluminum, which has a very large spectral bandwidth, is low-cost and durable within the protected inside of the concentrating solar collector 110a. In this way the product of the concentrations $C_y$, $C_z$ provides the overall two stage concentration $C_{active}$. For example, if $C_y=100$ and $C_z=100$ then $C_{active}=10,000$, which is sufficient to nearly instantaneously melt steel.

Optionally, a safety region 110m of the input slab may be made opaque and of low thermal conductivity. This region being formed to protect wildlife, such as birds, from intense light and heat. Thus, the concentrating solar collector 110a, has the unique capability of also being a containment vessel for intense concentrated sunlight and heat generated by concentrated sunlight. This is a particularly important capability because currently deployed conventional solar towers have been known to spontaneously ignite or even flash vaporize many hundreds of birds in the course of an hour or two, forming what those in the concentrating solar power industry call "streamers", which are dead or dying birds that are literally on fire and falling out of the sky after flying into the intense solar radiation field of unprotected and exposed solar tower receivers.

The concentrating solar collector 110a is also nearly 100% area covering. This is unlike todays heliostats, which can waste up to 90% of the land area and solar energy. The concentrating solar collector 110a therefore has much lower impact on the environment and is especially useful for solar applications where there is an intrinsic need for a containment building. Note that the containment building may be rigid or even inflated, such as large sports complexes. The roof of the inflated building would hold an array of concentrator panels with colloidal and DEP-based light control. Inflated building are low-cost and can support huge weights, for example even the weight of large amounts of snow on an inflated sports building will not collapse the building.

The next example of a solar tracker and concentrator is based on trading hardware complexity for software complexity by using reflective particles, e.g. metallic particles in a simple gap between two transparent sheets. These particles may be nanoparticles or they many be micron scale particles. In this solar tracker electrically large gratings are formed by controlling the distribution of reflecting particles within the colloid. This is related to the material already discussed in Section 7.8 "Beam Steering Fields For DEP-Based Gratings. As the sun moves the grating reconfigures to redirect sunlight towards whatever type of solar receiver is desired: solar cells, concentrating solar power molten salts, a solar smelter, a solar desalination receiver and others. The great advantage of an electrically large grating formed now by reflecting particles, see for example FIG. 44B, is that only a thin colloid layer, perhaps a few hundred microns thick, is needed between two sheets with transparent electrodes on the transparent sheets to provide ponderomotive forces. So instead of a curved µFCC, as shown in FIG. 108, we instead use software generated complex voltage waveforms on transparent electrodes, and these waveforms correspond to a specific reflecting particle distribution, i.e. a grating, to redirect sunlight. This was already discussed in the context of FIG. 49.

FIG. 111 shows another embodiment of a solar tracker that works in transmission. In particular, the sun 111a provides both direct sunlight 111b and indirect (scattered) sunlight 111c to an electrically large grating 111d covering a ground cavity 111e. The electrically large grating is configured to have an output direction that is slowly varying across its length from south to north so that, independent of the position of the sun, the electrically large grating output rays 111f and 111g are concentrated to a solar receiver 111h. This receiver may be photovoltaic or solar thermal. In the case of a solar thermal receiver the underground location of the receiver provides additional insolation which is very useful in increasing the thermodynamic efficiency of energy conversion, while removing the need for solar towers. The focusing of the rays form the solar tracker may be done either directly or, as in the example shown in FIG. 111, by means of another optical system like the secondary mirror 111i. The designation of north and south shown are only for the purpose of providing a specific example and may be changed to any other ground orientation by changing the optical transformation rules provided within the electrically large grating. This configuration is similar to that of FIG. 110 except that the electrically large grating need not be formed from a curved µFCC control volume that is formed in the solid transparent material. Instead just a simple region between two transparent sheets is needed.

To give the reader an idea of how the electrically large grating sun tracker is used in a high-concentrating photovoltaic solar panel a very simple design is provided as an example. In particular, FIG. 112 shows a cross section of a portion of one embodiment of a passive tracking solar panel based on an electrically large grating. The sun 112a changes it position in the hemispherical sky 112b during the course of the day and seasons. A transparent solid 112c encloses an electrically large grating 112d and reflects sunlight at a tracker input surface 112e to be processed by said electrically large grating 112d. The transparent solid provides protection from the environment and compresses the angular extent of the hemispherical sky to less than $2\pi$ steradians. Rays incident at the tracker input surface 112e are substantially reorganized by said electrically large grating and are emitted out of the tracker output surface 112f.

The emitted rays take the form of a cone of light 112g from each point along the electrically large grating. Note that only a finite number of these cones are shown in FIG. 112 to represent the infinite number of said doses of light. Additionally, for each point on the lens array input surface 112h there is an input ray cone 112j. As the sun progresses through its daily motion the electrically large grating changes orientation and creates the emitted light cones 112g independent of the position of the sun so that the lens array can focus the output rays though the lens array input surface 112h and the lens array output surface and 112i to a focus. A representative focal region is 112k. The focal region may contain a PV cell or other optical components, which might be located on a solar panel 112m.

FIG. 113 shows another embodiment of a solar tracker that works in reflection. In particular, the sun 113a provides both direct sunlight 113b and indirect (scattered) sunlight 113c to an electrically large grating 113d enclosed within a transparent solid 113e located near and below a solar tower 113f supporting a solar receiver 113g. This solar receiver may be photovoltaic or solar thermal. Independent of the position and direction of incidence of the direct and indirect sunlight the electrically large grating dynamically reconfigures under software control and redirects the sunlight into ray bundle 113h so that it is focused onto the solar receiver above the ground 113i. Again, the designation of north and south shown are only for the purpose of providing a specific example and may be changed to any other ground orientation by changing the optical transformation rules provided to the electrically large grating.

Next, we reconsider periodic potentials to generate particle distributions like that shown in FIG. 50. Now, however, we increase the scale of the system so that instead of diffraction we have the reflections and refractions of broadband ray optics. This is particularly useful for solar energy applications. Let us also admit the possibility that the particles in the colloid are larger than nanoparticles and that the particles are at least one of dielectric and metallic.

In the development of DEP based gratings in the section "Beam Steering Fields for DEP-Based Gratings," we initially assumed that the potential plane supported a continuous potential. This is not a necessary condition and we can sample the potential plane with electrodes. This is shown in FIG. 114 where a first transparent layer 114*a* and a second transparent layer 114*b* support a first electrode array 114*c* and a second electrode array 114*d* respectively. Located between the transparent layers and electrode arrays is a control volume that contains a colloid containing at least one of dielectric and metallic particles.

Figure 115A:
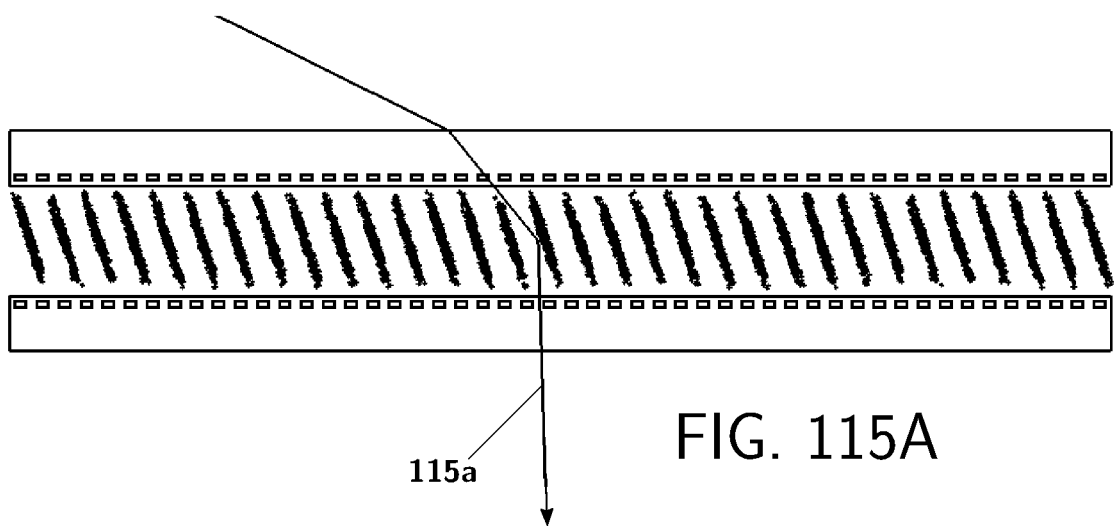
Figure 115B:
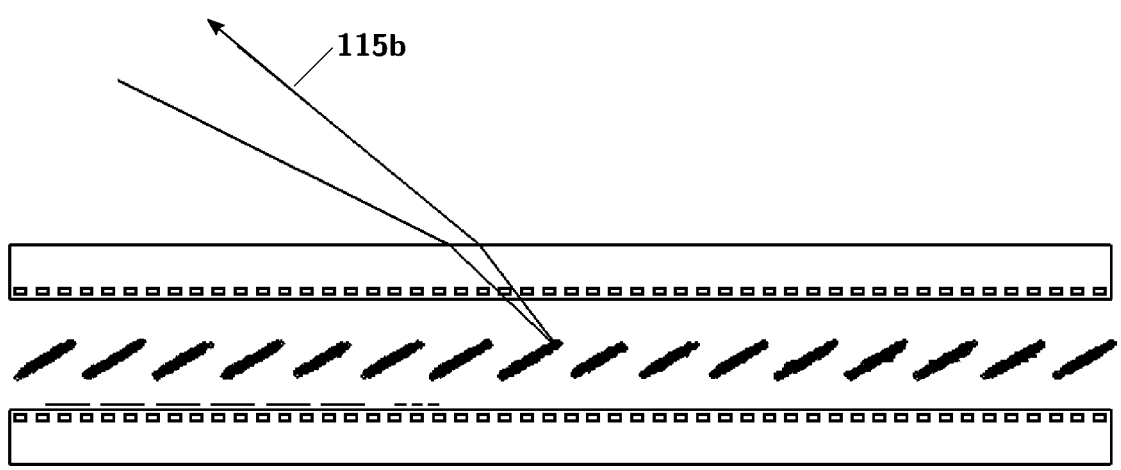
Figure 115C:
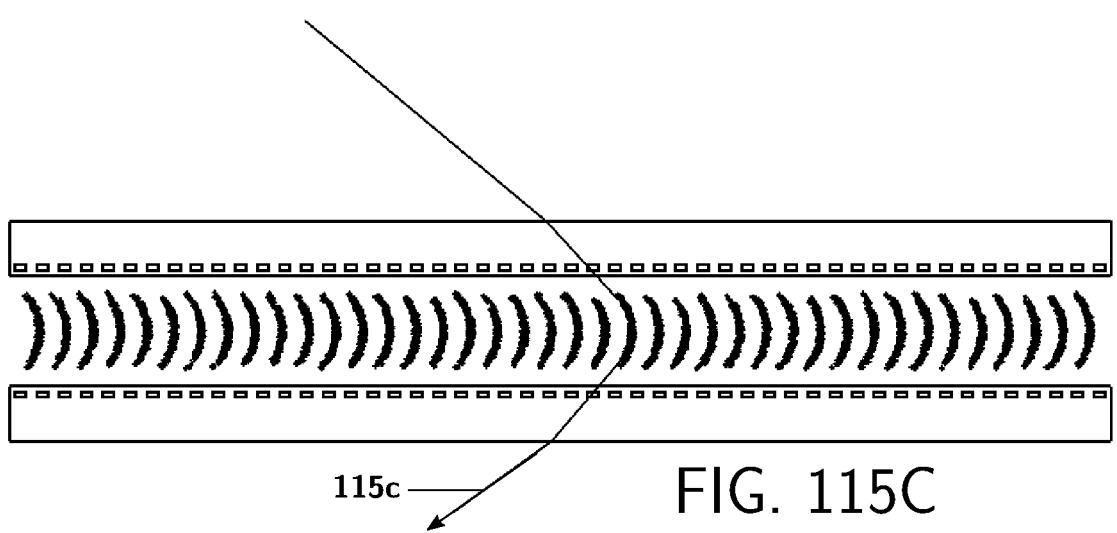

In FIG. 115A-C a cross section of a device similar to FIG. 114 is shown. The control volume in FIG. 115A supports grating elements that are essentially flat and that provide a means to redirect light 115*a* by reflection from metallic particles or by continuous refraction through dielectric particles forming a GRIN medium as was shown in FIG. 66. The control volume in FIG. 115B supports grating elements that are essentially flat and that provide a means to redirect light 115*b* by reflection from metallic particles only due to the potential for non-grazing incidence on the grating element as shown. The control volume in FIG. 115C supports grating elements that are essentially curved and that provide a means to redirect light 115*c* by either reflection from metallic particles or refraction through a GRIN medium. There are an infinite number of grating element designs that can be referenced based on the impressed potential waves that are impressed on the first and second electrode arrays.

Therefore, by the used of simple printed electrodes on flat panels we can impress non-uniform electric fields on particles in a thin colloidal layer to steer sunlight into a desired direction. If each panel has slightly different direction then we can focus large fields of sunlight to a common focus for the generation of electricity, desalination of water, smelting of steel, and many other applications.

Additional Applications

DEP-Based 2D-Reconfigurable Optics

The ability to control the position of many different types of particles in time by means of harmonic voltages, frequencies, and phases opens up the possibility of creating optical elements under control of software. Some possible parameters that may be controlled include refractive index, scattering cross section, focal length, beam scan angle, optical switch state (pass vs. reflect), polarization (spin angular momentum) state, orbital angular momentum state, wavelength, and potentially many other quantities.

As particles in a colloid get smaller and smaller the voltages needed to move the particles increase as there are fewer induced charges on the particles to provide electrical forces. To have fast acting optics at modest voltages therefore requires that the distance that the particles have to travel is small. This is a motivation for keeping all the optical processing in a thin control volume.

Therefore, consider FIG. 116, which shows an example of a software reconfigurable optical device that is capable of making lenses, beam steering devices, optical reflection switches and other functions. It has a first slab 116*a* and a second slab 116*b*, both of which are non-conducting and may be transparent if needed. The first slab 116*a* has a first electrode array 116*c* and the second slab 116*b* has a second electrode array 116*d*. In this particular embodiment the two electrode arrays are orthogonal to each other and on the inner surfaces of the slabs.

Between the electrode arrays and the slabs is located a colloid 116*e* (or suspension) having particles comprising at least one of a dielectric, a metal, a quantum dot, a plasmonic dot, a photonic crystal dot (photonic band gap dot), and a biological cell. Complex particles comprising different hybrid combinations and structures are also possible.

Connected to the electrodes are a first harmonic excitation 116*f* and a second harmonic excitation 116*g*. The excitations may be grouped into sets. For example, if every other electrode in the first electrode array 116*c* is energized with the same voltage excitation then there is a set of two repeating excitations for the first electrode array $\{A_1 e^{i(\omega_1 t + \phi_1)}, A_2 e^{i(\omega_1 t + \phi_2)}, \ldots\}$. If the second electrode array has four repeating voltage excitations then the excitations are: $\{B_1 e^{i(\omega_2 t + \psi_1)}, B_2 e^{i(\omega_2 t + \psi_2)}, B_3 e^{i(\omega_1 t + \psi_3)}, B_4 e^{i(\omega_2 t + \psi_4)} \ldots\}$. These excitations are predisposed to normal and tangential ponderomotive forces with the voltage amplitudes are the same. Thus, the distribution of nanoparticles normal and tangential to the slabs is controllable.

The parameters that can be placed under software control include: voltage amplitude $V_m$, frequency $\omega$, phase $\theta_m$, and the number M of electrodes in a group. This is available on each electrode array and provides a large number of degrees of freedom that may be exploited to change the optical properties of the colloid. Light can pass through and reaming the thin layer of colloid or it can pass through the slabs and the colloid. Various functions have already been described in the prior sections on beam steering and optical switching.

Clearly, the more electrodes (pixels electrodes for example) will give greater control at the expense of more complexity, however the result is greater control over light in a way that controllable by software.

Quantum Computing

The ability to control one or more nano-scale particles in space and time by means of harmonic voltages, frequencies, and phases opens up the possibility of positioning and interacting with atomic and molecular species for the purposes of quantum computing by means of a DEP process. Of particular interest here are room temperature quantum computers based on endohedral fullerenes, endohedral borospherenes, and other cage molecules.

A fullerene is a structural form of carbon, i.e. an allotrope of carbon, and can take many forms such as $C_{60}$, $C_{200}$ and large carbon nanotubes. The $C_{60}$ molecule has 60 carbon atoms in a cage-like ball structure, i.e. a Buckyball, that resembles a soccer ball (football) with geometry of a truncated icosahedron having a diameter of about 1 nm. These cage-like molecules are called cage molecules.

Endohedral $C_{60}$ fullerenes molecules have additional materials inside the Buckball cage. Those additional materials may include at least one of atoms, ions, and multi-atom particle clusters. Endohedral borospherenes, such as $B_{40}$, are also cage molecules like similar to the Buckball, but with an antiprismatic symmetry $D_2d$ symmetry group like that of a baseball with a unique axis of symmetry. Endohedral borospherenes also have additional materials inside the molecular cage. Endohedral nanotubes are also possible.

The most stable forms of fullerenes have been calculated from first principles to be $C_{60}$, $C_{240}$, $C_{540}$, $C_{960}$, $C_{1500}$, and $C_{2160}$ by the US Naval Research Labs. These fullerenes have diameters ranging from about 1 nm to about 50 nm. Thus, the largest fullerenes are comparable to the size of nanoparticles typically considered for modification of the refractive index of a liquid or gas host medium.

A carbon Buckyball $C_{60}$ made only of isotopic $C_{13}$ atoms can, in principle, serve as a 60-qubit quantum computer through the nuclear spin of ½ for each atom therein. However, it is fragile and typically requires cryogenic temperatures. In contradistinction, a room temperature atomic cage molecule can hold atoms to form a spin quantum register. For example, free nitrogen and phosphorus atoms possess a half-filled p-shell and a total electron spin of $S=3/2$. If these atoms are caged in fullerene molecules $C_{60}$ and $C_{70}$ respectively they retain their atomic character, which is useful for quantum computing.

Therefore, these cage molecules provide a way to protect the fragile quantum states of atoms, ions, and atomic clusters that are inside the cages from the external environment. One type of external environment is that of a colloid. That is to say that cage molecules can form a colloid (or suspension) in either a liquid or gas—even a very dilute gas.

The fullerenes (and borospherenes) can have covalently bonded chemical groups that extend the size of the molecules and give them modified shapes, chemistry, and physical properties. These derivatives are included here as well. Thus, another class of particles that is included in this disclosure are the cage molecules, their derivatives and endohedral forms. These particles, may be used to provide at least one of DEP-based assembly and a means for quantum interactions for quantum computing in a colloid or suspension.

The cage molecules are not the only systems of interest for DEP-based arrangement of quantum computing systems. Other potential systems for DEP-based arrangement and interaction with electromagnetic radiation include: solid-state NMR of a nitrogen vacancy in diamond particles used in a DEP process, quantum dots used for charge qubits, and quantum dots used for spin quibits.

SPECIFICATION END NOTES

Scope of Invention

While the above descriptions in each of the sections contains many specific details for dielectrophoresis based light control, these details should not be construed as limiting the scope of the invention, but merely providing illustrations of some of the possible methods, physical embodiments and applications. In particular, the present invention is thus not limited to the above theoretical modeling and physical embodiments, but can be changed or modified in various ways on the basis of the general principles of the invention, including but not limited to forces on particles that are induced by other forms of phoresis where gradients in a physical quantity induce ponderomotive forces to curve a light beam's path.

Note that the theoretical discussion provided in this disclosure may reuse some mathematical symbols to mean different things in different locations of the text for historical and pragmatic reasons. The meaning is readily discernible by those skilled in the art when taken in context of the associated descriptions.

Many of the figures in the disclosure are not to scale, but are instead provided to maximize understanding of the underlying concepts.

Many potential applications follow from a few physical principles and a few generic embodiments. This disclosure provides many example embodiments in different applications to establish the flexibility of the underlying principles and to teach by example.

Every effort was made to provide accurate analysis of the physics. Nonetheless, typographical and other errors in equations sometimes make it through reviews. Therefore, derivations, individual equations, textural descriptions, and figures should be taken together so that clarity of meaning is ascertained from a body of information even in the event of an unintended error in an equation.

Finally, the scope of the invention should in general be determined by the appended claims and their equivalents and not only by the examples, embodiments, and theoretical analysis provided in this disclosure.

INDUSTRIAL APPLICABILITY

This invention has applicability for controlling light by controlling scattering from small particles. The control includes optical operations as beam steering and focusing as well as general wavefront modification without significant restrictions due to polarization, direction of input light and direction output light. Specific applications include, but are not limited to: Light Detection and Ranging (LiDAR), electronically focused camera lenses, robotic visions system, adaptive automotive headlights, light-art, free-space photonic network configurations for computing, laser machining, laser power beaming to remotely power drones, 3D-printing, topographic mapping, automated inspection, remote sensing, point-to-point communications, computer displays, augmented reality displays, virtual reality displays, mixed reality displays, electronic paper, sensor drones, topography mapping, surveying, augmented reality sensors, drought monitoring sensors, aircraft collision avoidance, drone based structural inspection, construction site monitoring, security, laser scanning for bar code readers, optical reflectance switches for telecommunications, solar concentrators, solar power plants, solar desalination plants, solar smelting plants, solar radiation control windows, light-beam power combiner, laser systems, laser gyroscopes, a laser machining, a manufacturing machine for making graded refractive index devices, and software reconfigurable optics.

ACKNOWLEDGMENTS

First, and foremost I would like to express sincere thanks and gratitude to my wife Susan and daughter Anora for tolerating the countless days and nights I spent away from them theorizing, experimenting in the lab, and writing for more than a decade of entrepreneurial R&D as I sought a way to contribute to overcoming global warming and make the world a better place through invention.

Second, I would like to thank my parents Maria and Leo DiDomenico, whose sacrificed so much for my life and scientific training and asked for so little in return. Their time of life was entirely too short and they will be forever missed.

REFERENCE SIGNS LIST

2a Augmented Reality Glasses
2b Augmented Reality Pixel
2c Image Scene
3a Electrode
3b Electrode
3c Dielectric Liquid -continued 3d Spherical Dielectric Nanoparticle
3e Boundary
3f Boundary
3g Boundary
5a Dielectric nanosphere
5b Incident Light Field
5c Differential Annulus
5d Far-Field-Point
5e Opaque Screen
6a Beaker
6b Lab Scale
6c Calibration Line
6e First Optically Mapped Curve
6f Second Optically Mapped Curve
6g Magnetic Stirring Rod
6h Third Optically Mapped Curve
7a Electrode
7b Solid Dielectric Material
7c Colloidal Nanoparticle Fluid
7d Electrode
7e Solid Dielectric Material
7f Colloidal Nanoparticle Fluid
8a Electric Field Decay
8b Exponential Approximation
10a Steady State Concentration
12a Micro Fluidic Control Channel
12b Transparent Dielectric
12c Index Matching Liquid
12d Input Rays
12e Propagation Direction
12f Input Rays
12g External Output Rays
12h Direction Arrow
12i Direction Arrow
12j Vacuum Refractive Index
12k solid medium refractive index
13a Incident Light
13b Control Channel
13c Gallery Ray
13d Leading Edge of Control Channel
13e IML Reservoir
13f IML Injection Depth
13g IML Injection Depth
13h IML Injection Depth
13i IML Injection Depth
14a Microfluidic Control Channel
14b Input Rays
14c Propagation Direction
14d Index Gradient Liquid (IGL)
14e Gradient Spoiled Region
14f Output Rays
14g Solid Transparent Material
14h External Output Rays
14i Direction Arrow
14j Direction Arrow
14k Linearized Refractive Index
14m Uniform Refractive Index
14n Solid Refractive Index Region
14o Solid Refractive Index Region
15a Beam Steering Device
15b Electrode
15c Electrode
15d Index Gradient Liquid
15e Light Beam
16a Electrode
16b Electrode
16c Electric Field
16d Constant Potential Line
16e Index Gradient Liquid
16f Light Beam
17a Index Gradient Liquid
17b Light Beam
18a Curved Light Trajectory
18b Free-Space Light Beam
18c Containment Vessel
18d Cut-Away Region
18e MicroFluidic Control Channel
18f Electrodes
18g Electrodes -continued 18h Electrode Boundary
19a Segmented Electrodes
19b SymmetryAxis
19c Upper Electrode
19d Lower Electrode
19e Off-State Angular Range
20a Positive Dielectrophoresis
20b Negative Dielectrophoresis
22a Input Light
22b Microfluidic Control Channel
22c Light Propagation Direction
22d Dielectrophoresis Disrupted Region
22e Rectilinear Propagation
22f Transparent Containment Vessel
22g Free-Space Light Propagation
22h Direction Arrow
22i Direction Arrow
22j Containment Refractive Index
22k Containment Refractive Index
22m GRIN Profile
22n Uniform Refractive Index
23a Electrode
23b Electrode
23c Refractive Index Gradient Liquid
23d Equipotential Curves
23e Electric Field Curves
24a Transparent Radome
24b Radome Inner Surface
24c Optional Inner Solid
24d Outer Surface of the Inner Solid
24e Microfluidic Control Channel
24f Nanoparticle Colloid
24g Input Light Beam
24h Angle Selective Mirror
24i Upward Spiraling Light Trajectory
24j Downward Spiraling Light Trajectory
24k Reflection Device
24m Point
24n Internal Rectilinear Trajectory
24o Point
24p Internal Rectilinear Trajectory
24q First Magnification Inset
24r Nanoparticle Gradient Vector
24s Nanoparticle Gradient Vector
24t Nanoparticle Gradient Vector
24u Second Magnification Inset
24v Transparent Transistors
24w Transparent Electrodes
25a Radome
25b V-electrode
25c W-band Antenna Aperture
25d Cone Shaped Mirror
25e Image Field Light
25g charged couples device
25g Lens System
26a Autonomous Vehicle
26b Hyper-Spectral Sensor
26c W-Band Antenna Pattern
26d Change Angle Direction
26e W-Band Antenna Pattern
26f LiDAR Beam
26g LiDAR Beam
26h Movement in Angle
26i Visible World Scene
28a Dielectric Spherical Manifold
28b Meridian Geodesic
28c Main Lobe
28d Side Lobe
28e Linearly Propagating Light
32a Laser Output Aperture
32b First Laser Beam
32b Second Laser Beam
32d Colloid
33a Ray Circle
33b Ray Circle
33c Lens Circle
34a Exact Solution
34b Approximate Solution
34c Initial Ray

| | |
|---|---|
| 35a Laser Source | 43y Output Surface Mode |
| 35b External Surface | 43z Output Surface Mode |
| 35c Internal Surface | 45a Volume Phase Hologram (VPH) |
| 35d Colloidal Medium | 45b Reciprocal Space |
| 35e First Electrode Array | 45c Circular Dispersion Curve |
| 35f Second Electrode Array | 45d p-Polarized Dispersion Curve |
| 35g Individual Electrode | 45e p-Polarized Dispersion Curve |
| 35h Curving Ray | 45f s-Polarized Dispersion Curve |
| 35i Output Rays | 45g s-Polarized Dispersion Curve |
| 35j First Lens Surface | 45h Construction Line |
| 35k Second Lens Surface | 45i Replay Wave |
| 35m First Ray Segment | 45j Scattered Wave |
| 35n Second Ray Segment | 45k Unit Polarization Vector |
| 35o Third Ray Segment | 45m Unit Polarization Vector |
| 36a Flat Lens Surface | 45n Steering Angle |
| 37a First Parallel Electrode | 45o VPH First Surface |
| 37b Fourth Parallel Electrode | 45p VPH Second Surface |
| 37b Second Parallel Electrode | 45q Input Medium |
| 37c Third Parallel Electrode | 45r Output Medium |
| 41a Fringe | 45s refractive index fringe |
| 41b First Ray | 45t Lattice Spacing |
| 41c Second Ray | 45u Reciprocal Lattice Vector |
| 41d Third Ray | 45v Construction Line |
| 41e Fourth Ray | 45w Group Velocity Vector |
| 42a Sharp Diffraction Edge | 46a Optimal Performance Point |
| 42b First Ray | 46b Optimal Performance Point |
| 42c Second Ray | 46c Optimal Performance Point |
| 42d Third Ray | 50a Periodic Potential |
| 42e Fourth Ray | 50b Periodic Ponderomotive Force |
| 43a Volume Phase Hologram (VPH) | 51a LiDAR Transceiver |
| 43aa Output Surface Mode | 51b Laser Source |
| 43ab Output Surface Mode | 51c Upper Section |
| 43ac Transmission Mode | 51d Photodiode Receiver |
| 43ad Output Surface Mode | 51e Lower Section |
| 43ae Output Surface Mode | 51f First Surface |
| 43af Output Surface Mode | 51g Optical Radome |
| 43ag Output Surface Mode | 51h Nanoparticle Colloid |
| 43ah VPH First Surface | 51i Second Surface |
| 43ai VPH Second Surface | 51j Outbound Laser Beam |
| 43aj Isotropic Dispersion Curve | 51k Transmitter Beam |
| 43ak Wavevector | 51m Electrode Array |
| 43am Wavevector | 51n Back-Scatted Light |
| 43an Wavevector | 51o Circular Light Trajectory |
| 43ao Wavevector | 51p Optical Reflector |
| 43ap Reciprocal Lattice Vectors | 51q Optical Reflector |
| 43aq Input Surface Mode | 51r Mismatched Ray Segment |
| 43ar Output Surface Mode | 51s Mismatched Ray Segment |
| 43as Reference Point | 52a Non-Imaging Lens |
| 43at Output Surface Mode | 52b Matched Rays |
| 43au Output Surface Mode | 52c Photodiode |
| 43av Output Surface Mode | 53a Photosensitive Time-Domain Array |
| 43aw Isotropic Dispersion Curve | 54a LiDAR Sensor Drone |
| 43ax Isotropic Dispersion Curve | 54b Beam-Steered Rays |
| 43ay Output Surface Mode | 54c Sensor Port |
| 43az Output Surface Mode | 54d Drone Hull |
| 43b VPH First Surface | 54e Ducted Fan |
| 43ba Output Surface Mode | 54f Ducted Fan |
| 43bb Output Surface Mode | 54g Sensor Port |
| 43c VPH Second Surface | 54h Sensor Port |
| 43d Edge Scattering Site | 54i Sensor Port |
| 43e First Medium | 54j LiDAR Transceiver |
| 43f First Medium | 54k LiDAR Transceiver |
| 43g Input Surface | 54m LiDAR Transceiver |
| 43h Input Medium | 54n Mass Distribution Tube |
| 43i Input Volume Mode | 54o Mass Distribution Tube |
| 43j Input Volume Mode | 54p Steered Laser Beam |
| 43k Input Volume Mode | 55a Input Light |
| 43m Input Volume Mode | 55b First Containment Structure |
| 43n Input Volume Mode | 55c Second Containment Structure |
| 43o Input Volume Mode | 55d Index Gradient Liquid |
| 43p Output Volume Mode | 55e First Annular Electrode |
| 43q Output Volume Mode | 55f Second Annular Electrode |
| 43r Output Volume Mode | 55g Electrical Insulator |
| 43s Output Volume Mode | 55h Electric Fields |
| 43t Output Volume Mode | 55i Symmetry Axis |
| 43u Output Volume Mode | 55j Output Light |
| 43v Fringe | 55k Converging Lens Refractive Index |
| 43w VPH Thickness | 55m Diverging Lens Refractive Index |
| 43x Input Surface Mode | 56a First Annular Electrode |

| | |
|---|---|
| 56b Second Annular Electrode | 68k First Medium |
| 56c Electrical Insulator | 68m Colloidal Medium |
| 56d Tapered Electrode | 68n Curved Scattering Ray |
| 57a Input Light | 68o Output Ray |
| 57b Output Light | 68p Electrode Array |
| 57c Dielectrophoresis Lens | 68q Scattered Light |
| 57d Optical Axis | 69a Incident Light Ray |
| 57e First Annular Electrode | 69b First Optical Boundary |
| 57f Second Annular Electrode | 69c First Medium |
| 57g Electrical Insulator | 69d Colloidal Medium |
| 57h First Containment Structure | 69e Electrode Array |
| 57i Second Containment Structure | 69f Colloidal Nanoparticles |
| 58a Concentric Electrodes | 69g Reflected Light Ray |
| 58b Colloid Containment Volume | 69h Electrode Array |
| 58c Optical Axis | 69i First Medium |
| 58d Input Light | 69j Third Medium |
| 58e Containment Structure | 69k Incident Ray |
| 58f Focused Output Light | 69m First Optical Boundary |
| 58g Cutaway Arc | 69n Second Optical Boundary |
| 59a Thin Circular Lens | 69o Output Ray |
| 59b Focus | 69p Optional Scattered Light |
| 59c Origin of Coordinate System | 71a Magnified Cross-Section |
| 59d Actual Output Ray | 71b Narrow-Band Guided Light |
| 59e Approximating Ray | 71c Narrow-Band Guided Light |
| 60a Exponential Refractive Index Gradient | 71d Solid Waveguide |
| 60b Family of Equal radii Circles | 71e MicroFluidic Control Channel |
| 60c Focus Point | 71f DEP Electrodes |
| 60d Radome Circle | 71g Electrode |
| 61a Optical Axis | 71h Fluorescing Pixel Region |
| 61b Control Volume Circle | 71i Pixel Output Light |
| 61c Light Carrying Fiber Optic | 71j Point |
| 61d Light Carrying Fiber Optic | 71k Light Ray |
| 61e Ball Lens | 71m Zoomed Out View |
| 61f Ball Lens | 71n Wave Guide |
| 61g Gradient Arrow | 71o Edge-Launched Light |
| 61h Gradient Arrow | 71p Guided Ray |
| 61i Ray Bundle | 71q Guided Ray |
| 61j Ray Bundle | 71r Total Internal Reflection Point |
| 61k Focal Point | 71s Edge-Launched Ray |
| 61m Optional Mirror | 71t Micro Fluidic Control Channel |
| 61n Propagation Direction Arrow | 71u Output Display Light |
| 61o Propagation Direction Arrow | 71v Transparent Solid |
| 61p Beam Combiner Output | 71w Human Eye |
| 61q Normal Ray | 71x Scene Light |
| 61r Normal Ray | 71y Scene Object |
| 61s Lens | 72a Optional Light Control Layer |
| 61t Target | 72b Waveguide Layer |
| 63a Control Volume | 72c DEP Process Layer |
| 63b Array of Circular Electrodes | 72d Transparent Thin Film Transistor Layer |
| 64a Control Volume | 72e Transparent Thin Film Transistor |
| 64b Linear Electrode | 72f Electrode-Select Wire |
| 65a High Refractive Index Reflectance | 72g Signal Wire |
| 65b Medium Refractive Index Reflectance | 72h Electrode |
| 65c Low Refractive Index Reflectance | 72i Fluidic Containment Layer |
| 66a Input Ray | 74a Single Color-Pixel |
| 66b High Concentration Region | 74b Red Sub-Pixel |
| 66c Low Concentration Region | 74c Green Sub-Pixel |
| 66d Curved Trajectory Ray Segment | 74d Blue Sub-Pixel |
| 66e Output Ray | 74e Black Background |
| 67a Input Surface | 74f Waveguide |
| 67b Interior Refractive Index | 74g Primary Light Source |
| 67c Air | 74h Pixel-Waveguide Boundary |
| 67d Structured Nanoparticle | 74i Transparent Thin Film Transistor |
| 67e Structured Nanoparticle | 74j Harmonic Data Signal |
| 67f Structured Nanoparticle | 74k Digital Select Signals |
| 67g Inclusion | 74m Red Electrode |
| 67h Refractive Index Gradient | 74n Green Electrode |
| 68a First Medium | 74o Blue Electrode |
| 68aa Last Medium | 74p Optional Conductive Screen |
| 68b Colloidal Medium | 74q Electrical Ground |
| 68c Solid Nanoparticles | 74r Containment Medium |
| 68d First Array Of Electrodes | 74s Optical Output Surface |
| 68dd Second Array Of Electrodes | 74t Output Light |
| 68e Optical Boundary | 75a First Transparent Slab |
| 68f Incident Ray | 75b Second Transparent Slab |
| 68g Output Ray | 75c Electrode |
| 68h Optical Boundary | 75d Colloidal Medium |
| 68i Incident Ray | 75e Color Producing Particles |
| 68j Nanoparticle Distribution | 75f White Light Scattering Particle |

215
-continued

75g First Transparent Slab
75h Second Transparent Slab
75i Electrode
75j Colloidal Medium
75k Color Producing Particles
75m Large Light Scattering Particle
76a First Ray Segment
76b First Optical Surface
76c External Environment
76d First Internal Environment
76e Second Ray Segment
76f Second Internal Environment
76g Effective Mirror
76h Second Optical Surface
76i External Environment
76j Third Ray Segment
76k Perturbation Ray
76m Perturbation Ray
77a Transparent Slab
77b Transparent Corrugation Slab
77c μFCC Region
77d Colloid
77e Transparent Electrode
77f Light Guide Ray
77g Light Guide Ray
77h Waveguide Surface
77i Waveguide Surface
77j TIR Bounce Point
77k Observer's Eye
77m Line of Electrodes
77n Observer's Eye
77o High Concentration Region
77p Pixel Light
77q Light Form Image Source
77r Viewed Physical Object
78a Edge Launched Light
78b Transparent Slab
78c Transparent Corrugation Slab
78d Transparent Electrode
78e The Pass Through Beam
78f Pixel Beam
78g Observer's Eye
78h External Light
78i Scene Object
78j TIR2 Mirror
12 79a Curved Wavefront
79b Edge Launched Light
79c Pixel Beam
79d Observer
79e Curved Wavefront
79f Hover Pixel Position
80a Transparent Slab
80b Transparent Corrugation Slab
80c μFCC Region
80d Corrugation Step
80e Transparent Electrode
80f 1$^{st}$ Linear Array of Electrodes
80g 2$^{nd}$ Linear Array of Electrodes
80h 3$^{rd}$ Linear Array of Electrodes
80i N$^{th}$ Linear Array of Electrodes
80j Harmonic Voltage Source Array
81a First Optical Slab
81b Second Optical Slab
81c MicroFluidic Control Channel
81d Input Light Beam
81e electrode
81f Electrode
81g Light Scattering Nanoparticles
81h Observer's Eye
81i Output Solid Angle
81j External Environment Object
81k Scene Light
81m Augmented Reality Display
81n Optional Light Absorbing Backplane
83a Right Lens
83b Left Lens
83c DEP Zoom Lens
83d LiDAR Beam Steering Director
83e LiDAR Receiver

216
-continued

83f Augmented Reality Observer
83g Augmented Reality Frame
83h Ear Rest
84a Lens Corrugation Steps
85a Light Edge Injectors
85b Injected Light
85c Light Absorber
86a Table Edge
86b Front Lens Element
86c Front Lens Element
86d Lens Holder
86e Signal Connection
86f Lens Corrugations
86g Back Lens Elements
86h Lens Holder
86i Light Edge Injectors
86j Control Volume Gap
87a Multi-Button Controller
90a Direction Arrow
90b Direction Arrow
91a Lens Cross Section
91aa Colloid
91ab Transparent Electrode Layer
91ac Randomly Rough Surface
91ad Second Magnified Detail
91ae Periodic Surface
91af Colloid
91b Input Light
91bb Light Guide Core
91c Solid Cladding Layer
91d Colloidal Cladding Layer
91e Scattering Electrode Layer
91f Second Lens
91g Eye
91h First Magnified Detail
91i Light Guide Core
91j Guided Ray
91k Solid Cladding Layer
91m Low RI Cladding Region
91n Low RI Cladding Region
91o Medium RI Cladding Region
91p Stochastic Pixel Region
91q Second Magnified Detail
91r Ray Bundle
91s Second Lens
91t Air
91u High RI Colloidal Region
91y Light Ray
91w Scene Region
91x Lens Back Surface
91y Transparent Electrode Layer
91z Transparent Electrode
93a External Environment
93b External Cladding Layer
93c Light Guide Layer
93d Low RI Colloid Cladding
93e Low RI Colloid Cladding
93f Pixel RIM Layer
93g Beam Shaper RIM Layer
93h Beam Shaper RIM Layer
93i Transparent Electronics Layer
93j Second Lens
93k Random Surface
93m Transparent Electrode
93n External Eye Environment
94a First Colloidal Control Volume
94b First Colloidal Control Volume
94c RGB Laser Sources
94d Optical Axis
94e Electrode
94f Curved Laser Radome
94g Transparent Electrode Layer
94h Lens Section
94i First Scanned Laser
94j Second Scanned Laser
94k Curved Focusing Electrode
94m Refractive Index Variation
95a First RI Segment
95b Second RI Segment

| | |
|---|---|
| 95c Third RI Segment | 107d Third Array |
| 95d Fourth RI Segment | 107e Fifth Array |
| 95e Fifth RI Segment | 107e First Array |
| 95f Laser Beam Extent | 107e Third Array |
| 96a Pump Beam | 107f Sixth Array |
| 96b Sold Transparent Medium | 107w Solar Tower |
| 96c Colloidal Medium | 107x Sunlight |
| 96d Inner Containment Wall | 108a Input Sunlight |
| 96e Outer Containment Wall | 108b Output Sunlight |
| 96f Doped Fiber Core | 108c Input Surface |
| 96g Non-Uniform Colloidal RI | 108d Output Surface |
| 96h n-Uniform Colloidal RI | 108e Solid Transparent Medium |
| 96i Core RI | 108f Array of Control Volumes |
| 96j Modified Pump Beam | 108g Electrode Array |
| 96k Propagation Direction | 108h First Inset Drawing |
| 96m Laser Beam | 108i Second Inset Drawing |
| 96n Containment RI | 108j Intermediate Light Ray |
| 96o Containment RI | 108k Output Light Ray |
| 96p Inner Solid Region | 108m TIR Point |
| 97a Fiber Laser Core | 108n µFCC |
| 97aa Fiber Laser Core | 108o Solid Transparent Medium |
| 97b Shaped Channel | 108p Low Refractive Index Side |
| 97bb Shaped Channel | 108q µFCC |
| 97c First Electrode | 108r Intermediate Light Ray |
| 97cc First Electrode | 108s Output Light Ray |
| 97d Second Electrode | 108t Solid Transparent Medium |
| 97dd First Electrode | 108u Electrode |
| 97e Interstitial Space | 108v Parallel Direction |
| 97f Harmonic Voltage Source | 108w Tangent Direction |
| 97g Iso-Potential Curve | 109a solar collector-concentrator |
| 97h Electric Field | 109b Beam Steering System |
| 97i Input Pump Light | 109c Reflector |
| 98a Fiber Laser Core | 109d Solar Receiver |
| 98b Nanoparticle Colloid | 109e Annual Angular Range |
| 98c Containment Vessel | 109f Mirror Reflection |
| 98d Electrode | 109g Magnified Region |
| 98e Asymmetric Nanoparticle Distribution | 109h Winter Solstice Magnification |
| 100a First Fiber Laser Subassembly | 109i Input Light Bundle |
| 100b Coiled Fiber Laser Bundle | 109j First Surface |
| 100c First Fiber Laser Holder | 109k Second Surface |
| 100d Diode Laser Source Module | 109m Output Light Bundle |
| 100e Output Fiber Bundle | 109n Deactivated Mirror |
| 100f Fiber Bundle | 109o Activated Mirror |
| 100g V-Groove | 109p Winter Solstice Magnification |
| 100h Electrode | 109q Input Light Bundle |
| 101a Array of Fiber Lasers | 109r Activated Mirror |
| 101b Diode Laser Source Module | 109s Output Light Bundle |
| 101c Array of Curved Laser Beam Trajectories | 110a Concentrating Solar Collector |
| 102a Optional Mirror | 110aa Equations Of Time |
| 102b First Lens Electrode | 110b Ground |
| 102c Second Lens Electrode | 110bb Summer Solstice Side |
| 102d Insulator | 110c Output Aperture |
| 102e Fiber Optic Retaining Structure | 110cc Winter Solstice Side |
| 102f External Case | 110d Active Input Slab |
| 102g Collimated Laser Beam | 110e Reflective Side |
| 103a Beam Steering Assembly | 110f Reflective Side |
| 103b Beam Combiner | 110g Reflective Bottom |
| 104a Protective Shell | 110h Input Ray |
| 104b Lens | 110i Internal Ray |
| 104c Outbound Laser Beam | 110j Internal Ray |
| 104d Inbound Laser Signal | 110k Internal Ray |
| 104e Azimuth Field of View | 110m Safety Region |
| 104f Elevation Field of View | 111a Sun |
| 105a Fiber Laser System | 111b Direct Sunlight |
| 105b Laser Machined Part | 111c Indirect Sunlight |
| 105c Cut Line | 111d Electrically Large Grating |
| 106a Tracking Array | 111e Ground Cavity |
| 106b Ground | 111f Output Ray |
| 106c Morning Sunlight | 111g Output Ray |
| 106d Mirror On Tracker | 111h Solar Receiver |
| 106e Morning Shadow | 111i Secondary Mirror |
| 106f Noon Configuration | 112a Sun |
| 106g Sunlight Intercepted | 112b Hemispherical Sky |
| 106h Mirror | 112c Transparent Solid |
| 106i Interstitial Region | 112d Electrically Large Grating |
| 107a First Array | 112e Tracker Input Surface |
| 107b Second Array | 112f Tracker Output Surface |
| 107c Third Array | 112g Cone Of Light |
| 107d Fourth Array | 112g Emitted Light Cones |

-continued

112h Lens Array Input Surface
112i Lens Array Output Surface
112j Input Ray Cone
112k Focal Region
112m Solar Panel
113a Sun
113b Direct Sunlight
113c Indirect Sunlight
113d Electrically Large Grating
113e Transparent Solid
113f Solar Tower
113g Solar Receiver
113h Ray Bundle
113i Ground
114a First Transparent Layer
114b Second Transparent Layer
114c First Electrode Array
114d Second Electrode Array
116a First Slab
116b Second Slab
116c First Electrode Array
116d Second Electrode Array
116e Colloid
116f First Harmonic Excitation
116g Second Harmonic Excitation

The invention claimed is:

1. A phoresis based device for scattering input light, comprising: (a) at least one light scattering control volume; (b) a plurality of particles; (c) at least one of a transparent liquid and gas; (d) at least one source of non-uniform electromagnetic fields; (e) at least one transparent solid; wherein said input light is directed into said at least one light scattering control volume where said plurality of particles is mixed with said at least one of a transparent liquid and gas to form at least one of a colloid and a suspension that interacts with non-uniform electromagnetic fields, which are provided by said at least one source of non-uniform electromagnetic fields, said interactions producing forces by at least ponderomotive, fluid mechanical, and thermal interactions; which further provides a distribution in space and time of said plurality of particles in the quantities of: volume fraction, concentration, scattering, and average refractive index, within said at least one of a colloid and a suspension; thereby allowing said input light to move along a curved trajectory, as needed, within said at least one light scattering control volume to become output light; wherein said input light and said output light may be transmitted through at least one optical boundary, where said at least one optical boundary is formed by said at least one transparent solid in direct contact with said at least one of a colloid and a suspension so that said at least one optical boundary passes light into and out of said at least one light scattering control volume as needed; whereby said input light, which is potentially broadband, polarization diverse, and high-power is transformed into said output light by a scattering process that is controlled electronically through a phoretic process and diffusion process to manipulate the refractive index and scattering properties of said at least one of a colloid and a suspension so that light may propagate substantially and when needed by curved ray trajectories, or its modal equivalent, over large distances in said at least one light scattering control volume for a variety of photonics applications including those that require the steering, focusing, display, and generation of potentially and substantially broadband, polarization diverse, diffraction-free, and high-power light.

2. The device of claim 1, wherein said at least one source of non-uniform electromagnetic fields is generalized to a non-uniform physical quantity that provides particle motion by such phenomena as, but not limited to: acoustophoresis, anaphoresis, cataphoresis, chemophoresis, dielectrophroesis, diffusiophoresis, diffusioosmosis, electrophoresis, electromagnetophoresis, thermophoresis, optophoresis, and magnetophoresis.

3. The device of claim 1, wherein said input light is a beam of light.

4. The device of claim 1, wherein said input light is at least one of continuous, pulsed, chirped frequency, and space-time light having each spatial frequency associated with a specific temporal frequency.

5. The device of claim 1, wherein said at least one light scattering control volume includes a thin gap between at least two surfaces forming said at least one control volume.

6. The device of claim 1, wherein said plurality of particles comprise at least one of nanoparticles and microparticles.

7. The device of claim 1, wherein said plurality of particles comprise at least one of optically transparent, optically opaque and optically reflecting.

8. The device of claim 1, wherein said plurality of particles comprise at least one of glass, diamond, titanium dioxide, corundum, barium titanate, metals, and metallic alloys.

9. The device of claim 1, wherein said plurality of particles comprise at least one of a dielectric, a metal, and a magnetic material.

10. The device of claim 1, wherein said plurality of particles comprise at least one of positive material dispersion and negative material dispersion.

11. The device of claim 1, wherein said plurality of particles comprise optical scatters of at least one of a quantum dot, a plasmonic dot, a photonic bandgap dot, and a biologic cell, all of which have complex internal structures.

12. The device of claim 1, wherein said plurality of particles comprise doped transparent gain medium with atoms of at least one of dysprosium, erbium, holmium, neodymium, praseodymium, thulium and ytterbium.

13. The device of claim 1, wherein said plurality of particles comprise at least one of solid particles, and particles with voids therein.

14. The device of claim 1, wherein said plurality of particles comprise at least one of cage molecules, cage molecule derivatives formed by chemical bonding, and endohedral forms of cage molecules.

15. The device of claim 1, wherein said plurality of particles comprise a plurality of particles having a distribution of different sizes, shapes, dielectric constants, refractive indices and conductivities.

16. The device of claim 1, wherein said plurality of particles comprise in part surfactants and other chemicals to help provide a stable colloid that remains separated and does not precipitate and flocculate.

17. The device of claim 1, wherein said plurality of particles is optically transparent over a select spectral range.

18. The device of claim 1, wherein said plurality of particles comprise Janus type particles, which comprise different material properties on at least two sides of each particle, so that a self-phoretic process may self-propel said plurality of particles using energy derived from the environment in order to provide at least one of a modified distribution of particles and a modification of the diffusion coefficient.

19. The device of claim 1, wherein said at least one of a transparent liquid and gas is water, a hydrocarbon, an isoparaffin, and a silicone fluid, each of which may have additives to set the conductivity.

20. The device of claim 1, wherein said plurality of particles and said at least one of a transparent liquid and gas form at least one of a colloid and a suspension.

21. The device of claim 20, wherein said at least one of a colloid and a suspension is optically matched to the refractive index of said at least one transparent solid.

22. The device of claim 20, wherein said at least one of a colloid and a suspension maintains a refractive index gradient therein.

23. The device of claim 1, wherein said at least one source of non-uniform electromagnetic fields is at least one of oscillating and non-oscillating.

24. The device of claim 1, wherein said at least one source of non-uniform and electromagnetic field is provided by at least one electrode pair connected to at least one voltage source.

25. The device of claim 24, wherein said at least one voltage source provides at least one of a narrowband signal and a broadband signal, where said narrow-band signal is substantially a harmonic signal and said broadband signal may include but is not limited to at least one of broadband pulses and noise from a substantially stochastic process.

26. The device of claim 24, wherein said at least one electrode pair comprises at least one substantially transparent thin layer of elemental metal, alloyed metal, indium tin oxide, conductive polymers, graphene, borophene, and metallic nanoparticle ink.

27. The device of claim 24, wherein said at least one electrode pair comprises electrodes in three dimensions.

28. The device of claim 24, wherein said at least one electrode pair comprises an electrodes array on a two dimensional surface.

29. The device of claim 24, wherein said at least one electrode pair is an electrode array that further supports harmonic polyphase excitation of two or more phases to produce ponderomotive forces in substantially different directions.

30. The device of claim 24, wherein said at least one voltage source provides harmonic time varying voltages.

31. The device of claim 24, wherein said at least one voltage source provides harmonic polyphase excitation.

32. The device of claim 24, wherein said at least one voltage source provides arbitrary waveform voltage excitation.

33. The device of claim 1, wherein said at least one transparent solid is a plastic, glass, ceramic, and semiconductor.

* * * * *